US010643046B2

(12) United States Patent
Yoshida

(10) Patent No.: US 10,643,046 B2
(45) Date of Patent: May 5, 2020

(54) DEVICE, AND CARD TYPE DEVICE

(71) Applicant: I.P SOLUTIONS, LTD, Tokyo (JP)

(72) Inventor: Kenji Yoshida, Tokyo (JP)

(73) Assignee: I.P SOLUTIONS, LTD, Tokyo (JP)

( * ) Notice: Subject to any disclaimer, the term of this patent is extended or adjusted under 35 U.S.C. 154(b) by 0 days.

(21) Appl. No.: 15/761,817

(22) PCT Filed: Sep. 21, 2016

(86) PCT No.: PCT/JP2016/077914

§ 371 (c)(1),
(2) Date: Nov. 13, 2018

(87) PCT Pub. No.: WO2017/051833

PCT Pub. Date: Mar. 30, 2017

(65) Prior Publication Data

US 2019/0080127 A1 Mar. 14, 2019

Related U.S. Application Data

(60) Provisional application No. 62/366,615, filed on Jul. 25, 2016, provisional application No. 62/311,611, filed on Mar. 22, 2016.

(30) Foreign Application Priority Data

Sep. 21, 2015 (JP) ................................ 2015-186144
Nov. 17, 2015 (JP) ................................ 2015-225115
(Continued)

(51) Int. Cl.
*G06K 7/12* (2006.01)
*G06K 7/14* (2006.01)
(Continued)

(52) U.S. Cl.
CPC .......... *G06K 7/12* (2013.01); *G06F 3/03545* (2013.01); *G06F 3/03547* (2013.01);
(Continued)

(58) Field of Classification Search
None
See application file for complete search history.

(56) References Cited

U.S. PATENT DOCUMENTS 5,896,403 A 4/1999 Nagasaki et al.
2006/0071076 A1 4/2006 Tamayama
(Continued)

FOREIGN PATENT DOCUMENTS

EP 2804078 A1 11/2014
GB 2523611 A 2/2015
(Continued)

OTHER PUBLICATIONS

Japan Patent Office; Tokyo, Japan; Dec. 11, 2015
(Continued)

*Primary Examiner* — Kristy A Haupt
(74) *Attorney, Agent, or Firm* — Patshegen IP LLC; Moshe Pinchas

(57) ABSTRACT

The present invention enables a code to be recognized by a smart phone or other electronic devices even when the code is successively changed. The apparatus is equipped with an incoming amount detection unit for detecting the incoming amount per unit time of external energy incoming from the exterior, an information acquisition circuit for acquiring input information in a predetermined format based on a change in the said incoming amount per unit time, a working surface arranged with one or more elements in which a physical quantity change detectable from a counter surface occurs, one or more physical quantity control units which generate the said physical quantity change in each of the said
(Continued)

one or more elements, and an information output unit in the said one or more physical quantity control units which outputs output information in a predetermined format in accordance with the said physical quantity change by the said one or more elements.

30 Claims, 219 Drawing Sheets

(30) Foreign Application Priority Data

| | | |
|---|---|---|
| Nov. 17, 2015 | (WO) | PCT/JP2015/082315 |
| Feb. 17, 2016 | (JP) | 2016-028444 |
| Mar. 22, 2016 | (JP) | 2016-057723 |
| Jul. 25, 2016 | (JP) | 2016-145848 |

(51) Int. Cl.

| | |
|---|---|
| ***G06F 21/73*** | (2013.01) |
| ***G06F 3/042*** | (2006.01) |
| ***G06F 3/0354*** | (2013.01) |
| ***G06F 21/32*** | (2013.01) |
| ***G06F 3/041*** | (2006.01) |
| ***G06F 21/34*** | (2013.01) |
| ***G06F 3/044*** | (2006.01) |

(52) U.S. Cl.

CPC ............ *G06F 3/042* (2013.01); *G06F 3/0416* (2013.01); *G06F 21/32* (2013.01); *G06F 21/34* (2013.01); *G06F 21/73* (2013.01); *G06K 7/143* (2013.01); *G06K 7/1413* (2013.01); *G06K 7/1417* (2013.01); *G06F 3/044* (2013.01); *G06F 2221/2153* (2013.01)

(56) References Cited

U.S. PATENT DOCUMENTS

| | | | | |
|---|---|---|---|---|
| 2010/0149119 | A1 | 6/2010 | Homma et al. | |
| 2012/0068962 | A1 | 3/2012 | Yamamoto et al. | |
| 2012/0118968 | A1 | 5/2012 | Yoshida | |
| 2012/0331546 | A1* | 12/2012 | Falkenburg ......... | G06F 3/03545 726/16 |
| 2013/0076690 | A1* | 3/2013 | Vellanki .................. | G06F 3/044 345/174 |
| 2014/0368430 | A1* | 12/2014 | Choi ..................... | G06F 3/0488 345/156 |
| 2015/0042609 | A1 | 2/2015 | Takanohashi | |
| 2016/0125323 | A1 | 5/2016 | Uenishi et al. | |

FOREIGN PATENT DOCUMENTS

| | | | |
|---|---|---|---|
| JP | 2008-271139 | A | 3/1990 |
| JP | 2003-274474 | A | 9/2003 |
| JP | 2003-281483 | A | 10/2003 |
| JP | 2008-181555 | A | 8/2008 |
| JP | 2010-140322 | A | 6/2010 |
| JP | 2011-129531 | A | 6/2011 |
| JP | 2015-507270 | A | 3/2015 |
| JP | 2015-191629 | A | 11/2015 |
| JP | 2015-207837 | A | 11/2015 |

OTHER PUBLICATIONS

Japan Patent Office; Tokyo, Japan; Dec. 13, 2016

European Search Report; Munich; Aug. 21, 2019.

The International Bureau of WIPO; Geneva Switzerland; Mar. 27, 2018.

* cited by examiner

TOP FACE OF THE PATTERN CODE SETTING RING

PATTERN CODE 00000001 (1 IN THE DECIMAL NUMBER SYSTEM)

PATTERN CODE 10010110 (150 IN THE DECIMAL NUMBER SYSTEM)

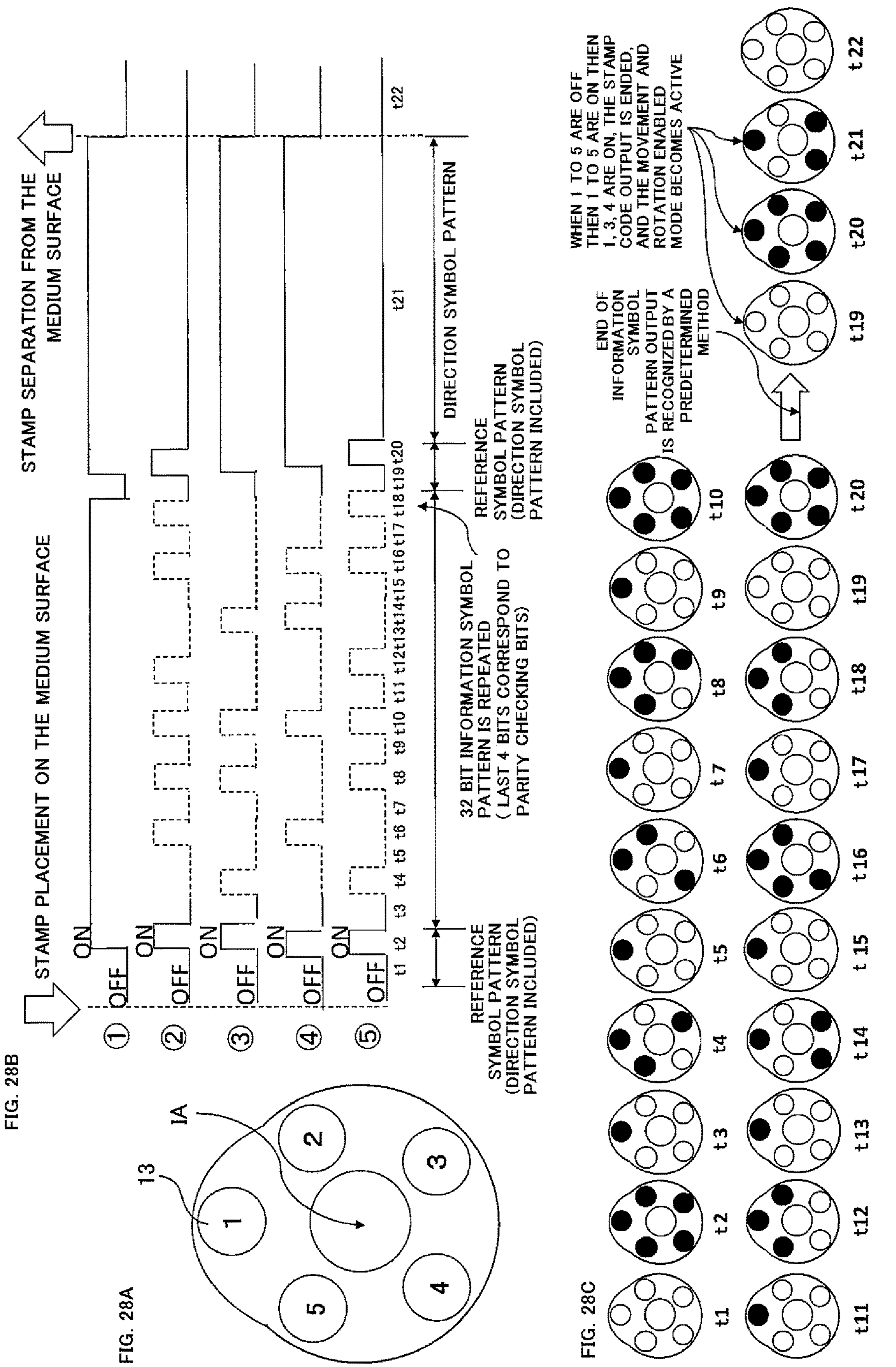
FIG. 28A
13
IA
1
2
3
4
5
FIG. 28B
STAMP PLACEMENT ON THE MEDIUM SURFACE
STAMP SEPARATION FROM THE MEDIUM SURFACE
①
②
③
④
⑤
OFF
ON
t1 t2 t3 t4 t5 t6 t7 t8 t9 t10 t11 t12t13t14t15 t16t17 t18 t19t20
t21
t22
REFERENCE SYMBOL PATTERN (DIRECTION SYMBOL PATTERN INCLUDED)
32 BIT INFORMATION SYMBOL PATTERN IS REPEATED (LAST 4 BITS CORRESPOND TO PARITY CHECKING BITS)
REFERENCE SYMBOL PATTERN (DIRECTION SYMBOL PATTERN INCLUDED)
DIRECTION SYMBOL PATTERN
FIG. 28C
t1 t2 t3 t4 t5 t6 t7 t8 t9 t10
t11 t12 t13 t14 t 15 t16 t17 t18 t19 t 20
END OF INFORMATION SYMBOL PATTERN OUTPUT IS RECOGNIZED BY A PREDETERMINED METHOD
WHEN 1 TO 5 ARE OFF THEN 1 TO 5 ARE ON THEN 1, 3, 4 ARE ON, THE STAMP CODE OUTPUT IS ENDED, AND THE MOVEMENT AND ROTATION ENABLED MODE BECOMES ACTIVE
t19 t20 t21 t22

FIG. 44A

| |
|---|
| CODE VALUE |

FIG. 44B

| | |
|---|---|
| X COORDINATE VALUE | Y COORDINATE VALUE |

FIG. 44C

| | | |
|---|---|---|
| CODE VALUE | X COORDINATE VALUE | Y COORDINATE VALUE |

FRONT SIDE

| CONDUCTOR | 7 MM DIAMETER BRASS DISK | | |
|---|---|---|---|
| SHIELDED WIRE SCISSION [DISCONNECTION] | | PRESENCE OR ABSENCE OF RESPONSE | |
| LENGTH | ELECTRO-STATIC CAPACITANCE | i-phone MODEL | |
| | | 5s | 6 |
| 13.8 mm | 4.00 pF | YES | YES |
| 11.2 mm | 3.25 pF | YES | YES |
| 9.3 mm | 2.70 pF | YES | YES |
| 8.7 mm | 2.52 pF | YES | YES |
| 7.5 mm | 2.18 pF | YES | YES |
| 6.0 mm | 1.74 pF | YES | YES |
| 5.3 mm | 1.54 pF | NO | NO |
| THRESHOLD RESISTANCE VALUE | | 1.64 pF | 1.64 pF |

FIG. 189

| CONDUCTOR | 7.5 MM DIAMETER BRASS DISK | | |
|---|---|---|---|
| SHIELDED WIRE SCISSION [DISCONNECTION] | | PRESENCE OR ABSENCE OF RESPONSE | |
| LENGTH | ELECTRO-STATIC CAPACITANCE | i-phone MODEL | |
| | | 5s | 6 |
| 10.1 | 2.929 | YES | YES |
| 9.6 | 2.784 | YES | YES |
| 8.2 | 2.378 | YES | YES |
| 7.8 | 2.262 | YES | YES |
| 6.8 | 1.972 | YES | NO |
| 6 | 1.74 | NO | NO |
| THRESHOLD RESISTANCE VALUE | | 1.86 pF | 2.12 pF |

FIG. 190

| CONDUCTOR | 8 MM DIAMETER BRASS DISK | | |
|---|---|---|---|
| SHIELDED WIRE SCISSION [DISCONNECTION] | | PRESENCE OR ABSENCE OF RESPONSE | |
| LENGTH | ELECTROSTATIC CAPACITANCE | i-phone MODEL | |
| | | 5s | 6 |
| 11.5 | 3.335 | YES | YES |
| 10.9 | 3.161 | YES | YES |
| 9.7 | 2.813 | YES | YES |
| 8.1 | 2.349 | YES | YES |
| 7.6 | 2.204 | YES | YES |
| 6.8 | 1.972 | NO | NO |
| THRESHOLD RESISTANCE VALUE | | 2.09 pF | 2.09 pF |

FIG. 191

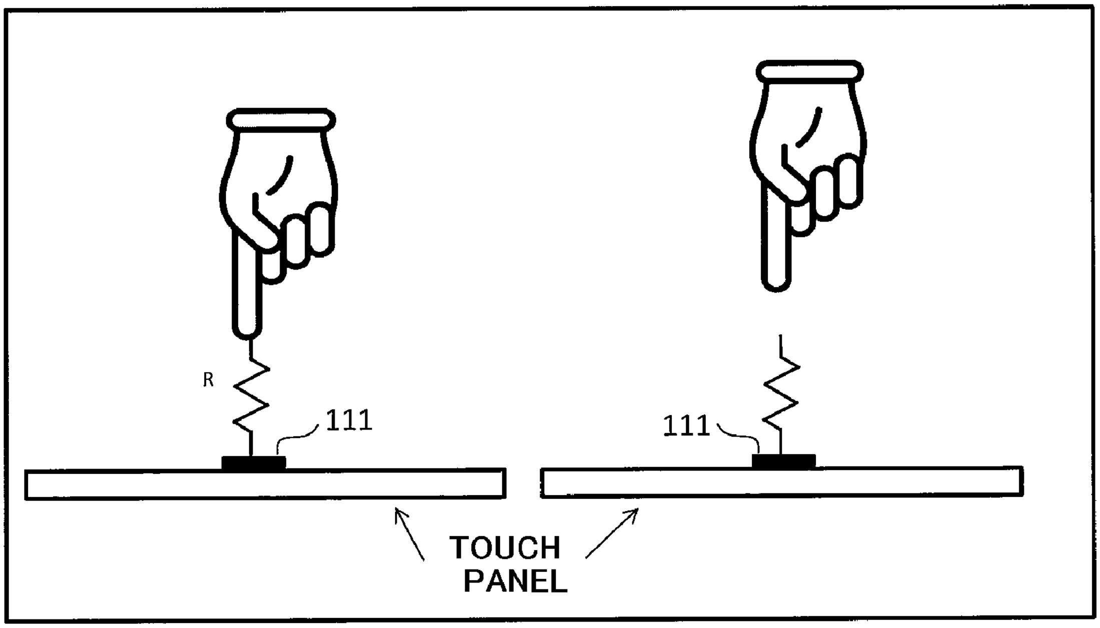

FIG. 192

| CONDUCTOR | 7 MM DIAMETER BRASS DISK | | 7.5 MM DIAMETER BRASS DISK | | 8 MM DIAMETER BRASS DISK | |
|---|---|---|---|---|---|---|
| RESISTANCE VALUE | i-phone MODEL | | i-phone MODEL | | i-phone MODEL | |
| | 5s | 6 | 5s | 6 | 5s | 6 |
| 120 kΩ ±1% | YES | YES | YES | YES | YES | YES |
| 150 kΩ ±1% | YES | YES | YES | YES | YES | YES |
| 180 kΩ ±1% | YES | YES | YES | YES | YES | YES |
| 220 kΩ ±1% | YES | YES | YES | YES | YES | YES |
| 270 kΩ ±1% | YES | YES | YES | YES | YES | YES |
| 330 kΩ ±1% | YES | YES | YES | YES | YES | YES |
| 390 kΩ ±1% | YES | YES | YES | YES | YES | YES |
| 470 kΩ ±1% | YES | YES | YES | YES | YES | YES |
| 560 kΩ ±1% | YES | YES | YES | YES | YES | YES |
| 680 kΩ ±1% | YES | YES | YES | YES | YES | YES |
| 820 kΩ ±1% | YES | YES | YES | YES | YES | YES |
| 1000 kΩ ±1% | YES | NO | YES | NO | YES | NO |
| 1200 kΩ ±1% | YES | NO | YES | NO | YES | NO |
| 1500 kΩ ±1% | NO | NO | NO | NO | NO | NO |
| 1800 kΩ ±1% | NO | NO | NO | NO | NO | NO |
| THRESHOLD RESISTANCE VALUE | 1350 | 910 | 1350 | 910 | 1350 | 910 |

| INFORMATION PATTERN(4) | INFORMATION PATTERN(3) | INFORMATION PATTERN(2) | INFORMATION PATTERN(1) |
|---|---|---|---|
| 10000 | 01111 | 10011 | 10001 |

20bit PATTERN CODE
10000011111001110001

CASE WHERE A NET-SHAPED METAL LAYER IS IN A REGION DIFFERENT FROM THE REGION WHERE THE CONDUCTIVE ELEMENT IS PLACED

FIG. 225

| "ON" TIME (ms) | DEVICE | RECOGNITION RATE (%) | AVERAGE RESPONSE TIME FOR "ON-OFF" (ms) | SHORTEST TIME (ms) | LONGEST TIME (ms) |
|---|---|---|---|---|---|
| 10 | iPad | 53 | 14 | 11 | 23 |
| 10 | iPhone | 51 | 14 | 13 | 17 |
| 20 | iPad | 85 | 17.3 | 13 | 33 |
| 20 | iPhone | 84 | 18.6 | 14 | 32 |
| 30 | iPad | 81 | 28.2 | 15 | 32 |
| 30 | iPhone | 85 | 30.5 | 16 | 32 |
| 40 | iPad | 94 | 38.7 | 29 | 50 |
| 40 | iPhone | 93 | 38.8 | 30 | 64 |
| 50 | iPad | 93 | 48 | 45 | 66 |
| 50 | iPhone | 93 | 48 | 46 | 50 |
| 60 | iPad | 96 | 56.5 | 47 | 72 |
| 60 | iPhone | 94 | 56.8 | 48 | 67 |
| 70 | iPad | 91 | 65.8 | 49 | 81 |
| 70 | iPhone | 92 | 68.2 | 61 | 100 |
| 80 | iPad | 93 | 78.1 | 64 | 106 |
| 80 | iPhone | 92 | 84.3 | 65 | 100 |
| 90 | iPad | 94 | 85 | 79 | 100 |
| 90 | iPhone | 100 | 87 | 79 | 98 |
| 100 | iPad | 92 | 93.8 | 81 | 116 |
| 100 | iPhone | 91 | 95.7 | 82 | 115 |

FIG. 226

| "ON" TIME (ms) | DEVICE | RECOGNITION RATE (%) | AVERAGE RESPONSE TIME FOR 'ON-OFF' (ms) | SHORTEST TIME (ms) | LONGEST TIME (ms) |
|---|---|---|---|---|---|
| 10 | iPad | 51 | 13.8 | 13 | 20 |
| 10 | iPhone | 57 | 14 | 11 | 17 |
| 20 | iPad | 81 | 21 | 13 | 36 |
| 20 | iPhone | 85 | 18.9 | 14 | 32 |
| 30 | iPad | 80 | 29.5 | 14 | 48 |
| 30 | iPhone | 73 | 29.4 | 14 | 64 |
| 40 | iPad | 100 | 40 | 31 | 54 |
| 40 | iPhone | 100 | 39.2 | 29 | 64 |
| 50 | iPad | 98 | 48.4 | 47 | 65 |
| 50 | iPhone | 97 | 49.6 | 47 | 65 |
| 60 | iPad | 93 | 60.1 | 48 | 82 |
| 60 | iPhone | 95 | 59.1 | 46 | 65 |
| 70 | iPad | 100 | 70.3 | 63 | 99 |
| 70 | iPhone | 100 | 68.8 | 63 | 82 |
| 80 | iPad | 100 | 80.7 | 64 | 116 |
| 80 | iPhone | 94 | 80.2 | 63 | 82 |
| 90 | iPad | 97 | 88.3 | 81 | 100 |
| 90 | iPhone | 96 | 88.1 | 80 | 115 |
| 100 | iPad | 100 | 98.6 | 95 | 116 |
| 100 | iPhone | 100 | 101.1 | 96 | 114 |

FIG. 227

| DISTANCE BETWEEN CENTERS | DEVICE | RECOGNITION RATE (%) | AVERAGE RESPONSE TIME FOR "ON-OFF" (ms) | SHORTEST TIME (ms) | LONGEST TIME (ms) |
|---|---|---|---|---|---|
| 13 | iPad | 98 | 40 | 27 | 66 |
| 13 | iPhone | 88 | 47.3 | 30 | 48 |
| 13.5 | iPad | 95 | 47.2 | 30 | 65 |
| 13.5 | iPhone | 97 | 47 | 31 | 49 |
| 14 | iPad | 99 | 48.2 | 34 | 63 |
| 14 | iPhone | 94 | 43.2 | 30 | 49 |
| 14.5 | iPad | 93 | 47.3 | 30 | 50 |
| 14.5 | iPhone | 95 | 47.6 | 31 | 65 |
| 15 | iPad | 92 | 40 | 31 | 49 |
| 15 | iPhone | 93 | 46.8 | 31 | 48 |
| 16 | iPad | 89 | 48.2 | 30 | 50 |
| 16 | iPhone | 91 | 40 | 30 | 65 |
| 17 | iPad | 93 | 40 | 30 | 52 |
| 17 | iPhone | 95 | 47.6 | 30 | 50 |
| 18 | iPad | 92 | 48.3 | 31 | 51 |
| 18 | iPhone | 98 | 47.3 | 31 | 48 |
| 19 | iPad | 90 | 48.2 | 29 | 50 |
| 19 | iPhone | 100 | 47.2 | 29 | 64 |
| 20 | iPad | 91 | 48.4 | 33 | 63 |
| 20 | iPhone | 93 | 47.2 | 30 | 54 |

FIG. 228

| LINE LENGTH (cm) | DEVICE | RECOGNITION RATE (%) | AVERAGE RESPONSE TIME FOR "ON-OFF" (ms) | SHORTEST TIME (ms) | LONGEST TIME (ms) |
|---|---|---|---|---|---|
| 5 | iPad | 100 | 44.8 | 30 | 51 |
| | iPhone | 97 | 48.3 | 46 | 49 |
| 6 | iPad | 90 | 33.2 | 31 | 36 |
| | iPhone | 100 | 31.3 | 29 | 32 |
| 7 | iPad | 100 | 40.2 | 30 | 51 |
| | iPhone | 100 | 30.3 | 28 | 32 |
| 8 | iPad | 90 | 33.2 | 30 | 48 |
| | iPhone | 100 | 47.7 | 46 | 52 |
| 9 | iPad | 97 | 36.4 | 31 | 51 |
| | iPhone | 95 | 39 | 29 | 66 |
| 10 | iPad | 100 | 32.4 | 30 | 48 |
| | iPhone | 95 | 31.9 | 29 | 33 |
| 11 | iPad | 100 | 34.1 | 31 | 48 |
| | iPhone | 100 | 47.6 | 47 | 65 |
| 12 | iPad | 97 | 38.2 | 30 | 64 |
| | iPhone | 100 | 43.1 | 30 | 49 |
| 13 | iPad | 96 | 33.9 | 30 | 56 |
| | iPhone | 98 | 48.9 | 31 | 65 |
| 14 | iPad | 100 | 43.3 | 29 | 51 |
| | iPhone | 95 | 30.9 | 29 | 65 |
| 15 | iPad | 100 | 33.8 | 29 | 65 |
| | iPhone | 98 | 38.7 | 26 | 59 |

FIG. 229

| LINE LENGTH (cm) | DEVICE | RECOGNI-TION RATE (%) | AVERAGE RESPONSE TIME FOR "ON-OFF" (ms) | SHORTEST TIME (ms) | LONGEST TIME (ms) |
|---|---|---|---|---|---|
| 5 | iPad | 93 | 40.1 | 31 | 49 |
| | iPhone | 96 | 40.5 | 29 | 48 |
| 6 | iPad | 93 | 39.6 | 31 | 49 |
| | iPhone | 100 | 42.1 | 29 | 65 |
| 7 | iPad | 100 | 45.6 | 31 | 51 |
| | iPhone | 94 | 47.9 | 31 | 50 |
| 8 | iPad | 100 | 35.4 | 31 | 65 |
| | iPhone | 97 | 33.8 | 31 | 48 |
| 9 | iPad | 100 | 40.1 | 29 | 50 |
| | iPhone | 100 | 48.2 | 29 | 65 |
| 10 | iPad | 100 | 48.3 | 46 | 50 |
| | iPhone | 100 | 42.8 | 47 | 65 |
| 11 | iPad | 100 | 36.9 | 31 | 65 |
| | iPhone | 97 | 48.2 | 31 | 65 |
| 12 | iPad | 95 | 41.3 | 47 | 65 |
| | iPhone | 100 | 32.8 | 33 | 66 |
| 13 | iPad | 89 | 31.6 | 29 | 64 |
| | iPhone | 100 | 37.3 | 30 | 66 |
| 14 | iPad | 100 | 34.8 | 30 | 64 |
| | iPhone | 100 | 39.1 | 31 | 50 |
| 15 | iPad | 100 | 44.3 | 31 | 60 |
| | iPhone | 95 | 34.3 | 31 | 48 |

DEVICE, AND CARD TYPE DEVICE

FIELD OF THE INVENTION

The present invention relates to an apparatus and a card type apparatus.

BACKGROUND OF THE INVENTION

Conventionally, a technology exists where by holding a prepaid card, on which an authentication code corresponding to a conductor/nonconductor arrangement pattern is recorded, against an electronic device (for example, a smartphone) equipped with a touch panel, the arrangement pattern of the conductor and the nonconductor is detected by the touch panel, and based on the detection result, the authentication code is recognized by the electronic device (see Japanese Patent Application Laid-Open (JP-A) No. 2004-102798).

PRIOR ART DOCUMENTS

Patent Literature

Patent Literature 1: Japanese Unexamined Patent Application Publication No. 2015-035051

SUMMARY OF THE INVENTION

Problems that the Invention is to Solve

However, despite the demand for a method in which codes are changed sequentially, and an electronic device such as a smartphone and the like can recognize the changed codes, prior technology including that in Patent Document 1 was unable to meet the demand.

The present invention has been made in view of such a situation, and it is the object of the present invention to have the codes be recognizable by an electronic device such as a smartphone even if the codes are successively changed.

Solution to Problem

In order to achieve the above objective, in one aspect, the apparatus of this invention equips: an incoming amount detection unit that detects the amount of external energy incoming from the exterior per unit time; an information acquiring circuit for acquiring input information in a predetermined format based upon the change in the incoming amount of external energy per unit time described above; a working surface on which arranged are one or more elements capable of detecting changes in physical quantities detectable from the opposing surface; one or more physical quantity control units for generating physical quantity changes in each of the one or more elements described above; and an information output unit for outputting output information in a predetermined format in accordance with the physical quantity change described above from the one or more elements described above to the one or more physical quantity control units described above.

Furthermore, other apparatus for the embodiment of the present invention for achieving the above objective includes in addition: for example, an identification information storage unit for storing identification information for identifying the apparatus for the embodiment of the present invention described above from other apparatus; and an encrypted information generating circuit for generating encrypted information based on the identification information described above and the acquired input information described above, and the information output unit described above outputs output information including the encrypted information described above.

Advantageous Effect of the Invention

According to the present invention, even if the code is successively changed, the codes can be recognized by an electronic device such as a smartphone.

BRIEF DESCRIPTION OF THE DRAWINGS

FIG. 28 is a diagram showing a specific example of a symbol pattern in which dots 13-1 to 13-5 are arranged as a non-rotating object.

FIGS. 43(A), 43(B), 43(C), 43(D), and 43(E) are for explaining an embodiment of the information dots, wherein FIG. 43(A) shows a first example, FIG. 43(B) shows a second example, FIG. 43(C) showing a third example, FIG. 43(D) shows a fourth example, and FIG. 43(E) shows a fifth example, respectively.

FIGS. 44(A), 44(B), and 44(C) are for explaining an embodiment of a dot code allocation format, wherein FIG. 44(A) shows a first example, FIG. 44(B) shows a second example, and FIG. 44(C) shows a third example, respectively.

FIGS. 45(A), 45(B), and 45(C) are for explaining an embodiment of a first example ("GRID 0") of dot patterns, wherein FIG. 45(A) shows a first general-purpose example, FIG. 45(B) shows a second example, and FIG. 45(C) shows a third general-purpose example, respectively.

FIGS. 46(A), 46(B), and 46(C) are for explaining modification examples of the dot pattern (GRID 0), wherein FIG. 46(A) is a first modification example, FIG. 46(B) is a second modification example, and FIG. 46 a third modification example.

FIGS. 47(A), 47(B), and 47(C) are for explaining modification examples of the dot pattern (GRID 0), wherein FIG. 47(A) is a fourth modification example, and at the same time explains the embodiment of a second example ("GRID 1") of the dot pattern, FIG. 47(B) is a fifth modification example, and FIG. 47(C) is a sixth modification example, respectively.

FIGS. 48(A) and 48(B) are for explaining examples of a connection or a concatenation of a dot pattern (GRID 0, 1), wherein FIG. 48(A) shows an example of a connection of a dot pattern (GRID 0, 1) and FIG. 48(B) shows a first example of a concatenation of a dot pattern (GRID 0), respectively.

FIGS. 50(A), 50(B), and 50(C) are for explaining the embodiment of a dot pattern (GRID 5) of the second example, wherein FIG. 50(A) is a first general-purpose example, FIG. 50(B) is a second general-purpose example, and FIG. 50(C) is a third general-purpose example, respectively.

FIGS. 51(A), 51(B) and 51(C) are for explaining a modification example of the dot pattern (GRID 5), wherein FIG. 51(A) shows a first modification example, FIG. 51(B) shows a second modification example, and FIG. 51(C) show a third modification example, respectively.

FIGS. 53(A) and 53(B) are for explaining the reading of a dot pattern, wherein FIG. 53(A) shows a first reading example, and FIG. 53(B) shows a second reading example, respectively.

FIG. 54 shows a third reading example.

FIG. 88 is a plan view of the image sensor of the twelfth embodiment as viewed from the imaging surface.

FIG. 89 is a sectional view of the image sensor.

FIG. 90 is a sectional view of the image sensor.

FIG. 91 is a sectional view of the image sensor of the thirteenth embodiment.

FIG. 92 is a diagram exemplifying one dot included in a dot pattern.

FIG. 93 is a diagram exemplifying the relationship between dots and CMOS sensor elements.

FIG. 94 is a diagram exemplifying the output of pixel values.

FIG. 95 is a plan view as viewed from the light receiving surface of the optical sensor.

FIG. 96 is a plan view of the optical sensor having six photodiodes as viewed from the light receiving surface.

FIG. 97 is a sectional view of the optical sensor.

FIG. 98 is a sectional view of the optical sensor.

FIG. 99 is a sectional view of the optical sensor.

Figure 100:
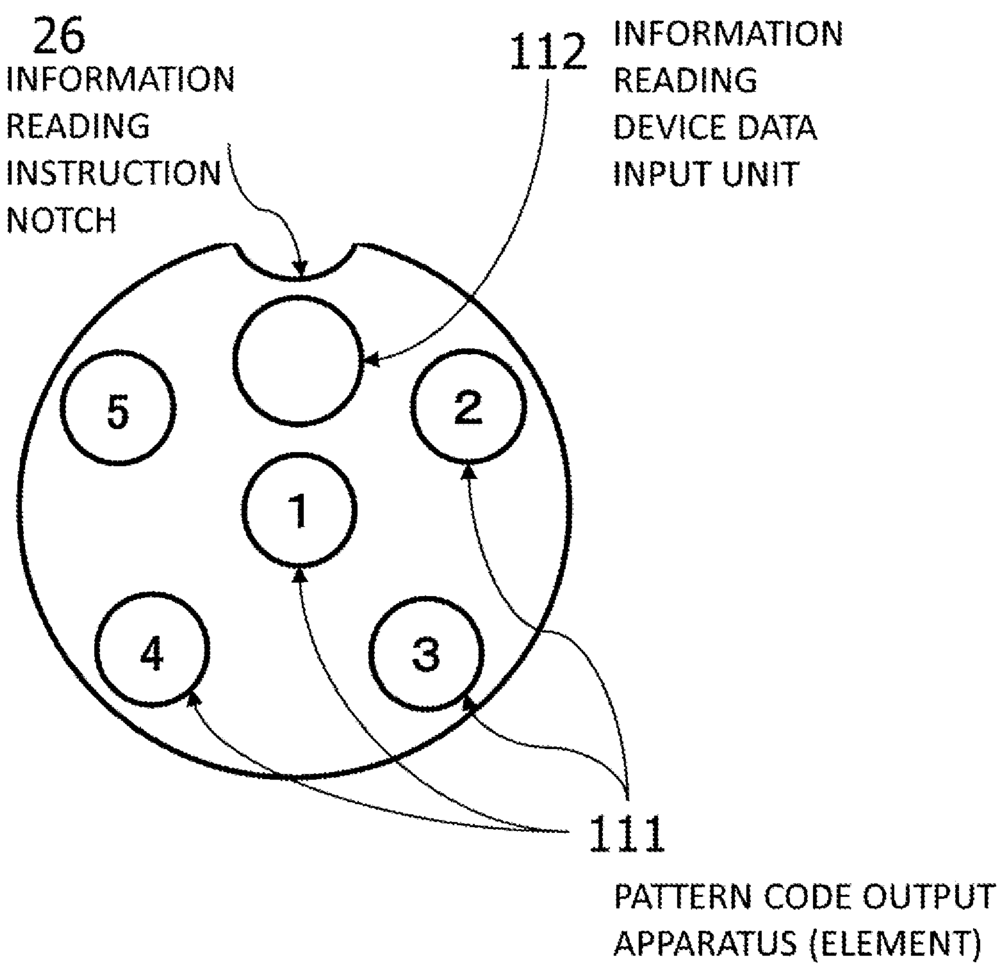

FIG. 100 is a schematic diagram showing an example of a configuration of the contact surface between a digital stamp and an information device.

Figure 101:
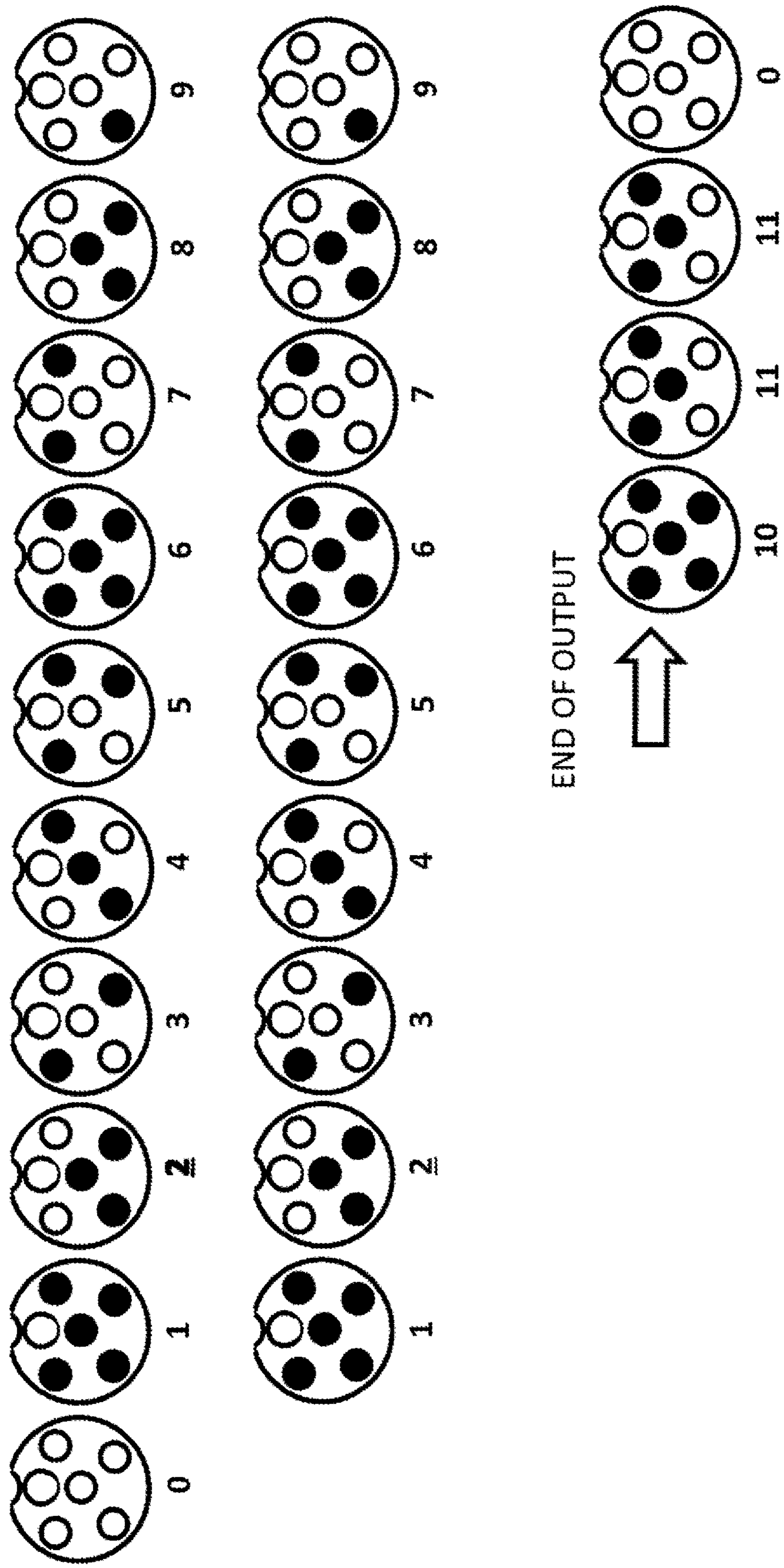

FIG. 101 is a diagram showing an example of pattern codes output by a digital stamp.

Figure 102:
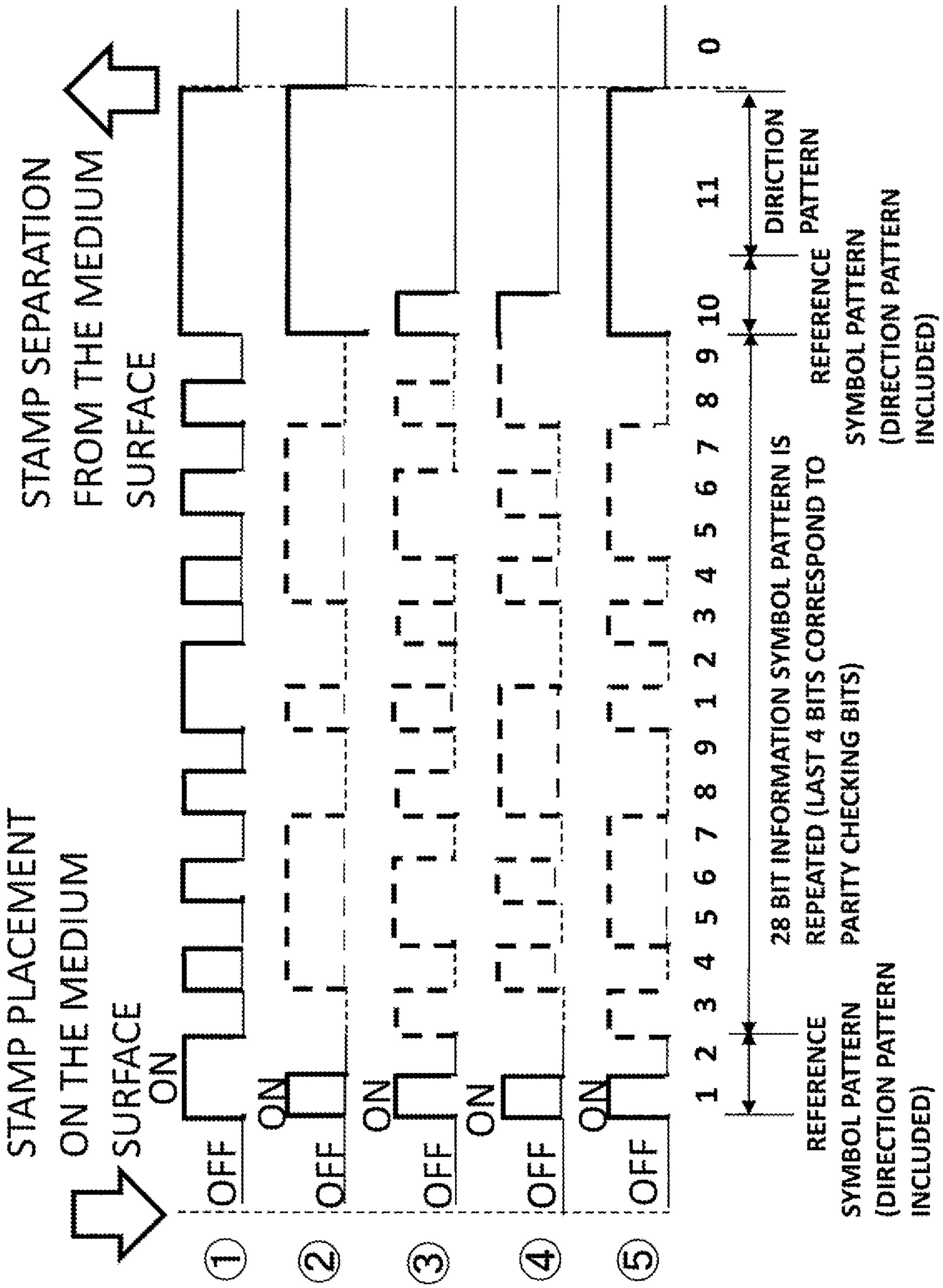

FIG. 102 is a diagram showing an example of pattern codes output by a digital stamp.

Figure 103:
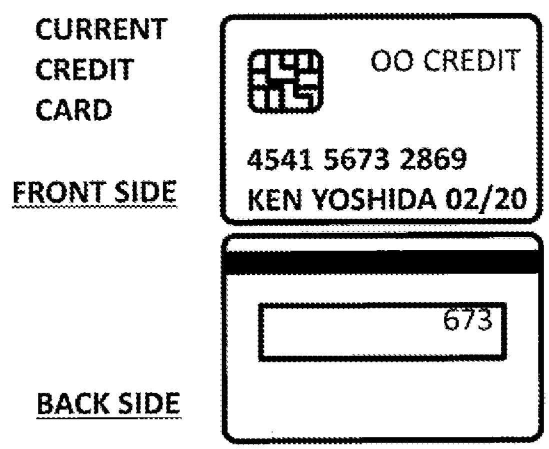

FIG. 103 is a diagram exemplifying a current credit card.

Figure 104A:
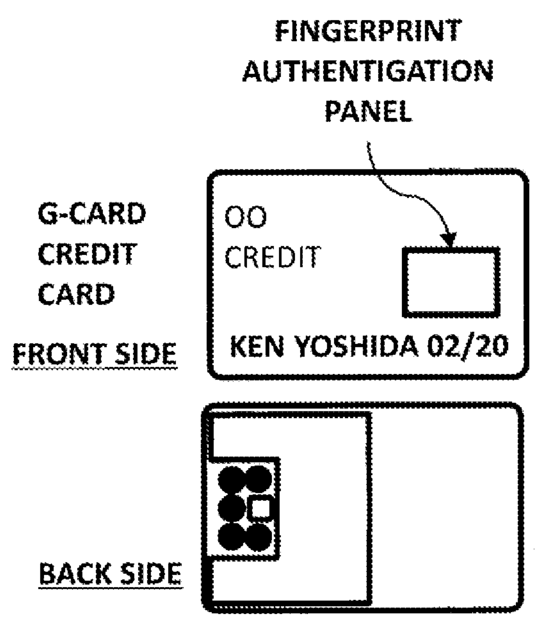

FIG. 104A is a diagram showing an example of the use of a card-type apparatus.

Figure 104B:
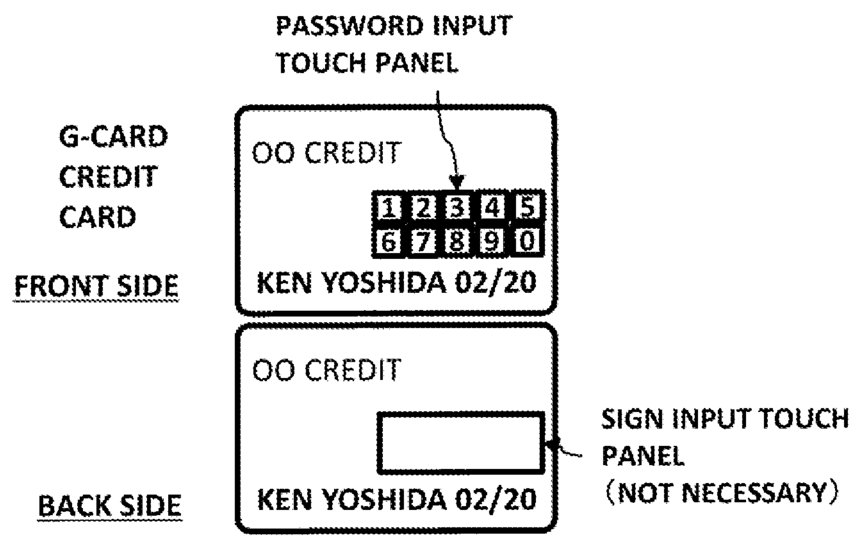

FIG. 104B is a diagram showing an example of the use of a card-type apparatus.

Figure 105:
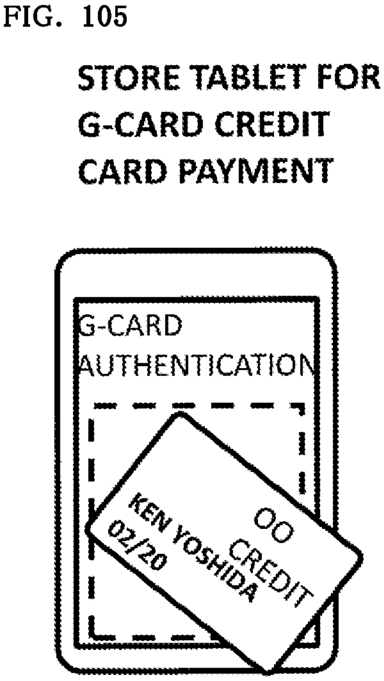

FIG. 105 is a diagram showing an example of the use of a G-Card for a tablet executing personal authentication.

Figure 106:
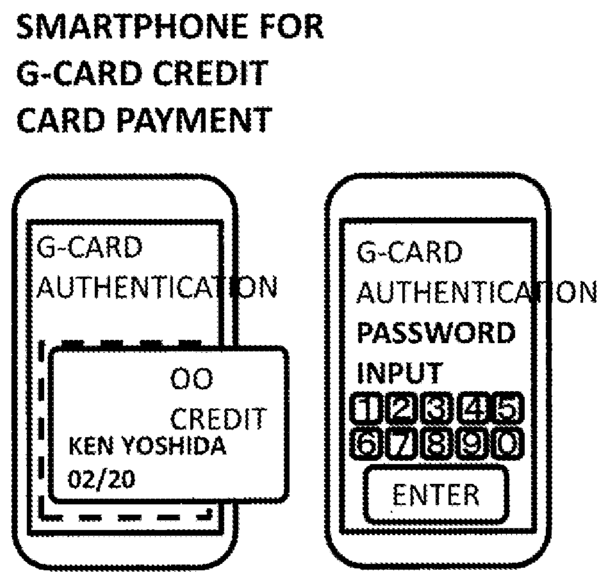

FIG. 106 is a diagram showing an example of the use of a G-Card for a smartphone executing personal authentication.

Figure 107:
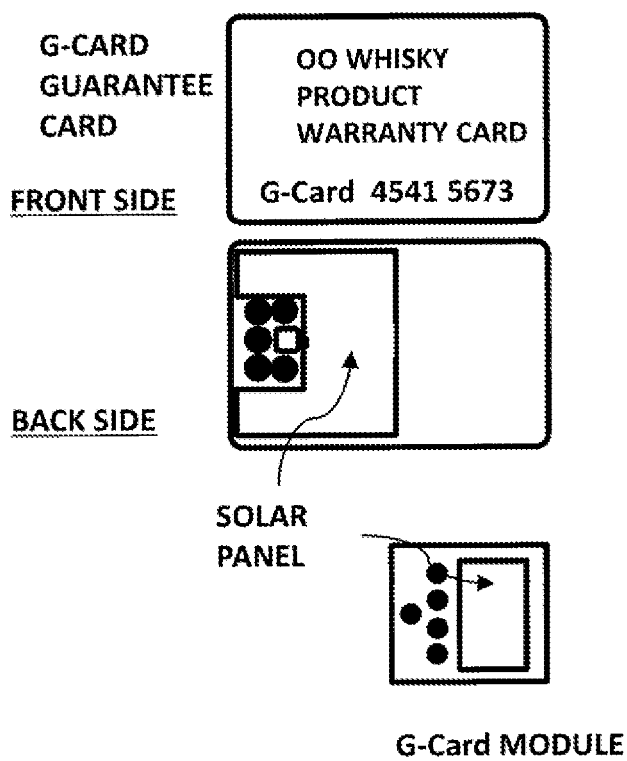

FIG. 107 is a diagram showing an example of the use of a G-Card used for product guaranteeing.

Figure 108:
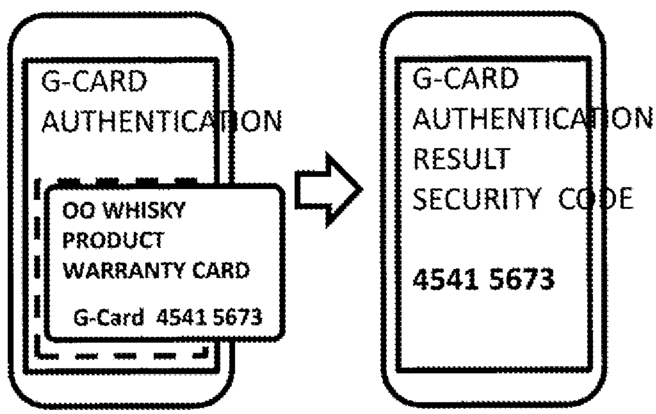

FIG. 108 is a diagram showing an example of authenticity judgment by a G-Card.

Figure 109:
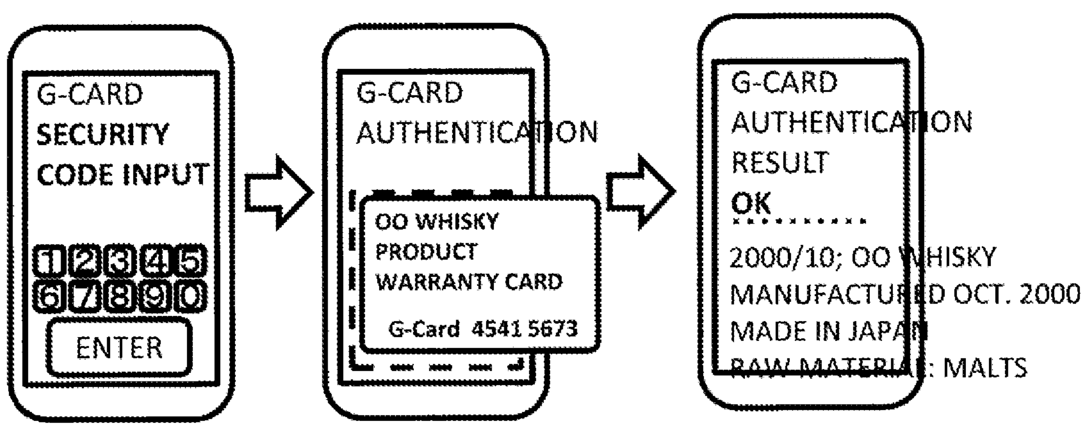

FIG. 109 is a diagram showing an example of authenticity judgment by a G-Card and a security code input.

Figure 110:
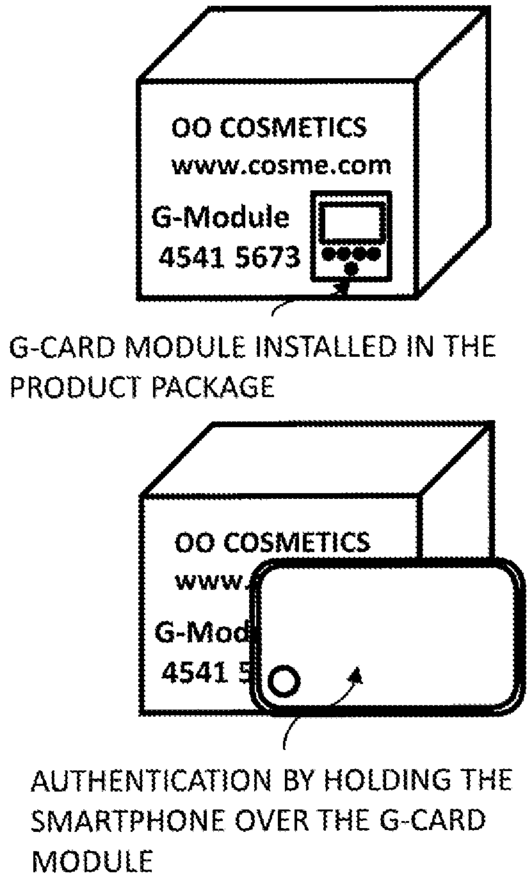

FIG. 110 is a diagram showing an example of the use of a G-Card module.

Figure 111:
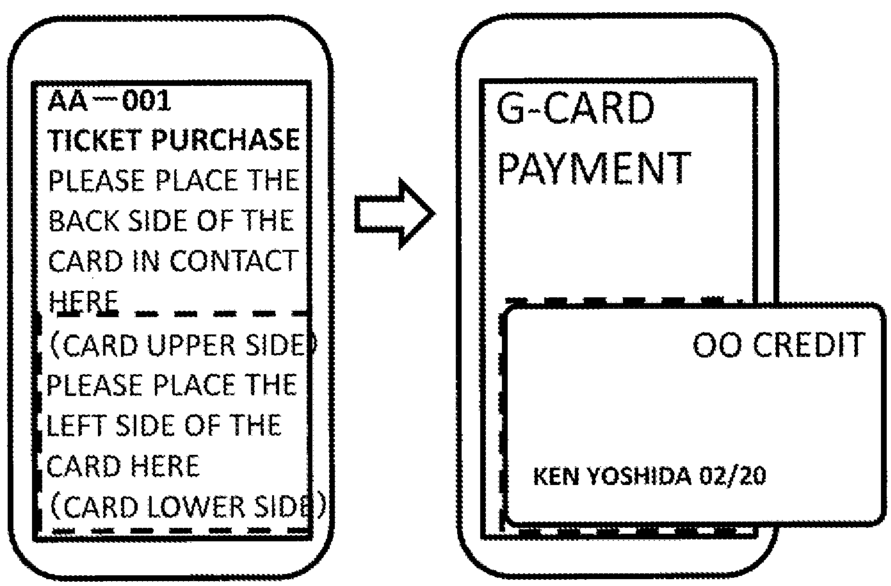

FIG. 111 is a diagram showing an example of payment by a G-Card.

Figure 112:

FIG. 112 is a diagram showing an example in which a ticket/coupon is used by a G-Card.

Figure 113:
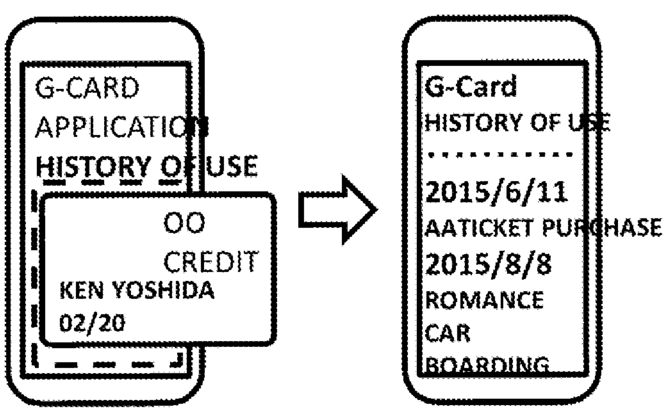

FIG. 113 is a diagram showing an example of the displaying of the history of the use of a G-Card.

Figure 114:
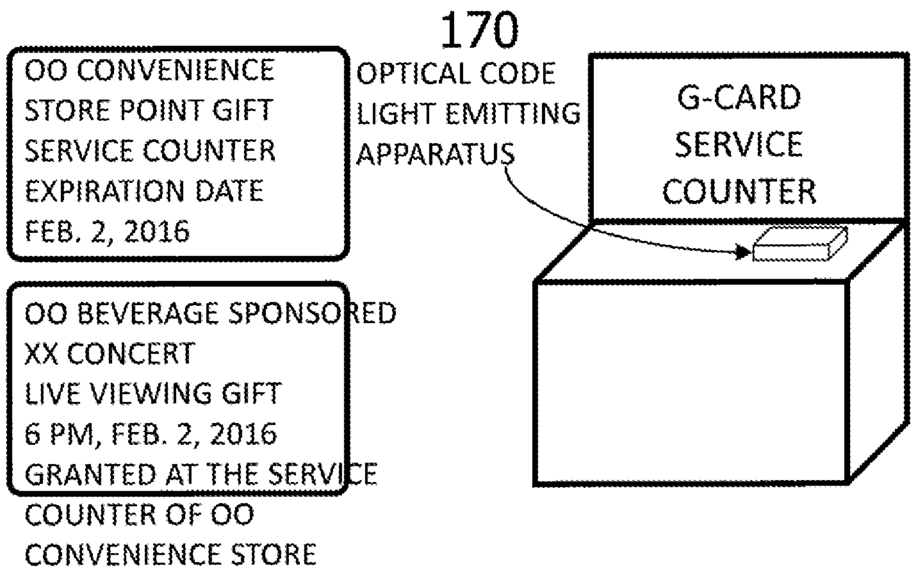

FIG. 114 is a diagram showing an example of a provided service such as reward points by a G-Card.

Figure 115:
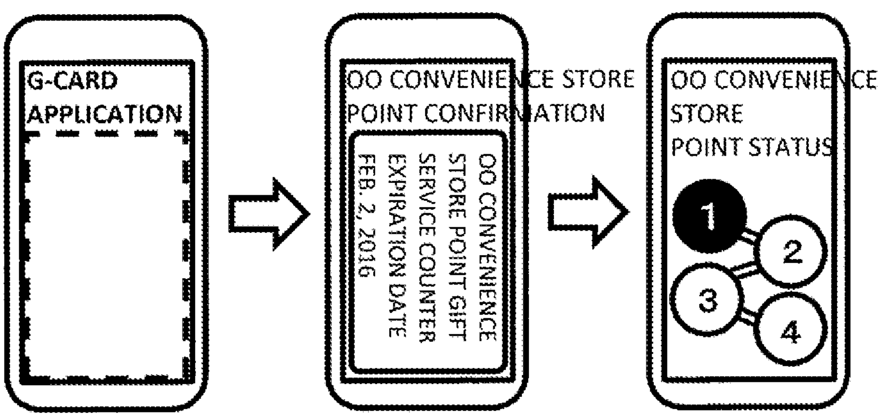

FIG. 115 is a diagram showing an example of the displaying of the status of a point service by a G-Card.

Figure 116:
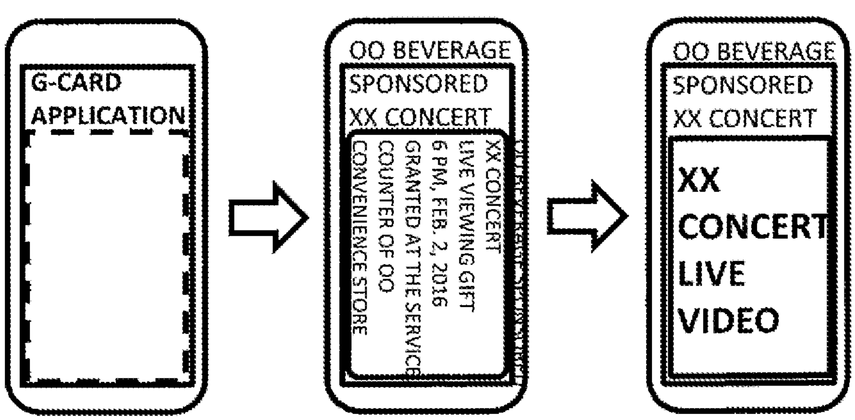

FIG. 116 is a diagram showing an example of the displaying of a service content such as a coupon by a G-Card.

Figure 117:
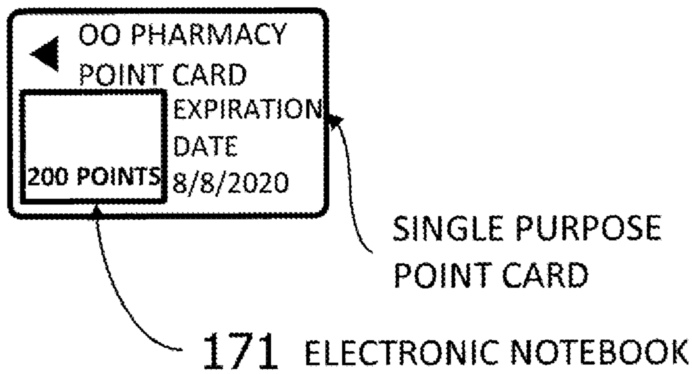

FIG. 117 is a diagram showing an example of the use of a G-Card as an individual point card of a specific store.

Figure 118:
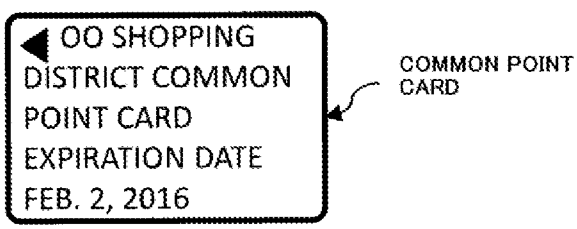

FIG. 118 is a diagram showing an example of the use of a G-Card as a common point card for a plurality of stores.

Figure 119:
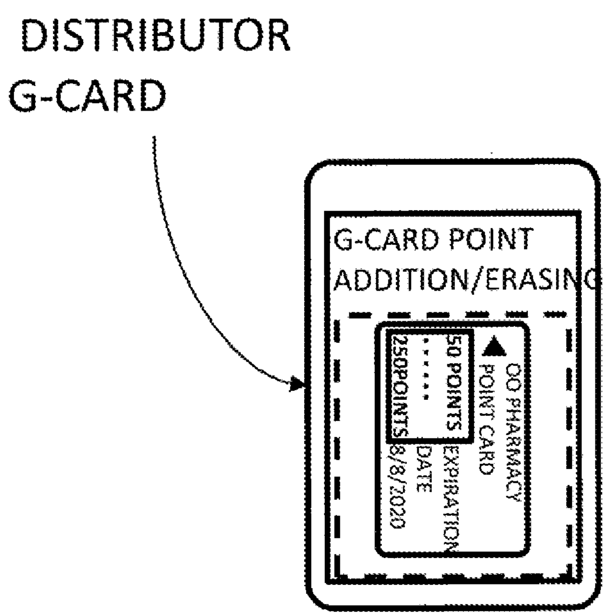

FIG. 119 is a diagram showing an example of the addition and clearing of stamps and points recorded on a G-Card.

Figure 120:
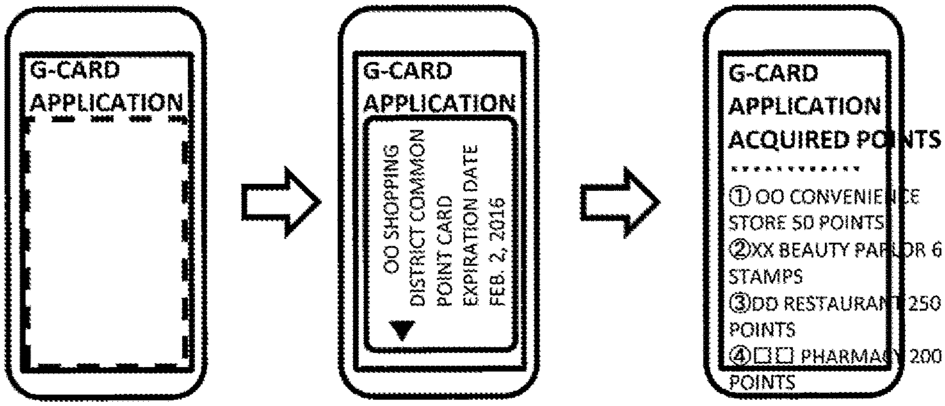

FIG. 120 is a diagram showing an example of the execution of different processings in accordance with the orientation of the placed G-Card.

Figure 121:
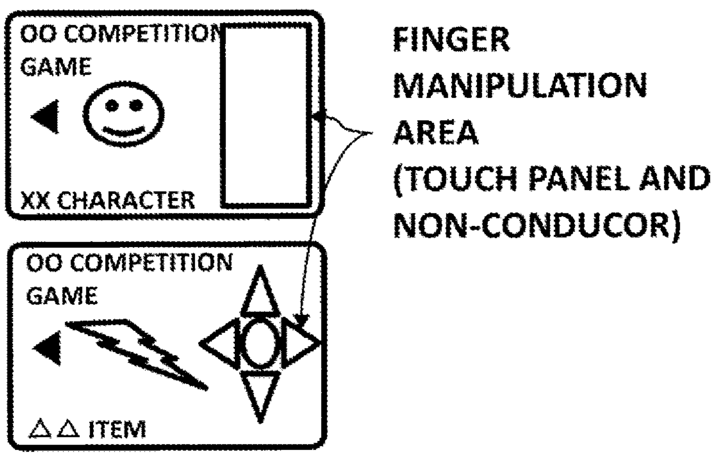

FIG. 121 is a diagram for explaining an example of a game using a card-type device.

Figure 122:
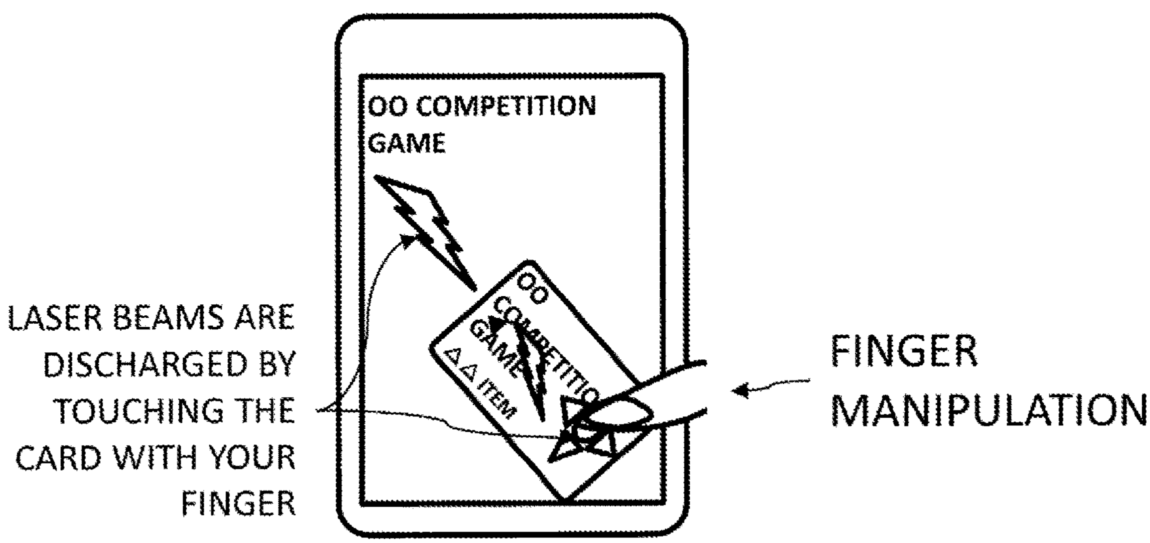

FIG. 122 is a diagram for explaining an example of a game using a card-type device.

Figure 123:
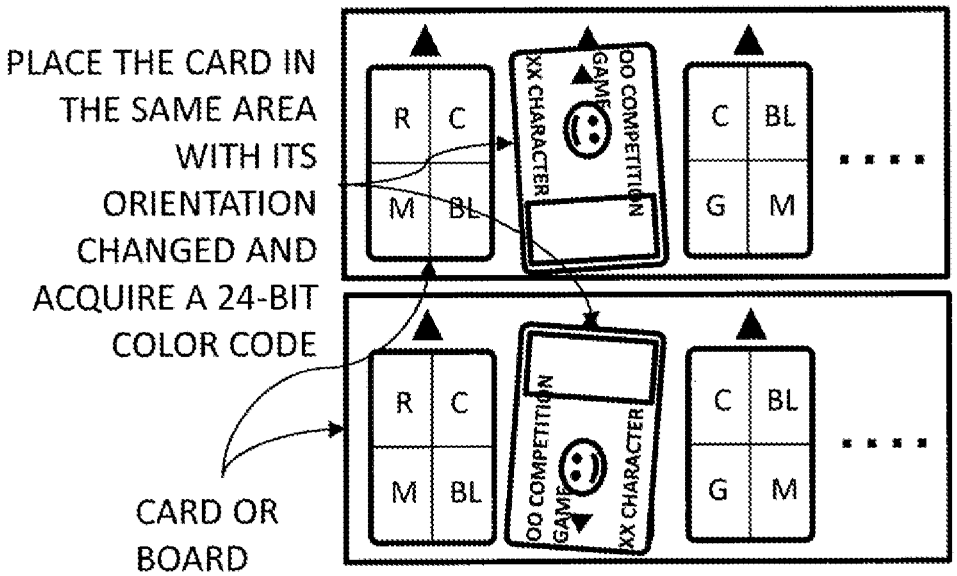

FIG. 123 is a diagram for explaining an example of a game using a card-type device.

Figure 124:
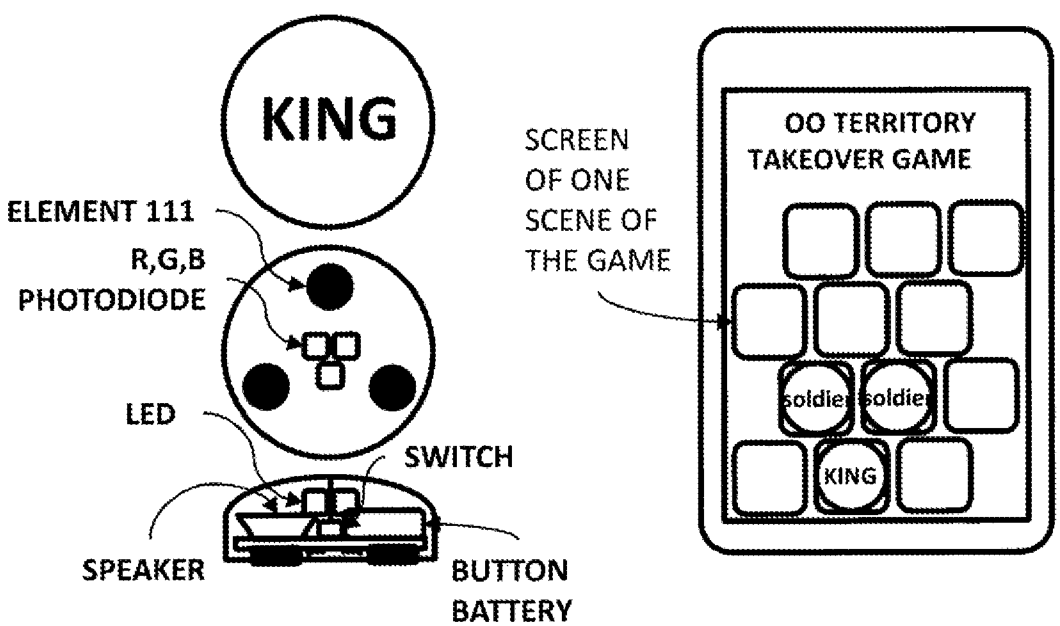

FIG. 124 is a diagram for explaining an example of a game by a device having another shape.

Figure 125:
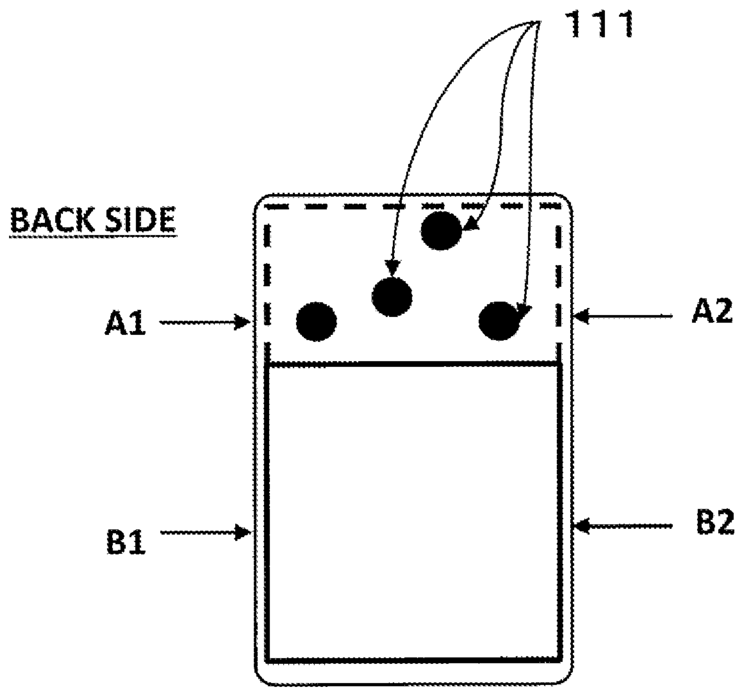

FIG. 125 is a diagram exemplifying a configuration of a back side of a card for a game.

Figure 126:
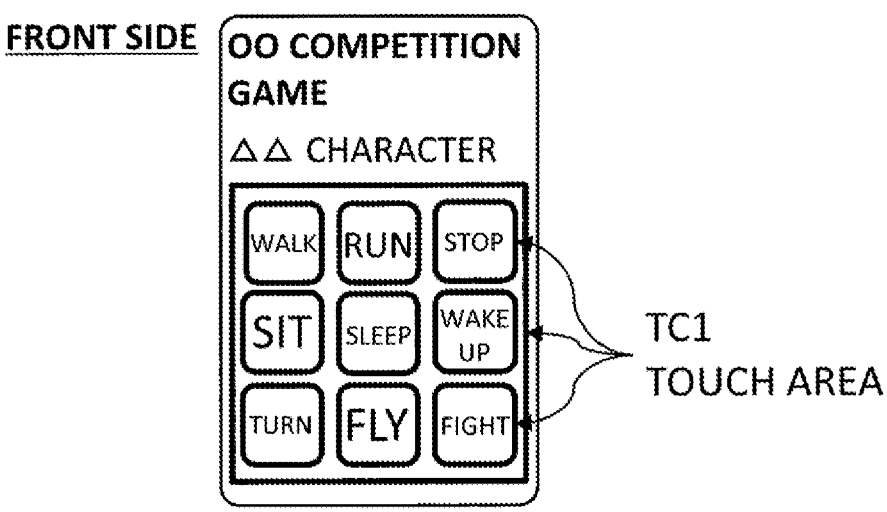

FIG. 126 is a diagram exemplifying a configuration of a front side of a card for a game.

Figure 127:
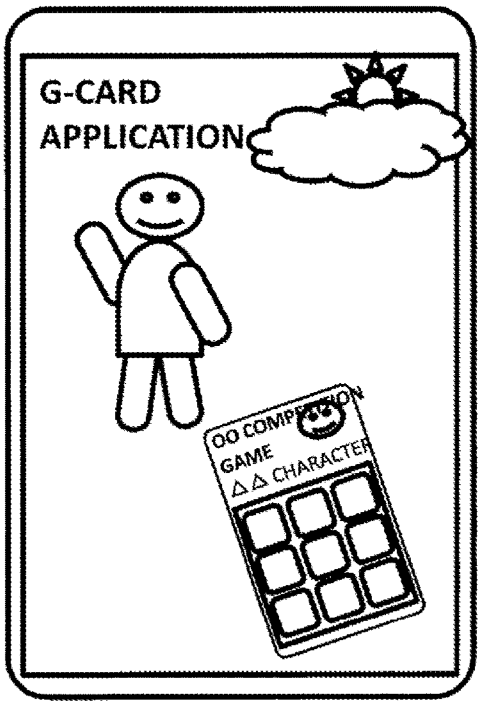

FIG. 127 is a diagram showing an example of the use of a card with a tablet terminal.

Figure 128A:
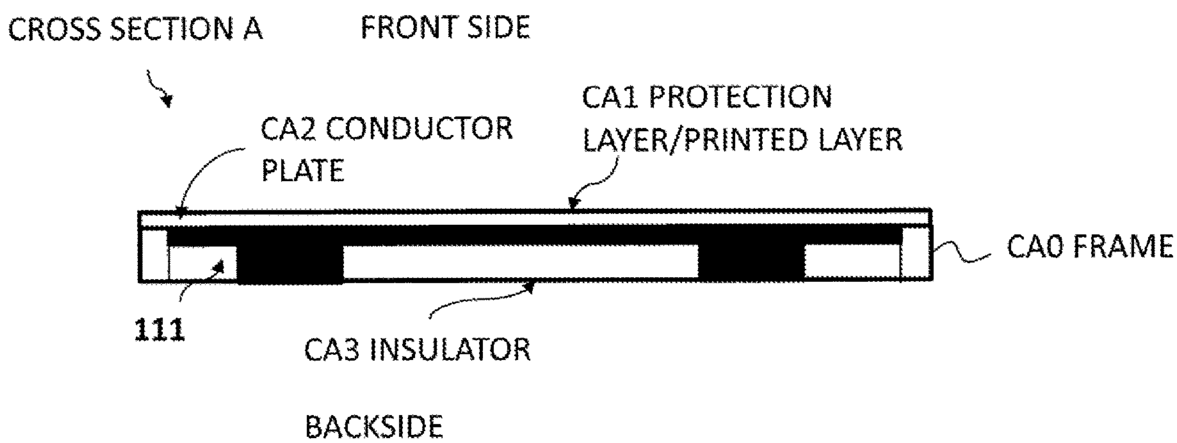

FIG. 128A is a sectional view of a card for a game.

Figure 128B:
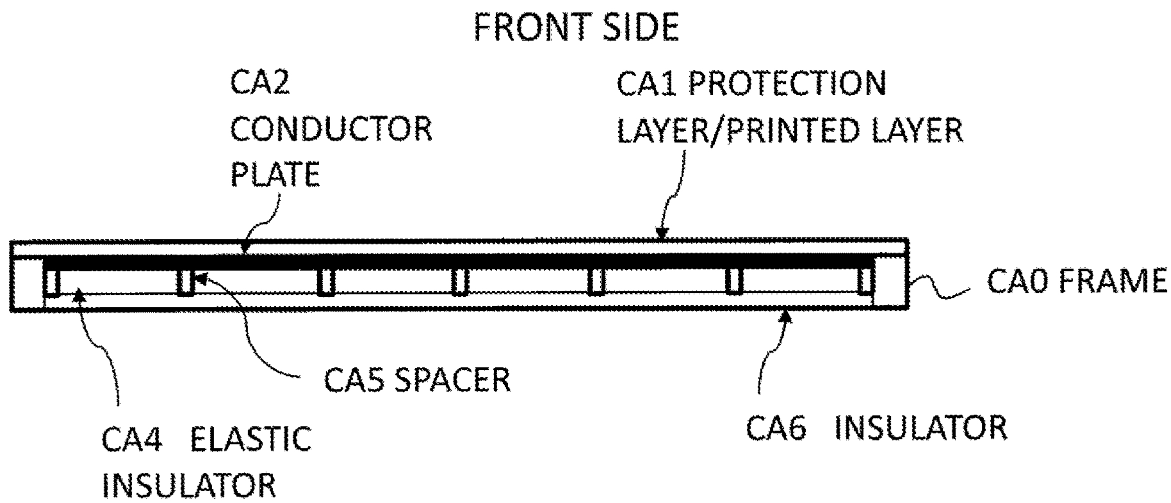

FIG. 128B is a sectional view of a card for a game.

Figure 129:
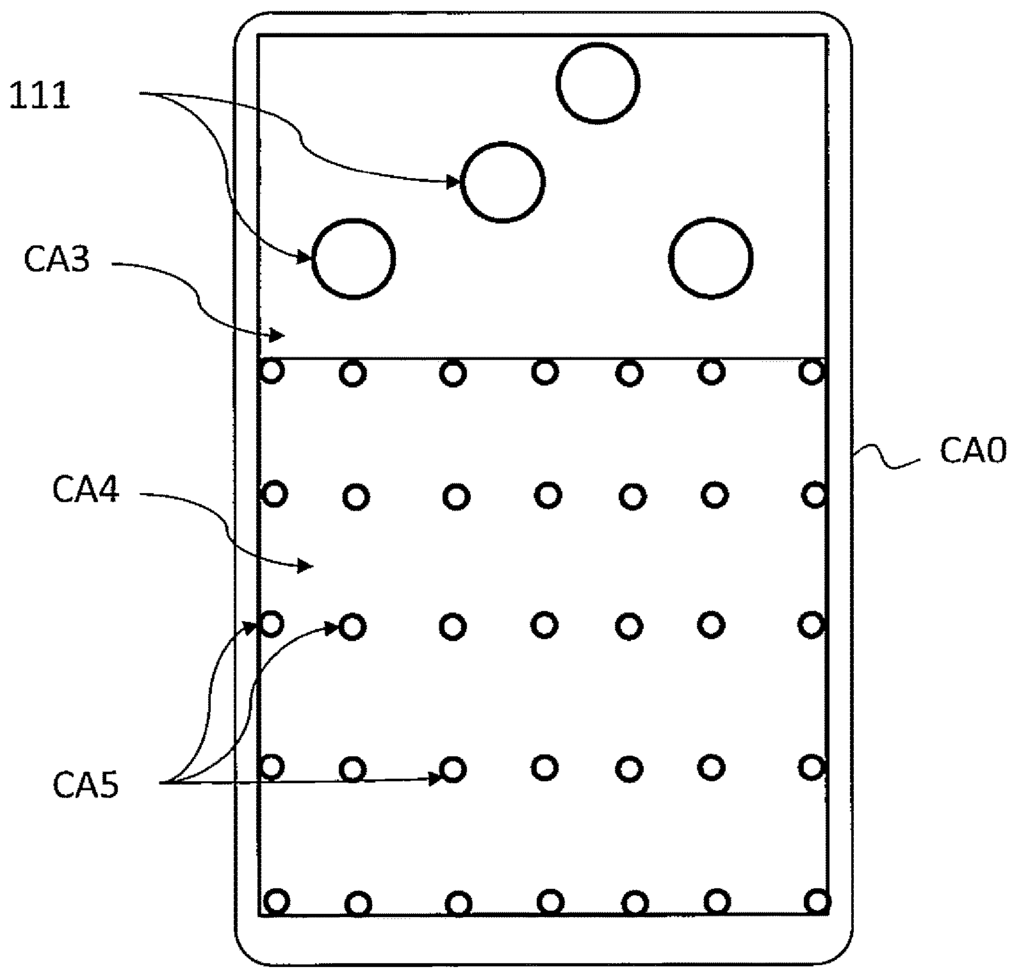

FIG. 129 is a bottom view of a card for a game.

Figure 130:
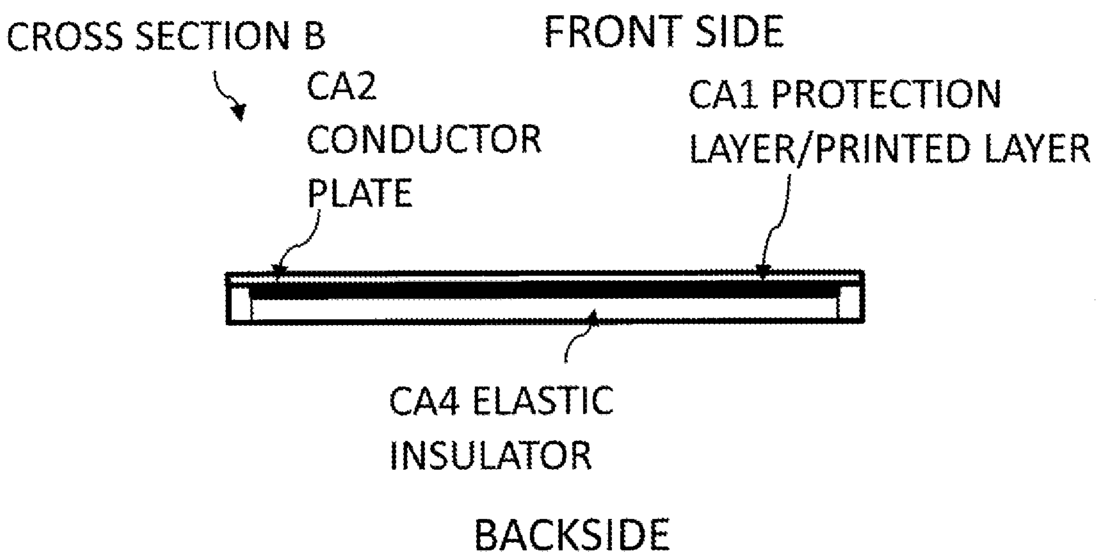

FIG. 130 is a sectional view of a modification example of a card for a game.

Figure 131:
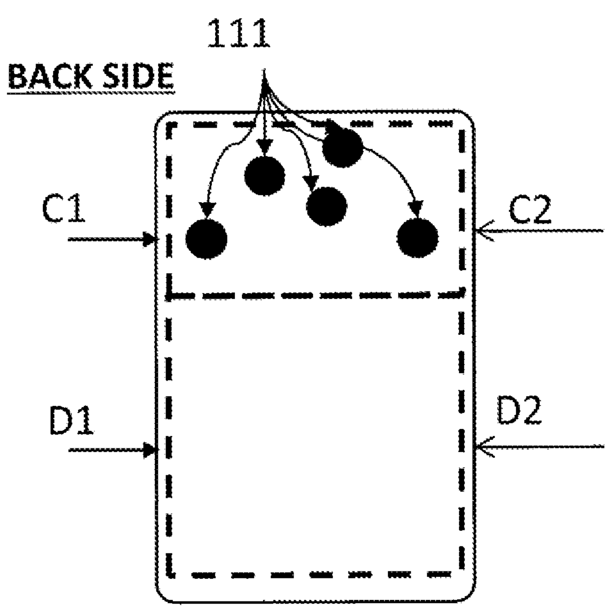

FIG. 131 is an example of a card for a game.

Figure 132:
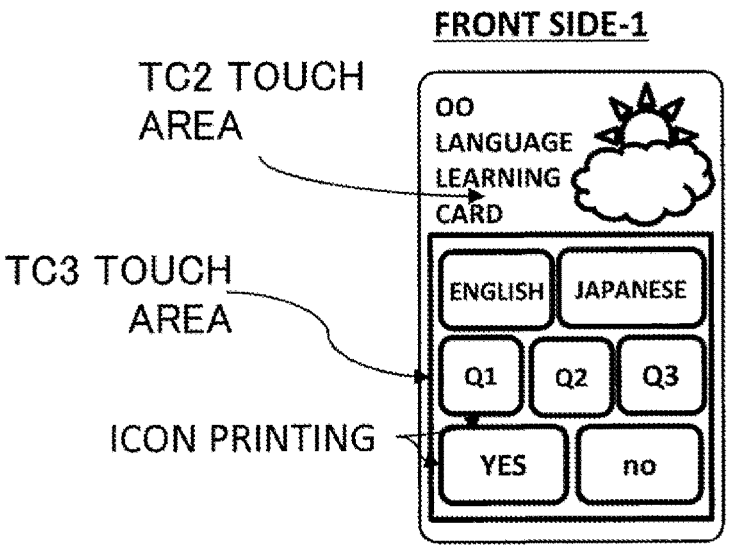

FIG. 132 is an example of a card for a game.

Figure 133:
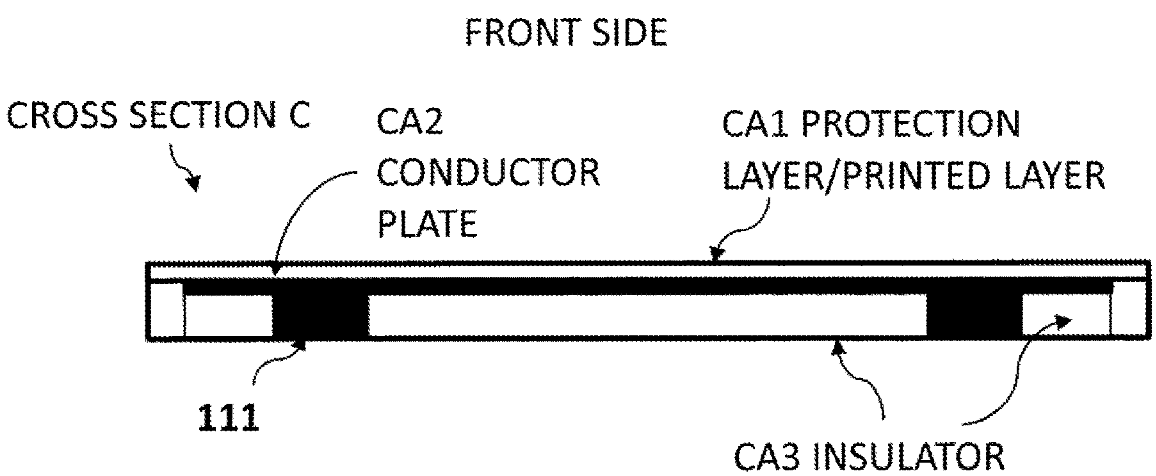

FIG. 133 is a sectional view of a card for a game.

Figure 134:
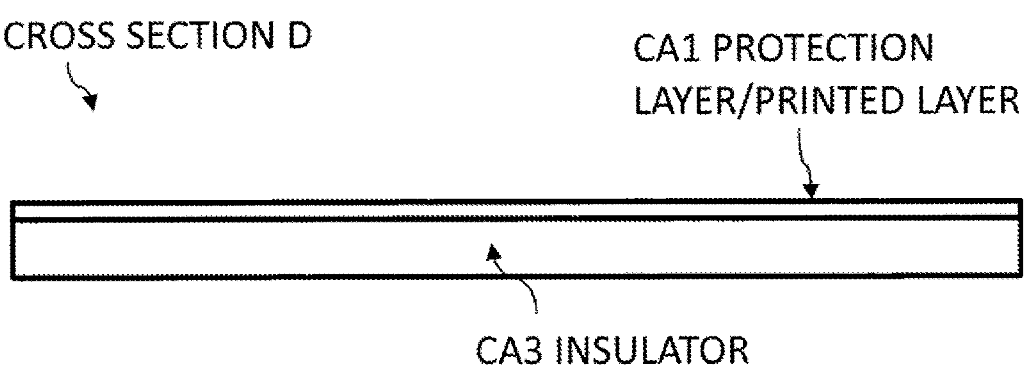

FIG. 134 is a sectional view of a card for a game.

Figure 135:
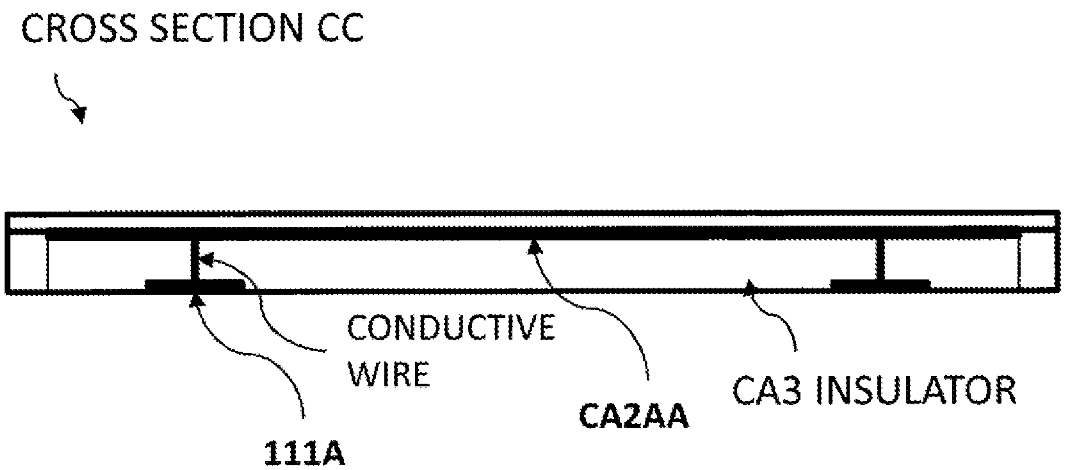

FIG. 135 is a sectional view of another card for a game relevant to a modification example.

Figure 136:
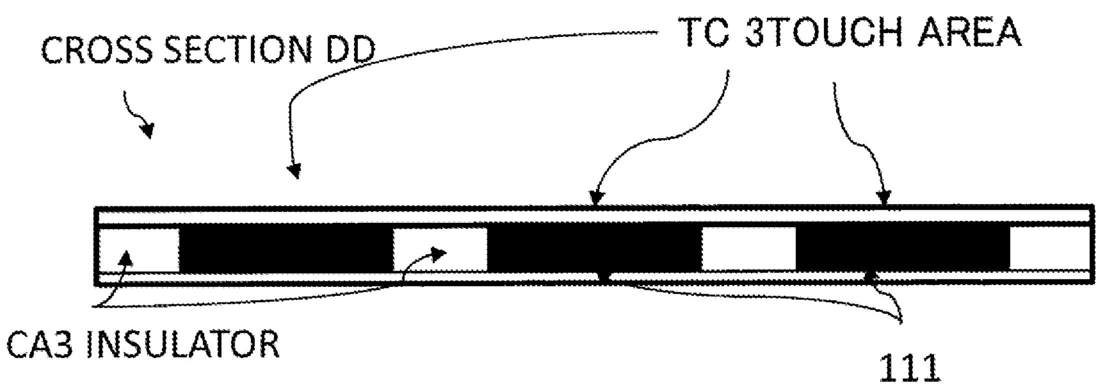

FIG. 136 is a sectional view of another card for a game relevant to a modification example.

Figure 137:
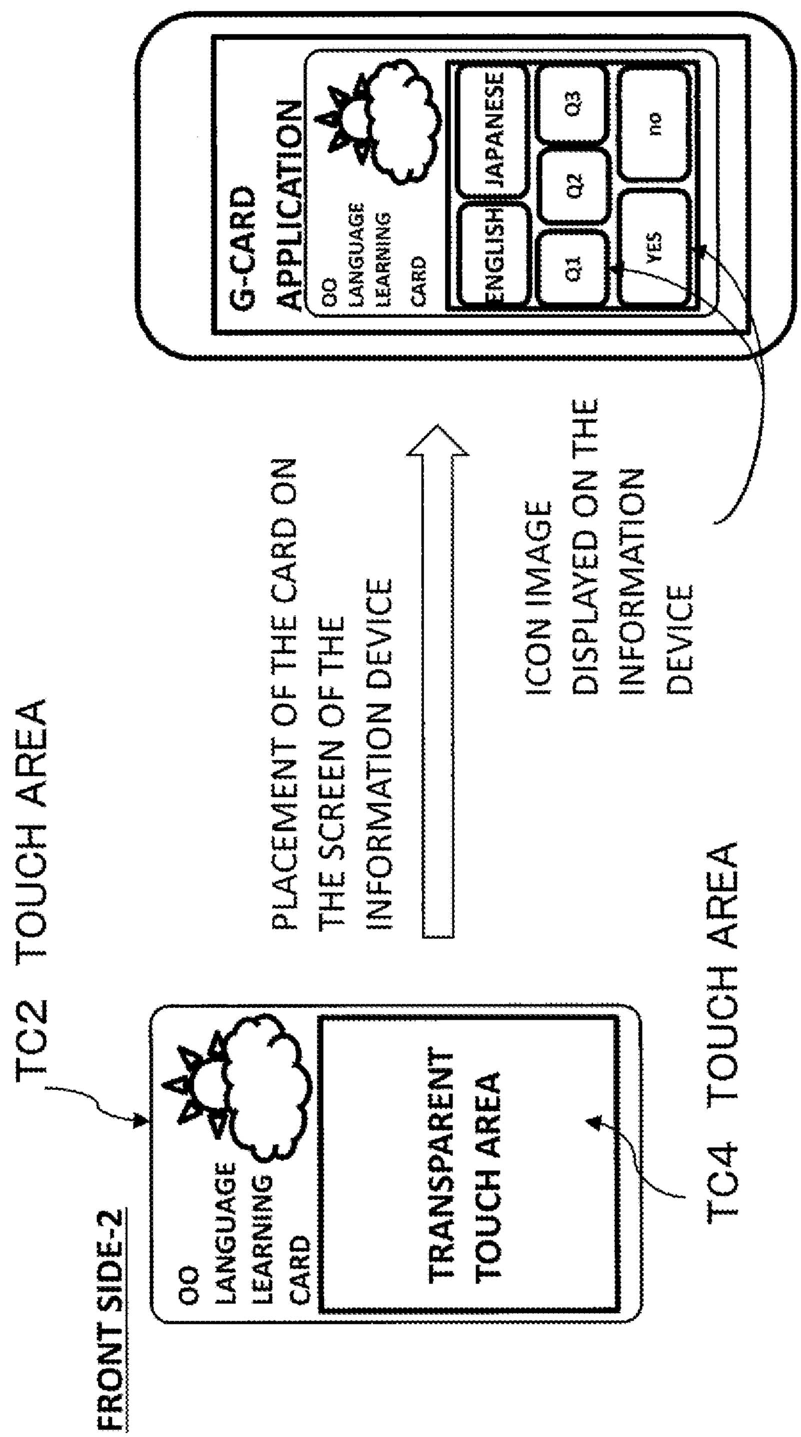

FIG. 137 shows an example of a card for a game.

Figure 138:
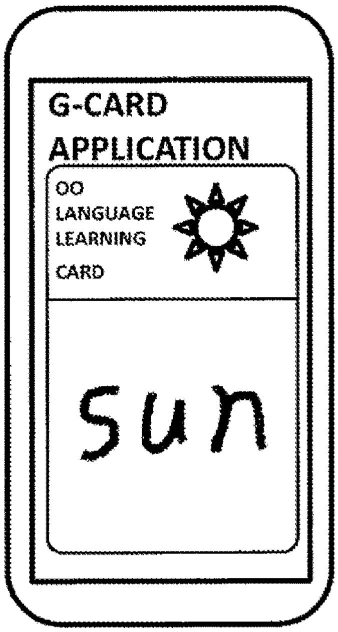

FIG. 138 is an example in which processing of a drawing application is executed with a game card.

Figure 139:
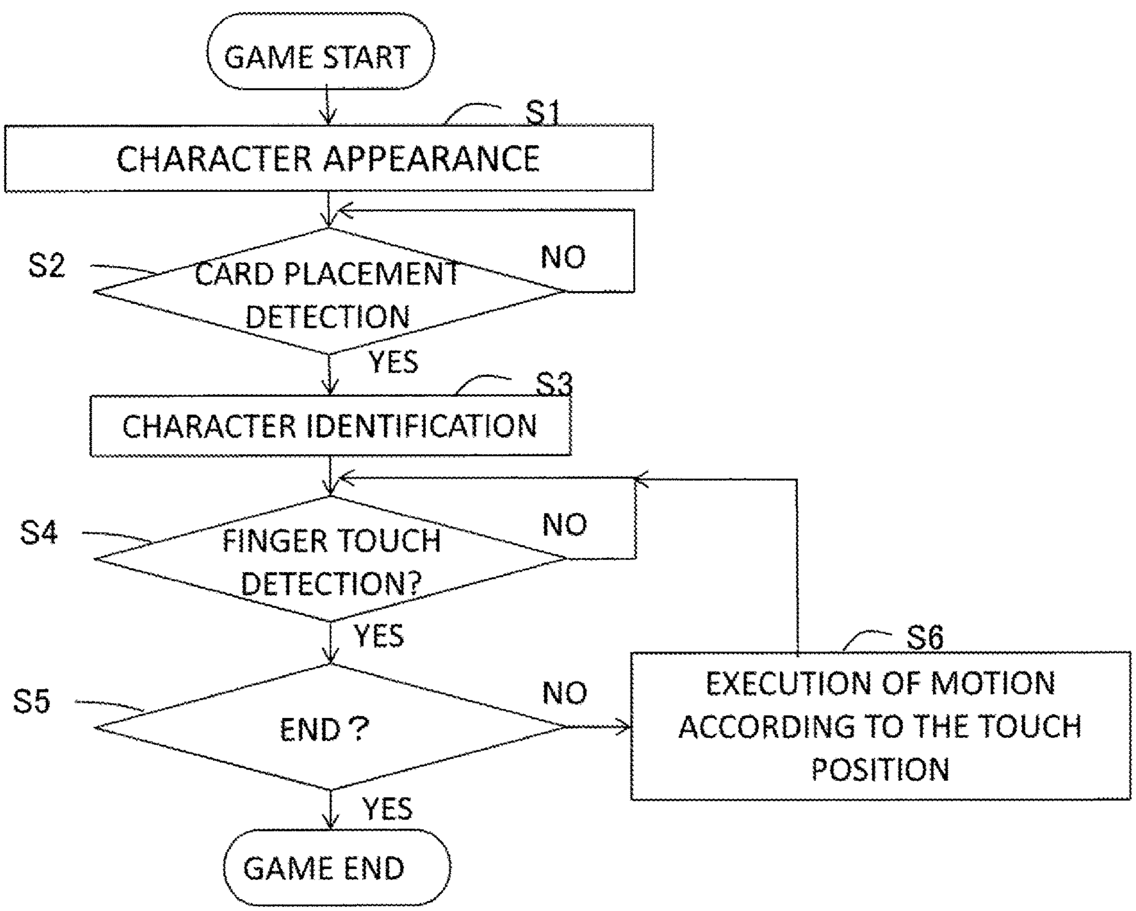

FIG. 139 is an example of the processing of a game program.

Figure 140:
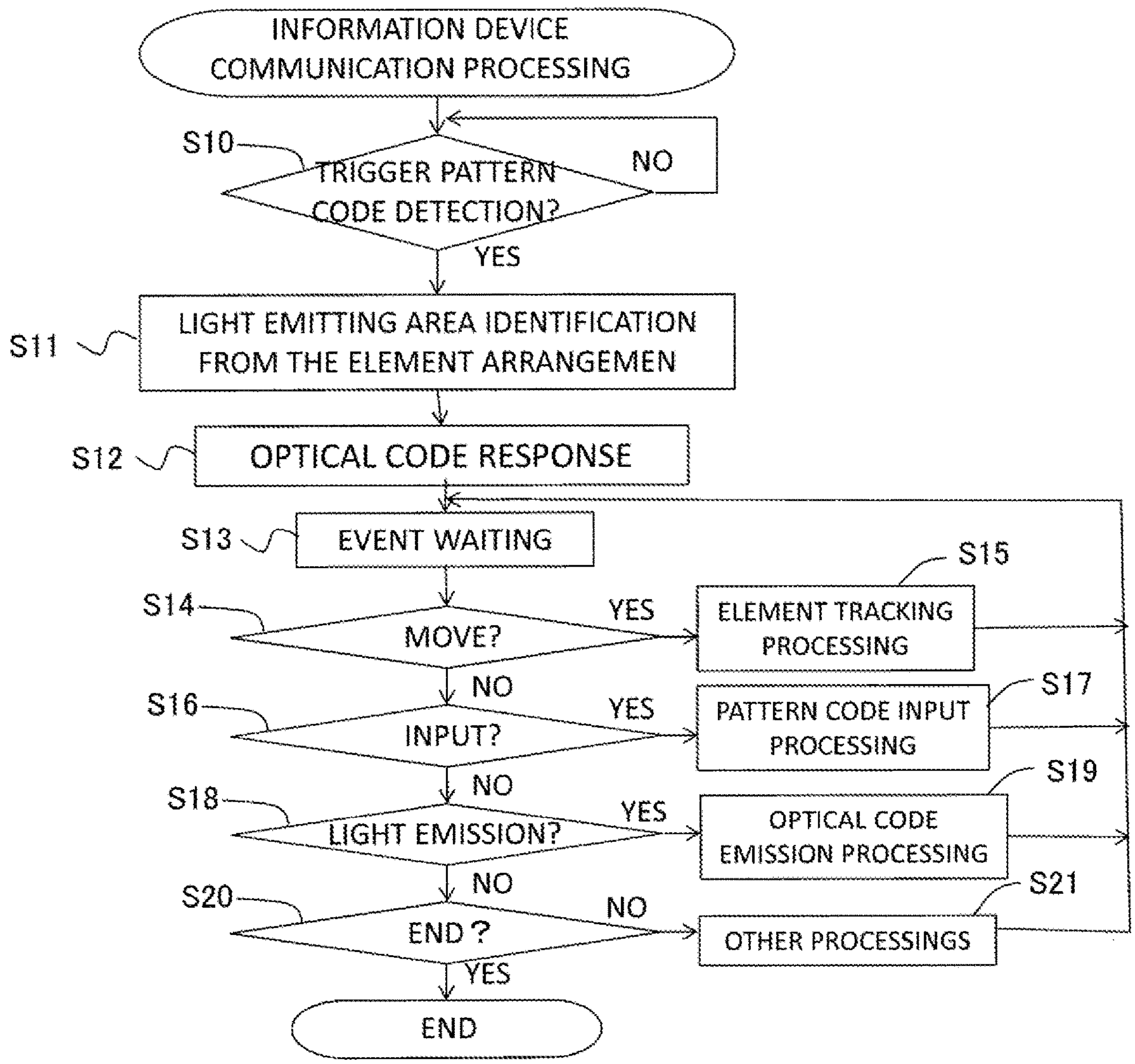

FIG. 140 is a diagram exemplifying an information transmission processing.

Figure 141:
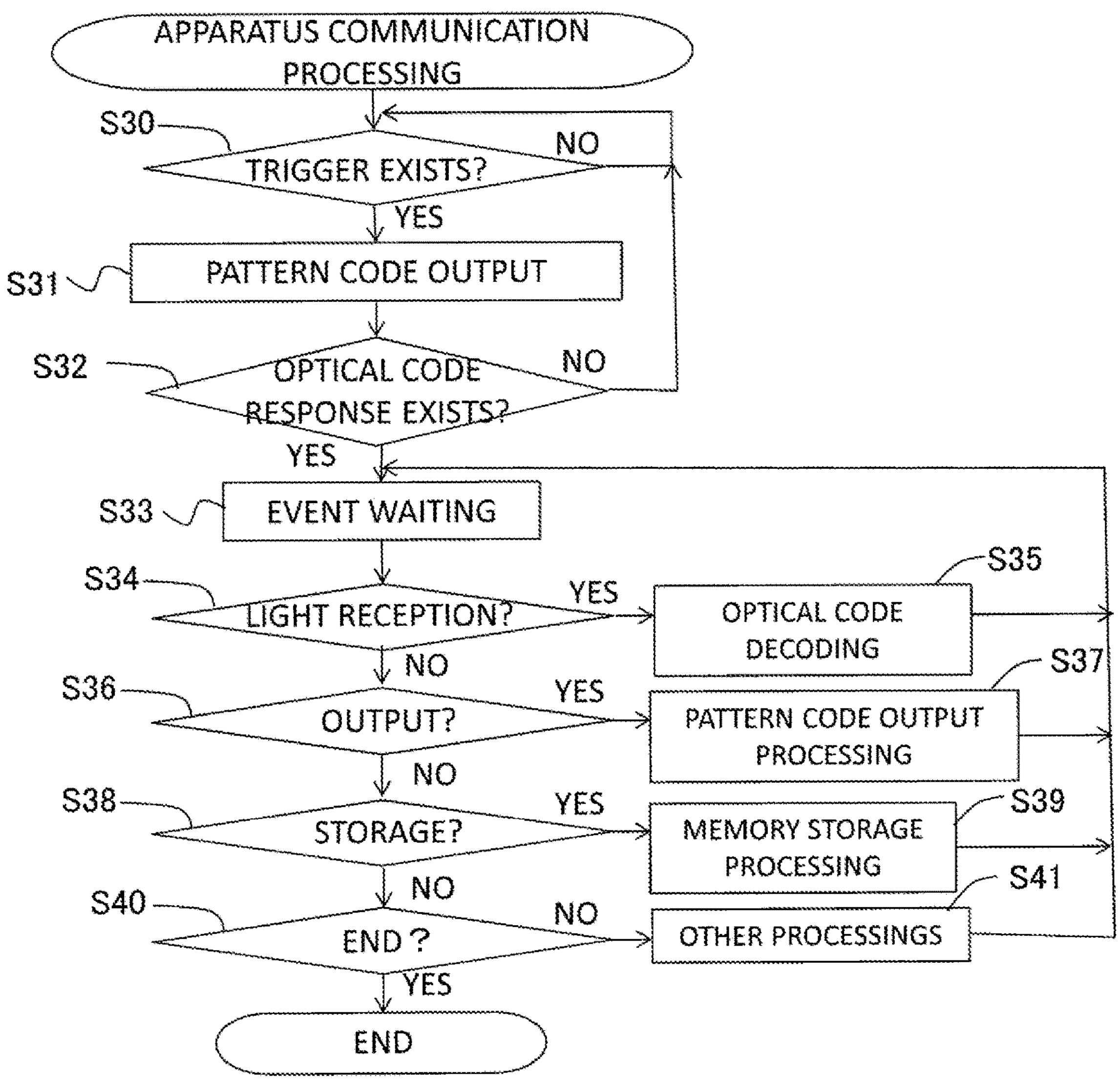

FIG. 141 is a diagram exemplifying an information transmission processing.

Figure 142:
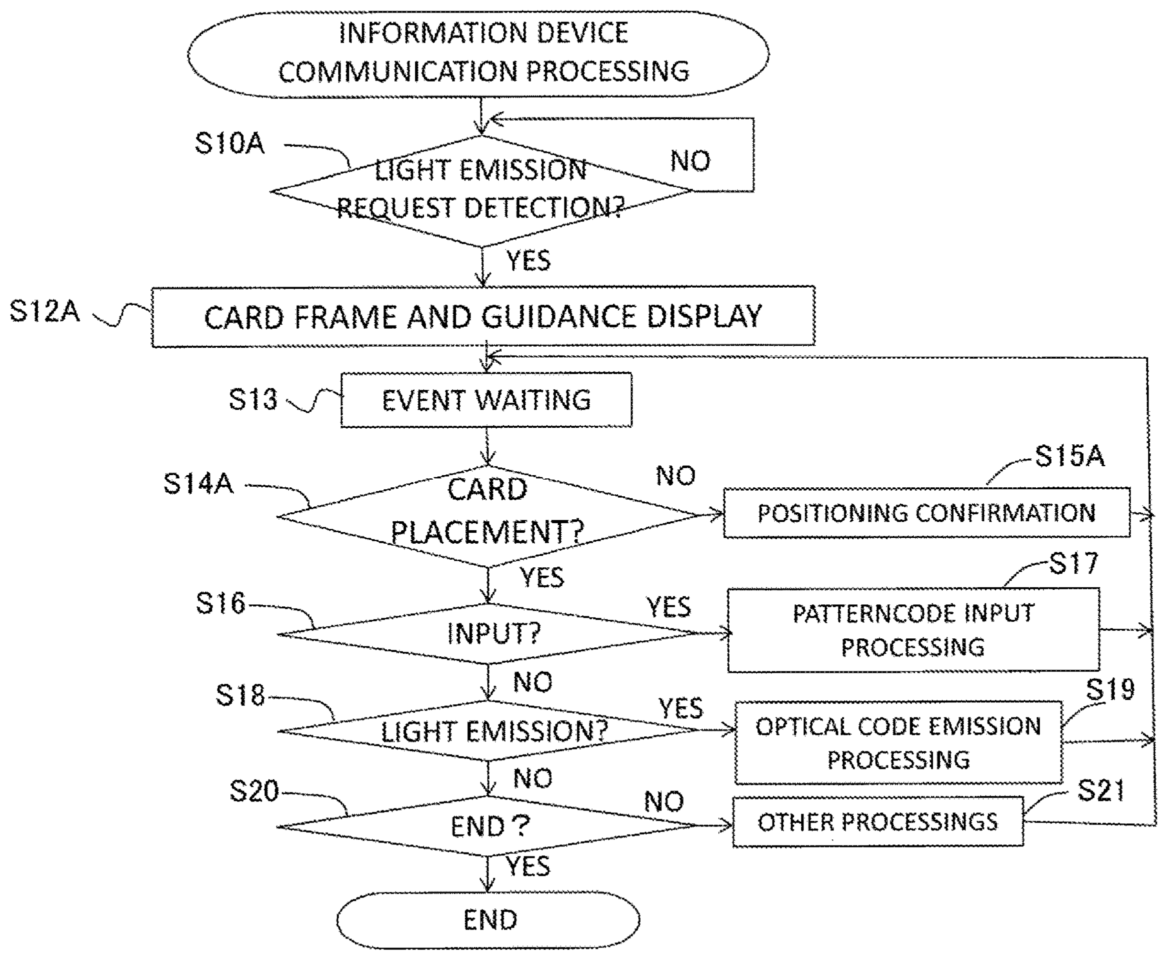

FIG. 142 is a diagram exemplifying an information transmission processing.

Figure 143:
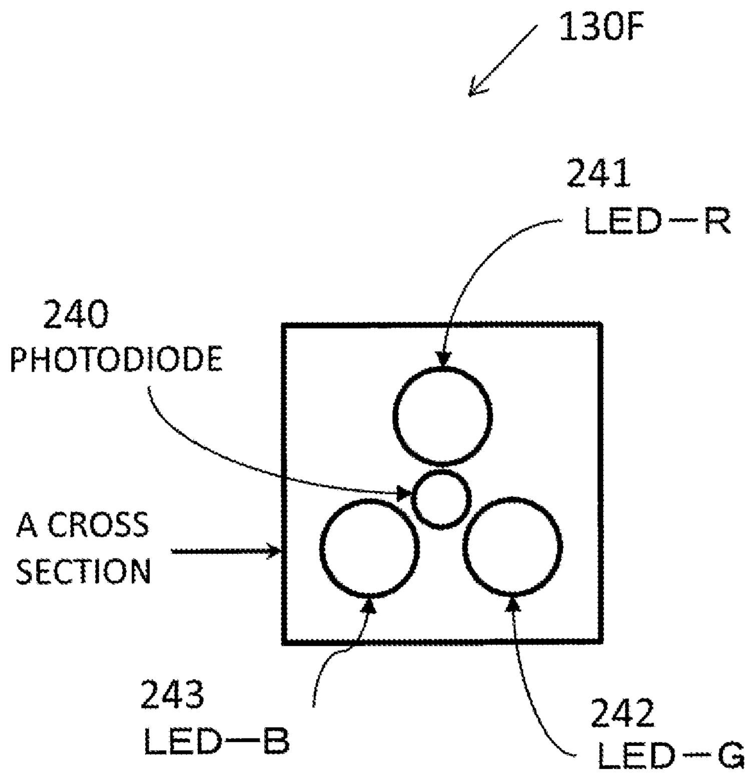

FIG. 143 is a plan view of an optical sensor which is relevant to the eighteenth embodiment.

Figure 144:
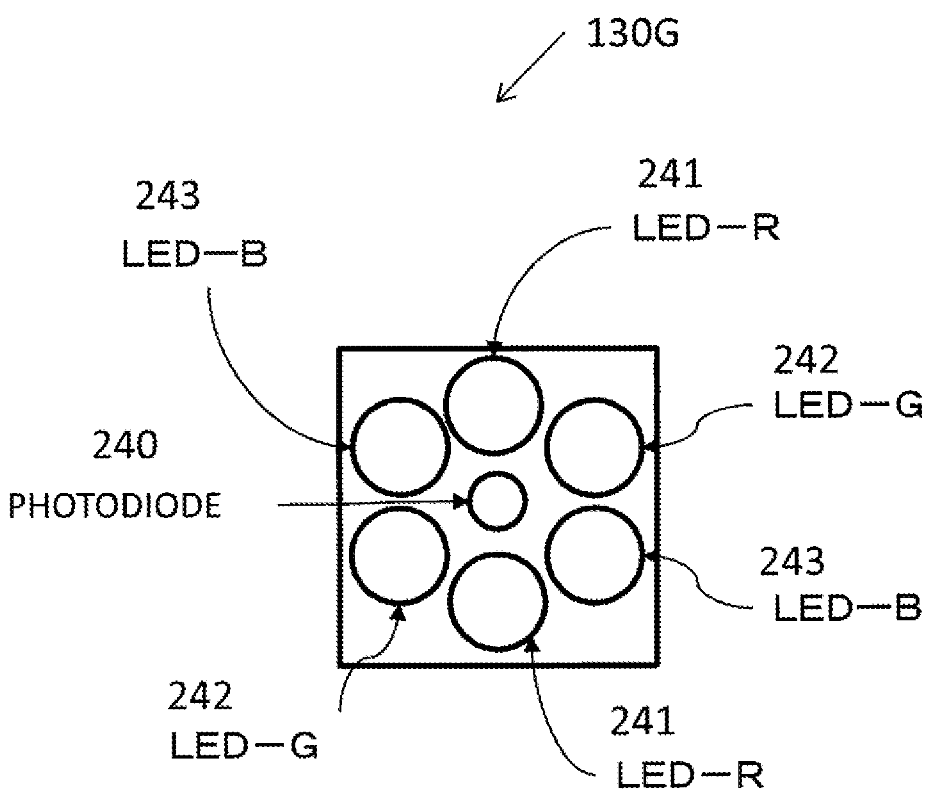

FIG. 144 is a plan view of an optical sensor which is relevant to the eighteenth embodiment.

Figure 145:
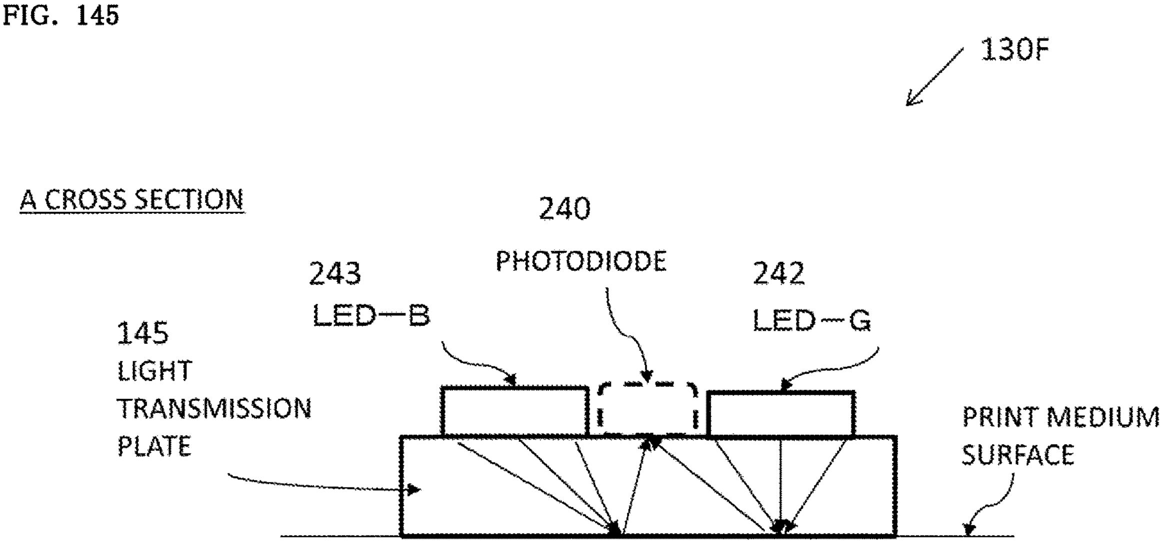

FIG. 145 is a sectional view of an optical sensor which is relevant to the eighteenth embodiment.

Figure 146:
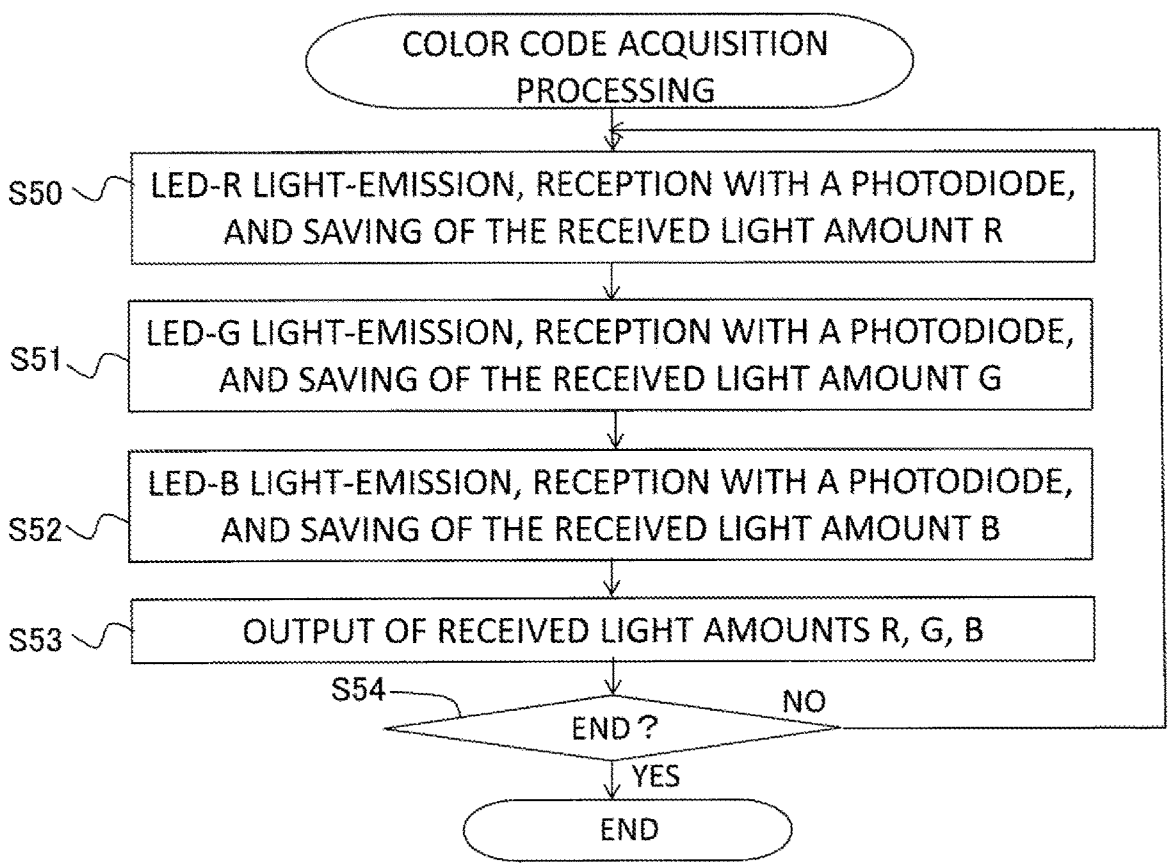

FIG. 146 is an example of the processing of color code acquisition by an optical sensor which is relevant to the eighteenth embodiment.

Figure 147:
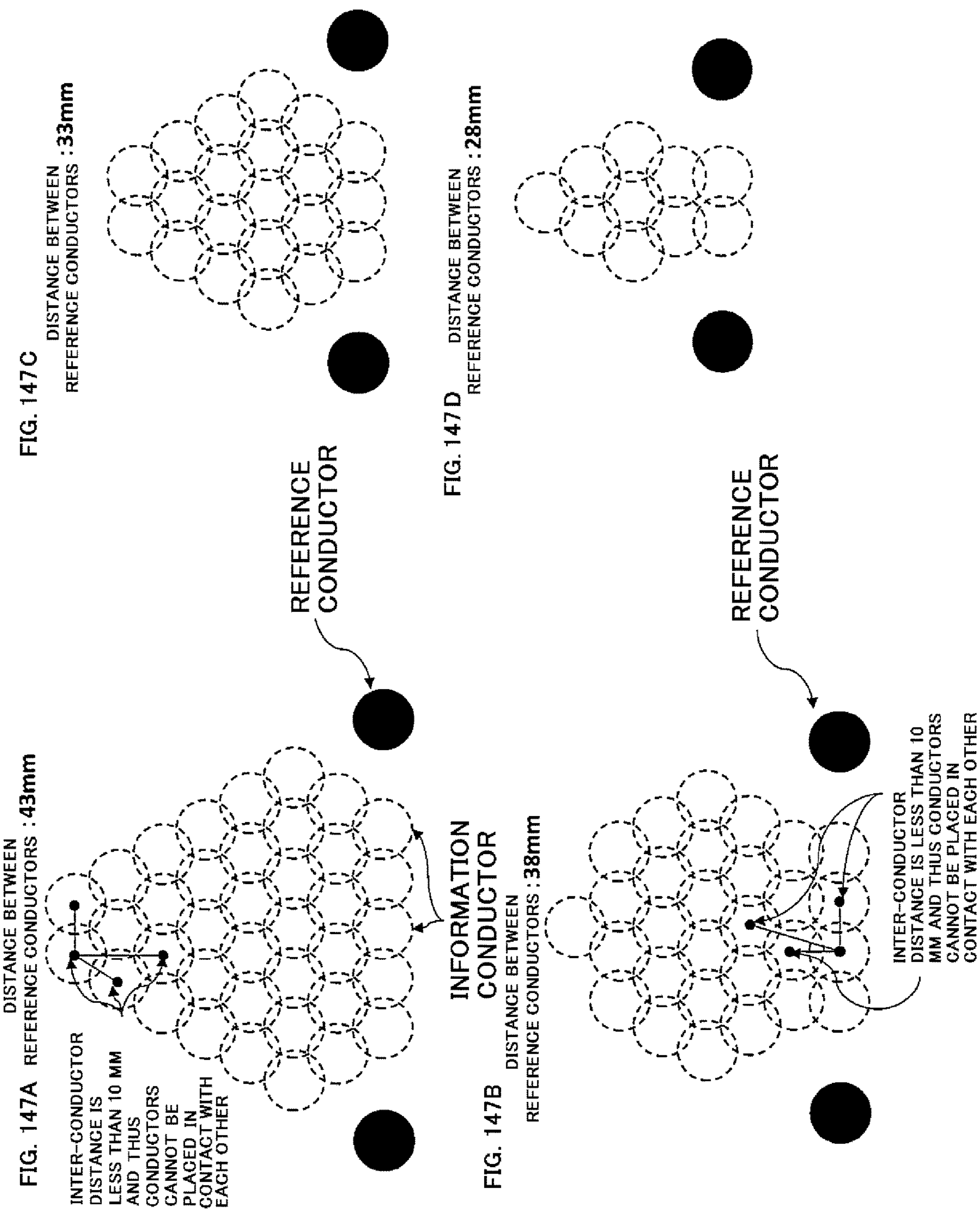

FIG. 147 is a diagram showing an example of the arrangement of a pattern code which is relevant to the nineteenth embodiment.

Figure 148:
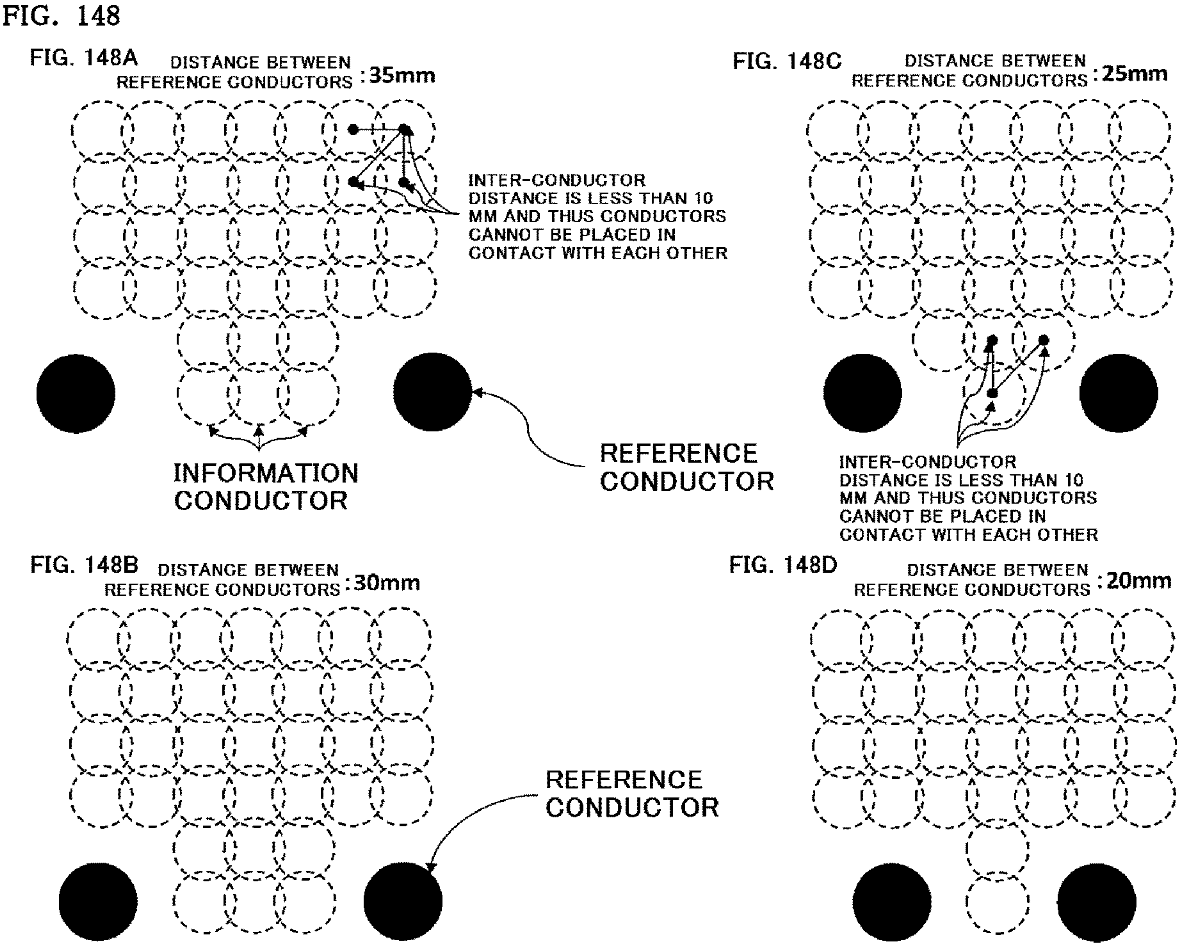

FIG. 148 is a diagram showing an example of the arrangement of a pattern code which is relevant to the nineteenth embodiment.

Figure 149:
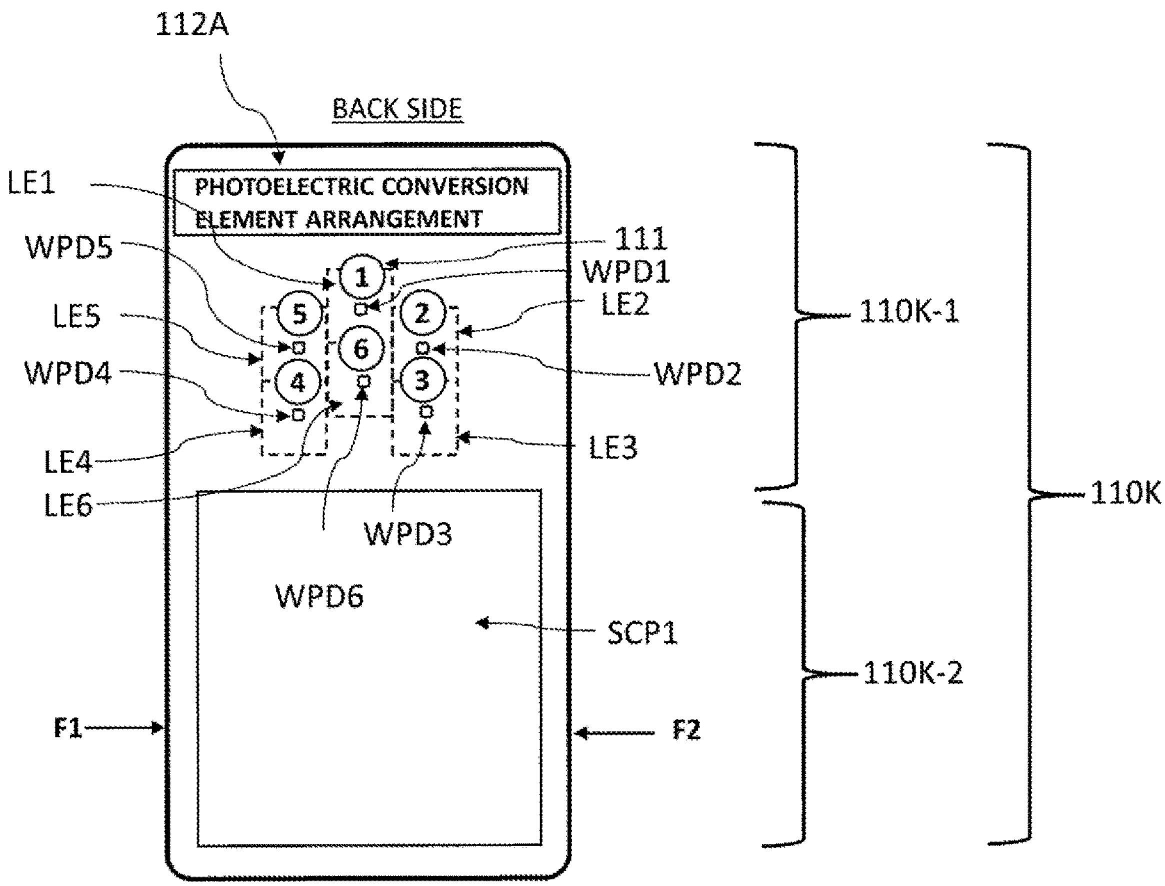

FIG. 149 is a plan view of an apparatus which is relevant to the twentieth embodiment as viewed from the back side.

Figure 150:
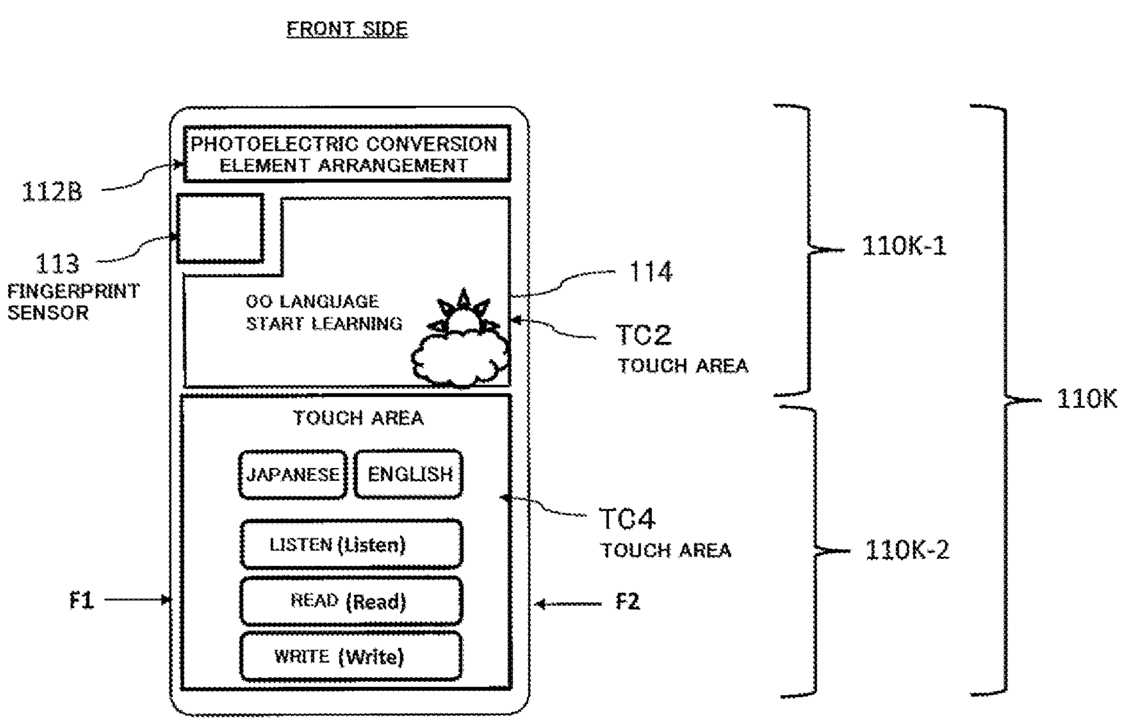

FIG. 150 is a plan view of an apparatus which is relevant to the twentieth embodiment as viewed from the front side.

Figure 151:
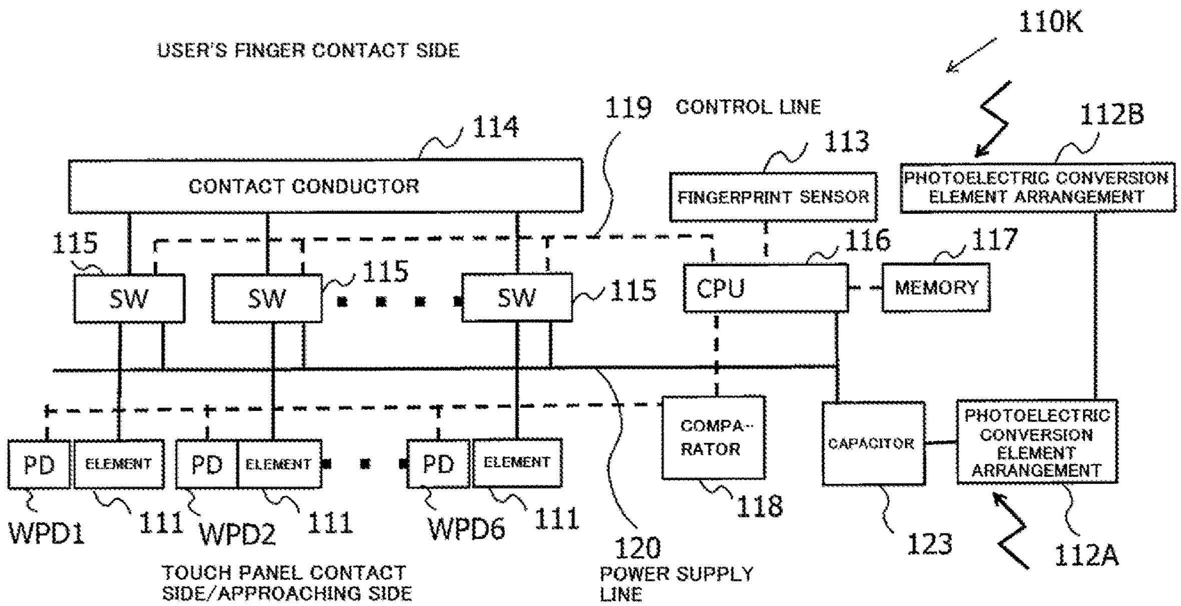

FIG. 151 is a diagram exemplifying a configuration of an electric mechanism region.

Figure 152:
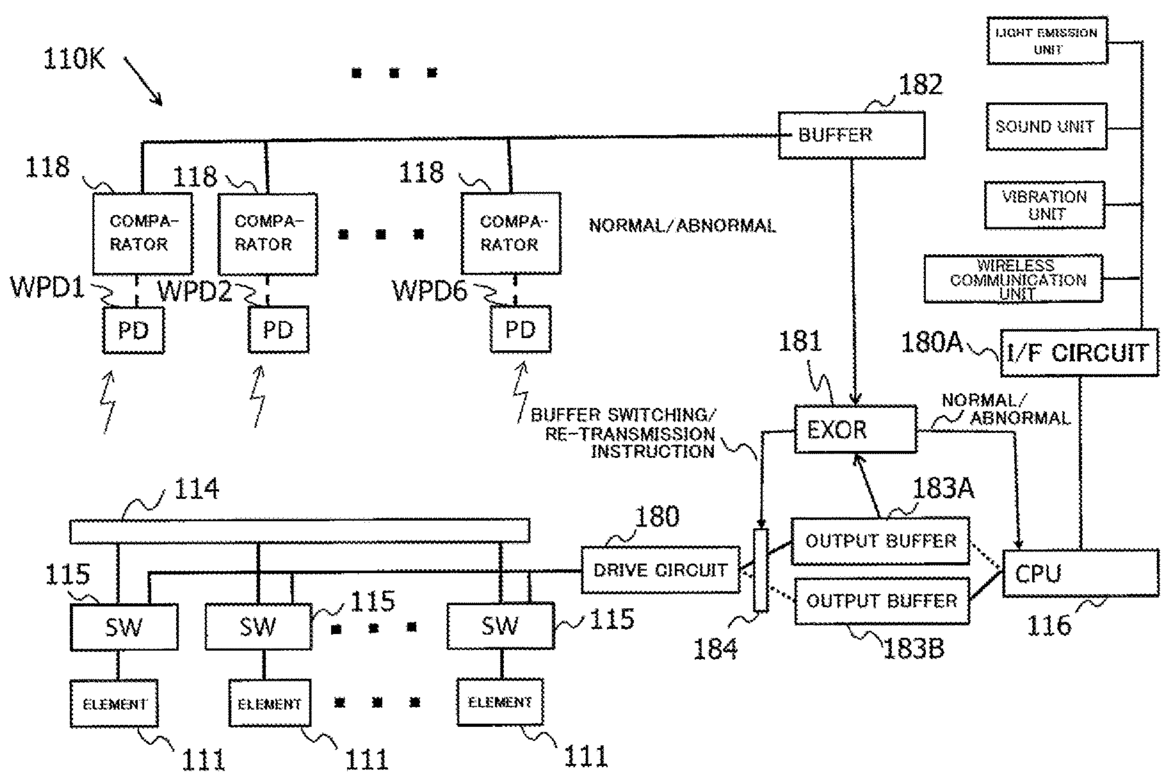

FIG. 152 is a diagram exemplifying details of a circuit configuration of an apparatus which is relevant to the twenty-first embodiment.

Figure 153:
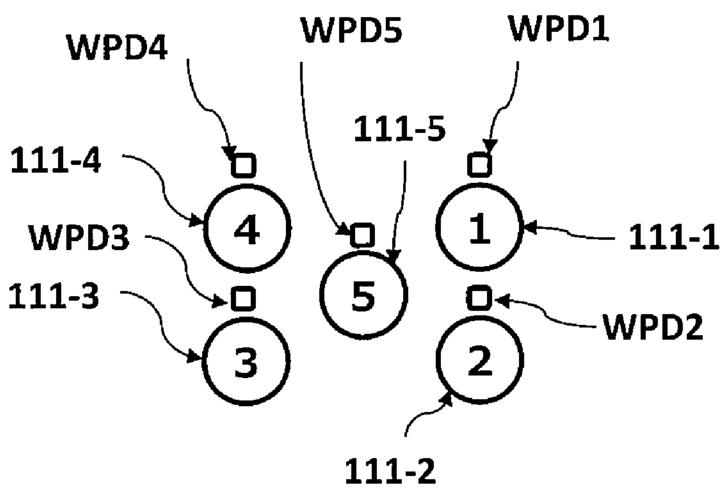

FIG. 153 is an example of the arrangement of a photodiode and an element which is in the twenty-first embodiment.

Figure 154:
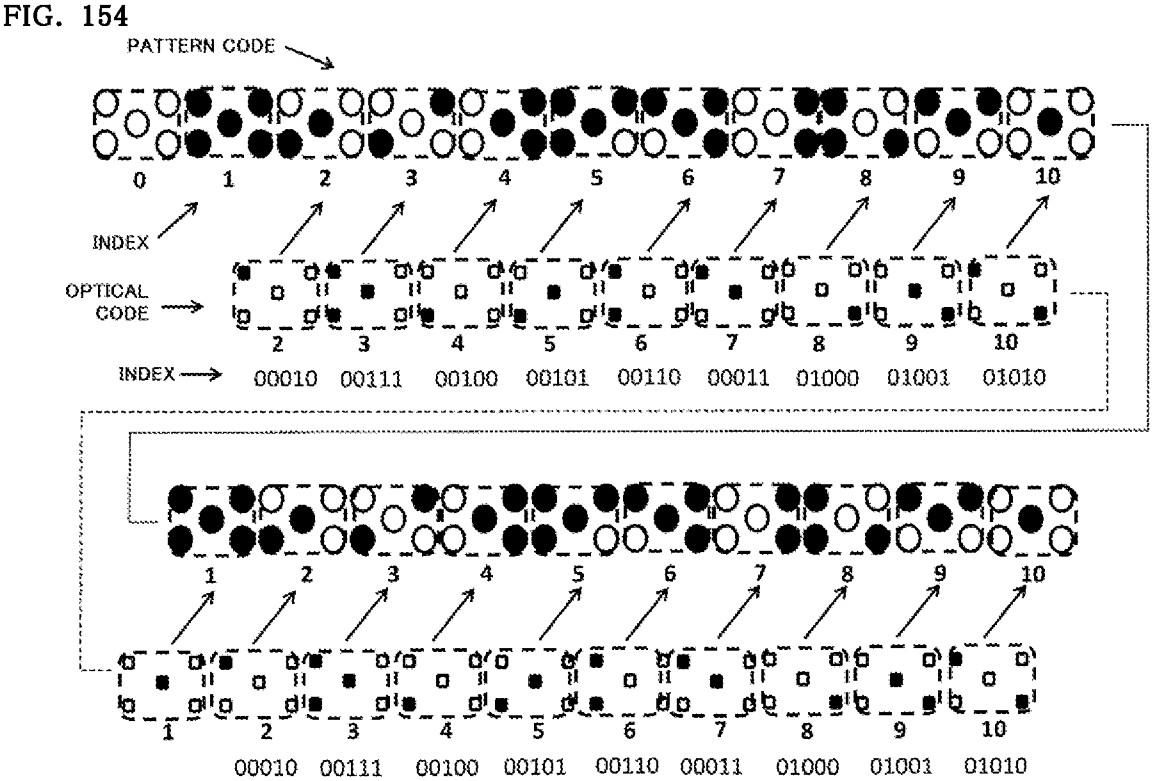

FIG. 154 is a diagram exemplifying a communication procedure between an apparatus and an information device.

Figure 155:
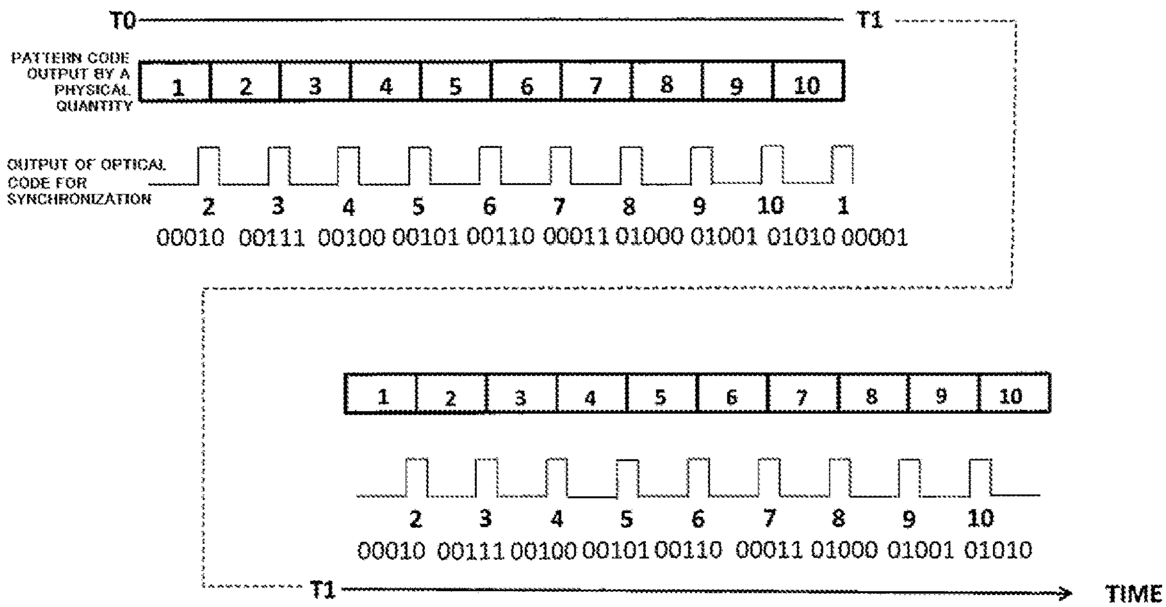

FIG. 155 is a timing chart exemplifying the relationship between an optical code for synchronization and a pattern code.

Figure 156:
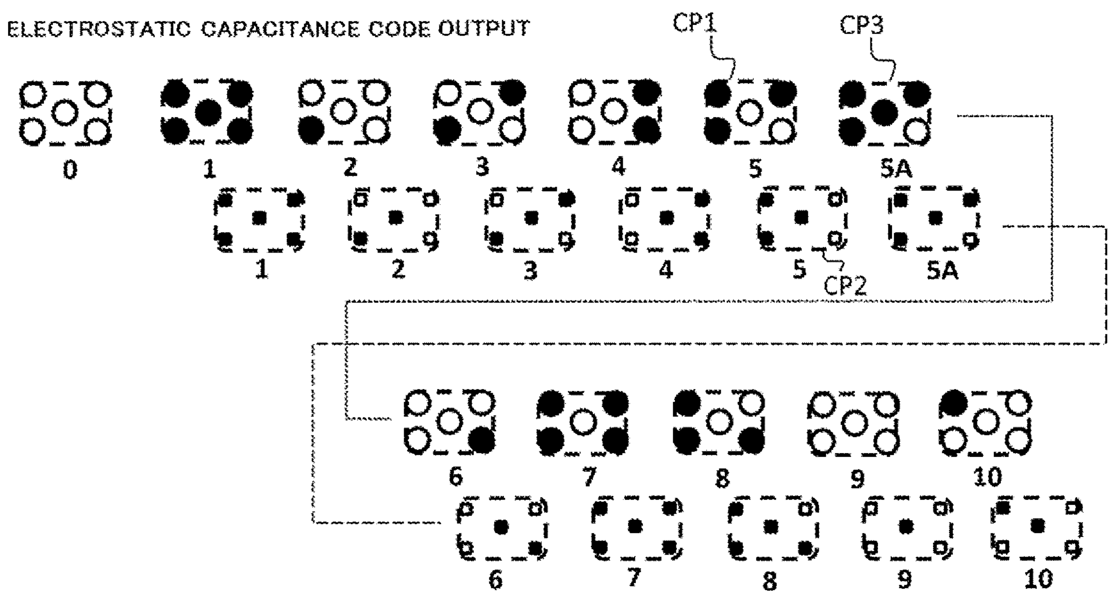

FIG. 156 is an example of an error checking method in the twenty-first embodiment.

Figure 157:
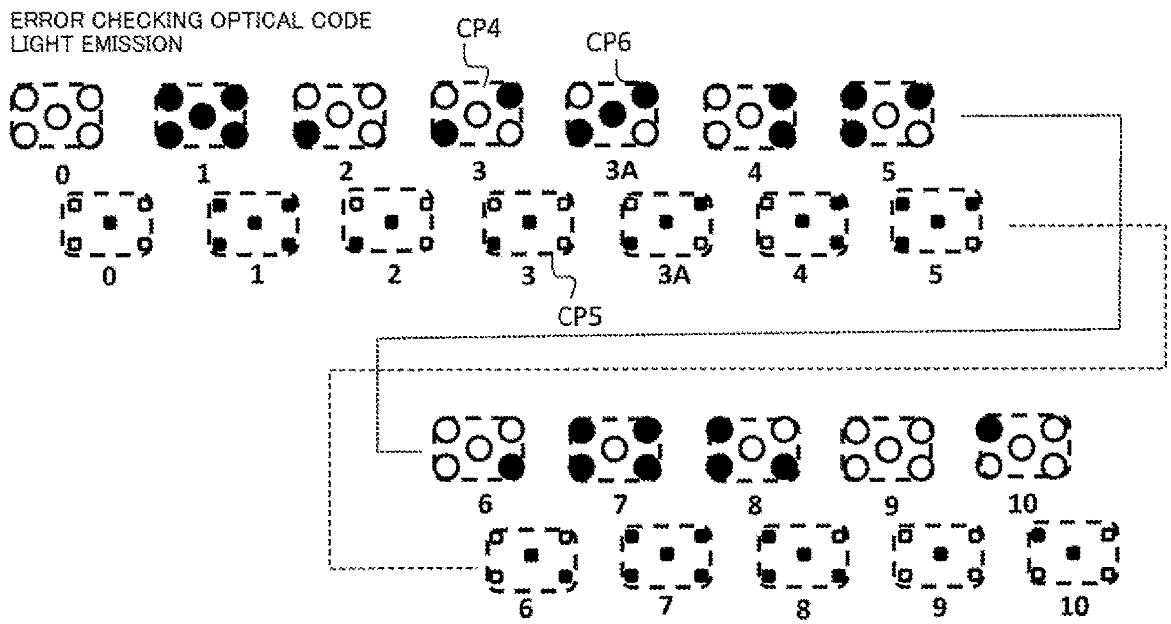

FIG. 157 is another example in which the pattern code is output again.

Figure 158:
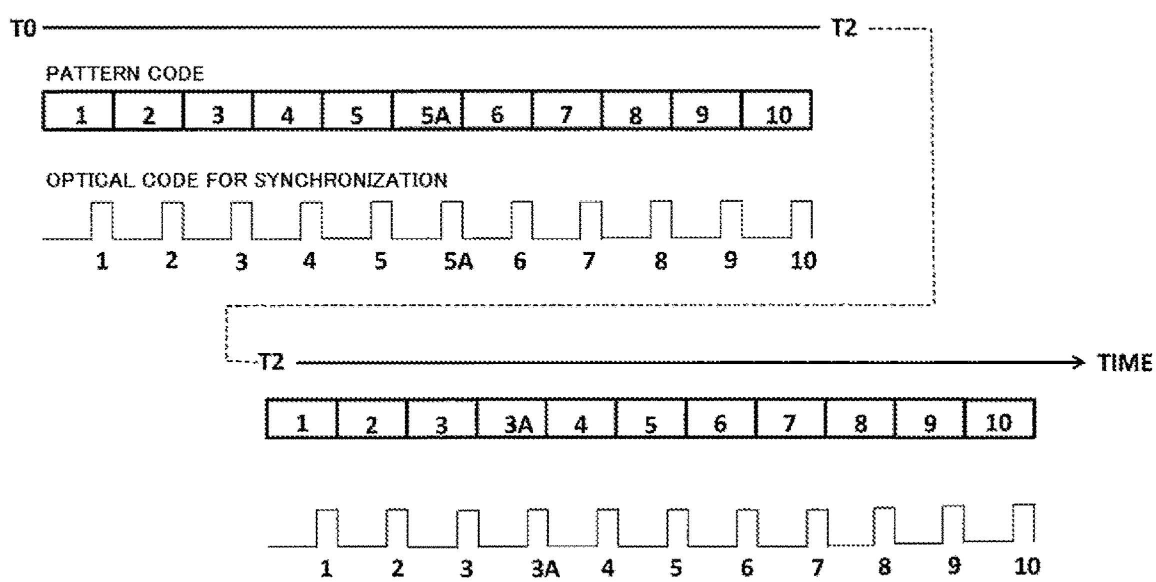

FIG. 158 is a timing chart exemplifying the relationship between synchronization optical code and a pattern code.

Figure 159:
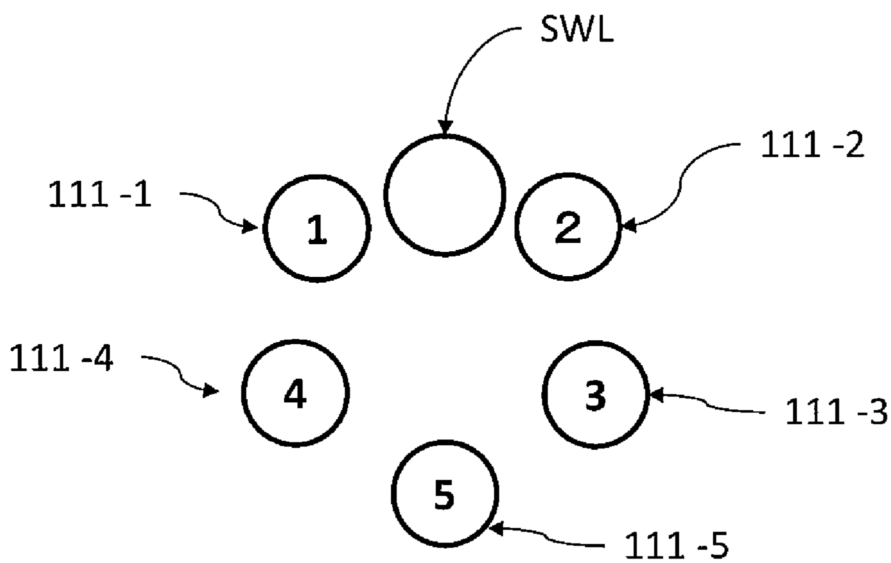

FIG. 159 is a diagram exemplifying another configuration of the back side of an apparatus.

Figure 160:
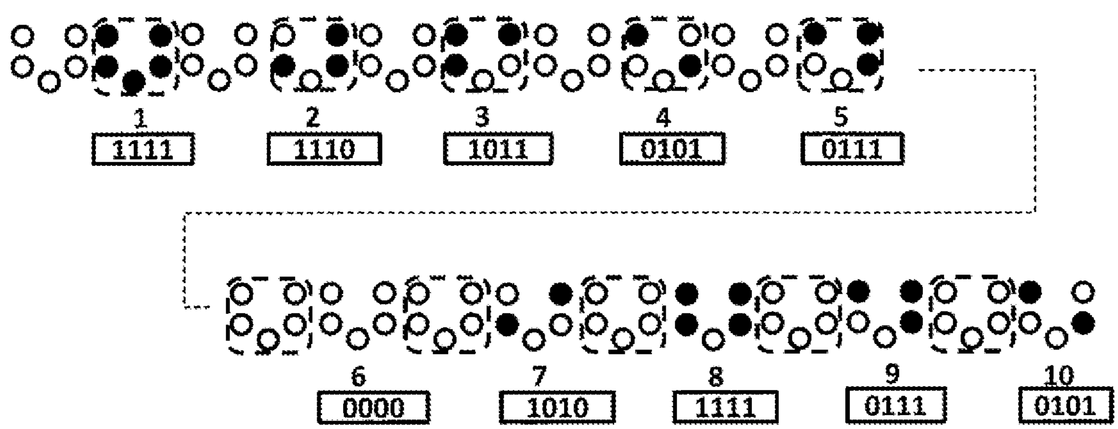

FIG. 160 is a diagram exemplifying a pattern code.

Figure 161:
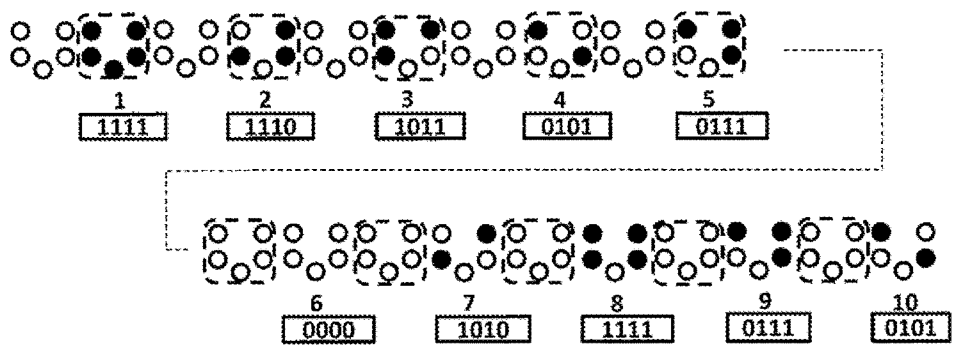

FIG. 161 is a diagram exemplifying a pattern code.

Figure 162:
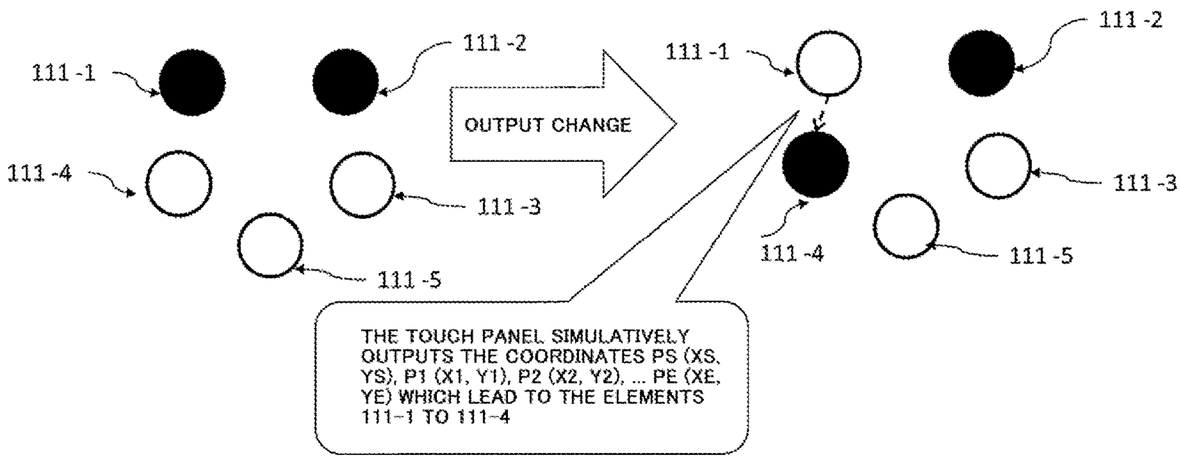

FIG. 162 is an example of an erroneous detection of a touch move.

Figure 163:
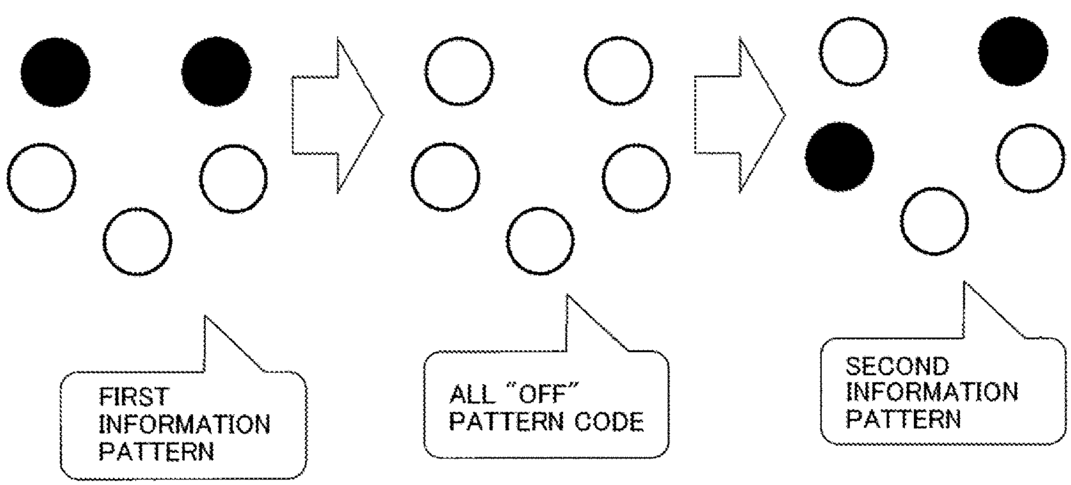

FIG. 163 is a diagram exemplifying processing for reducing erroneous detections of a touch move.

Figure 164A:
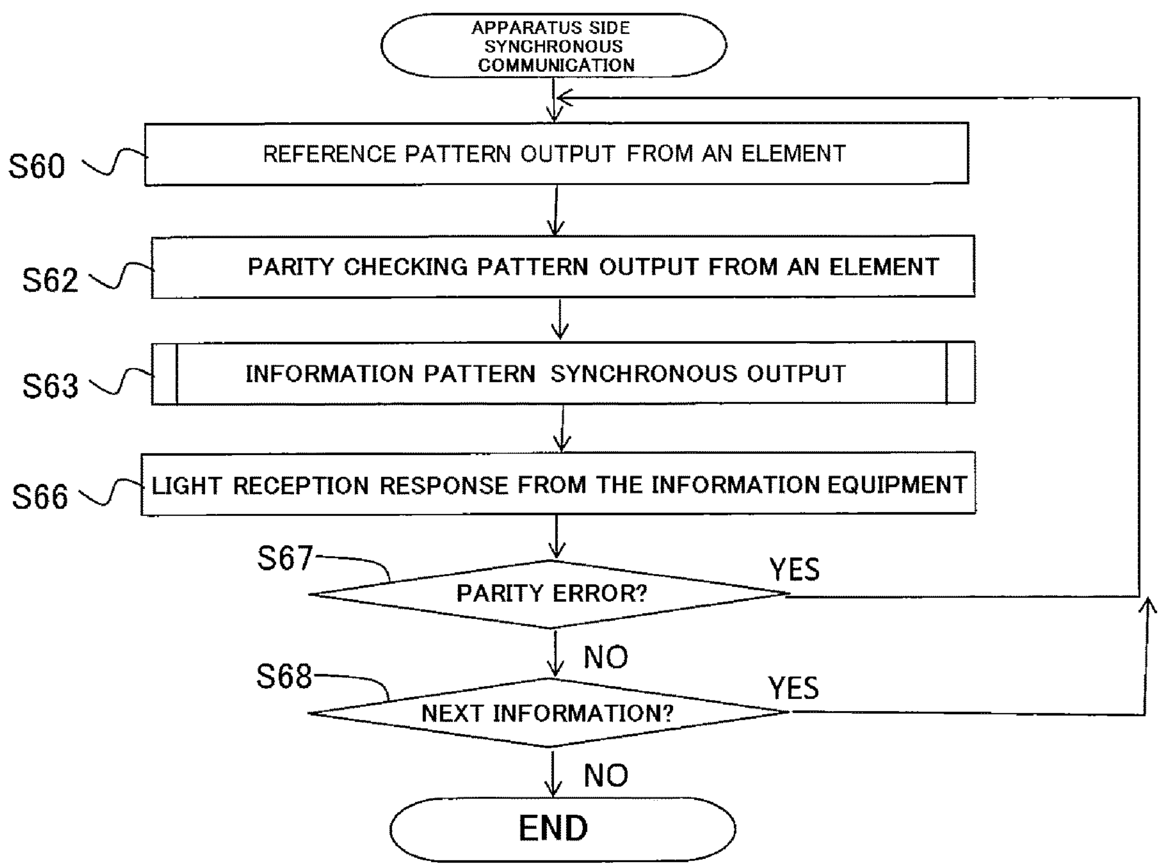

FIG. 164A is a diagram exemplifying pattern code output processing (apparatus-side synchronous communication).

Figure 164B:
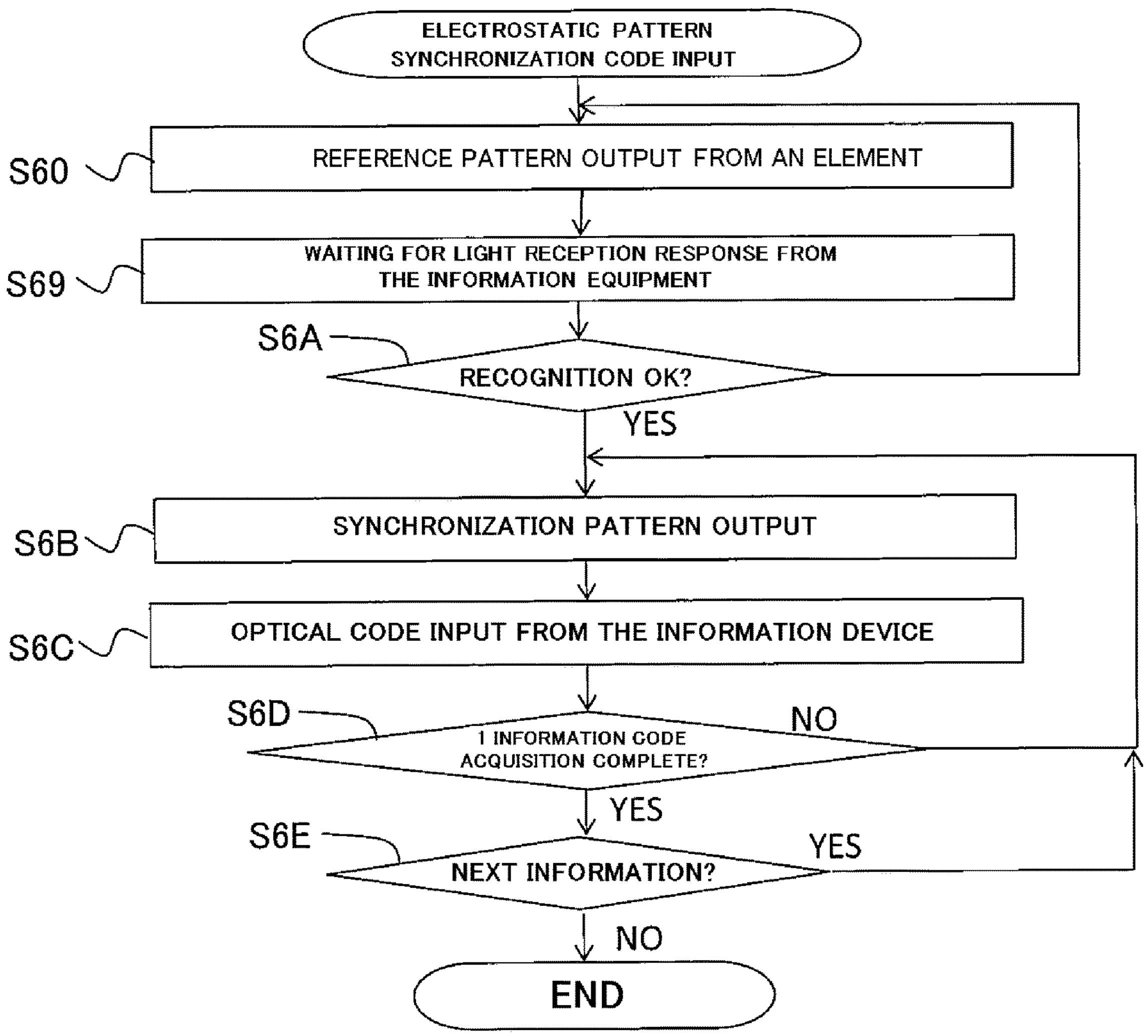

FIG. 164B is a diagram exemplifying processing in which an apparatus outputs a pattern code for synchronization instead of an information device outputting an optical code for synchronization.

Figure 164C:
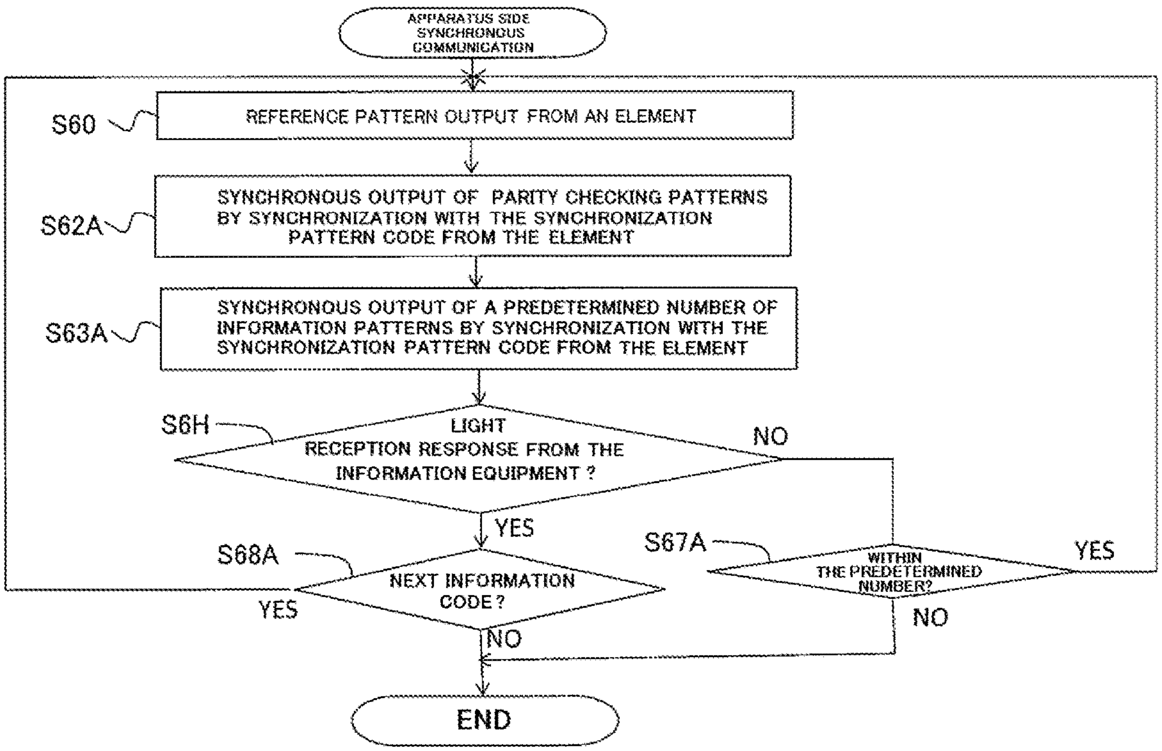
Figure 165:
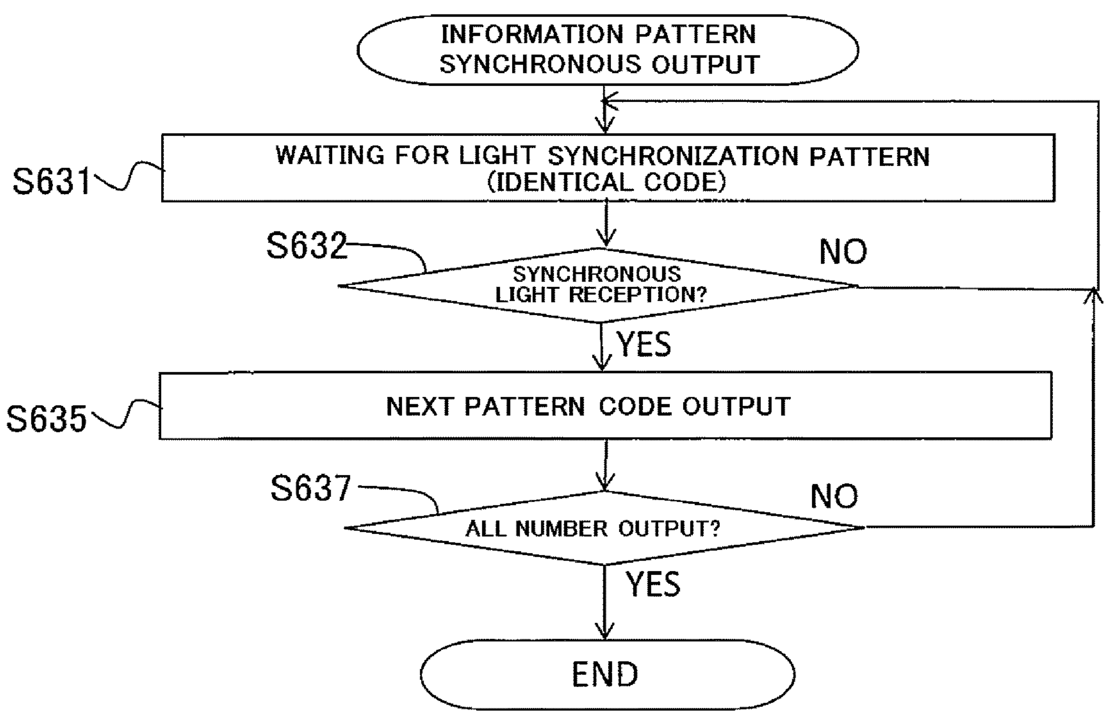

FIG. 164C exemplifies processing of an apparatus in which an information pattern is input into an information device in synchronization with a synchronization pattern code FIG. 165 is a diagram exemplifying details of an information pattern synchronous output processing.

Figure 166:
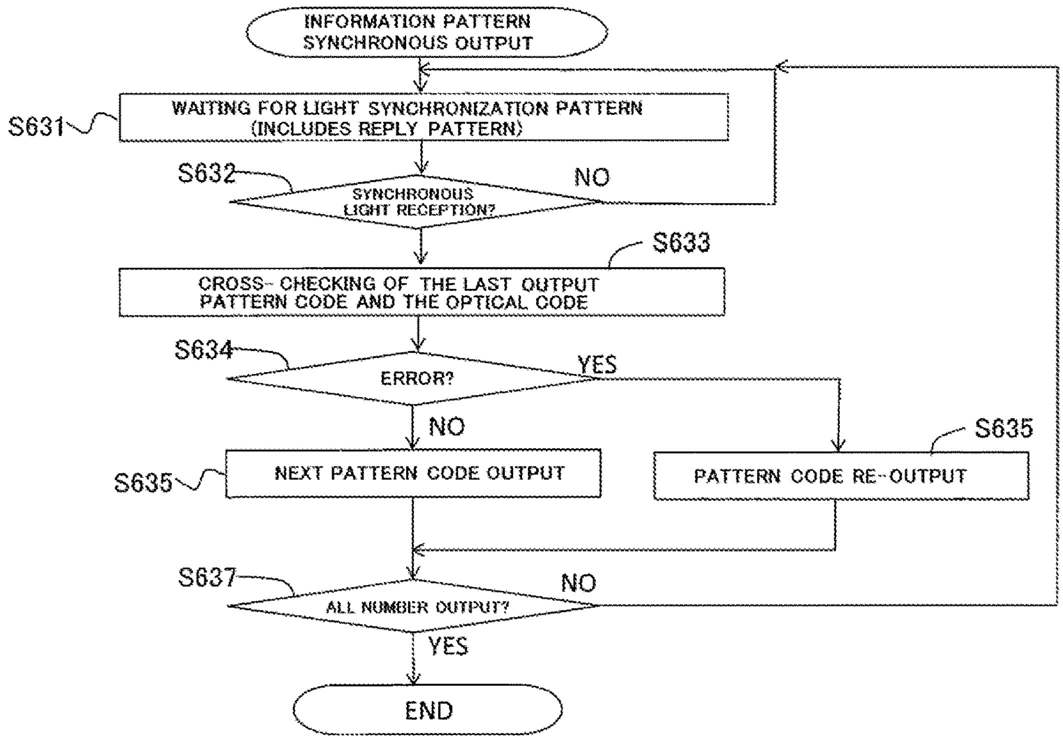

FIG. 166 is a diagram showing another example of details of the information pattern synchronous output processing.

Figure 167:
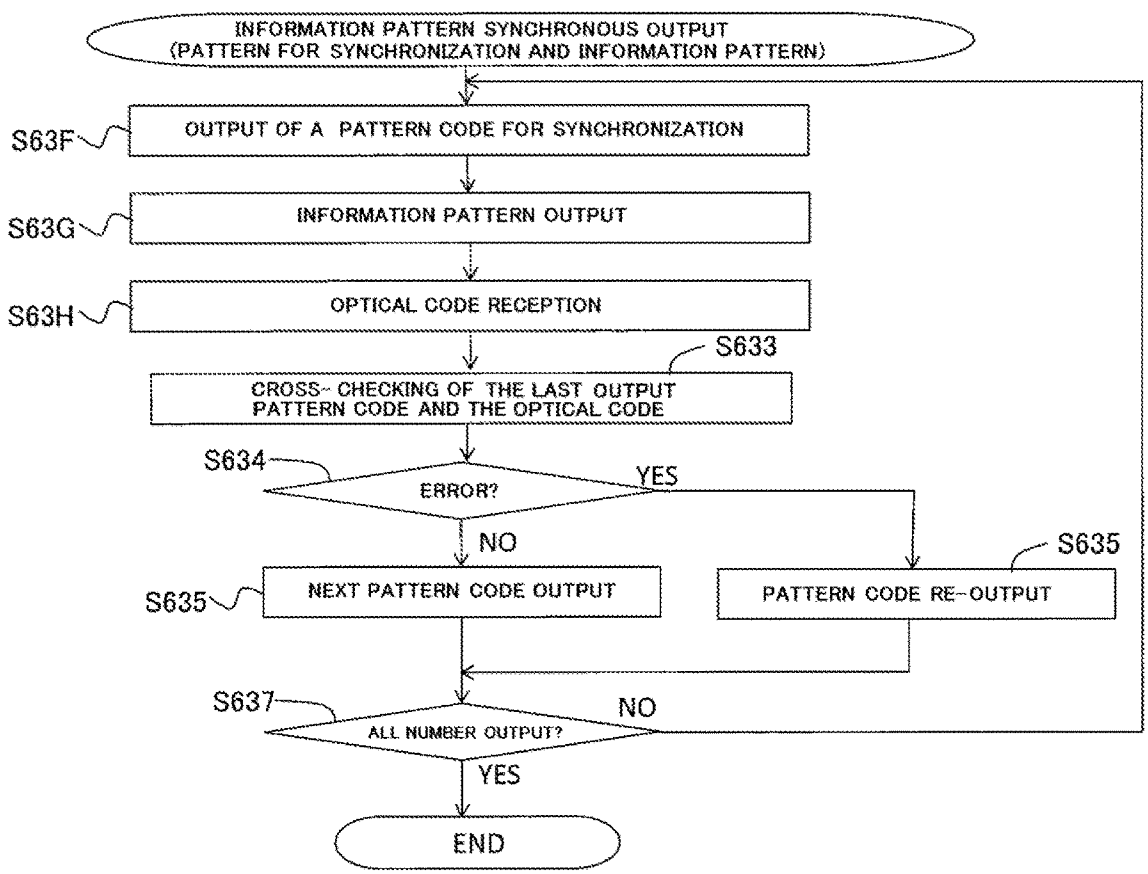

FIG. 167 is a diagram exemplifying a processing of an apparatus outputting an information pattern following a pattern code for synchronization.

Figure 168:
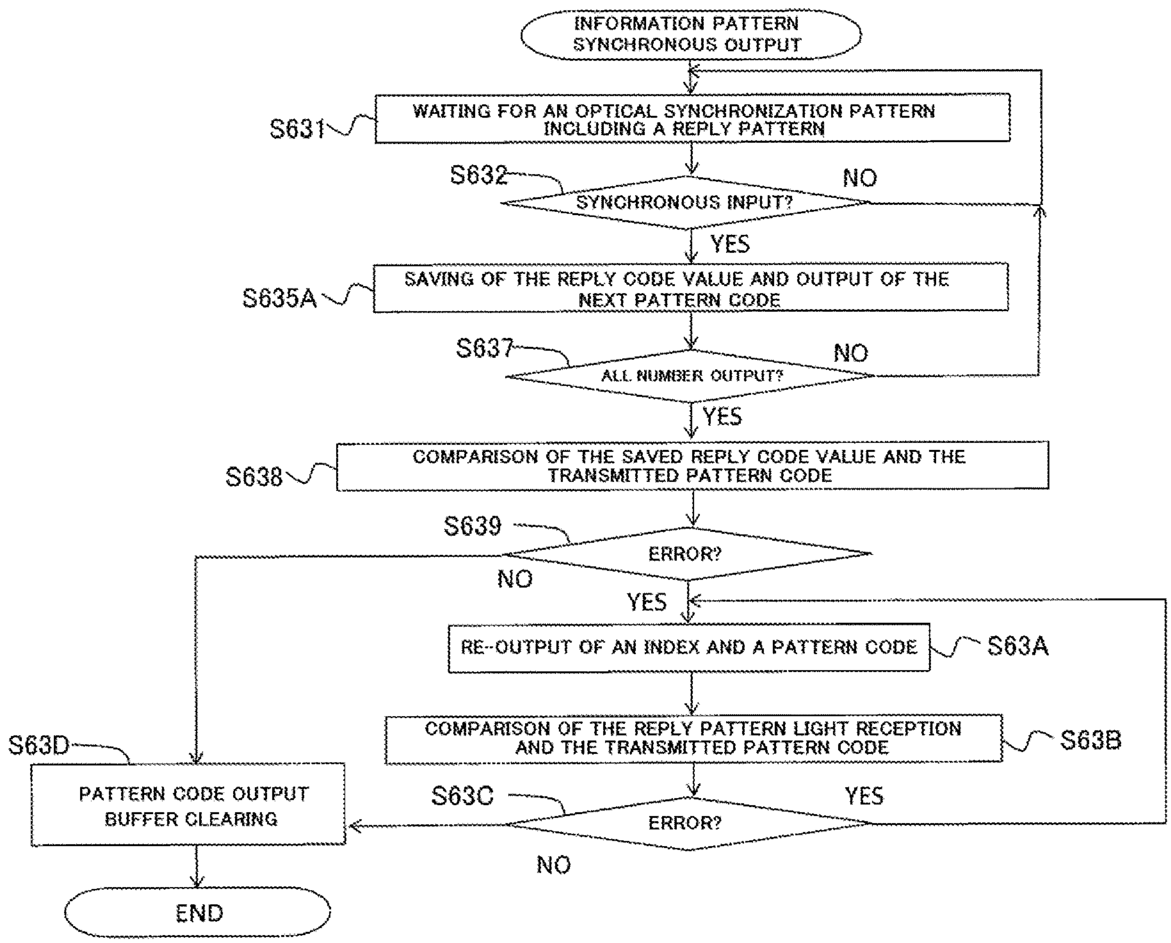

FIG. 168 is an example of processing in which error checking is executed after outputting a pattern code string.

Figure 169:
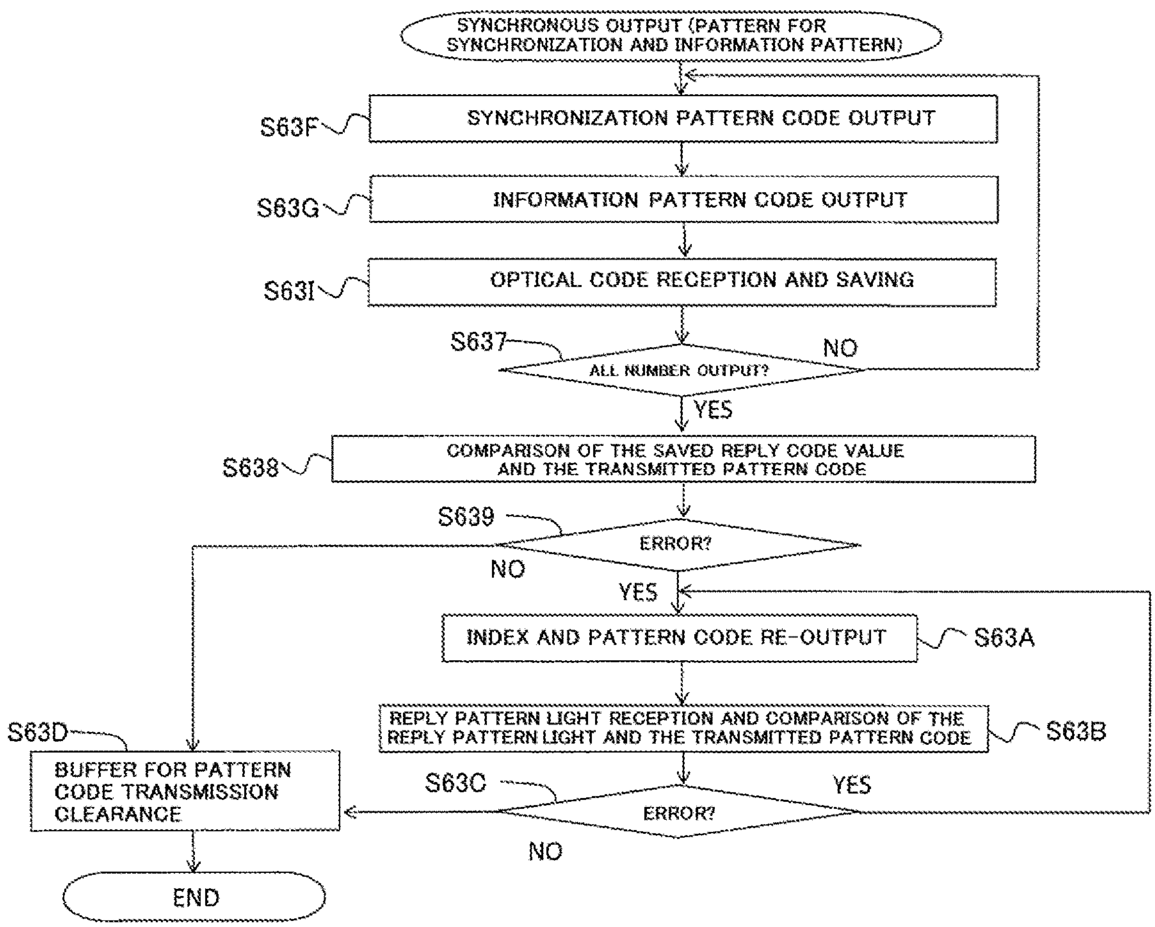

FIG. 169 is a flowchart of processing in which an error check is executed with a delay from the time of one pattern code output.

Figure 170A:
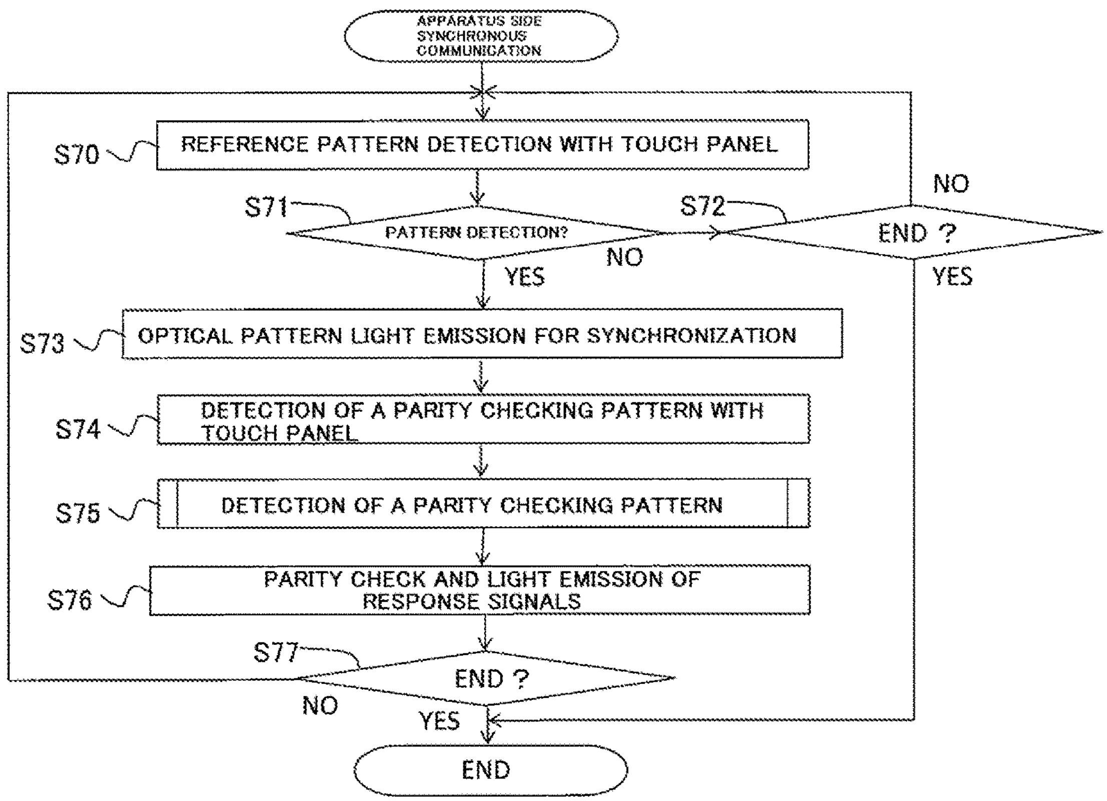

FIG. 170A is a flowchart exemplifying synchronous communication processing on the information device side.

Figure 170B:
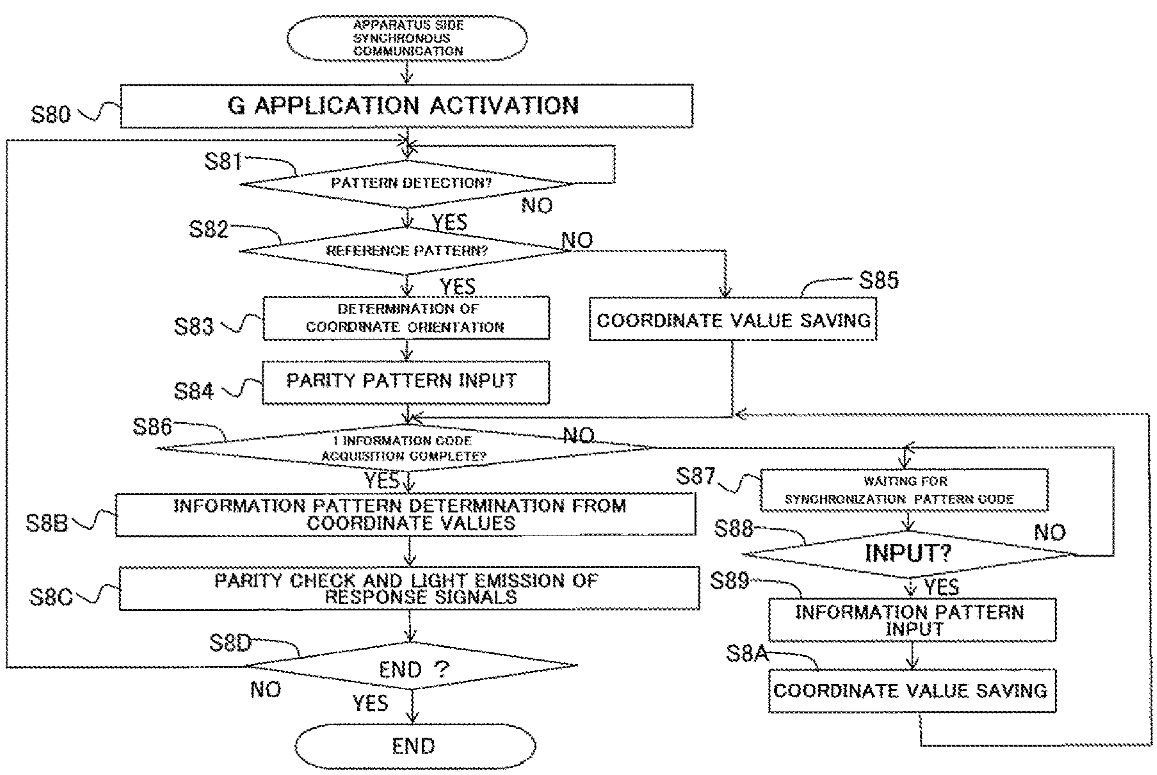

FIG. 170B is a diagram exemplifying processing of information device 200 which inputs a pattern code regardless of whether or not the reference pattern is detected.

Figure 171:
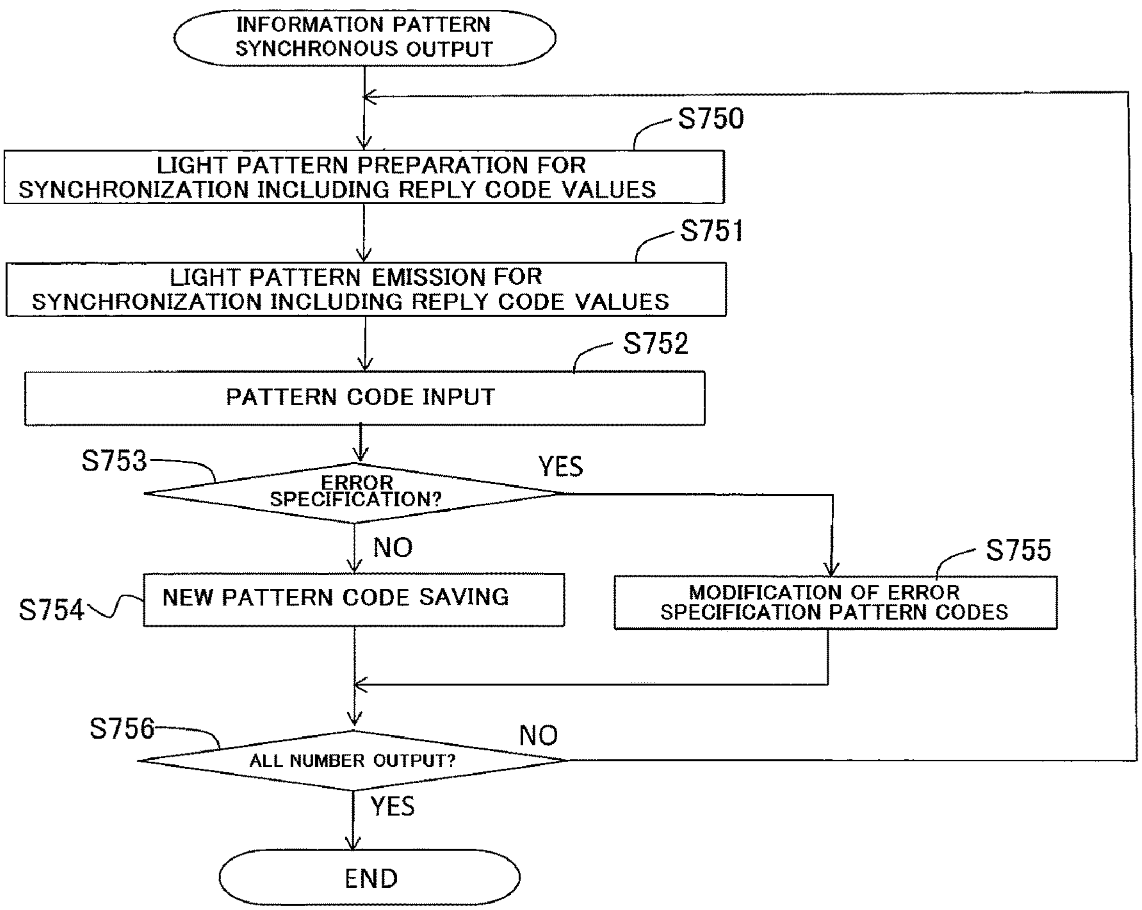

FIG. 171 is a flowchart of processing exemplifying details of an information pattern synchronous input process.

Figure 172:
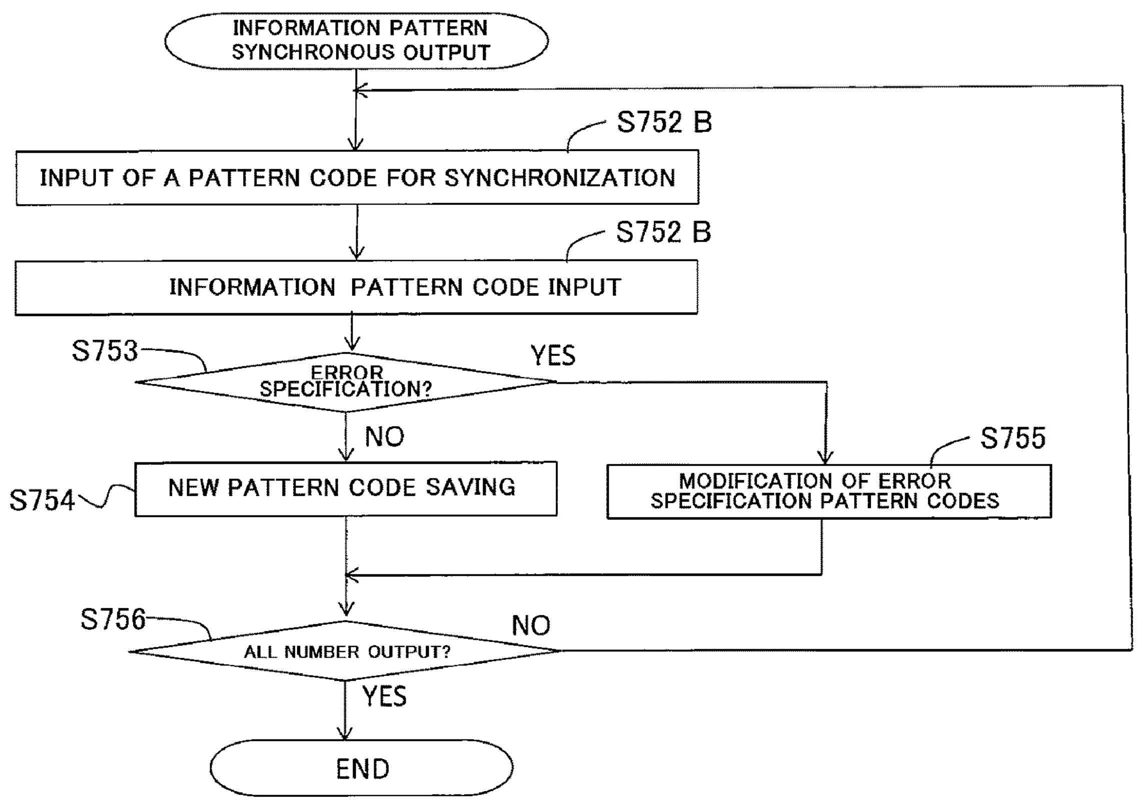

FIG. 172 is an example of processing of an information device when the information device inputs a pattern code for apparatus synchronization.

Figure 173:
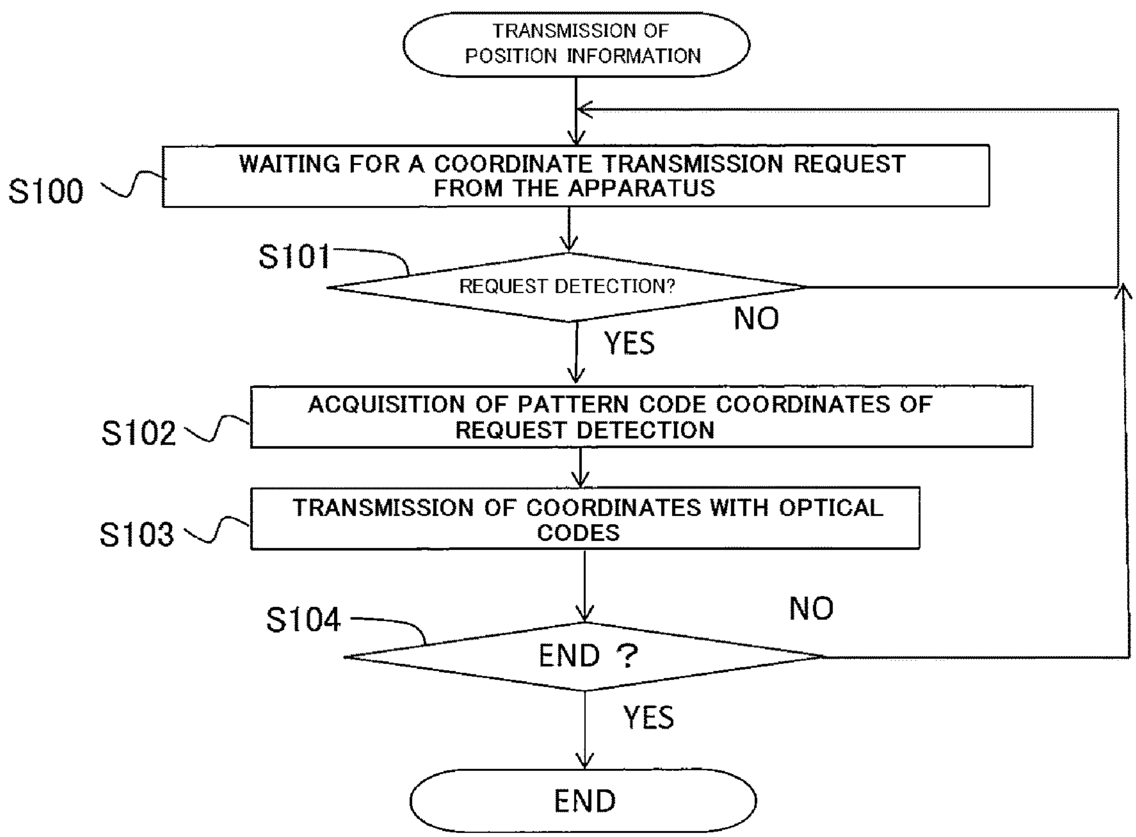

FIG. 173 is an example of processing in which the information device transmits position coordinates on the touch panel in accordance with the output of a pattern code from the apparatus.

Figure 174:
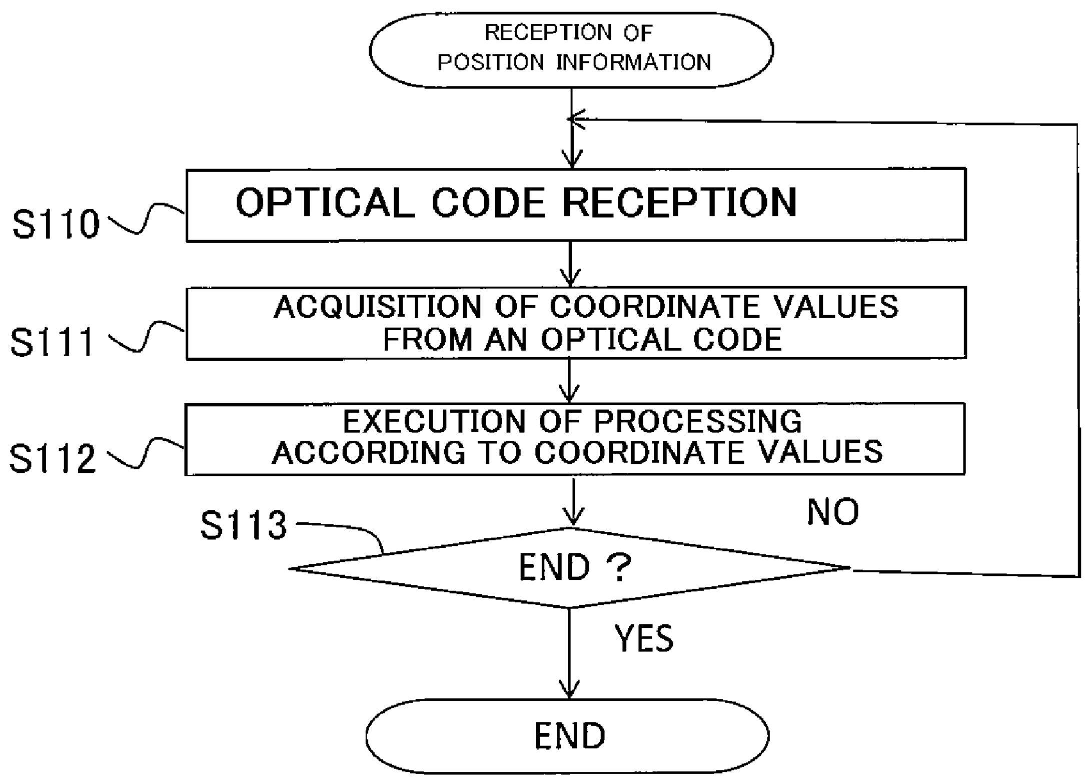

FIG. 174 is a flowchart of position coordinate reception processing.

Figure 175:
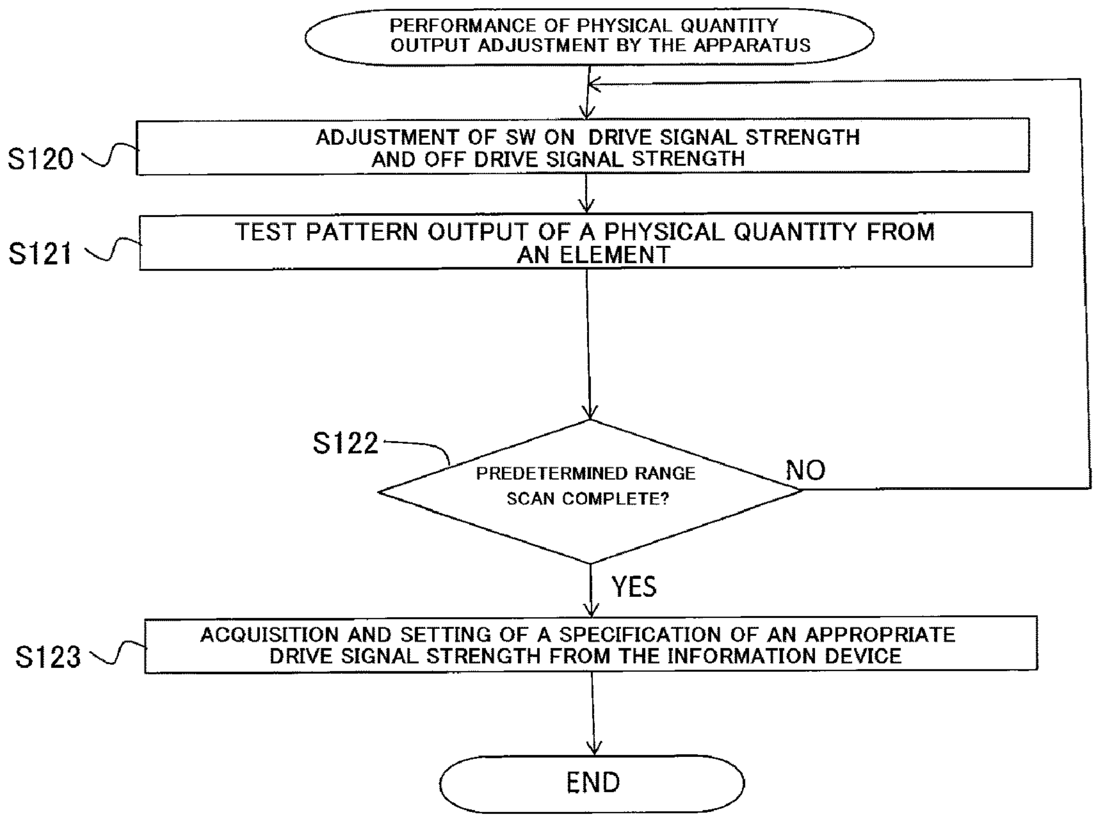

FIG. 175 is a diagram exemplifying processing of the adjustment of an output value of a physical quantity output by an apparatus with an information device.

Figure 176:
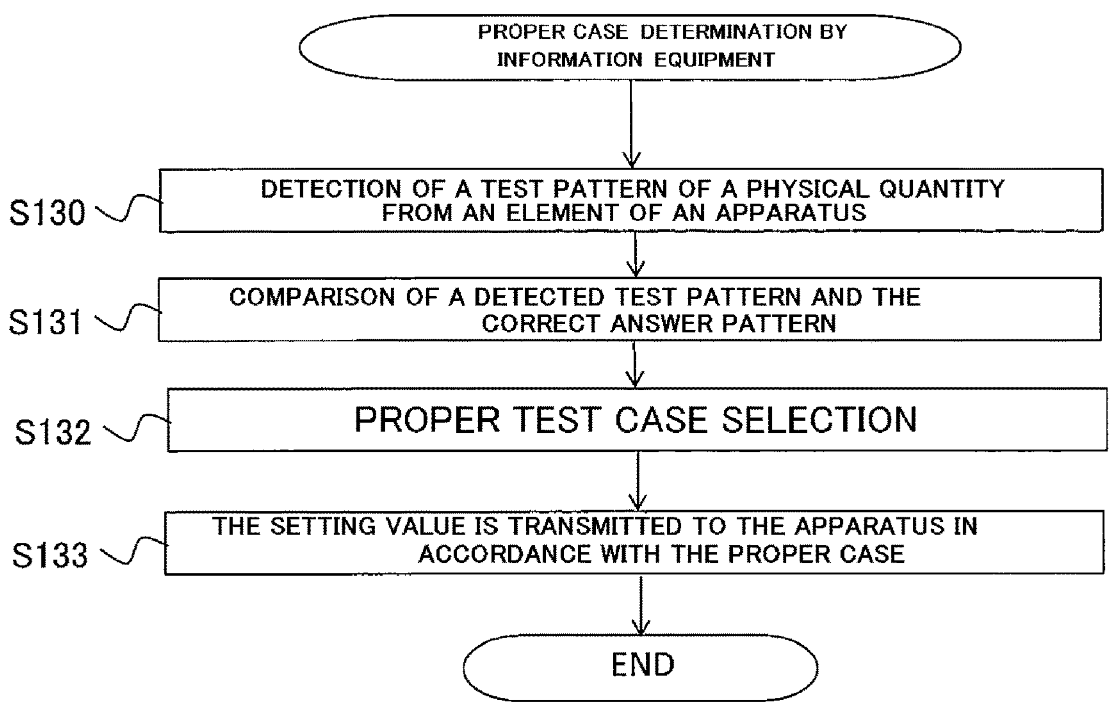

FIG. 176 is a flowchart exemplifying an appropriate case determination processing based on test pattern detection.

Figure 177:
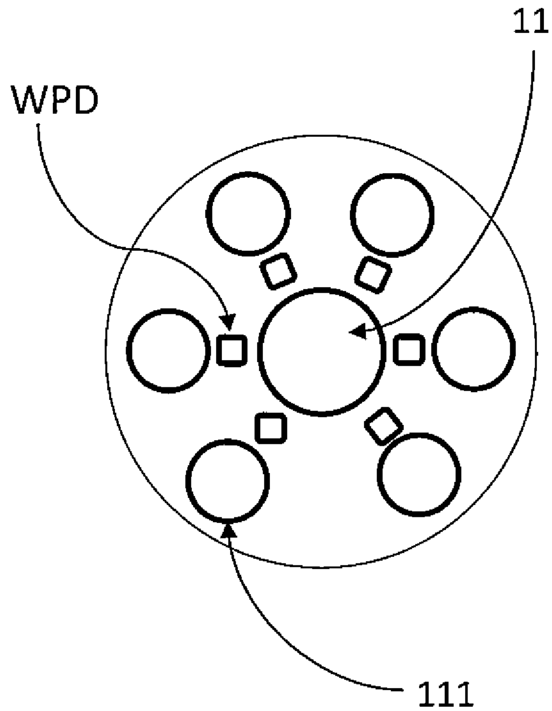

FIG. 177 is a diagram exemplifying a configuration of the back side which comes into contact with the touch panel of the device which is relevant to the twenty-second embodiment.

Figure 178:
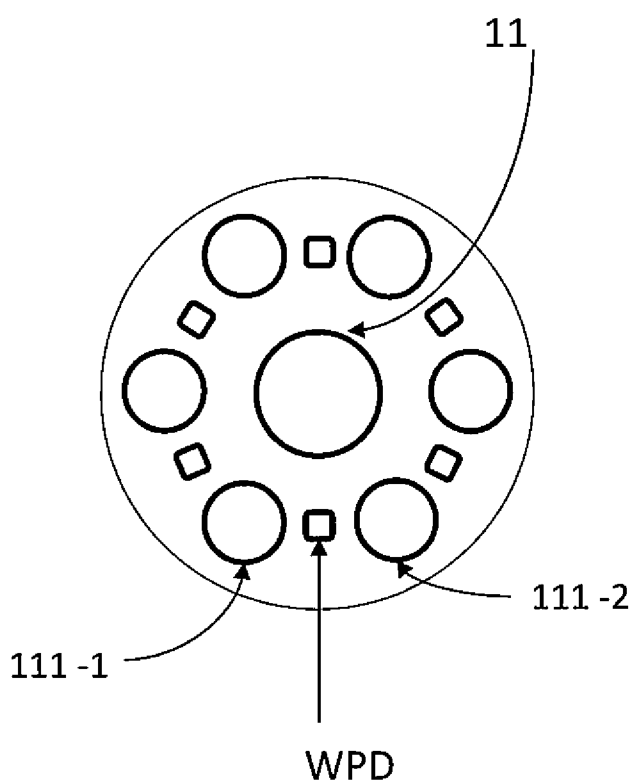

FIG. 178 is a modification example of the configuration of the back side which comes into contact with the touch panel of the device which is relevant to the twenty-second embodiment.

Figure 179:
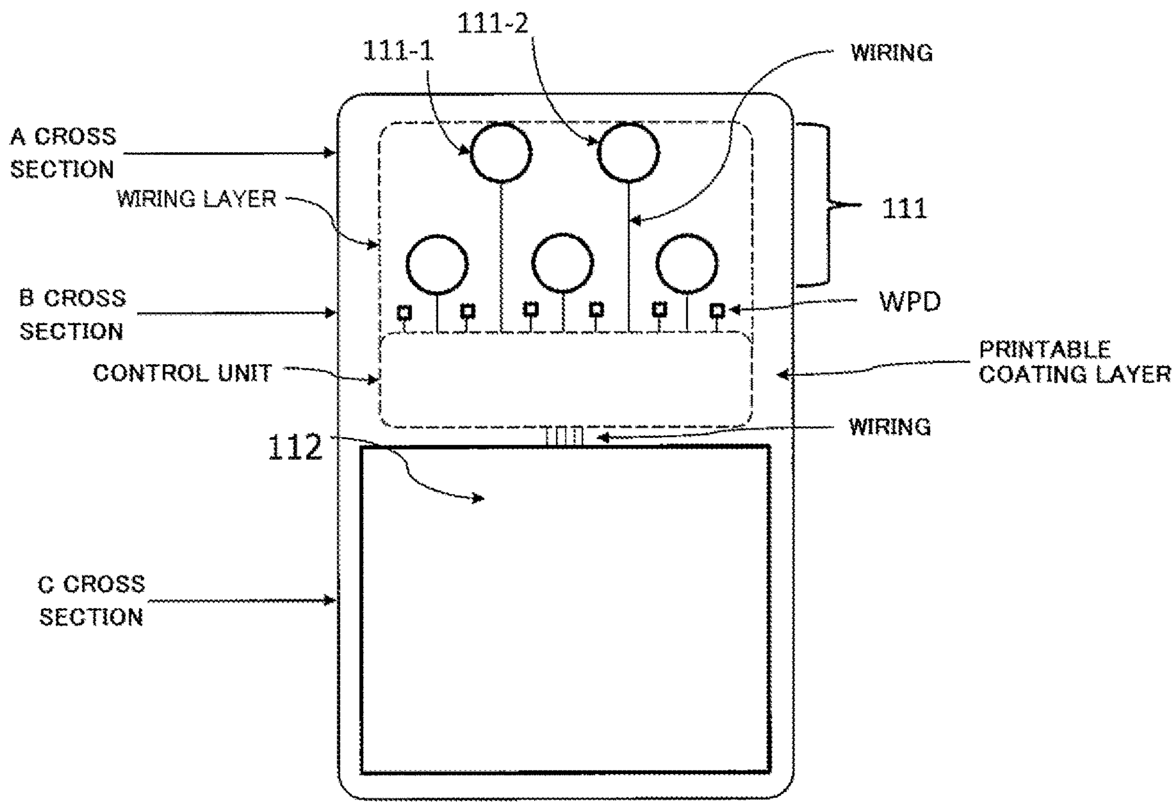

FIG. 179 exemplifies the appearance of the back side of an apparatus which comes into contact with the touch panel of an information device which is relevant to the twenty-third embodiment.

Figure 180:
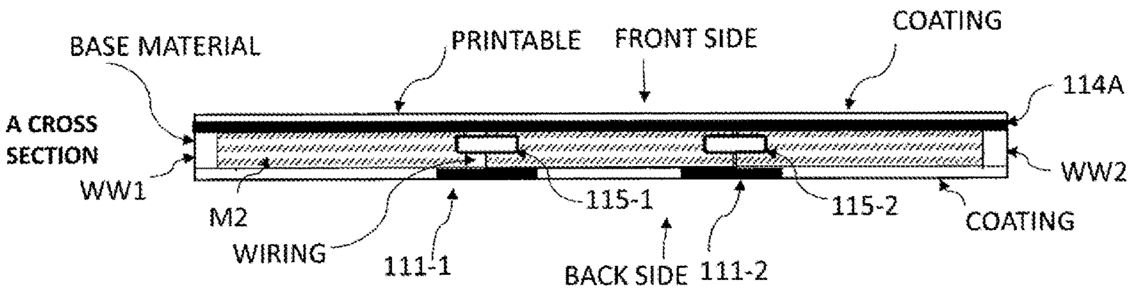

FIG. 180 is a sectional view of section A of the apparatus.

Figure 181:
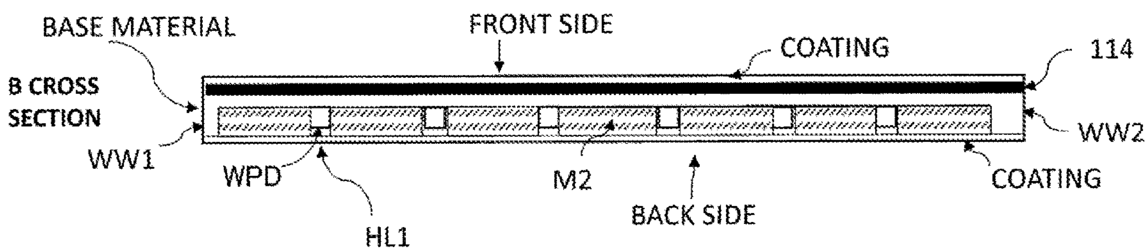

FIG. 181 is a sectional view of section B of the apparatus.

Figure 182:
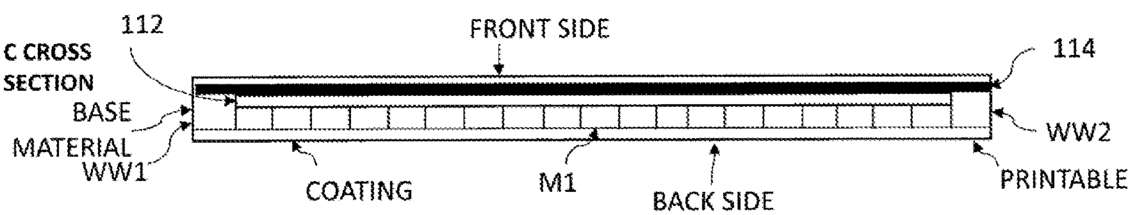

FIG. 182 is a sectional view of section C of the apparatus.

Figure 183:
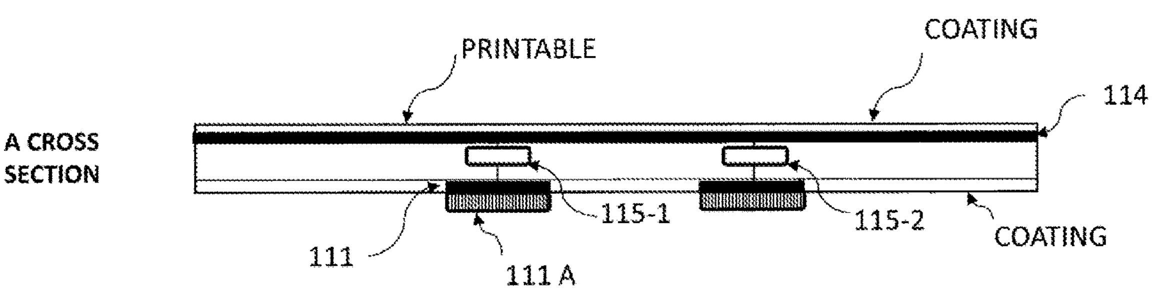

FIG. 183 is a modification example of section A of the apparatus.

Figure 184:
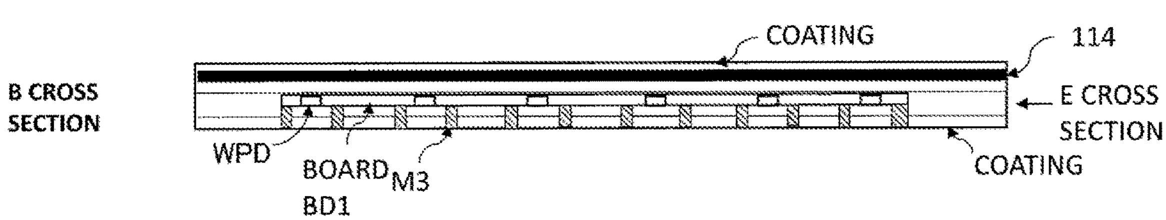

FIG. 184 is a modification example of section B of the apparatus.

Figure 185:
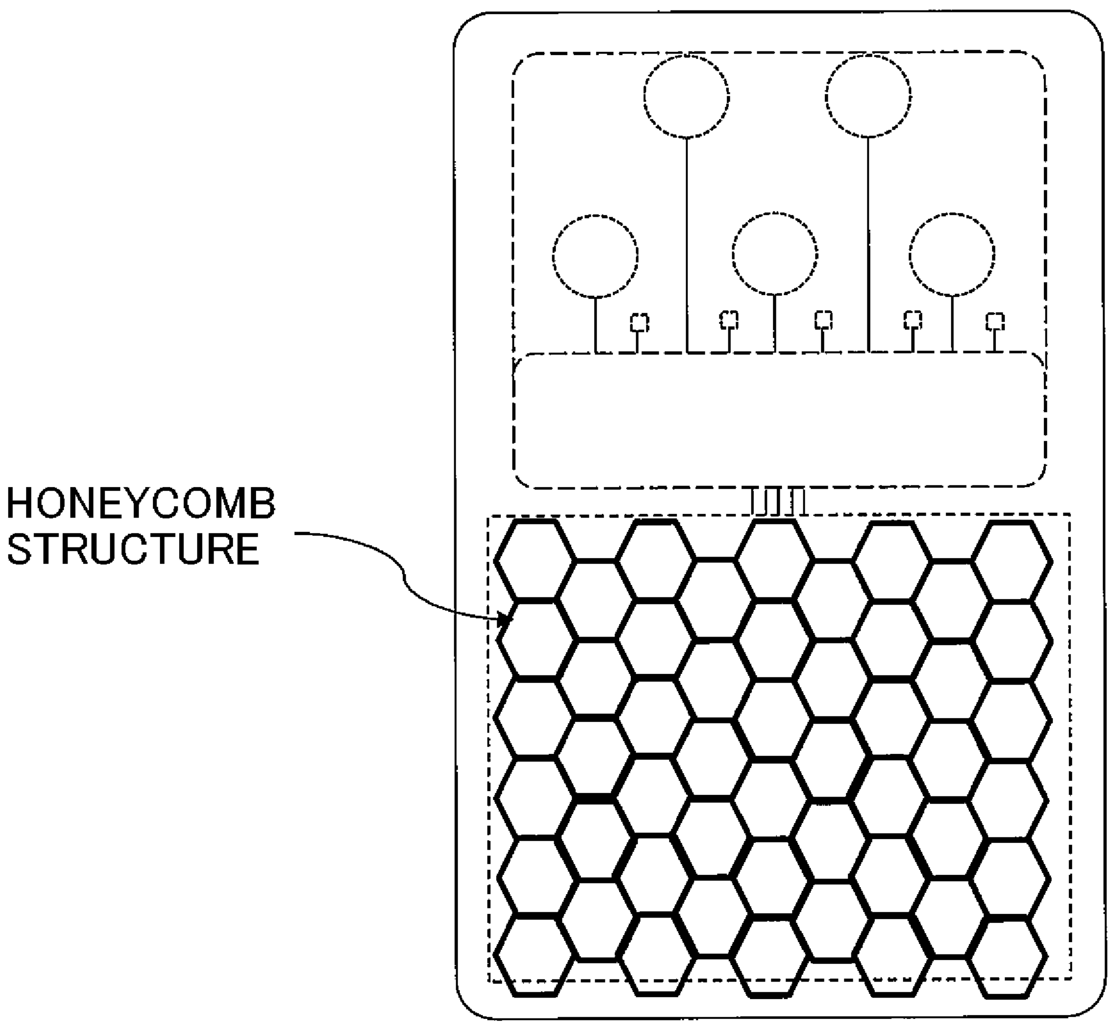

FIG. 185 is a view exemplifying a case where the section is hexagonal in structure, referred to as honeycomb structure.

Figure 186A:
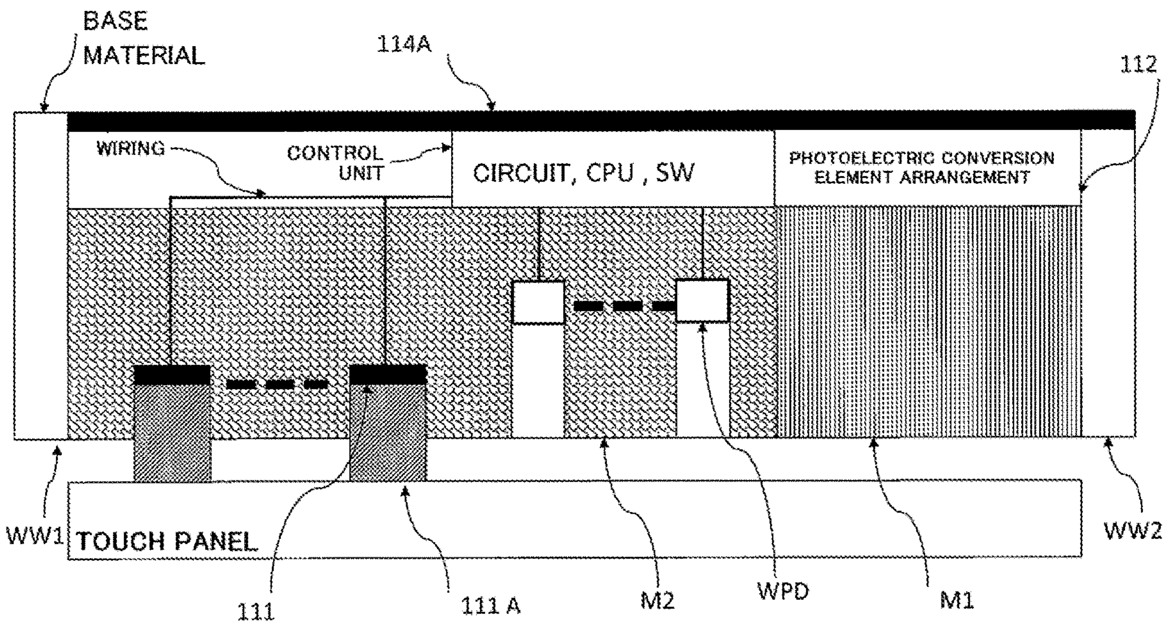

FIG. 186A is a modification example of the apparatus which is relevant to the twenty-third embodiment.

Figure 186B:
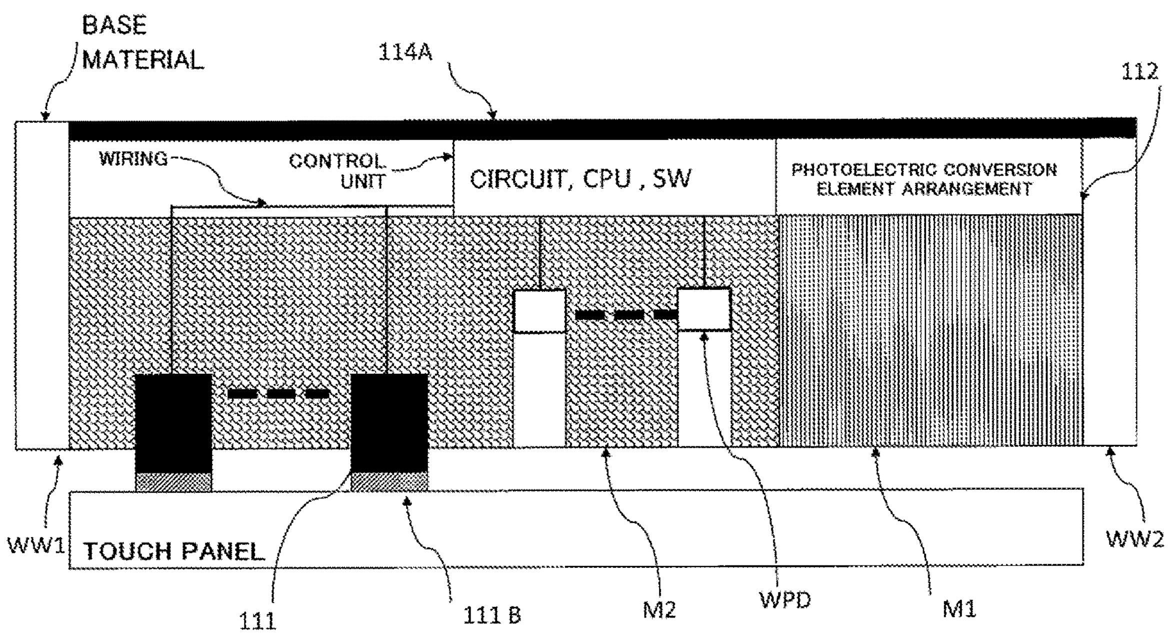

FIG. 186B is a modification example of the apparatus which is relevant to the twenty-third embodiment.

Figures 187, 188:
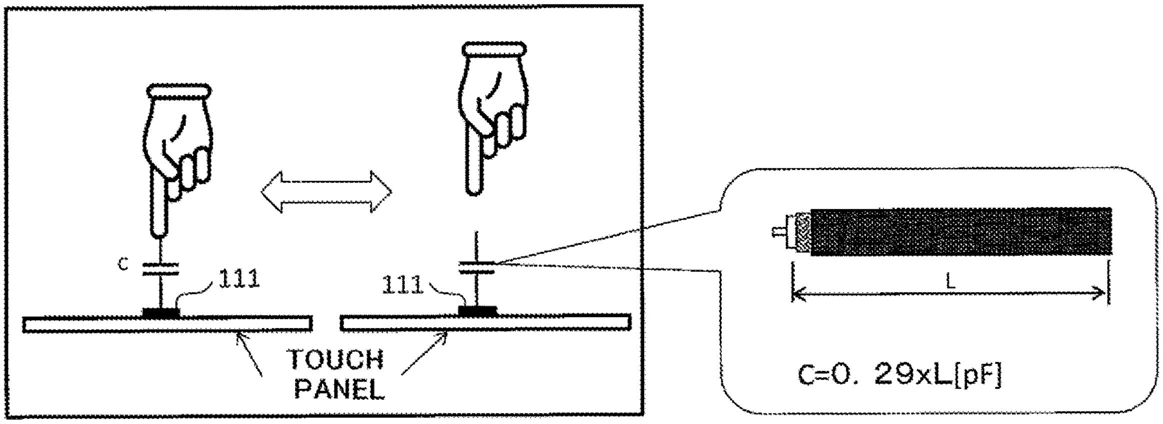

FIG. 187 is a diagram exemplifying the configuration of the experimental jig and the experimental procedure.

FIG. 188 is the experimental result when the element diameter is 7 mm.

FIG. 189 is the experimental result when the element diameter is 7.5 mm.

FIG. 190 is the experimental result when the element diameter is 7.5 mm.

FIG. 191 is a diagram exemplifying the configuration of an experimental jig and experimental procedure for determining the limit value of ON resistance of SW.

FIG. 192 is an experimental result on the limit value of the ON resistance of SW.

Figure 193:
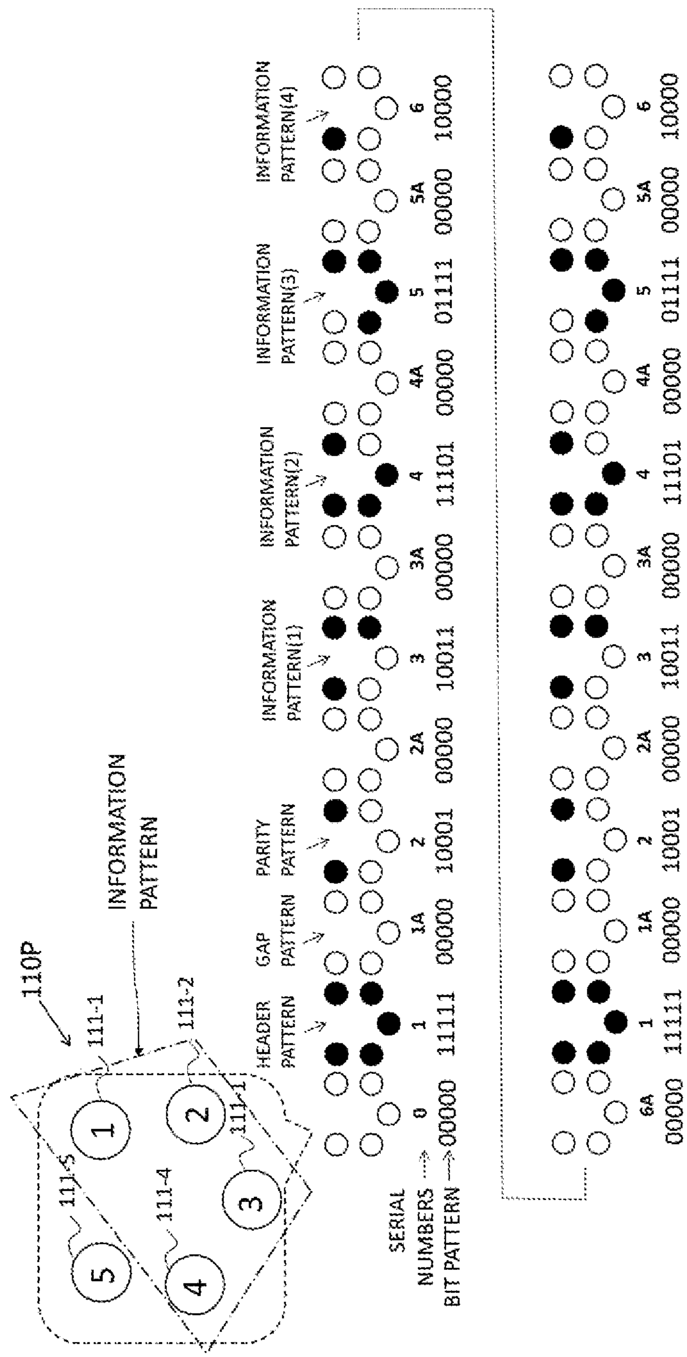
Figure 194A:
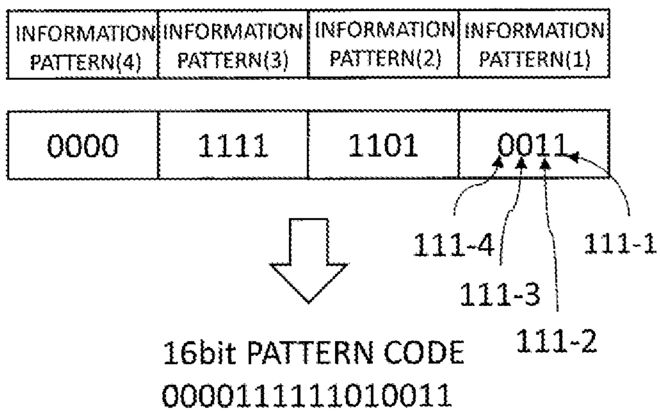

FIG. 193 is a diagram exemplifying the configuration of an element on the back side where an apparatus comes into contact with the touch panel, and a pattern code output from the element;

FIG. 194A is a diagram exemplifying a configuration of information defined by a combination of patterns.

Figure 194B:
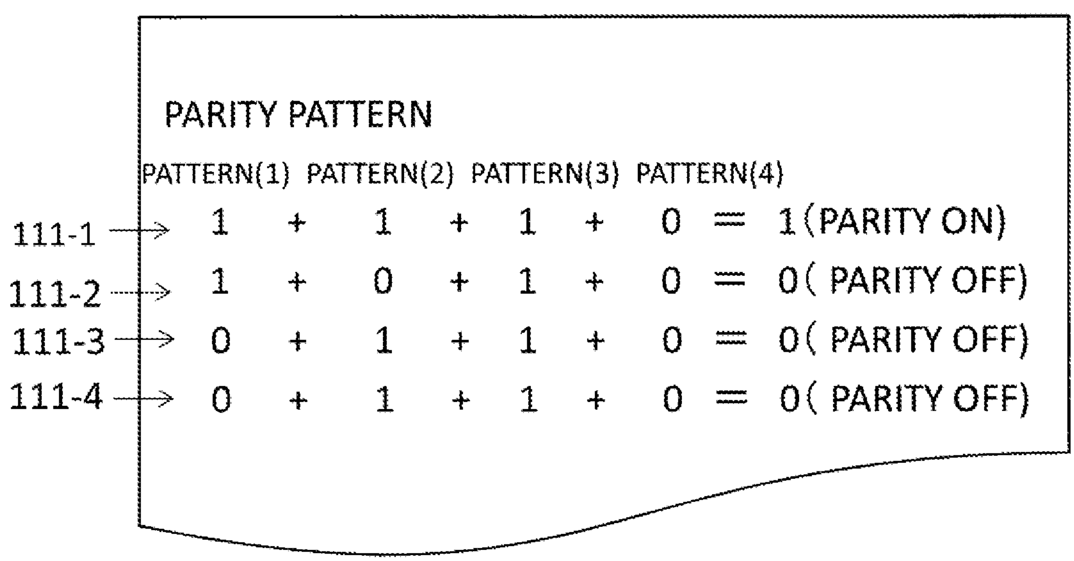

FIG. 194B is a diagram exemplifying a setting of a parity pattern.

Figure 195A:
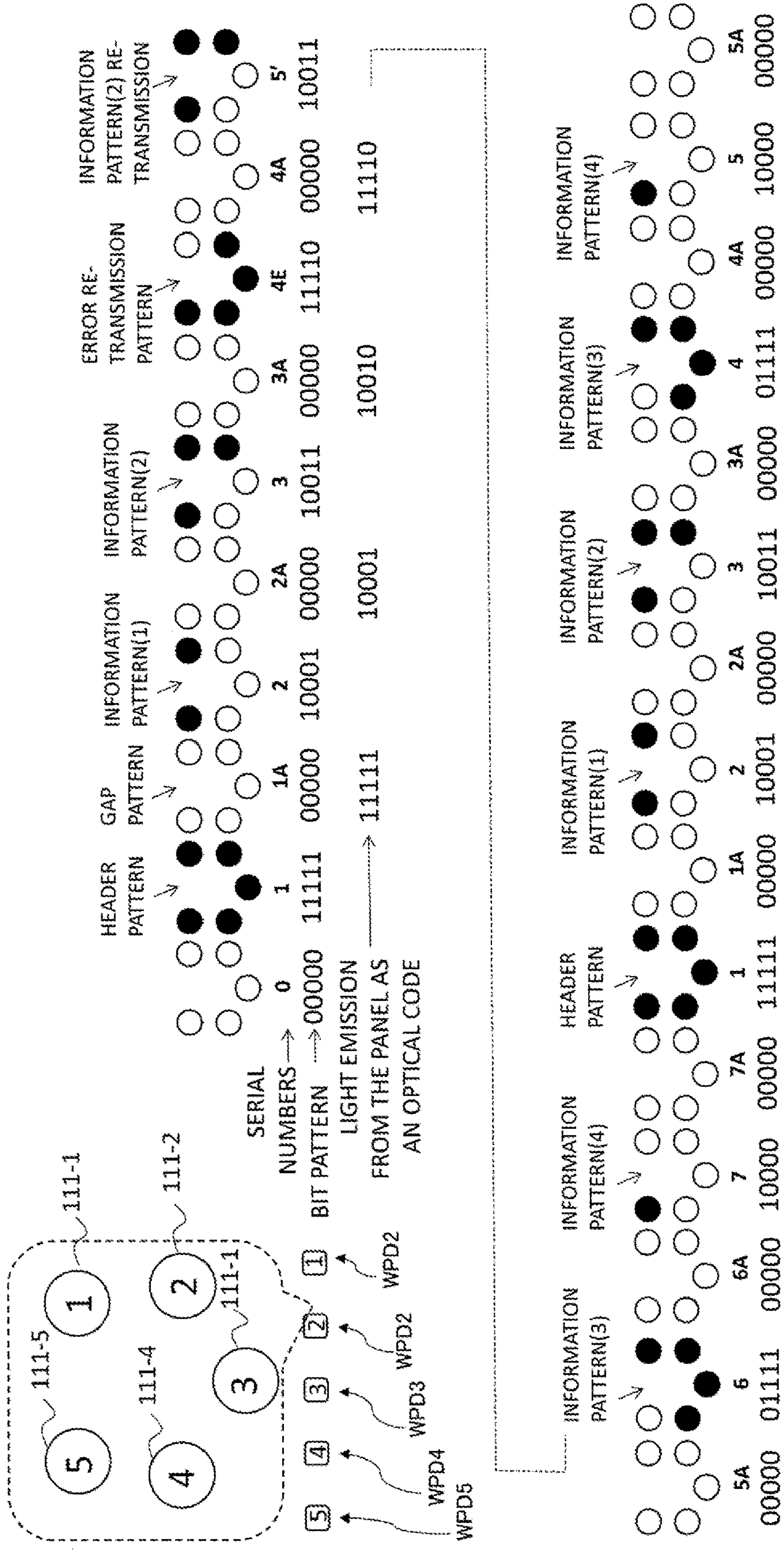

FIG. 195A is a diagram exemplifying the procedure of signal exchange in the case where there is an error in the pattern of an element output.

Figures 195B, 196:
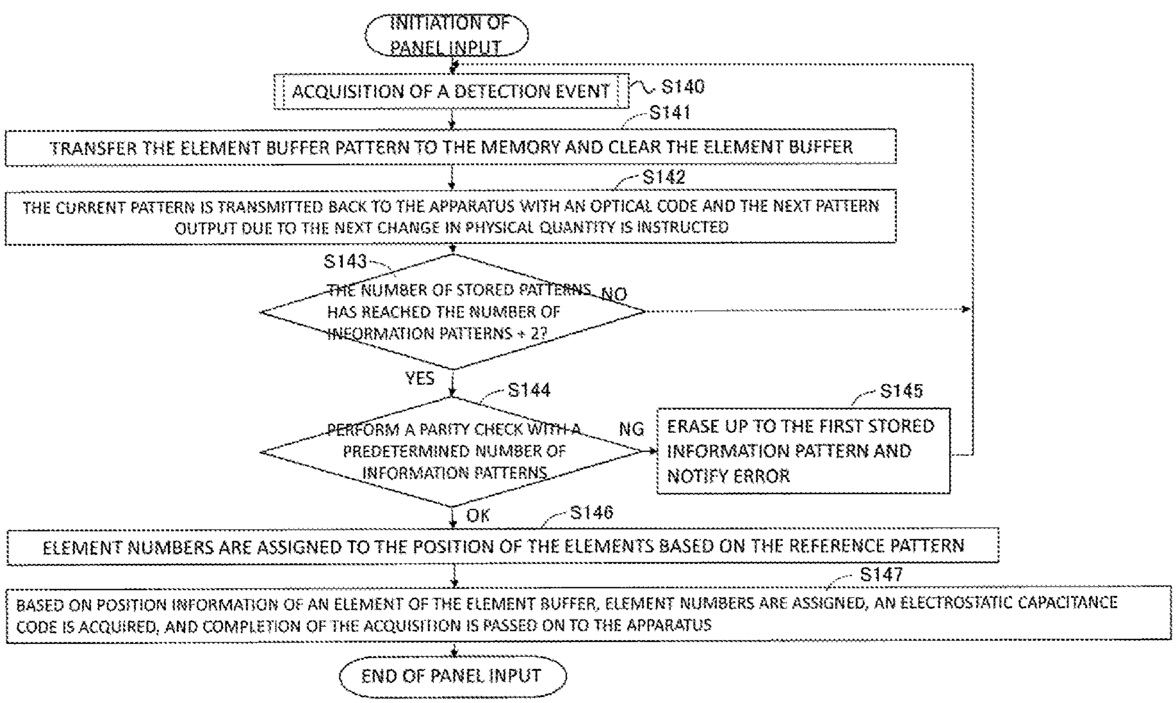

FIG. 195B is a diagram exemplifying a transmitted pattern code.

FIG. 196 is a processing example in which the information device acquires pattern code output from the apparatus.

Figure 197:
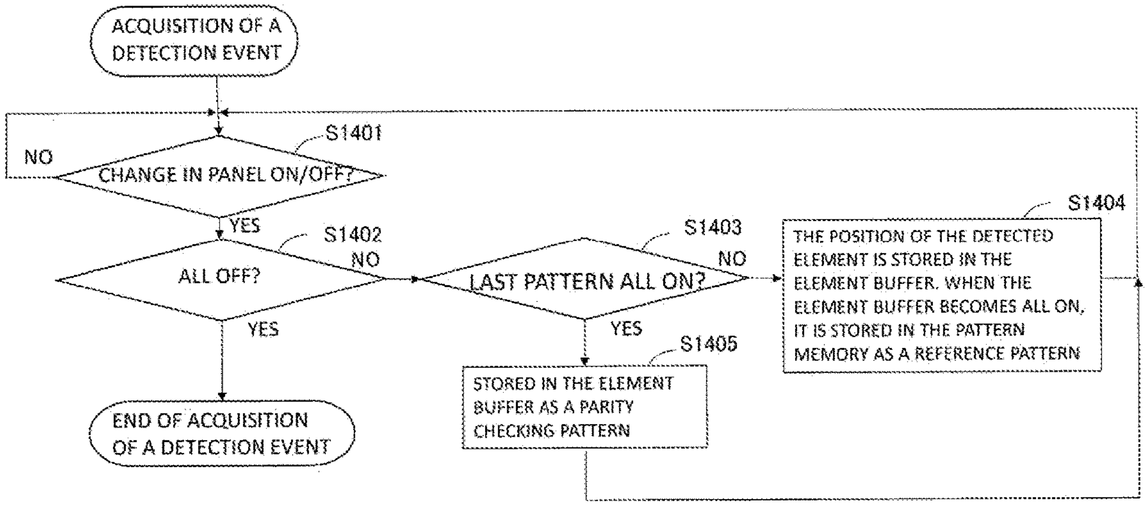

FIG. 197 is a diagram exemplifying details of a detection event acquisition process.

Figure 198:
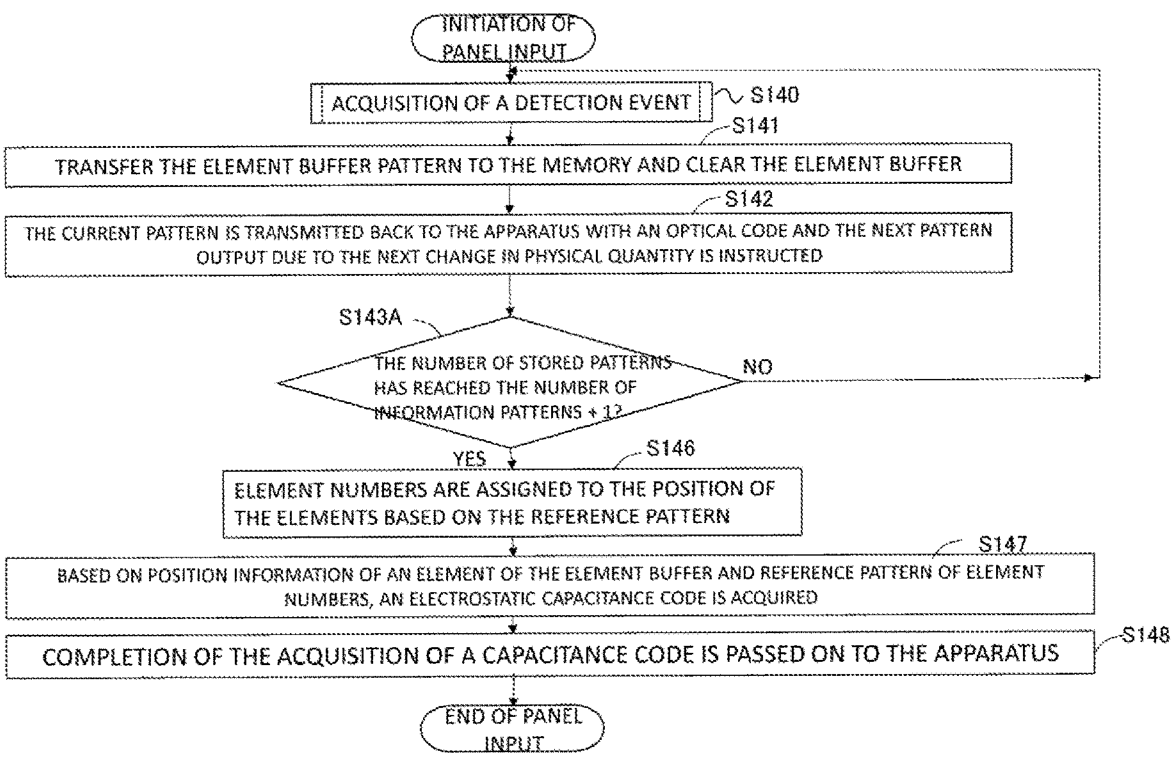

FIG. 198 is a flowchart exemplifying a panel input processing that does not perform a parity check.

Figure 199:
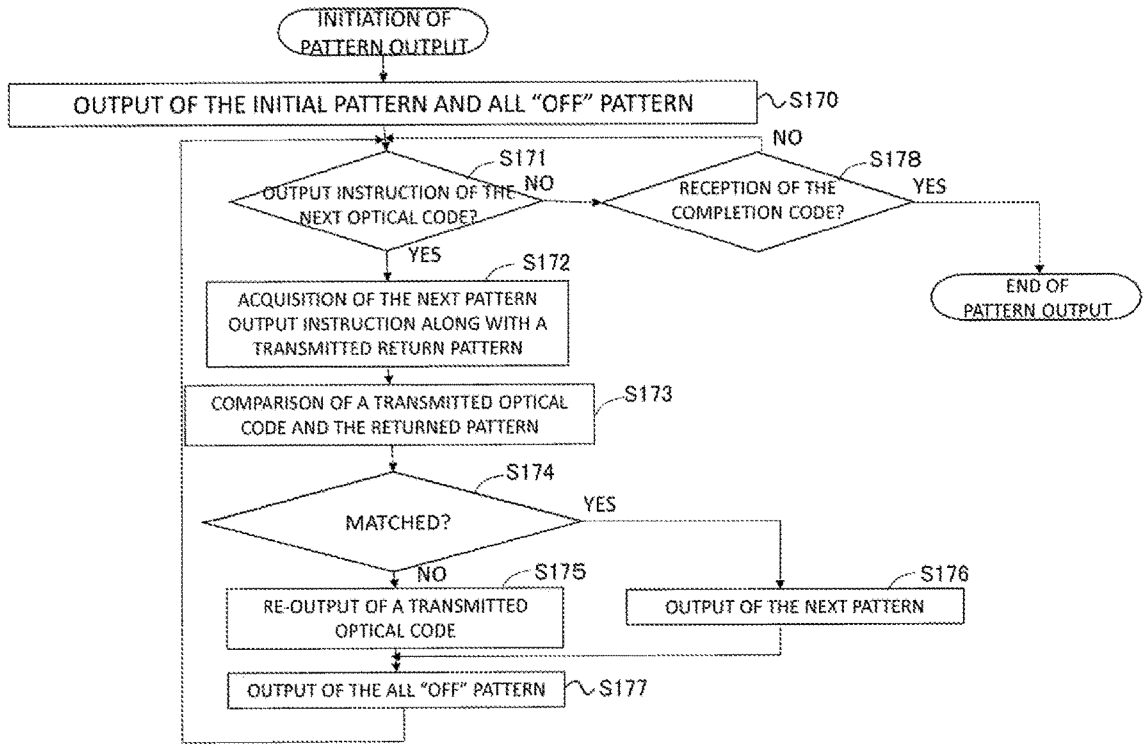

FIG. 199 is a flowchart exemplifying a pattern output processing based on a change in a physical quantity of the apparatus.

Figure 200:
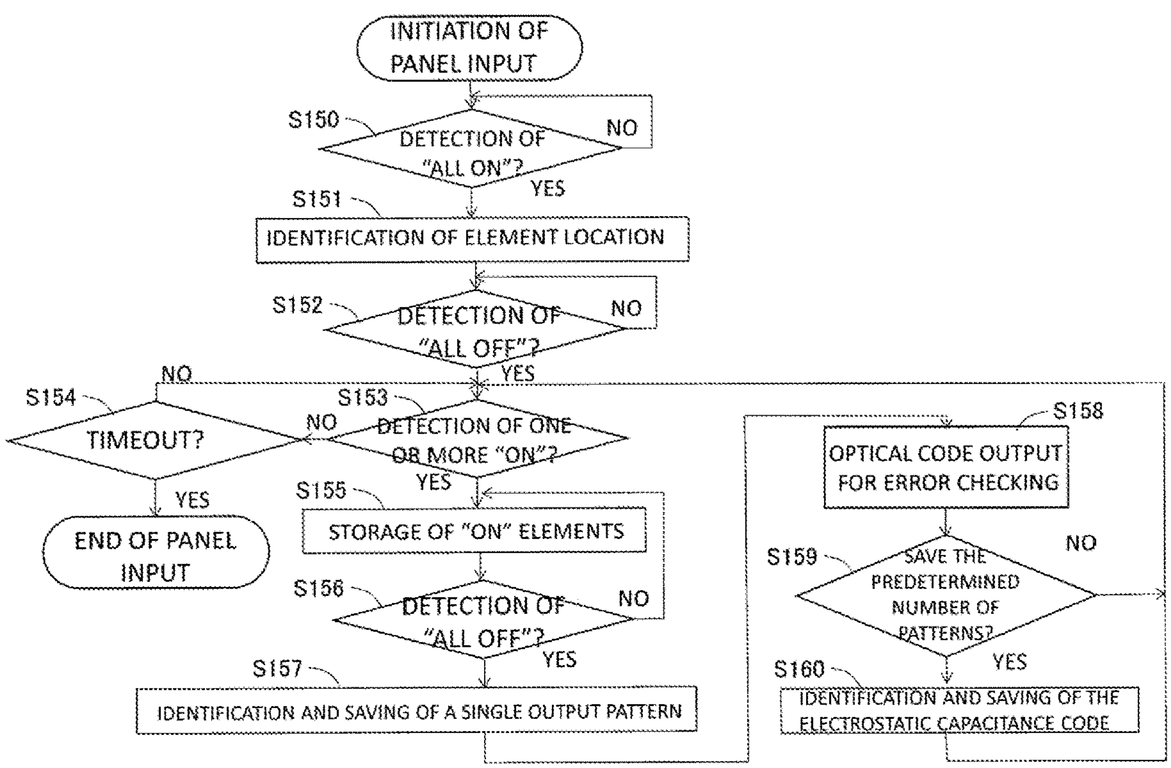

FIG. 200 is a diagram exemplifying a modification of panel input processing.

Figure 201:
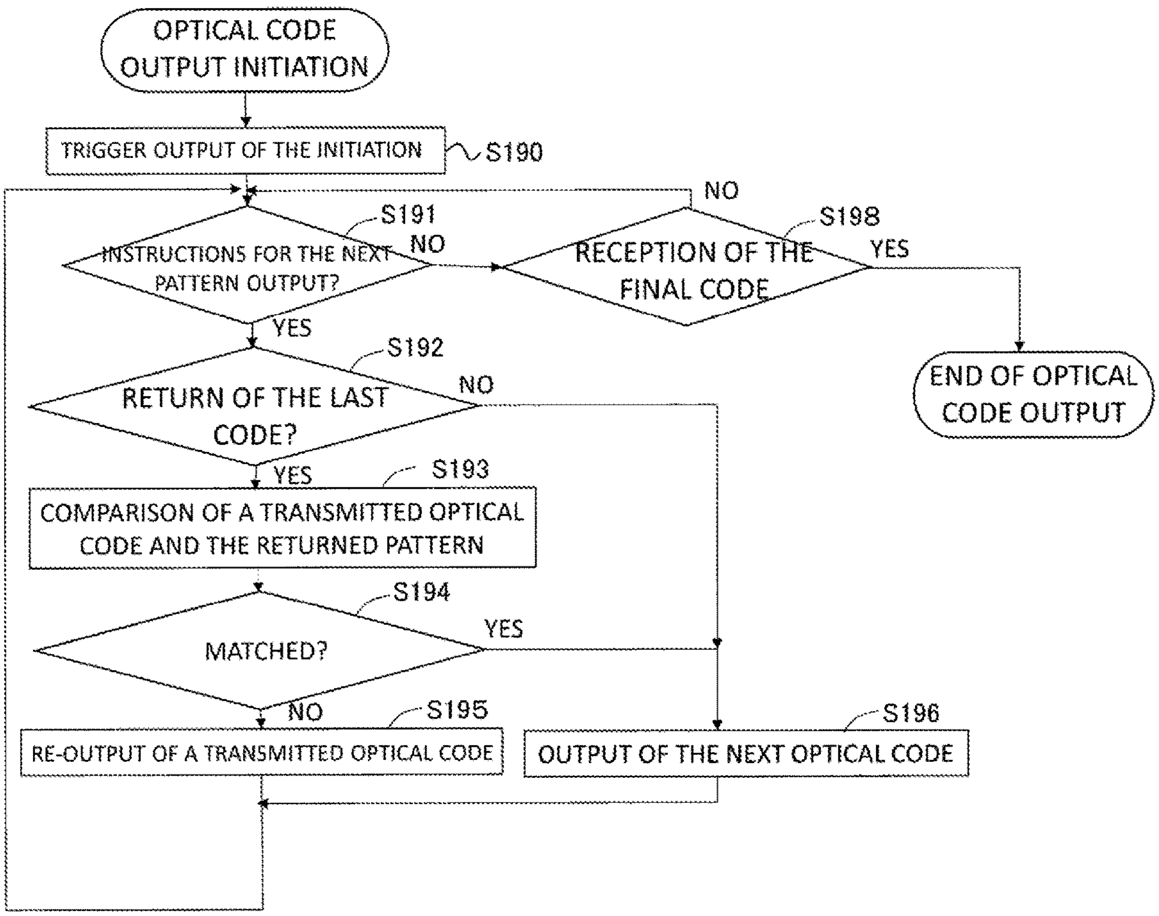

FIG. 201 is a flowchart showing a modification example of a communication processing between an information device and an apparatus.

Figure 202:
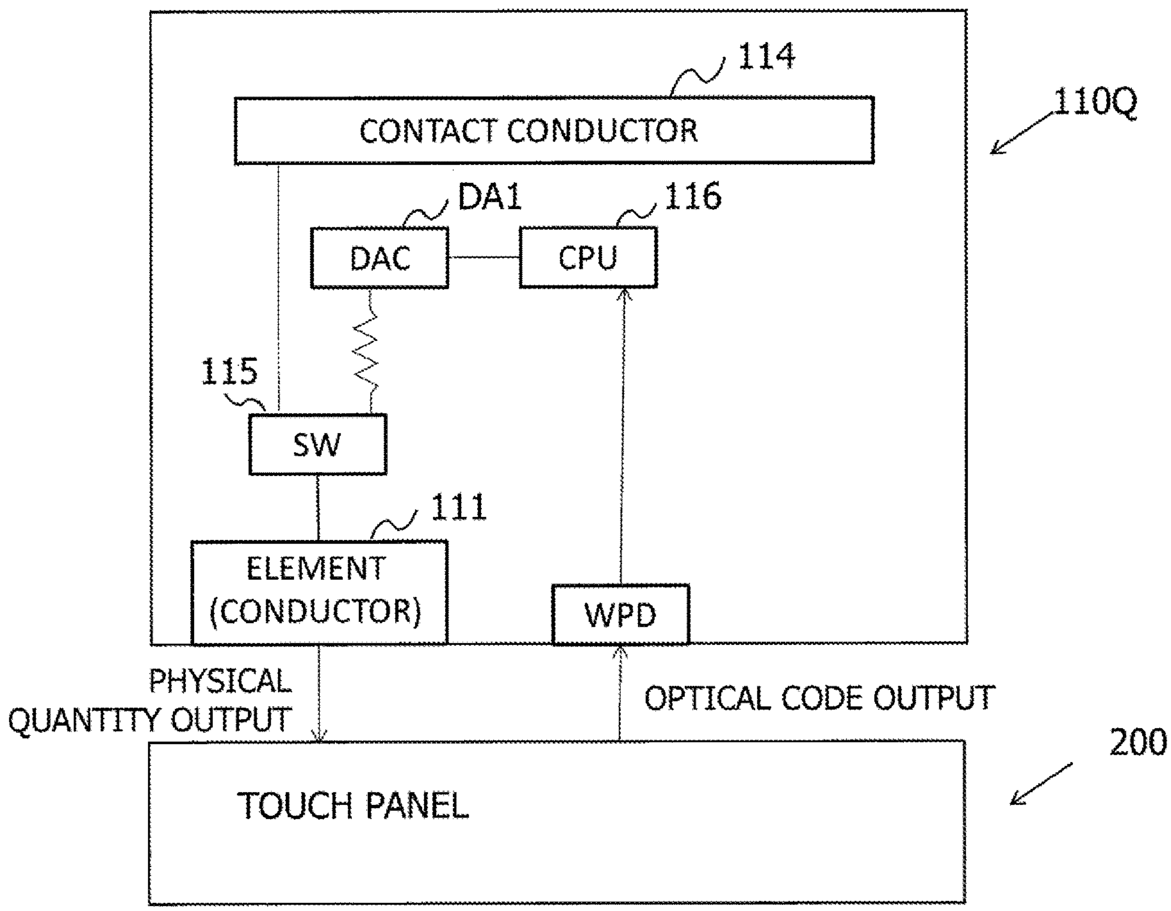

FIG. 202 is a diagram exemplifying the relationship of signal exchange between an apparatus and an information device.

Figure 203:
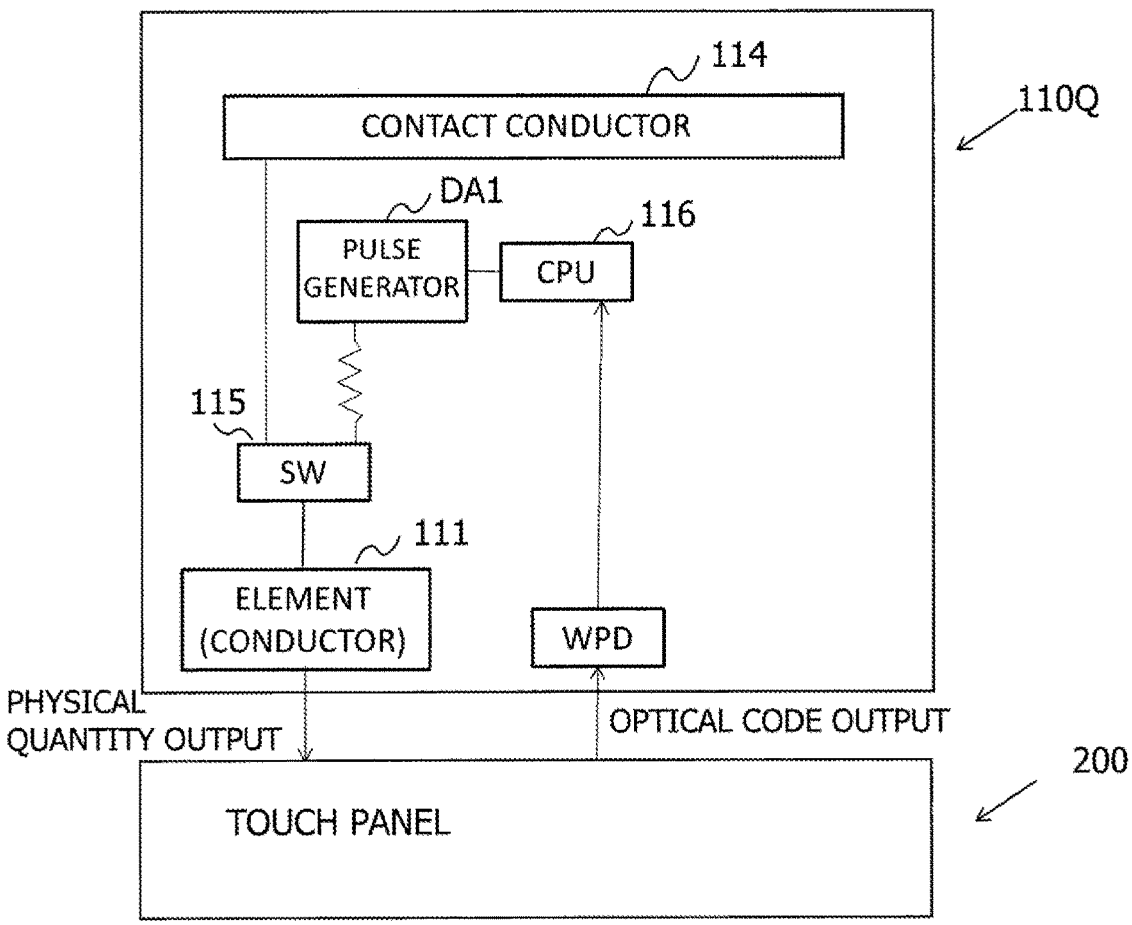

FIG. 203 is a diagram exemplifying a device modification.

Figure 204A:
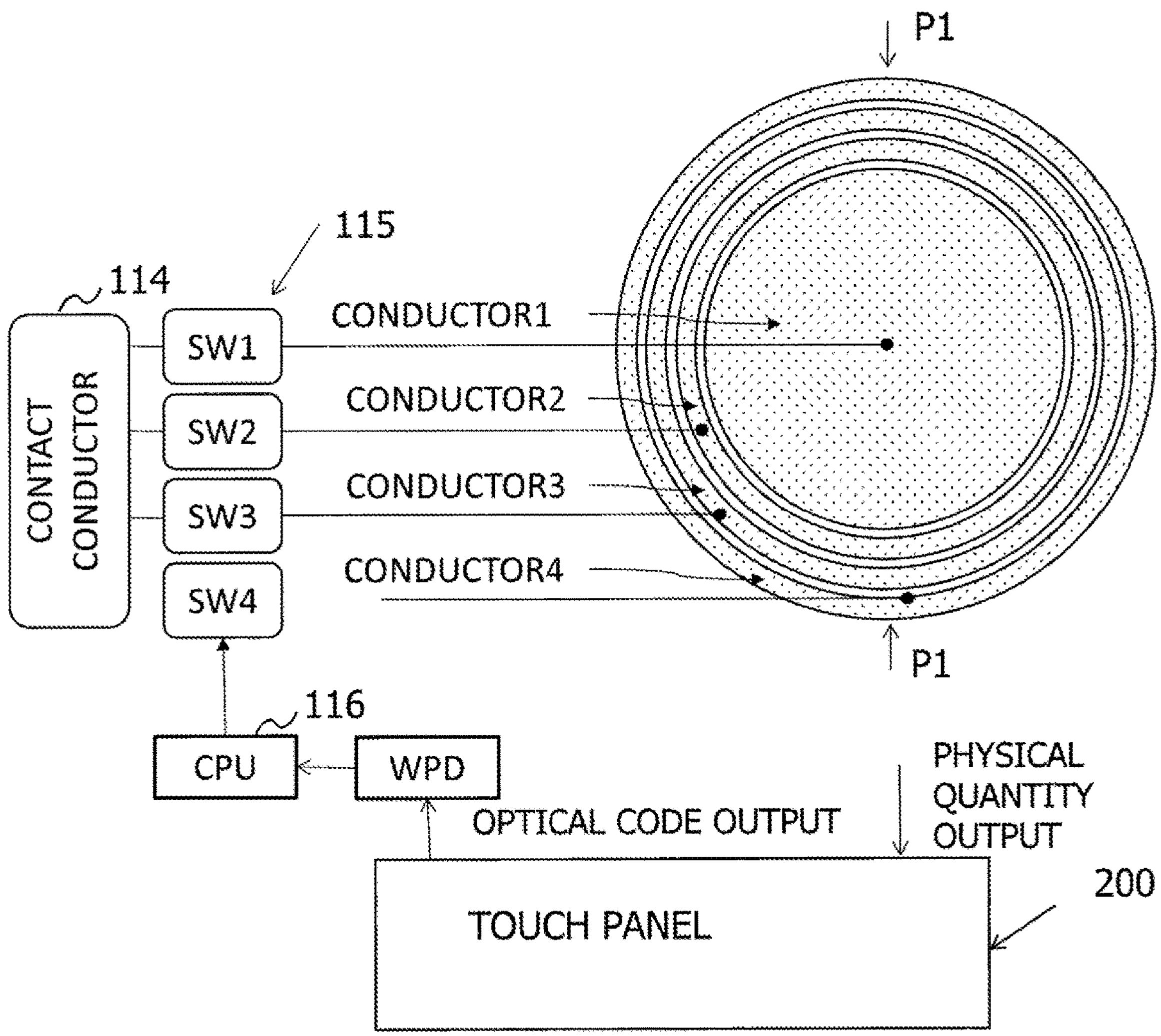

FIG. 204A is a diagram consisting of a plan view of the element 111, and a diagram showing the connection between each part in the plan view of the element 111 and a contact conductor and semiconductor switches.

Figure 204B:
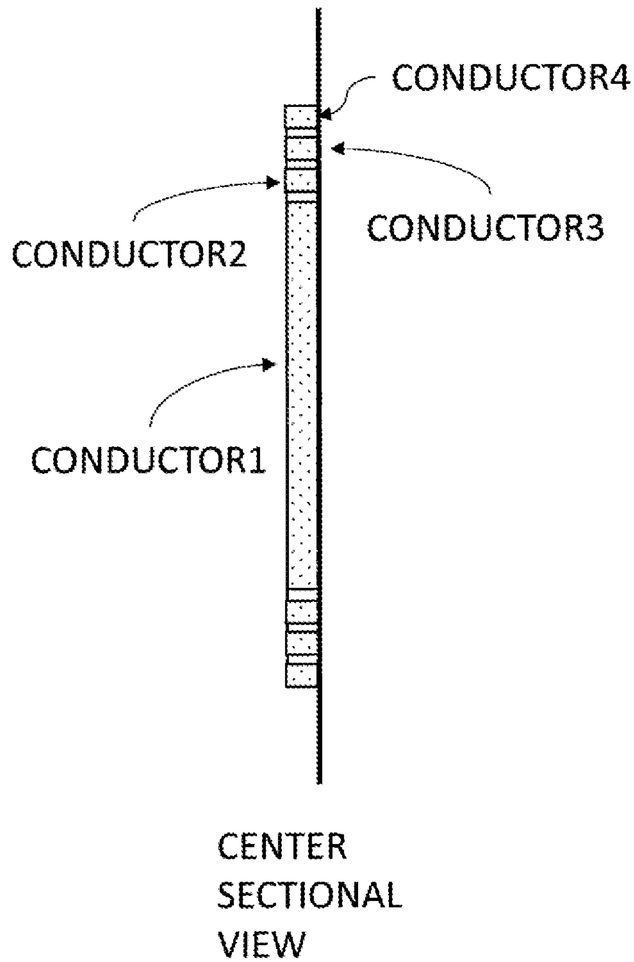

FIG. 204B is a sectional view of an element.

Figure 205:
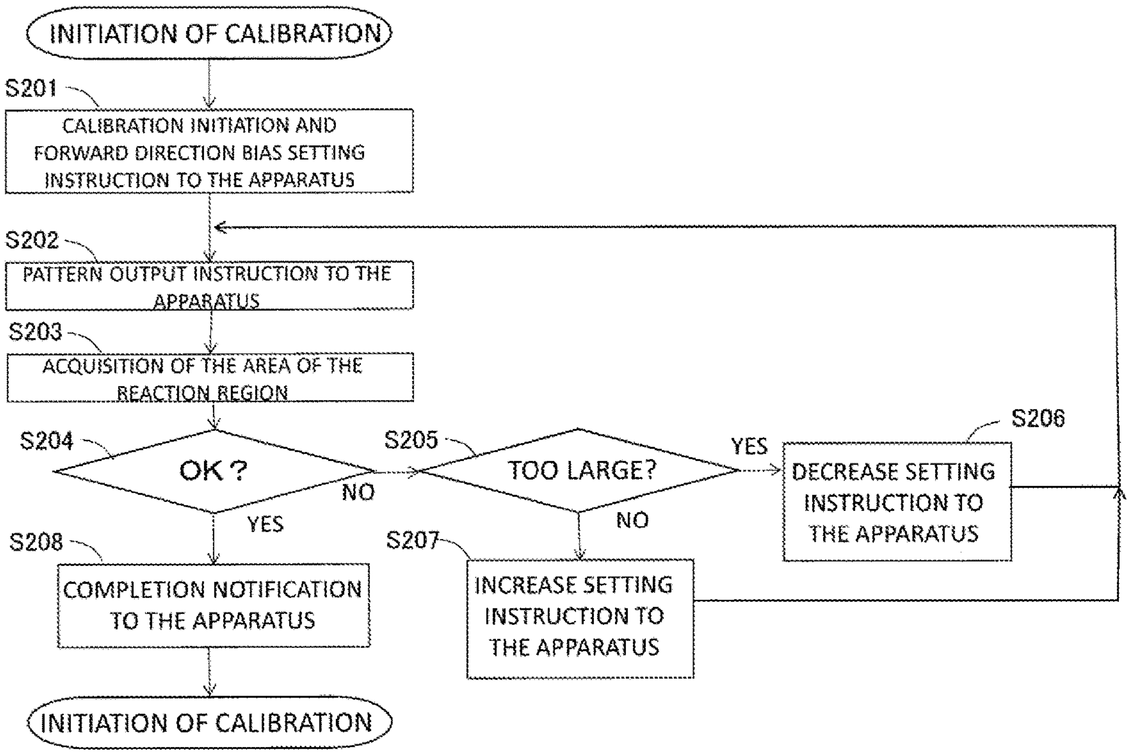

FIG. 205 is a flowchart exemplifying the processing of an information device which executes calibration.

Figure 206:
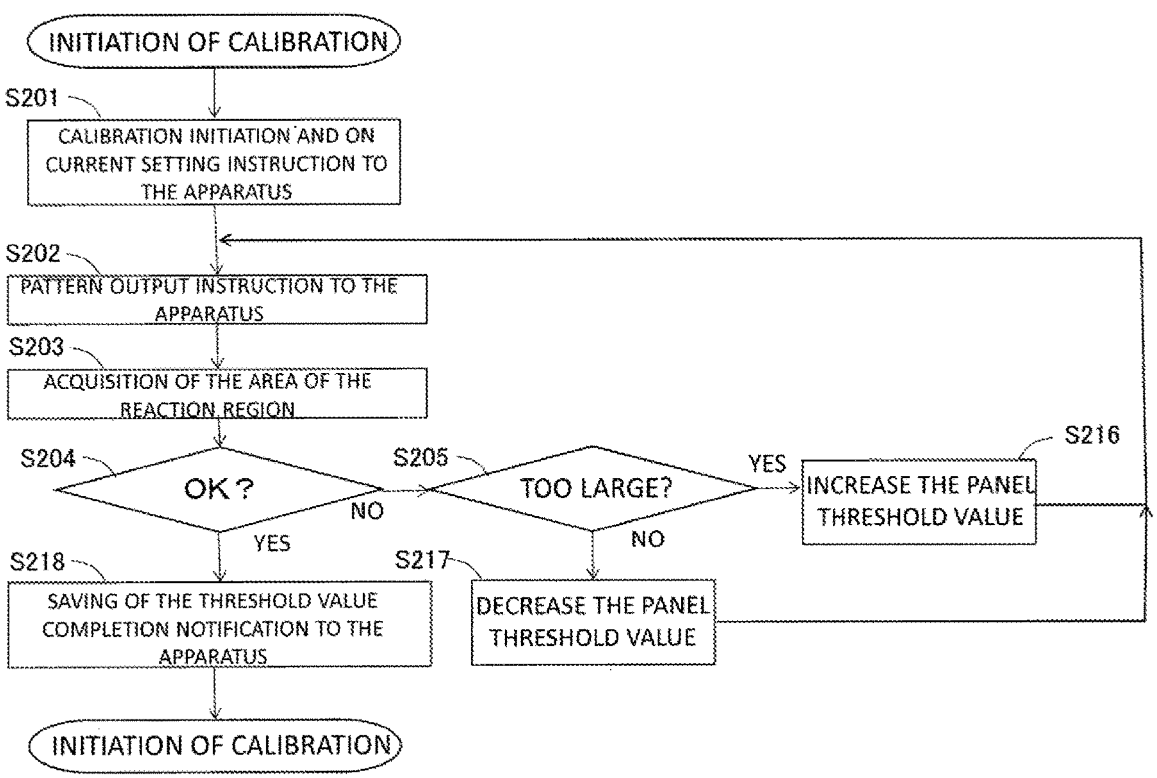

FIG. 206 is a diagram showing information device processing in accordance with a modification example.

Figure 207:
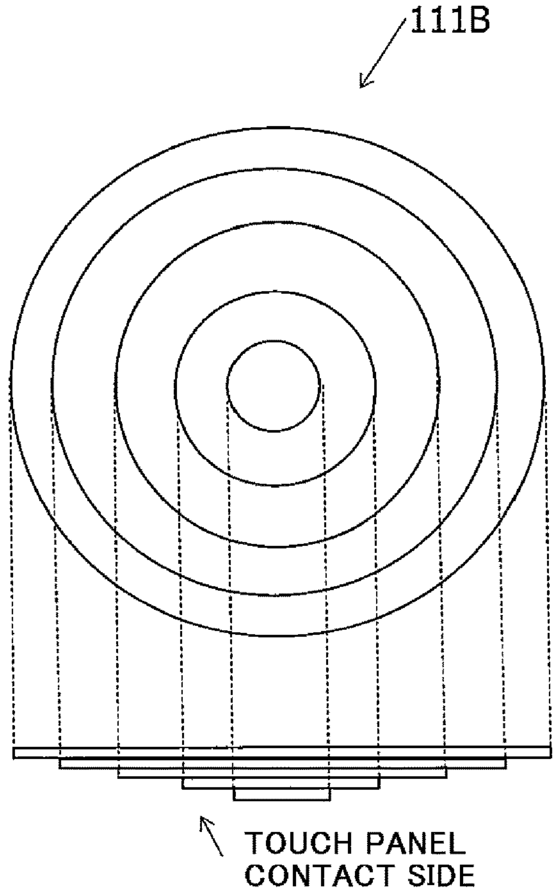

FIG. 207 is a diagram exemplifying a configuration of an element.

Figure 208:
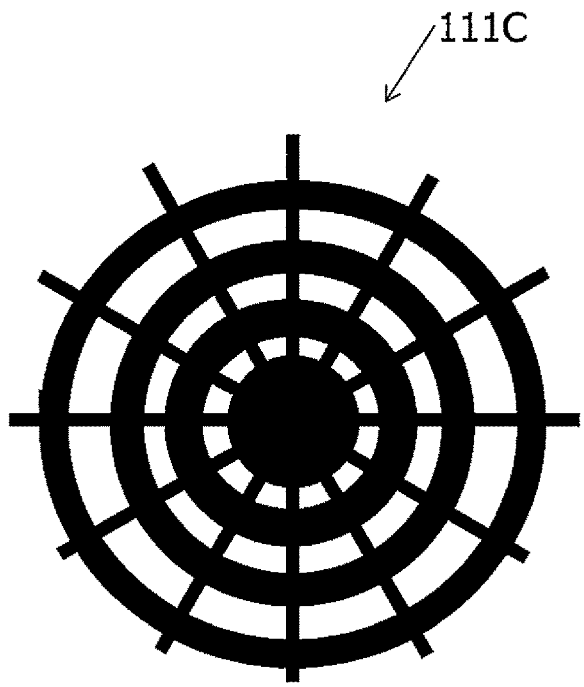

FIG. 208 is a diagram exemplifying a configuration of an element.

Figure 209:
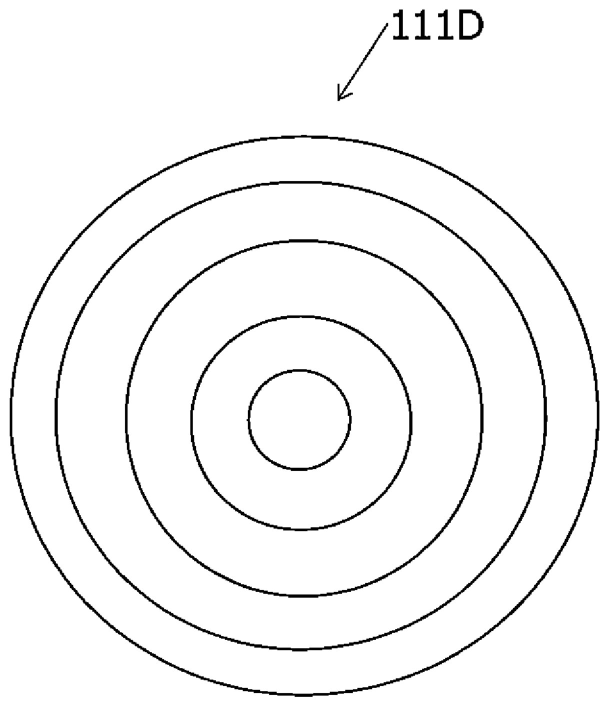

FIG. 209 is a diagram exemplifying a configuration of an element.

Figure 210:
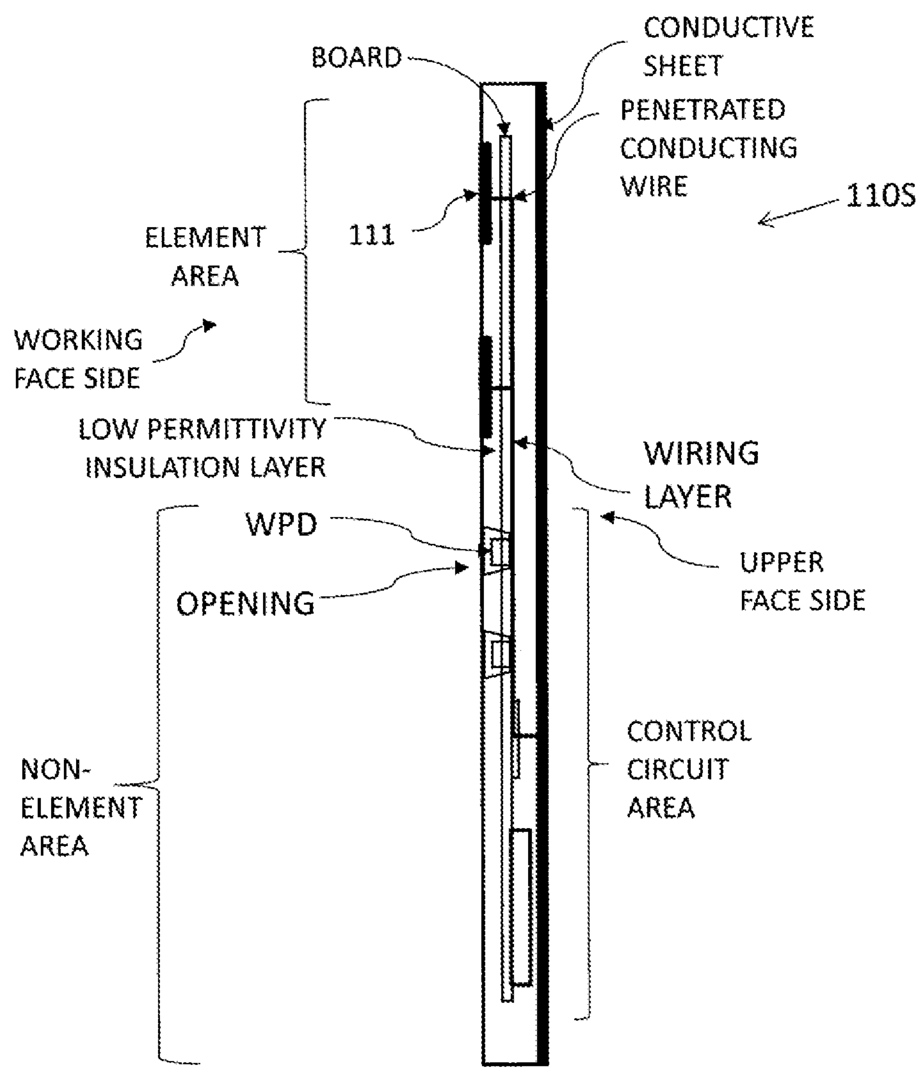

FIG. 210 is a sectional view of the device.

Figure 211:
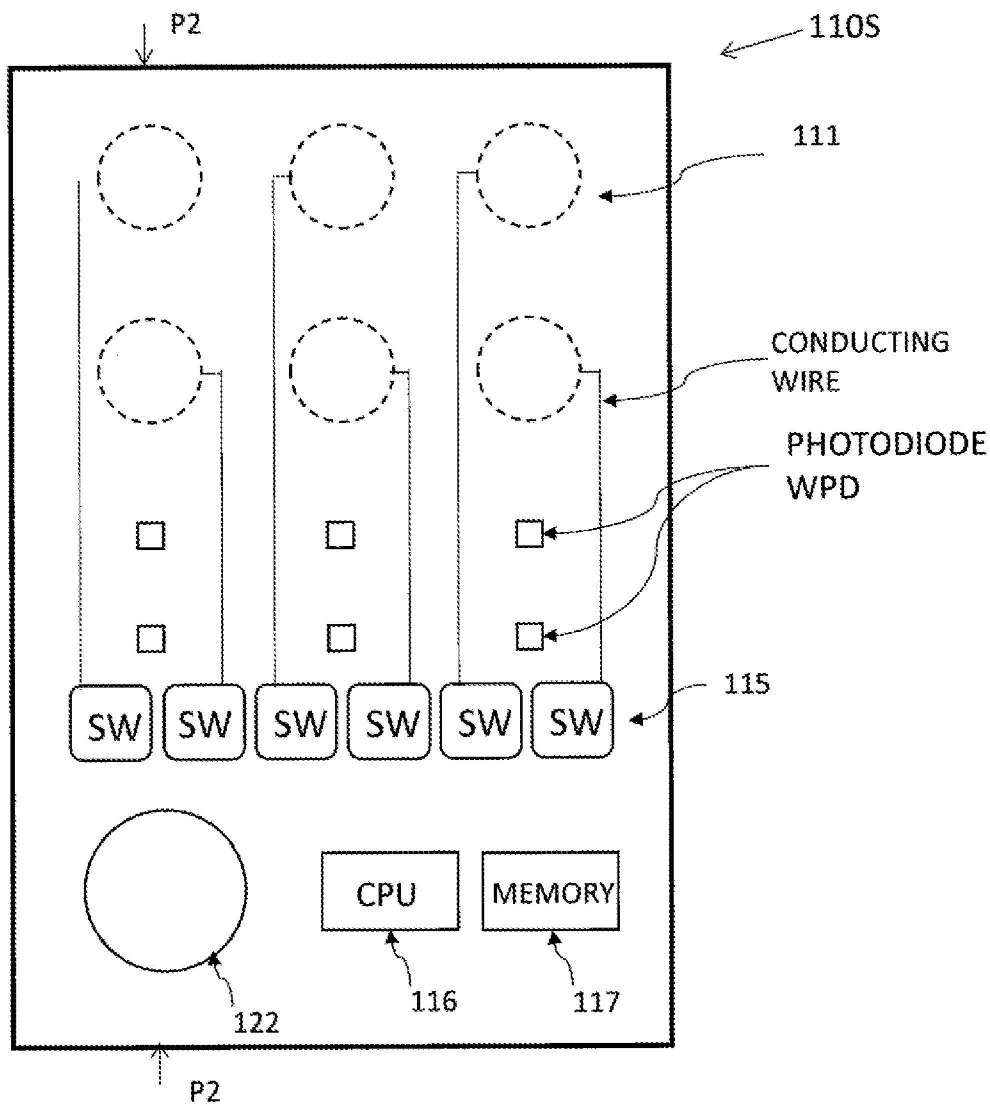

FIG. 211 is a plan view of the device.

Figure 212:
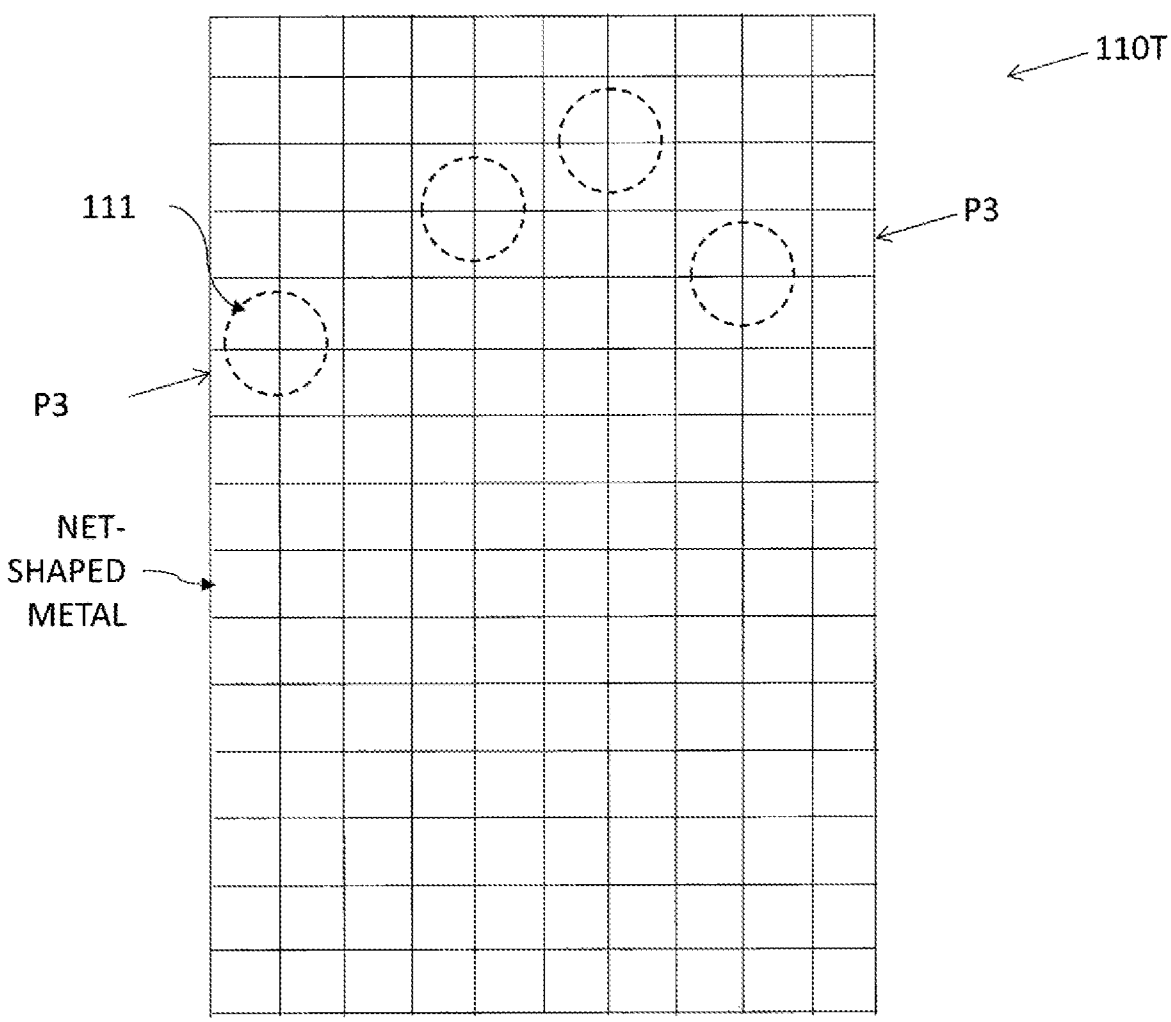

FIG. 212 is a plan view as viewed from the upper side of the device.

Figure 213:
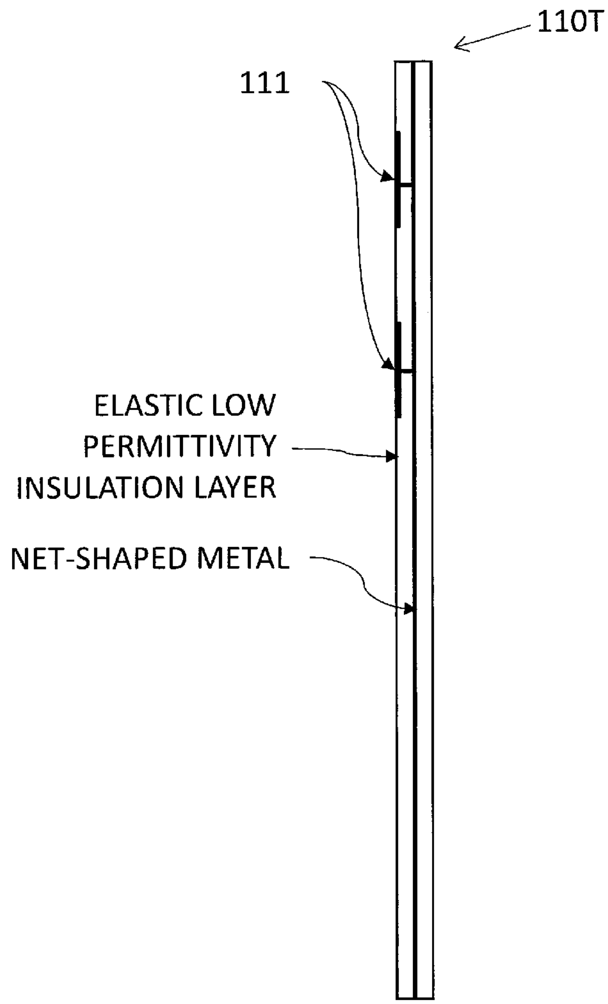

FIG. 213 is a sectional view of the device.

Figure 214:
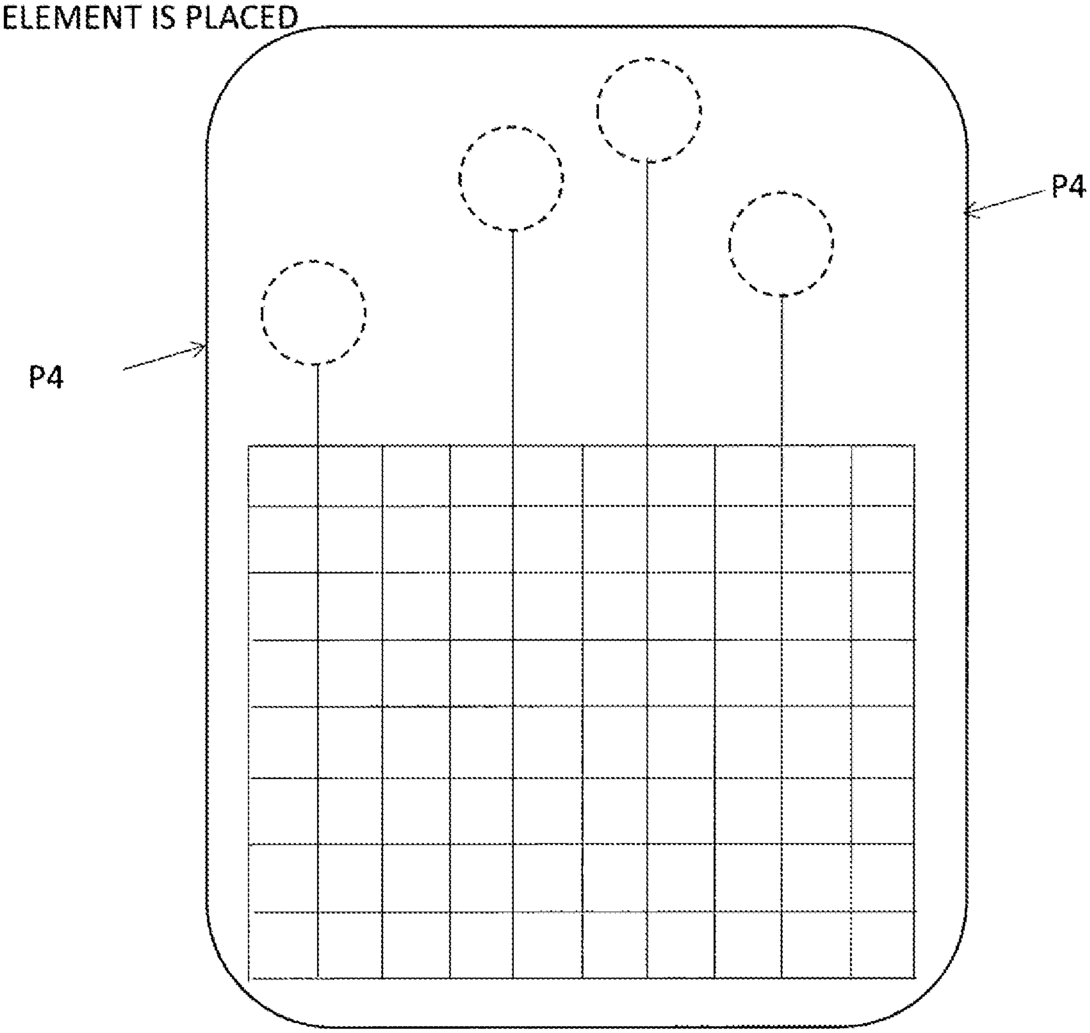

FIG. 214 is a plan view as viewed from the upper side of the device.

Figure 215:
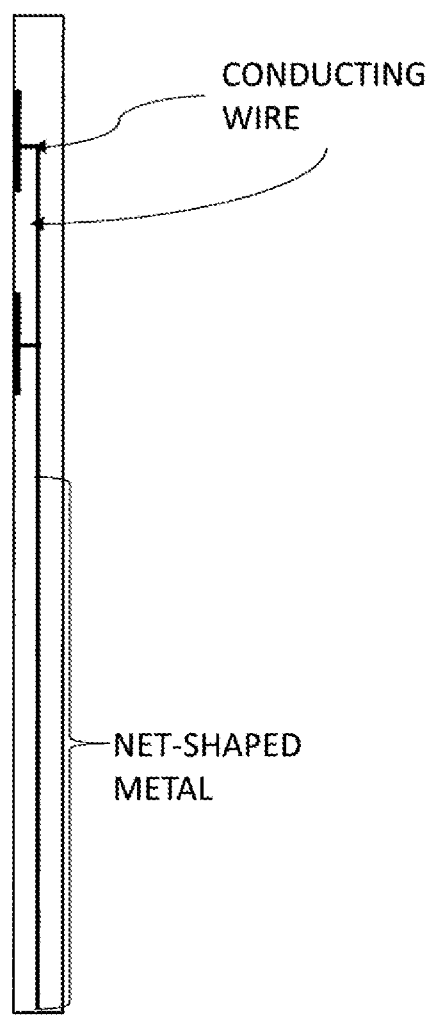

FIG. 215 is a sectional view of the device.

Figure 216:
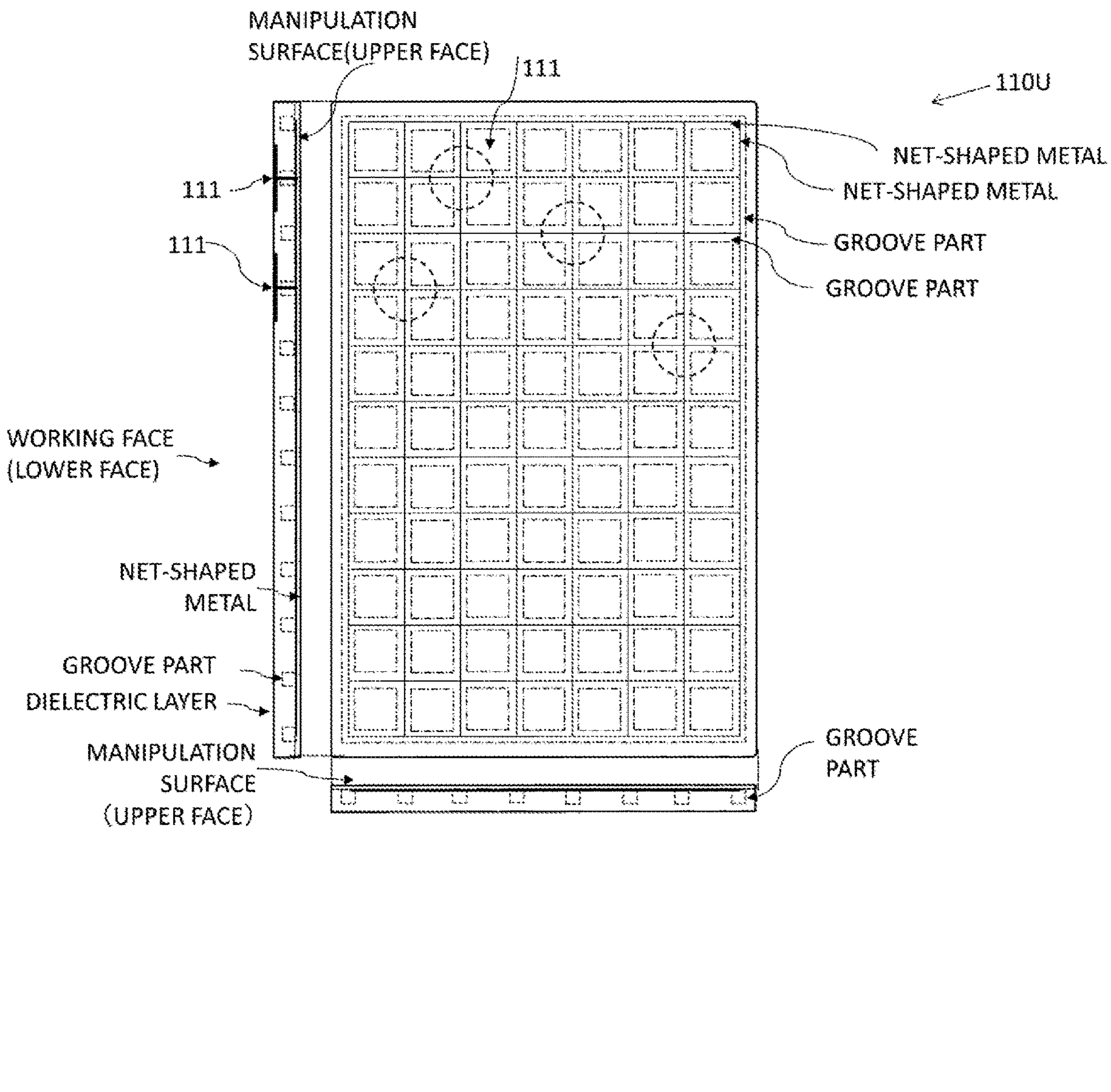

FIG. 216 is a diagram exemplifying a configuration of the device.

Figure 217:
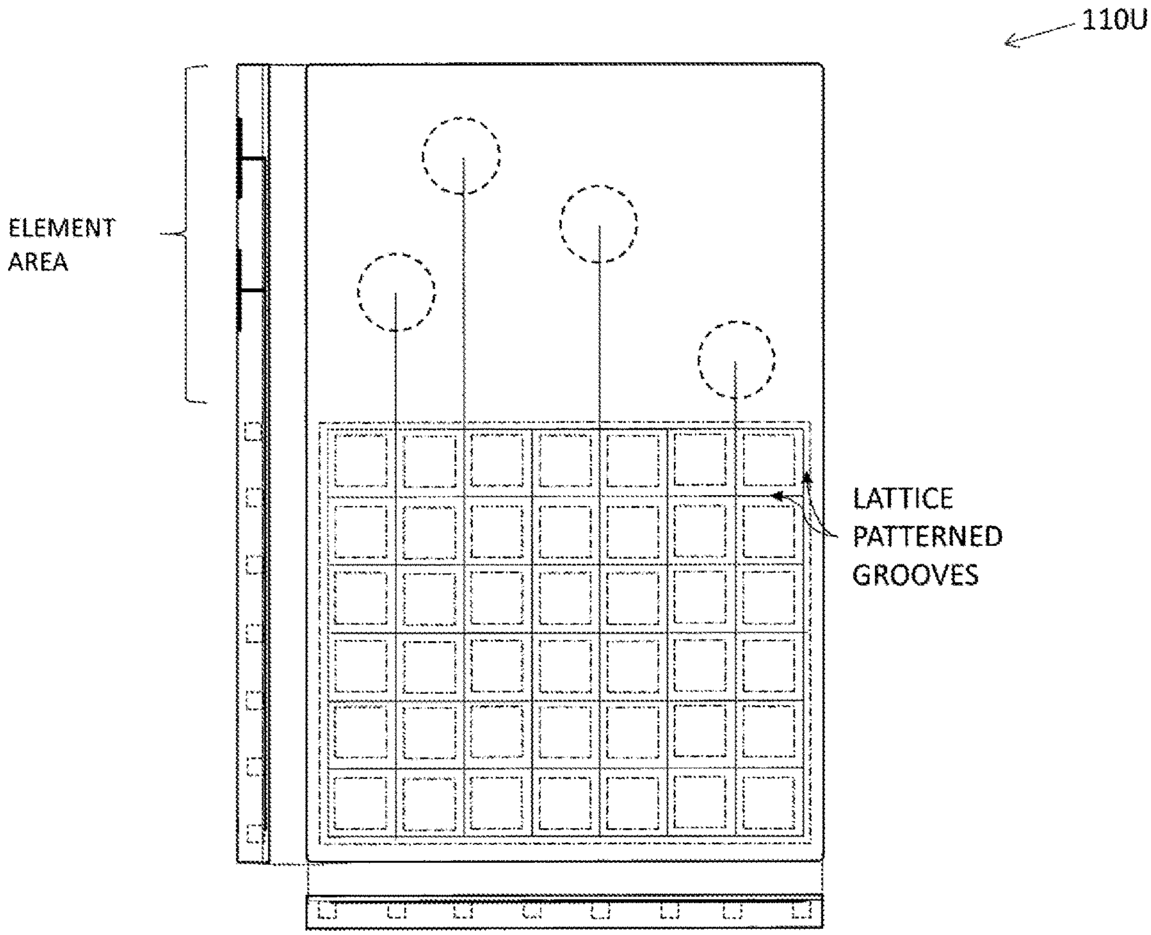

FIG. 217 is a variant of the device.

Figure 218:
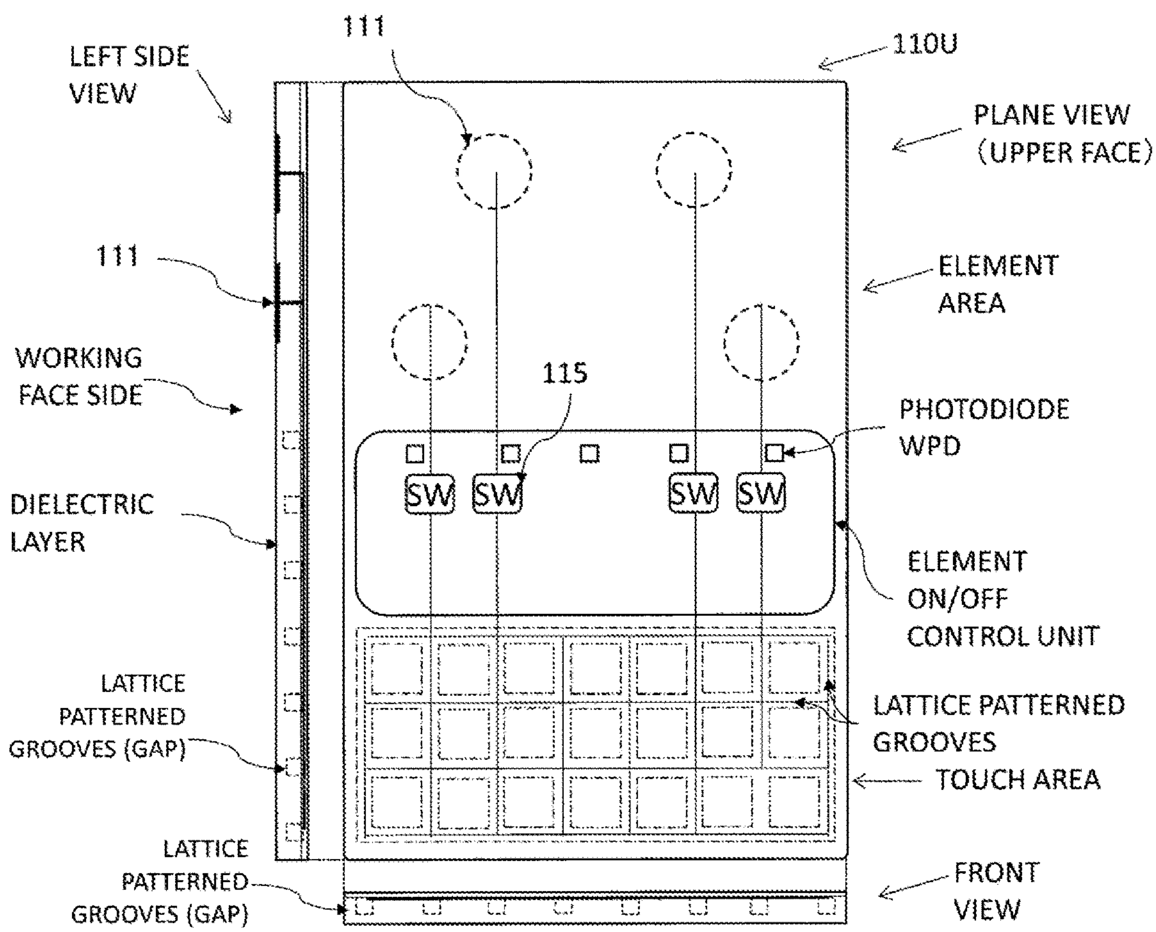

FIG. 218 is a diagram exemplifying a configuration of the device.

Figure 219:
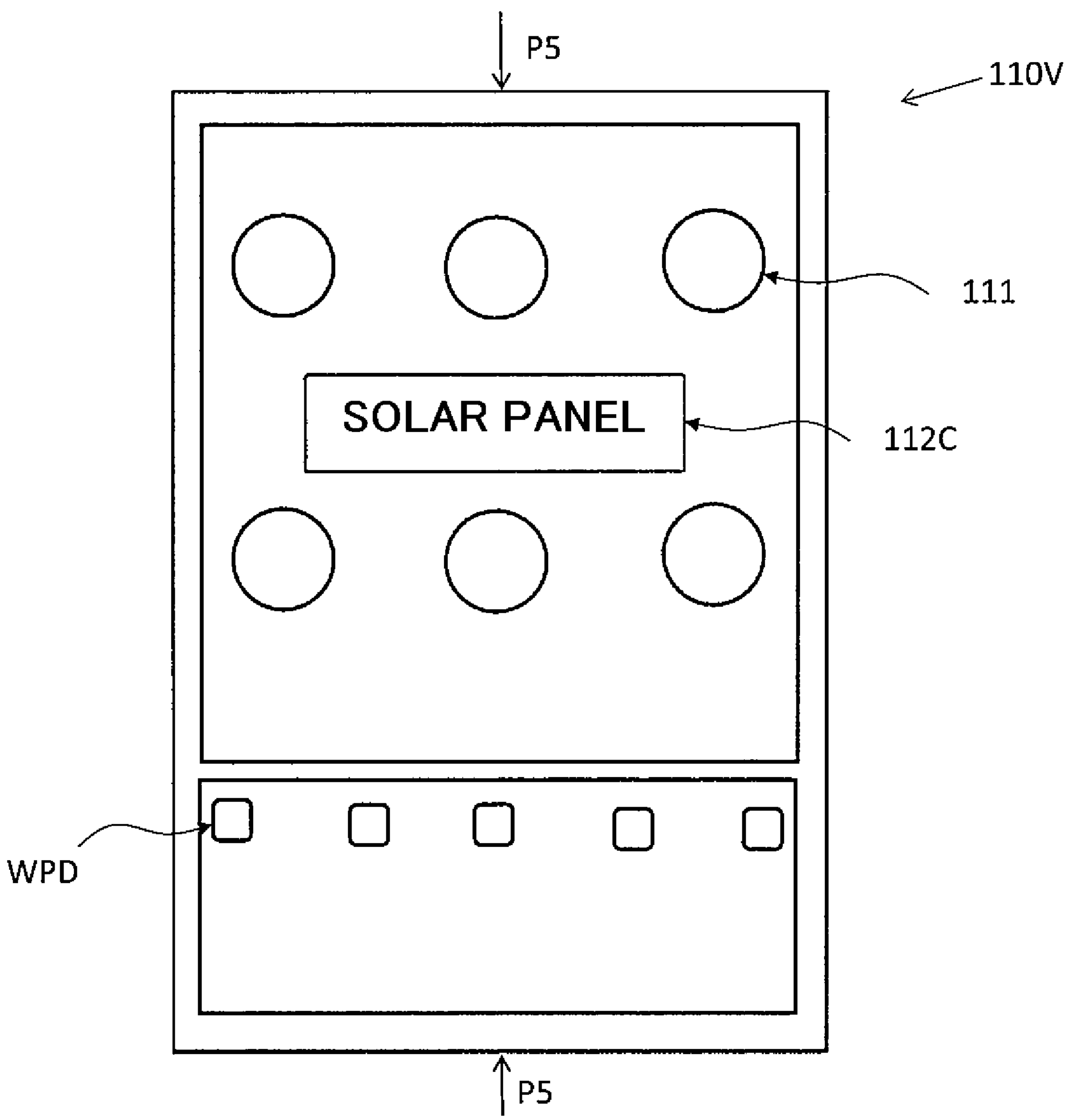

FIG. 219 is a plan view sectional view of the device as viewed from the working surface side where there is action on the touch panel.

Figure 220:
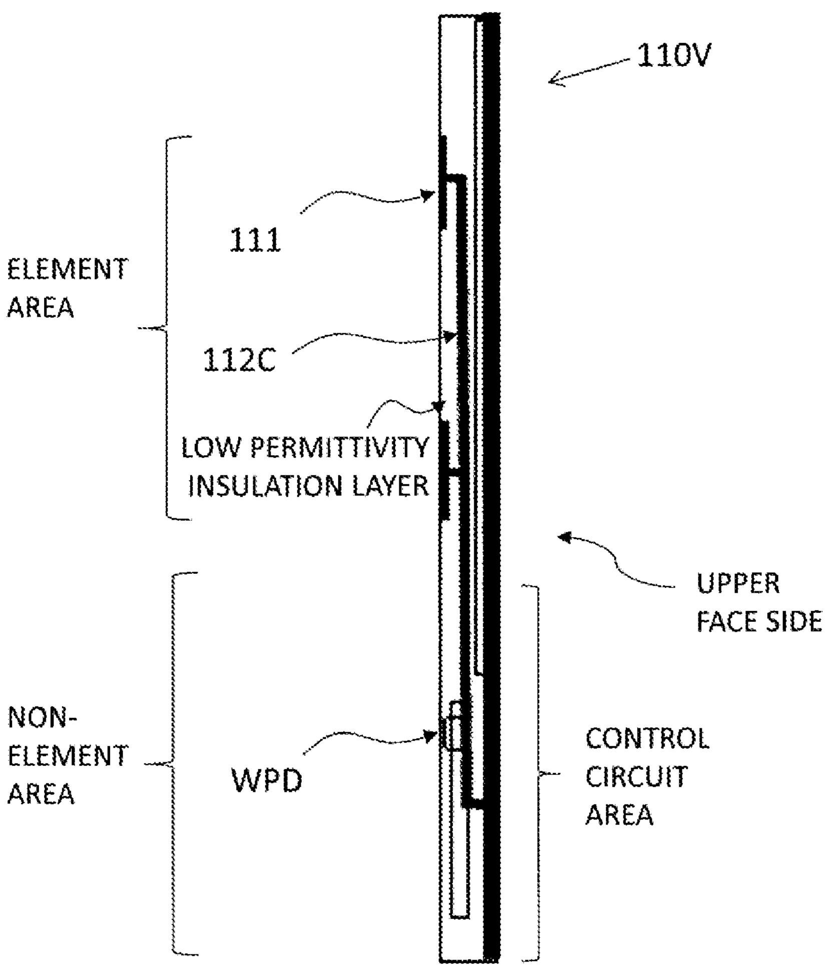

FIG. 220 is a sectional view of the device.

Figure 221:
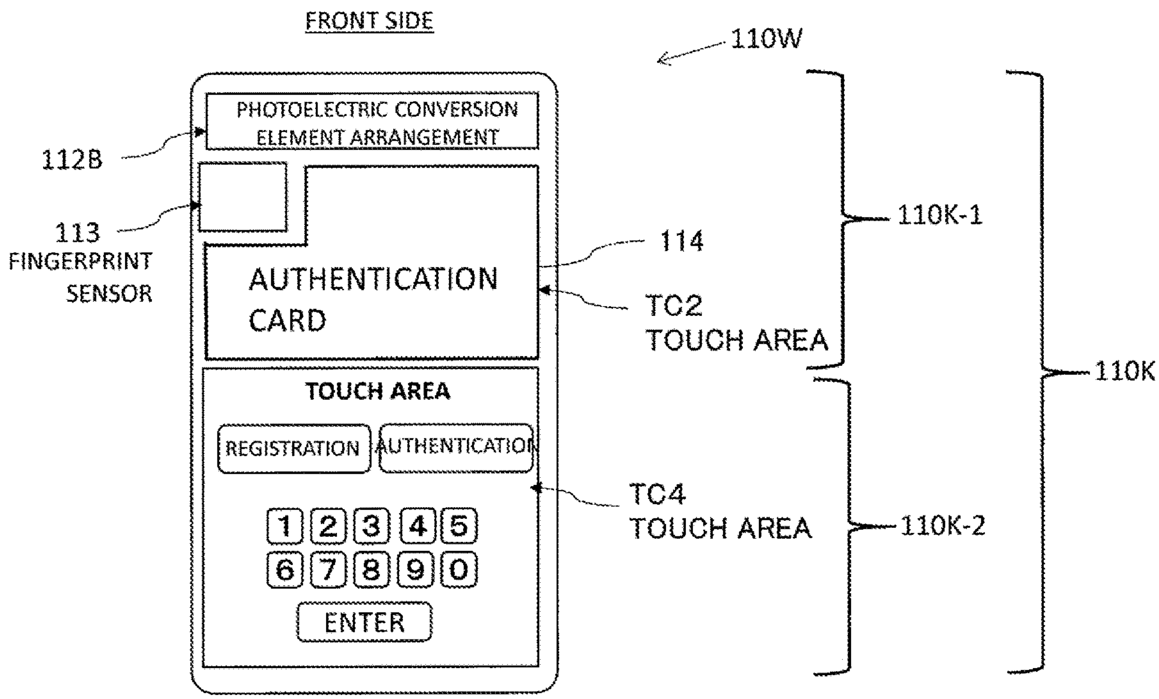

FIG. 221 is a plan view as viewed from the upper side of the apparatus.

Figure 222:
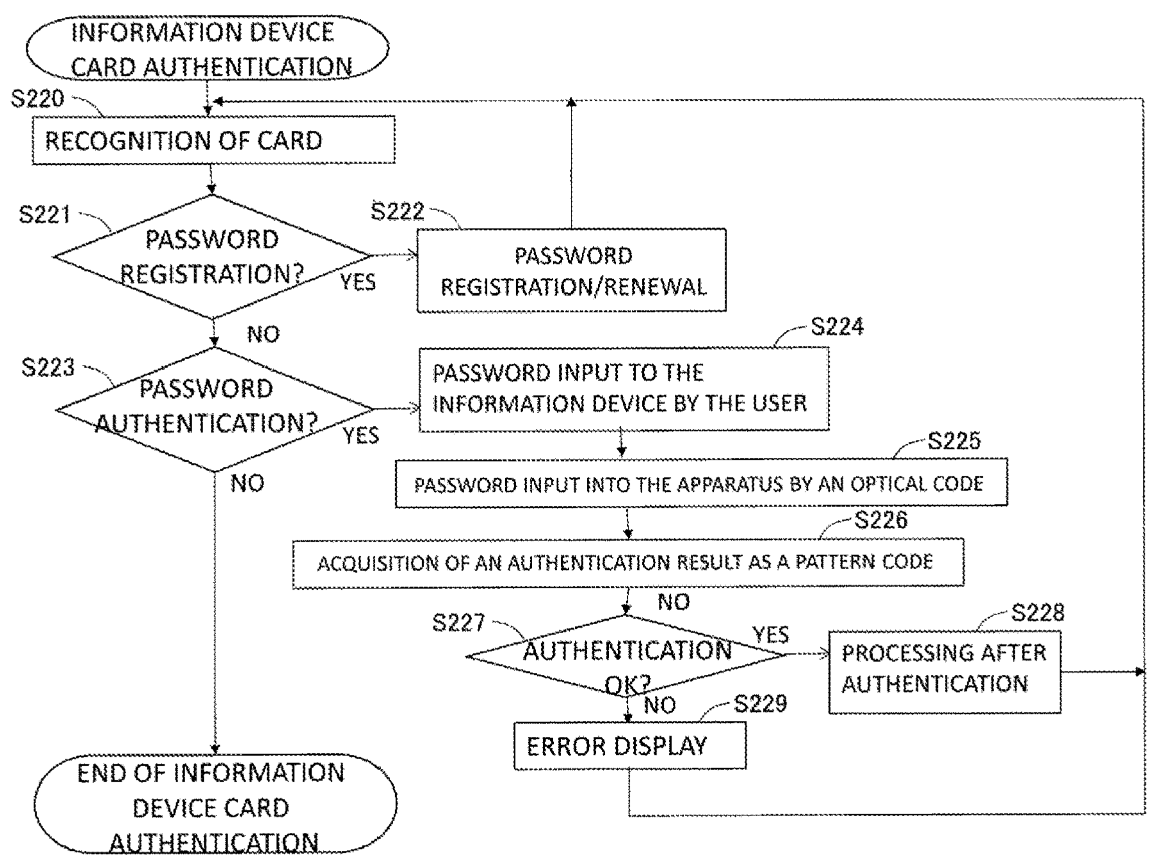

FIG. 222 is a flowchart of card authentication processing.

Figure 223:
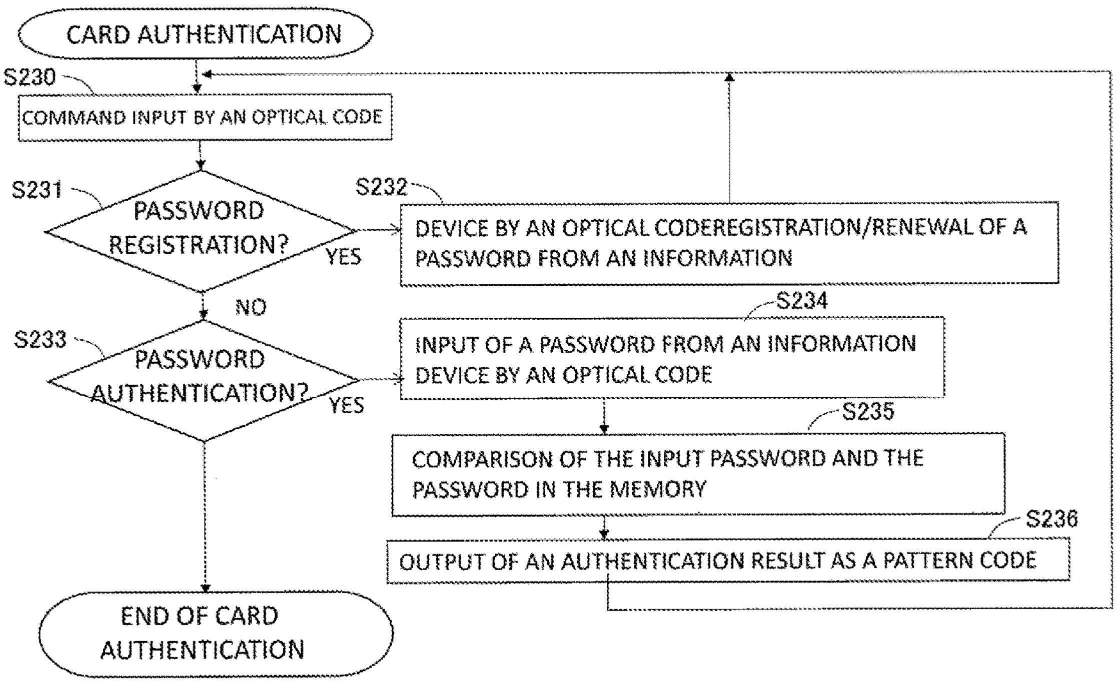

FIG. 223 is a flowchart of card authentication processing.

Figure 224:
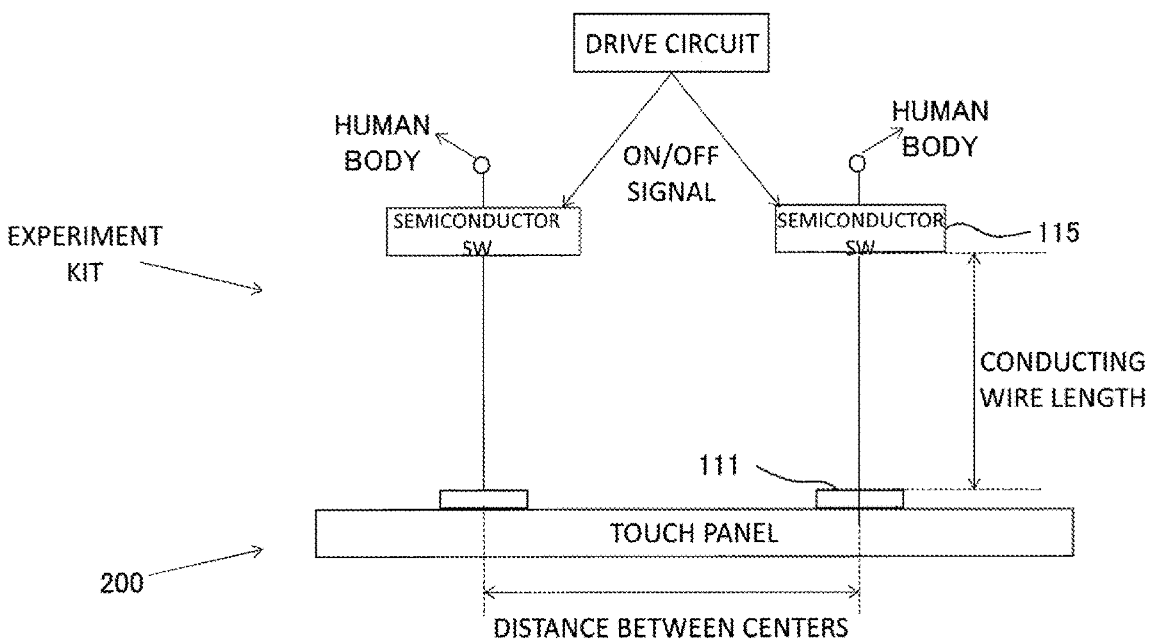

FIG. 224 is a diagram exemplifying the state of the apparatus at the time of the experiment.

FIG. 225 is a result of measurements with the ON time changed.

FIG. 226 is a result of measurements with the length of the conductor being 10 cm.

FIG. 227 is a result of measurements using two elements 111.

FIG. 228 is a result of measurements by changing the length of the conductive wire.

FIG. 229 is a result of measurements by changing the length of the conductive wire.

DETAILED DESCRIPTION OF PREFERRED EMBODIMENTS

Hereinafter, embodiments of the present invention will be described with reference to the drawings.

Zeroth Embodiment

[Outline of the Information Processing System]

Figure 1:
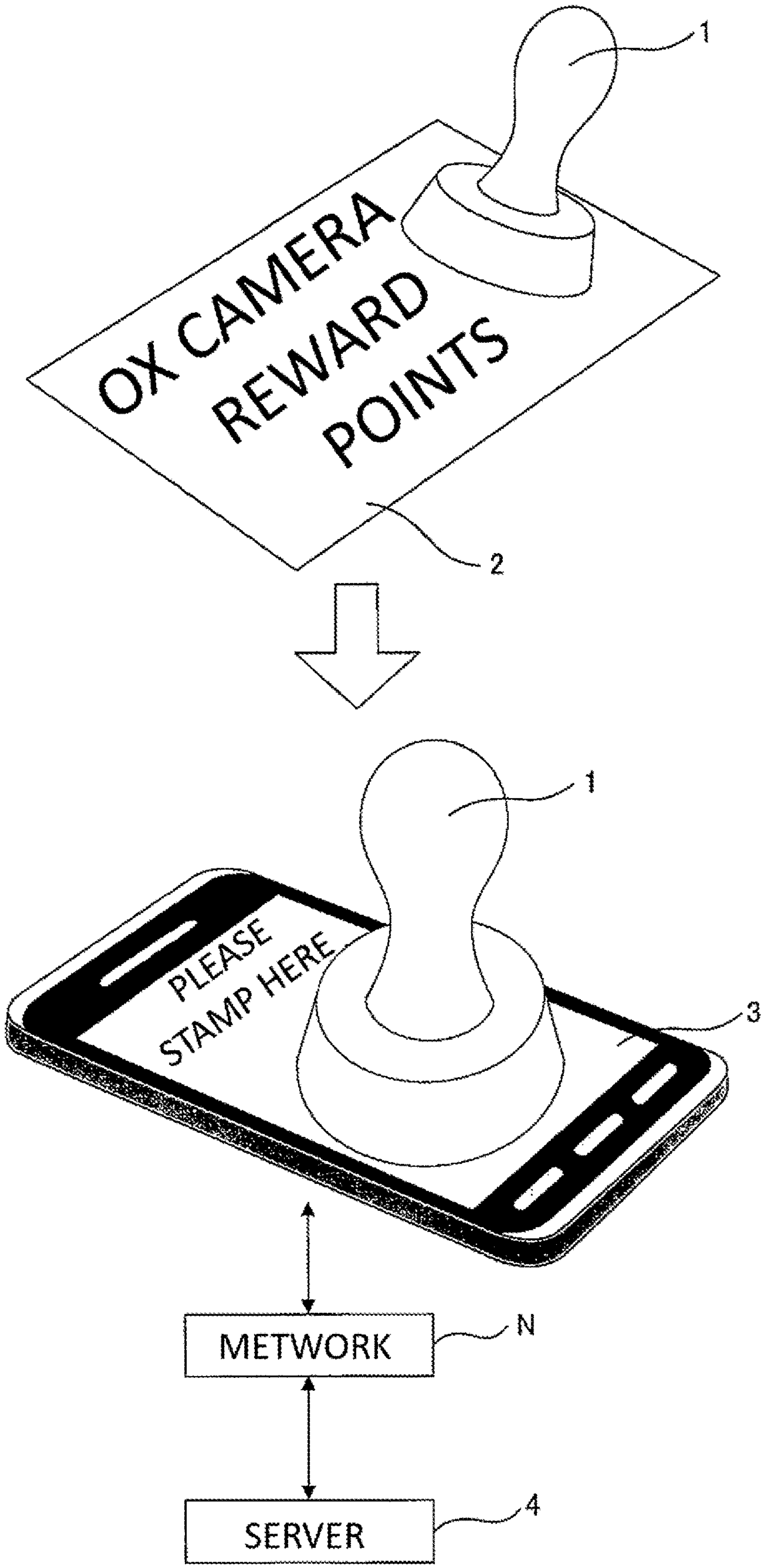
FIG. 1 is a diagram showing an example of an external configuration of an information processing system which is relevant to one embodiment of the present invention.

FIG. 1 is a diagram showing an example of an external configuration of an information processing system which is relevant to an embodiment of the present invention.

The information processing system shown in FIG. 1 comprises a code generation apparatus 1 for generating codes, a medium 2 such as a card to which predetermined information concerning the codes is embedded, a code recognition apparatus 3 for recognizing the codes, and a server 4 for executing a predetermined processing concerning the code.

The code recognition apparatus 3 and the server 4 are connected via a predetermined network N such as the internet.

FIG. 2 is a diagram showing an overview of a series of processings from reading the predetermined information to generating a code concerning the predetermined information, among the processings of the information processing system in FIG. 1.

Figure 2A:
FIG. 2 is a diagram showing an outline of a series of processings from reading predetermined information to generating a code relating to the predetermined information among the processings of the information processing system of FIG. 1.

As shown in FIG. 2(A), predetermined information C concerning a code is embedded in a medium 2 such as a card.

Here, the predetermined information C is sufficient as long as the information is readable by the code generation apparatus 1 and the information can allow the generation of codes by the code generation apparatus 1, and its form and so on are not particularly restricted. For example, a QR code (registered trademark), a bar code, a color code, and the like may be adopted as predetermined information C In the present embodiment, however, a dot code is adopted as the predetermined information C, and a dot pattern representing the dot code is formed on the medium 2.

Here, the "dot pattern" refers to an information code encrypted by a plurality of dot placement algorithms.

Note that the numeric information (code) obtained by reading the above dot pattern is a dot code and includes the notation of "dot code" as a general term. The same applies for the rest of the description.

Regarding the encrypting algorithm of the information code by the dot pattern, well-known algorithms such as Grid Onput (registered trademark) of Gridmark Inc., the Anoto Pattern of Anoto Co., Ltd. may be used.

Note that Grid Onput (registered trademark) of Gridmark among the dot patterns will be described in detail later.

The dot pattern encrypting algorithm itself is common in the case of reading with visible light and in the case of reading with infrared light, so it is not particularly restricted. Besides this, the dot pattern is sufficient even if it cannot be visually recognized or even in the case in which it can be visually recognized but just as a pattern, and any dot pattern may be adopted.

Furthermore, by defining the coordinate values of a dot pattern, it is possible to encrypt different information codes in accordance with the reading position. Furthermore, the dot pattern includes a direction factor serving as a reference for encrypting and decrypting the information code, and by reading the direction, the rotation angle of the code generation apparatus 1 with respect to the dot pattern can be acquired. On the other hand, when the code generation apparatus 1 is tilted with respect to the dot pattern formation medium, it is also possible to acknowledge the direction and the degree of tilting of the generation apparatus 1 by a change in the brightness of the captured image.

Figure 2B:
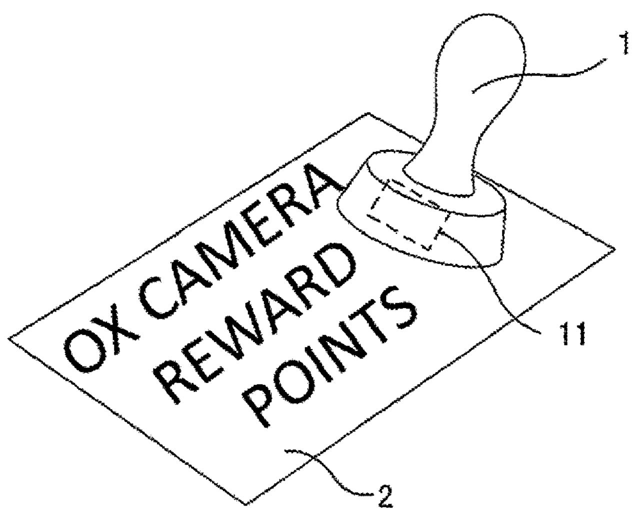

As shown in FIG. 2(B), the code generation apparatus 1 is equipped with an information reading unit 11.

The information reading unit 11 captures the dot pattern (predetermined information C) formed on the medium 2, and recognizes the dot code based on the image data of the dot pattern obtained as a result.

Note that the information reading unit 11 has a function for reading the predetermined information C embedded in the medium 2, and as described above, it may take various forms in accordance with the form of the predetermined information C.

Figure 2C:
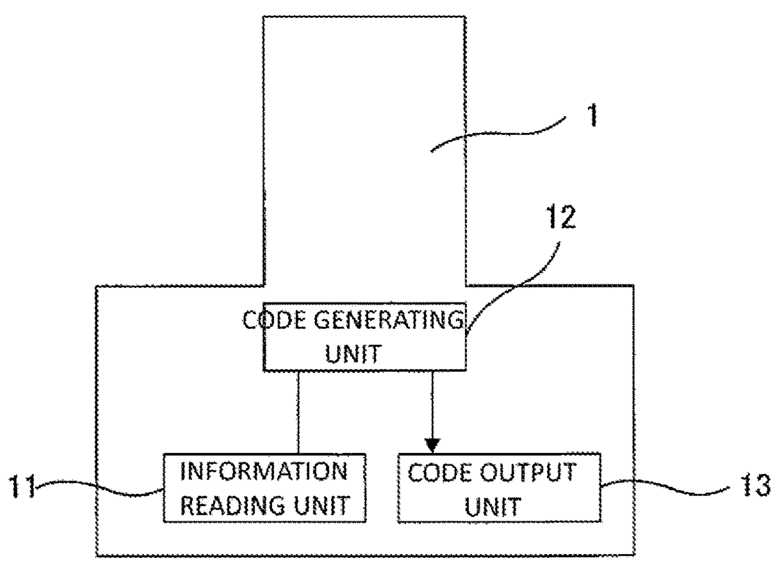

As shown in FIG. 2(C), the code generation apparatus 1 is further equipped with a code generation unit 12 and a code output unit 13 in addition to the information reading unit 11.

The code generating unit 12 generates a code, which is a code of predetermined information C and is represented by at least one of the arrangement patterns of the spatial direction and the time direction of one or more symbols, as a pattern code. Here, the symbol is a character, a figure, a pattern, or a combination thereof, and in this embodiment, dots are adopted for them.

That is, each time a new predetermined information C is read by the information reading unit 11, the code generation unit 12 generates a pattern code, respectively.

Each time a pattern code is generated, the code output unit 13 outputs a pattern code by changing the response propriety of an electrostatic capacitive type position input sensor (touch panel) in accordance with an arrangement pattern showing the pattern code for each of the one or more dots, respectively.

Note that specific examples of the pattern codes and their output will be described later with reference to FIGS. 6, 7, and 10 to 13.

FIG. 3 is a diagram showing an outline of a series of processings up to the recognition of the output code among the processings of the information processing system in FIG. 1.

Figure 3A:
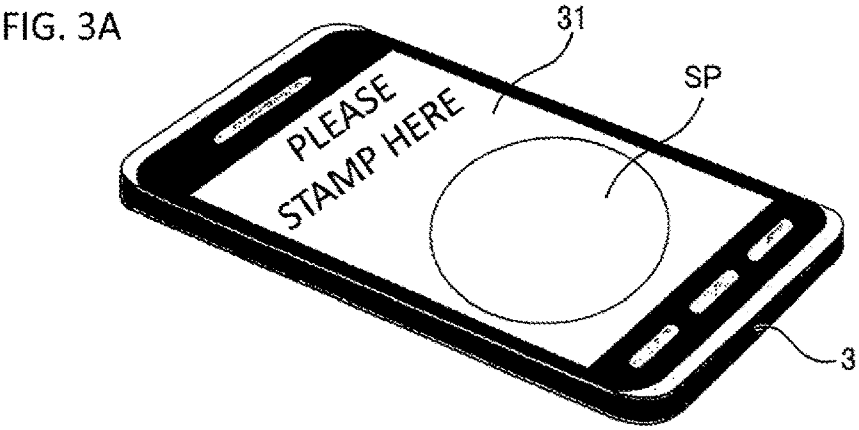
FIG. 3 is a diagram showing an outline of a series of processings up to recognition of an output code among the processings of the information processing system of FIG. 1.

As shown in FIG. 3(A), the code recognition apparatus 3 consists of a smartphone or the like having a touch panel 31. The touch panel 31 consists of a display unit (the display unit 57 in FIG. 5 to be described later) and electrostatic capacitive type position input sensors (touch operation input unit 56 in FIG. 5 to be described later) stacked on the display face of the display unit. On the touch panel 31 is displayed an area SP (hereinafter referred to as "code detection area SP") for detecting a dot group indicating the pattern code output by the code generation apparatus 1.

Figure 3B:
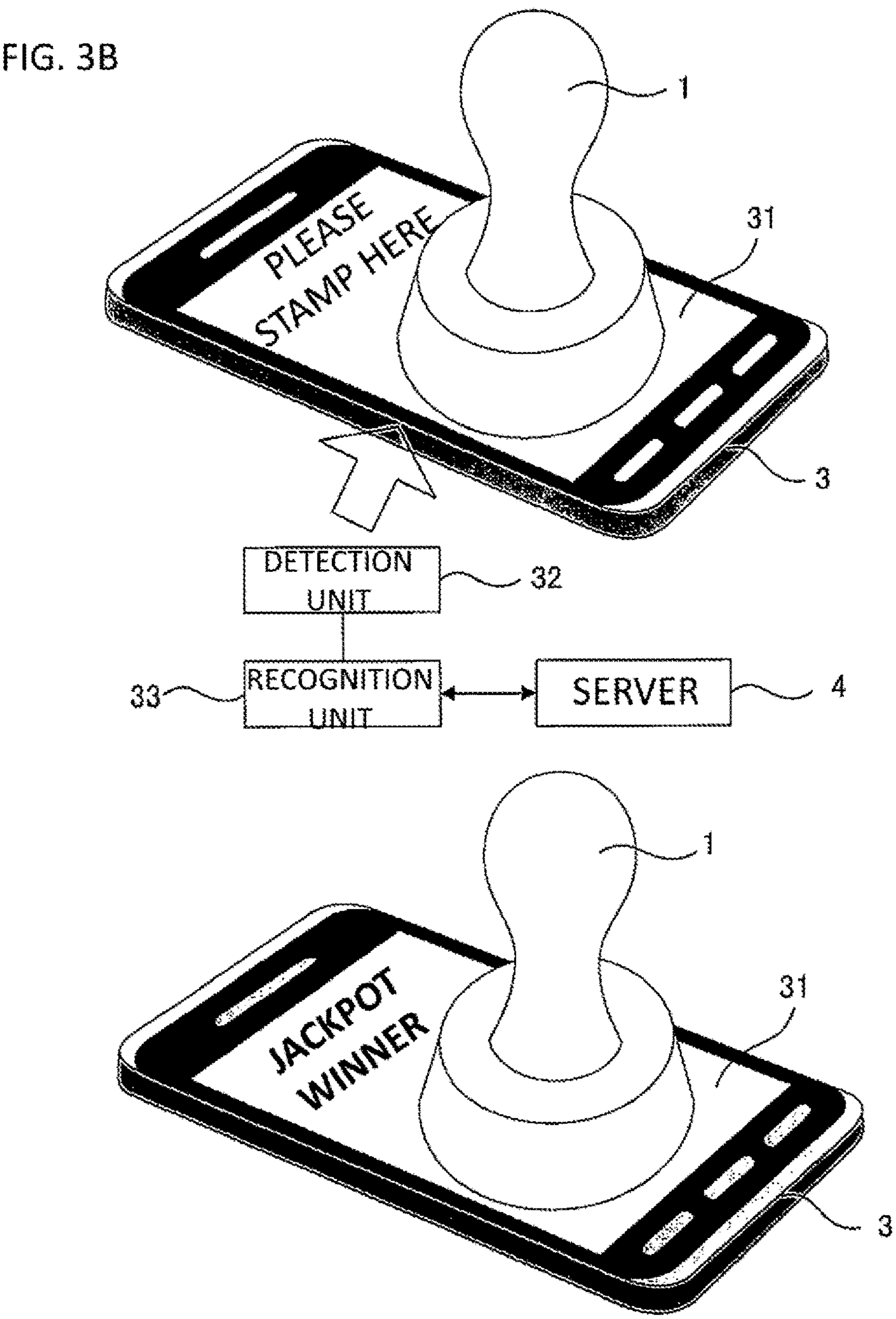

As shown in FIG. 3(B), the code recognition apparatus 3 consists of a detection unit 32 and a recognition unit 33 as functional blocks.

Note that the functional blocks may be constituted by standalone hardware, but in the present embodiment, they are constituted by software and hardware (CPU 51 in FIG. 5 to be described later). That is, the detecting unit 32 and the recognition unit 33 is to perform the following functions by the cooperation of software and hardware.

The detection unit 32 detects the arrangement pattern of the one or more dots based on the detection result of the position input sensor when the one or more dots, in which the response propriety of the position input sensor has changed due to the code output unit 13 of the code generation apparatus 1, comes into contact with or comes into proximity with the code detection area SP of the touch panel 31.

The recognition unit 33 recognizes the pattern code generated by the code generation unit 12 of the code generation apparatus 1 based on the detected arrangement pattern of the one or more dots.

This pattern code is transmitted to the server 4 as necessary.

The server 4 executes various processings based on the pattern code, and transmits the execution result to the code recognition apparatus 3. The code recognition apparatus 3 displays an image showing the execution result on the touch panel 31.

FIG. 4 is a schematic diagram showing an example of the configuration of the code generation apparatus 1.

Figure 4A:
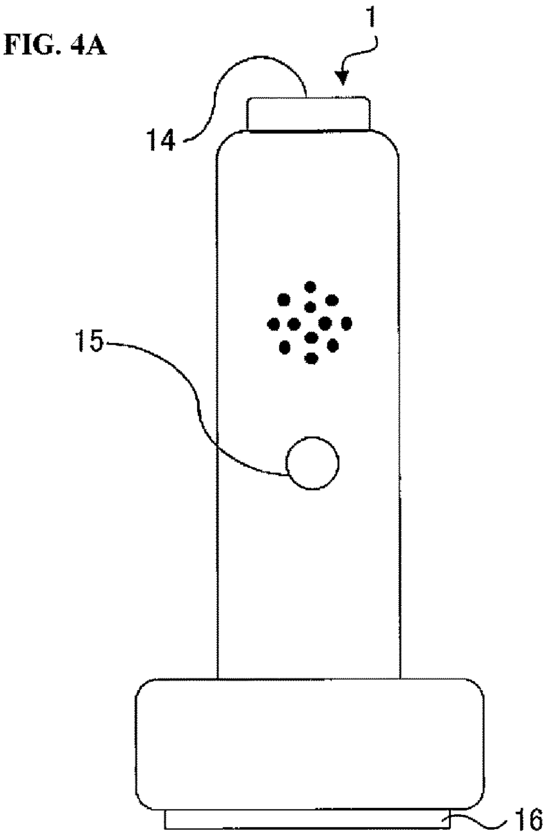
FIG. 4 is a schematic diagram showing an example of a configuration of a code generation apparatus in the information processing system of FIG. 1.
Figure 4B:
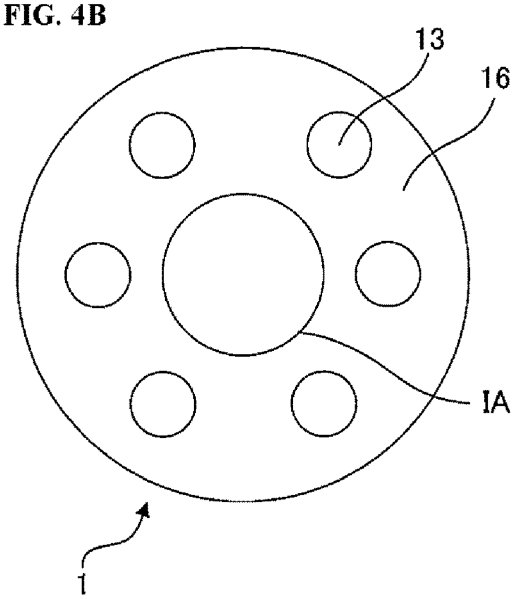
Figure 4C:
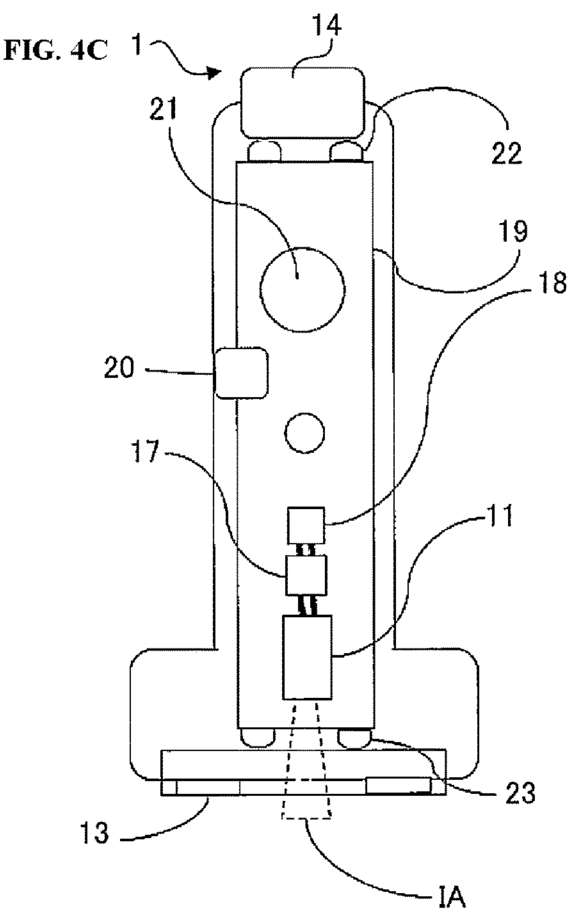
Figure 4D:
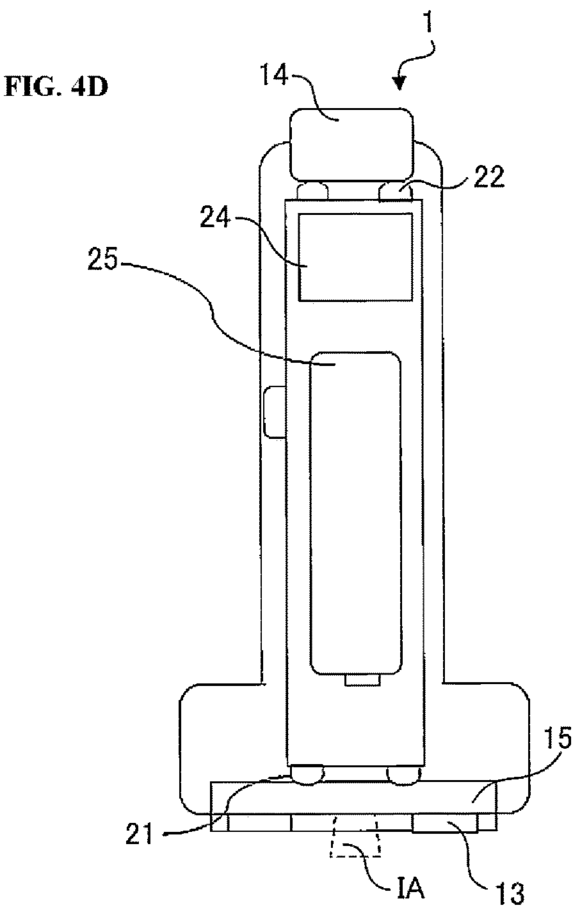

Specifically, FIG. 4(A) is a side view showing an example of the external configuration of the code generation apparatus 1. FIG. 4(B) is a bottom view showing an example of the external configuration of the code generation apparatus 1. FIG. 4(C) is a diagram showing an example of the internal configuration of the front side of the code generation apparatus 1. FIG. 4(D) is a diagram showing an example of the internal configuration of the back side of the code generation apparatus 1.

Note that in order to distinguish it from the examples in FIG. 8 and FIG. 9 to be described later, the code generation apparatus 1 in the example of FIG. 4 is particularly referred to as "stamp-type code generation apparatus 1." Note that hereinafter, the bottom area in FIG. 4, that is, the direction opposing the medium 2 and the code recognition apparatus 3 will be described as "bottom."

As shown in FIG. 4, the stamp-type code generation apparatus 1 further includes an operation button 14, a power button 15, a stamp unit 16, a CPU (Central Processing Unit) 17, an internal memory 18, a PCBA 19, a USB terminal 20, a speaker 21, a button switch 22, a self-weight switch 23, a wireless device 24, and a power supply unit 25, in addition to the information reading unit 1, the code generation unit 12, and the code output unit 13 described above.

As in FIG. 4(A), an operation button 14 is provided at the upper end of the code generation apparatus 1, and is used for instructing operations for various types of control for the code generation apparatus 1 such as instructions to read the predetermined information C, and instructions to turn the pattern code output on/off. Specifically, when the operation button 14 is pressed down, as shown in FIG. 4(C), the button switch 22 arranged inside the code generation apparatus 1 is switched from one of the ON and OFF states to the other state. Note that an LED may be provided inside the operation button 14, and various states may be expressed by the emission color or emission pattern of the LED. Note that the operation button 14 is not indispensable to the code generation apparatus 1. Furthermore, the operation button 14 may be provided on the side face.

The power button 15 is provided on a side face of the code generation apparatus 1, and is a button for switching the power on/off for the code generation apparatus 1.

As shown in FIG. 4(A), the stamp unit 16 is provided at the bottom end of the code generation apparatus 1. As shown in FIG. 4(B), the stamp unit 16 is provided with a code output unit 13 constituted by the arrangement of a plurality of dots in a predetermined pattern, and a hole is opened in the center thereof. This hole portion is an information reading area IA in which predetermined information C is read by the information reading apparatus 11.

Protective member such as rubber or silicone may be provided around the plurality of dots so as to prevent damage of the display such as the touch panel 31 of the code recognition apparatus 3. If the stamp unit 16 is to be moved on the display, it is preferable to adopt a member such as silicone having a low friction coefficient for the bottom surface of the stamp unit 16 (including a protective member if there is a protective member). However, if the stamp part 16 is not to be moved on the display, it is preferable to employ a material such as rubber having a high friction coefficient.

When reading the predetermined information C, as shown in FIG. 2(B), the stamp unit 16 is placed above the dot pattern (predetermined information C) of the medium 2. As a result, as shown in FIG. 4(C), the predetermined information C is read by the information reading unit 11 via the reading area IA.

Furthermore, when outputting the pattern code, as shown in FIG. 3(B), the stamp unit 16 comes into contact with or comes into proximity with the code detection area SP of the touch panel 31 of the code recognition apparatus 3. More precisely, a plurality of dots of the code output unit 13 provided in the stamp unit 16 come into contact with or come into proximity with the code detection area SP of the touch panel 31 of the code recognition apparatus 3. Here, the plurality of dots are constituted by conductors or the like, and response propriety (conductive/non-conductive) of the touch panel 31 is controlled in accordance with the pattern code. That is, the touch panel 31 detects only dots (position coordinates thereof) that are allowed to be responsive among a plurality of dots. A pattern code is recognized based on the arrangement pattern of the dots detected in this manner. Note that specific examples of the recognition of a pattern code by a plurality of dots will be described later with reference to FIGS. 6 and 7.

As in FIG. 4(C), the CPU 17 executes all of the control processings of the code generation apparatus 1, for example, various processings related to the reading of predetermined information C, the output of a pattern code, program update, the control of input/output devices, and the like. By cooperation with predetermined software, the CPU 17 makes various functional blocks such as the code generation unit 12 in FIG. 2(C) function.

The built-in memory 18 stores programs for execution by the CPU 17, various data used by the CPU 17, and the like.

The PCBA 19 is a board on which various circuits necessary for the code generation apparatus 1 to execute the various processings shown in FIG. 2 are mounted.

When program update, data input/output, charging, and the like of the code generation apparatus 1 are performed, the USB terminal 20 is USB-connected to some other apparatus not shown. Note that the USB terminal 20 is not indispensable for the code generation apparatus 1.

The speaker 21 outputs various sounds when predetermined information C (dot pattern) is read, when various operation instructions are given, when contents with sounds are reproduced, and so on.

As described above, the button switch 22 is a switch that switches from one of the ON and OFF states to the other in response to a depression operation of the operation button 14. The self-weight switch 23 is a switch that activates the pattern code output unit 16 by its own weight. Here, to activate is to establish a state of response propriety (conductive/non-conductive) in the touch panel 31 for each dot of the plurality of dots constituting the pattern code output unit 16 in accordance with the pattern code. Furthermore, as shown in FIG. 2(B), when the stamp unit 16 is placed on the dot pattern (predetermined information C) of the medium 2, the self-weight switch 23 is activated by its own weight, and the predetermined information C is read by the information reading unit 11 via the reading area IA. Substantial power saving can be achieved when the mechanism, by which the self-weight switch 23 is activated by its own weight, activates the output procedure of the pattern code and the reading procedure of the dot pattern, which require power, only when the code generation apparatus 1 is placed on the touch panel 31 and/or the medium 2. Note that the self-weight switch 23 is not indispensable to the code generation apparatus 1.

As in FIG. 4(D), the wireless device 24 is a device that communicates wirelessly with the server 4 and exchanges various kinds of information used for the control processing of output such as processing to collate the read predetermined information C with the server 4 and the like.

The power supply unit 25 is a unit that supplies electric power to the code generation apparatus 1 with dry batteries or the like. Therefore, the power supply unit 25 is not particularly required to be a dry battery, and it may be a rechargeable battery. In this case, the method of charging is not particularly restricted, and a method of charging by USB connection at the USB terminal 20 may be adopted, or some other method may be adopted.

Figure 5:
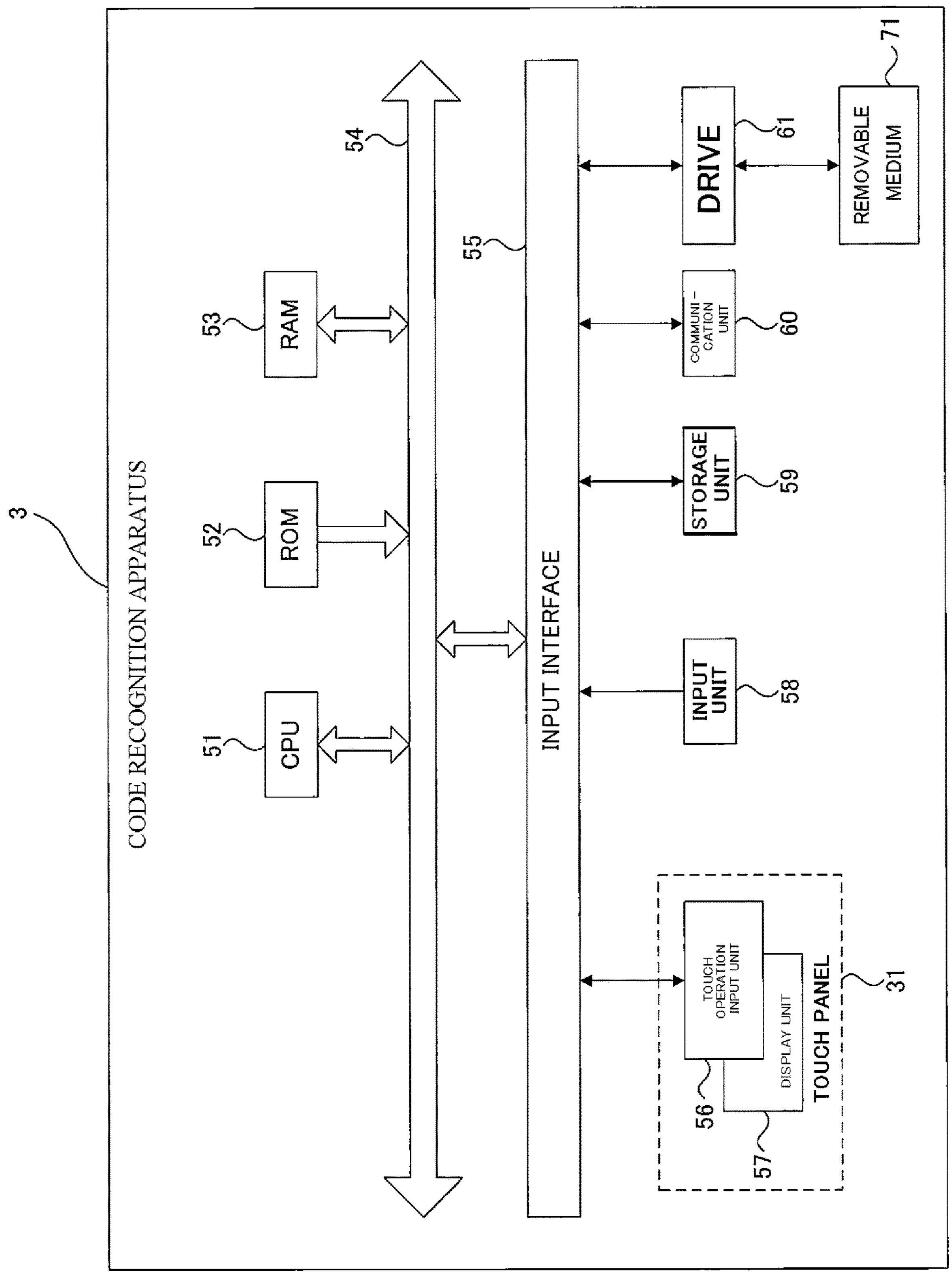
FIG. 5 is a block diagram showing an example of a hardware configuration of a code recognition apparatus in the information processing system of FIG. 1.

FIG. 5 is a block diagram showing an example of a hardware configuration of the code recognition apparatus 3.

The code recognition apparatus 3 includes a CPU 51, a ROM (Read Only Memory) 52, a RAM (Random Access Memory) 53, a bus 54, an input/output interface 55, a touch operation input unit 56, a display unit 57, an input unit 58, a storage unit 59, a communication unit 60, and a drive 61.

The CPU 51 executes various processings in accordance with a program recorded in the ROM 52 or a program loaded from the storage unit 59 to the RAM 53.

The RAM 53 also stores data and the like necessary for the CPU 51 to execute various processings when proper.

The CPU 51, the ROM 52, and the RAM 53 are mutually connected via a bus 54. An input/output interface 55 is also connected to the bus 54. To the input/output interface 55, a touch operation input unit 56, a display unit 57, an input unit 58, a storage unit 59, a communication unit 60, and a drive 61 are connected.

The touch operation input unit 56 is constituted by, for example, electrostatic capacitive type position input sensors stacked on the display face of the display unit 57, and detects the coordinates of the position where the touch operation was performed.

Here, the touch operation refers to an operation in which an object is brought into contact with or brought into proximity with the touch operation input unit 56. The object that comes into contact with or comes into proximity with the touch operation input unit 56 is generally a user's finger, a touch pen, or the like, and in the present embodiment, it is a plurality of dots constituting the code output unit 13 of the code generation apparatus 1. Note that hereinafter, the position at which the touch operation is performed is referred to as the "touch position," and the coordinate of the touch position is referred to as "touch coordinate."

The display unit 57 is constituted by a display of liquid crystal and the like, and displays various images such as the images shown in FIG. 2 and FIG. 3. Thus, in the present embodiment, the above-described touch panel 31 is configured by a touch operation input unit 56 and a display unit 57.

The input unit 58 is configured by various hardware buttons and the like, and various kinds of information are input in accordance with the instruction operation by the player.

The storage unit 59 is configured by a DRAM (Dynamic Random Access Memory) or the like, and stores various data. The communication unit 60 controls communication with other apparatuses (the server 4 in the example of FIG. 1) via the network N including the internet.

The drive 61 is provided as necessary. A removable storage medium 71 consisting of a magnetic disk, an optical disk, a magneto-optical disk, a semiconductor memory, or the like is mounted on the drive 61 when proper. The program read from the removable storage medium 71 by the drive 61 is installed in the storage unit 59 as necessary. Furthermore, the removable storage medium 71 can also store various data stored in the storage unit 59 in the same manner as the storage unit 59.

Next, with reference to FIGS. 6 and 7, a specific example of the output form (arrangement pattern of dots) of the pattern code of the stamp-type code generation apparatus 1 will be described.

FIG. 6 shows a specific example of a dot arrangement pattern (hereinafter referred to as "single dot pattern") in the case in which the touch panel 31 can detect only one point.

Figure 6A:
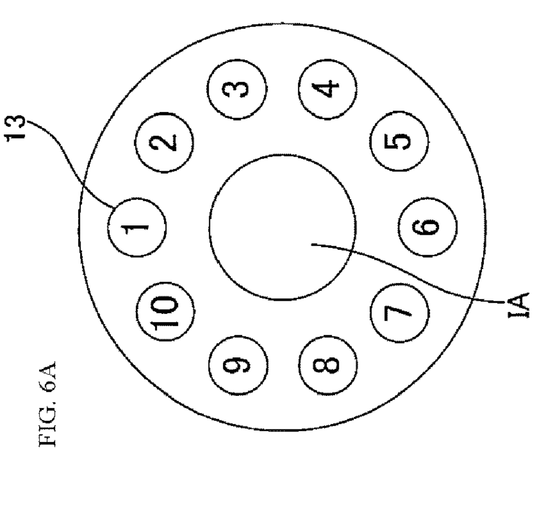
FIG. 6 is a diagram showing a specific example of a dot arrangement pattern when the touch panel can detect only one point.

In the example of FIG. 6, as shown in FIG. 6(A), the code output unit 13 is configured with ten dots equally spaced in a circumferential shape. Here, the reference numeral of each dot is represented by 13 and the numeral in the circle in the figure. For example, the dot located at the uppermost spot in FIG. 6 is referred to as dot 13-1 because the number in the circle is 1. Thus, when determining the arrangement pattern of the dots, a pattern in which each of the dots 13-1 to 13-10 is arranged at a position predefined in a spatial direction is the basis. Such an arrangement pattern of dots as the basis is hereinafter referred to as "basic pattern." That is, in the example of FIG. 6, the pattern shown in FIG. 6(A) is the basic pattern.

Note that the basic pattern is not particularly restricted to a pattern in which the dots 13-1 to 13-10 are arranged in a circular shape as in FIG. 6(A), and a pattern in which the dots 13-1 to 13-10 are arranged in an arbitrary shape such as a rectangular shape may be adopted. Also, the number of dots is not particularly restricted as in the example of FIG. 6(A), and may be arbitrary.

Figure 6B:
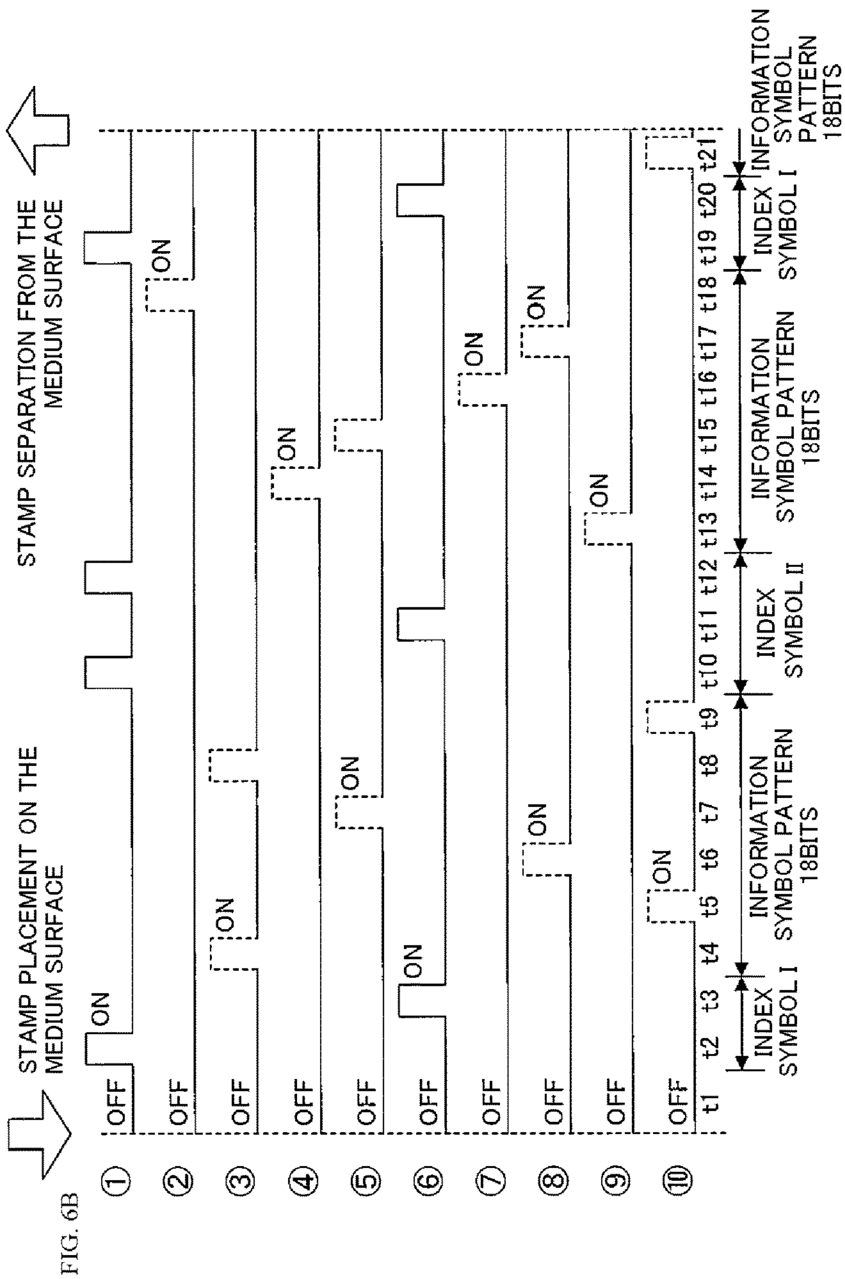

Furthermore, as shown in FIG. 6(B), for each of the dots 13-1 to 13-10 included in the basic pattern in FIG. 6(A), the response propriety of the touch panel 31 is defined at a predetermined time among the relative times t1 to t21 (predetermined time timing).

Here, the state in which the touch panel 31 responds, that is, the conductive state is referred to as "ON" or "output." Conversely, a state where the touch panel 31 does not respond, that is, a non-conductive state is referred to as "OFF."

Note that in the present embodiment, the ON/OFF switching of each of the dots 13-1 to 13-10 is realized by the control of the CPU 17 in FIG. 4(C). A method of sequentially switching predetermined dots among the dots 13-1 to 13-10 and outputting (ON) is not particularly restricted, and for example, in the present embodiment, a method in which the pressing operation of the operation button 14 in FIG. 4(A) is repeated may be adopted or a method using the output of the self-weight button 23 that operates by the self-weight of the stamp unit 16 on the placement surface may be adopted.

In the example of FIG. 6, since the touch panel 31 is capable of detecting only one point, regardless of the timing among times t1 to t21, "output (ON)" is permitted for only one predetermined dot among the dots 13-1 to 13-10.

Figure 6C:
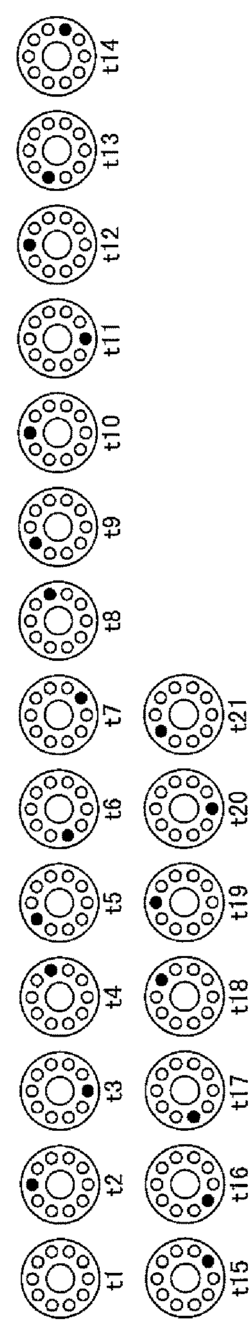

Here, in FIG. 6(C), at each timing from the time t1 to the time t21, patterns in which only dots of "output (ON)" are filled black, are drawn among the basic patterns in FIG. 6 (A). Such a pattern is referred to as a "unit pattern." For example, the unit pattern at time t2 refers to a pattern in which only the dot 13-1 is "output (ON)" among the basic patterns.

A plurality of such unit patterns are prepared (21 kinds are prepared in the example of FIG. 6 (C)), and by arranging various unit patterns one by one at each position of the time direction (each timing from times t1 to t21), the pattern code to be generated is defined.

The time (relative time) at which the stamp unit 16 of the code generation apparatus 1 comes into contact with or comes into proximity with the surface of the touch panel 31 (hereinafter also referred to as "placement") is defined as time t1. As shown in FIGS. 6(B) and 6(C), the unit pattern at the time t1 is an OFF pattern for all of the dots 13-1 to 13-10. Here, the interval between time t1 and time t2 may be arbitrary.

That is, when there is a placement on the touch panel 31 after the code generation apparatus 1 reads the predetermined information C and generates a pattern code, a predetermined dot (dot 13-1 in the example of FIG. 6) may be "output (ON)," immediately," or it may "output (ON)" after a predetermined period of time.

Here, in the example of FIG. 6, two or more dots among dots 13-1 to 13-10 are defined as references (hereinafter referred to as "reference dots"), and the others are defined as "information dots."

In this way, by sequentially "outputting (ON)" two or more reference dots, that is, by consecutively arranging two or more unit patterns, in which only reference dots at different positions are "output (ON)," in the time direction, it is possible to recognize the orientations of the dots 13-1 to 13-10 with respect to the touch panel 31 and the positions of the other information symbols relative to the reference symbol.

In this way, when each dot is sequentially "output (ON)," the gap time until the output of the next dot, that is, intervals of the arrangement in the time direction of the unit pattern can be set arbitrarily in accordance with the performance of the code recognition apparatus 3. Furthermore, if recognition on the code recognition apparatus 3 side is possible, it is also possible to output the next dot during the output of the preceding dot, that is, it is also possible to arrange two or more unit patterns in overlap in a predetermined time period.

In the example of FIG. 6, since the touch panel 31 can recognize only one dot, even if the next dot is recognized after the output of the preceding dot is completed or even if the preceding dot is being output, it is possible that it is recognized during the output of the next new dot.

More specifically, in the example of FIG. 6 in which ten dots 13-1 to 13-10 are present, first, the reference dots 13-1 and 13-6 are "output (ON)" in that order. In other words, a unit pattern by which the reference dot 13-1 is "output (ON)" is arranged at time t2, and the reference dot 13-6 is "output (ON)" at the next time t3.

The recognition unit 33 of the code recognition apparatus 3 recognizes the positions of other information dots and the spatial directions of the dot arrangement patterns (combinations of unit symbols) relative to the positions of the two reference dots 13-1 and 13-6.

Note that although not shown, if there is sufficient time for recognition, by sequentially "outputting (ON)" all of the dots 13-1 to 13-10, the touch panel 31 can acknowledge that the dots 13-1 to 13-10 are detected as normal. Thereby, it can be confirmed whether or not the code recognition apparatus 3 can operate normally.

Here, as described above, to arrange a unit pattern with the second dot set to "output (ON)" at the next position in the time direction (next time) after the arrangement of the unit pattern with the first dot is set to "output (ON)," means that the second dot is set to "output (ON)" after setting the first dot to "output (ON)."

Therefore, herein, for the sake of convenience for explanation, explanations are carried out only with respect to the temporal relationship with "output (ON)" of the dot, unless specified otherwise. However, this explanation is equivalent to the explanation in which unit patterns are arranged in the time direction.

Now, when two reference dots 13-1 and 13-6 are "output (ON)," the remainder is eight information dots 13-2 to 13-5 and 13-7 to 13-10. There are eight combinations in which one of the eight information dots 13-2 to 13-5 and 13-7 to 13-10 can be assigned "output (ON)." Therefore, in one "output (ON)," a 3-bit code can be output. In other words, since eight types of unit patterns can be arranged at a predetermined timing (one time), a 3-bit code can be output at a predetermined timing (one time).

Therefore, as shown in FIG. 6, by sequentially "outputting (ON)" information dots at the respective timings from time t4 to time t9, in other words by arranging the unit pattern six times, six times×3 bits/times=18 bits (26144 codes) can be output.

Here, it is possible to increase the number of output times for information dots (number of unit pattern arrangements in the time direction). However, in the touch panel 31, since there is a possibility for the stamp unit 16 to slip and be erroneously recognized, it is desirable to reduce the number of output times of information dots as much as possible.

Therefore, in the present embodiment, as shown in FIG. 6(B), by using the output (two outputs) of two reference symbols as an index of information, dividing one piece of information (code) into a plurality of pieces of information, regarding each piece of divided information as one block and outputting in block units, the output of a large amount of information (code) is realized.

Specifically, in this example, in the index of the first information, the reference symbols 13-1 and 13-6 are "output (ON)" in this order, and by "outputting (ON)" the six subsequent information symbols, the first block (first information) of 18 bits represented by combinations thereof is output.

In the index of the next information, the reference symbols 13-1, 13-6, 13-6 are "output (ON)" in this order, and by "outputting (ON)" the six subsequent information symbols, the second block (second information) of 18 bits represented by combinations thereof is output.

As a result, 36 bits (about 60 billion codes) can be output.

In order to surely recognize a large amount of information (code) output in this manner on the side of the code recognition apparatus 3, in order to prevent the surface of the touch panel 31 and the bottom surface of the stamp unit 16 (the surface shown in FIG. 4(B)) to slip, it is preferable to use rubber or the like having a high friction coefficient in the vicinity of the dot (conductor).

As in this embodiment, when the surface of the touch panel 31 is a display surface (display), such a rubber can buffer the impact when the stamp unit 16 is pressed. Note that, devising to prevent slipping is inadequate for moving or rotating the stamp unit 16 on the surface of the touch panel 31. In that case, silicone or the like having a low friction coefficient may be used.

The single dot pattern in the example of FIG. 6 is based on the premise that only one dot can be recognized at the same time by the touch panel 31 side. Accordingly, since the limitation of multi-touch recognition (the distance between the dots is about 10 to 15 mm) is small, the spatial distance between the dots in the reference pattern can be shortened. As a result, the bottom surface of the stamp unit 16 (face shown in FIG. 4(B)) can be made small.

Here, in the present embodiment, it is not possible to transmit from the code recognition apparatus 3 to the code generation apparatus 1 to the effect that the code output from the code generation apparatus 1 has been acquired. Therefore, the code generation apparatus 1 can surely transmit the pattern code by repeatedly executing the output of the pattern code (arrangement of a plurality of unit patterns in the time direction).

Furthermore, since this embodiment is merely an example, the code recognition apparatus 3 may notify the code generation apparatus 1 of the completion of pattern code (information) acquisition by various methods such as wireless communication, sound, light not shown. This makes it unnecessary to repeatedly output on the code generation apparatus 1 side.

As a general method of notifying the completion of such pattern code (information) acquisition, there is a method of displaying an image indicating the completion of acquisition of the pattern code (information) on the touch panel 31 or a separately prepared display. Furthermore, on the other hand, the code recognition apparatus 3 may display a two-dimensional code or a color code of a dot pattern or the like indicating the completion of pattern code (information) acquisition and it may be read by the information reading unit 11 via the reading area IA of the stamp unit 16.

Furthermore, in the single dot pattern of the example in FIG. 6, pattern codes are configured by arranging a plurality of types of unit patterns in the time direction (dots are sequentially "output (ON)"). That is, by increasing the number of dot ON/OFF repetitions, the amount of information of the pattern code (information) is increased.

Furthermore, here, by combining the lengths, long and short, of the time intervals of dot ON/OFF (by combining the distances of the unit pattern arrangements in the time direction), it is possible to output a much larger amount of pattern codes (information).

Note that in the example of FIG. 6, dots are used for explanation, but of course, the same applies when arbitrary symbols other than dots are adopted.

Furthermore, the recognizable size of a symbol, intervals of the spatial arrangements between symbols, the output time of a symbol, the gap time from the end of the symbol output to the start time of the next symbol output (depending on the performance of the touch panel 31, a gap time may not be necessary or the output of the next symbol may overlap) may be set arbitrarily taking into consideration the performance of the code recognition apparatus 3, the speed of the processing program, and the like.

Furthermore, by adopting the single dot pattern in the example of FIG. 6, it can easily be dealt with in the case where a pattern code relating to information different from the firstly input predetermined information C is newly output by a predetermined method or even when an pattern code output from code output apparatus 1 changes at any time due to wireless communication or the like. That is, the code output apparatus 1 can variably output information.

FIG. 7 shows a specific example of a dot arrangement pattern (hereinafter referred to as "multi-dot pattern") when the touch panel 31 can detect multiple points.

Figure 7A:
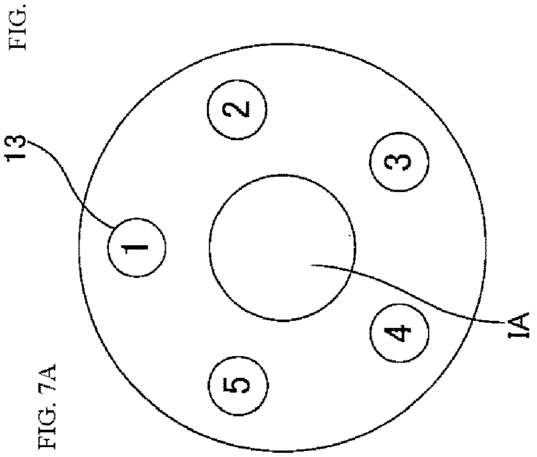
FIG. 7 is a diagram showing a specific example of a dot arrangement pattern when a touch panel can detect multiple points.

In the example of FIG. 7, as shown in FIG. 7(A), a pattern in which five dots 13-1 to 13-5 are circumferentially arranged with equal intervals is adopted as a basic pattern.

Note that the basic pattern is not particularly restricted to a pattern in which the dots 13-1 to 13-5 are arranged in a circular shape as in FIG. 7(A), and a pattern in which the dots 13-1 to 13-5 are arranged in an arbitrary shape such as a rectangular shape may be adopted. Also, the number of dots is not particularly be restricted as in the example in FIG. 7(A), and may be arbitrary.

Figure 7B:
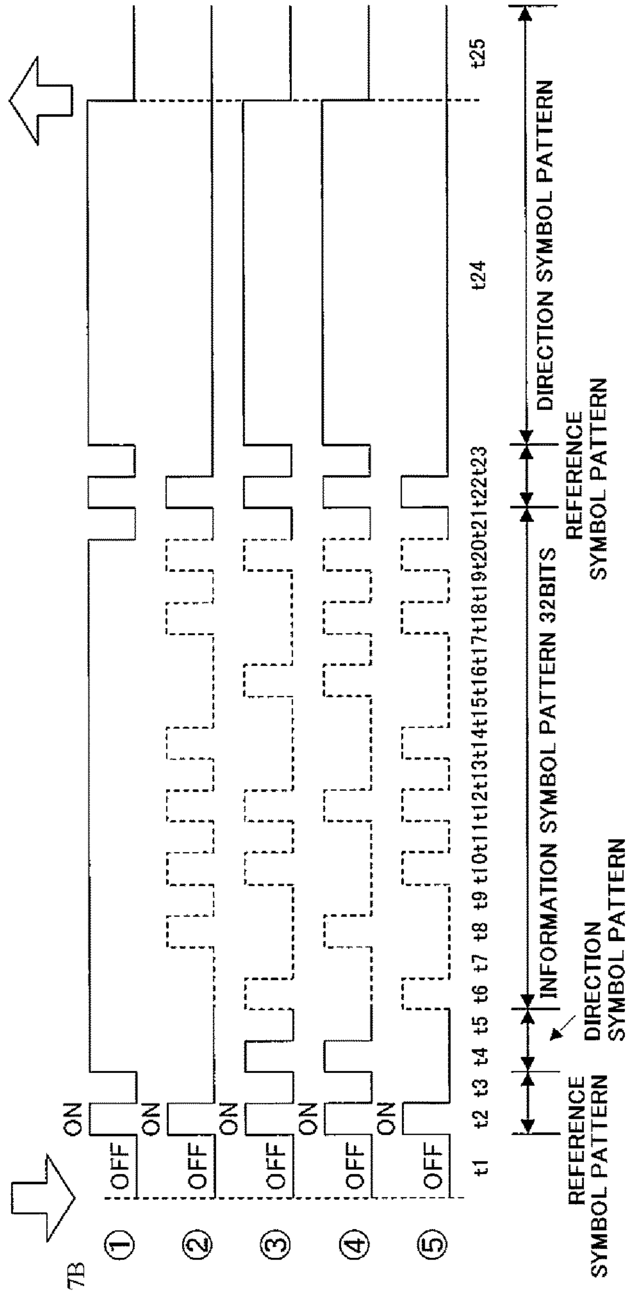

Furthermore, as shown in FIG. 7(B), for each of the dots 13-1 to 13-5 included in the basic pattern of FIG. 7(A), of the relative times t1 to t25, "output (ON)" or "OFF" is defined at predetermined times (predetermined time timing).

Figure 7C:
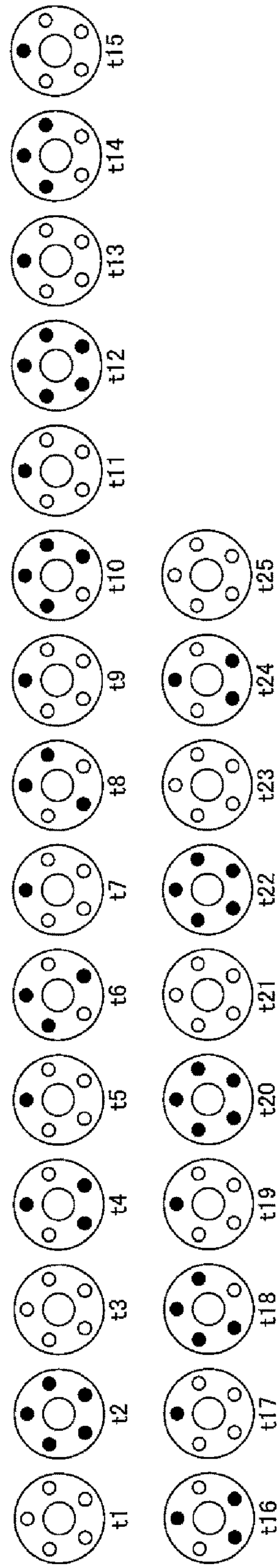

In the example of FIG. 7, since the touch panel 31 can detect a plurality of points, for "output (ON)," any number and any combination of the dots 13-1 to 13-5 is permitted at any timing from times t1 to time t25. Here, in FIG. 7(C), at each timing from the time t1 to the time t21, patterns in which only dots of "output (ON)" are filled black, are drawn among the basic patterns in FIG. 7 (A). Compared with the unit pattern in FIG. 6(C), since the touch panel 31 is capable of multi-dot detection, the "output (ON)" of a plurality of dots can be recognized with the unit pattern in FIG. 7(C).

By preparing a plurality of such unit patterns (25 kinds are prepared in the example of FIG. 7(C)), and arranging the various unit patterns one by one at each position (at each timing of times t1 to t25) in the time direction, the pattern code to be generated is defined.

Note that in the present embodiment, switching of the ON/OFF of each of the dots 13-1 to 13-5 is realized by the control of the CPU 17 in FIG. 4(C). A method for sequentially switching each unit pattern in FIG. 7(C) is not particularly restricted, and for example, in the present embodiment, a method in which the pressing operation of the operation button 14 in FIG. 4(A) is repeated may be adopted or a method using the output of the self-weight button 23 that operates by the self-weight of the stamp unit 16 on the placement surface may be adopted.

The time (relative time) at which the stamp unit 16 of the code generation apparatus 1 is placed on the touch panel 31 is set as time t1. As shown in FIGS. 7(B) and 7(C), the unit pattern at the time t1 is a pattern in which all of dots 13-1 to 13-5 are turned off.

Here, the interval between time t1 and time t2 may be arbitrary. That is, when there is a placement on the touch panel 31 after the code generation apparatus 1 reads the predetermined information C and generates a pattern code, the one or more predetermined dots (dots 13-1 to 13-7 in the example of FIG. 7), may be "output (ON)," immediately or it may be "output (ON)" after a predetermined period of time.

In the example of FIG. 7 where there are five dots 13-1 to 13-5, all of dots 13-1 to 13-5 are "output (ON)" at time t2. In other words, a unit pattern in which all of the reference dots 13-1 to 13-5 are "output (ON)" is arranged at time t2.

The recognition unit 33 of the code recognition apparatus 3 recognizes these dot positions and stores the reference pattern. Note that by "output (ON)" of all of dots 13-1 to 13-5, it is possible to recognize that the touch panel 31 has normally detected the dots 13-1 to 13-5. Thus, whether or not the code recognition apparatus 3 can operate normally can be confirmed.

At the next time t3, all of dots 13-1 to 13-5 are turned off.

At time t4, the dots 13-1, 13-3, 13-5 become "output (ON)."

The recognition unit 33 of the code recognition apparatus 3 recognizes the orientation of the unit pattern with these three dots 13-1, 13-3, and 13-5. Here, the recognition unit 33 recognizes the dot 13-1 as the vertex and recognizes the dot 13-1 as the positive direction from the center of the dots 13-1 to 13-5.

At the next time t5, the dots 13-2 to 13-5 other than the vertex dot 13-1 are turned off.

Afterwards, only the vertex dot 13-1 remains "output (ON)" as a reference, and information (part of information of the pattern code) is output by the ON/OFF of the dots 13-2 to 13-5.

For the touch panel 31 on which the stamp unit 16 is placed, there is a case where the stamp unit 16 slips on the placement surface and makes a linear movement. Even in this case, the recognition unit 33 can recognize which other dots of each unit pattern are "output (ON)" by the movement of the vertex dot 13-1.

Normally, since it can be considered that the possibility of the stamp unit 16 to rotate is very low at the moment of placement unless rotational motion is applied on purpose, it is sufficient as long as recognition accuracy is ensured so that erroneous recognition due to linear movement does not occur. But of course, the orientation of this unit pattern can recognize at what rotation angle the stamp part 16 is placed with respect to the surface of the touch panel 31.

By defining information with four dots spatially spaced apart by predetermined distances, using the ON/OFF of dots 13-2 to 13-4 and with one dot corresponding to one bit, 4 bits can be defined with one unit pattern. Therefore, by arranging 8 unit patterns in the time direction (turning the unit pattern on/off 8 times), it is possible to output information of 32 bits (about 4 billion codes).

Here, in the present embodiment, it is not possible to transmit from the code recognition apparatus 3 to the code generation apparatus 1 to the effect that the code output from the code generation apparatus 1 has been acquired. Therefore, the code generation apparatus 1 can surely transmit the pattern code by repeatedly executing the output of the pattern code (arrangement of a plurality of unit patterns in the time direction).

Furthermore, since this embodiment is merely an example, the code recognition apparatus 3 may notify the code generation apparatus 1 of the completion of pattern code (information) acquisition by various methods such as wireless communication, sound, light not shown. This makes it unnecessary to repeatedly output on the code generation apparatus 1 side.

As a general method of notifying the completion of such pattern code (information) acquisition, there is a method of displaying an image indicating the completion of acquisition of the pattern code (information) on the touch panel 31 or a separately prepared display. Furthermore, on the other hand, the code recognition apparatus 3 may display a two-dimensional code or a color code of a dot pattern or the like indicating the completion of pattern code (information) acquisition and it may be read by the information reading unit 11 via the reading area IA of the stamp unit 16.

Furthermore, by combining the lengths, long and short, of the time intervals of unit pattern ON/OFF (by combining the distances of the unit pattern arrangements in the time direction), it is possible to output a much larger amount of pattern codes (information)

There is a case in which it is desired to move the stamp unit 16 on the touch panel 31 to perform an operation after the pattern code is read by the code recognition apparatus 3. In this case, by setting the dots 13-1, 13-3, 13-4 to "output (ON)" after completion of the output of the pattern code, the recognition unit 33 of the code recognition apparatus 3 can recognize the position of the stamp unit 16 (the center position, the outline of the stamp unit 16, etc.) and the rotation angle of the stamp unit 16. Thus, an operation based on the image displayed on the touch panel 31 becomes possible.

Here, in the case in which information based on the repeated unit pattern is output, when the user desires termination at will, the operation button 14 provided in the code generation apparatus 1 is pressed. As a result, only the dots 13-1, 13-3, 13-4 become "output (ON)." By moving the stamp part 16 to a predetermined position and pressing the operation button 14, it is possible for the user to select an instruction placed at the position. This makes it easy to do from games to education, shopping, usual handling of smartphones and PCs.

Note that in the example of FIG. 7, dots are used for explanation, but of course, the same applies when arbitrary symbols other than dots are adopted.

Furthermore, the number of symbols that can be recognized simultaneously, the recognizable size of a symbol, intervals of the spatial arrangements between symbols, the output time of a symbol, the gap time from the end of the symbol output to the start time of the next symbol output (depending on the performance of the touch panel 31, a gap time may not be necessary or the output of the next symbol may overlap) may be set arbitrarily taking into consideration the performance of the code recognition apparatus 3, the speed of the processing program, and the like.

For example, even in the case in which the stamp unit 16 slides or rotates on the touch panel 31, by always continuing "output (ON)" using seven or more symbols with three or more symbols as reference symbols, the recognition unit 33 of the code recognition apparatus 3 can accurately recognize other information symbols that are "output (ON)." As a result, the code generation apparatus 1 can output the same 32 bits (about 4 billion codes) as in the example of FIG. 7.

Furthermore, by adopting the multi-dot pattern in the example of FIG. 7, it can easily be dealt with in the case where a pattern code relating to information different from the firstly input predetermined information C is newly output by a predetermined method or even when an pattern code output from code output apparatus 1 changes at any time due to wireless communication or the like. That is, the code generation apparatus 1 can variably output information.

As above, the stamp-type code generation apparatus 1 in FIG. 4 is described, but it is not particularly restricted to the description.

Thus, a pen-type code generation apparatus 1 will be described below.

FIG. 8 is a schematic diagram showing an example of the configuration of a pen-type code generation apparatus 1.

Figure 8D:
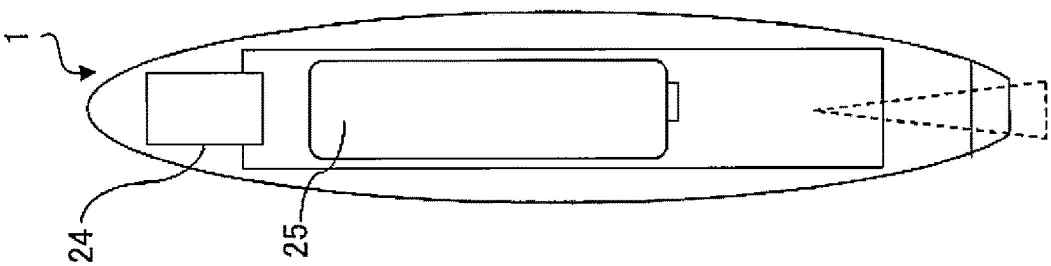
FIG. 8 is a schematic diagram showing an example of a configuration of a pen-type code generation apparatus.
Figure 8C:
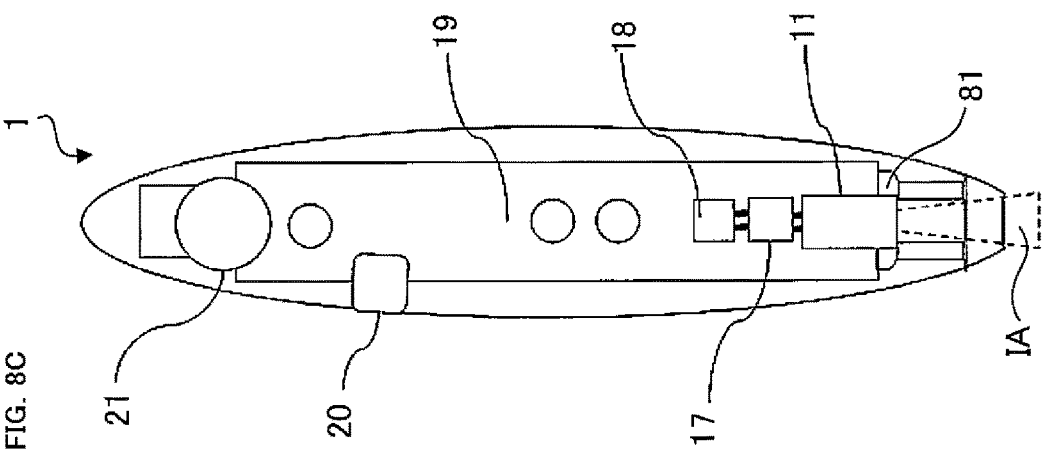
Figure 8B:
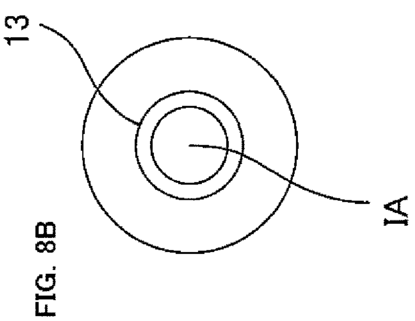
Figure 8A:
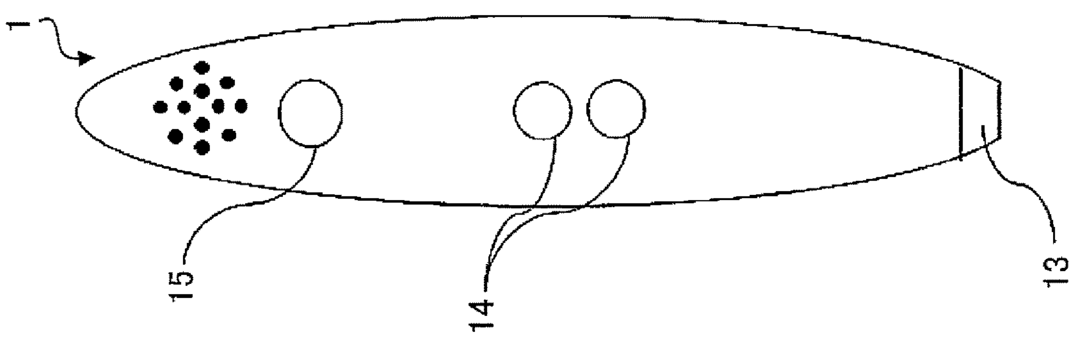

Specifically, FIG. 8(A) is a side view showing an example of the appearance configuration of the code generation apparatus 1. FIG. 8(B) is a bottom view showing an example of the appearance configuration of the code generation apparatus 1. FIG. 8(C) is a diagram showing an example of the internal configuration of the front side of the code generation apparatus 1. FIG. 8(D) is a diagram showing an example of the internal configuration of the back side of the code generation apparatus 1.

FIG. 9 is an example of a configuration of a pen-type code generation apparatus 1, and is a schematic diagram showing an example different from that in FIG. 8.

Figure 9D:
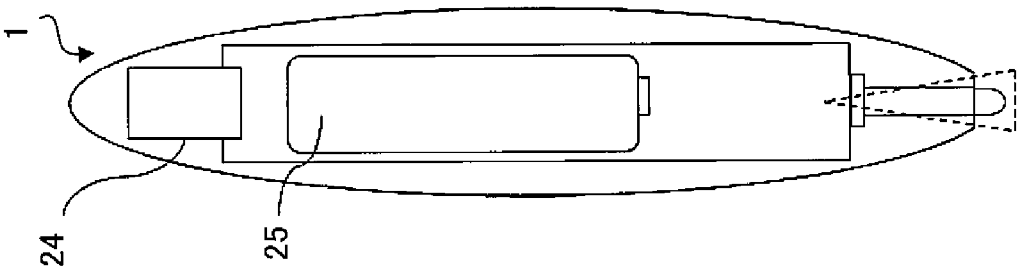
FIG. 9 is a schematic diagram showing another example of a configuration of a pen-type code generation apparatus.
Figure 9C:
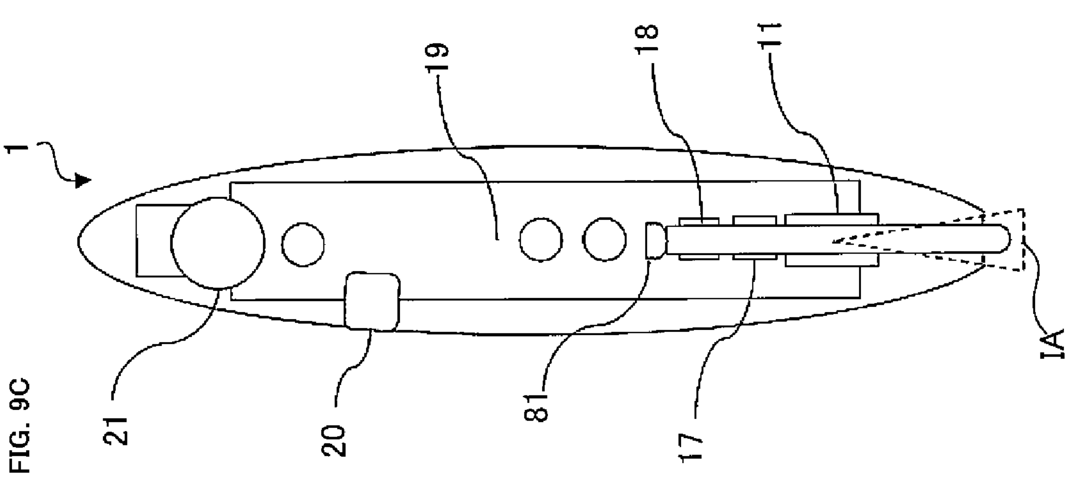
Figure 9B:
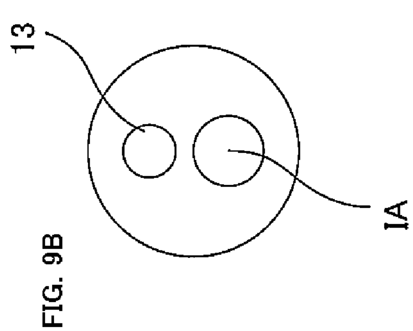
Figure 9A:
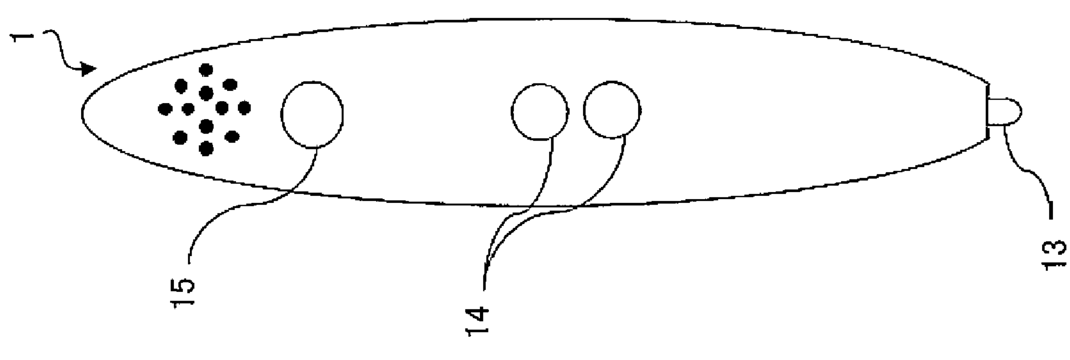

Specifically, FIG. 9(A) is a side view showing an example of the external configuration of the code generation apparatus 1. FIG. 9(B) is a bottom view showing an example of the external configuration of the code generation apparatus b 1. FIG. 9(C) is a diagram showing an example of the internal configuration of the front side of the code generation apparatus 1. FIG. 9(D) is a diagram showing an example of the internal configuration of the back side of the code generation apparatus 1.

Note that hereinafter, the bottom areas in FIGS. 8 and 9, that is, the direction opposing the medium 2 and the code recognition apparatus 3 will be described as "bottom."

As shown in FIG. 8, the pen-type code generation apparatus 1 includes an information reading unit 11, a code generation unit 12, a code output unit 13, an operation button 14, a power button 15, a CPU 17, an internal memory 18, a PCBA 19, a USB terminal 20, a speaker 21, a wireless device 24, and a power supply unit 25. These components have the same functions and configurations as those of the same reference numerals in FIG. 4 although the arrangements differ. Therefore, description of these constituent elements is omitted here.

At the bottom end of the pen-type code generation apparatus 1, a code output unit 13 is provided.

In the example of FIG. 8, one concentric circle symbol surrounding the circular-shaped information reading area IA is provided as the code output unit 13.

In the example of FIG. 9, one dot-shaped symbol separated from the circular information reading area IA is provided as the code output unit 13. This symbol also functions as a pen tip portion of a ballpoint pen or a stylus pen. That is, the pen-type code generation apparatus 1 in the example of FIG. 9 has a handwriting function.

The pen-type code generation apparatus 1 is also provided with a pen tip switch 81. The pen tip switch 81 is a switch that turns on when the code output unit 13 is pressed and turns off when pressing is released.

For example, when the code output unit 13 is pressed against the medium 2, the pen tip switch 81 is turned on, and reading of the predetermined information C by the information reading apparatus 11 is started.

For example, when the code output unit 13 is pressed against the touch panel 31, the pen tip switch 81 is turned on, and the code output unit 13 starts outputting the pattern code.

Note that the pen tip switch 81 is not indispensable to the pen-type code generation apparatus 1.

Since the code output unit 13 of the pen-type code generation apparatus 1 has one symbol, the pattern output unit 13 outputs the pattern code as a combination of the arrangements of symbols in the time direction.

Here, for the combination of the arrangements of symbols in the time direction, not only a simple combination of the arrangements of the presence/absence of "output (ON)" in the time direction but also the combination of "output (ON)" times (hereinafter referred to as "output time") with them being variable, the combination of time intervals between an "output (ON)" and an "output (ON)" (hereinafter referred to as "gap time") with them being variable, and the combination of "output (ON)" intensities (hereinafter referred to as "output intensity") variable with them being variable, may be adopted.

A specific example of an output form (symbol arrangement pattern) of a pattern code of such a pen-type code generation apparatus 1 will be described below.

FIG. 10 shows a specific example in the case in which the pattern code (information) is output at the interval of the symbol output time.

Figure 10A:
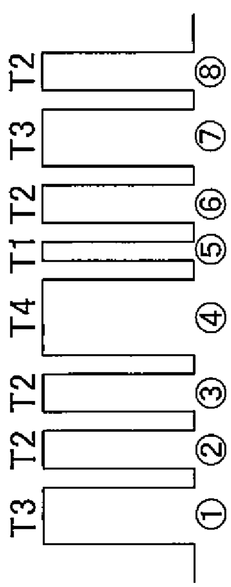
FIG. 10 is a diagram showing a specific example of a case where pattern codes (information) are output during symbol output time spans.

As shown in FIG. 10(A), plural kinds of output time intervals are set. Specifically, for example, with T1 to T4 set to 50 msec, 100 msec, 150 msec, and 200 msec, respectively, as four types (2 bits) of output times, by outputting eight times, only with the variation of the time of a single symbol output as with the pen-type code generation apparatus, it is possible to output 65,536 (16 bit) pattern codes.

Combined with gap time, output intensity, shape, size, arrangement patterns or the like of a symbol, it is possible to output an enormous amount of pattern codes (information).

The above output times may have arbitrary time intervals if each can be discriminated, the type and the number of times of output may also be arbitrary, and the number of pattern codes can be set freely. Note that in the example of FIG. 10(A), the gap time between symbol outputs is fixed.

Note that if the size, placement, and strength of the output symbols are different each time, a gap between the symbol outputs is not necessary.

Figure 10B:
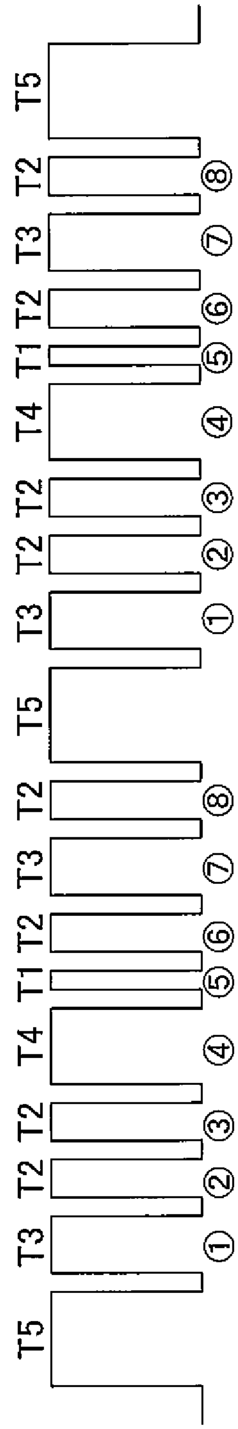

Furthermore, for example, as shown in FIG. 10(B), by setting "output (ON)" at the beginning with the output time to be referenced to (hereinafter referred to as "reference output time"), it is also possible to recognize the output time of other symbols from the reference output time.

Here, with the reference output time set to 250 msec, and T1 to T4 to ⅕ (50 msec), ⅖ (100 msec), ⅗ (150 msec) and ⅘ (200 msec) of the reference output time, respectively, as four types (2 bits) of output times, by outputting the symbol eight times, it is possible to output 65,536 (16 bit) pattern codes. In order to prevent recognition omission or misidentification of symbols, information output after the reference output time of 250 msec may be repeated plural times.

Figure 10C:
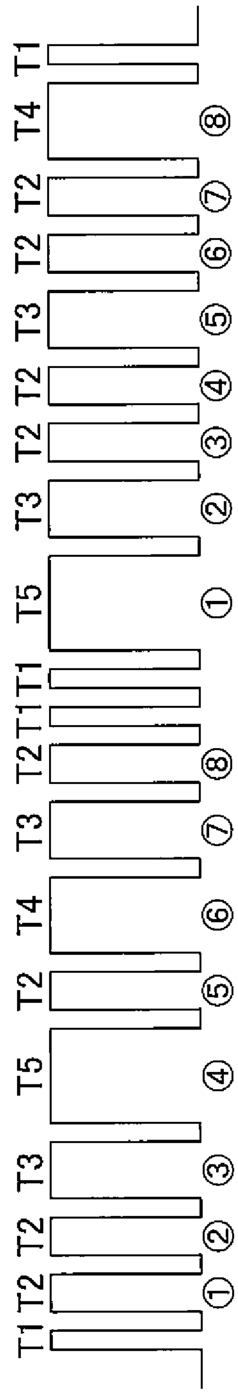

Furthermore, for example, as shown in FIG. 10(C), by performing "output (ON)" at a reference output time at the beginning at least once and using the number of "output (ON)" at the reference output time as an index, the pattern code may also be blocked and be output. Here, after outputting a symbol once and twice with a reference output time of T1, two blocked pattern codes are output as the index of two different pattern codes. Thus, like the pen-type code generation apparatus 1, it is possible to output 4,294,967,296 pieces (32 bits) of information only by varying the times for a single symbol output. Indexes do not need to be in ascending order and they can be set arbitrarily, and also, the number of times to output symbols with a pattern code can be set arbitrarily.

FIG. 11 shows a specific example of a case in which the pattern code (information) is output at intervals of the gap time of the symbol.

Figure 11A:
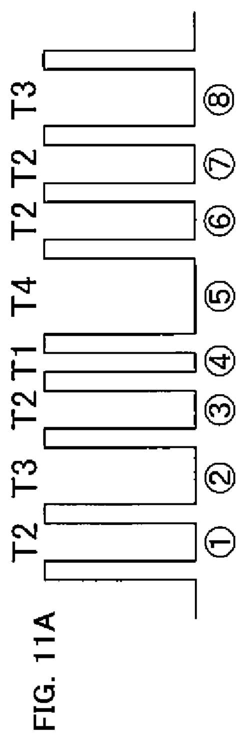
FIG. 11 is a diagram showing a specific example of a case where pattern codes (information) are output during time gaps between symbol outputs.

As shown in FIG. 11(A), plural kinds of gap time intervals are set. Specifically, for example, with T1 to T4 set to 50 msec, 100 msec, 150 msec, and 200 msec, respectively, as four types (2 bits) of gap times, by outputting eight times, only with the variation of the time of a single symbol output as with the pen-type code generation apparatus, it is possible to output 65,536 (16 bit) pattern codes. Combined with output time, output intensity, shape, size, arrangement patterns or the like of a symbol, it is possible to output an enormous amount of pattern codes (information). The above gap times may have arbitrary time intervals if each can be discriminated, the type and the number of times of output may also be arbitrary, and the number of pattern codes can be set freely. Note that in the example of FIG. 11(A), the gap time between symbol outputs is fixed.

Figure 11B:
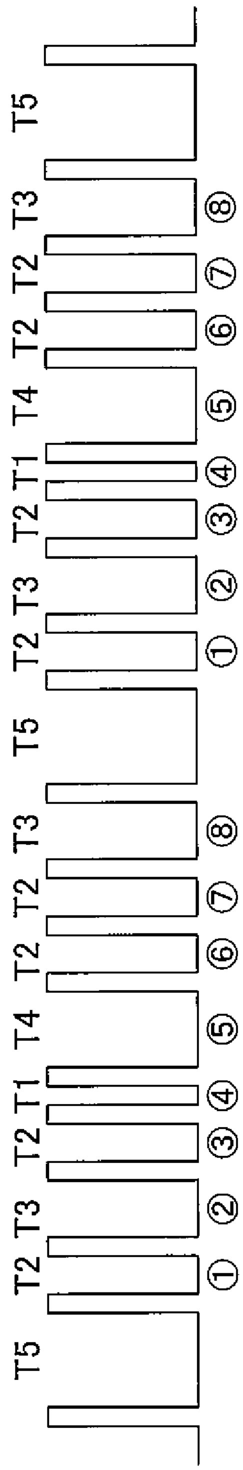

Furthermore, for example, as shown in FIG. 11(B), by setting "output (ON)" at the beginning with the gap time to be referenced to (hereinafter referred to as "reference gap time"), it is also possible to recognize the gap time of other symbols from the reference gap time.

Here, with the reference gap time set to 250 msec, and T1 to T4 to ⅕ (50 msec), ⅖ (100 msec), ⅗ (150 msec) and ⅘ (200 msec) of the reference gap time, respectively, as four types (2 bits) of gap times, by outputting the symbol eight times, it is possible to output 65,536 (16 bit) pattern codes.

In order to prevent recognition omission or misidentification of symbols, information output after the reference gap time of 250 msec may be repeated plural times.

Figure 11C:
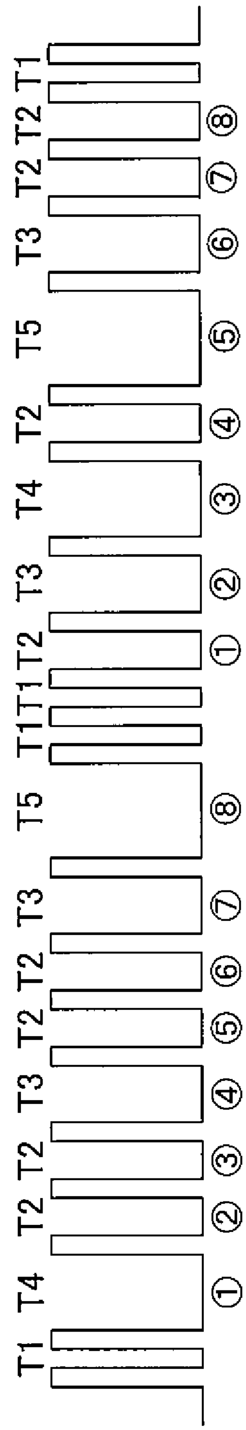

Furthermore, for example, as shown in FIG. 11(C), by performing "output (ON)" at a reference gap time at the beginning at least once and using the number of "output (ON)" at the reference output time as an index, the pattern code may also be blocked and be output. Here, after outputting a symbol once and twice with a reference gap time of T1, two blocked pattern codes are output as the index of two different pattern codes. Thus, like the pen-type code generation apparatus 1, it is possible to output 4,294,967,296 pieces (32 bits) of information only by varying the times for a single symbol output. Indexes do not need to be in ascending order and they can be set arbitrarily, and also, the number of times to output symbols with a pattern code can be set arbitrarily.

FIG. 12 shows a specific example of a case in which the pattern code (information) is output during the intervals of the symbol output time and the gap time.

Figure 12A:
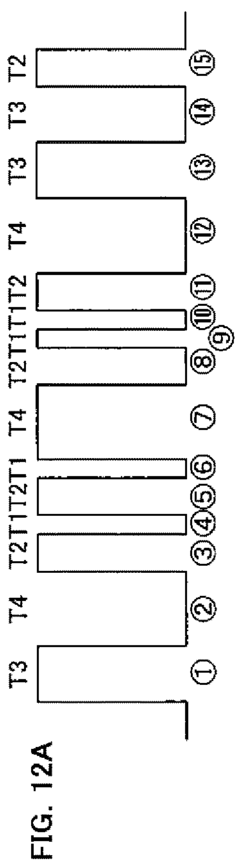
FIG. 12 is a diagram showing a specific example of a case where pattern codes (information) are output during symbol output time spans and during time gaps between symbol outputs.

As shown in FIG. 12(A), plural kinds of output time and gap time intervals are set. Specifically, for example, with T1 to T4 set to 50 msec, 100 msec, 150 msec, and 200 msec, respectively, as four types (2 bits) of output times and gap times, by outputting eight times, only with the variation of the time of a single symbol output as with the pen-type code generation apparatus, it is possible to output 65,536 (16 bit) pattern codes.

Combined with output intensity, shape, size, arrangement patterns or the like of a symbol, it is possible to output an enormous amount of pattern codes (information). The above output times and gap times may have arbitrary time intervals if each can be discriminated, the type and the number of times of output may also be arbitrary, and the number of pattern codes can be set freely.

Figure 12B:
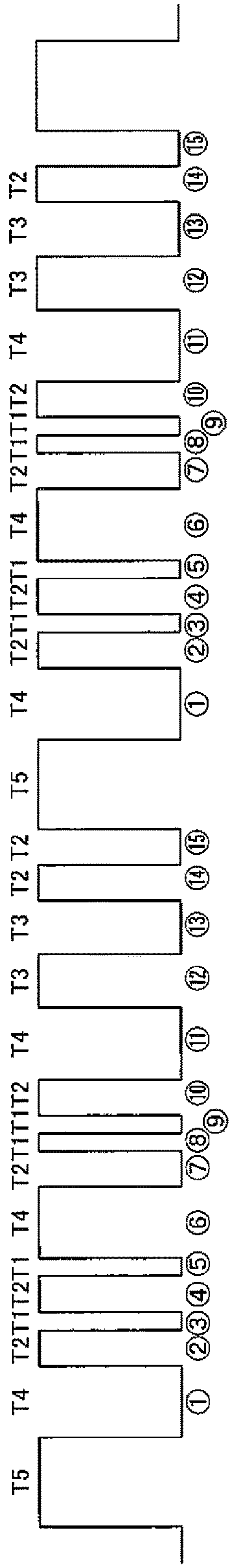

Furthermore, for example, as shown in FIG. 12(B), by setting "output (ON)" at the beginning with the reference output time, it is also possible to recognize the output time and the gap time of other symbols from the reference gap time.

Here, with the reference output time set to 250 msec, and T1 to T4 to ⅕ (50 msec), ⅖ (100 msec), ⅗ (150 msec) and ⅘ (200 msec) of the reference output time, respectively, as four types (2 bits) of output and gap times, by outputting the symbol eight times, it is possible to output 65,536 (16 bit) pattern codes. In order to prevent recognition omission or misidentification of symbols, information output after the reference output time of 250 msec may be repeated plural times.

Figure 12C:
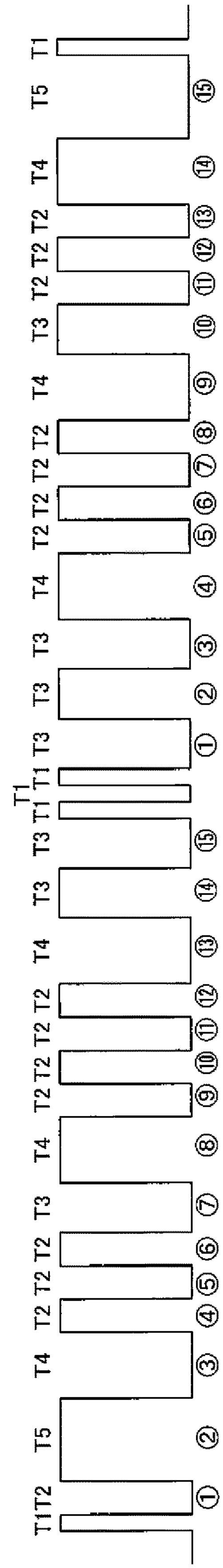

Furthermore, for example, as shown in FIG. 12(C), by performing "output (ON)" at a reference output time at the beginning at least once and using the number of "output (ON)" at the reference output time as an index, the pattern code may also be blocked and be output. Here, after outputting a symbol once and twice with a reference output time of T1, two blocked pattern codes are output as the index of two different pattern codes. Thus, like the pen-type code generation apparatus 1, it is possible to output 4,294,967,296 pieces (32 bits) of information only by varying the times for a single symbol output. Indexes do not need to be in ascending order and they can be set arbitrarily, and also, the number of times to output symbols with a pattern code can be set arbitrarily.

FIG. 13 shows a specific example of a case in which the pattern code (information) is output by the output intensity of the symbol.

Figure 13A:
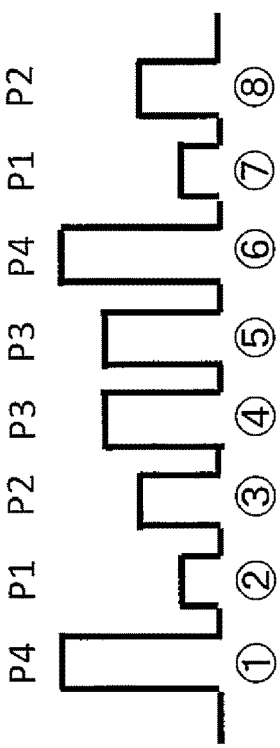
FIG. 13 is a diagram showing a specific example where pattern codes (information) are output in accordance with symbol output strengths.

As shown in FIG. 13(A), plural types of output intensities are set. Specifically, for example, for electrostatic capacitance, with the symbol output intensity levels P1 to P4 set to 5 pico, 10 pico, 15 pico, and 20 pico, respectively, as four types (2 bits) of symbol output intensity levels, by outputting eight times, only with the variation of the time of a single symbol output as with the pen-type code generation apparatus, it is possible to output 65,536 (16 bit) pattern codes.

Combined with output time, gap time, shape, size, arrangement patterns, or the like of the symbol, it is possible to output an enormous amount of pattern codes (information).

The above intensity levels may have arbitrary intensities as long as each can be discriminated, the type and the number of times of output may also be arbitrary, and the number of pattern codes can be freely set.

Note that if the size, placement, and intensity of the symbols output each time are different, there is no need for a gap between the symbol outputs.

Figure 13B:
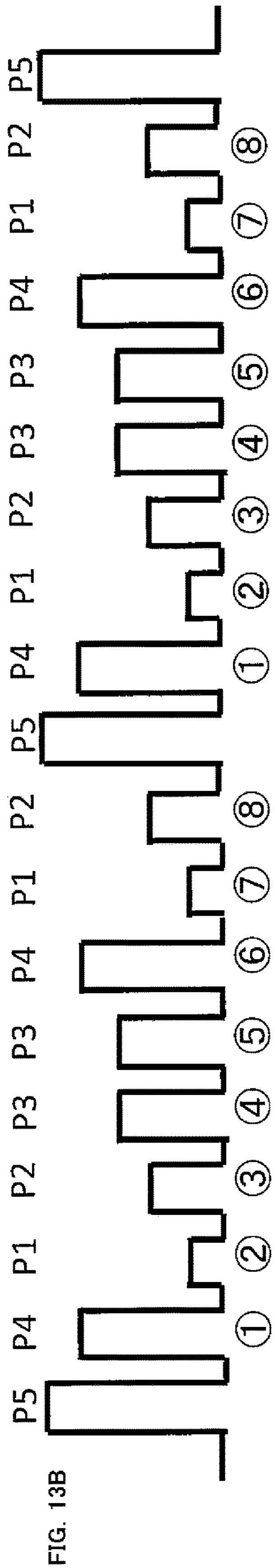

Furthermore, for example, as shown in FIG. 13(B), by setting "output (ON)" at the beginning with the output intensity to be referenced to (hereinafter referred to as "reference output intensity"), it is also possible to recognize the output intensity of other symbols from the reference output intensity.

Here, with the reference output intensity set to 25 pico, and P1 to P4 to ⅕ (5 pico), ⅖ (10 pico), ⅗ (15 pico), ⅘ (20 pico) of the reference output intensity, respectively, as four types (2 bits) of output intensities, by outputting the symbol eight times, it is possible to output 65,536 (16 bit) pattern codes.

In order to prevent recognition omission or misidentification of symbols, information output after the reference output intensity of 25 pico may be repeated plural times.

Figure 13C:
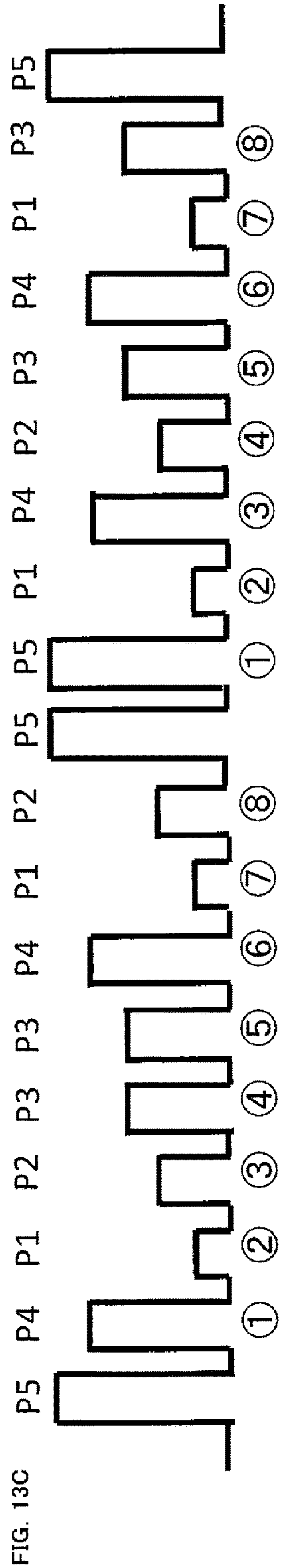

Furthermore, for example, as shown in FIG. 13(C), by performing "output (ON)" at a reference output intensity at the beginning at least once and using the number of "output (ON)" at the reference output intensity as an index, the pattern code may also be blocked and be output. Here, after outputting a symbol once and twice with a reference output intensity of P1, two blocked pattern codes are output as the index of two different pattern codes. Thus, like the pen-type code generation apparatus 1, it is possible to output 4,294,967,296 pieces (32 bits) of information only by varying the times for a single symbol output. Indexes do not need to be in ascending order and they can be set arbitrarily, and also, the number of times to output symbols with a pattern code can be set arbitrarily.

Note that the present invention is not restricted to the above-described embodiments, and variations, improvements and the like within the scope of achieving the objective of the present invention are included.

For example, forms such as size and shape of a symbol for generating a code is fixed in the above embodiment, but they may be variable.

Thus, with the forms of a symbol being variable, it is also possible to define a pattern code by the combination of the forms.

Figure 14:
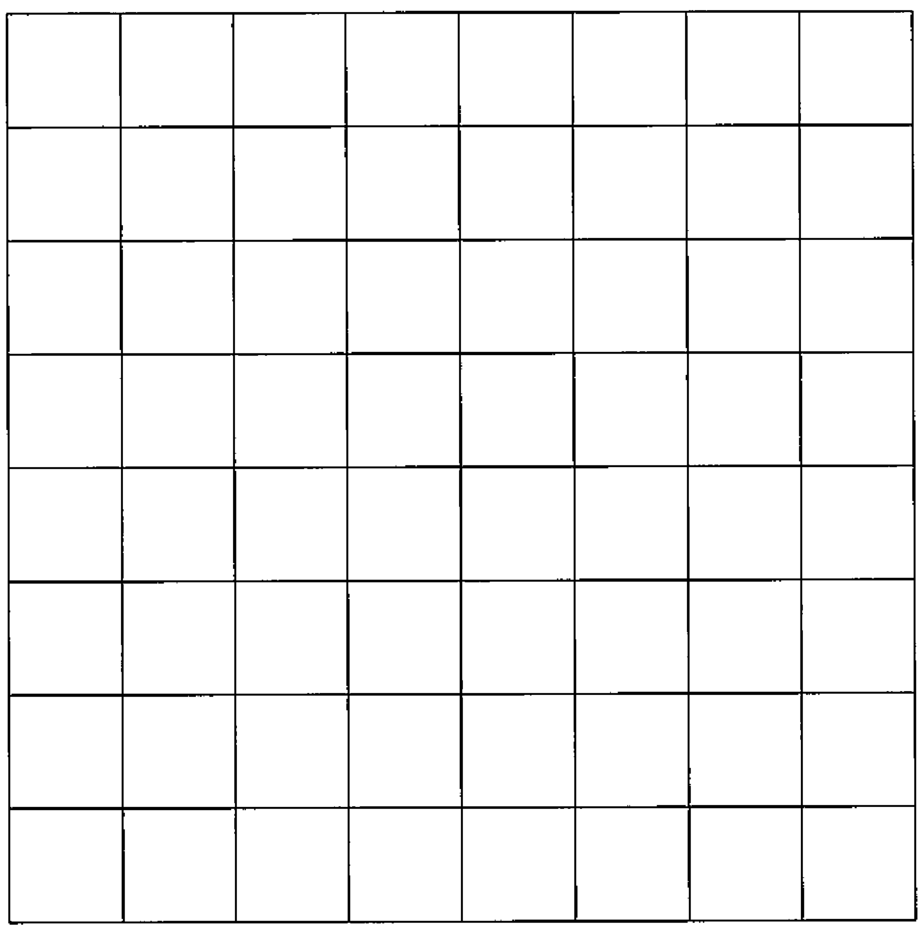
FIG. 14 is a diagram showing an example of a code output unit adopting rectangular division conductor control as a control for changing the form of a symbol.

FIG. 14 is a diagram showing an example of a code output unit adopting rectangular division conductor control as a control method for changing the form of a symbol.

Figure 15:
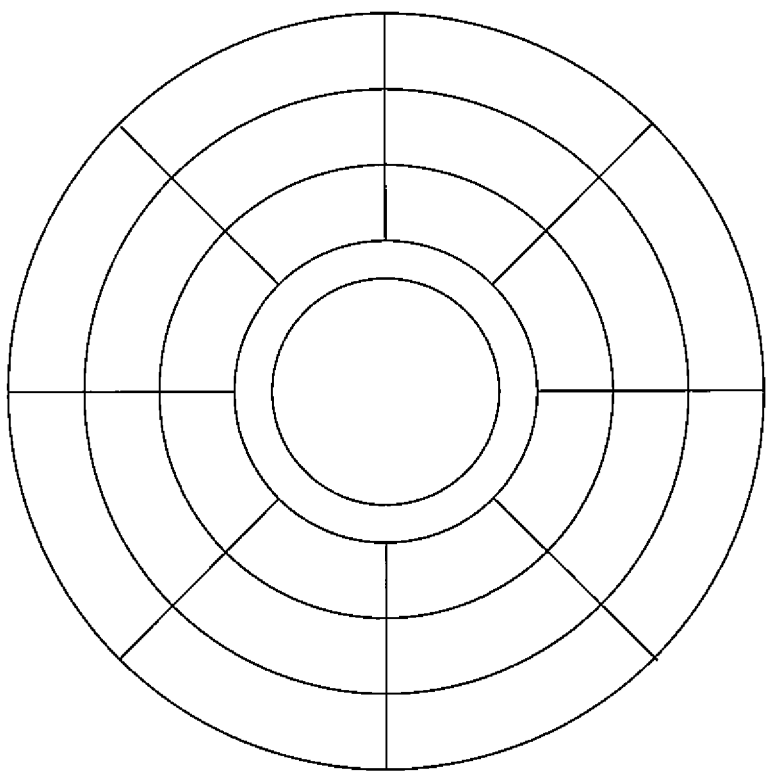
FIG. 15 is a diagram showing an example of a code output unit adopting circular split conductor control as a control for changing the form of a symbol.

FIG. 15 is a diagram showing an example of a code output unit adopting circular split conductor control as a control method for changing the form of a symbol.

A plurality of conductive cells having a size of about 5 mm are arranged adjacent to each other in a lattice shape as shown in FIG. 14 or in a dome shape around the photographing hole (information reading area IA) as shown in FIG. 15, and by making it possible to control "output (ON)" with an arbitrary number of these conductive cells in an arbitrary number of combinations, it is possible to make the form of a symbol variable. As a result, it is possible to output the pattern code based on the form of the symbol.

FIG. 16 is a diagram showing a specific example of a case in which the pattern code (information) is output in the form of a symbol.

Figure 16A:
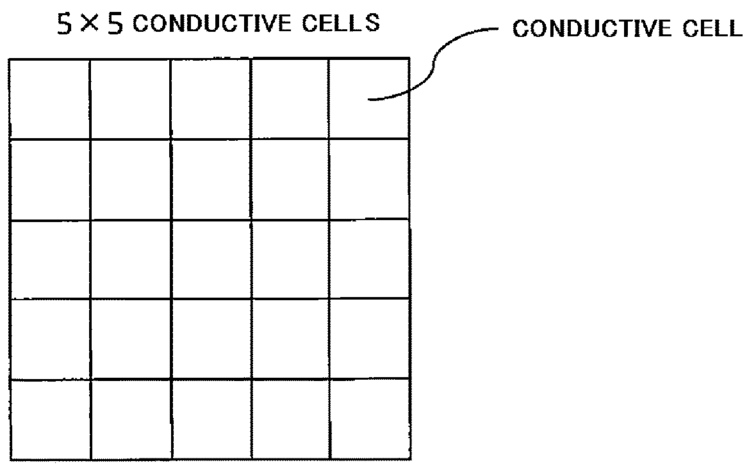
FIG. 16 is a diagram showing a specific example of a case where pattern codes (information) are output in the form of symbols.

As shown in FIG. 16(A), by varying the ON/OFF pattern of the output of each conductive cell in a state where a plurality of conductive cells are arranged adjacent to each other, it is possible to control forms such as the size and shape of a symbol formed from a conductive cell that is ON to be unique. By this control, it is possible to output a pattern code.

For example, as shown in FIG. 16(A), consider a case in which 5×5=25 conductive cells are arranged as an example.

Figure 16B:
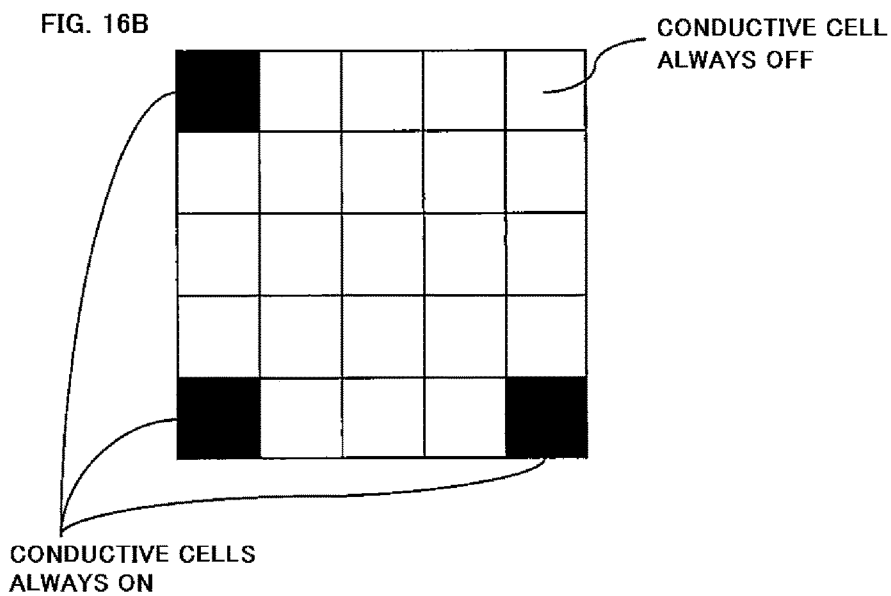

For example, as shown in FIG. 16(B), with three predetermined conductive cells out of the four cells in the corners always kept ON and one always kept OFF (here, a conductive cell need not be placed), by controlling the ON/OFF of each of the other conductive cells 25-4=21, it is possible to output 21 bits (209715) of codes by the output of one symbol. In this case, it becomes a patch pattern.

Here, it is possible to reduce the amount of information somewhat, and exclude conductive cells to be turned off from the set of conductive cells to be turned on.

Figure 16C:
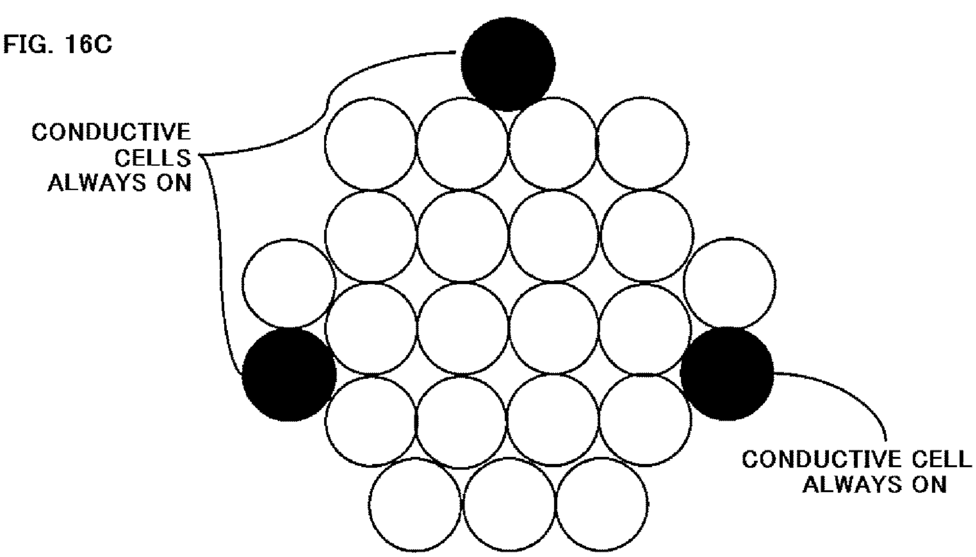

In the examples of FIGS. 16(A) and 16(B), square conductive cells are arranged in a square shape, but this is particularly not a necessity. For example, as shown in FIG. 16(C), the shape of the conductive cell is arbitrary, and it may be arranged in to form any shape.

Furthermore, in the example of FIG. 16, a symbol in which three conductive cells as references are kept ON is adopted, but it is possible to adopt a symbol in which the conductor is turned on so as to make the form unique, and output a pattern code based on this symbol.

Furthermore, a plurality of symbols which can change these forms may be arranged to increase the amount of information. Still more, by outputting in the time direction a plurality of times, the information amount may be increased further.

By the way, although the predetermined information C of a code has been embedded in the medium 2 such as a card in the above embodiment, it is not particularly restricted to it and can be embedded in an arbitrary place.

For example, the predetermined information C of a code may be displayed on a display of a smartphone, a personal computer, a television receiver, or the like, including those functioning as a code recognition apparatus 3.

FIG. 17 is a schematic diagram showing how the code generation apparatus 1 acquires a dot code (predetermined information C) shown on a display.

Figure 17A:
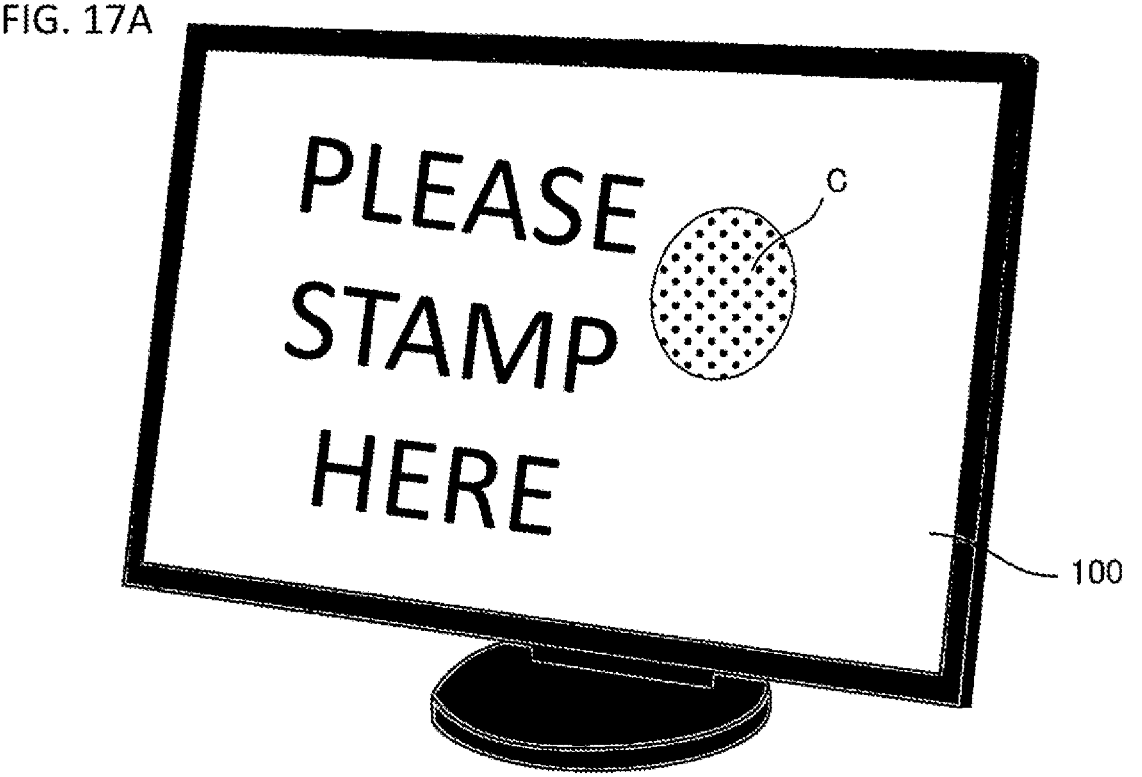
FIG. 17 is a schematic diagram showing how a code generation apparatus obtains a dot code (information) shown on a display.

As shown in FIG. 17(A), a dot pattern indicating a dot code (predetermined information C) is displayed in the predetermined display area of the display 100.

Figure 17B:
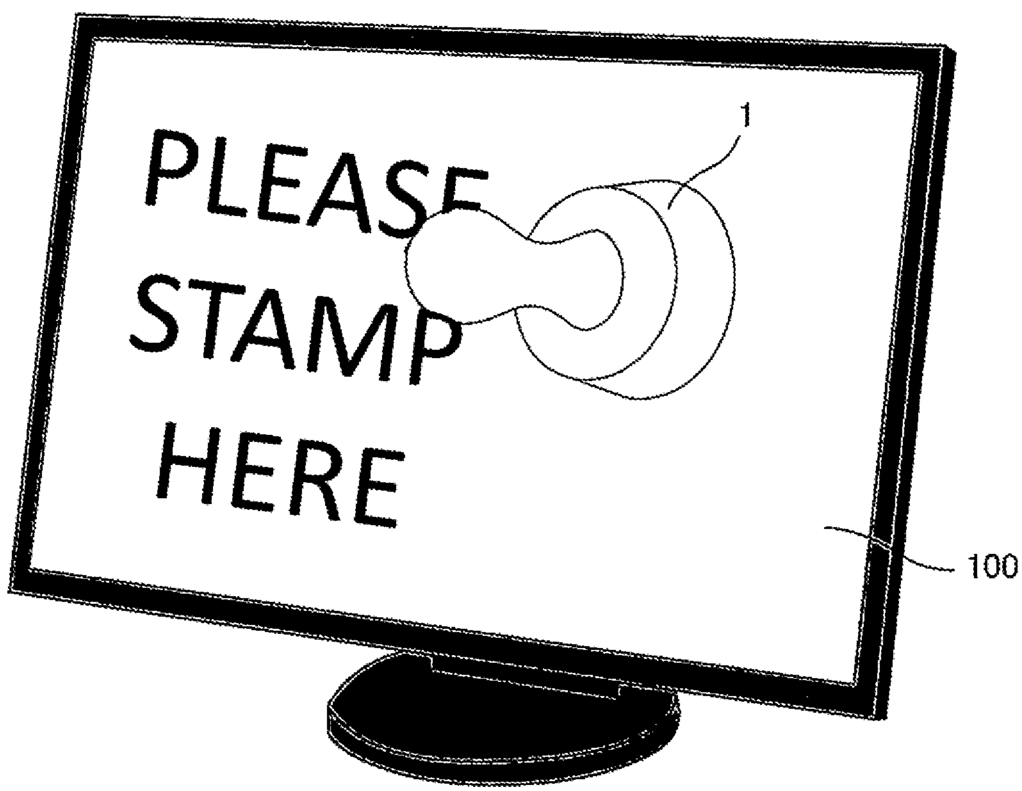

As shown in FIG. 17(B), when the code generation apparatus 1 is placed on the display surface (the display area in which a dot pattern indicating a dot code (predetermined information C) is displayed) of the display 100, the information reading unit 11 of the code generation apparatus 1 reads the dot code (predetermined information C).

Here, the display on which the dot code (predetermined information C) is displayed is not particularly restricted, and it may be that of the touch panel 31 of a smartphone functioning as a code recognition apparatus 3.

FIG. 18 is a schematic diagram showing how the code generation apparatus 1 acquires a dot code (predetermined information C) displayed on the touch panel 31 of a code recognition apparatus 3.

Figure 18A:
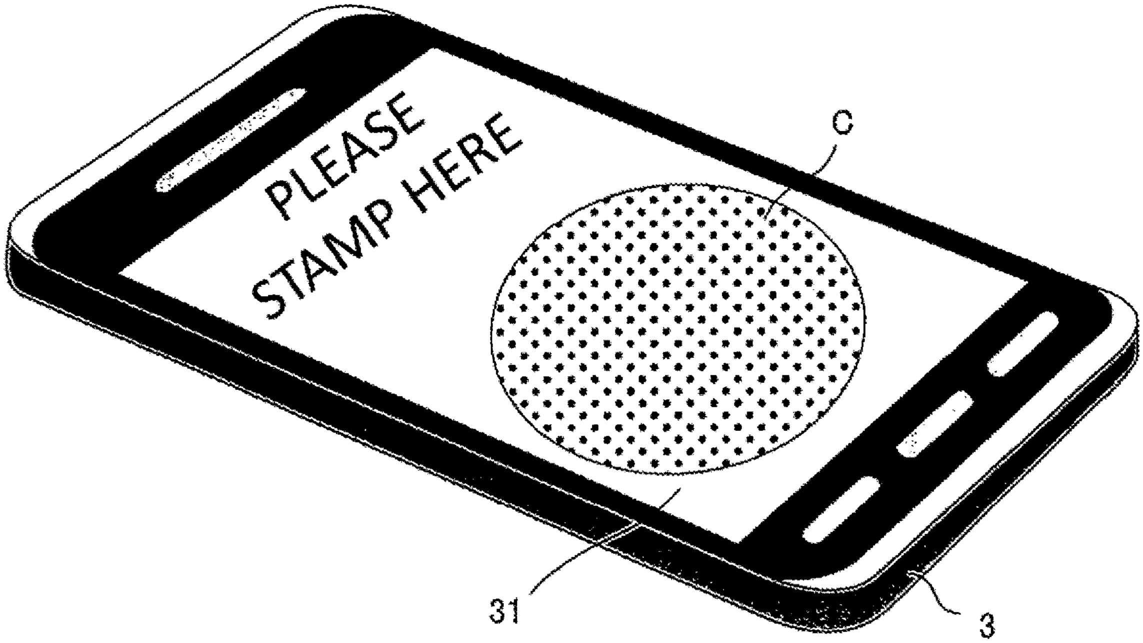
FIG. 18 is a schematic diagram showing how the code generation apparatus 1 acquires a dot code (information) displayed on the touch panel of a code recognition apparatus.

As shown in FIG. 18(A), a dot pattern indicating a dot code (predetermined information C) is displayed in the predetermined display area of the touch panel 31 of the code recognition apparatus 3.

Figure 18B:
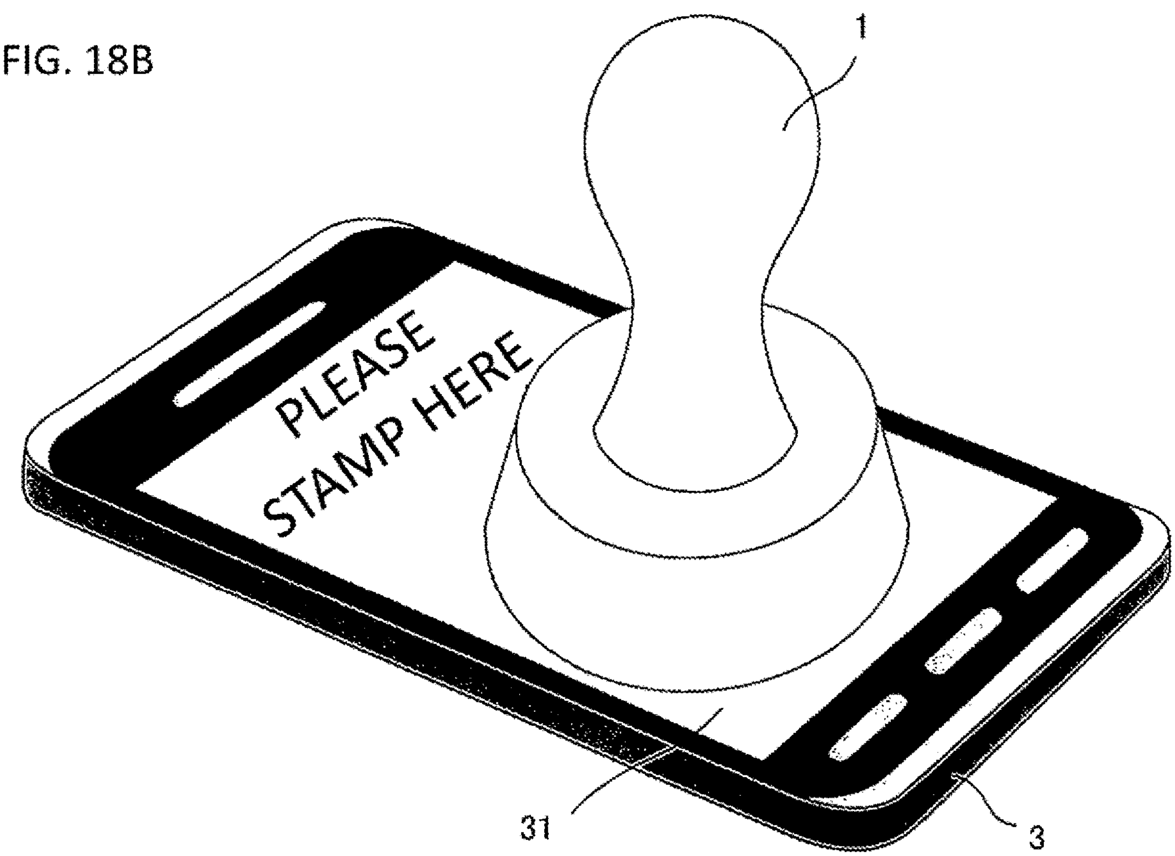

As shown in FIG. 18(B), when the code generation apparatus 1 is placed on the display surface of the touch panel 31 of the code recognition apparatus 3 (the display area in which a dot pattern indicating a dot code (predetermined information C) is displayed), the information reading unit 11 of the code generation apparatus 1 reads the dot code (predetermined information C).

In the case of the example of FIG. 18, the output and reception of data can be confirmed by performing the following series of processings.

First, from the medium 2, on which a dot pattern indicating a dot code (predetermined information C) is formed, the information reading unit 11 of the code generation apparatus 1 reads the dot code (predetermined information C).

The code output unit 13 of the code generation apparatus 1 outputs the dot code (predetermined information C) as a predetermined pattern code to the touch panel 31 of a smartphone functioning as a code recognition apparatus 3.

The touch panel 31 of the smartphone displays a dot pattern indicating the recognized dot code (predetermined information C).

The information reading unit 11 of the code generation apparatus 1 reads the dot code (predetermined information C) by photographing the light emitted from the touch panel 31 of the smartphone. Thus, a dot pattern indicating the recognized dot code (predetermined information C) from the pattern code output by the code output unit 13 of the code generation apparatus 1 is displayed, and if the information reading unit 11 of the code generation apparatus 1 reads it and the predetermined information C are identical, erroneous recognition can be completely eliminated, and an authentication system with extremely high security can be realized.

In another embodiment, it is not necessary to read the dot code (predetermined information C) from the medium 2 on which the dot pattern indicating the dot code (predetermined information C) is formed, and if the user selects a predetermined dot pattern displayed together with graphics and texts on the touch panel 31 of a smartphone functioning as the code recognition apparatus 3, and places the code generation apparatus 1 onto the place it is displayed, and the information reading unit 11 reads it, information from the code recognition apparatus 3 can be read. By this series of operations, it is possible to select an icon, a graphic, or a text displayed together with the dot pattern displayed on the touch panel 31 of the smartphone without using the medium 2 on which the dot pattern indicating the dot code (predetermined information C) is formed, so that various contents such as shopping, games, learning can be operated interactively. Thus, by a comparison of the touch by the finger and the recognition of the pattern code output from the code generation apparatus 1, who is operating can be specified. Therefore, in shopping, it is possible to identify the user making purchases and to recognize what is being purchased and in games, when a plurality of people are participating, it is possible to specify who has operated and thus it is easy to realize competition games or the like. Furthermore, through the recognition of information based on the manipulation of operation buttons and the moving/rotating of the code generation apparatus 1 by the code recognition apparatus 3, a limitless number of contents enjoyable interactively can be realized.

By performing such a series of processings, it is possible to confirm the output and reception of data.

Furthermore, the code generation apparatus 1 can grasp the placement position of the code generation apparatus 1 on the touch panel 31 of the smartphone, and can also output a corresponding pattern code.

In this case, in the medium 2, when dots are overlay printed on a printed matter with infrared absorbing ink and the information reading unit 11 extracts dots only in the infrared region, it is necessary to irradiate the medium 2 with the infrared LED. If the code generation apparatus 1 is a pen-type, since sunlight may enter from the surroundings, an infrared transmitting filter is necessary. On the other hand, if the code generation apparatus 1 is a pen stamp type, there is no danger of sunlight entering from the surroundings, it is possible to image only dots printed with infrared sensitive ink, and thus an infrared transmitting filter is unnecessary. Note that infrared rays for irradiation may be replaced with ultraviolet rays, and you only have to print dots with ultraviolet sensitive ink.

When the information reading unit 11 reads a dot pattern displayed on a display such as the touch panel 31 of a smartphone, reading is executed in the visible light region.

Since the infrared light irradiated from an infrared LED does not return by reflection by the display, the information reading unit 11 does not photograph reflected infrared rays. On the other hand, in the case of the stamp-type code generation apparatus 1, as described above, since an infrared transmitting filter is not provided, the information reading unit 11 can capture visible light from the display. That is, the information reading unit 11 can read the dot code (predetermined information C) from the dot pattern displayed on the display.

Thus, the information reading unit 11 can capture both a dot pattern printed with display infrared absorption ink and a dot pattern (which emits light with visible light) shown on a display, and read the dot code (predetermined information C), and it is possible to read the dot code accurately, regardless of the medium on which the dot pattern was formed. Furthermore, if the code generation apparatus 1 continuously outputs from at least two or three conductors, regardless of how the code generation apparatus 1 is moved and/or rotated on the display, its position and operation state can be recognized, and thus the code recognition apparatus 3 can recognize an amount of information which far exceeds that by the operation of the user's finger, of which rotation is difficult to recognize. In the first place, with finger manipulation, it is impossible to recognize whose finger or which finger.

However, in the case of output with two conductors, in order to recognize the orientation and the arrangement, it is necessary for the code recognition apparatus 3 to track down whether the output from the two conductors is the start point or the end point, and to continue to constantly recognize it during movements and rotation In the case with more than 3, if they are in a unique arrangement (an arrangement that does not become the same unless it is rotated 360 degrees), the code recognition apparatus 3 can recognize uniquely where the code generation apparatus 1 is located.

In other words, the information reading unit 11 is not restricted to the above-described embodiment, and as long as the predetermined information C can be read, anything arbitrary can be adopted.

For example, an optical reading sensor, an electromagnetic wave reading apparatus, or the like for reading a two-dimensional code (predetermined information C) of a dot code or the like, can be adopted as the information reading unit 11.

When an optical reading sensor is adopted as the information reading apparatus 11 of a stamp type code generation apparatus 1, as described above, by irradiation with IRLED, it is possible to read the two-dimensional code (predetermined information C) of a dot code or the like in the infrared region with a printed medium, and in the visible light region with a display.

For example, forms such as the size and the shape of a stamp unit 16 of a stamp type code generation apparatus 1 is not particularly restricted to those in the embodiments described above.

For example, the stamp unit 16 may be enlarged so as to cover the case, thereby increasing the degree of freedom of the arrangements of the dots (conductors). Thus, it is possible to stabilize the code generation apparatus 1 at the moment of placement.

Furthermore, for example, the code generation apparatus 1 may not only transmit a pattern code to a code recognition apparatus 3 such as a smartphone but may also be allowed to receive information from the code recognition apparatus 3. In this case, the method of communication is not particularly restricted, and wireless communication, voice sensing, light sensing, and the like can be adopted.

Furthermore, for example, the detection method of the "output (ON)" of the symbol of the code output unit 11 by the code recognition apparatus 3 is not restricted to the method of the above-described embodiment, that is, a method using an electrostatic capacitance type touch panel 31, and an arbitrary sensor such as a light sensor, a pressure sensor, or the like may be used instead.

In summary, the code generation apparatus and the code recognizing apparatus to which the present invention is applied suffices if the following configurations are taken, and may take various embodiments including the above-described embodiments.

That is, a code generation apparatus to which the present invention is applied is equipped with:

an information reading unit that reads predetermined information;

a code generation unit in which generates a code related to the said predetermined information and represented by at least a spatial direction or a time direction of one or more symbols as a pattern code;

a pattern code output unit in which a pattern code is output by changing the presence/absence of output based on response propriety of a sensor in accordance with the said arrangement pattern indicating the said pattern code for each of the said one or more symbols each time the said pattern code is generated.

The said sensor is an electrostatic capacitive type position input sensor included in a touch panel, and the said pattern code output unit can be made to have the pattern code output by changing the presence/absence of output based on response propriety of the said electrostatic capacitive type position input sensor in accordance with the said arrangement pattern indicating the said pattern code for each of the said one or more symbols each time the said pattern code is generated.

The said pattern code may be made to be defined based on the unit pattern with a pattern in which each of a plurality of the symbols is arranged at a position predefined in a spatial direction as a basic pattern, and a pattern in which the response propriety of the said sensor for each of a plurality of said symbols included in the said basic pattern is defined, as a unit pattern.

The said pattern code may be made to be defined based on the combination of the arrangements of a plurality of types of the said unit patterns in the time direction.

The said pattern code may be made to be defined based on the combination of the arrangement of the said symbols in the time direction.

A combination of the arrangements of the said symbols in the time direction may be made to be a combination based on the output times when the output time of the said symbols is variable.

A combination of the arrangements of the said symbols in the time direction may be made to be a combination based on the gap times when the gap time between outputs of the said symbols is variable.

A combination of the arrangements of the said symbols in the time direction may be made to be a combination based on the output times and the gap times when the output time and the gap time of the said symbol are variable.

A combination of the arrangements of the said symbols in the time direction may be made to be a combination based on the output intensities when the output intensity of the said symbol is variable.

The said pattern code may be made to be defined based on the form when the form of the said symbol is variable.

An operation unit that is operated by a user and arranged on the side opposite of a said detection surface in a state in which the said code generation apparatus is placed on the detection surface of the said sensor may be made to further be equipped.

An operation by the said operation unit may be made to include an operation of activating at least the said information reading unit or the said pattern code generating unit.

An activation unit for activating at least the said information reading unit or the said pattern code generating unit under the condition in which the said code generation apparatus is placed on the detection surface of the said sensor may be made to further be equipped.

The said activation unit may be made to be equipped a switch that is in the ON state when the said code generation apparatus is placed on the detection surface of the said sensor and in an OFF state when the placement is terminated.

A biometric authentication unit that detects biometric information of a user who operates the said code generation apparatus and authenticates the user by using the detection result may be made to be further equipped.

A presenting unit for presenting information on the generated said pattern code to the user may be made to be further equipped.

The said code generation apparatus may be made to be further equipped with a code erasing unit which changes the said sensor not to react with any of the said plurality of symbols when an instruction to erase the said pattern code is given.

The said predetermined information read by the said information reading unit may be made to be a two-dimensional code.

The said two-dimensional code may be made to be a dot code.

The said predetermined information read by the said information reading unit may be made to be information displayed on a predetermined display device.

A irradiating unit for irradiating the said predetermined information with light of the said predetermined wavelength of which the said predetermined information read by the said information reading unit is information that responds to light of a predetermined wavelength, and a blocking unit that blocks external light in which the said code generation apparatus is placed on the display surface of the said display device may be made to further be equipped A code recognition apparatus to which the present invention is applied is a code recognition apparatus for recognizing the said pattern code generated from the code generation apparatus described above, and the code recognition apparatus is equipped with:

the said display device which shows the said predetermined information, the said predetermined sensor a detection unit for detecting the said arrangement pattern of the one or more symbols based on a result of detection by the said sensor with respect to the said one or more symbols whose response propriety to the said sensor is changed by the said pattern code output unit of the said code generation apparatus a recognition unit that recognizes the said pattern code generated by the said code generation unit of the said code generation apparatus based on the said arrangement pattern of the detected said one or more symbols.

A touch panel with the said display device and a electrostatic capacitive type position input sensor stacked on the display surface of the said display device as the said sensor may be made to be equipped.

In addition to the said pattern code, the said recognition unit may further be made to recognize the orientation or the movement trajectory of the said code generation apparatus that is brought into contact with or is brought into proximity with the said touch panel, the number of times the code generation apparatus is brought into contact with or is brought into proximity with the said touch panel, or a combination of at least two of them.

The series of processings described above can be executed by hardware or software.

When a series of processings is executed by software, the program constituting the software is installed in a computer or the like from a network or a recording medium.

The computer may be a computer incorporated in dedicated hardware. Furthermore, the computer may be a computer capable of executing various functions by installing various programs, for example, a general-purpose personal computer.

A recording medium including such a program is not only constituted by a removable storage medium distributed separately from the main body of the apparatus in order to provide a program to the user, but is also provided to the user with a recording medium or the like pre-installed in the main body of the apparatus.

The removable storage medium consists of, for example, a magnetic disk (including a floppy disk), a Blu-ray Disc (registered trademark), an optical disk, a magneto-optical disk, or the like. The optical disk consists of, for example, a CD-ROM (Compact Disk-Read Only Memory), a DVD (Digital Versatile Disk), or the like. The magneto-optical disk consists of an MD (Mini-Disk) or the like. Furthermore, the recording medium provided to the user pre-installed in the main body of the apparatus consists of, for example, a ROM in which a program is recorded, a hard disk, or the like.

In this specification, steps describing programs to be recorded on a recording medium naturally includes processing executed in chronological order in accordance with the recorded order, but need not be in chronological order and may include processing executed in parallel or individually.

Furthermore, in this specification, terms of the system are to refer to those of the whole apparatuses composed of a plurality of apparatuses, plural means and the like.

The code generation apparatus to which the present invention is applied, as described above, suffices if a configuration appropriate to the sensor on the code recognition apparatus side is taken, and it is not particularly restricted.

Figure 19:
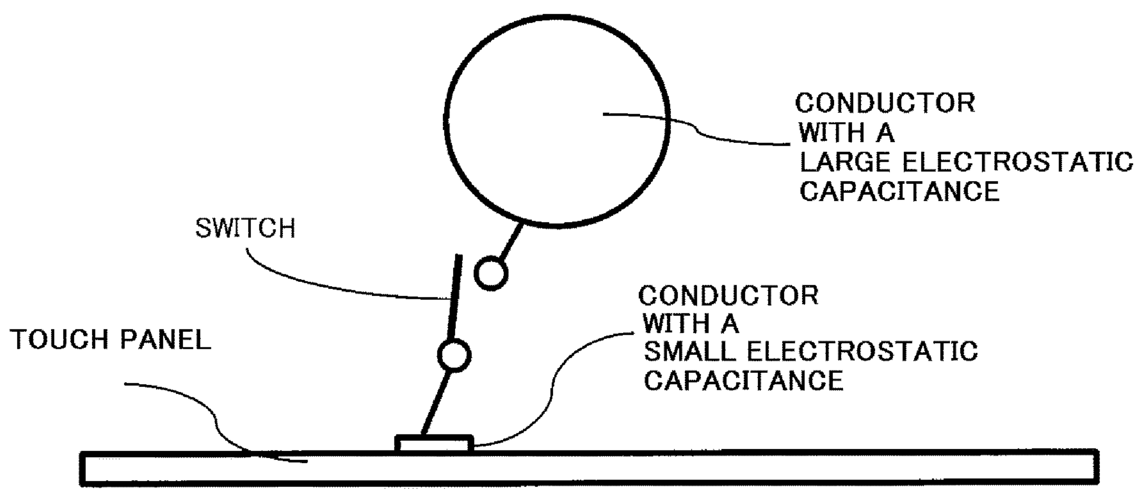
FIG. 19 is a schematic diagram showing a configuration example of a electrostatic capacitance control system.
Figure 20A:
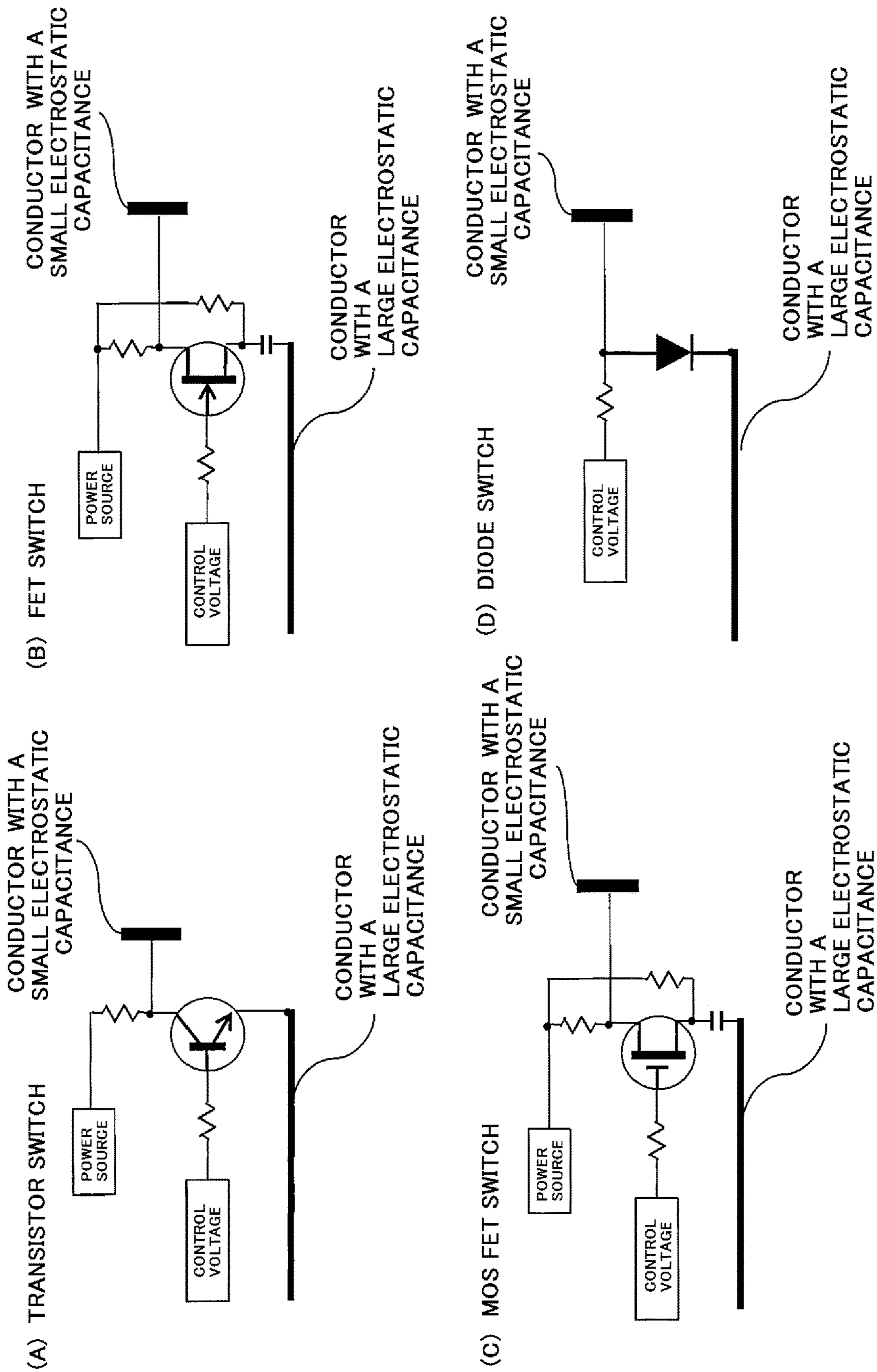
FIG. 20A is a diagram showing a configuration example of various semiconductor switches that can be adopted in the electrostatic capacity control system of FIG. 19.
Figure 20B:
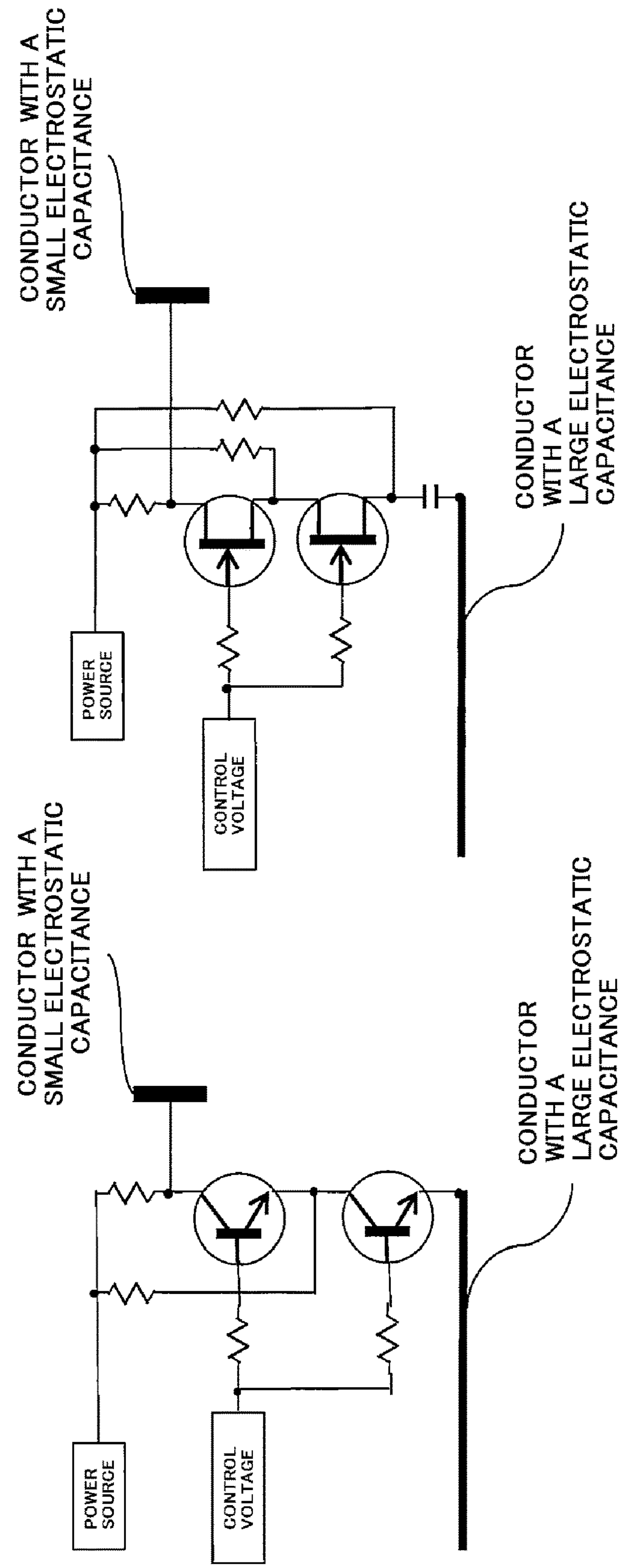
FIG. 20B is an explanatory diagram of an outline of the minimization of the electrostatic capacitance when the semiconductor switch in FIG. 20A is turned off.
Figure 21:
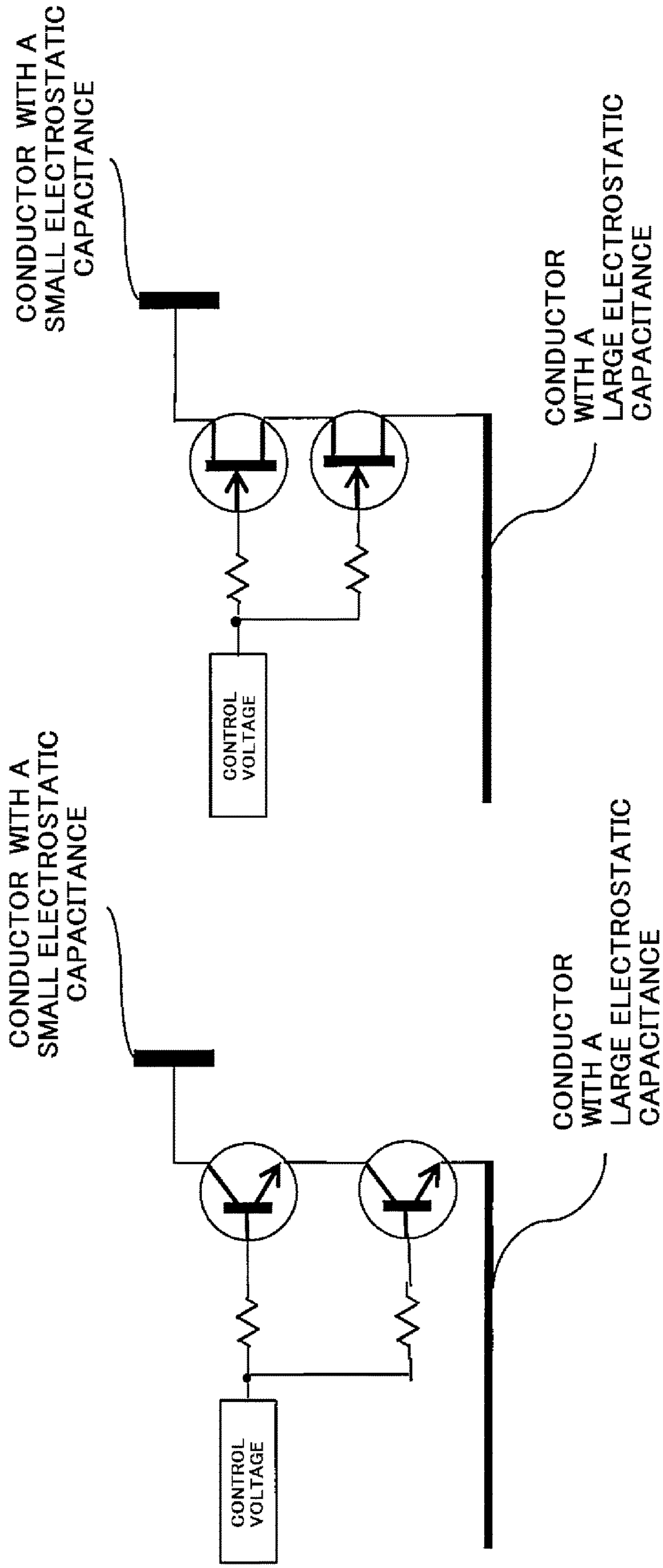
FIG. 21 is an example of a circuit with a switch consisting of a transistor and without a power supply.

For example, in a case where the code generation apparatus is of a stamp-type and the sensor on the side of the code recognition apparatus is an electrostatic capacitive type position input sensor included in the touch panel, the pattern code output unit as shown in FIGS. 19 to 21 can be realized.

Note that the pattern code output unit and the touch panel are collectively referred to as "electrostatic capacitance control system" hereinafter.

Furthermore, a control in which the pattern code output unit changes the presence/absence of output based on sensor response propriety for the predetermined symbol in accordance with the said arrangement pattern indicating the said pattern code, and the touch panel (position input sensor) detects the output symbol, will be referred to as "touch panel electrostatic capacitance detection control of the stamp conductor" hereinafter.

In other words, FIGS. 19 to 21 are diagrams for describing the principle of the touch panel electrostatic capacitance detection control of the stamp conductor.

FIG. 19 is a schematic diagram showing an example of a configuration of the electrostatic capacitance control system.

The code recognition apparatus is to consist of a smartphone or a tablet PC having an electrostatic capacitance detection type touch panel. In this case, the electrostatic capacitance detection type touch panel detects electrostatic capacitance as a touch operation by the approach of a conductor having a predetermined amount of electrostatic capacitance. The touch panel detects a small electrostatic capacitance of several picofarads (pF) or less and grasps the touch position.

Here, in the electrostatic capacitance control system shown in FIG. 19, when a conductor having a degree of electrostatic capacitance so small that it cannot be detected by the touch panel, is brought into proximity with the touch panel, and a conductor having a large electrostatic capacitance is electrically connected, the conductor having the small electrostatic capacitance becomes a conductor having a large electrostatic capacitance and thus can be detected by the touch panel. By using this principle, with one or more conductors with small electrostatic capacitance as at least a part of the symbols, with at least the change in the arrangement of conductors with large electrostatic capacitance or the change in the electrostatic capacitance in the time direction being controlled in the pattern code output unit of the code generation apparatus placed in the lower section, the touch panel on the code recognition apparatus side detects the electrostatic capacitance and the recognition unit of the code recognition apparatus recognizes the pattern code.

FIG. 20A shows an example of a configuration of various semiconductor switches adoptable in the electrostatic capacitance control system of FIG. 19. Note that in addition to semiconductor switches, various switches may be used.

Next, with reference to FIG. 20B, an overview of the minimization of electrostatic capacitance when the semiconductor switch of FIG. 20A is turned off will be described.

FIG. 20B is a schematic diagram for describing a current reduction system when the semiconductor switch of FIG. 20A is off.

A small current flows even when the semiconductor switch is turned off, as a result, the electric conductor may continue to possess a degree of electrostatic capacitance detectable by the touch panel.

In a case where a pattern code is output by changing the electrostatic capacitance in the time direction with the code generation apparatus kept placed on the touch panel or when a new pattern code is output by a predetermined method (operation of the operation button, acquisition of a two-dimensional code shown on a display, and autonomous control by a program) with the code generation apparatus kept placed, conductors of which conductivity had been detected must no longer be detected.

For that purpose, in order to minimize the amount of current to the extent that the electrostatic capacitance is not detected, it is necessary to ensure sufficiently high impedance at each switch. As one measure, as shown in FIG. 20B, semiconductors (transistor, FET) are arranged in two stages in series to reduce the amount of current to make the electrostatic capacitance equal to or less than the amount detected by the touch panel to prevent the touch panel from detecting the conductor. If two stages in series is not enough, the number of stages may be further increased. Furthermore, transistors, FETs, MOS FETs and the like made for high frequencies can greatly lower current and minimize electrostatic capacitance.

As above, although response propriety to the touch panel 31 according to the pattern code for each of a plurality of dots constituting the pattern code output unit 16 has been described to refer to conductive/nonconductive, changes in conductive/nonconductive states for conductors and the like or changes in electrostatic capacitance are included. Furthermore, the plurality of dots constituting the pattern code output unit 16 are not points without areas but are symbols having predetermined areas sufficient for response propriety to the touch panel 31. This symbol is an arbitrarily shaped symbol. The same shape and the same area are not required. Note that it is needless to say that the above dots are completely different from the dots of dot patterns and dot codes read by the information reading unit. Note that, the dot pattern is a two-dimensional code composed of a plurality of dots formed (including those optically formed by printing, stamping, display and the like) on a medium (including any shaped object). This two-dimensional code is a dot code which is numerical information (code) obtained by reading a dot pattern (including photographing and imaging). The predetermined information C includes a two-dimensional code such as a bar code, a QR code (registered trademark), a dot code, a color code, and numerical information (code) recorded on a wireless information recording medium. The above description also applies to the examples hereinafter.

A power supply is connected to the collector circuit of the bipolar transistor of FIG. 20A(A), and the drain circuit of the MOS transistor (FET) of FIGS. 20A(B) and 20A (C). However, when these are used as switches, providing a power supply is not required. FIG. 21(A) exemplifies a configuration of a circuit using a bipolar transistor as a switch with the power supply omitted. Furthermore, FIG. 21(B) exemplifies a configuration of a circuit using a MOS transistor (FET) as a switch with the power supply omitted. Note that as already described in FIG. 20B by connecting two transistors in cascade as shown in FIGS. 21 (A) and 21 (B), the capacitance of the collector-base junction capacitance, the emitter-base junction capacitance, the drain capacitance, the source capacitance and the like can be reduced. Furthermore, the number of stages for the cascade connection of the transistors is not restricted to two stages.

Next, an example different from the above-described configuration of the code generation apparatus 1 will be described with reference to the drawings in and after FIG. 22.

FIG. 22 is a schematic diagram showing an example of a configuration of a code generation apparatus 1 equipped with an information reading apparatus.

Specifically, FIG. 22 (A) is a side view showing an example of the appearance configuration of the code generation apparatus 1. FIG. 22 (B) is a bottom view showing an example of the appearance configuration of the code generation apparatus 1. FIG. 22 (C) is a diagram showing an example of the internal configuration of the front side of the code generation apparatus 1. FIG. 22(D) is a diagram showing an example of the internal configuration of the back side of the code generation apparatus 1. FIG. 22(E) is a side view showing an example of the appearance configuration of the enlarged stamp unit 16 of the code generation apparatus 1. FIG. 22(F) is a diagram showing an example of the internal configuration of the front side of the enlarged stamp unit 16 of the code generation apparatus 1.

As shown in FIG. 22, in addition to the information reading unit 11, the code generation unit 12, and the code output unit 13 described above, the stamp-type code generation apparatus 1 further consists of an operation button 14, a power button 15, a stamp unit 16, a CPU 17, an internal memory 18, a PCBA 19, a USB terminal 20, a speaker 21, a button switch 22, a self-weight switch 23, a wireless device 24, and a power supply unit 25.

Figure 22A:
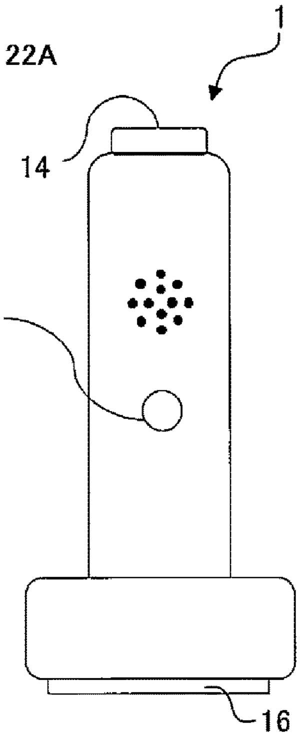
FIG. 22 is a schematic diagram showing an example of a configuration of code generation apparatus 1 equipped with an information reading apparatus.
Figure 22B:
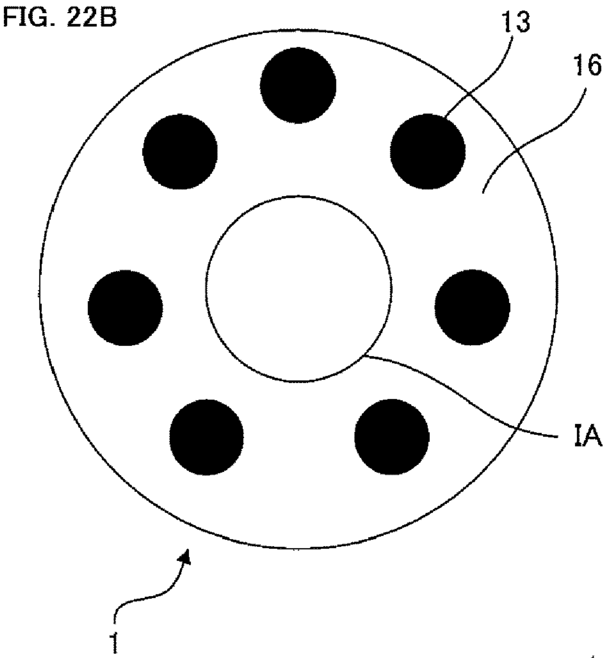
Figure 22C:
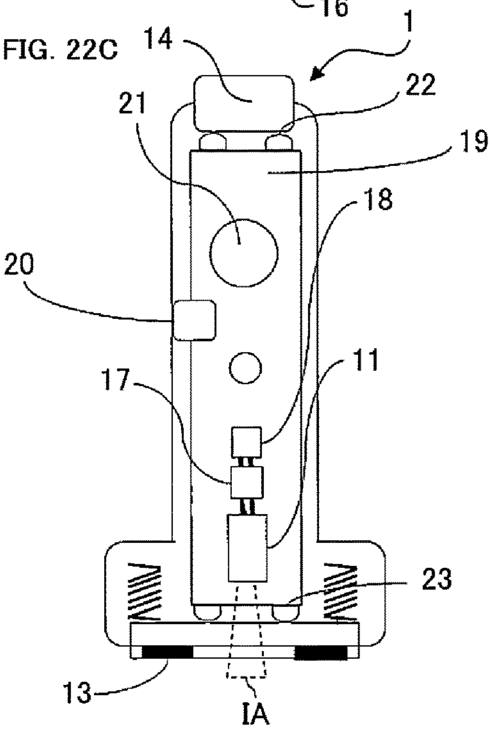

As in FIG. 22(A), the operation button 14 is provided at the upper end of the code generation apparatus 1, and is a button for the instruction operation of various types of control of the code generation apparatus 1, such as instruction to read the predetermined information C and instruction to turn on/off the pattern code. Specifically, when the operation button 14 is pressed, as shown in FIG. 22(C), the button switch 22 disposed inside the code generation apparatus 1 is switched from one of the ON and OFF states to the other state. Note that an LED may be provided inside the operation button 14 and various states may be expressed by the emitted color or emission pattern of the LED. Note that the operation button 14 is not a component indispensable to the code generation apparatus 1. Furthermore, the operation button 14 may be provided on the side face.

The power button 15 is provided on a side face of the code generation apparatus 1, and is a button for switching the power supply of the code generation apparatus 1 ON/OFF.

Figure 22D:
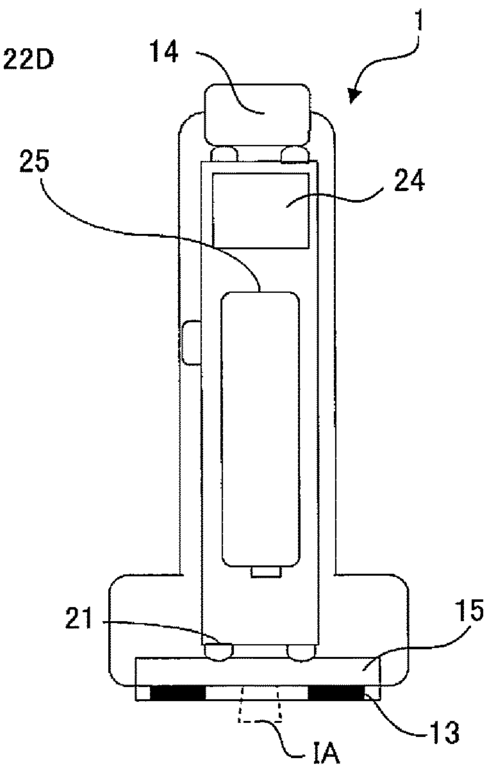
Figure 22E:
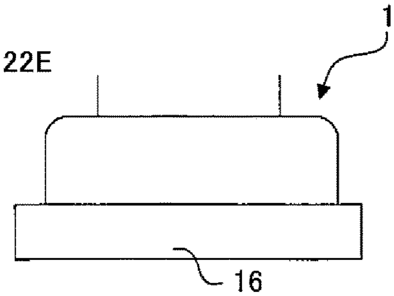

As shown in FIGS. 22(A) and 22(E), the stamp unit 16 is provided at the lower end of the code generation apparatus 1. As shown in FIG. 22 (B), the stamp unit 16 is provided with a code output unit 13 configured by the arrangement of a plurality of dots in a predetermined pattern with a hole opened in the center. This hole portion is an information reading area IA in which predetermined information C is read by the information reading apparatus 11. The information reading apparatus 11 may read the predetermined information C by coming into contact with the medium surface on which the predetermined information C is formed or may read the predetermined information C a certain distance apart from the medium surface.

A protective member such as nonconductive rubber, silicone, PET, or the like may be provided on the surface of the periphery of the plurality of symbols or the surface on which the symbol is placed so as to prevent damage of the display of the touch panel 31 or the like of the code recognition apparatus 3. Note that if the stamp unit 16 is to be moved on the display, it is preferable to adopt a material having a low friction coefficient for the bottom face of the stamp unit 16 (including a protective member if there is a protective member). However, if the stamp unit 16 is not to be moved on the display, it is preferable to adopt a material having a high friction coefficient. This is to prevent the code recognition apparatus 3 from slipping when placed, so that the symbol can surely be recognized instantaneously.

When reading the predetermined information C, as shown in FIG. 2(B), the stamp unit 16 is disposed on or above the symbol pattern (predetermined information C) of the medium 2. Thus, as shown in FIG. 22(C), the predetermined information C is read by the information reading unit 11 via the reading area IA.

Furthermore, when outputting the pattern code, as shown in FIG. 3(B), the stamp unit 16 comes into contact with or comes into proximity with the code detection area SP of the touch panel 31 of the code recognition apparatus 3. More precisely, a plurality of symbols of the code output unit 13 provided in the stamp unit 16 comes into contact with or comes into proximity with the code detection area SP of the touch panel 31 of the code recognition apparatus 3. Here, the plurality of symbols consists of a conductor or the like, and in accordance with the pattern code, response propriety of the touch panel 31 is controlled. That is, the touch panel 31 detects only symbols (their position coordinates) among the plurality of symbols that are made responsive. The pattern code is recognized based on the arrangement pattern and the like of the symbols detected in this manner.

Note that a specific example of the recognition of a pattern code by a plurality of symbols has been described with reference to FIGS. 6 and 7 and will therefore be omitted.

As in FIG. 22(C), the CPU 17 executes all of the control processings of the code generation apparatus 1, related to reading of predetermined information C, output of pattern codes, program update, control of input/output devices, and the like. By cooperating with predetermined software, the CPU 17 makes various functional blocks such as the code generation unit 12 of FIG. 2(C) function.

The built-in memory 18 stores programs executed by the CPU 17, various data and the like used by the CPU 17.

The PCBA 19 is a board on which various circuits necessary for the code generation apparatus 1 to execute the various processings shown in FIG. 2 are mounted.

When program update, data input/output, charging, and the like of the code generation apparatus 1 are performed, the USB terminal 20 is USB-connected to other devices not shown. Note that the USB terminal 20 is not indispensable to the code generation apparatus 1.

The speaker 21 outputs various sounds when predetermined information C is read, when various operation instructions are given, when contents including sound are reproduced, and the like. As described above, the button switch 22 is a switch that switches from one of the ON and OFF states to the other in response to a pressing operation of the operation button 14.

The button switch 22 may function independently as a seesaw button to instruct different operations for either independently.

The self-weight switch 23 is a switch that activates the pattern code output unit 13 by its own weight. Here, to activate is to establish a state of responsiveness to the touch panel 31 in accordance with the pattern code for each of a plurality of dots constituting the pattern code output unit 13. As shown in FIG. 2 (B), when the stamp unit 16 is disposed on or above the dot pattern (predetermined information C) of the medium 2, the self-weight switch 23 is activated by its own weight, and the predetermined information C is read by the information reading unit 11 via the reading area IA. The mechanism by which the self-weight switch 23 is activated by its own weight may help to achieve substantial power saving by activating pattern code output and dot pattern reading and the like processes which require electric power, only when the code generation apparatus 1 is mounted on the touch panel 31 and/or the medium 2. Furthermore, the switch may be made not be turned on by its own weight, and the switch may be made to turn on by pushing in the code generation apparatus 1. The self-weight switch 23 is not indispensable to the code generation apparatus 1.

As in FIG. 22(D), the wireless device 24 is a device that communicates wirelessly with the server 4 and exchanges various kinds of information used for the control processing of output such as processing to collate the read predetermined information C with the server 4 and the like. The wireless device 24 may also acquire the pattern code wirelessly. The wireless device 24 is not indispensable for the code generation apparatus 1.

The power supply unit 25 is a unit that supplies electric power to the code generation apparatus 1 with dry batteries or the like. Therefore, the power supply unit 25 is not particularly required to be a dry battery, and it may be a rechargeable battery. In this case, the method of charging is not particularly restricted, and a method of charging by USB connection at the USB terminal 20 may be adopted, or some other method may be adopted. Also, electric power may be supplied from an external power supply apparatus. The supply of electric power may be a combination of the above.

Figure 22F:
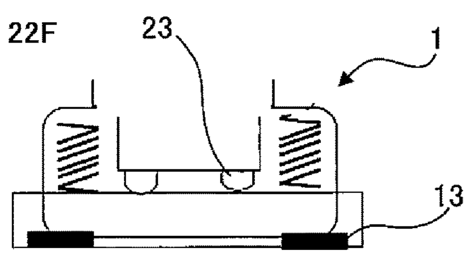

As shown in FIG. 22(F), rubber or a ring-shaped spring is provided inside the stamp unit 16 of the code generating apparatus 1. This is to have the conductor placement surface and the medium input apparatus surface come into tight contact with each other even when the code generation apparatus 1 is placed in a somewhat tilted manner. Furthermore, it is for suppressing erroneous recognition of the pattern code when the code generation apparatus 1 separates away, by having all of the conductors separate away simultaneously.

Note that it is not essential for the code generation apparatus 1 to be provided with a rubber or a ring-shaped spring inside the stamp unit 16 of the code generation apparatus 1.

Furthermore, the code generation apparatus 1 may be increased in size with covering of the code generation apparatus 1 itself with a case, thereby increasing the degree of freedom for the arrangement of the conductor. Furthermore, by increasing the size of the code generation apparatus 1 itself, it is possible to stabilize the code generation apparatus 1 at the moment of placement.

FIG. 23 is a schematic diagram showing an example of a configuration of a code generation apparatus 1 equipped with an information reading apparatus.

Figure 23A:
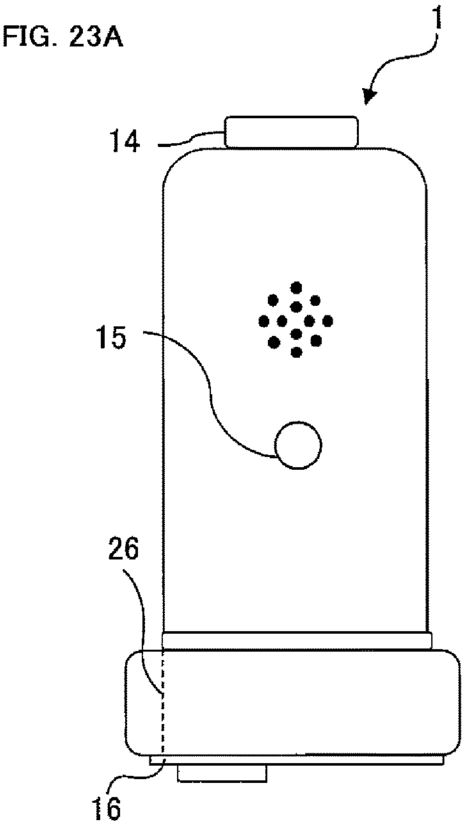
FIG. 23 is a schematic diagram showing an example of a configuration of code generation apparatus 1 equipped with an information reading apparatus.
Figure 23B:
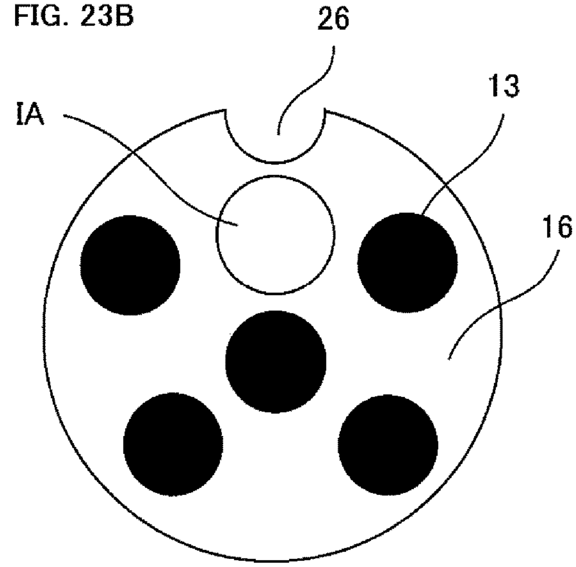
Figure 23C:
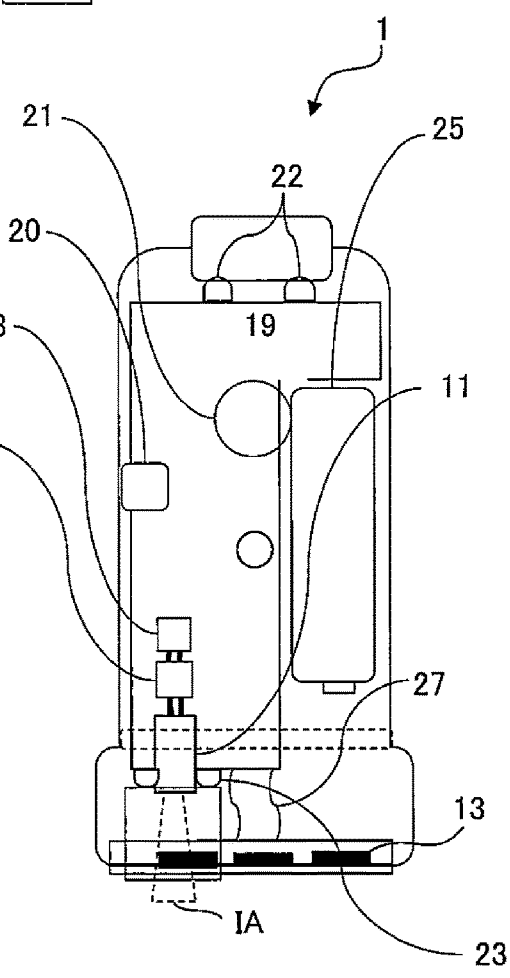

Specifically, FIG. 23(A) is a side view showing an example of an appearance configuration of the code generation apparatus 1. FIG. 23(B) is a bottom view showing an example of the appearance configuration of the code generation apparatus 1. FIG. 23(C) is a diagram showing an example of the internal configuration of the front side of the code generation apparatus 1.

As shown in FIG. 23, in addition to the information reading unit 11, the code generation unit 12, and the code output unit 13, the stamp-type code generation apparatus 1 further consists of an operation button 14, a power button 15, a stamp unit 16, a CPU 17, an internal memory 18, a PCBA 19, a USB terminal 20, a speaker 21, a button switch 22, a self-weight switch 23, a wireless device 24, a power supply unit 25, an information reading instruction notch 26 and a flexible printed circuit 27.

As in FIG. 23(A), the operation button 14 is provided at the upper end of the code generation apparatus 1, and is a button for the instruction operation of various types of control of the code generation apparatus 1, such as instruction to read the predetermined information C and instruction to turn on/off the pattern code. Specifically, when the operation button 14 is pressed, as shown in FIG. 23(C), the button switch 22 disposed inside the code generation apparatus 1 is switched from one of the ON and OFF states to the other state. Note that an LED may be provided inside the operation button 14 and various states may be expressed by the emitted color or emission pattern of the LED. Furthermore, the operation button 14 may be provided as a seesaw button for two kinds of independent operation functions. Note that the operation button 14 is not a component indispensable to the code generation apparatus 1. Furthermore, the operation button 14 may be provided on the side face.

The power button 15 is provided on a side face of the code generation apparatus 1, and is a button for switching the power supply of the code generation apparatus 1 ON/OFF.

As shown in FIG. 23 (A), the stamp unit 16 is provided at the lower end of the code generation apparatus 1. As shown in FIG. 23 (B), the stamp unit 16 is provided with a code output unit 13 configured by the arrangement of a plurality of symbols in a predetermined pattern with a hole opened above the center part. This hole portion is an information reading area IA in which the predetermined information C is read by the information reading apparatus 11. The information reading apparatus 11 may read the predetermined information C by coming into contact with the medium surface on which the predetermined information C is formed or may read the predetermined information C a certain distance apart from the medium surface.

A protective member such as nonconductive rubber, silicone, PET, or the like may be provided on the surface of the periphery of the plurality of symbols or the surface on which the symbol is placed so as to prevent damage of the display of the touch panel 31 or the like of the code recognition apparatus 3. Note that if the stamp unit 16 is to be moved on the display, it is preferable to adopt a material having a low friction coefficient for the bottom face of the stamp unit 16 (including a protective member if there is a protective member). However, if the stamp unit 16 is not to be moved on the display, it is preferable to adopt a material having a high friction coefficient. This is to prevent the code recognition apparatus 3 from slipping when placed, so that the symbol can surely be recognized instantaneously.

When reading the predetermined information C, as shown in FIG. 2(B), the stamp unit 16 is disposed on or above the symbol pattern (predetermined information C) of the medium 2. Thus, as shown in FIG. 23(C), the predetermined information C is read by the information reading unit 11 via the reading area IA.

Furthermore, when outputting the pattern code, as shown in FIG. 3(B), the stamp unit 16 comes into contact with or comes into proximity with the code detection area SP of the touch panel 31 of the code recognition apparatus 3. More precisely, a plurality of symbols of the code output unit 13 provided in the stamp unit 16 come into contact with or come into proximity with the code detection area SP of the touch panel 31 of the code recognition apparatus 3.

Here, the plurality of symbols consists of a conductor or the like, and in accordance with the pattern code, response propriety of the touch panel 31 is controlled. That is, the touch panel 31 detects only symbols (their position coordinates) among the plurality of symbols that are made responsive. The pattern code is recognized based on the arrangement pattern and the like of the symbols detected in this manner.

Note that a specific example of the recognition of a pattern code by a plurality of symbols has been described with reference to FIGS. 6 and 7 and will therefore be omitted.

Furthermore, as shown in FIG. 23 (A), cushioning material such as rubber, ring-shaped silicone, or ring-shaped rubber is provided on the upper periphery of the stamp unit 16 of the code generation apparatus 1. It is to relieve shock even when the code generation apparatus 1 is strongly pressed onto the display surface, and to have the conductor placement surface and the medium input apparatus surface come into tight contact with each other even when the code generation apparatus 1 is placed in a somewhat tilted manner. Furthermore, it is for suppressing erroneous recognition of the pattern code when the code generation apparatus 1 separates away, by having all of the conductors separate away simultaneously. It is not essential for the code generation apparatus 1 to be provided with cushioning material such as rubber, ring-like silicone, or ring-like rubber on the upper periphery of the stamp unit 16 of the code generation apparatus 1.

Furthermore, the code generation apparatus 1 may be increased in size with covering of the code generation apparatus 1 itself with a case, thereby increasing the degree of freedom for the arrangement of the conductor. Furthermore, by increasing the size of the code generation apparatus 1 itself, it is possible to stabilize the code generation apparatus 1 at the moment of placement.

The information reading instruction notch 26 is provided on the outer circumference of the stamp unit 16 as shown in FIG. 23(B). When the code generation apparatus 1 is placed on the display of the code recognition apparatus 3 to select an object image such as a small icon, a character, a graphic, or the like, the information reading instruction notch 26 accurately indicates the instruction point of the object image and reads the predetermined information C. The information reading instruction notch 26 may be replaced with an optical instruction (for example, a laser pointer or the like), or they may be combined. Note that the method of calculating specific instruction points will be described later with reference to FIG. 32.

As in FIG. 23(C), the CPU 17 executes all of the control processings of the code generation apparatus 1, related to reading of predetermined information C, output of pattern codes, program update, control of input/output devices, and the like. By cooperating with predetermined software, the CPU 17 makes various functional blocks such as the code generation unit 12 of FIG. 2(C) function.

The built-in memory 18 stores programs executed by the CPU 17, various data and the like used by the CPU 17.

The PCBA 19 is a board on which various circuits necessary for the code generation apparatus 1 to execute the various processings shown in FIG. 2 are mounted. When program update, data input/output, charging, and the like of the code generation apparatus 1 are performed, the USB terminal 20 is USB-connected to other devices not shown. Note that the USB terminal 20 is not indispensable to the code generation apparatus 1.

The speaker 21 outputs various sounds when predetermined information C is read, when various operation instructions are given, when contents including sound are reproduced, and the like.

As described above, the button switch 22 is a switch that switches from one of the ON and OFF states to the other in response to a pressing operation of the operation button 14. The button switch 22 may function independently as a seesaw button to instruct different operations for either independently.

The self-weight switch 23 is a switch that activates the pattern code output unit 13 by its own weight. Here, to activate is to establish a state of responsiveness to the touch panel 31 in accordance with the pattern code for each of a plurality of dots constituting the pattern code output unit 13. As shown in FIG. 2(B), when the stamp unit 16 is disposed on or above the dot pattern (predetermined information C) of the medium 2, the self-weight switch 23 is activated by its own weight, and the predetermined information C is read by the information reading unit 11 via the reading area IA. The mechanism by which the self-weight switch 23 is activated by its own weight may help to achieve substantial power saving by activating pattern code output and dot pattern reading and like processes which require electric power, only when the code generation apparatus 1 is mounted on the touch panel 31 and/or the medium 2. Furthermore, the switch may be made not be turned on by its own weight, and the switch may be made to turn on by pushing in the code generation apparatus 1. The self-weight switch 23 is not indispensable to the code generation apparatus 1.

As in FIG. 23(C), the wireless device 24 is a device that communicates wirelessly with the server 4 and exchanges various kinds of information used for the control processing of output such as processing to collate the read predetermined information C with the server 4 and the like. The wireless device 24 may also acquire the pattern code wirelessly. The wireless device 24 is not indispensable for the code generation apparatus 1.

The power supply unit 25 is a unit that supplies electric power to the code generation apparatus 1 with dry batteries or the like. Therefore, the power supply unit 25 is not particularly required to be a dry battery, and it may be a rechargeable battery. In this case, the method of charging is not particularly restricted, and a method of charging by USB connection at the USB terminal 20 may be adopted, or some other method may be adopted. Also, electric power may be supplied from an external power supply apparatus. The supply of electric power may be a combination of the above.

The flexible printed circuit 27 is flexibly wired to the PCBA 19 in order to have the PCBA 19 provided with the information reading unit 11 function even when the code generation apparatus 1 is placed in a tilted manner.

FIG. 24 is a schematic diagram showing an example of the configuration of a code generation apparatus 1 not equipped with an information reading apparatus. Specifically, FIG. 24(A) is a side view showing an example of the appearance configuration of the code generation apparatus 1. FIG. 24(B) is a bottom view showing an example of the appearance configuration of the code generation apparatus 1. FIG. 24(C) is a diagram showing an example of the internal configuration of the front side of the code generation apparatus 1. FIG. 24 (D) is a diagram showing an example of the internal configuration of the back side of the code generation apparatus 1. FIG. 24 (E) is a side view showing an example of the appearance configuration enlarged the stamp unit 16 of the code generation apparatus 1. FIG. 24(F) is a diagram showing an example of the internal configuration of the front side of the enlarged stamp unit 16 of the code generation apparatus 1.

As shown in FIG. 24, in addition to the code generation unit 12 and the code output unit 13, the stamp-type code generation apparatus 1 further consists of an operation button 14, a power button 15, a stamp unit 16, a CPU 17, an internal memory 18, a PCBA 19, a USB terminal 20, a speaker 21, a button switch 22, a self-weight switch 23, a wireless device 24, a power supply unit 25, a pattern code input apparatus 301, a speaker duct 302, a pattern code display apparatus 303, a pattern code recognition apparatus 304, and a power switch 305.

Figure 24A:
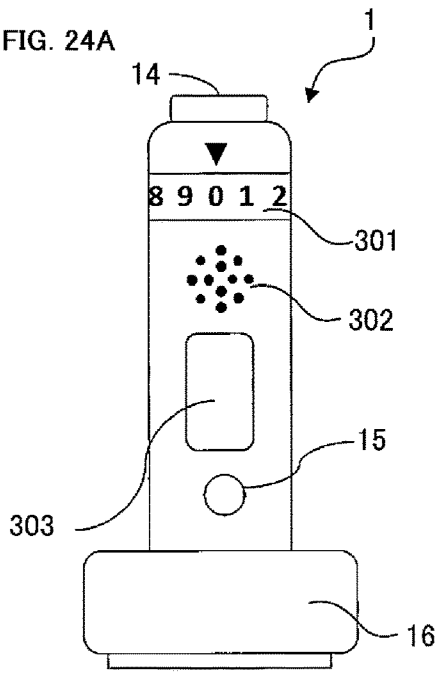
FIG. 24 is a schematic diagram showing an example of a configuration of code generation apparatus 1 not equipped with an information reading apparatus.
Figure 24B:
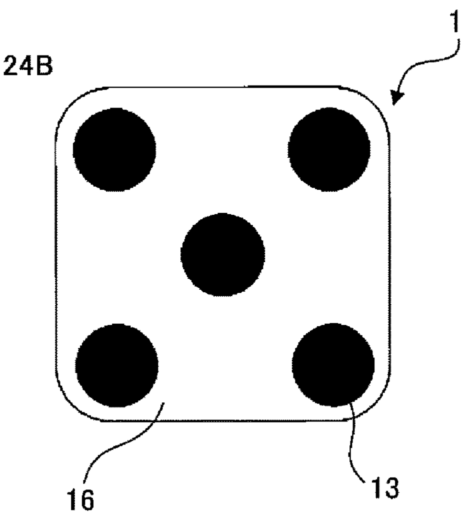
Figure 24C:
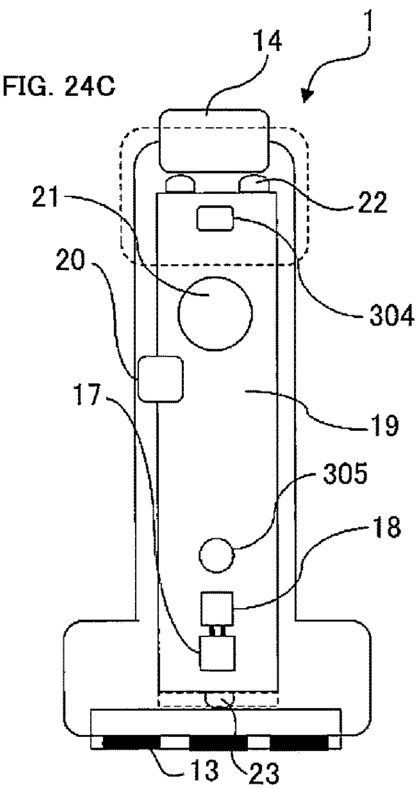

As in FIG. 24(A), the operation button 14 is provided at the upper end of the code generation apparatus 1, and is a button for the instruction operation of various types of control of the code generation apparatus 1, such as instruction to read the predetermined information C and instruction to turn on/off the pattern code. Specifically, when the operation button 14 is pressed, as shown in FIG. 24(C), the button switch 22 disposed inside the code generation apparatus 1 is switched from one of the ON and OFF states to the other state. Note that an LED may be provided inside the operation button 14 and various states may be expressed by the emitted color or emission pattern of the LED. In addition, the operation button 14 may be provided with a blindfold cap to disallow a third party to set a pattern code. Note that the operation button 14 is not indispensable to the code generation apparatus 1. Furthermore, the operation button 14 may be provided on the side face.

The power button 15 is provided on a side face of the code generation apparatus 1, and is a button for switching the power supply of the code generation apparatus 1 ON/OFF.

The pattern code input apparatus 301 is provided above the surface of the code generation apparatus 1 and is a device for setting a pattern code. Specifically, the pattern code is set by turning the ring of the pattern code input apparatus 301 in which numerals are drawn so that the numerals are set at predetermined positions. When the setting of the pattern code input apparatus 301 is started, the pattern code input apparatus 301 carries out setting of numerals a plurality of times with a combination of operations of various operation buttons not normally used and memorizes them, and then outputs the pattern code. Although not shown in the drawing here, the pattern code input apparatus 301 may be arranged with a plurality of stages of rings, in which numbers are drawn, as with a rotary key. Furthermore, the pattern code input apparatus 301 may be arranged with a plurality of number buttons. Furthermore, the pattern code input apparatus 301 may be made to be set by pushing the necessary number of operation buttons.

The speaker duct 302 discharges various sounds output from the speaker 21.

The pattern code display apparatus 303 is a display apparatus for confirming the pattern code set by the pattern code input apparatus 301. For the pattern code display apparatus 303, for example, a liquid crystal monitor can be adopted. Furthermore, it is also possible to provide a touch panel on the pattern code display apparatus 303, to display numerals and to allow setting of pattern codes with a touch operation.

Figure 24D:
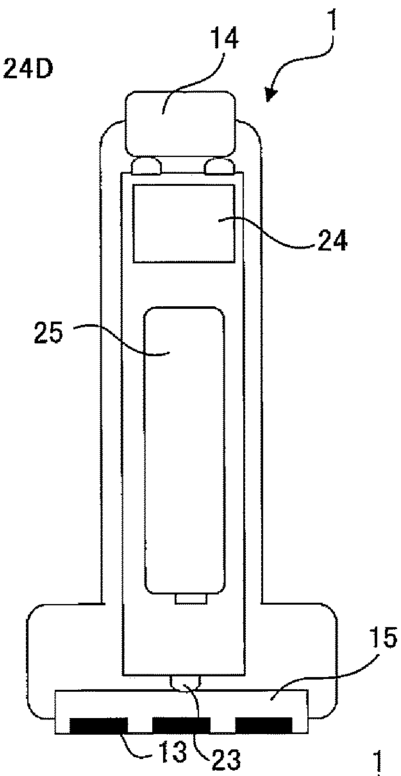
Figure 24E:
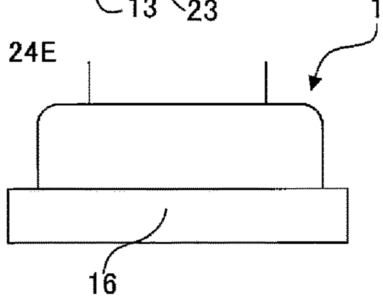

As shown in FIGS. 24(A) and 24(E), the stamp unit 16 is provided at the lower end of the code generating apparatus 1. As shown in FIG. 24(B), the stamp unit 16 is provided with a code output unit 13 configured by the arrangement of a plurality of symbols in a predetermined pattern.

A protective member such as nonconductive rubber, silicone, PET, or the like may be provided on the surface of the periphery of the plurality of symbols or the surface on which the symbol is placed so as to prevent damage of the display of the touch panel 31 or the like of the code recognition apparatus 3. Note that if the stamp unit 16 is to be moved on the display, it is preferable to adopt a material having a low friction coefficient for the bottom face of the stamp unit 16 (including a protective member if there is a protective member). However, if the stamp unit 16 is not to be moved on the display, it is preferable to adopt a material having a high friction coefficient. This is to prevent the code recognition apparatus 3 from slipping when placed, so that the symbol can surely be recognized instantaneously.

When outputting the pattern code, as shown in FIG. 3(B), the stamp unit 16 comes into contact with or comes into proximity with the code detection area SP of the touch panel 31 of the code recognition apparatus 3. More precisely, a plurality of symbols of the code output unit 13 provided in the stamp unit 16 come into contact with or come into proximity with the code detection area SP of the touch panel 31 of the code recognition apparatus 3.

Thus, the plurality of symbols consists of a conductor or the like, and in accordance with the pattern code, response propriety of the touch panel 31 is controlled. That is, the touch panel 31 detects only symbols (their position coordinates) among the plurality of symbols that are made responsive. The pattern code is recognized based on the arrangement pattern and the like of the symbols detected in this manner.

Note that a specific example of the recognition of a pattern code by a plurality of symbols has been described with reference to FIGS. 6 and 7 and will therefore be omitted.

As in FIG. 24(C), the CPU 17 executes all of the control processings of the code generation apparatus 1, related to reading of predetermined information C, output of pattern codes, program update, control of input/output devices, and the like. By cooperating with predetermined software, the CPU 17 makes various functional blocks such as the code generation unit 12 of FIG. 2(C) function.

The built-in memory 18 stores programs executed by the CPU 17, various data and the like used by the CPU 17.

The PCBA 19 is a board on which various circuits necessary for the code generation apparatus 1 to execute the various processings shown in FIG. 2 are mounted.

When program update, data input/output, charging, and the like of the code generation apparatus 1 are performed, the USB terminal 20 is USB-connected to other devices not shown. Note that the USB terminal 20 is not indispensable to the code generation apparatus 1.

The speaker 21 outputs various sounds when various operation instructions are given, when contents including sound are reproduced, and the like.

As described above, the button switch 22 is a switch that switches from one of the ON and OFF states to the other in response to a pressing operation of the operation button 14. The button switch 22 may function independently as a seesaw button to instruct different operations for either independently.

The self-weight switch 23 is a switch that activates the pattern code output unit 13 by its own weight. Here, to activate is to establish a state of responsiveness to the touch panel 31 in accordance with the pattern code for each of a plurality of dots constituting the pattern code output unit 13. The mechanism by which the self-weight switch 23 is activated by its own weight may help to achieve substantial power saving by activating pattern code output and dot pattern reading and like processes which require electric power, only when the code generation apparatus 1 is mounted on the touch panel 31 and/or the medium 2. Furthermore, the switch may be made not be turned on by its own weight, and the switch may be made to turn on by pushing in the code generation apparatus 1. The self-weight switch 23 is not indispensable to the code generation apparatus 1.

The pattern code recognition apparatus 304 is an apparatus that recognizes the pattern code set by the pattern code input apparatus 301. Specifically, a numeral is recognized by disposing a material, a resistance, or the like on the back side of the ring on which a number is drawn that can recognize a number. Furthermore, the pattern code recognition apparatus 304 has only to recognize a number by any other method.

As in FIG. 24(D), the wireless device 24 is a device that communicates wirelessly with the server 4 and exchanges various kinds of information used for the control processing of output such as processing to collate the read predetermined information C with the server 4 and the like. The wireless device 24 may also acquire the pattern code wirelessly. The wireless device 24 is not indispensable for the code generation apparatus 1.

The power supply unit 25 is a unit that supplies electric power to the code generation apparatus 1 with dry batteries or the like. Therefore, the power supply unit 25 is not particularly required to be a dry battery, and it may be a rechargeable battery. In this case, the method of charging is not particularly restricted, and a method of charging by USB connection at the USB terminal 20 may be adopted, or some other method may be adopted. Also, electric power may be supplied from an external power supply apparatus. The supply of electric power may be a combination of the above.

Figure 24F:
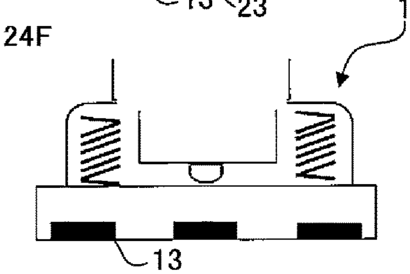

As shown in FIG. 24(F), rubber or a ring-shaped spring is provided inside the stamp unit 16 of the code generating apparatus 1. This is to have the conductor placement surface and the medium input apparatus surface come into tight contact with each other even when the code generation apparatus 1 is placed in a somewhat tilted manner. Furthermore, it is for suppressing erroneous recognition of the pattern code when the code generation apparatus 1 separates away, by having all of the conductors separate away simultaneously.

Note that it is not essential for the code generation apparatus 1 to be provided with a rubber or a ring-shaped spring inside the stamp unit 16 of the code generation apparatus 1.

Furthermore, the code generation apparatus 1 may be increased in size with covering of the code generation apparatus 1 itself with a case, thereby increasing the degree of freedom for the arrangement of the conductor. Furthermore, by increasing the size of the code generation apparatus 1 itself, it is possible to stabilize the code generation apparatus 1 at the moment of placement.

FIG. 25 is a schematic diagram showing an example of the configuration of a code generation apparatus 1 not equipped with an information reading apparatus.

Figure 25A:
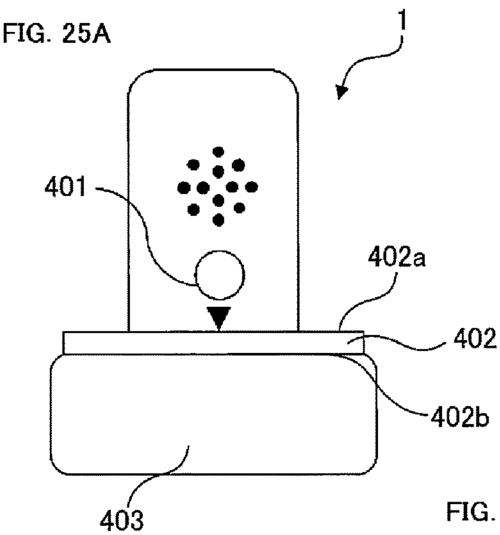
FIG. 25 is a schematic diagram showing an example of a configuration of code generation apparatus 1 not equipped with an information reading apparatus.
Figure 25B:
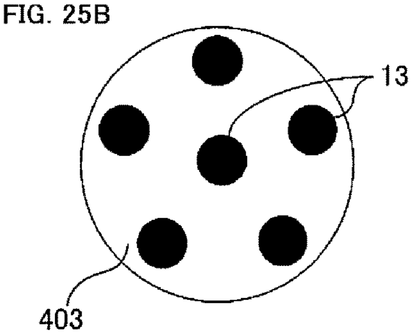

Specifically, FIG. 25(A) is a side view showing an example of the appearance configuration of the code generation apparatus 1. FIG. 25(B) is a bottom view showing an example of an appearance configuration of the code generation apparatus 1. FIG. 25 (C) is a side view showing an example of an appearance configuration in which the upper side of the code generator 1 is covered with a shaped cover. FIG. 25(D) is a diagram showing an example of the top face of the pattern code setting ring of the code generation apparatus 1. FIG. 25(E) is a diagram showing an example of the bottom face of the pattern code setting ring of the code generation apparatus 1. FIG. 25(F) is a diagram showing an example of the top face of the pattern code setting/output apparatus of the code generation apparatus 1. FIG. 25(G) is a diagram showing an example of the top face of the pattern code setting ring of the code generation apparatus 1 different from that shown in FIG. 25(D). FIGS. 25(H) and 25(I) show examples of the bottom face of the pattern code setting ring of the code generation apparatus 1 different from that shown in FIG. 25(E) (when the pattern code is set in the clockwise direction with the lowest dot as the reference dot.)

As shown in FIG. 25, the stamp-type code generation apparatus 1 consists of a code output unit 13, a power button 401, a pattern code setting ring 402, a pattern code setting/output apparatus 403, and a contact switch 404. Note that the pattern code setting ring 402 is composed of the top face 402*a* of the pattern code setting ring and the bottom face 402*b* of the pattern code setting ring.

As in FIG. 25(A), the power button 401 is provided on a side face of the code generation apparatus 1, and is a button for switching power of the code generation apparatus 1 on/off.

Furthermore, as shown in FIG. 25(D), top face 402*a* of the pattern code setting ring is provided with setting numbers. The pattern code is set by turning the ring on which this number is drawn and setting the number to a predetermined position (for example, a mark or a stamp). When the setting is started, the code generation apparatus 1 starts the setting with a combination of operations of various operation buttons not normally used, executes number setting a plurality of times, memorizes them, and then outputs the pattern code. Note that an exclusive button for pattern code setting may be arranged in code generation apparatus 1.

Furthermore, as shown in FIG. 25(E), the bottom face 402*b* of the pattern code setting ring is provided with a conductor.

As shown in FIG. 25(B), the pattern code setting/output device 403 is provided at the lower end of the code generation apparatus 1.

On the top face of the pattern code setting/output device 403, as shown in FIG. 25(F), eight pairs of contact switches 404 are provided.

On the bottom face of the pattern code setting/output device 403, as shown in FIG. 25(B), a code output unit 13 configured by the arrangement of a plurality of symbols in a predetermined pattern is provided.

Furthermore, on the bottom face of the pattern code setting/output device 403, at least one conductor (a plurality of adjacent ones is possible as long as the number is within 7) is provided, and by rotating the ring, one of the eight predetermined contact switches makes contact and the corresponding contact switch can be turned on to define one numerical value constituting the pattern code. For example, by performing four rotation operations, 12 bits (4096 codes) of pattern codes may be set. The number of switches is arbitrary. After attaching the ring first of all, if the rotation operation is performed immediately and the next rotation operation is performed after a predetermined amount of time (for example, around 1.0 second) elapses when a number is set to a predetermined position, numbers can easily be set without performing other button operations and settings (starting/ending). When the same number continues, it is only necessary to once rotate and again set the same number to the predetermined position and then let a predetermined period of time to elapse. By setting the necessary number of numbers, it ends automatically.

Figure 25C:
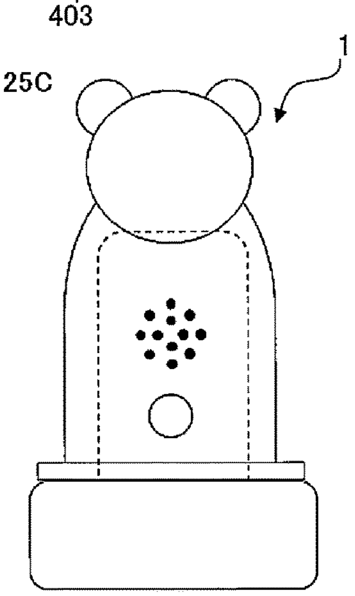
Figure 25D:
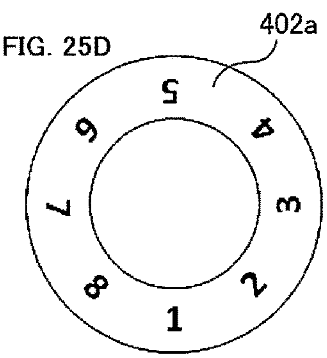
Figure 25E:
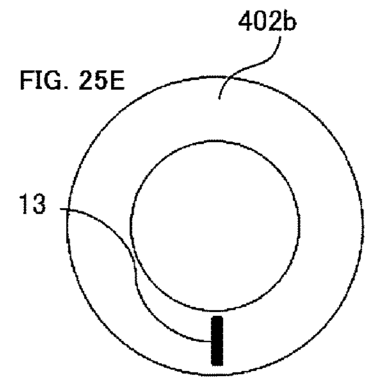
Figure 25F:
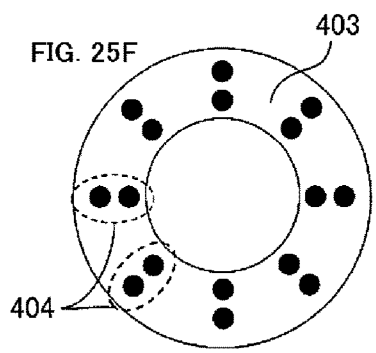
Figure 25G:
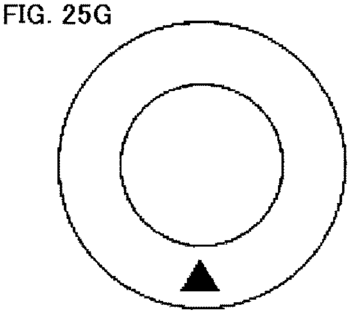
Figure 25H:
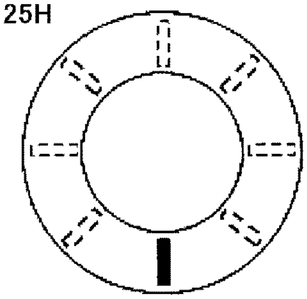
Figure 25I:
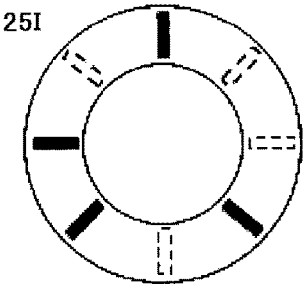

As in FIG. 25(C), the pattern code can be output with the pattern code setting ring fixed to the lower part of a figure or a model object and placed (removable) so as to cover a predetermined position of the stamp. Thus, by placing various figures and model objects on the input medium surface, it is possible to operate/view the corresponding contents. Furthermore, it is possible to rotate a figure or a modeled object and output a new pattern code. Furthermore, the pattern code setting ring may be replaced. Note that any kind of switch such as an optical switch may be used as the contact switch 404.

As shown in FIG. 25(G), after setting the pattern code, a blindfold ring may be attached from above to prevent pattern code setting by a third party, or the pattern code setting ring 402 may be removed and a blindfold ring may further be attached. Furthermore, when setting the pattern code just by attaching the pattern code setting ring 402, in this embodiment, with the eight contact switches, 8 bits (256 codes) of pattern codes can be set. Thus, a conductor (current-carrier) is provided at various positions on the bottom face 402*b* of the pattern code setting ring, and a pattern code can be set by the ON/OFF of the eight contact switches by the conductors. However, it is necessary to provide triangular marks and engraved markings on the top face 402*a* of the pattern code setting ring and to combine them. In this case, it is not necessary to provide a setting number on the top face 402*a* of the pattern code setting ring.

Four kinds of stamp types are described above and it is needless to say that the mechanisms and functions included therein may be appropriately combined for commercialized.

Figure 26A:
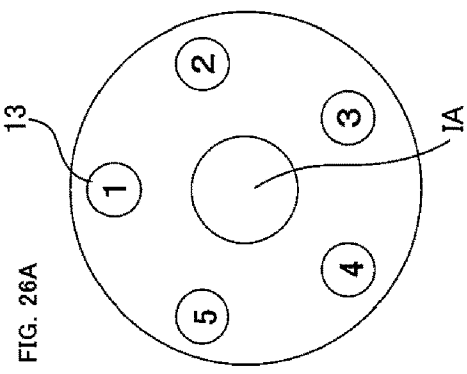
FIG. 26 is a diagram showing a specific example of a symbol arrangement pattern (hereinafter referred to as "symbol pattern") when the touch panel 31 can detect multiple points.
Figure 26B:
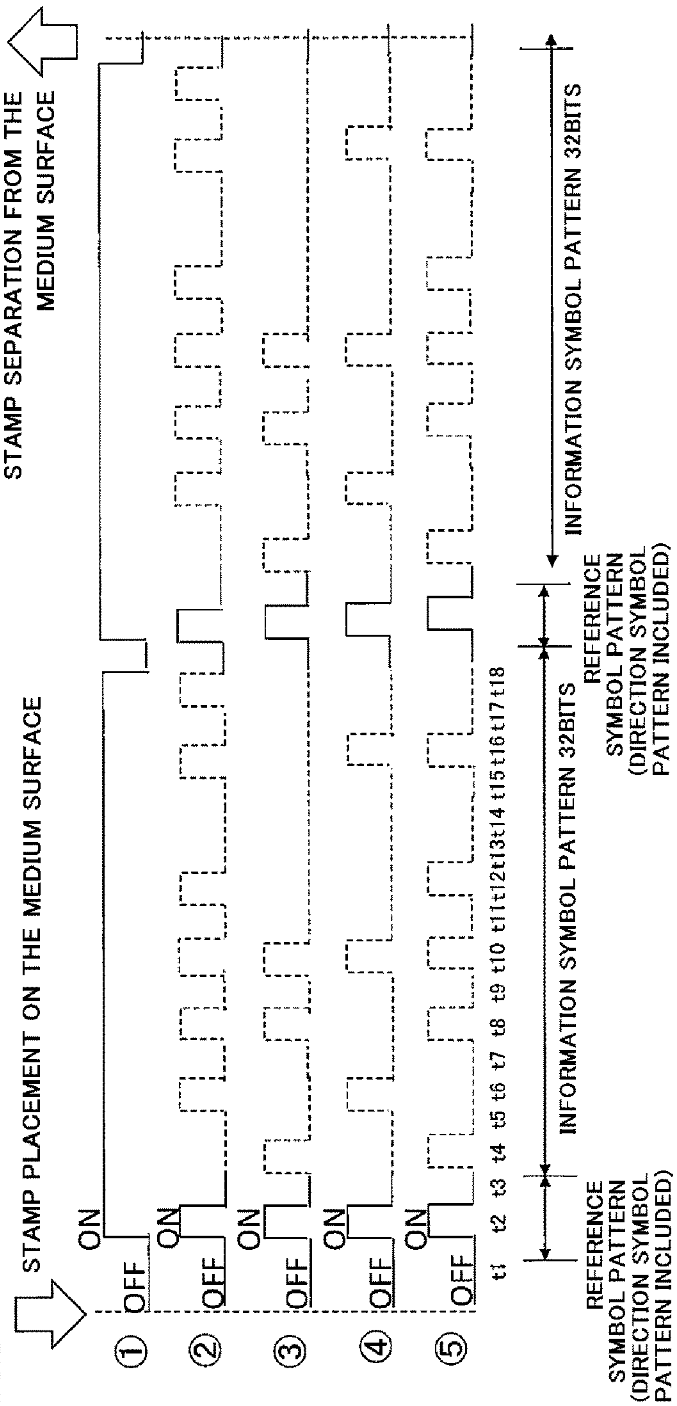

FIGS. 26 and 27 show specific examples of symbol arrangement patterns, that is, symbol patterns, in a case where the touch panel 31 is capable of detecting multiple points.

In the examples of FIGS. 26 and 27, as shown in FIG. 26(A), a pattern in which five symbols 13-1 to 13-5 are arranged equally spaced circumferentially is adopted as a basic pattern.

Figure 26C:
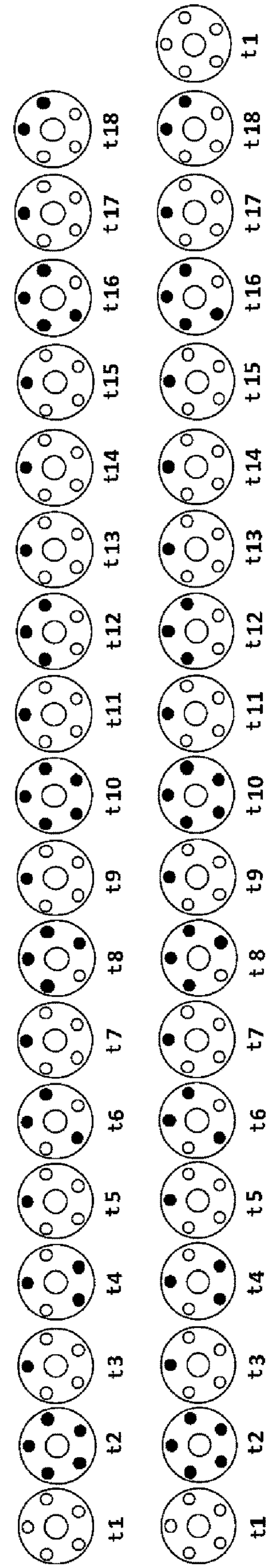
Figure 27A:
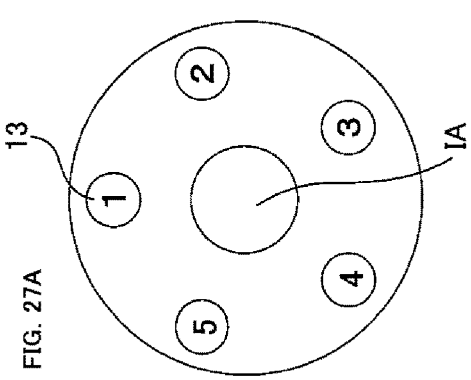
FIG. 27 is a diagram showing a specific example of a symbol pattern when the touch panel 31 can detect multiple points.

Note that the basic pattern is not particularly restricted to a pattern in which the dots 13-1 to 13-5 are arranged in a circular shape as in FIGS. 26 and 27(A), but a pattern in which the symbols 13-1 to 13-5 are arranged in an arbitrary shape such as a rectangular shape may be adopted, and the size and shape of the symbols may be different.

Furthermore, the number of symbols is not particularly restricted to those in the examples of FIG. 26 and FIG. 27(A), and may be arbitrary.

Figure 27B:
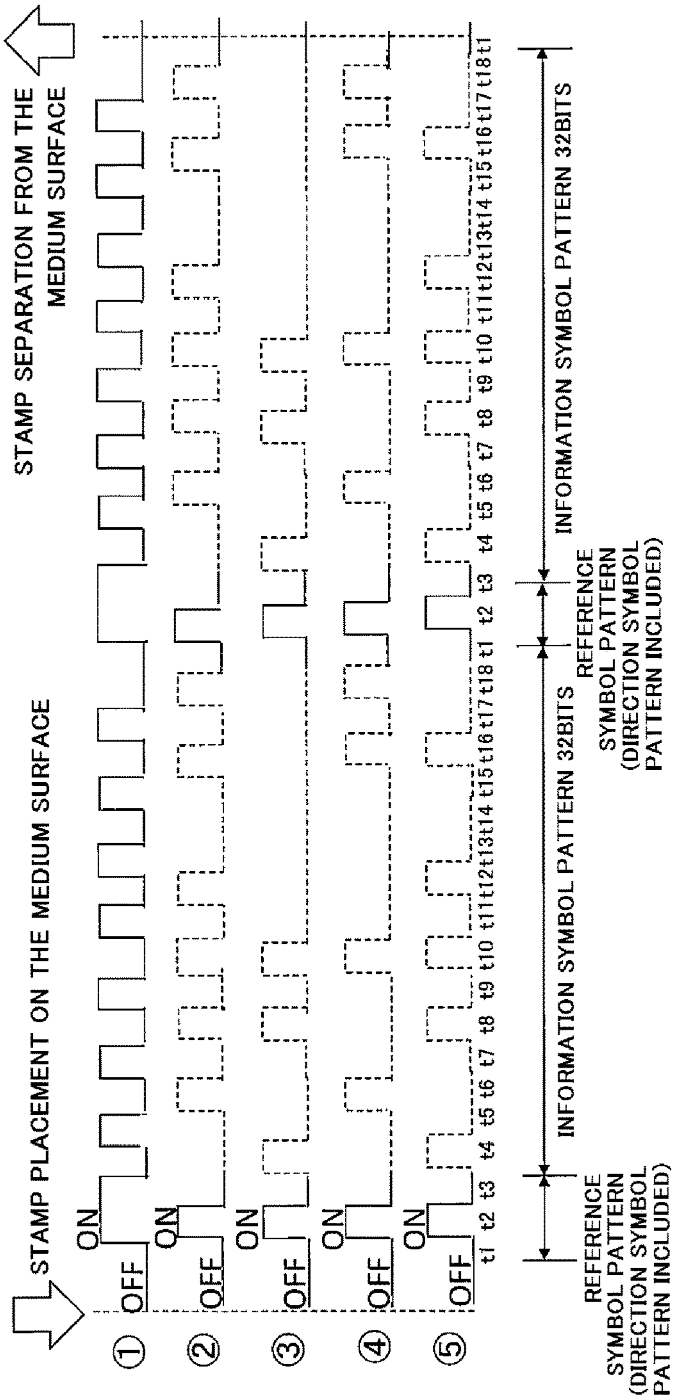

Furthermore, as shown in FIGS. 26 and 27(B), for each of the symbols 13-1 to 13-5 included in the basic patterns of FIGS. 26 and 27(A), "output (ON)" or "OFF" is defined at predetermined times (timing of the predetermined times) among the relative times t1 to t18.

In the examples of FIG. 26 and FIG. 27, since the touch panel 31 is capable of detecting a plurality of points, an arbitrary combination of an arbitrary number of symbols 13-1 to 13-5 can be allowed to be "output (ON)" at any timing from time t1 to t18.

Figure 27C:
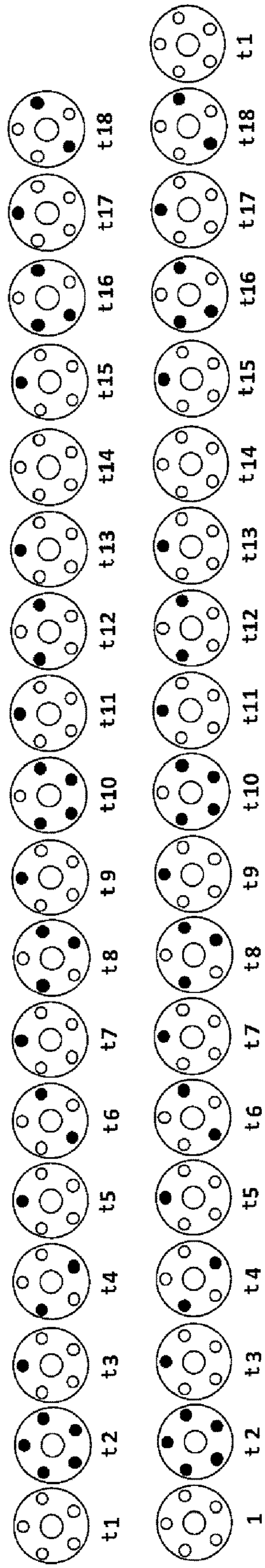

Here, in FIGS. 26 and 27(C), of the basic patterns of FIGS. 26 and 27(A), unit patterns in which only the "output (ON)" symbols are filled black are drawn for each timing from time t1 to t18. By comparing with the unit pattern of FIG. 6(C), it is possible to recognize that a plurality of symbols are "output (ON)" for the unit patterns of FIG. 26(C) because the touch panel 31 can detect multi-symbols.

The pattern code to be generated is defined by preparing a plurality of such unit patterns (25 types are prepared in the examples of FIGS. 26 and 27(C)) and placing various unit patterns one by one at each position in the time direction (each timing of the times t1 to t18.)

Note that in this embodiment, the switching of each of the symbols 13-1 to 13-5 ON/OFF is realized by the control of the CPU 17 in FIG. 4(C). The method of outputting one pattern code of FIG. 26 and FIG. 27(C) is not particularly restricted. For example, in the present embodiment, a method of repeating the pressing operation of the operation button 14 in FIG. 4(A) may be adopted, or it is also possible to adopt a method in which a self-weight button 23, that operates by the own weight of the stamp unit 16, is provided on the placement surface and the output is automatic upon placement on the code recognition apparatus 3. It is also possible to have a setting in which the same pattern code is repeatedly output for a predetermined number of times.

The time (relative time) at which the stamp portion 16 of the code generation apparatus 1 is placed on the touch panel 31 is set to time t1. As shown in FIGS. 26 and 27(B), and 26 and 27(C), the unit pattern at the time t1 is a pattern in which all of the symbols 13-1 to 13-5 are OFF.

Here, the interval between time t1 and time t2 may be arbitrary. That is, when the code generation apparatus 1 is placed on the touch panel 31 after it reads the predetermined information C and generates the pattern code, one or more predetermined symbols (the symbols 13-1 to 13-7 in the example of FIG. 7) may be "output (ON)" immediately or be "output (ON)" after a predetermined amount of time elapses.

In the examples of FIGS. 26 and 27 where there are five symbols 13-1 to 13-5, at time t2, all of the symbols 13-1 to 13-5 are "output (ON)." In other words, a unit pattern in which all of the reference symbols 13-1 to 13-5 are "output (ON)" is arranged at time t2.

The recognition unit 33 of the code recognition apparatus 3 recognizes these symbol positions and stores the reference pattern. Note that by "output (ON)" of all of the symbols 13-1 to 13-5, it is possible to recognize that the touch panel 31 has normally detected each of the symbols 13-1 to 13-5. Thus, whether or not the code recognition apparatus 3 can operate normally can be confirmed.

At the next time t3, all of the symbols 13-1 to 13-5 are turned off. Alternatively, at the time t3, only the symbols 13-2 and 13-5 may be turned off. At time t4, the symbols 13-1, 13-3, 13-4 are "output (ON)." The recognition unit 33 of the code recognition apparatus 3 recognizes the orientation of the unit pattern with these three symbols 13-1, 13-3, and 13-4. Here, the recognition unit 33 recognizes the symbol 13-1 as a vertex and recognizes the symbol 13-1 from the center of the symbols 13-1 to 13-5 as the positive direction of the symbol pattern.

At the next time t5, only the symbol 13-1 at the vertex is ON, and the symbols 13-2 to 13-5 are OFF.

Afterwards, only the vertex symbol 13-1 continues to be "output (ON)" as the reference and information (part of the information of the pattern code) is output by the ON/OFF of the symbols 13-2 to 13-5.

When all of the outputs of 13-2 to 13-5 are OFF, and only the symbol 13-1 continues to be ON, the recognition of the output time is required for the recognizing of the number of information outputs.

Therefore, in FIG. 27, information is output with the ON/OFF of 13-2 to 13-5, and 13-1 is OFF. Next, by turning only the symbol 13-1 ON, and repeating the ON/OFF of the information of symbol 13-1 and the information of symbols 13-2 to 13-5, the symbol 13-1 may play the role of a time stamp for information output in the time direction and it is possible to reliably execute the acquisition of information that changes in the time direction.

For the touch panel 31 on which the stamp unit 16 is placed, there is a case where the stamp unit 16 slides on the placement surface and moves linearly. Even in this case, the recognizing unit 33 can recognize which other symbol of each unit pattern is "output (ON)" with accordance to the movement of the vertex symbol 13-1.

Normally, since the amount of rotation of the stamp unit 16 at the moment of placement is considered to be extremely small unless deliberately applying rotational motion, it is sufficient to ensure recognition accuracy so that erroneous recognition due to linear movement does not occur. Of course, the orientation of this unit pattern can recognize with what rotation angle the stamp unit 16 is placed with respect to the surface of the touch panel 31.

Note that in the case where the code generation apparatus 1 is not rotated or moved when it is in use, if a material having a high friction coefficient is disposed around the conductor, recognition accuracy can be ensured avoiding slipping when placed on the conductor.

Furthermore, if each position in the time direction can be recognized accurately, the vertex symbol 13-1 may be made to be ON only once at first when the orientation is being recognized with the pattern code output being executed continuously with the vertex symbol 13-1 turned off, thereafter. In addition, information (part of information of the pattern code) may be made to be output by the ON/OFF of the vertex symbol 13-1.

By defining information with four symbols spatially spaced apart by predetermined distances, using the ON/OFF of symbols 13-2 to 13-4 and with one symbol corresponding to one bit, 4 bits can be defined with one unit pattern. Therefore, by arranging 8 unit patterns in the time direction (turning the unit pattern on/off 8 times), it is possible to output information of 32 bits (about 4 billion codes).

Note that as in FIG. 27, when the last time t18 is set to be for the parity check (4 bits), the recognition accuracy is improved remarkably, but the amount of information is reduced to 28 bits (270 million codes.)

Here, in the present embodiment, it is not possible to transmit from the code recognition apparatus 3 to the code generation apparatus 1 to the effect that the code output from the code generation apparatus 1 has been acquired. Therefore, the code generation apparatus 1 can surely transmit the pattern code by repeatedly executing the output of the pattern code (arrangement of a plurality of unit patterns in the time direction).

Furthermore, since this embodiment is merely an example, the code recognition apparatus 3 may notify the code generation apparatus 1 of the completion of pattern code (information) acquisition by various methods such as wireless communication, sound, light not shown. This makes it unnecessary to repeatedly output on the code generation apparatus 1 side.

As a general method of notifying the completion of such pattern code (information) acquisition, there are methods of notifying the user by displaying an image indicating the completion of acquisition of the pattern code (information) on the touch panel 31 or a separately prepared display and by outputting sounds or vibrations. Furthermore, on the other hand, the code recognition apparatus 3 may display a two-dimensional code or a color code of a dot pattern or the like indicating the completion of pattern code (information) acquisition and it may be read by the information reading unit 11 via the reading area IA of the stamp unit 16.

Furthermore, as the single symbol in FIG. 6, by combining the lengths, long and short, of the time intervals of unit pattern ON/OFF (by combining the distances of the unit pattern arrangements in the time direction), it is possible to output a much larger amount of pattern codes (information)

There is a case in which it is desired to move the stamp unit 16 on the touch panel 31 to perform an operation after the pattern code is read by the code recognition apparatus 3. In this case, by setting the symbols 13-1, 13-3, and 13-4 to "output (ON)" after the completion of the output of the pattern code, no matter how the stamp unit 16 is slid and rotated, the recognition unit 33 of the device 3 can recognize the position of the stamp unit 16 (the center position, the outer shape of the stamp unit 16, and the like) and the rotation angle of the stamp unit 16. Thus, an operation based on the image displayed on the touch panel 31 is possible.

Here, in FIGS. 26 and 27, when information based on the repeating unit pattern is being output, and the user desires arbitrary termination, the operation button 14 provided in the code generation apparatus 1 is pressed. As a result, only the symbols 13-1, 13-3, 13-4 are "output (ON)."

Furthermore, if a two-dimensional code reading apparatus is provided, the stamp unit 16 automatically identifies the completion of information acquisition, and only the symbols 13-1, 13-3, 13-4 are "output (ON)."

Furthermore, by moving the stamp unit 16 to a position where a predetermined instruction from the information reading apparatus 3 is displayed and pressing the operation button 14, the user can select the instruction placed at the position. Thus, operations for games to education and shopping, and normal operations for smartphones and PCs can easily be done.

Furthermore, the number of symbols that can be simultaneously recognized, the size of recognizable symbols, the spatial arrangement interval between symbol and symbol, the output time of symbols, the gap time between the end time of an output and the start time of the output of the next symbol (depending on the performance of touch panel 31 the gap time may not have to be provided, and the output of the next symbol may overlap) may be set arbitrarily taking into consideration the performance of the code recognition apparatus 3, the speed of the processing program, applications, and the like.

For example, even in a case in which the stamp unit 16 slides or rotates on the touch panel 31, by always continuing "output (ON)" using seven or more symbols with three or more symbols as reference symbols, the recognition unit 33 of the code recognition apparatus 3 can accurately recognize other information symbols that are "output (ON)." As a result, the code generation apparatus 1 can output the same 32 bits (about 4 billion codes) as in the example of FIG. 7.

Furthermore, by adopting the multi-symbol pattern in the example of FIG. 7, it can easily be dealt with in the case where a pattern code relating to information different from the firstly input predetermined information C is newly output by a predetermined method or even when an pattern code output from code output apparatus 1 changes at any time due to wireless communication or the like. That is, the code generation apparatus 1 can variably output information.

Note that in FIG. 27, the stamp code for outputting information at times t1 to t18 is repeatedly shown twice. Here, even if the code generation apparatus 1 starts outputting the pattern code before the stamp is properly placed or recognition begins at the middle of the times t1 to t18 due to a delay in the startup of the application, or for some other reason, if times t1 to time t3 can be recognized somewhere in the time direction, 18 time points t including those before and after the time t1 can be stored and the stamp code can be accurately recognized.

FIG. 28 is a diagram showing a symbol pattern in which the symbols 13-1 to 13-5 are arranged as non-rotating objects.

FIG. 28 shows a specific example of the symbol pattern in which the symbols 13-1 to 13-5 are arranged as non-rotating objects.

FIG. 28(A) shows a basic pattern. As shown in FIG. 28(B), for each of the symbols 13-1 to 13-5 included in the basic pattern of FIG. 28(A), "output (ON)" or "OFF" is defined at predetermined times (timing of the predetermined times) among the relative times t1 to t18.

In the example of FIG. 28, since the touch panel 31 is capable of detecting a plurality of points, an arbitrary combination of an arbitrary number of symbols 13-1 to 13-5 can be allowed to be "output (ON)" at any timing from time t1 to t18. Here, in FIG. 28(C), of the basic patterns of FIG. 28(A), unit patterns in which only the "output (ON)" symbols are filled black are drawn for each timing from time t1 to t18. By comparing with the unit pattern of FIG. 6(C), it is possible to recognize that a plurality of symbols are "output (ON)" for the unit patterns of FIG. 28(C) because the touch panel 31 can detect symbols.

The pattern code to be generated is defined by preparing a plurality of such unit patterns (25 types are prepared in the example of FIG. 28(C)) and placing various unit patterns one by one at each position in the time direction (each timing of the times t1 to t18.)

Note that in this embodiment, the switching of each of the symbols 13-1 to 13-5 ON/OFF is realized by the control of the CPU 17 in FIG. 4(C). The method of outputting one pattern code of FIG. 28(C) is not particularly restricted. For example, in the present embodiment, a method of repeating the pressing operation of the operation button 14 in FIG. 4(A) may be adopted, or it is also possible to adopt a method in which a self-weight button 23, that operates by the own weight of the stamp unit 16, is provided on the placement surface and the output is automatic upon placement on the code recognition apparatus 3. It is also possible to have a setting in which the same pattern code is repeatedly output for a predetermined number of times.

The basic configuration shown in FIG. 28 is the same as that of the symbol patterns of FIGS. 26 and 27 except for the following points.

As shown in FIG. 28, by placing the symbols 13-1 to 13-5 on non-rotating objects, it is possible to recognize the positive direction of the symbol pattern without turning on only symbol 13-1 after turned on symbols 13-1 to 13-5 as in FIGS. 7, 26 and 27.

Here, since with non-rotating objects, the patterns do not become geometrically the same upon rotating the group of symbols 13-1 to 13-5 with angles other than 360 degrees, it is possible to recognize the orientation of the group of symbols 13-1 to 13-5.

Therefore, it is possible to recognize the orientation of the acquired symbols 13-1 to 13-5. Although the position of the conductor indicating information changes due to the movement and the rotation of the stamp unit 16, it is possible to acquire the times t1 to t18 by recognizing the position of the conductor at high speed with the code recognition apparatus 3 and tracing the trajectory.

Furthermore, by continuing the output of the symbol 13-1, it is possible to recognize relative changes in the arrangements of the symbols 13-2 to 13-5 and improve recognition accuracy.

Furthermore, the geometrical arrangement of the non-rotating objects enables the recognition of the position and the rotation of the conductor indicating a change in information. Here, the symbol 13-1 is continuously kept ON even at the time of information output, but similarly to FIG. 27, when the symbol 13-1 outputs, information is output with the ON/OFF of the symbols 13-2 to 13-5 with the symbol 13-1 OFF. Next, by turning only the symbol 13-1 ON, and repeating the ON/OFF of the symbol 13-1 and the symbols 13-2 to 13-5, the symbol 13-1 may play the role of a time stamp for information output in the time direction and it is possible to reliably execute the acquisition of information that changes in the time direction.

FIG. 29 is a diagram exemplifying a symbol pattern in which indication by the information reading area IA is made easier by arranging the information reading apparatus at the end to make it easier for the user to recognize the reading position and providing a notch portion on the bottom face of the code generation apparatus 1, in addition to the arrangement of the non-rotating objects in FIG. 28.

FIG. 29 shows a specific example of a symbol pattern in which indication by the information reading area is made easier by arranging the symbols 13-1 to 13-5 on non-rotating objects to make it easier for the user to recognize the reading position and providing a notch portion on the bottom face of the code generation apparatus 1.

Figure 29A:
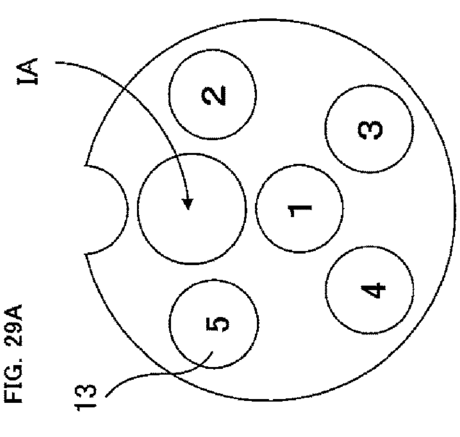
FIG. 29 is a diagram showing a specific example of a symbol pattern in which the information reading apparatus is placed at the end so that the user can easily recognize the reading position in addition to the dots 13-1 to 13-5 being arranged as a non-rotating object.
Figure 29B:
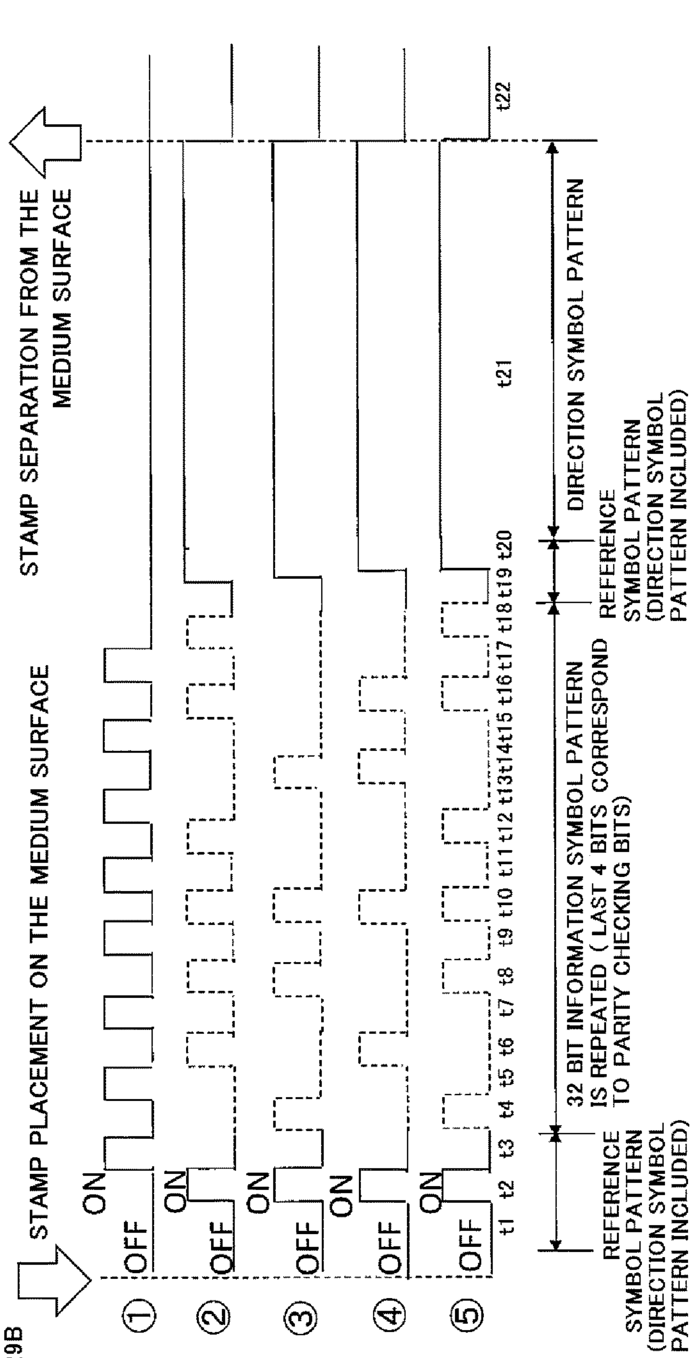

FIG. 29(A) shows a basic pattern. Furthermore, as shown in FIG. 29(B), for each of the symbols 13-1 to 13-5 included in the basic pattern of FIG. 29(A), "output (ON)" or "OFF" is defined predetermined times (timing of the predetermined times) among the relative times t1 to t18.

In the example of FIG. 29, since the touch panel 31 is capable of detecting a plurality of points, an arbitrary combination of an arbitrary number of symbols 13-1 to 13-5 can be allowed to be "output (ON)" at any timing from time t1 to t18.

Figure 29C:
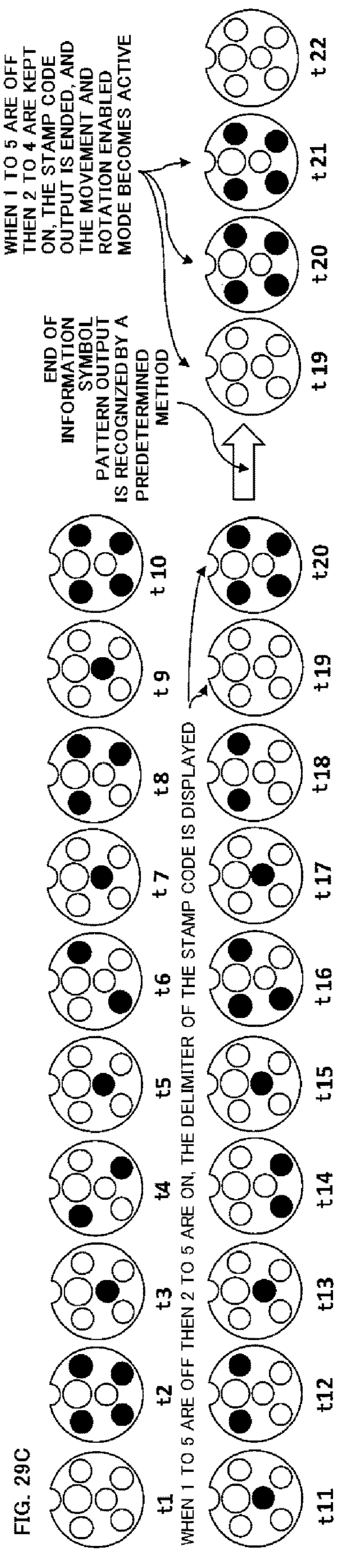

Here, in FIG. 29(C), of the basic patterns of FIG. 29(A), unit patterns in which only the "output (ON)" symbols are filled black are drawn for each timing from time t1 to t18. By comparing with the unit pattern of FIG. 6(C), it is possible to recognize that a plurality of symbols are "output (ON)" for the unit patterns of FIG. 29(C) because the touch panel 31 can detect symbols. Note that when the symbol 13-1 and at least one other symbol is ON, and the touch panel 31 cannot detect the symbols because they are too close to each other, symbol 13-1 and these other symbols must not be turned on at the same time.

The pattern code to be generated is defined by preparing a plurality of such unit patterns (22 types are prepared in the example of FIG. 29(C)) and placing various unit patterns one by one at each position in the time direction (each timing of the times t1 to t18.)

Note that in this embodiment, the switching of each of the symbols 13-1 to 13-5 ON/OFF is realized by the control of the CPU 17 in FIG. 4(C). The method of outputting one pattern code of FIG. 29(C) is not particularly restricted. For example, in the present embodiment, a method of repeating the pressing operation of the operation button 14 in FIG. 4(A) may be adopted, or it is also possible to adopt a method in which a self-weight button 23, that operates by the own weight of the stamp unit 16, is provided on the placement surface and the output is automatic upon placement on the code recognition apparatus 3. It is also possible to have a setting in which the same pattern code is repeatedly output for a predetermined number of times.

The basic configuration of FIG. 29 is the same as that of the symbol patterns of FIGS. 26 and 27 except for the following points.

By turning on the symbols 13-2 to 13-5, the positive direction of the symbol pattern can be recognized. In addition, three symbols among the symbols 13-1 to 13-5 may be turned on so as to form a non-axis rotation object. Note that when the symbol 13-1 and at least one other symbol is ON, and the touch panel 31 cannot detect the symbols because they are too close to each other, three symbols among symbols 13-2 to 13-5 must not be turned on with the formation of a non-axis rotation object.

Therefore, the orientation can be recognized with the acquired symbol pattern, and the position and the rotation of the conductor can be recognized.

For confirming the positive direction, after turning on the symbols 13-2 to 13-5, only the symbol 13-1 is turned on. The role of the symbol 13-1 as a reference symbol for indicating the center or the vicinity of the symbols 13-2 to 13-4 of the stamp unit 16 is to directly recognize the center or the vicinity of the symbols 13-2 to 13-4 of the stamp unit 16 and accurately recognize the position of the stamp unit 16 even if the stamp unit 16 moves.

At the time of output from time t1 to time t18, information is output by a combination of the ON/OFF of the symbols 13-2 to 13-5, while the symbol 13-1 is OFF. Next, by turning only the symbol 13-1 ON, and repeating the ON/OFF of the symbol 13-1 and the symbols 13-2 to 13-5, the symbol 13-1 may play the role of a time stamp for information output in the time direction and it is possible to reliably execute the acquisition of information that changes in the time direction. Furthermore, in order to reduce the area of the bottom of the stamp, the distance between the symbol 13-1 and other symbols may be shortened. This is because in this embodiment, since the symbol 13-1 and other symbols are not ON at the same time, no case in which the touch panel 31 cannot detect the symbols because they are too close to each other occurs. Needless to say, it is a matter of course that the symbols 13-2 to 13-6 are arranged at positions detectable by the touch panel 31.

By the embodiment, it is possible to output a 32-bit stamp code by outputting information symbols 8 times. Note that when the last time t18 is set to be for the parity check (4 bits), the recognition accuracy is improved remarkably, but the amount of information is reduced to 28 bits (270 million codes.)

There is a case in which it is desired to move the stamp unit 16 on the touch panel 31 to perform an operation after the pattern code is read by the code recognition apparatus 3.

In this case, by setting the symbols 13-2 to 13-5 (or any three of the symbols 13-2 to 13-5) to "output (ON)" after the completion of the output of the pattern code, regardless of how the stamp unit 16 is slid and rotated, the recognition unit 33 of the device 3 can recognize the position of the stamp unit 16 (the center position, the outer shape of the stamp unit 16, and the like) and the rotation angle of the stamp unit 16. Thus, an operation based on the image displayed on the touch panel 31 is possible.

Here, the symbol 13-1 is close to the symbols 13-2 to 13-5, but the symbol 13-1 and the symbols 13-2 to 13-5 can both be recognized at the same time by preventing them to be ON at the same time, even if both cannot be recognized at the same time due to a limitation in the arrangement intervals of the symbols of the code generation apparatus 1. Furthermore, in a case where at least one of the symbols 13-2 to 13-5 is turned on, and code recognition apparatus 3 continues to recognize it as ON even after the symbol is turned off due to floating capacitance remaining in the code output unit 13, by making the symbol recognized by the code recognition apparatus 3 invalid when the symbol 13-1 is turned on, the symbols 13-2 to 13-5 that are turned on after the symbol 13-1 is turned off can be reliably recognized by the code recognition apparatus 3. Electrostatic capacitance may be reduced so that no floating capacitance remains for the symbol 13-1. To reduce the electrostatic capacitance, there are various methods such as reducing it electrically, reducing the area of the conductor, shortening the output time, and the like.

FIG. 30 is a diagram showing a specific example of a symbol pattern in which no symbol code is read in a case where the touch panel 31 can detect multiple points.

FIG. 30 shows a specific example of a symbol pattern in which symbols 13-1 is arranged in the center and 13-2 to 13-6 are arranged at equal intervals.

Figures 30A, 30B, 30C:
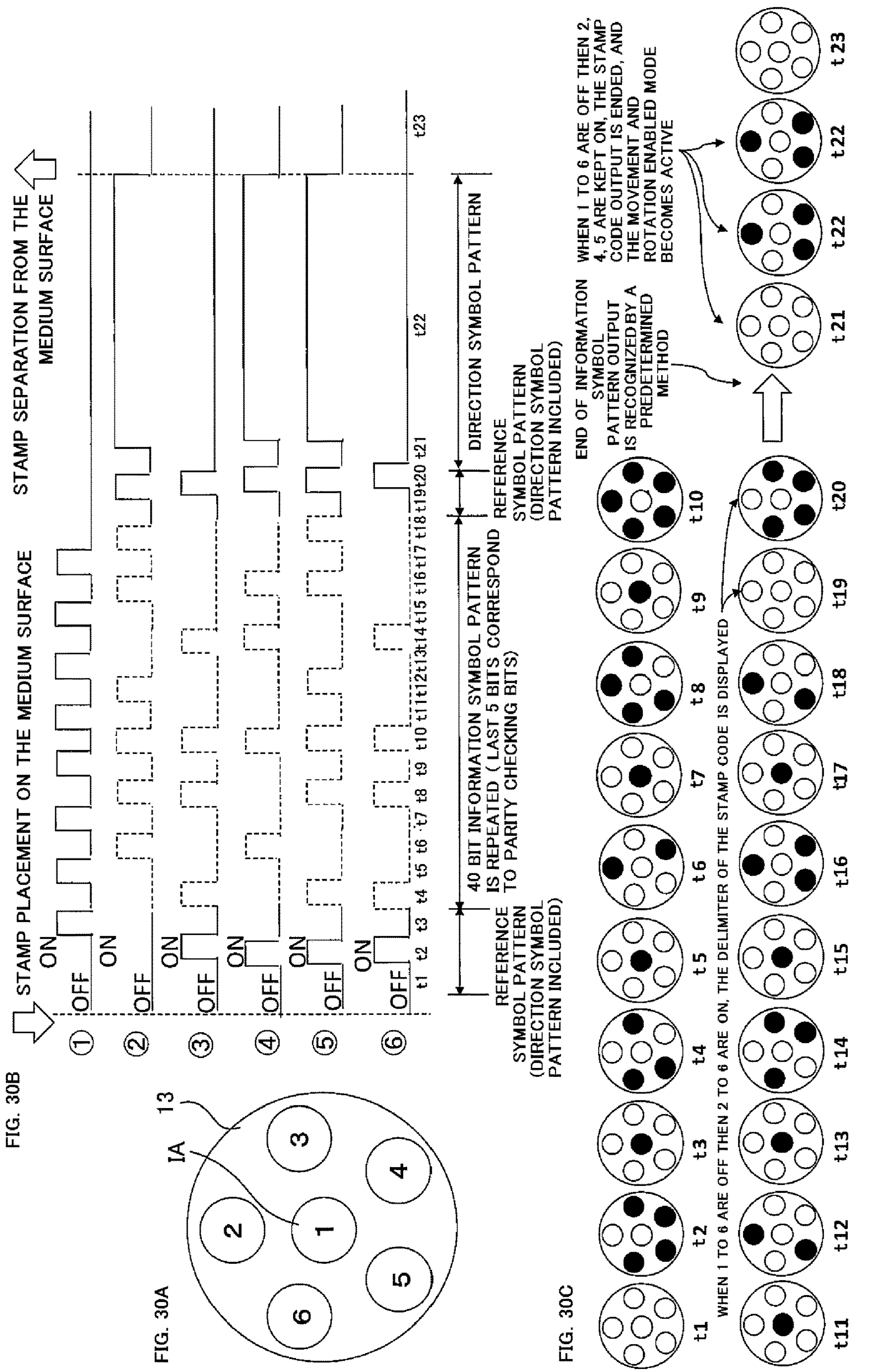
FIG. 30 is a diagram showing a specific example of a symbol pattern, of which the dot code is not read, when the touch panel 31 can detect multiple points.

FIG. 30(A) shows a basic pattern. Furthermore, as shown in FIG. 30(B), for each of the symbols 13-1 to 13-6 included in the basic pattern of FIG. 30(A), "output (ON)" or "OFF" is defined at predetermined times (timing of the predetermined times) among the relative times t1 to t18.

In the example of FIG. 30, since the touch panel 31 is capable of detecting a plurality of points, an arbitrary combination of an arbitrary number of symbols 13-1 to 13-5 can be allowed to be "output (ON)" at any timing from time t1 to t18.

Here, in FIG. 30(C), of the basic patterns of FIG. 30(A), unit patterns in which only the "output (ON)" symbols are filled black are drawn for each timing from time t1 to t18. By comparing with the unit pattern of FIG. 6(C), it is possible to recognize that a plurality of symbols are "output (ON)" for the unit patterns of FIG. 30(C) because the touch panel 31 can detect symbols. Note that when the symbol 13-1 and at least one other symbol is ON, and the touch panel 31 cannot detect the symbols because they are too close to each other, symbol 13-1 and these other symbols must not be turned on at the same time.

The pattern code to be generated is defined by preparing a plurality of such unit patterns (23 types are prepared in the example of FIG. 30(C)) and placing various unit patterns one by one at each position in the time direction (each timing of the times t1 to t18.)

Note that in this embodiment, the switching of each of the symbols 13-1 to 13-6 ON/OFF is realized by the control of the CPU 17 in FIG. 4(C). The method of outputting one pattern code of FIG. 30(C) is not particularly restricted. For example, in the present embodiment, a method of repeating the pressing operation of the operation button 14 in FIG. 4(A) may be adopted, or it is also possible to adopt a method in which a self-weight button 23, that operates by the own weight of the stamp unit 16, is provided on the placement surface and the output is automatic upon placement on the code recognition apparatus 3. It is also possible to have a setting in which the same pattern code is repeatedly output for a predetermined number of times.

The basic configuration of FIG. 30 is the same as that of the symbol patterns of FIG. 29 except for the following points.

By turning on the symbols 13-2 to 13-6, the positive direction of the symbol pattern can be recognized and the arrangement of the other symbols can be recognized by estimation. In addition, three symbols among the symbols 13-3 to 13-6 may be turned on so as to form a non-axis rotation object. Note that when the symbol 13-1 and at least one other symbol is ON, and the touch panel 31 cannot detect the symbols because they are too close to each other, three symbols among symbols 13-2 to 13-6 must not be turned on with the formation of a non-axis rotation object.

Therefore, the orientation can be recognized with the acquired symbol pattern, and the position and the rotation of the conductor can be recognized.

For confirming the positive direction, after turning on the symbols 13-3 to 13-6, only the symbol 13-1 is turned on. The role of the symbol 13-1 as a reference symbol for indicating the center of the symbols 13-2 to 13-4 of the stamp unit 16 is to directly recognize the center or the vicinity of the symbols 13-3 to 13-4 of the stamp unit 16 and accurately recognize the position of the stamp unit 16 even if the stamp unit 16 moves.

At the time of output from time t1 to time t18, information is output by a combination of the ON/OFF of the symbols 13-2 to 13-6, while the symbol 13-1 is OFF. Next, by turning only the symbol 13-1 ON, and repeating the ON/OFF of the symbol 13-1 and the symbols 13-2 to 13-6, the symbol 13-1 may play the role of a time stamp for information output in the time direction and it is possible to reliably execute the acquisition of information that changes in the time direction. Furthermore, in order to reduce the area of the bottom of the stamp, the distance between the symbol 13-1 and other symbols may be shortened. This is because in this embodiment, since the symbol 13-1 and other symbols are not ON at the same time, no case in which the touch panel 31 cannot detect the symbols because they are too close to each other occurs. Needless to say, it is a matter of course that the symbols 13-2 to 13-6 are arranged at positions detectable by the touch panel 31.

By the embodiment, it is possible to output a 40-bit stamp code by outputting information symbols 8 times. Note that when the last time t18 is set to be for the parity check (5 bits), the recognition accuracy is improved remarkably, but the amount of information is reduced to 35 bits (34.36 billion codes.)

There is a case in which it is desired to move the stamp unit 16 on the touch panel 31 to perform an operation after the pattern code is read by the code recognition apparatus 3. In this case, by setting the symbols 13-2, 13-4, and 13-5 (or any three of the symbols 13-2 to 13-6) to "output (ON)" after the completion of the output of the pattern code, regardless of how the stamp unit 16 is slid and rotated, the recognition unit 33 of the device 3 can recognize the position of the stamp unit 16 (the center position, the outer shape of the stamp unit 16, and the like) and the rotation angle of the stamp unit 16. Thus, an operation based on the image displayed on the touch panel 31 is possible.

Here, the symbol 13-1 is close to the symbols 13-2 to 13-6, but the symbol 13-1 and the symbols 13-2 to 13-6 can both be recognized at the same time by preventing them to be ON at the same time, even if both cannot be recognized at the same time due to a limitation in the arrangement intervals of the symbols of the code generation apparatus 1. Furthermore, in a case where at least one of the symbols 13-2 to 13-6 is turned on, and code recognition apparatus 3 continues to recognize it as ON even after the symbol is turned off due to floating capacitance remaining in the code output unit 13, by making the symbol recognized by the code recognition apparatus 3 invalid when the symbol 13-1 is turned on, the symbols 13-2 to 13-6 that are turned on after the symbol 13-1 is turned off can be reliably recognized by the code recognition apparatus 3.

Electrostatic capacitance may be reduced so that no floating capacitance remains for the symbol 13-1. To reduce the electrostatic capacitance, there are various methods such as reducing it electrically, reducing the area of the conductor, shortening the output time, and the like.

Thus, although FIG. 28, FIG. 29, and FIG. 30 are described with different symbol patterns from those in FIG. 7, FIG. 26, and FIG. 27, the same effects can be obtained, and symbol patterns with combinations in which features of FIG. 7, FIG. 26, FIG. 27, FIG. 28, FIG. 29, and FIG. 30 are each selectively adopted may be output. Note that the mounting surface may have any external shape.

FIG. 31 is a diagram showing the position recognition of the input medium symbol pattern.

Figure 31A:
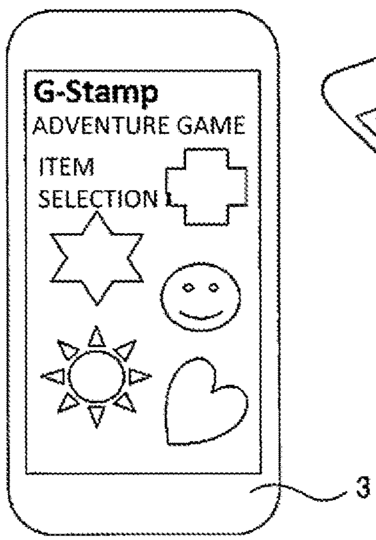
FIG. 31 is a diagram showing the position recognition of an input medium symbol pattern
Figure 31B:
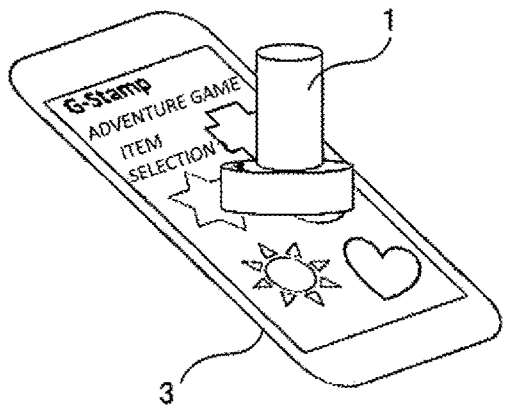

FIG. 31(A) shows the code recognition apparatus 3. Furthermore, in FIG. 31(B), the code generation apparatus 1 and the code recognition apparatus 3 are shown. When the code generation apparatus 1 is placed on the display of the code recognition apparatus 3 to select an object image such as a small icon, a character, a graphic, or the like, it is difficult for the code generation apparatus 1 to instruct because a certain amount of bottom area is required.

Figure 31C:
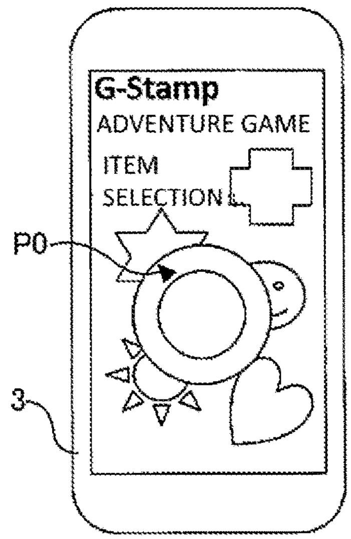
Figure 31D:
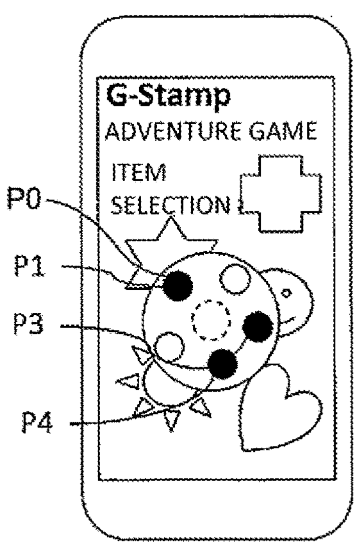
Figure 31E:
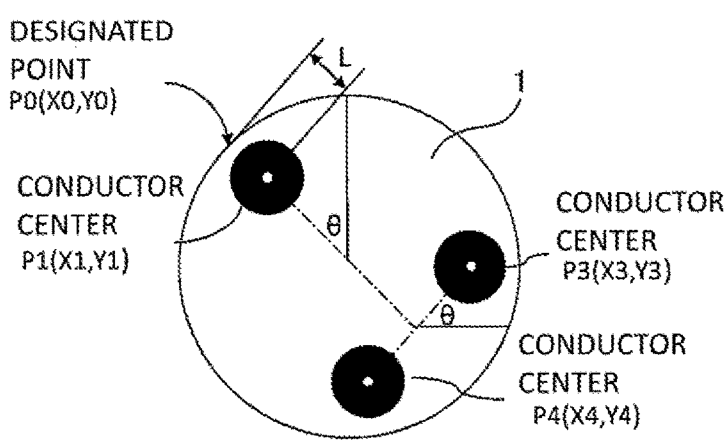

Therefore, as shown in FIG. 31(C), the instruction area of the object image is accurately indicated with an indication mark or a protrusion on the code generation apparatus 1, a notch provided on the bottom face of the code generation apparatus 1, or an optical instruction (for example, by a laser pointer or the like). A method of calculating the instruction point P0 (X0, Y0) at the end of the code generation apparatus 1 of the position information of the code recognition apparatus 3 will be described below.

When the center coordinate values of the conducting conductors are P1(X1, Y1), P3(X3, Y3) and P4(X4, Y4), the rotation angle θ of the stamp, with the clockwise direction as positive, is obtained with θ=ARK tan ((Y3−Y4)/(X3−X4)). When the distance from the center coordinate value P1(X1, Y1) of the conductor 13-1 to the instruction point P0 (X0, Y0) is L, the instruction point P0(X0, Y0) is obtained with $$X0 = X1 + L \sin\theta$$

$$Y0 = Y1 + L \cos\theta.$$

Note that if the instruction point is determined by a predetermined method, then by successively tracking the moving coordinate values, the number of conductors to recognize may be two. In this manner, the instruction point is determined (see FIGS. 31(D) and 31(E).)

Each example of the authentication system using the code generation apparatus 1 will be described below with reference to FIGS. 32 to 37.

Next, each example of the information platform system using the code generation apparatus 1 will be described with reference to FIGS. 38 to 42.

In these systems, predetermined applications are executed with the code recognition apparatus 3. The predetermined applications can handle various kinds of services and processings in a unified manner by using the code generated from the code generation apparatus 1. That is, as shown in the embodiments of FIGS. 32 to 37, it is also possible to realize a platform where the code recognition apparatus 3 reads various stamp codes (the aforementioned pattern codes) output by the code generation apparatus 1, application set in the code recognition apparatus 3 are activated, and an application corresponding to a stamp code set in a server or a cloud is executed with the use of only one predetermined application (stamp code processing application.)

FIG. 32 is a diagram showing an embodiment of a personal authentication service using the present invention.

Hereinafter, when referred to as the present invention, it means the various inventions described in the specification mentioned above.

When paying a purchase price, making an agreement on the net, acquiring self and family private information of the principal and the like, it was necessary for the principal to present an identification card and to fill in necessary information on dedicated printed matter, and to seal it.

Figure 32A:
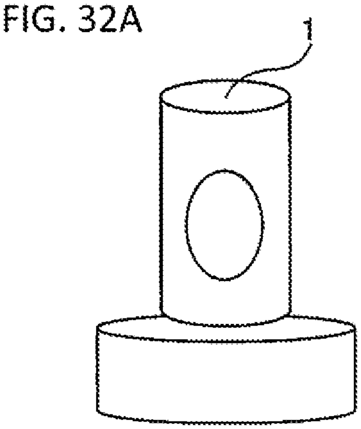
FIG. 32 is a diagram showing an embodiment of a personal authentication service using the present invention.

However, as in FIG. 32(A), convenience and security can be greatly improved by using the code generation apparatus 1 as a digital seal for the principal. Note that in order to prove that the user of the code generation apparatus 1 is the principal, a fingerprint authentication sensor may be provided in the code generation apparatus 1. Furthermore, in the place of a fingerprint authentication sensor, a vein authentication sensor, a retina authentication sensor, an iris authentication sensor, or the like may be provided.

Figure 32B:
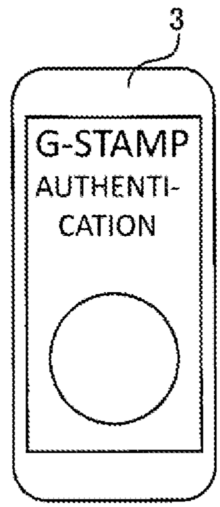

As in FIG. 32(B), when performing identity verification or approval/agreements in various situations, the code generation apparatus 1, in which a predetermined application is activated, is brought into contact with a code generation apparatus 1 possessed by the principal, and thereby a stamp code identifying the principal is output and the identity of the principal is confirmed. In that case, security can be increased furthermore, by the entering of a password by the principal, fingerprint authentication, or the like. Note that fingerprint authentication is performed by the registering of fingerprint information of the principal by the code generation apparatus 1 in a predetermined manner and by placing the finger registered in the fingerprint authentication sensor of the code generation apparatus onto the code recognition apparatus 3 after making contact or when coming into contact with the sensor, the corresponding stamp code is output and executed. If it is not the principal, a stamp code indicating that it is not the principal may be output, or stamps code may be made not be output at all. As for methods to register fingerprint information, registration may be accomplished by coming into contact with a medium on which a dot code indicating a registration procedure is formed or a code recognition apparatus 3 displaying a dot code and having the code generation apparatus 1 read the dot code or by the operation buttons provided in the code generation apparatus 1. Furthermore, by registering the fingerprint information of a plurality of users such as family members, it may be available to a plurality of users. The code generation apparatus 1 may be provided with a clock function to record (log) when and who used it. Such information can be acquired by other information processing apparatuses via a USB or a wireless function. Furthermore, the code recognition apparatus 3 may output a stamp code corresponding to the log by coming into contact with it As for another method, by placing the finger onto the code recognition apparatus 3 after making contact or when contacting with the fingerprint authentication sensor of the code generation apparatus for fingerprint information acquisition, a stamp code corresponding to the acquired fingerprint information may be output. The fingerprint information output by the stamp code may be compared with the fingerprint information registered in a storage medium (including a server or the like) connected to the code recognition apparatus 3 wirelessly or by wire, or in the code recognition apparatus 3.

Figure 32C:
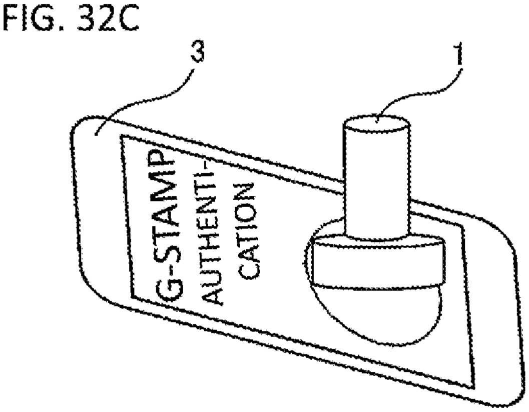

As in FIG. 32(C), in order to eliminate counterfeit code generation apparatuses 1 and code generation apparatuses 1 of which the expiration date has passed, another advanced approval may be made by having a dot code obtained by encrypting the stamp code output from the code generation apparatus 1, shown on the display of the code recognition apparatus 3, and read by the code generation apparatus 1, and having a cryptographic stamp code corresponding to the dot code be output. To increase the security, the code generation apparatus 1 may be provided with a clock function and may output a stamp code corresponding to the time, and also the code recognition apparatus 3 may authenticate the stamp code based on the impression time.

Figure 32D:
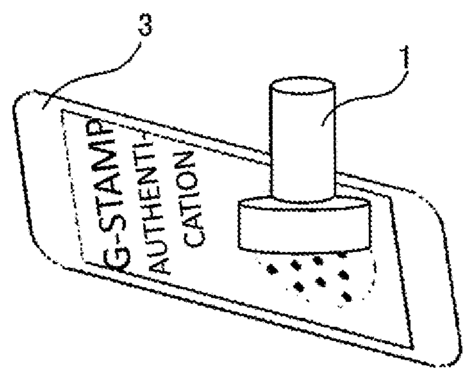
Figure 32E:
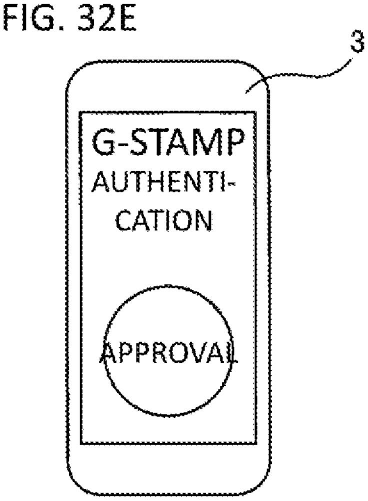

As shown in FIGS. 32(B) and 32(C), although the code recognition apparatus 3 was reckoned to first read the stamp code output from the code generation apparatus 1, as shown in FIGS. 32(D) and 32(E), the code recognition apparatus 3 may authenticate by at first having the code recognition apparatus 3 display a dot code, and then having the code generation apparatus 1 read the dot code and output the password stamp code. Similarly to FIG. 32(C), security may be increased by authentication of the stamp code based on the stamping time. Furthermore, if a dot code corresponding to a PIN code is output with an algorithm unique to each code generation apparatus 1, security is enhanced still further.

FIG. 33 is a diagram showing an example of a ticket purchase/coupon acquisition service using the present invention.

Figure 33A:
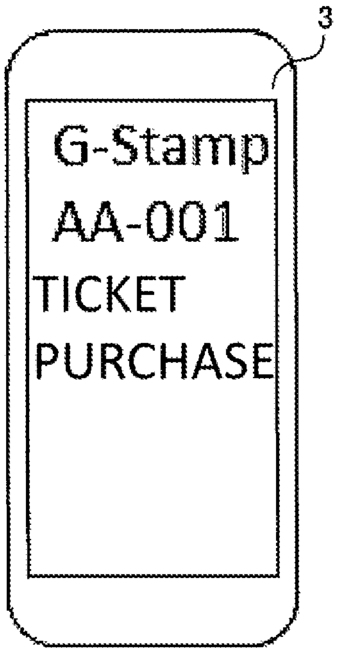
FIG. 33 is a diagram showing an embodiment of a ticket purchase/coupon acquisition service using the present invention.

As in FIG. 33(A), with a predetermined application, a ticket can be purchased and a coupon can be acquired. A corresponding stamp code is assigned.

Figure 33B:
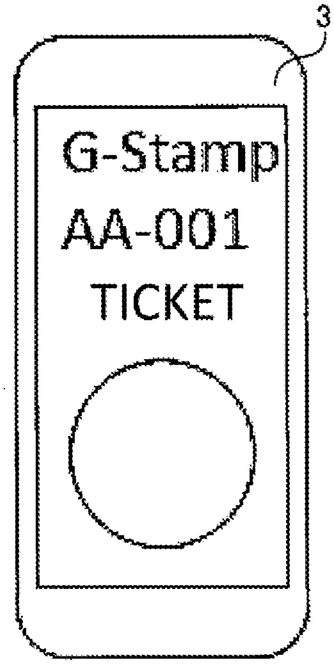

As shown in FIG. 33(B), when an entry is made or a coupon is used, a predetermined application is activated and an approval screen is displayed.

Figure 33C:
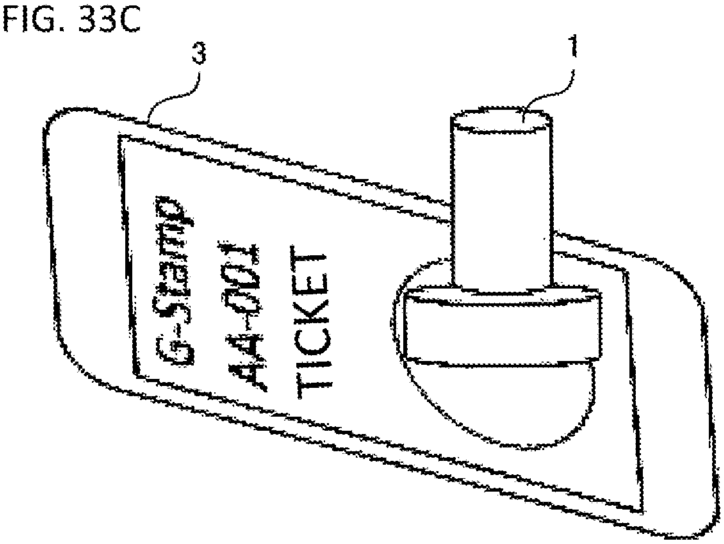

As in FIG. 33(C), a clerk brings the code generation apparatus 1 into contact with the code recognition apparatus 3 when an entry is made or a coupon is used. The code generation apparatus 1 is set in advance so as to output a stamp code corresponding to the ticket or coupon.

Figure 33D:
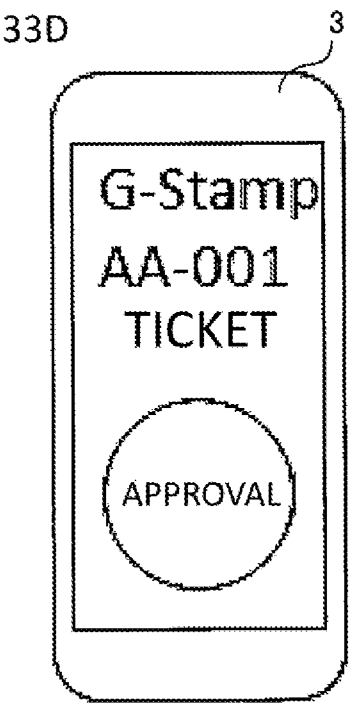

As in FIG. 33(D), the code recognition apparatus 3 reads the stamp code output by the code generation apparatus 1, and entry and the use of coupons is approved. Upon re-entry, this screen is to be shown.

FIG. 34 is a diagram showing a ticket purchase/coupon acquisition service (dot display) using the present invention.

Figure 34A:
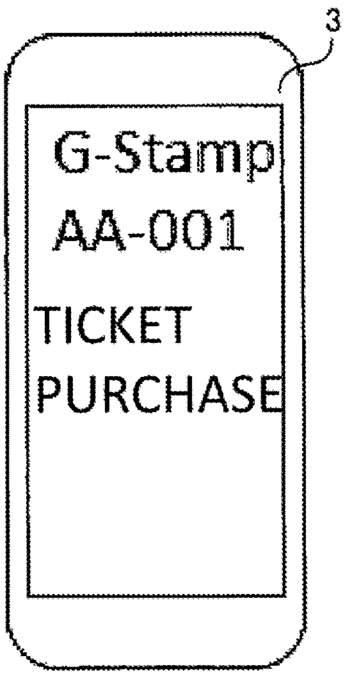
FIG. 34 is a diagram showing a ticket purchase/coupon acquisition service (dot display) using the present invention.

As in FIG. 34(A), a ticket is purchased or a coupon is acquired using a predetermined application. A corresponding dot code is assigned.

Figure 34B:
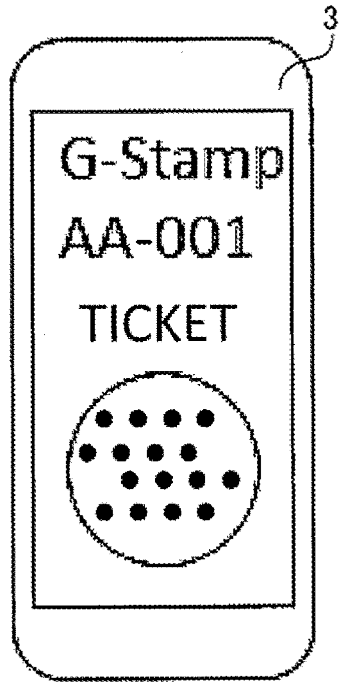

As in FIG. 34(B), a predetermined application is activated when an entry is made or a coupon is used, and a dot code corresponding to a ticket or a coupon is displayed on the approval screen.

Figure 34C:
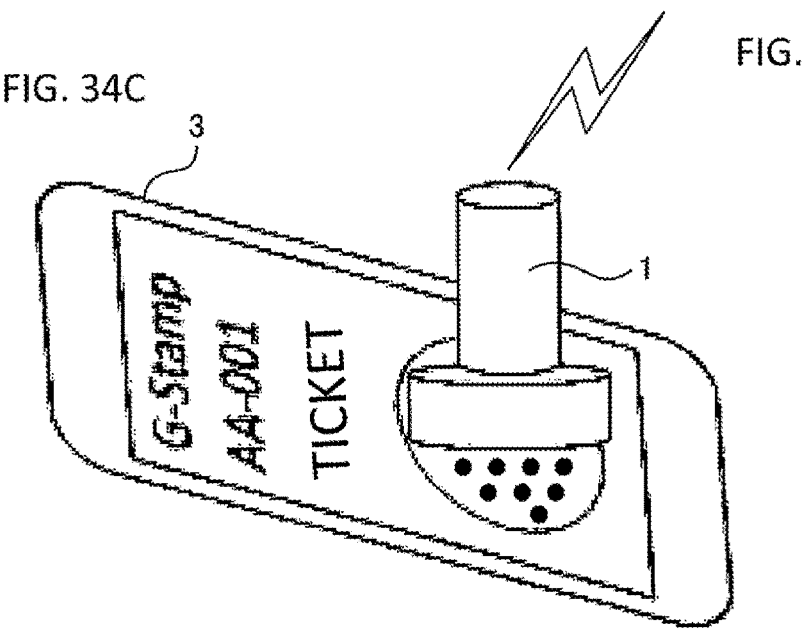

As in FIG. 34(C), a clerk brings the code generation apparatus 1 into contact with the code recognition apparatus 3 when an entry is made or a coupon is used, and the dot code is read. A dot code corresponding to a ticket or a coupon is registered in the code generation apparatus 1 in advance and it is authenticated. Note that a wireless function may be installed in the code generation apparatus 1 and the dot code may be approved by the server 4.

Figure 34D:
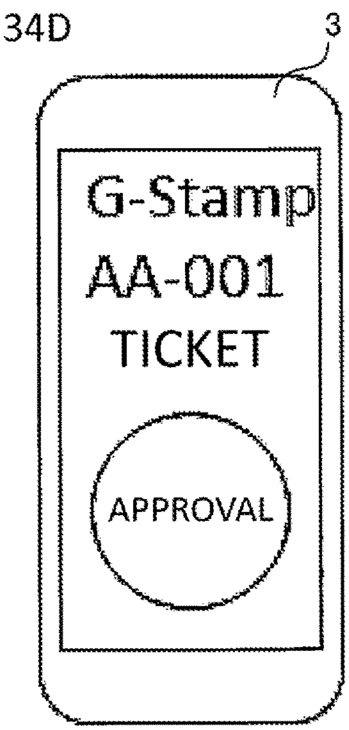

As in FIG. 34(D), after the code generation apparatus 1 reads the dot code, a corresponding stamp code is output, and the code recognition apparatus 3 reads it and approves its use for entry and coupons. In a case with a wireless function installed, an approval stamp code may be transmitted from the server 4 each time.

FIG. 35 is a diagram showing a ticket/coupon printout service using the present invention.

Figure 35A:
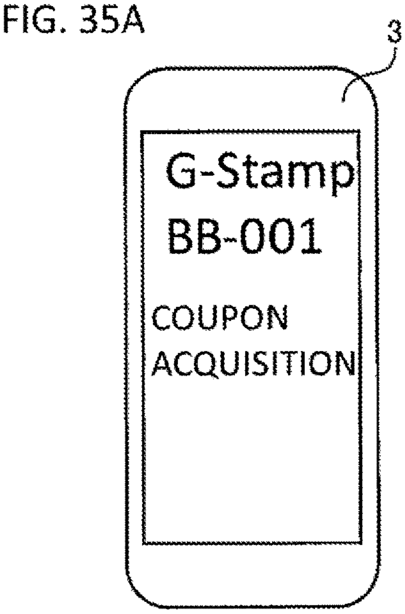
FIG. 35 is a diagram showing a ticket/coupon printout service using the present invention.

As in FIG. 35(A), with a predetermined application, a ticket can be purchased and a coupon can be acquired. A corresponding dot code is assigned.

Figure 35B:
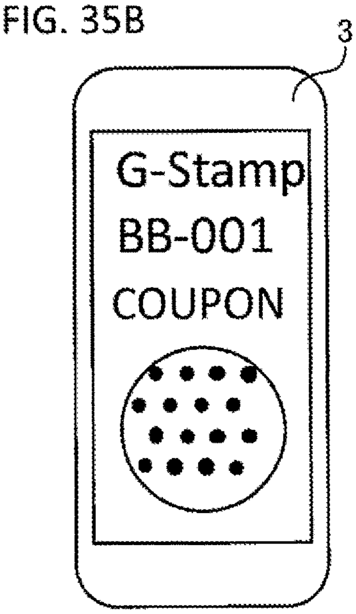

As in FIG. 35(B), a predetermined application is activated, and a dot code corresponding to a ticket or a coupon is displayed on the print output screen.

Figure 35C:
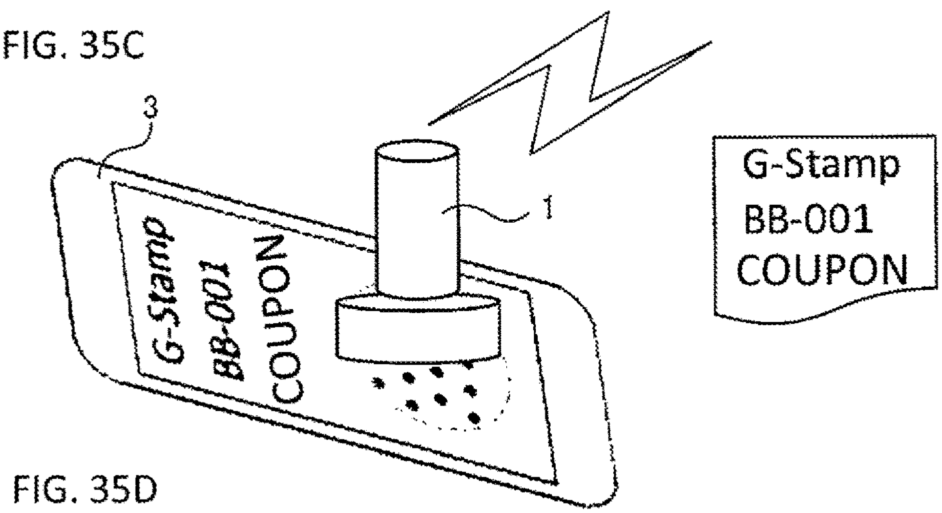

As in FIG. 35(C), the code generation apparatus 3 equipped with the wireless function is brought into contact with the code recognition apparatus 3. The code generation apparatus 1 reads the dot code, the server 4 authenticate it, and in addition, a printer which is wirelessly connected (for example, BT, Wi-Fi, and the like) outputs the ticket or the coupon. Note that a dot code corresponding to the ticket or the coupon may be registered in the code generation apparatus 1 in advance and be authenticated.

Figure 35D:
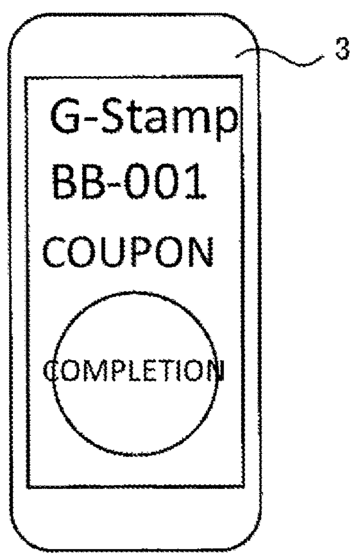

As in FIG. 35(D), after the code generation apparatus 1 reads the dot code, a corresponding stamp code is output, the code recognition apparatus 3 reads it and printing is regarded as already completed, and thereafter it becomes impossible to print.

FIG. 36 is a diagram showing a coupon/point customer attraction service using the present invention.

Figure 36A:
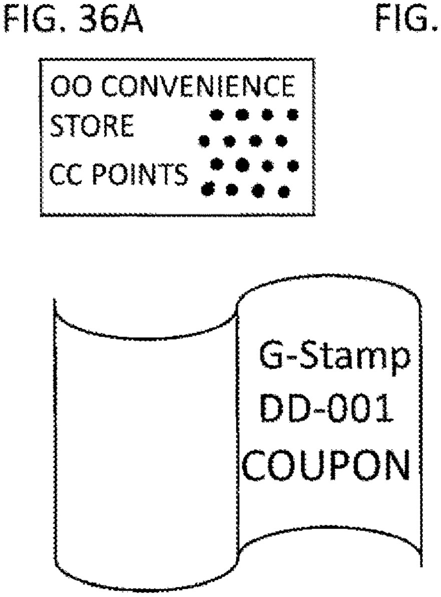
FIG. 36 is a diagram showing a customer attracting coupon/point service using the present invention.

As in FIG. 36(A), the user is given various printed materials such as flyers, DMs, newspapers, magazines, and the like which offer coupons and points services.

Figure 36B:
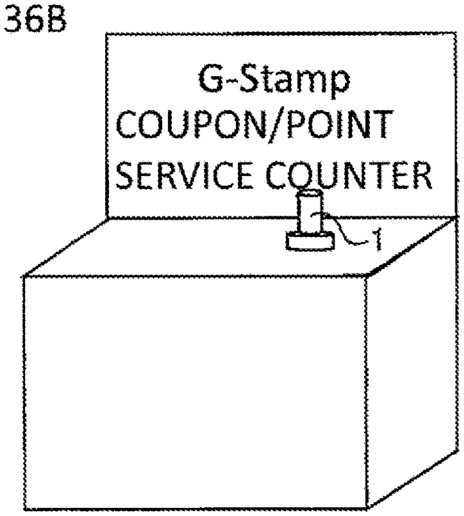

As in FIG. 36(B), the user goes to the service counter with the coupons and printed matter that offer points. The offering side of the coupons and the points places a service counter where attracting is necessary to attract customers.

Figure 36C:
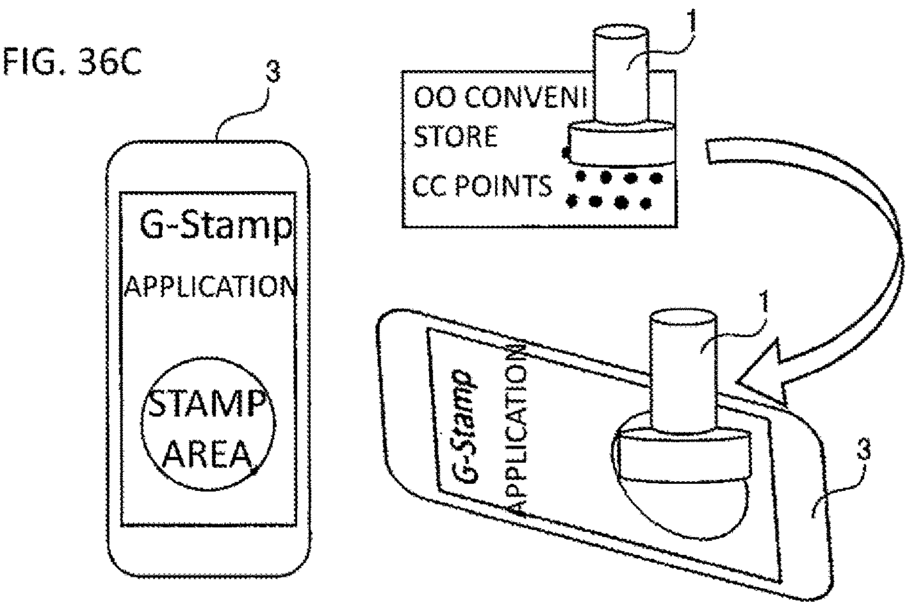

As in FIG. 36(C), a predetermined application is activated, and after coming into contact with the bring-in coupon or dot printed matter offering points with the code generating apparatus 1, the stamp mark area of the code recognition apparatus 3 is brought into contact. A stamp code corresponding to the dot code is set in advance in the code generation apparatus 1. If a wireless function is installed in the code generation apparatus 1, it is possible to sequentially update information of the stamp codes and the like, and to transmit information to the server 4. Stamp pressing may be done either by the user or the provider. When a predetermined application is activated and upon coming into contact with the printed matter, it is brought into contact with the code recognition apparatus 3, a coupon and points corresponding to the printed matter screen are displayed.

Figure 36D:
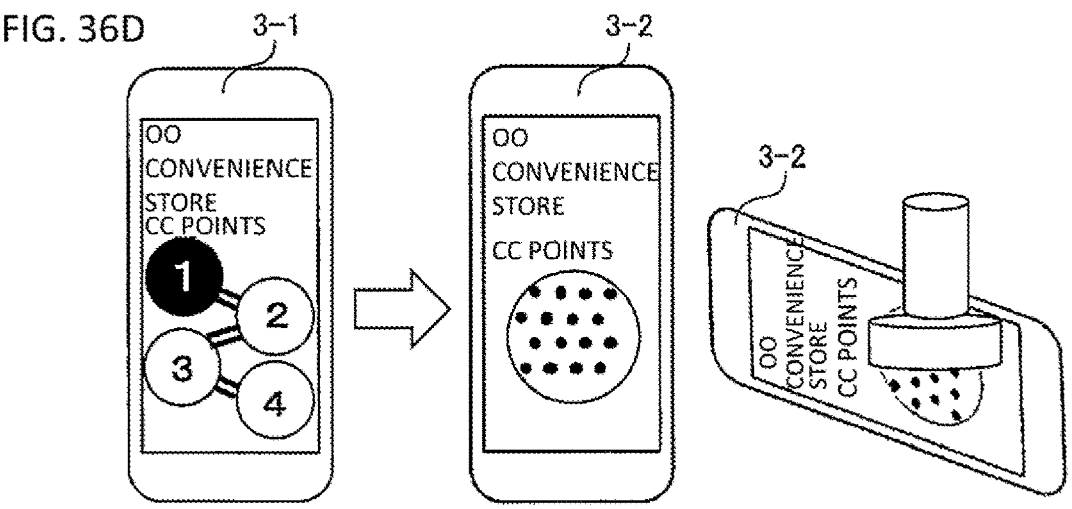

As in FIG. 36(D), a stamp code corresponding to the dot code read by the code generation apparatus 1 is output, the code recognition apparatus 3 reads it and a coupon or points are acquired. After the code recognition apparatus 3 reads the stamp code, the code generation apparatus 1 may show a dot code in which predetermined information is defined on the display of the code recognition apparatus 3, the code generation apparatus 1 may read the dot code, and information such as information stamped in from the code recognition apparatus 3, personal information or the like may be read. The information may be transmitted using a wireless function or the like. When the seal area is brought into contact with the code generation apparatus 1, an image of a point card or a stamp rally corresponding to the printed matter is displayed on the code recognition apparatus 3, and points or a stamp are granted. Furthermore, a dot code corresponding to point or stamp acquisition information or personal information may be displayed on the screen of the code recognition apparatus 3 and be read by the code generation apparatus 1. The information may be transmitted using wireless communication or the like.

FIG. 37 is a diagram showing an electronic point card service using the present invention.

Figure 37A:
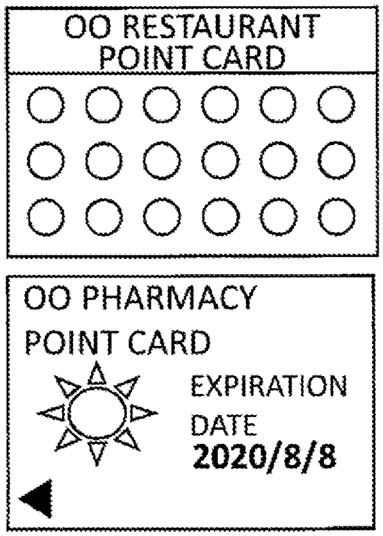
FIG. 37 is a diagram showing an electronic point card service using the present invention.

Conventionally, as shown in FIG. 37(A), when making a payment at a shop, a point stamp is pressed onto a paper point card or a point is accumulated on a plastic point card. However, for the user, management is troublesome with the increase in the number of point cards, and with plastic cards, it is hard to tell how many points are accumulated and until when they are valid.

Figure 37B:
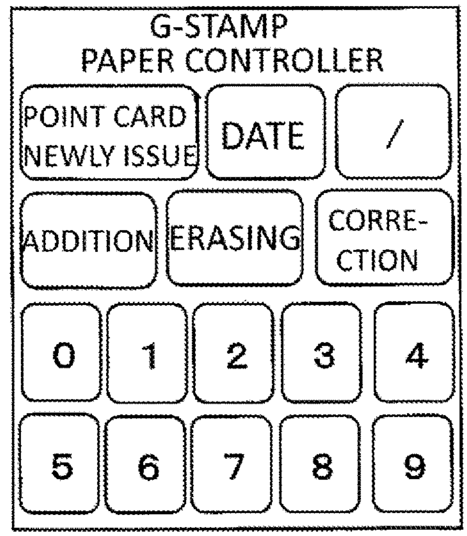
Figure 37C:
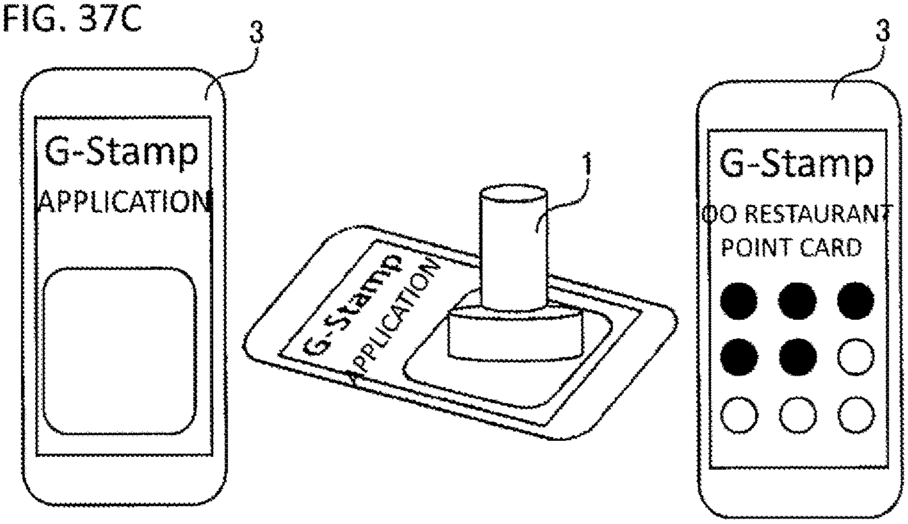
Figure 37D:
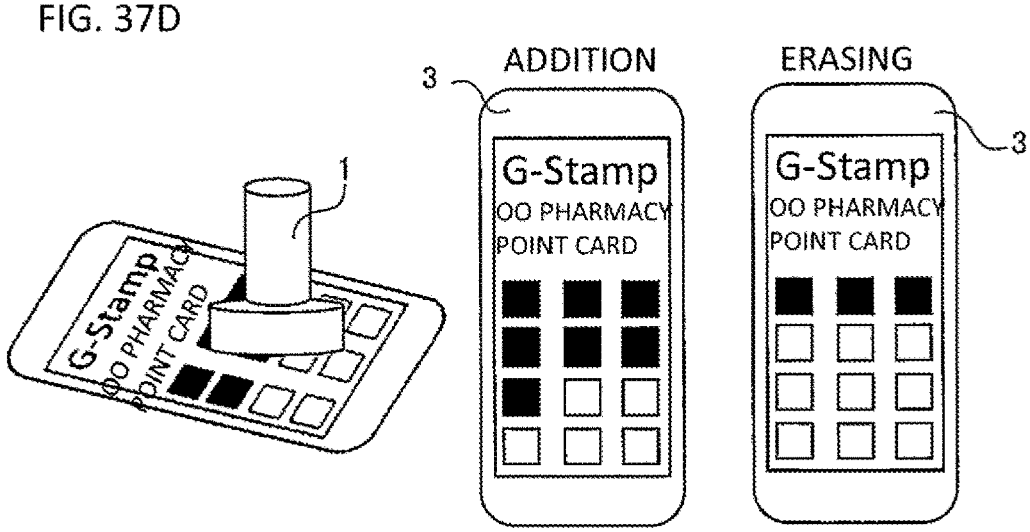

Thus, as shown in FIGS. 37(B) to 37(D), an electronic point card service using the present invention is provided. As shown in FIG. 37(B), when a predetermined application is activated and a code recognition apparatus 3 is brought into contact with a code generation apparatus 1 at the shop, a point card of the shop is displayed. As in FIG. 37(C), in accordance with the amount of money and coupons used at the cashier, the shop clerk brings the code generation apparatus 1 into contact with the numerals or icons of a dot-printed paper controller and the number of points and the date are temporarily recorded in the code generation apparatus 1. Note that points may be added/deleted without using a paper controller.

As in FIG. 37(C), the number of points and the date recorded in the code generation apparatus 1 are converted into a stamp code, and by coming into contact with the user's code recognition apparatus 3, the points specific to the shop are added in the code recognition apparatus 3. Note that the operation buttons of the code generation apparatus 1 may be pressed as many times as necessary, or the code generation apparatus 1 may be tapped or rotated to add points. With a predetermined application, the user can tell the accumulated points of each shop at any time and can use them. By activating a predetermined application and coming into contact with the seal area with the code generation apparatus 1, the point card of the specific shop is displayed.

As shown in FIG. 37(D), when using points, the code recognition apparatus 3 is touched with the code generation apparatus 1 to erase the number of points used at the cashier by identifying the dot printed numeral or corresponding icon.

Note that the operation button of the code generation apparatus 1 may be pressed as many times as necessary, or the code generation apparatus 1 may be tapped or rotated to erase points. Even if the operation is mistaken, correction of points can be made using the same operation. Each shop can transmit various kinds of advertisement information of campaigns and the like to the code recognition apparatus 3 to promote the use of the shop by joining a predetermined service system for providing points and coupons.

When registering the point card of the shop, after the code recognition apparatus 3 is touched with the code generation apparatus 1, a display such as "Will you accept information distribution from the shop?" is shown on the display and the user himself/herself performs approval according to a predetermined method. As a predetermined method, displaying a dot code and having the code generation apparatus 1 read the dot code is considered to be an approval. The dot code includes the ID of the code recognition apparatus 3, personal information, and the like, and the information may be transmitted by wireless communication or the like.

Adding/erasing can be done by adding/erasing operations using the code generation apparatus 1 on the point card screen displayed by coming into contact with the code generation apparatus 1. Operations cannot be performed with the code generation apparatuses 1 of other shops.

FIG. 38 is a diagram showing an information service by print media using the present invention.

Figure 38A:
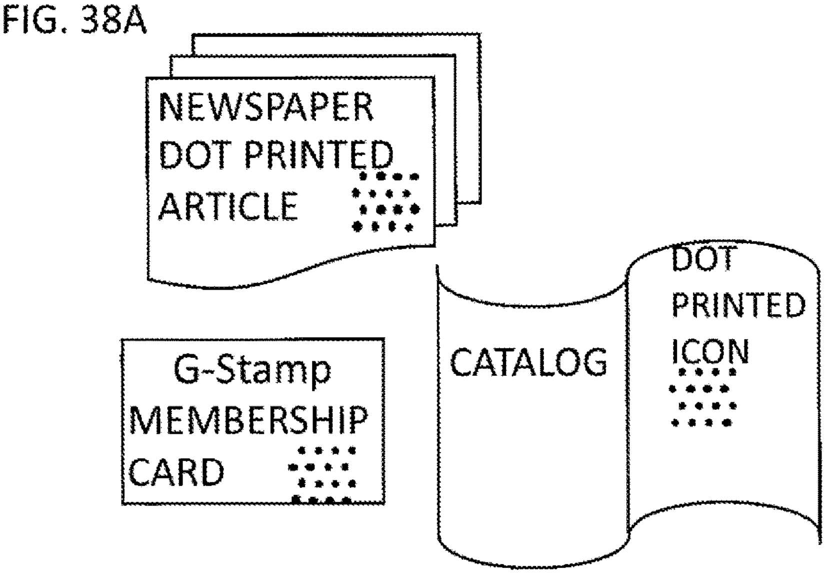
FIG. 38 is a diagram showing an information service by a print medium using the present invention.

As in FIG. 38(A), a provider or the like of various printed materials such as a newspaper printed with dot codes, a member's newsletter, a magazine, a catalog, teaching material, a picture book, a sightseeing map, and the like distributes the code generation apparatus 1 as a platform. It may be sold as a set with the printed materials.

Figure 38B:
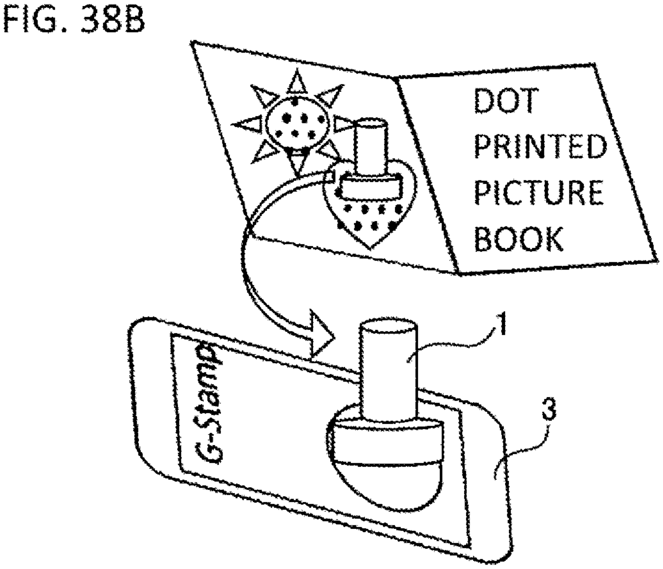

As in FIG. 38(B), the user has the code generation apparatus 1 touch the dot printed matter to read the dot code. Next, when the code recognition apparatus 3 is touched, a stamp code corresponding to the dot code is output, and the code recognition apparatus 3 reads the stamp code.

If it is exclusive to members, the user may log in by coming into contact with the dotted membership card before coming into contact with the dot printed part. Password input may be performed by rotating the code generation apparatus 1 a predetermined number of times in a predetermined direction or by coming into contact with the code recognition apparatus 3 with a finger. A G stamp itself may issue an ID. By coming into contact with various dot printed materials with the code generation apparatus 1 and then coming into contact with the code recognition apparatus 3, it is possible to browse contents or start a game.

Figure 38C:
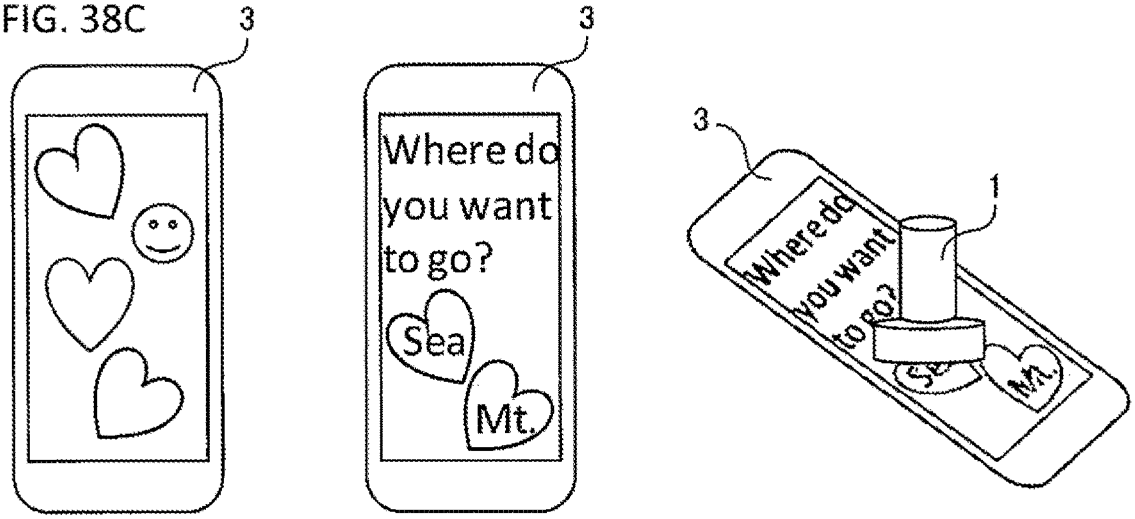

As in FIG. 38(C), when the code recognition apparatus 3 reads the stamp code, the code recognition apparatus 3 executes the browsing of contents or activation/operation instructing of the program corresponding to the stamp code (corresponding to the dot code). If the stamp code (corresponding to the dot code) is not registered in the memory of the code recognition apparatus 3, processings or contents corresponding to the stamp code (corresponding to the dot code) are downloaded or streamed from the server 4 to the code recognition apparatus 3. Note that depending on the content, it is also possible to slide the code generation apparatus 1 on the screen of the code recognition apparatus 3 to select an operation button and decide the next action. The progressing of a game, a purchase of goods, tourist route guiding and the like are also possible. Since the code recognition apparatus 3 can recognize the rotation angle of the code generation apparatus 1, by rotating the code generation apparatus 1, it is possible to scroll in a predetermined direction on a map or drawing/photo displayed on the code recognition apparatus 3 or to view a 360 degree panorama. When characters, icons, and graphics displayed on the code recognition apparatus 3 are selected, rotated or moved by the code generation apparatus 1, the following contents and operation instructions are displayed, and in addition, operations with the code generation apparatus 1 are possible.

FIG. 39 is a diagram showing a mail-order service by print media using the present invention.

Figure 39A:
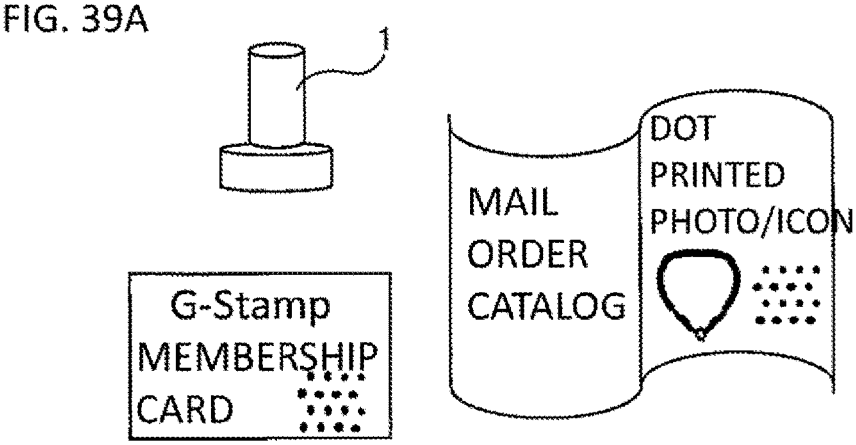
FIG. 39 is a diagram showing a mail-order service by a print medium using the present invention.

As in FIG. 39(A), a mail order catalog on which a dot code is printed, a dotted membership card, and a code generation apparatus 1 are distributed to members. The user logs in by coming into contact with the dotted membership card. Password input may be performed by rotating the code generation apparatus 1 a predetermined number of times in a predetermined direction or by coming into contact with the code recognition apparatus 3 with a finger. The code generation apparatus 1 itself may issue an ID.

Figure 39B:
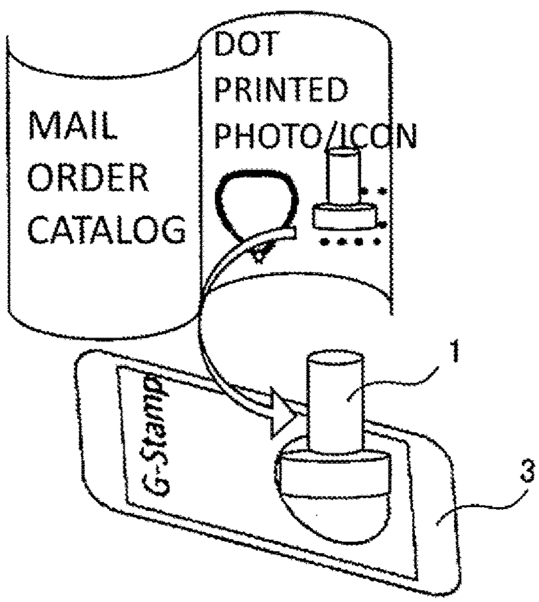

As in FIG. 39(B), by the user's coming into contact with of the photograph of an item in a mail-order catalog, a "comment icon," a "basket icon," or a "quantity icon" a dot code is read. Next, when the code recognition apparatus 3 is brought into contact, a stamp code corresponding to the dot code is output, and the code recognition apparatus 3 reads the stamp code.

Figure 39C:
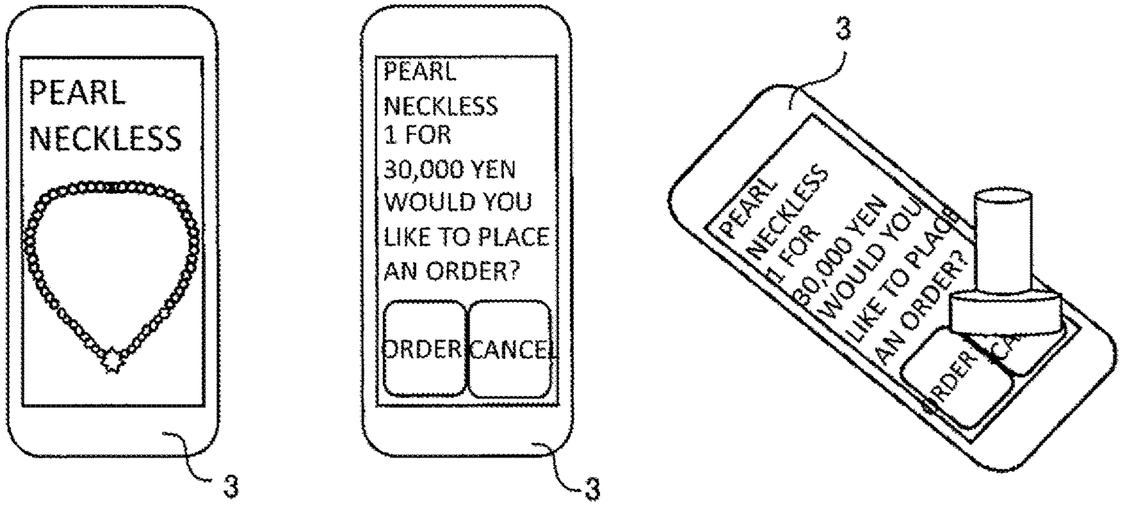

As in FIG. 39(C), when a catalog is touched with the code generation apparatus 1 and then the code recognition apparatus 3 is touched, a description of the item is displayed. Furthermore, when an operation button is pressed, or the code generation apparatus 1 is tapped or rotated, an order screen is displayed. When the code recognition apparatus 3 reads the stamp code, commentary on the item and order details corresponding to the stamp code (corresponding to the dot code) are displayed on the code recognition apparatus 3. If the stamp code (corresponding to the dot code) is not registered in the memory of the code recognition apparatus 3, processings or contents corresponding to the stamp code (corresponding to the dot code) are downloaded or streamed from the server 4 to the code recognition apparatus 3. If there is no problem with the order details of the code recognition apparatus 3, the "order icon" on the display of the code recognition apparatus 3 is touched with the code generation apparatus 1 and the operation button is pressed to make an order of the item. For cancellation, the "cancel icon" is touched and the operation button is pressed to cancel the order. The code generation apparatus 1 is moved to either "Order" or "Cancel" and the operation button is pressed to select it. Selection by other methods such as tapping without pressing the operation button is also possible.

FIG. 40 is a diagram showing an entertainment service using the present invention.

Figure 40A:
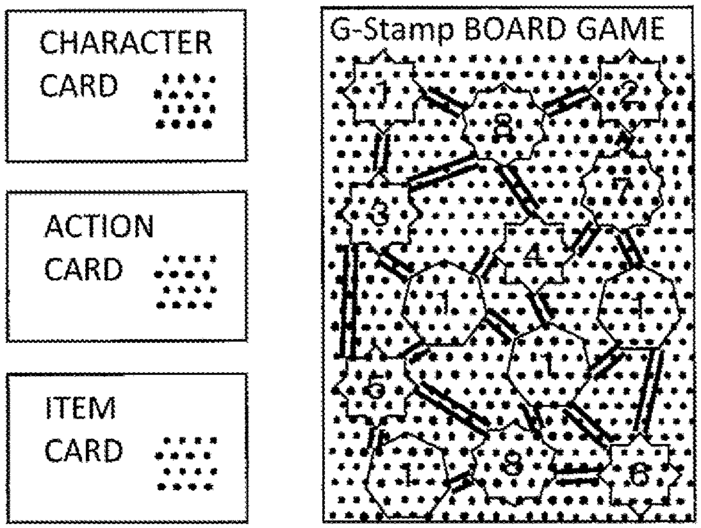
FIG. 40 is a diagram showing an entertainment service using the present invention.

As in FIG. 40(A), a game card, a trading card, or a game board on which a dot code is printed is developed as a game platform by a predetermined application. The dot printing may be performed on the whole surface or only a part of the card or the board.

Figure 40B:
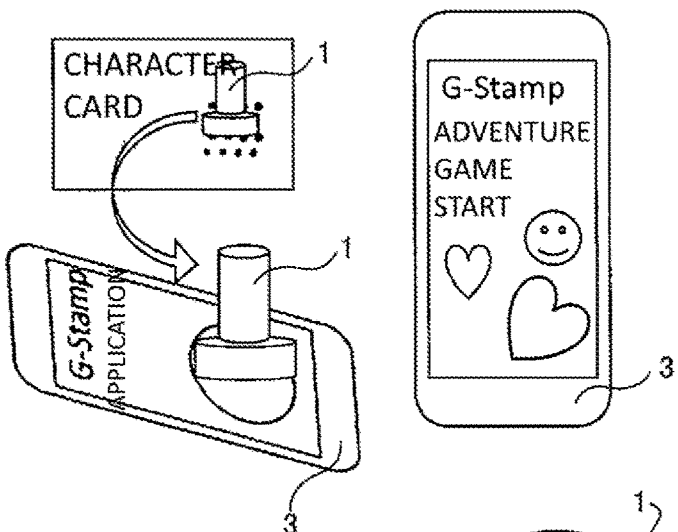

As in FIG. 40(B), a predetermined application is activated by the user, a card or a board is touched with the code generation apparatus 1, and a dot code (game identification code value) is read. Next, the code generation apparatus 1 is touched with the code recognition apparatus 3 to output a stamp code corresponding to the dot code, and when the code recognition apparatus 3 reads the stamp code, the game is started. By coming into contact with the card and coming into contact with the code recognition apparatus 3, the game can be started.

Figure 40C:
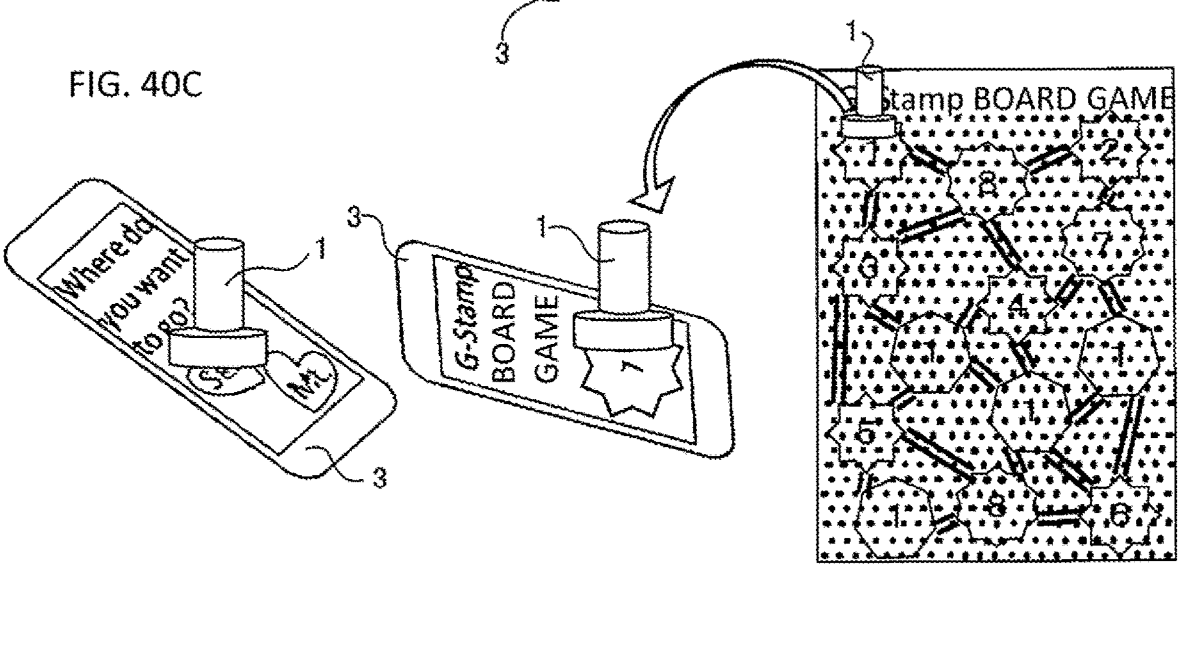

As in FIG. 40(C), by reading the dot code printed on collected characters, action, or item cards with the code generation apparatus 1, and by outputting a stamp code corresponding to the dot code upon coming into contact with the code recognition apparatus 3, a game progresses. With the board game, the XY coordinate values are also printed, and when the code generation apparatus 1 is placed on the board, the coordinate values of the position and the orientation of the code generation apparatus 1 can be read. Information can be input to the code recognition apparatus 3 by converting the information into a corresponding stamp code and then coming into contact with the code recognition apparatus 3 with the code generation apparatus 1. Since the code recognition apparatus 3 can recognize the rotation angle of the code generation apparatus 1, by rotating the code generation apparatus 1, it is possible to scroll in a predetermined direction on the game screen displayed on the code recognition apparatus 3 or to view a 360 degree panorama. Furthermore, by a button operation, it is also possible to select missile launches and icons displayed on the code recognition apparatus 3. Furthermore, by displaying a dot code on the code recognition apparatus 3 and reading it with the code generation apparatus 1, a new stamp code can be output and a more advanced game may be enjoyed. Characters, icons, and graphics displayed on the code recognition apparatus 3 are selected, rotated, or moved by the code generation apparatus 1 to progress the game. An XY coordinate value formed on a board or a code of a predetermined area are read by the code generation apparatus 1 and the code recognition apparatus 3 is touched to advance the game.

FIG. 41 is a diagram showing an information transfer service using the present invention.

Figure 41A:
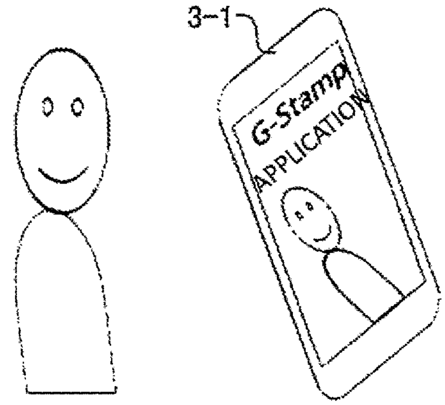
FIG. 41 is a diagram showing an information transfer service using the present invention.

As in FIG. 41(A), the code recognition apparatus 3-1 activates predetermined applications, takes photographs and videos, and displays various contents.

Figure 41B:
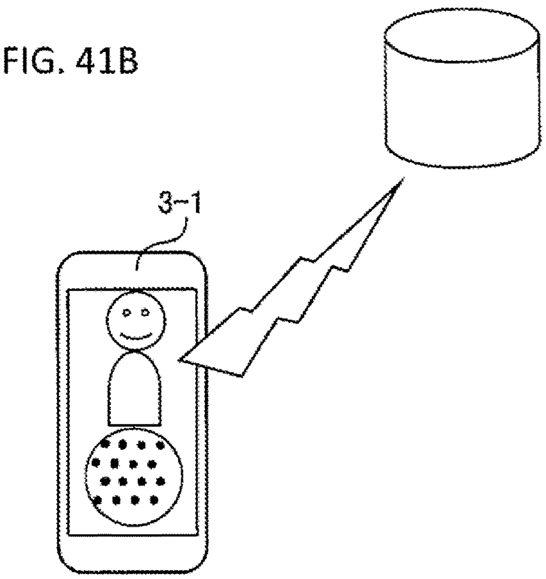

As in FIG. 41(B), when the code recognition apparatus 3-1 selects the information transfer mode of a predetermined application, a dot code for specifying the displayed content is displayed in part of or all of the display. The stamp code corresponding to the dot code and a linked content are uploaded to the cloud or the server 4, concurrently. It may be uploaded in advance. A content corresponding to the stamp code is uploaded to the cloud.

Figure 41C:
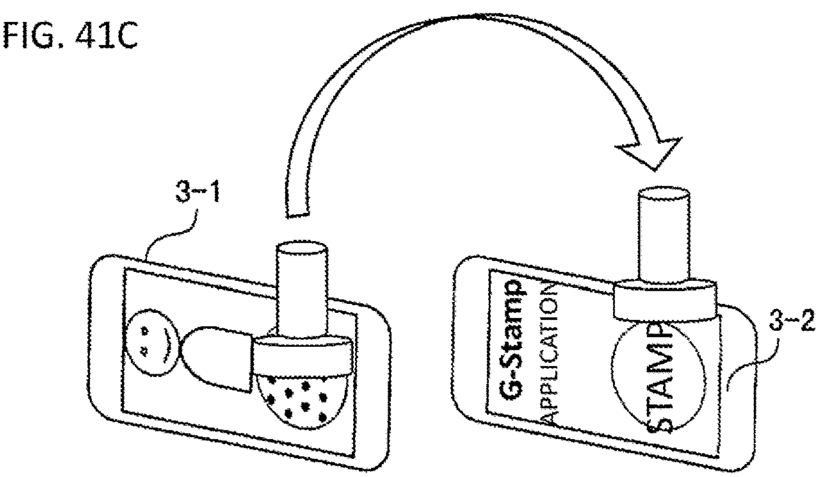

As in FIG. 41(C), when the code recognition apparatus 3-2 that receives information activates a predetermined application and the information reception mode is selected, an imprint mark of the code recognition apparatus 3-2 is displayed. In the code generation apparatus 1, the dot code displayed on the code recognition apparatus 3-1 is read and converted into a corresponding stamp code. Next, the stamp mark area (any kind of graphic is sufficient) displayed on the code recognition apparatus 3-2 is touched by the code generation apparatus 1, a stamp code is output, and the stamp code is read by the code recognition apparatus 3-2.

Figure 41D:
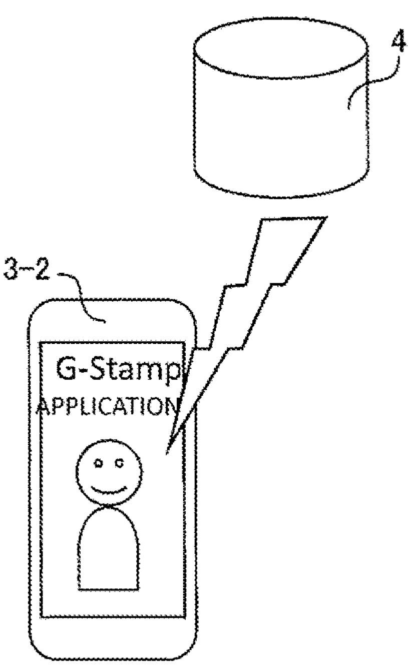

As in FIG. 41(D), the stamp code read by the code recognition apparatus 3-2 is transmitted to the cloud or the server 4, a content corresponding to the pre-registered stamp code is downloaded or streamed, and is recorded/viewable by the code recognition apparatus 3-2. The great advantage of this is that the content can easily be transferred without revealing your address to the other party. It is also possible to set the transferred content not to be retransmitted. A content corresponding to the stamp code is downloaded from the cloud or is streamed.

FIG. 42 is a diagram showing a dot code forming medium information link using the present invention.

Figure 42A:
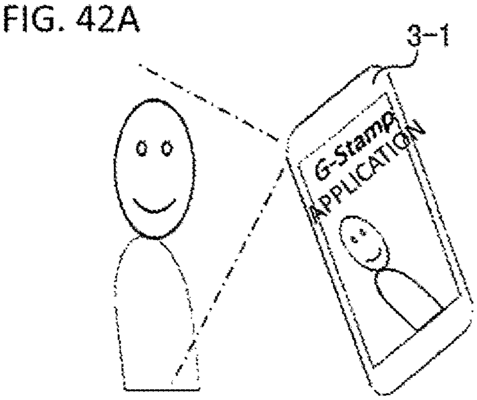
FIG. 42 is a diagram showing a dot code forming medium information link using the present invention.

As in FIG. 42(A), by activating the code generation apparatus 1 using the code recognition apparatus 3-1 with a predetermined application, photographs and videos can be taken, and various contents (including live video taken by the code recognition apparatus 3 and sounds) can be displayed. After reading the stamp code for linking contents, the content may be displayed.

Figure 42B:
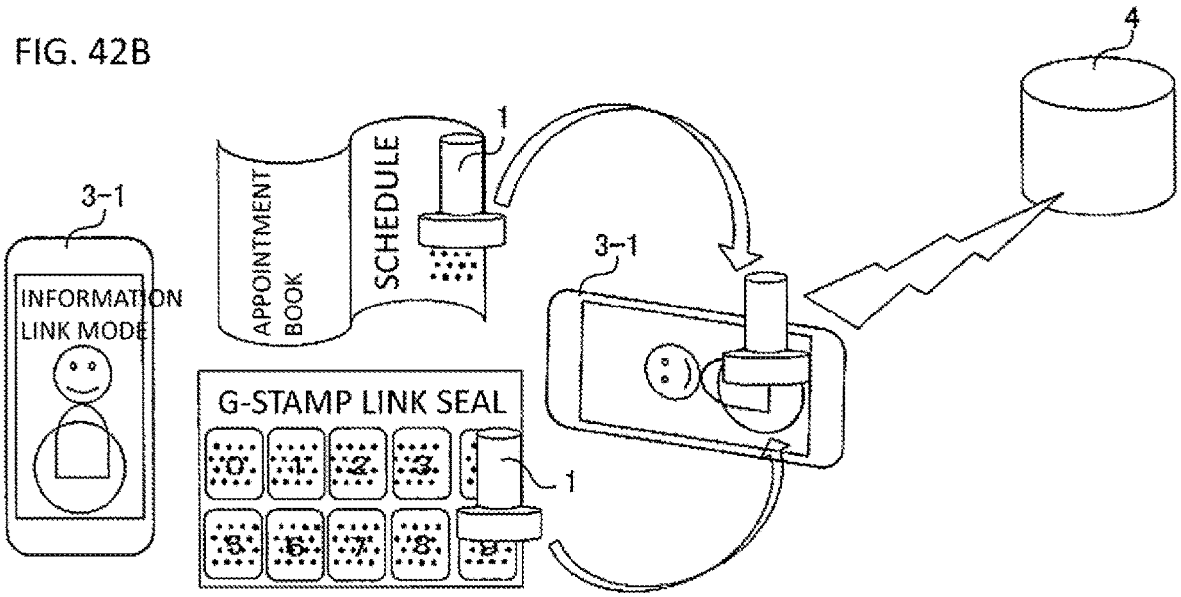

As in FIG. 42(B), by setting the information link mode of a predetermined application and by coming into contact with a seal or various media on which a dot code is formed with the code generator 1, the dot code is read and is converted to a corresponding stamp code. Next, the stamp mark area (any kind of graphics is sufficient) displayed on the code recognition apparatus 3-1 is touched by the code generation apparatus 1, the stamp code is output, and the stamp code is read by the code recognition apparatus 3-1. Note that the information link mode may be set after the code generation apparatus 1 reads the dot code and the stamp code is output. The information link mode may be set by setting on the side of the code recognition apparatus 3-1, by reading a dot code instructing an exclusive information link mode with the code generation apparatus 1 or by operating a button of the code generation apparatus 1. In addition, the dot code formed on a seal or various media also includes an instruction for setting the information link mode, and just by reading the dot code with the code generator 1, and just by reading the stamp code by coming into contact with the code recognition apparatus 3-1, the information link mode is set, and the stamp code and a corresponding content are linked. The stamp code corresponding to the dot code and the content displayed in FIG. 42(A) are linked, and the content is uploaded to the cloud or the server 4. Contents may be upgraded in advance. A content corresponding to the stamp code is uploaded to the cloud. A stamp code-content name table may also be registered.

Figure 42C:
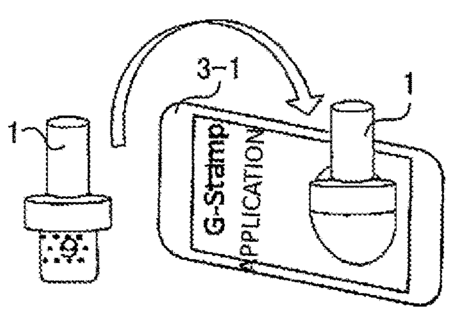

As in FIG. 42(C), thereafter, by having the dot code formed on a seal or various media and linked with the content of FIG. 42(B) be touch with the code generation apparatus 1, by having the dot code be read, and by having the dot code be converted to a corresponding stamp code upon coming into contact with the code recognition apparatus 3-1, the corresponding content can be browsed/executed. Thereafter, even if the predetermined application is re-activated, the content can be browsed/executed in the same way. Furthermore, the content can also be browsed/executed with the code recognition apparatus 3-2. The stamp code may be output by coming into contact with the medium where the dot code is formed and is linked to some content, and by coming into contact with the code recognition apparatus 3-2.

Figure 42D:
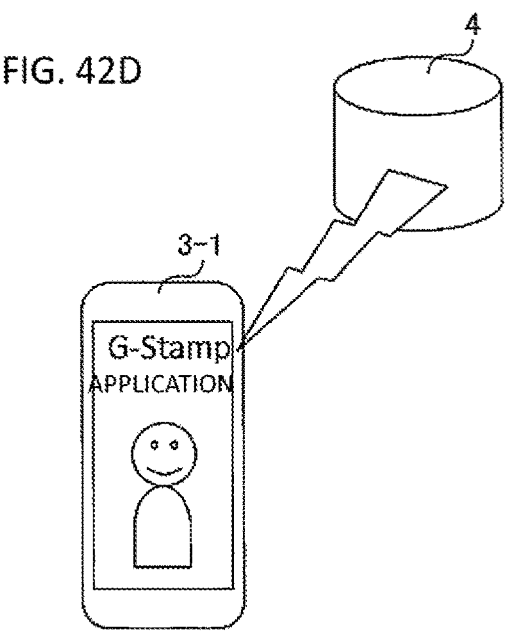

As in FIG. 42(D), as another method, by activating a predetermined application, the first dot code corresponding to the stamp code linked to the displayed content is displayed and the code is read by the code generation apparatus 1, and by coming into contact with the medium on which the second dot code is formed, the second dot code and the stamp code are linked, and then by coming into contact with the medium, coming into contact with the code recognition apparatus 3-2, and outputting the stamp code, the corresponding content can be browsed/executed. The content corresponding to the stamp code is downloaded from the cloud or is streamed.

<Explanation of the Dot Pattern>

Next, an example of the dot pattern referred to above will be described with reference to FIGS. 43 to 52.

<Ways of Viewing an Information Dot in FIG. 43>

Ways of viewing an information dot are as shown in FIGS. 43(A) to 43(E).

Note that ways of viewing an information dot are not restricted to the examples of FIGS. 43(A) to 43(E).

Figure 43A:
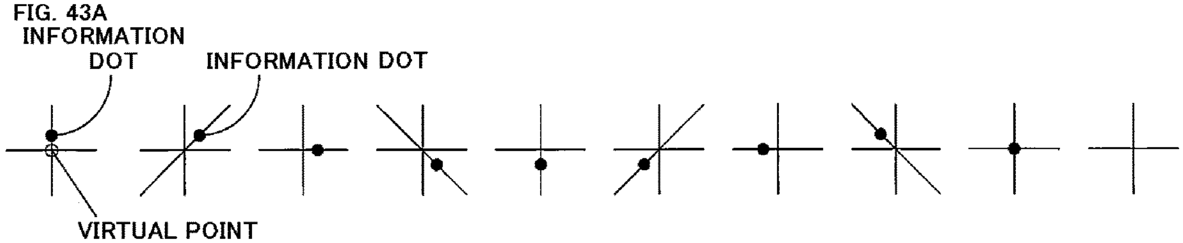
Figure 43B:
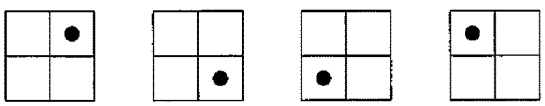

That is, as shown in FIG. 43(A), information dots are arranged above, below, on the left of, on the right of the virtual point, and in the case where information dots are not placed, an information dot is placed at the virtual point, and it is possible to increase the amount of information including the case where information dots are not placed. In FIG. 43(B), information dots are arranged in a total of four virtual regions in an array of 2 rows×2 columns. However, since there is a possibility of the occurrence of erroneous recognition if information dots are arranged near the boundaries, as shown in an embodiment in FIG. 43(C), adjacent virtual regions may be set with spacing. Note that, it is possible to increase the amount of information including cases in which a plurality of information dots are placed in and not placed in the four virtual regions.

Figure 43C:
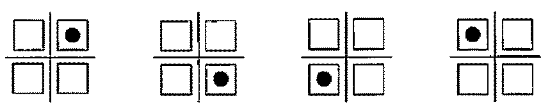
Figure 43D:
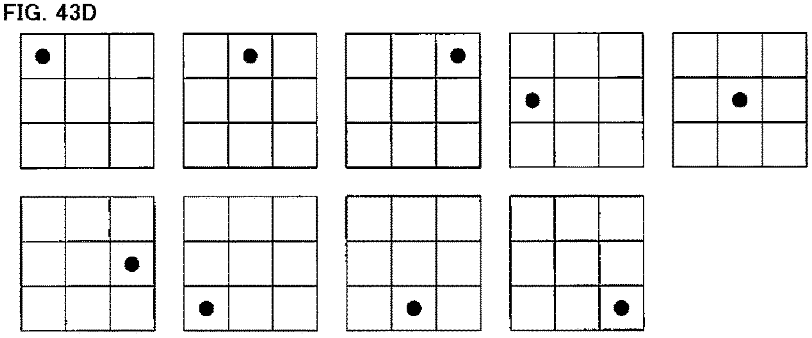

As in FIG. 43(D), information dots are arranged in a total of nine virtual regions in an array of 3 rows×3 columns. Note that, it is possible to increase the amount of information including cases in which a plurality of information dots are placed in and not placed in the four virtual regions.

Figure 43E:
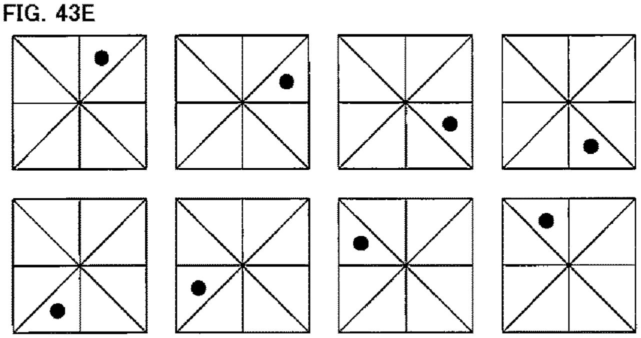

In FIG. 43(E), information dots are arranged in a total of eight virtual regions formed by lines or virtual lines connecting midpoints of the sides and passing through the center dot and diagonal lines of a square. Note that, it is possible to increase the amount of information including cases in which a plurality of information dots are placed in and not placed in the eight virtual regions.

The virtual regions in FIGS. 43(B) to 43(E) are square or triangular, however, as shown in FIG. 43(C), it is not necessary for the virtual regions to come into contact with each other, and they may be in any shape such as a circle or other polygons. Furthermore, by increasing the number of virtual regions, the amount of information can be increased. Note that the method of arrangement of the information dots in the virtual region is the same as the method of arrangement of the information dots shown in FIG. 43(A), where the information dot is arranged with deviation of a predetermined distance and in a predetermined direction from the virtual point. This is because when preparing print data, whichever virtual region the dot is placed in, it is necessary to determine the position of the placement with coordinate data indicating one of the positions, and it is no different from calculating coordinate data for placement with deviation from the virtual point. Furthermore, even when reading dots, whichever method of arrangement is adopted, in the image obtained by imaging the dot pattern, dot recognition judgment areas such as circles or rectangles are set centering a plurality of placement positions where information dots may be arranged, and since dot recognition is performed by judging whether or not a dot is in a dot recognition judgment area, this method can be considered to be the same method of information dot reading.

<Assignment of a Code of an Information Dot in FIG. 44>

The code assignment of an information dot is as shown in FIGS. 44(A) to 44(C).

That is, as shown in FIG. 44(A), all may be assigned to a "code value" such as a company code, or as shown in FIG. 44(B), may be assigned as one code format to the two data areas of the "X coordinate value" and the "Y coordinate value," or as shown in FIG. 44(C), may be assigned to the three data areas of the "code value," the "X coordinate value," and the "Y coordinate value." When assigning coordinate values to a rectangular region, the data area of the "X coordinate value" and the "Y coordinate value" may be different so as to reduce the amount of data. Furthermore, although not shown, the "Z coordinate value" may further be assigned in order to define the height for position coordinates.

Note that when the "X coordinate value" and the "Y coordinate value" are assigned, since the coordinate value is incremented by a predetermined amount in the + direction of the X and Y coordinates because of the position information, all of the dot patterns are not the same. Also, as is apparent from FIGS. 24(A) to 24(C), as the types of codes to be assigned are increased, the dot recognition judgment area becomes smaller, making it difficult to correctly recognize the placement position of the information dots.

First Example ("GRID 0"), FIGS. 45 to 48

As for the first example of the dot pattern, the present applicant refers to it as "GRID 0" as a tentative name.

A feature of "GRID 0" is that by using key dots, at least the range or the orientation of the dot pattern is made to be recognizable.

"GRID 0" has the following configuration as shown in FIGS. 45 to 48.

(1) Information Dot

An information dot is a dot for storing information.

Note that ways of viewing an information dot is as shown in FIGS. 43(A) to 43(E), and the assignment of an information dot code is as shown in FIGS. 44(A) to 44(C).

Note that when information dots are not placed, it is possible to increase the amount of information including cases in which information dots are placed at and not placed at virtual points.

(2) Reference Dot

A reference dot is a dot placed at a plurality of preset positions.

A reference dot is for specifying the position of a virtual point or a virtual region to be described later.

(3) Key Dot

Figure 46A:
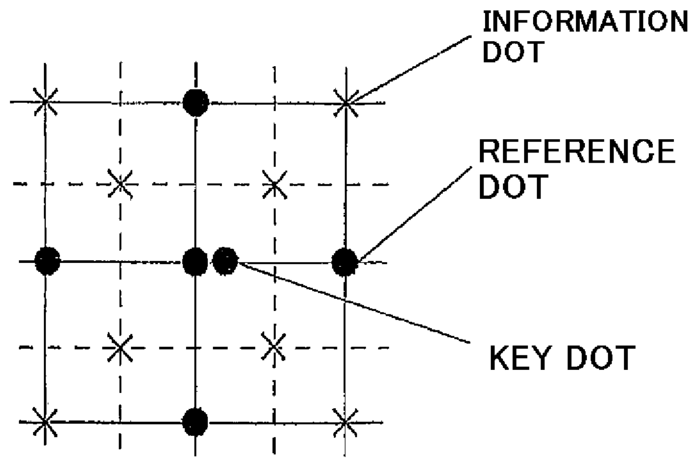
Figure 46B:
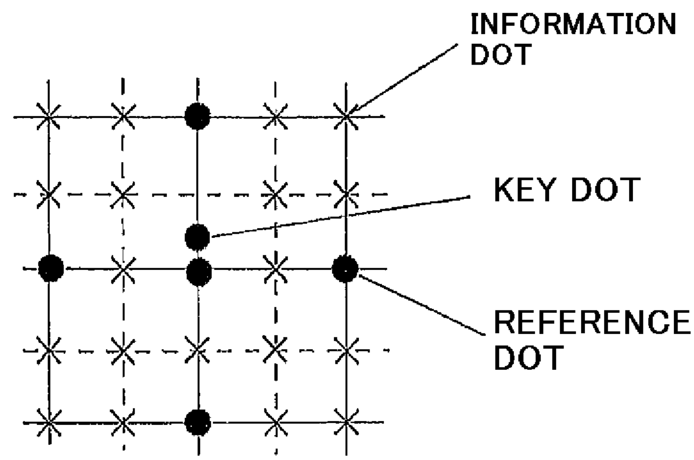
Figure 46C:
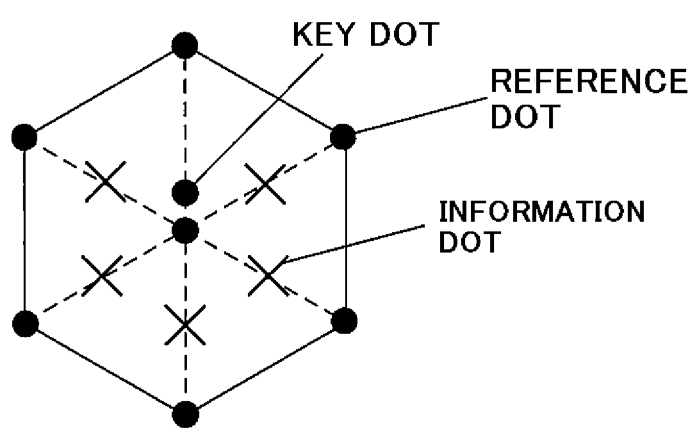

A Key dot is a dot placed by shifting a reference dot or is a dot placed in a position displaced from the placement position of a reference dot in addition as shown in FIG. 46. That is, when placing by shifting a reference dot, since the reference dot is displaced, there is no reference dot in the original placement position of the reference dot.

Thus, the key dot is to also play the role of the original reference dot, and it is desirable to be able to estimate the position of the original reference dot from the arrangement of other reference dots. In the case where a dot is placed in a position displaced from the placement position of a reference dot in addition, the two, that is, the reference dot and the key dot are placed in close vicinity of each other.

A Key dot is for specifying the reference orientation for information dots with respect to reference points and virtual points or for information dots arranged in the virtual region with respect to reference points. By determining this reference orientation, it is possible to provide information in the orientation of the information dot with respect to the virtual point and have it read. Furthermore, it is possible to specify the range of a dot pattern in which one piece of data is defined by a plurality of information dots. Thus, even if the dot patterns are placed vertically and horizontally, it is possible to decrypt the data by reading the range of the dot pattern.

(4) Virtual Point or Virtual Region

A virtual point or virtual region is specified by the arrangement of reference dots. As in FIG. 47, when information is defined by at least the distance or the direction from the virtual point, as for direction, information may be defined with reference to the direction of the dot pattern specified with the aforementioned key dot. Regarding distance, the distance between predetermined reference dots may be used as a reference.

Note that when defining information by arranging a virtual region, with the center of a plurality of virtual regions or a representative point as a virtual point for providing one piece of information, as described above, the position of a virtual point may be specified with the arrangement of reference dots, and a virtual region may be defined with the distance and direction from the virtual point.

Furthermore, from the arrangement of the reference dots, the arrangement positions of all of the virtual regions may be directly specified. Note that although adjacent virtual regions may be connected, in this case, there is a possibility of erroneous recognition if information dots are placed near the boundary, and thus, it is desirable to set virtual regions with spacing.

Figure 45A:
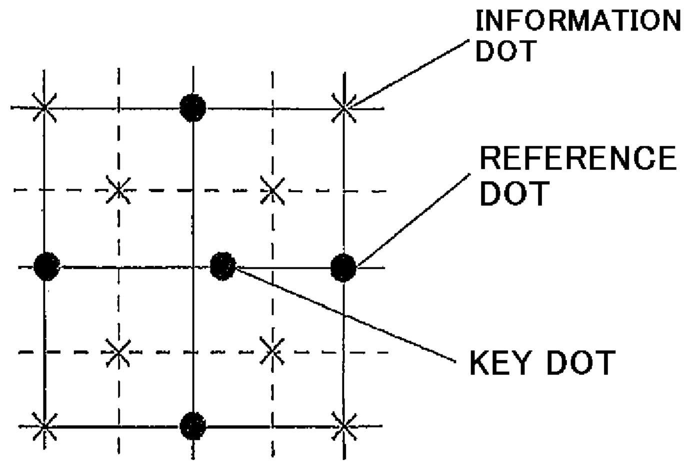
Figure 45B:
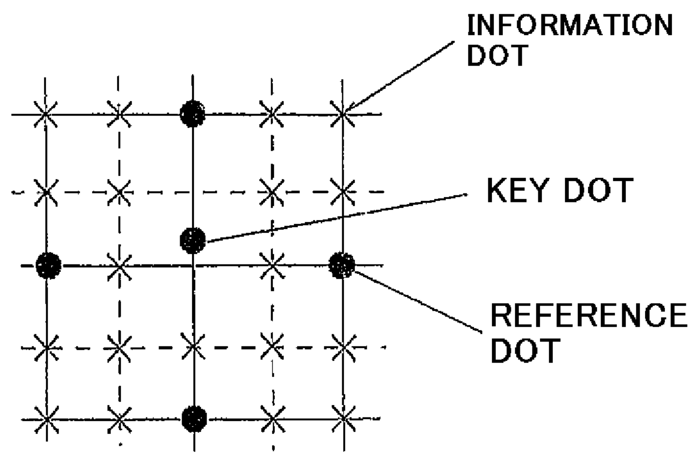
Figure 45C:
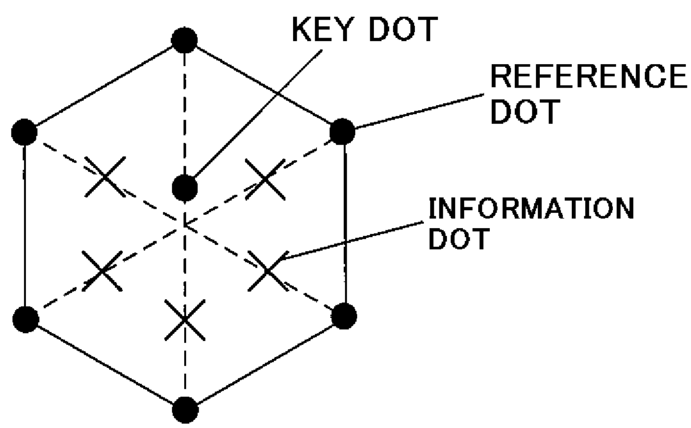

FIG. 45 shows a general-purpose example of a dot pattern of "GRID 0," wherein FIG. 45(A) shows an example in which reference dots are arranged in a substantially plus character shape, FIG. 45(B) shows an example in which the number of arranged information dots is increased, and FIG. 45(C) shows an example in which reference dots are arranged in a hexagon shape, respectively.

Note that the general-purpose example of the dot pattern is not restricted to the substantially plus character shape and the substantially hexagonal shape exemplified in FIGS. 45(A) to 45(C).

FIG. 46 shows a modification example of FIG. 45, in which key dots are placed in a position displaced from the placement position of the reference dots in addition, and thus, the two, that is, the reference dot and the key dot are placed in close vicinity of each other.

Figure 47A:
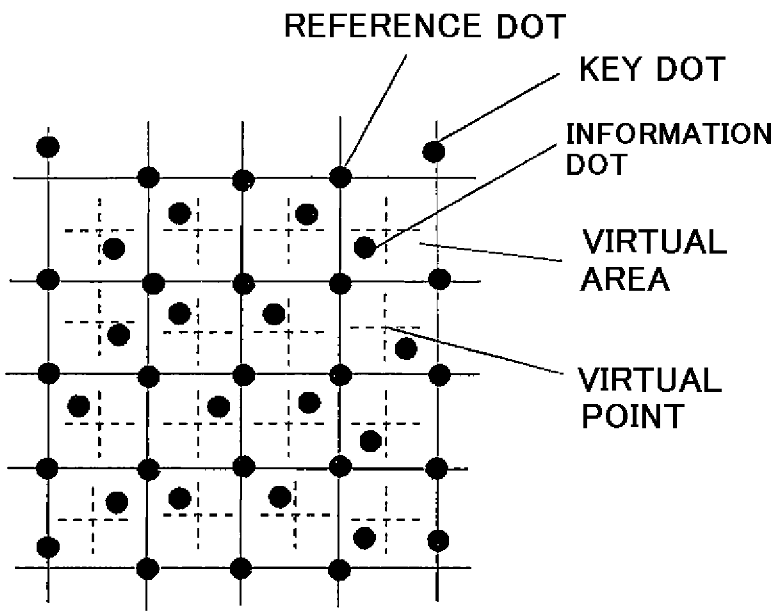
Figure 47B:
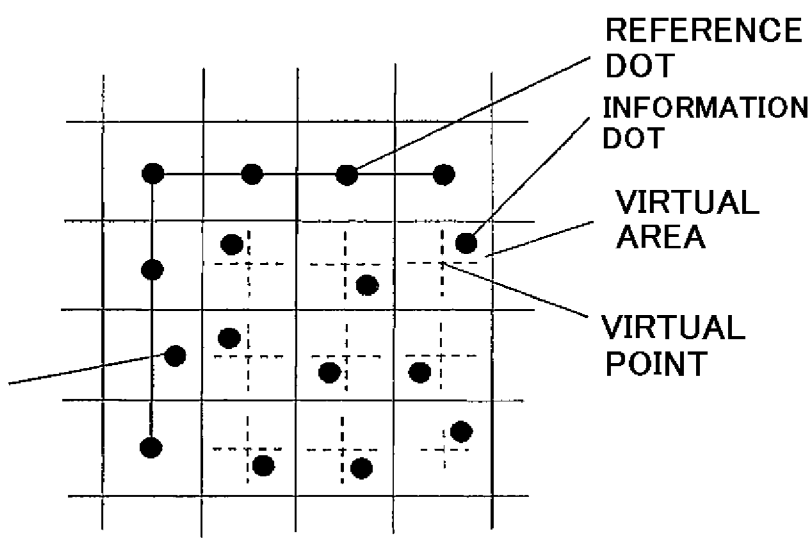
Figure 47C:
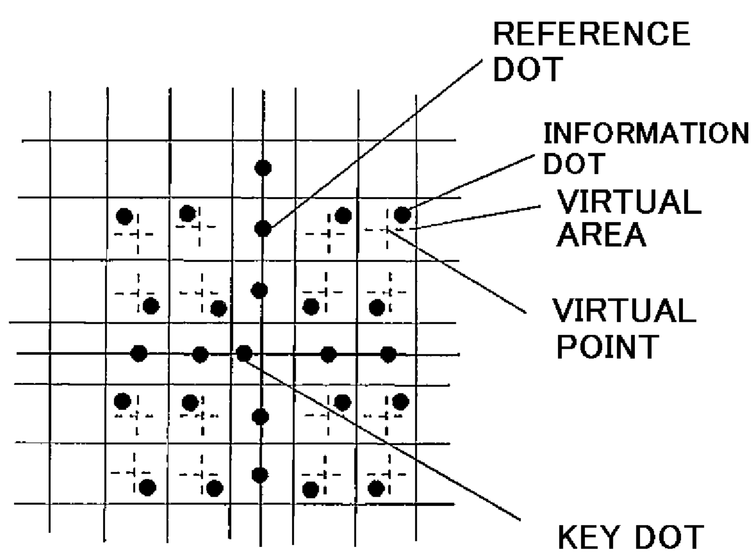

FIG. 47 shows a modification example of the dot pattern of "GRID 0," wherein FIG. 47(A) shows an example in which reference dots are arranged in a substantially square shape, FIG. 47(B) shows an example in which reference dots are arranged in a substantially L shape, and FIG. 47(C) shows an example in which the reference dots are arranged in a substantially cross shape or substantially plus shape, respectively.

Note that modification examples of the dot pattern are not restricted to the substantially square shape, substantially L-shape, substantially cross-shape or substantially plus-shape as exemplified in FIGS. 47(A) to 47(C).

Figure 48A:
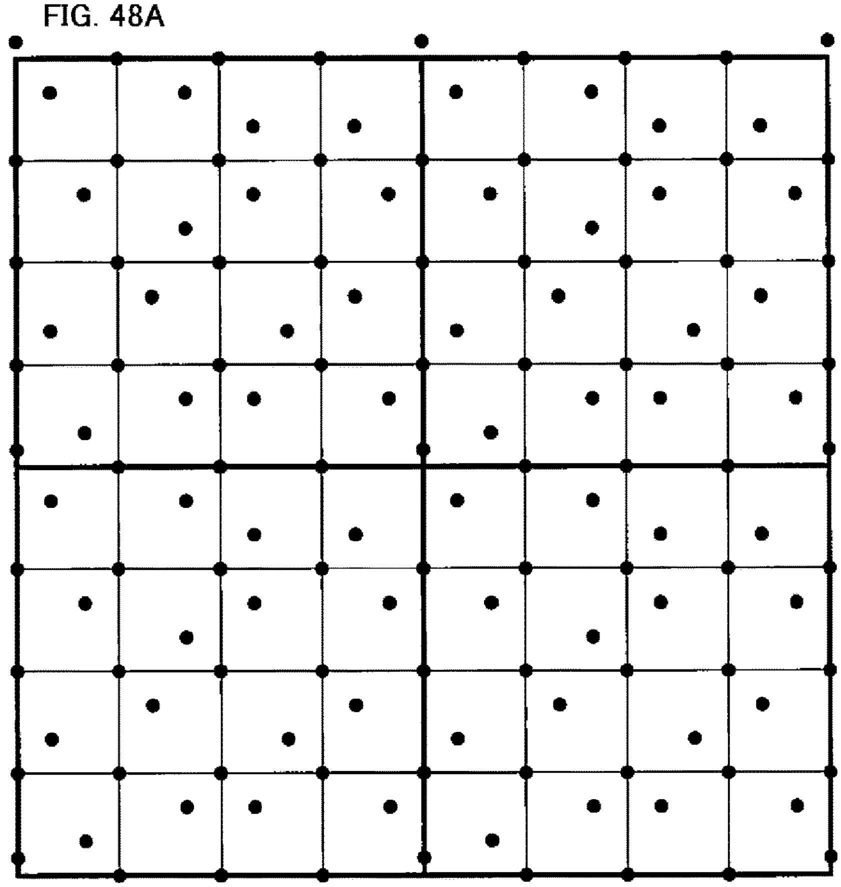
Figure 48B:
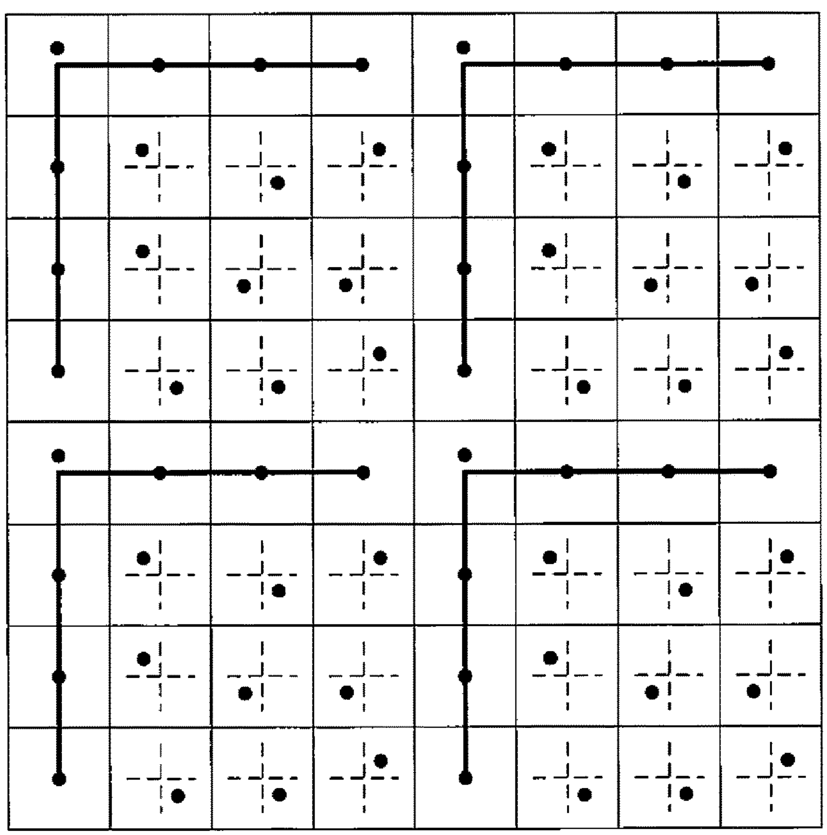
Figure 49A:
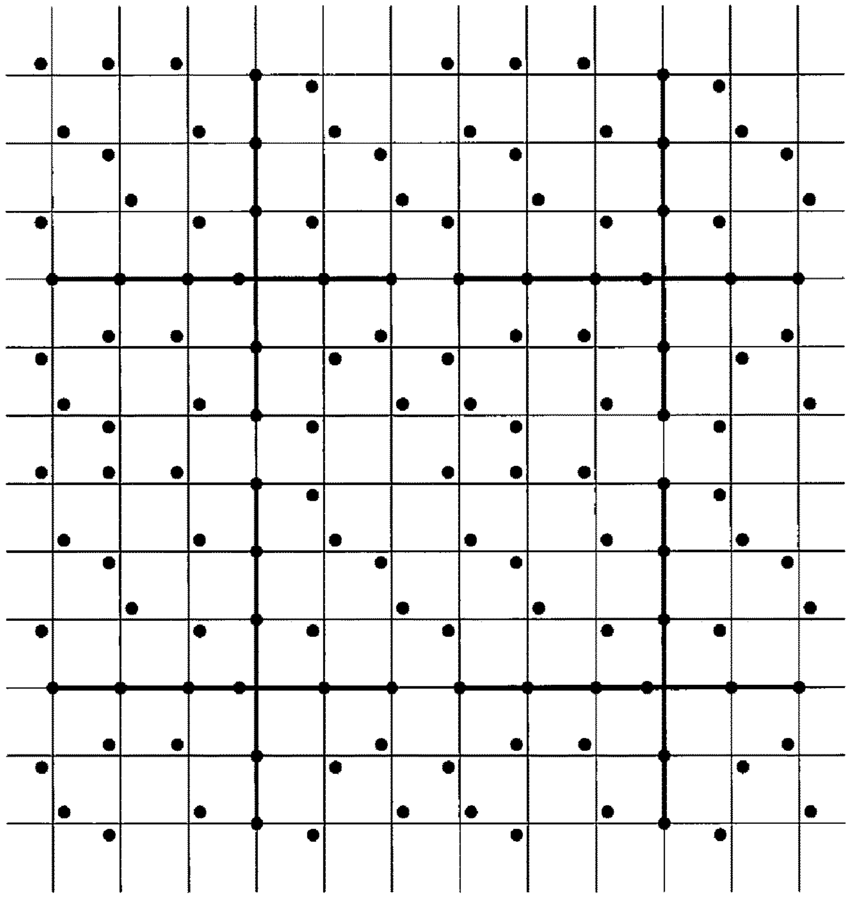
FIG. 49 shows a second example of a concatenation of the dot pattern (GRID 0), following FIG. 28.
Figure 49B:
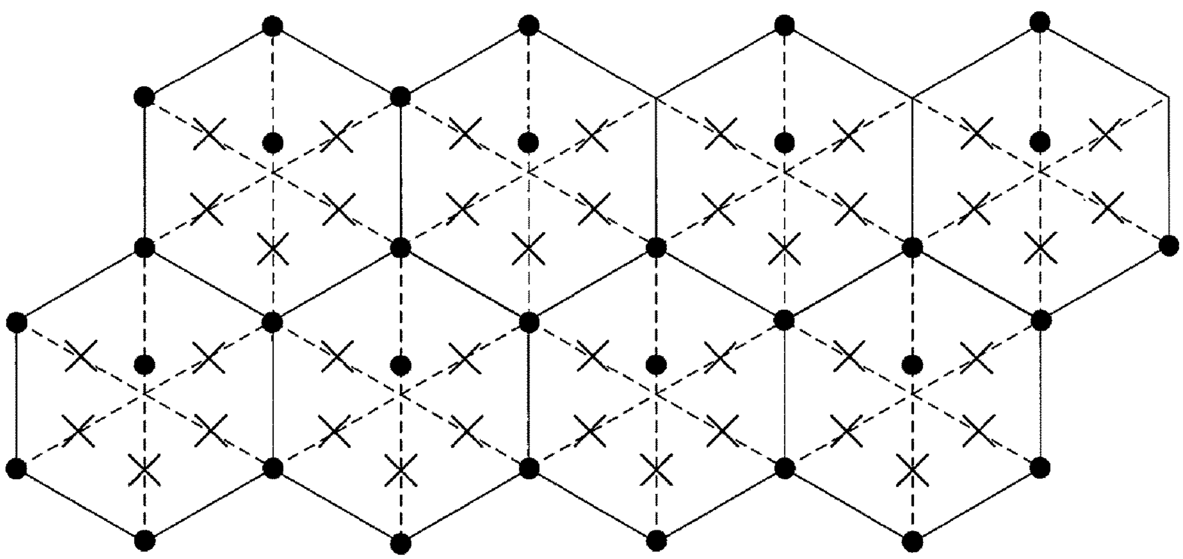

FIGS. 48 to 49 show examples of a connection or a concatenation of a dot pattern of "GRID 0," wherein FIG. 48(A) is examples of a connection where a plurality of dot patterns in which reference dots are arranged in substantially square shapes are arranged adjacent to each other so that part of the reference dots are common. As for the conditions under which the connection can be made, the positions of the upper and lower dots and/or those at the left and right ends of one dot pattern must necessarily be of common positions. Note that connections involving only the upper and lower sides or only the right and left sides may also be possible. FIG. 48(B) shows a first example of a concatenation in which a plurality of dot patterns in which reference dots are arranged in substantially L shapes are arranged independent of each other. FIG. 49(A) shows a second example of a concatenation in which a plurality of dot patterns in which reference dots are arranged to form a plus shape are arranged independent of each other. Note that concatenating is a method of arranging dot patterns vertically and horizontally at a predetermined interval. FIG. 49(B) shows a an example of a connection where a plurality of dot patterns in which reference dots are arranged in a hexagon shape are arranged adjacent to each other so that part of the reference dots are common.

Furthermore, examples of a connection or a concatenation of a dot pattern are not restricted to the arrangements illustrated in FIGS. 48(A), 48(B), and 49.

Second Example ("GRID 5")

As for the second example of the dot pattern, the present applicant refers to it as "GRID 0" as a tentative name.

In "GRID 5", in the place of the key dot of "GRID 0", the range and orientation of the dot pattern is recognized by utilizing "how to arrange reference dots." In order to recognize the orientation of the dot pattern utilizing "how to arrange the reference dots", regardless of what kind of point the reference dot arrangement is centered on and how much it is rotated (excluding 360°), the arrangement must be non-axisymmetric so that it is not identical with that before rotation. Furthermore, it is necessary to be able to recognize the range and orientation of dot patterns even when a plurality of dot patterns repeatedly arranging vertically and/or horizontally are connected or concatenated.

Note that in "GRID 5," the orientation of the dot pattern is recognized using pattern recognition. That is, the shape of a dot pattern formed by the reference dots is stored in a storage means. Then, by collating the image of the read dot pattern with the shape stored in the storage means, the orientation of the dot pattern can be recognized.

Note that even if the key dot is included as "GRID 0", by the recognition of the key dot as a reference dot, and utilizing "how to arrange the reference dots," the range and orientation can be recognized as a dot pattern of "GRID 5" without a key dot.

Figure 50A:
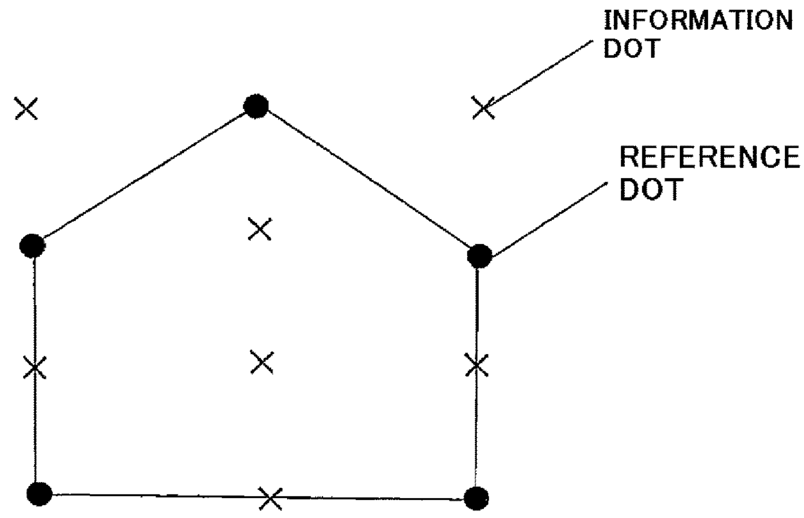
Figure 50B:
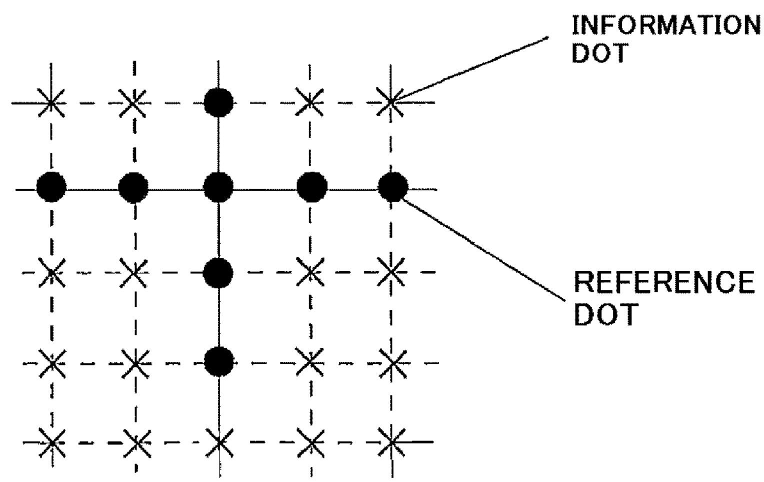
Figure 50C:
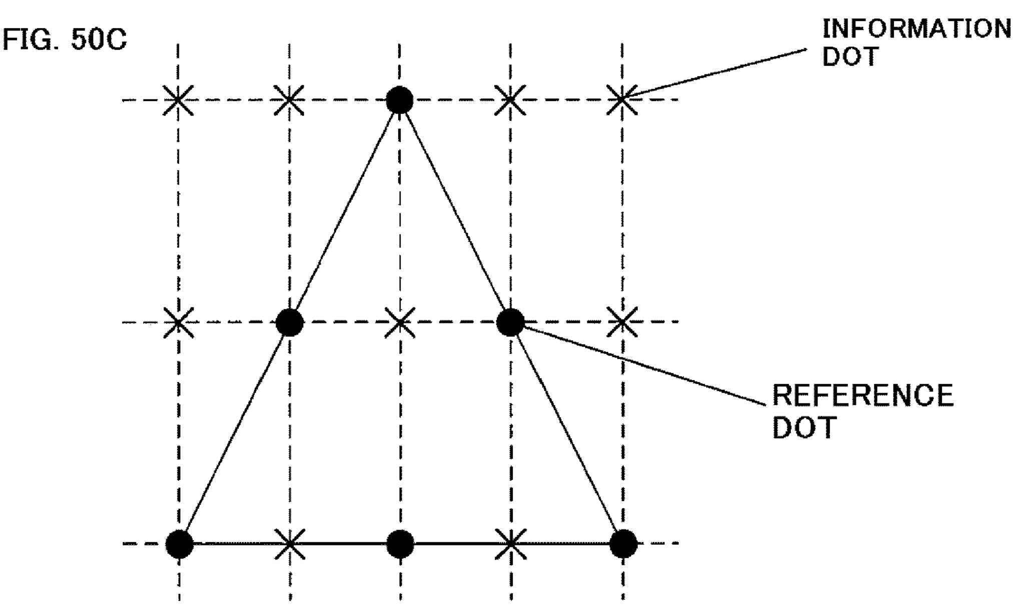

FIG. 50 shows a general-purpose example of a dot pattern of "GRID 5," wherein FIG. 50(A) shows an example in which reference dots are arranged in a substantially house shape unsymmetrical in the vertical direction, FIG. 50(B) shows an example in which the reference dots are arranged in a substantially cross shape unsymmetrical in the vertical direction, and FIG. 50(C) shows an example in which the reference dots are arranged in a substantially isosceles triangle unsymmetrical in the vertical direction, respectively.

Note that the general-purpose example of the dot pattern is not restricted to a substantially house shape, a substantially cross shape, or a substantially triangular shape as exemplified in FIGS. 50(A) to 50(C).

Figure 51A:
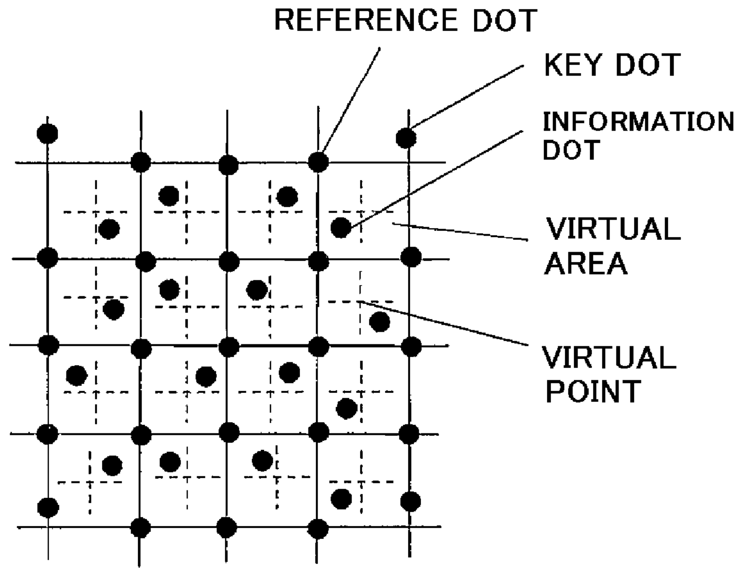
Figure 51B:
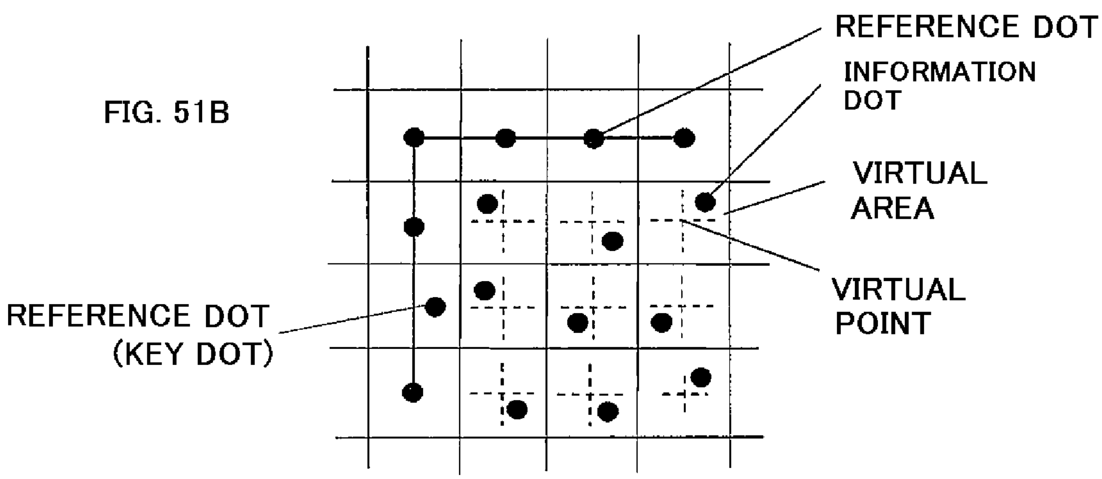
Figure 51C:
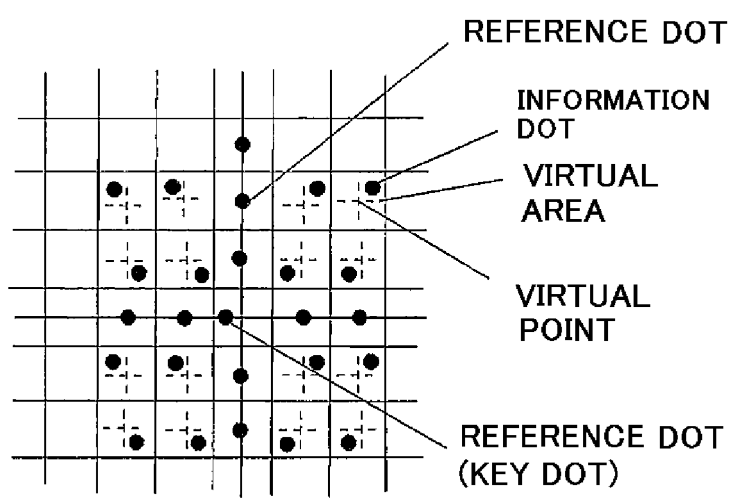

FIG. 51 shows a modification example of the dot pattern of "GRID 5," wherein FIG. 51(A) shows an example in which the reference dots are arranged in a substantially square shape unsymmetrical in the vertical direction, and FIG. 51(B) shows an example in which key dots are used together and the reference dots are arranged in a substantially L shape unsymmetrical in the vertical direction, FIG. 51(C) shows an example in which key dots are used together and the reference dots are arranged in a substantially cross shape unsymmetrical in the vertical direction, respectively.

Noted that the general-purpose example of the dot pattern is not restricted to a substantially square shape, a substantially L shape, or a substantially cross-shape unsymmetrical in the vertical direction as exemplified in FIGS. 51(A) to 51(C). Furthermore, in FIG. 51, the dot pattern is drawn in a lattice pattern, but as long as it is non-axisymmetric, the reference dot may be arbitrarily placed.

That is, in "GRID 5", the reference dots may be arranged in any way, as long as the arrangement of the dots form a recognizable pattern.

FIG. 52 is a diagram explaining a case where reference dots or virtual points are arbitrarily arranged in "GRID 5."

Figure 52A:
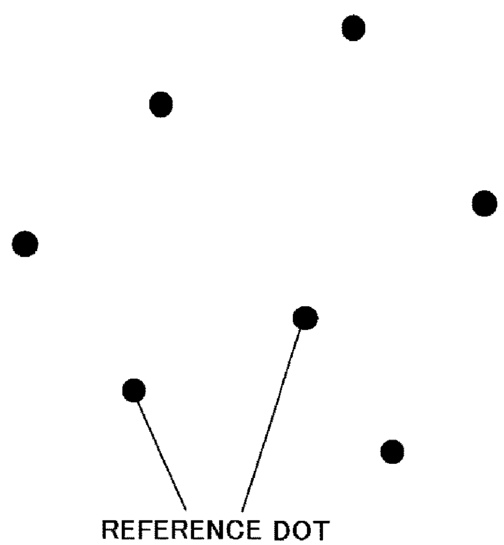
FIG. 52 is for explaining the arrangement of reference dots or virtual points of the dot pattern (GRID 5).

As in FIG. 52(A), the pattern of the reference dots is of a unique non-axisymmetric arrangement, and the arrangement pattern of the virtual points is recognizable. However, when the arrangement pattern of the reference dots is recognized from the arrangement pattern of the virtual points by pattern recognition (comparison with the arrangement pattern of the virtual points), the arrangement pattern of the reference dots may not have to be a of unique non-axisymmetric arrangement.

Figure 52B:
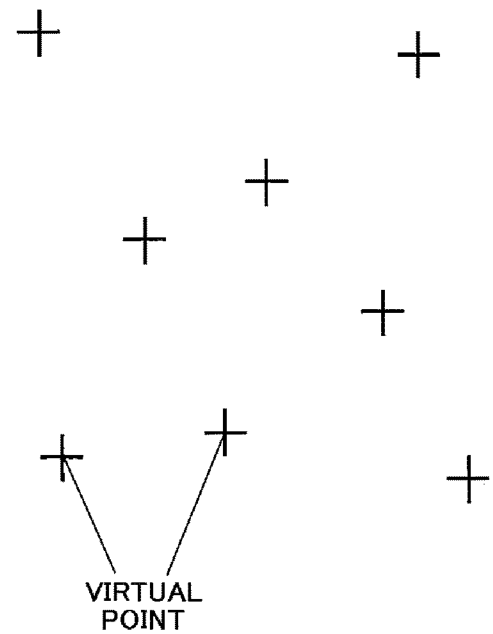

In FIG. 52(B), the virtual point pattern is of a unique non-axisymmetric arrangement, and the reference dot arrangement pattern is recognizable. However, when the arrangement pattern of the virtual points is recognized from the arrangement pattern of the reference dots by pattern recognition (comparison with the arrangement pattern of the reference dots), the arrangement pattern of the virtual points may not have to be of a unique non-axisymmetric arrangement.

Figure 52C:
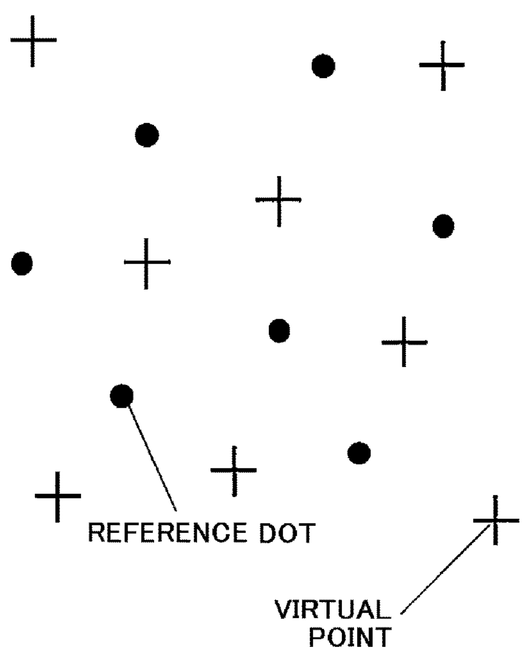

In FIG. 52(C), the pattern of the reference dots and the pattern of the virtual points are arranged in association with each other.

Figure 52D:
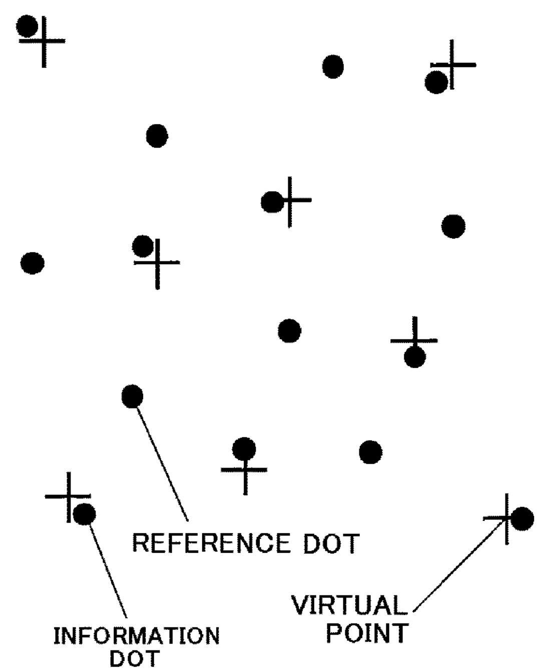

In FIG. 52(D), information dots are arranged with virtual points as starting points. In the case where the arrangement pattern of the reference dots is recognized from the arrangement pattern of the virtual points by pattern recognition, by recognizing the arrangement pattern of the information dots, it is possible to recognize that the virtual points are arranged in a neighboring region by the arrangement pattern of virtual points, and by comparing (pattern recognition) with the pattern of the virtual points, it is possible to recognize the arrangement pattern of virtual points.

<Reading of a Dot Pattern>

Figure 53A:
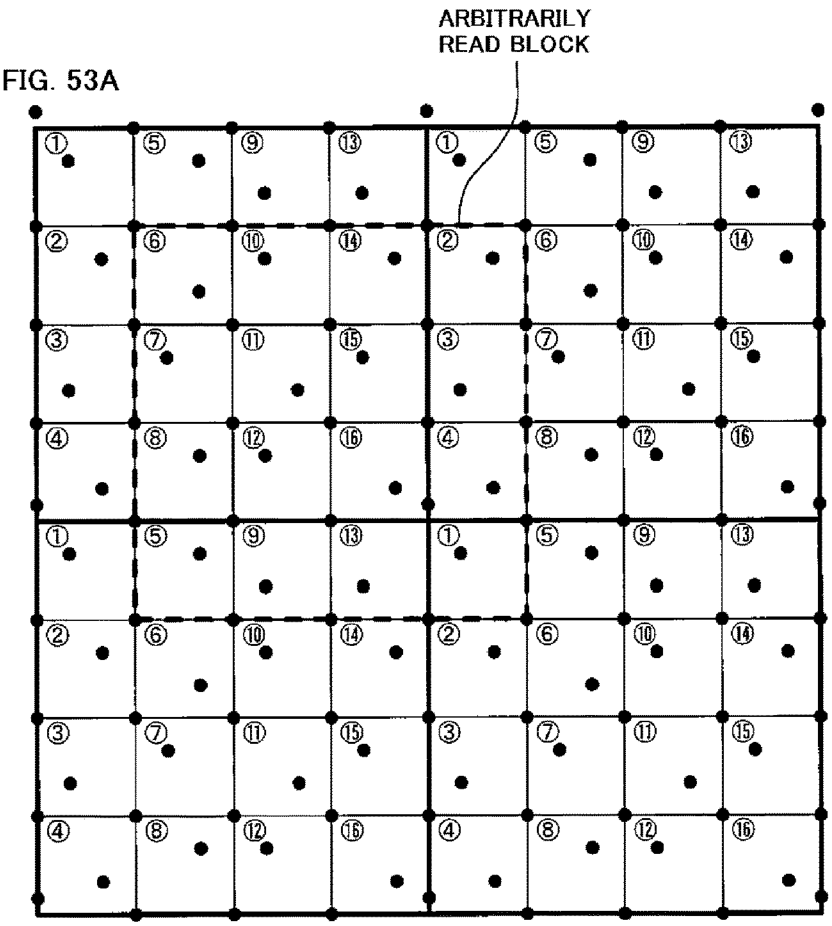
Figure 53B:
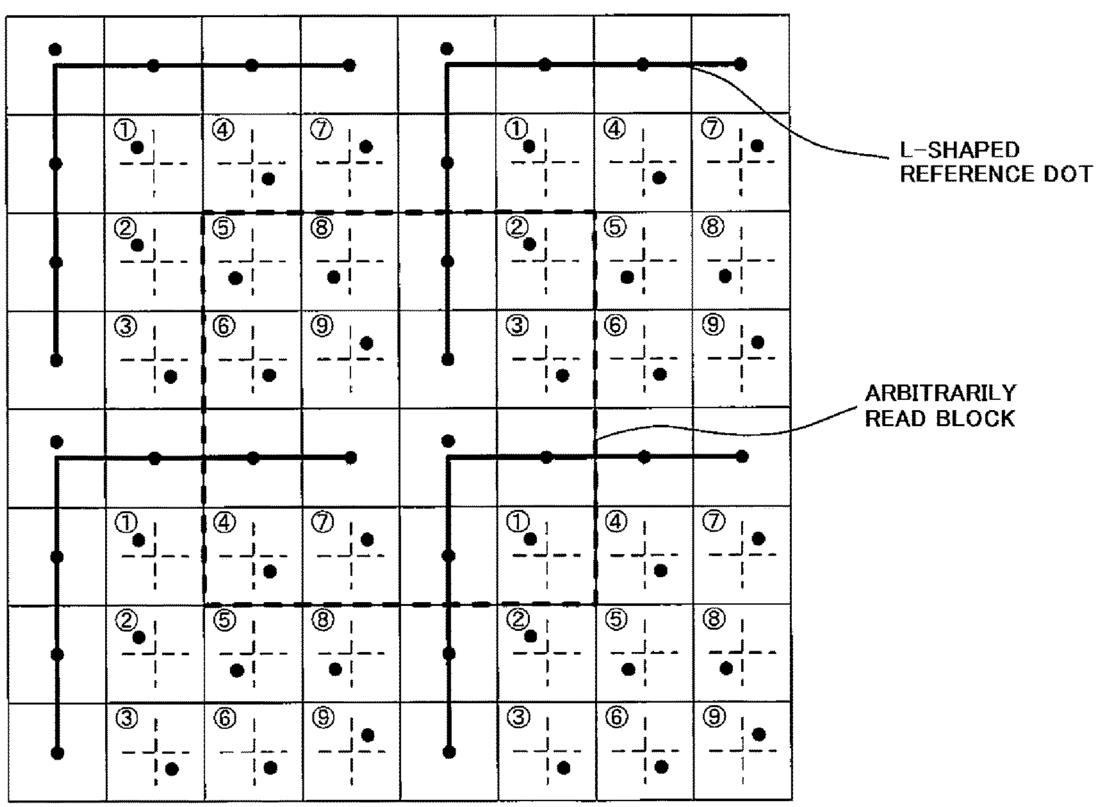
Figure 54:
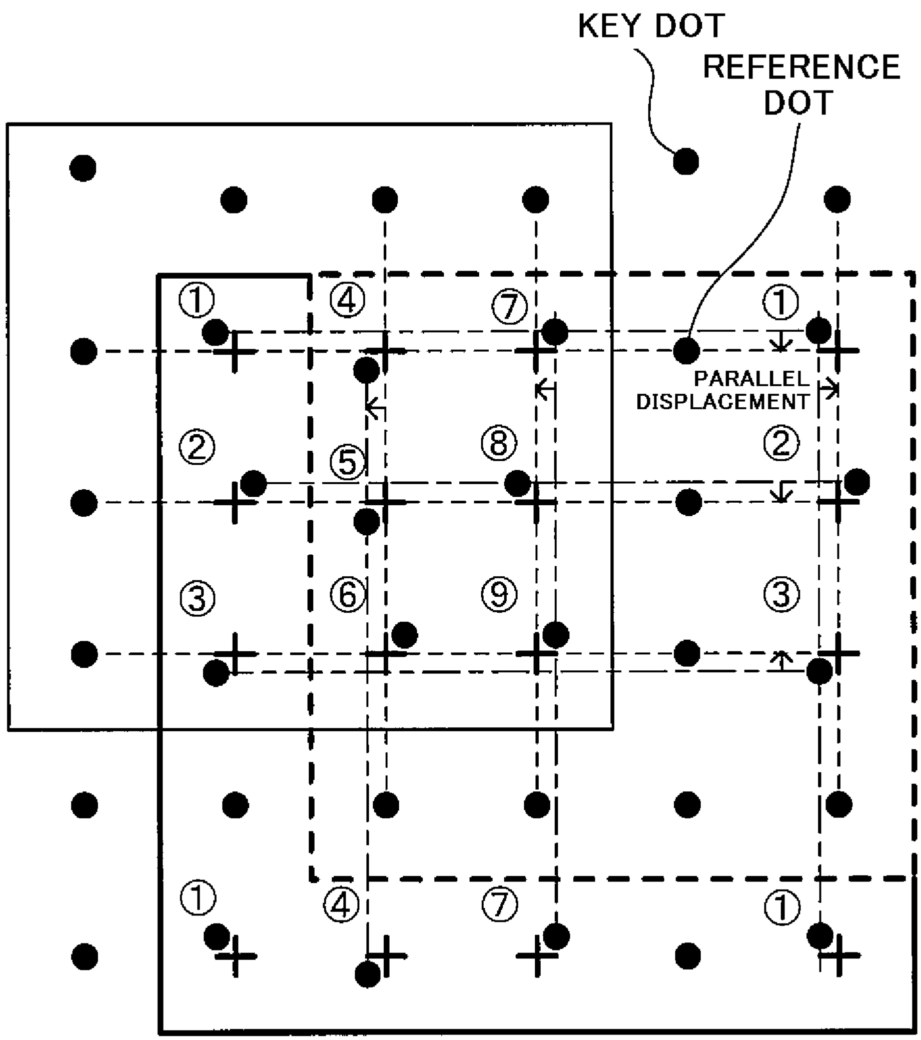
FIG. 54 is for explaining the reading of a dot pattern in addition to FIG. 52.

In the case where the dot patterns of the above "GRID 0" and "GRID 5" are defined with the same code value within a predetermined area and are repeatedly arranged vertically and horizontally, as shown in FIG. 53, if an arbitrary area is read with a range of the same size as the range of the dot pattern, information dots constituting the original dot pattern, (1) to (16) (in the figure, described as "circled 1 to circled 16") or (1) to (9) (in the figure, described as "circled 1 to circled 9") are all fulfilled, and all defined code values can be read. Thus, since the arrangement of the information dots can be ascertained by the orientation and the range of a dot pattern, the arrangement rule for information dots configured with code values can also be specified. Furthermore, as shown in FIG. 54, in the range of the dot pattern in an arbitrary area to be read, when an information dot on either the left or the right outside of such range is read, the information dot and an information dot located at the end of the opposite side to the information dot are defined with the same numerical value and are placed at positions displaced by the same distance in the same direction with respect to the virtual point. The line segment connecting the two information dots becomes a horizontal line, and by parallel translation of this horizontal line, it is possible to accurately recognize the horizontal line passing through the virtual point. The amount of parallel movement refers to the distance to the point on the horizontal line on which the reference dot resides if the corresponding reference dot exists. Furthermore, if a vertical line is recognized by a similar procedure for the vertical direction, it is possible to accurately determine the virtual point by determining the position of the intersection point of the horizontal line and the vertical line. According to this method, even when the dot arrangement is greatly deformed due to imaging of the dot pattern with a tilted the optical reading device, the virtual point can be accurately determined, and the numerical value indicated by the information dot can be accurately recognized.

The code generation apparatus and the code recognition apparatus to which the present invention is applied as described above can be used in various fields and for various applications. Although the above description relates to a code generation apparatus and a code recognition apparatus to which the present invention is applied, hereinafter, embodiments of various aspects of the present invention will be explained in accordance with the following first to the seventeenth embodiments. Therefore, the constituent elements included in the configuration of the above "embodiment" can be combined with any of the following first to the twenty-third embodiments. In addition, Needless to say that the constituent elements described in the following first to the twenty-third embodiments can be combined with the constituent elements of the above "embodiment".

First Embodiment

Figure 55:
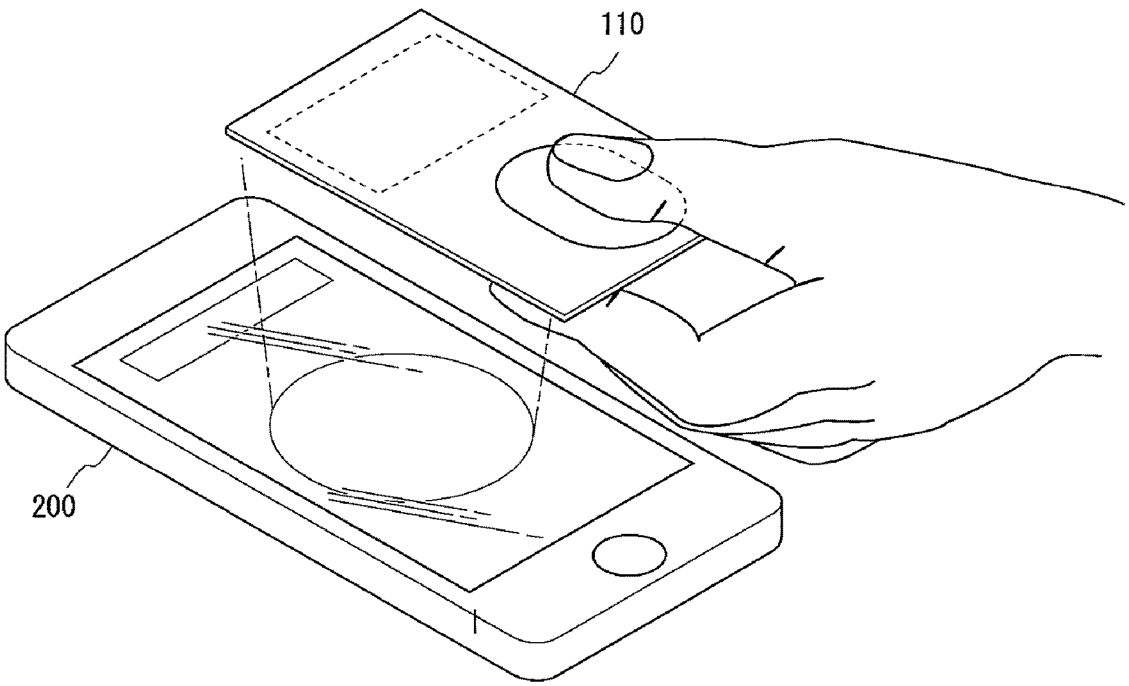
FIG. 55 is a diagram showing an example of the use of a card-type device.

Hereinafter, a card type apparatus 110 according to the first embodiment will be described. The present card type apparatus is a card type configuration of the code generation apparatus of the above the zeroth embodiment. However, the implementation of the present invention is not restricted to a card type apparatus. FIG. 55 shows an example of the use of the card type apparatus 110. The card type apparatus 110 has a configuration in which an electronic circuit and other elements are embedded in a plate-like member made of plastic.

As shown in FIG. 55, the card type apparatus 110 exchanges information with the touch panel of the information device 200 such as a mobile phone, a smartphone, a portable information terminal, a personal computer, an on-vehicle device, and the like. For example, the card apparatus 110 receives light emitted from the screen of a touch panel having a display and converts it into electric energy. The card type apparatus 110 generates digital data from changes in the energy (generated electric energy) of the light received per unit time. Therefore, the information device 200 can transmit digital data to the card shaped apparatus 110 by temporally changing the amount of light of the screen in accordance with digital data (bit string). The card apparatus 110 may come into contact with or come into proximity with the touch panel, but it may face the necessary distance for conversion to necessary electric energy and/or acquisition of digital data. The hardware configuration of the information device 200 is the same as that of the code recognition apparatus 3 described in the zeroth embodiment, and thus description thereof is omitted (see FIG. 5). Therefore, also in the following embodiments, the information device 200 is described as having the same configuration as that of the code recognition apparatus 3 in FIG. 3. Note that the information device 200 is, for example, a smartphone, a portable information terminal, a tablet terminal, or the like.

On the other hand, the card type apparatus 110 can output information to the CPU (Central Processing Unit) of the information device 200 via the touch panel by providing a change in a physical quantity such as electrostatic capacitance in the touch panel. For example, when the information device 200 detects a change in specific electrostatic capacitance as a trigger, it activates a communication program with the card type apparatus 110 and starts communication with the card type apparatus 110 via the touch panel.

The card type apparatus 110 is arranged with a plurality of conductor terminals (also referred to as elements) which generate changes in physical quantities such as electrostatic capacitance on a surface coming into contact with a touch panel or on a surface coming into proximity with the touch panel. Each element can be connected to a finger of a person who touches the card shaped apparatus 110 via a switch. Therefore, when the switch is on, for example, the mutual electrostatic capacitance between the element and the touch panel becomes larger than the reference value, and the touch panel detects the contact or the proximity of the element. When bringing the card type apparatus 110 close, it is desirable to have glass or some other protective sheet affixed without a gap between the card shaped apparatus 110 and the touch panel in a state where the card shaped apparatus 110 is in proximity. When there is a gap between the card shaped apparatus 110 and the touch panel, it is difficult for the touch panel to detect the proximity of the card shaped apparatus 110.

Depending on which switch is turned on, the arrangement pattern of the element detected by the touch panel will be different. For example, when the CPU of the information device 200 detects a predetermined element arrangement pattern referred to as a trigger pattern, the information device 200 starts communication with the card type apparatus 110. For example, when the fingerprint detected by the fingerprint sensor coincides with the fingerprint data of the user stored in the memory, the card type apparatus 110 may control the switch so that the trigger pattern is detected from the element by the touch panel. Furthermore, instead of a fingerprint authentication sensor, a vein authentication sensor, a retina authentication sensor, an iris authentication sensor, or the like may be used. The fingerprint sensor, the vein authentication sensor, the retina authentication sensor, and the iris authentication sensor may also be referred to as biometric authentication means.

Note that in the present embodiment, the apparatus exemplifying the present invention is not restricted to a card type apparatus. However, the apparatus exemplifying the present invention is desirably an apparatus having an operating surface on which elements for outputting information to the touch panel are arranged. Therefore, hereinafter, the card type apparatus is simply referred to as the apparatus 110. Furthermore, the moment the apparatus 110 and the information device 200 start communicating with each other is not restricted to when the fingerprint detected by the fingerprint sensor coincides with the fingerprint data of the user stored in the memory, and a trigger pattern is transmitted from the apparatus 110 to the information device 200. For example, for the information device 200, when a predetermined computer program satisfies predetermined conditions, a trigger signal may be made to transmit from the information device 200 to the apparatus 110 via a touch panel or the like. A predetermined condition satisfied by a predetermined computer program refers to, for example, when a predetermined computer program is activated and the predetermined computer program receives a predetermined operation from the user, and the like. The trigger signal transmitted from the information device 200 to the apparatus 110 via a touch panel or the like may be transmitted to the apparatus 110 by, for example, a change in the amount of light of the touch panel, a combination of colors on the touch panel, a transition of a combination of colors on the touch panel, a predetermined image on the touch panel, a change in the energy of an electromagnetic wave emitted from the information device 200, or the like. That is, when the apparatus 110 detects a change in the amount of light of the touch panel, a combination of colors on the touch panel, a transition of a combination of colors on the touch panel, a predetermined image on the touch panel, a change in the energy of an electromagnetic wave energy emitted from the information device 200, the apparatus 110 may be made to start communication with the information device 200 through a change in a physical quantity such as electrostatic capacitance from the above conductor terminal to the touch panel. In addition, the information device 200 may execute communication by activating various wireless apparatuses such as a Wi-Fi, a Bluetooth, or the like installed on the information device 200, using a computer program operating in the information device 200, or by controlling the energy of an electromagnetic wave energy output from various wireless apparatuses.

[Apparatus Configuration]

Figure 56:
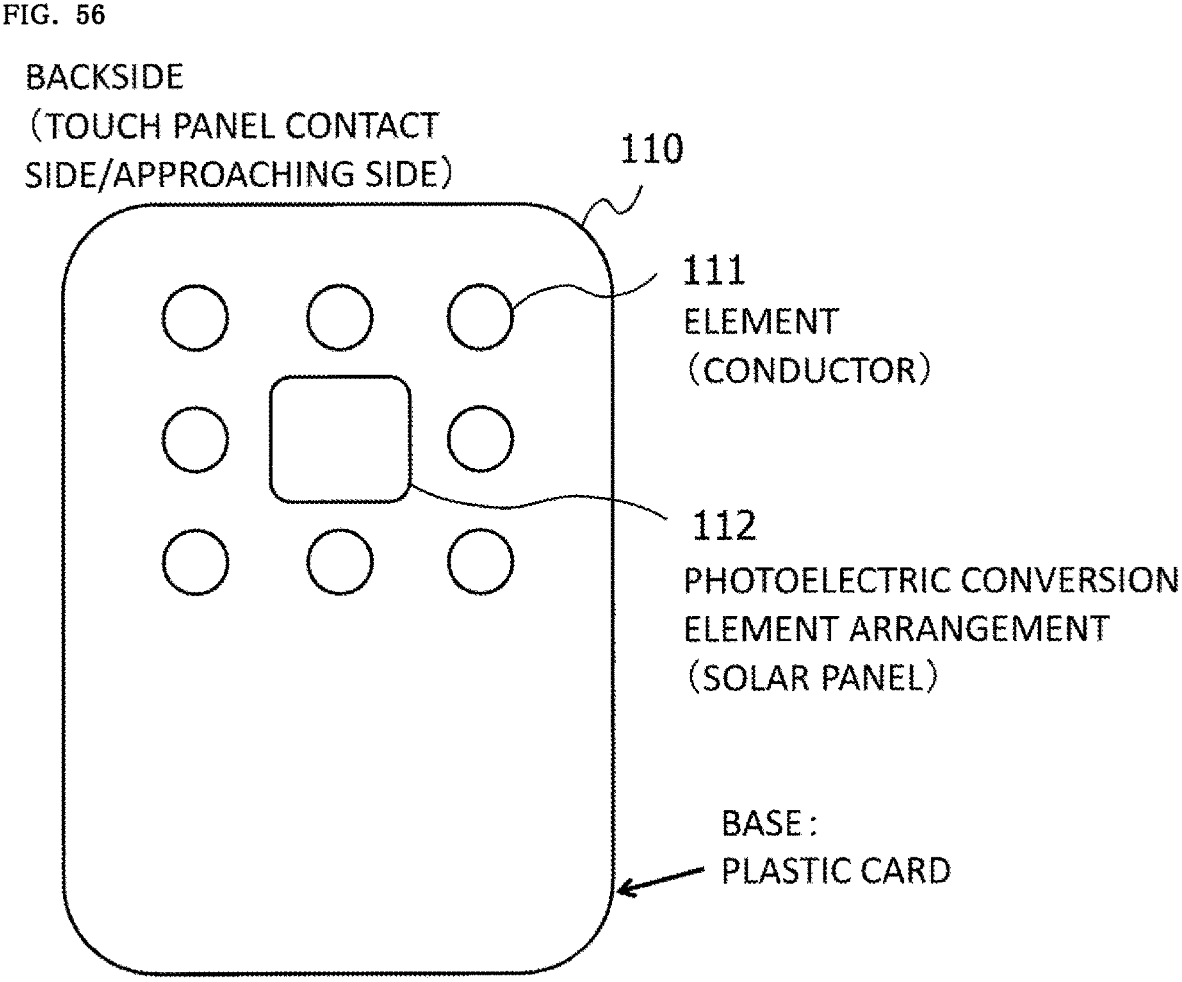
FIG. 56 is a schematic diagram showing an example of the configuration of the back side of the apparatus.
Figure 57:
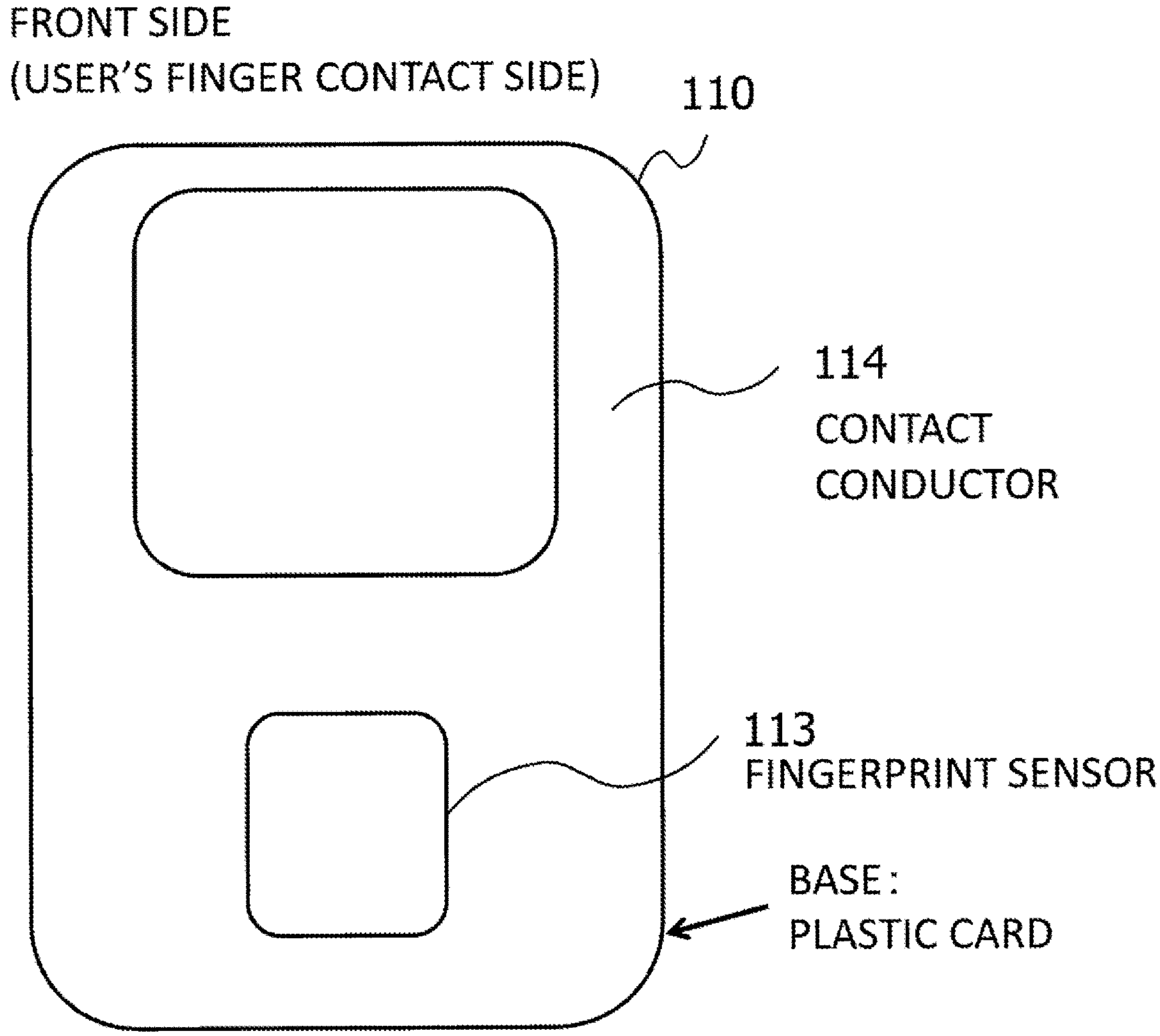
FIG. 57 is a schematic diagram showing an example of the configuration of the front side of the apparatus.
Figure 58:
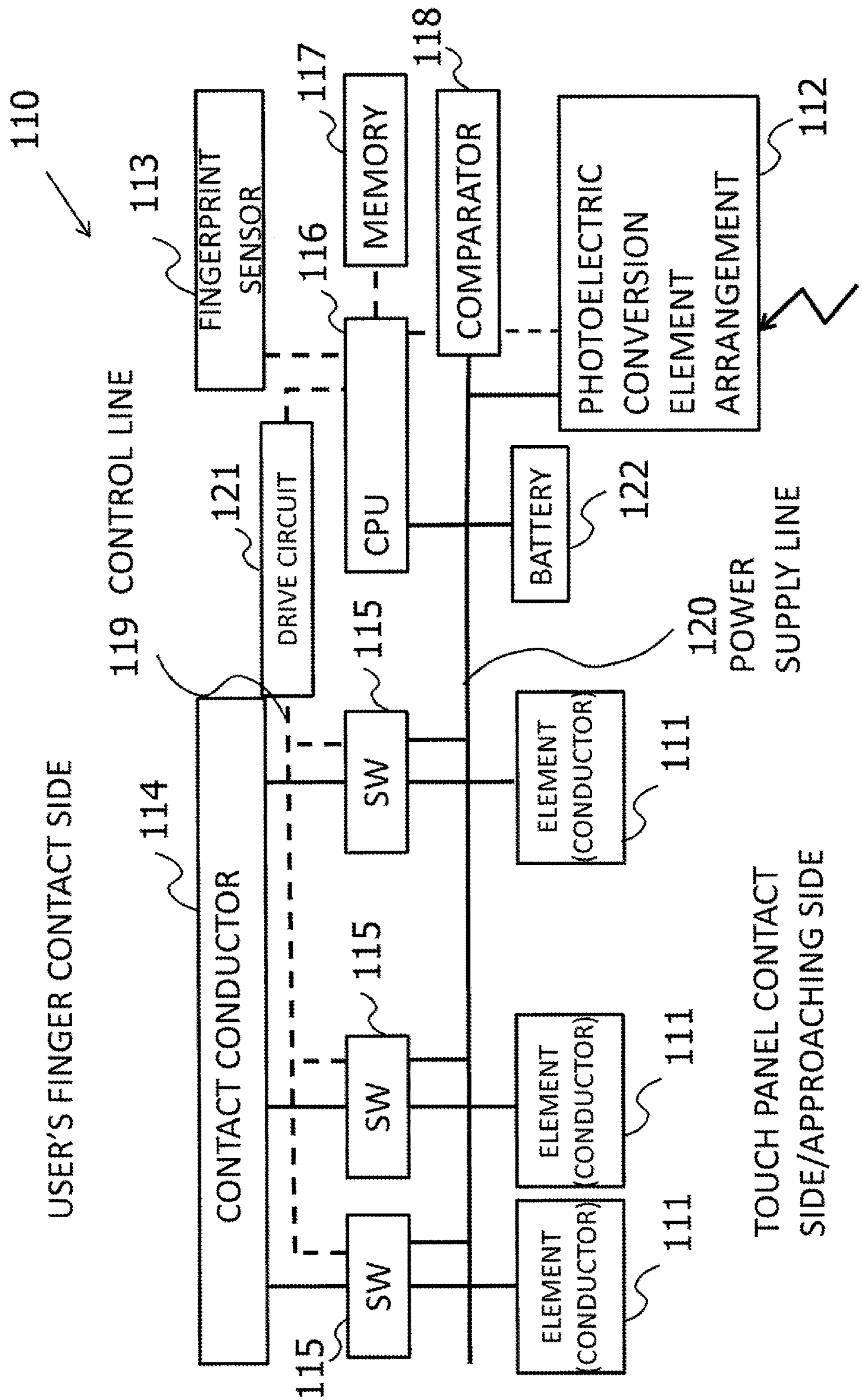
FIG. 58 is a schematic diagram showing an example of the configuration of the apparatus.
Figure 59:
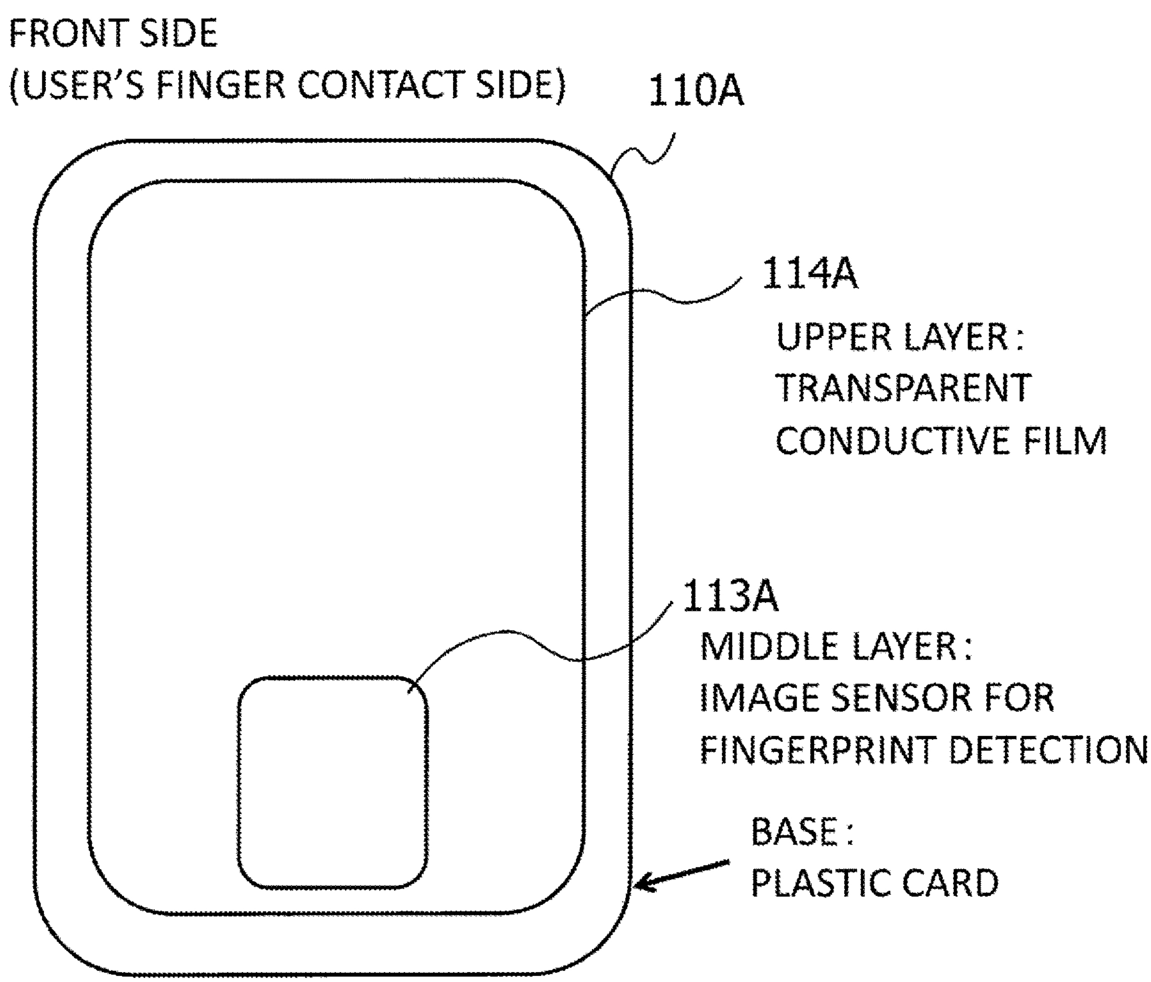
FIG. 59 is a schematic diagram showing an example of a configuration of the front side of an apparatus having conductive film on the front side.
Figure 60:
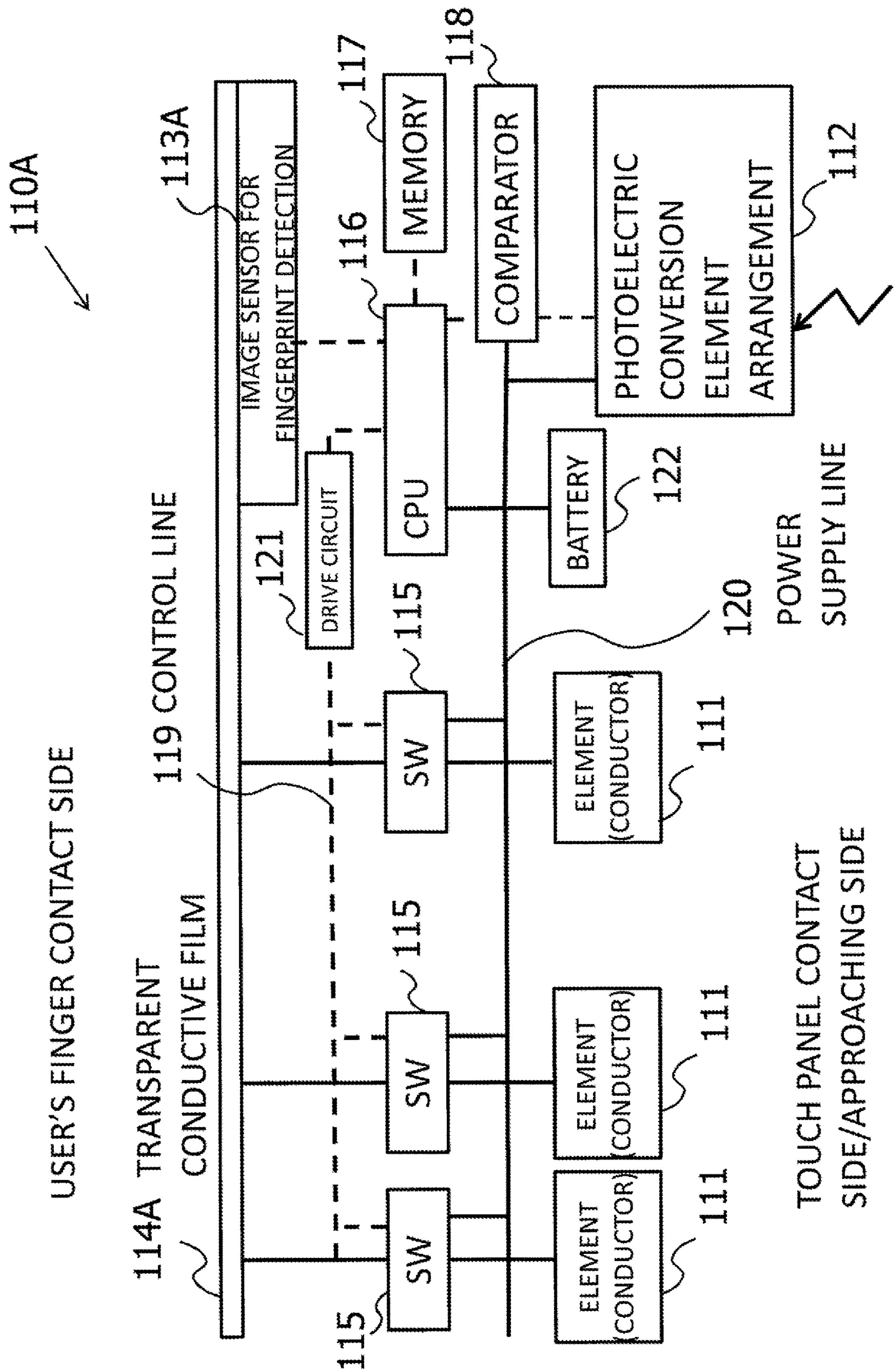
FIG. 60 is a schematic diagram showing an example of a configuration of an apparatus having conductive film on the front side.

FIGS. 56 to 58 show examples of configurations of the apparatus according to the first embodiment. Furthermore, FIG. 59 and FIG. 60 show examples of the configuration of an apparatus having a transparent conductive film on the upper layer of the apparatus. The configuration of the apparatus in this embodiment is an example, and it is possible to omit, replace, and add constituent elements not only the following, appropriately according to the embodiment. Furthermore, the arrangement of each component may be appropriately changed in accordance with the embodiment.

FIG. 56 is a schematic diagram showing an example of a configuration on the back side of the apparatus 110. The back side of the apparatus 110 is the side where the touch panel of the information device 200 comes into contact or comes into proximity. The apparatus 110 includes at least one element 111 on the back side and a photoelectric conversion element array 112 including at least one photoelectric conversion element. The photoelectric conversion element array 112 is, for example, a solar panel. The back side where at least one element 111 is arranged is an example of an operating surface on which at least element that generates a physical quantity change detectable from the opposing surface is arranged.

The element 111 is a terminal of a conductor, and outputs information in a predetermined format to the touch panel of the information device 200 in accordance with a change in a physical quantity such as electrostatic capacitance. The photoelectric conversion element array 112 includes at least one photoelectric conversion element and is supplied with electric energy. The photoelectric conversion element array 112 constitutes an example of "an incoming amount detection unit that detects the amount of external energy incoming from the exterior."

FIG. 57 is a schematic diagram showing an example of a configuration on the front side of the apparatus 110. FIG. 58 exemplifies the configuration of the apparatus 110. The front side of the apparatus 110 is the side where the user's finger or the like makes contact or comes into proximity. The apparatus 110 has a fingerprint sensor 113 and a contact conductor 114 (also referred to as a conductor pad) on its surface. The fingerprint sensor 113 detects a pattern due to concaves and convexes on a part of surface of a human body such as a fingerprint. On the other hand, when the finger coming into contact with or comes into proximity with the contact conductor 114, a change in a physical quantity such as electrostatic capacitance is detected by the touch panel. The front side of the apparatus 110 constitutes an example of a detection surface. The contact conductor 114 is an example of a conductive contact material portion that receives contact from the exterior, and when a user brings a finger into contact with the contact conductor 114, the human body of the user is connected to the element 111 via SW115. The contact conductor 114 plays the role of electrically connecting the human body of the user to SW115. For example, when SW115 is turned on/off in a state where the user's finger comes into contact with the contact conductor 114, a change in electrostatic capacitance that can be detected sufficiently by the touch panel occurs.

The fingerprint sensor 113 generates image data of the fingerprint based on the spatial distribution of electrostatic capacitance when the finger comes into contact with or comes into proximity with the fingerprint sensor 113 and transmits the generated image data to the CPU 116 (FIG. 58) through a bus (input/output bus or the like) not shown. The CPU 116 saves the image data of the fingerprint transmitted from the fingerprint sensor 113 in the work area of the memory 117 (FIG. 58). Then, the CPU 116 collates the image data of the fingerprint from the fingerprint sensor 113 stored in the work area of the memory 117 with the image data of the user's fingerprint originally stored in the nonvolatile area (an electrically erasable programmable read-only memory (EEPROM), a flash memory, or the like) of the memory 117. If the image data of the fingerprint from the fingerprint sensor 113 and the image data of the fingerprint stored in the nonvolatile area of the memory 117 match, based on the image data of the fingerprint from the fingerprint sensor 113, the CPU 116 determines that the authentication of the user has been executed correctly Instead of executing authentication with the image data of the fingerprint itself, the CPU 116 may obtain feature point data for specifying the fingerprint from the image data of the fingerprint, and may perform collation and authentication with the feature point data having a small capacity. That is, feature point data for specifying a fingerprint may be stored in the nonvolatile area of the memory 117 from the image data of the user's fingerprint.

Furthermore, the fingerprint sensor may be placed on the back side of the card. And, the CPU 116 controls a switch in accordance with a trigger pattern. By the control of this switch, the change in a physical quantity from the element 111 is transmitted to the touch panel of the information device 200 of which the apparatus 110 is in proximity or on which it is placed. Note that in addition to fingerprints, the fingerprint sensor 113 can recognize patterns such as a dot pattern including a plurality of dots having a diameter of less than 0.5 mm printed with electrically conducting ink on the surface of an insulating medium or a dot pattern including a plurality of dots having a diameter of less than 0.5 mm formed by fixing conductive material on the surface of an insulating medium. Note that if the fingerprint sensor 113 has sufficient accuracy, it is also possible to recognize dots of about 0.05 to 0.2 mm in diameter. Therefore, instead of performing authentication by making the fingerprint sensor 113 recognize a fingerprint, it is possible to perform authentication with dots. For example, a means of information input is formed as an alternative to authentication by a human finger by fixing a dot pattern in which information is encrypted using conductive ink or conductive material on the bottom face of a stamp unit similar to that of the code generation, on the bottom face of a stamp unit of a three-dimensional object or the like having various shapes and formed with insulating material or on the surface of a three-dimensional object or the like having various shapes. Furthermore, paper with a dot pattern in which information is encrypted by conductive ink or conductive material formed on it may also be used as a means of information input for the fingerprint sensor 113. Instead of a dot pattern, a bar code, a two-dimensional bar code or the like may also be used. Instead of a dot pattern, a bar code, a two-dimensional bar code, or the like, a character string formed on a medium surface with conductive ink or conductive material may also be used as a means of information input for the fingerprint sensor 113. The character string read by the fingerprint sensor 113 may be recognized by the technique of Optical Character Recognition (OCR).

However, authentication of the user's fingerprint is not restricted to the processing of the CPU 116. At least a part of the processing of the above CPU 116 may be executed by a processor other than the CPU 116, for example, a dedicated processor such as a Digital Signal Processor (DSP), a Graphics Processing Unit (GPU), a numerical operation processor, a vector processor, an image processing processor, or the like. Furthermore, at least part of the processing of the above CPU 116 may be executed by an Integrated Circuit (IC) or some other digital circuit. In addition, at least part of the processing of the above CPU 116 may be executed by an analog circuit. The integrated circuit includes an LSI, an Application Specific Integrated Circuit (ASIC), and a Programmable Logic Device (PLD). The PLD includes, for example, a field-programmable gate array (FPGA). The function of the above CPU 116 may be achieved by a combination of a processor and an integrated circuit. The combination is referred to as, for example, a Microcontroller Unit (MCU), a System-on-a-Chip (SoC), a system LSI, a chip set or the like.

FIG. 58 is a schematic diagram showing an example of the configuration of the apparatus 110. FIG. 58 schematically exemplifies the relationship of the parts embedded in a plate-shaped member, with the plastic plate-like member exemplified in FIG. 55 left out. The apparatus 110 includes a fingerprint sensor 113 and a contact conductor 114 on the front side (the side where a user's finger makes contact). Since the fingerprint sensor 113 and the contact conductor 114 are the same as the fingerprint sensor 113 and the contact conductor 114 shown in FIG. 57, description thereof are omitted.

Furthermore, the apparatus 110 includes at least one element 111 and a photoelectric conversion element array 112 on the back side (the side where the touch panel makes contact or comes into proximity). Since the element 111 and the photoelectric conversion element array 112 are the same as the element 111 and the photoelectric conversion element array 112 shown in FIG. 56, descriptions thereof are omitted.

Furthermore, the apparatus 110 includes at least one SW115 (switch), a CPU 116, a memory 117, a comparator 118, a drive circuit 121, and a battery 122. Each component of the apparatus 110 is connected to the CPU 116 by a control line 119. In addition, each component of the apparatus 110 is supplied with electrical power from the battery 122 via the power supply line 120. The battery 122 is, for example, a film type lithium ion battery. In addition to the photoelectric conversion element array 112, a photoelectric conversion element array (solar panel) may be provided on the front side of the apparatus 110 to charge the battery 122.

SW115 switches on/off the output from the element 111 to the touch panel of a change in electrostatic capacitance detected via the contact conductor 114. That is, when SW115 is ON, an electrostatic capacitance including that of a human body in contact via the contact conductor 114 is formed with the touch panel via the element 111. On the other hand, when SW115 is OFF, electrostatic capacitance of wiring or the like from the element 111 to SW115 is formed with the touch panel via the element 111. SW115 constitutes an example of a "physical quantity control unit." By executing various programs stored in the memory 117, the CPU 116 executes the processing of each component of the apparatus 110. The memory 117 provides a storage area for loading various programs and a work area for executing the programs. Furthermore, the memory 117 stores various programs and data used for executing the programs. The memory 117 is, for example, a semiconductor memory such as a read only memory (ROM), a random access memory (RAM), or the like. The ROM includes a rewritable nonvolatile memory.

The comparator 118 is a circuit provided in parallel with the power generation unit such as the photoelectric conversion element array 112. The comparator 118 determines whether or not the terminal voltage detected by the power generation unit exceeds a predetermined reference value, and converts the temporal change in the amount of external energy incoming into digital data. When signals are detected from a plurality of photoelectric conversion elements (a photosensor, a photodiodes, a phototransistor, and the like) of the photoelectric conversion element array 112, comparators 118 are provided with the same number in parallel with the plurality of the photoelectric conversion elements at position. By combining the plurality of photoelectric conversion elements and the plurality of comparators 118, a circuit for acquiring input signals of a plurality of channels is formed. Furthermore, an analog/digital converter (A/D converter) may be used in the place of the comparator. By using the A/D converter, it is possible to realize multivalued signals of 3 bits or more in each channel by one input. The comparator 118 (or the A/D converter) constitutes an example of "an information acquiring circuit that acquires input information of a predetermined format based on a temporal change in the amount of income".

The drive circuit 121 switches SW115 on/off in accordance with output information to be transmitted to the information device 200. Note that the processing executed by the drive circuit 121 may be controlled by the CPU 116. The battery 122 supplies power for drive hardware circuits including the element 111, SW115, the CPU 116, the drive circuit 121 and the like. However, electric power may be supplied to the hardware circuit by the power of the photoelectric conversion element array 112 without installing the battery 122. The drive circuit 121 constitutes an example of an information output unit that outputs output information in a predetermined format by a change in a physical quantity.

FIG. 59 exemplifies the appearance of a modification example of the apparatus 110. FIG. 59 is a schematic diagram showing an example of a configuration of the front side of an apparatus 110A having a conductive film on the front side. Instead of the fingerprint sensor 113 and the conductor pad 114 of the apparatus 110 shown in FIG. 57, the apparatus 110A includes a fingerprint detection image sensor 113A and a transparent conductive film 114A. Even with the configuration of FIG. 59, it is possible to provide the same functions as those of the apparatus 110 shown in FIG. 57.

The fingerprint detection image sensor 113A is, for example, an image sensor such as a CCD (Charge Coupled Device), a CMOS (Complementary Metal Oxide Semiconductor), or the like. The fingerprint detection image sensor 113A is, for example, placed on a plastic card. The transparent conductive film 114A is placed overlapping the fingerprint detection image sensor 113A. When a finger comes into contact with or comes into proximity with the fingerprint detection image sensor 113A via the transparent conductive film 114A, the fingerprint detection image sensor 113A acquires image data of the fingerprint on the surface of the finger. The fingerprint detection image sensor 113A transmits the acquired fingerprint image data to the CPU 116 through a bus (input/output bus, etc.) not shown. The CPU 116 stores the image data of the fingerprint transmitted from the fingerprint detection image sensor 113A in the work area of the memory 117. Since the processing of the CPU 116 after storing the image data of the fingerprint in the work area of the memory 117 is the same as that of the apparatus 110 of FIG. 57 (an example using a fingerprint sensor for detecting a fingerprint by a change in electrostatic capacitance), description thereof is omitted.

FIG. 60 is a schematic diagram showing an example of a configuration of the apparatus 110A having a conductive film 114A on the front side. FIG. 60 schematically exemplifies the relationship among the parts embedded in a plate-like member, with a plastic plate-like member exemplified in FIG. 59 left out. Instead of the fingerprint sensor 113 and the conductor pad 114 of the apparatus 110 shown in FIG. 58, the apparatus 110A includes a fingerprint detection image sensor 113A and a transparent conductive film 114A. In the configuration of FIG. 60, when a user's finger comes into contact with the transparent conductive film on the fingerprint detection image sensor 113A, the user's body is connected with the element 111 via SW115. Therefore, in a state where the user's finger is coming into contact with the transparent conductive film, by having the CPU 116 control the drive circuit 121 to turn SW115 on/off, the touch panel may be made to detect a change in a physical quantity such as electrostatic capacitance from the element 111. Other constituent elements are the same as those of the apparatus 110 shown in FIG. 58, and thus descriptions thereof are omitted. The fingerprint sensor 113 constitutes an example of a "sensor."

[Pattern Code Output]

Figure 61A:
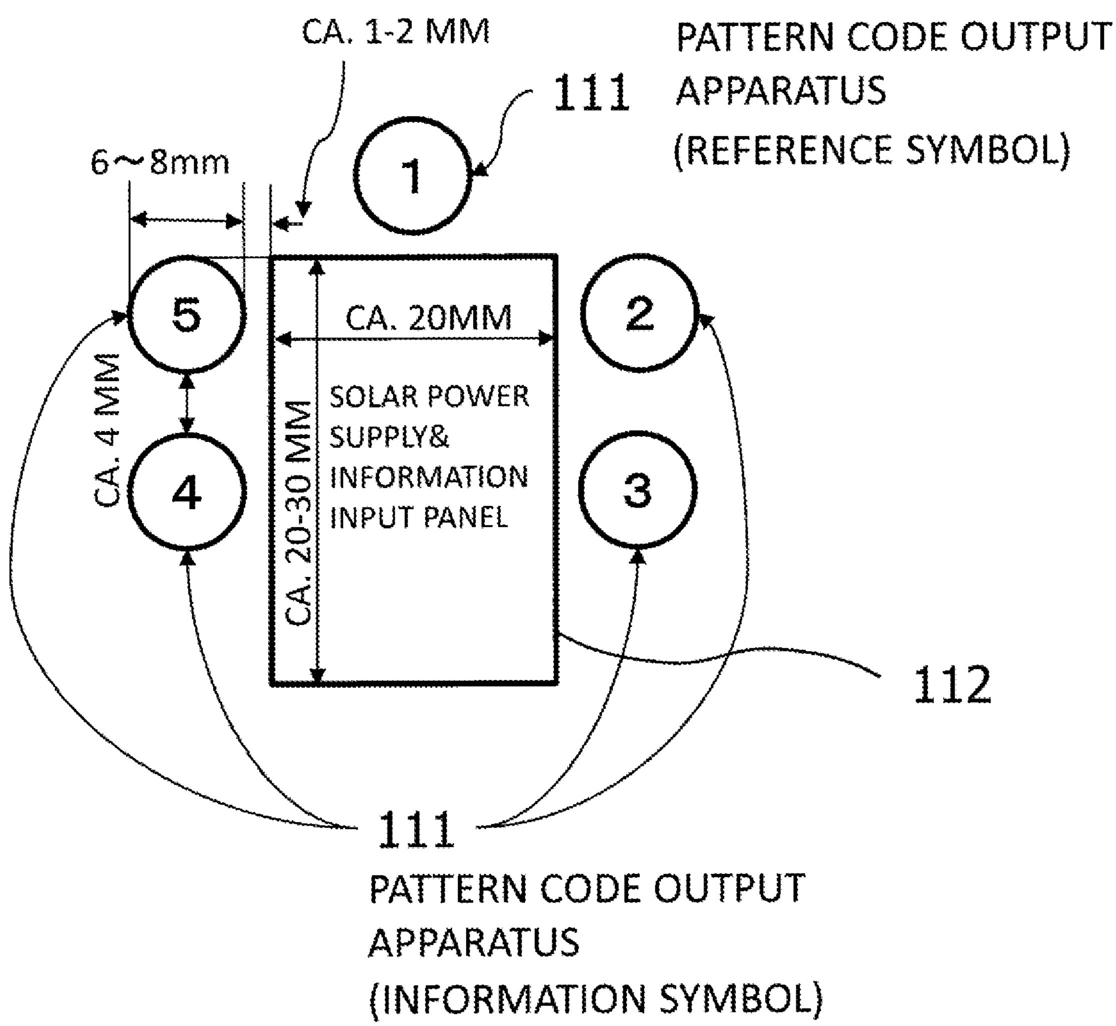
FIG. 61A is a schematic diagram showing an example of a configuration of the surface on which an information device of an apparatus comes into contact.

FIG. 61A is a schematic diagram showing an example of a configuration of a contact surface of the apparatus 110 with which the touch panel of the information device 200 makes contact. The apparatus 110 includes a photoelectric conversion element array 112 and five elements 111 (also referred to as a pattern code output apparatus).

The photoelectric conversion element array 112 is a panel for supplying solar power and inputting information. As in the example of FIG. 61A, if the photoelectric conversion element array 112 has a size of about 20 to 30 mm in length and 20 mm in width, it is possible to supply electric power for operating the pattern code output apparatus. To implement fingerprint authentication, dot code reading, and the like, it is preferable to install a large solar battery or a large rechargeable battery. Furthermore, the separation of 1 to 2 mm of the photoelectric conversion element array 112 from each element 111 is sufficient.

The five elements 111 are conductors and are arranged around the photoelectric conversion element array 112. For example, the five elements 111 induce a change in a physical quantity such as mutual electrostatic capacitance with the touch panel and the like, and output information to an electronic device having a touch panel. The output information of the element 111 is also referred to as a symbol. If the diameter of each element is 8 mm or more, the touch panel can read the output information from the element 111 even if protective glass of 0.5 to 0.66 mm is placed on the touch panel. In addition, recognition is possible if the distance from the end of one element 111 to the end of another element 111 for adjacent elements 111 is 4 mm or more. In the example of FIG. 61A, the information output from each element 111 is referred to as symbol 1 to symbol 5. As in FIG. 61A, symbol 1 to symbol 5 are exemplified by numerals in the round shaped element 111. Needless to say that the various sizes described above will vary depending on the performance of the touch panel side and the electric circuit inducing a change in the electrostatic capacitance. The symbol 1 is output from the element 111 on the upper side of the photoelectric conversion element array 112. Symbol 2 and symbol 3 are output from the two elements 111 on the right side of the photoelectric conversion element array 112, wherein the one in the upper side is the symbol 2, and the one in the lower side is the symbol 3. Symbol 4 and symbol 5 are output from the two elements 111 on the left side of the photoelectric conversion element array 112, wherein the one in the lower side is the symbol 4, and the one in the upper side is the symbol 5. A symbol is a signal and can also be referred to as an information symbol. The symbol is a signal detected by a physical quantity sensor through an interaction between an element 111 and a sensor (referred to as physical quantity sensor) capable of detecting a physical quantity of the touch panel or the like of the information device 200. A physical quantity sensor such as a touch panel or the like detects a physical quantity, for example, an electrostatic capacitance, or an electric field intensity or the like of a physical quantity sensor surface such as a touch panel or the like by interaction with the element 111. When the detected physical quantity is equal to or greater than (or exceeds) the threshold value, the signal is ON, and when the physical quantity is less than (or equal to or less than) the threshold value, the signal is OFF. Symbols can be referred to as ON or OFF signal strings thereof.

Symbol 1 is a reference symbol and is a signal that repeats ON/OFF at predetermined time intervals. Symbols 2 to 5 are signals used for outputting information. The apparatus 110 switches each information symbol on/off and outputs information (pattern code) to be transmitted to the information device 200 by outputting various arrangement patterns (hereinafter, also simply referred to as patterns) from a plurality of elements 111 arranged on a plane and having a spatial spread. That is, the pattern code refers to information expressed by changing the combination of the ON and OFF of symbols output from the plurality of elements 111 on the time axis. Furthermore, a combination of the ON and OFF of a symbol output from a plurality of elements 111 at a certain time is referred to as a pattern. And, the ON or OFF of a symbol are transmitted from the apparatus 110 to the touch panel by a change in electrostatic capacitance between each element 111 and the touch panel. That is, the information device 200 acquires a pattern code from the apparatus 110 by detecting a change in a physical quantity such as electrostatic capacitance or the like between each element 111 on the back side of the apparatus 110 which is placed on or is in proximity with the touch panel incorporated on the chassis surface and the touch panel, and by detecting the position of an element 111.

Figure 61B:
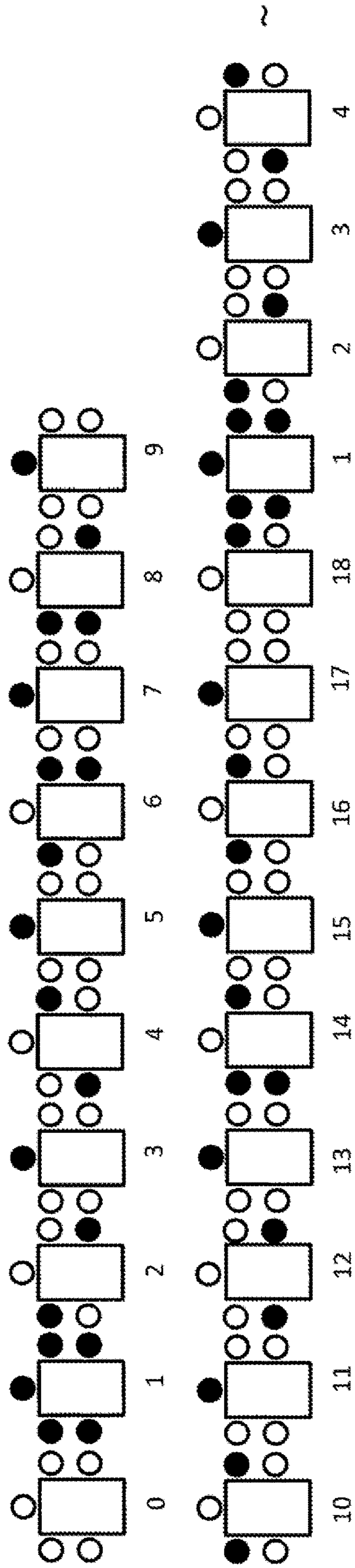
FIG. 61B is a diagram showing an example of a pattern code output.

FIG. 61B is a diagram showing an example of a pattern code output. The pattern code output apparatus outputs various patterns by the switching of each symbol on/off. As in FIG. 61B, serial numbers are attached to each arrangement pattern from the left. The zeroth (serial number 0) pattern is the case where the elements 111 corresponding to the symbols 1 to 5 are in the OFF state. The state where the element 111 is OFF is exemplified by an open circle. The apparatus 110, and the circuits and the like in the apparatus 110 are supplied with electric power also from the battery 112. However, by placing the apparatus 110, and the circuits and the like in the apparatus 110 on the touch panel of the information device 200, it is possible to have the photoelectric conversion element array 112 (an arrangement of P/N junctions of semiconductors similar to those of a solar batteries) which receives light from the touch panel supply electric power.

When the supply of the solar power from the touch panel is started, the apparatus 110 turns on the elements 111 corresponding to the symbols 1 to 5 as shown by the first pattern (serial number 1). A state in which the elements 111 corresponding to the symbols 1 to 5 are in the ON or OFF state is simply referred to as a state with the symbols 1 to 5 ON or OFF. Furthermore, the ON state is, for example, a state in which the touch panel can detect a physical quantity larger than standard from the element 111, and the OFF state is, for example, a state in which the touch panel cannot detect a physical quantity larger than standard from the element 111. A pattern in which symbols 1 to 5 are in an ON state (hereinafter also referred to as a delimiter pattern or reference symbol pattern) indicates the start or break of the pattern code. The delimiter pattern serves to indicate the start time of the time stamp. By preventing the reference symbol and the information symbol from being output simultaneously, the pattern code is recognized without error.

The second pattern (serial number 2) is a state in which the symbols 3 and 5 are ON and the other symbols are OFF. The second pattern is a pattern for outputting information.

The third pattern (serial number 3) is a state in which symbol 1, which is one of the other reference symbols, is ON and the other symbols are OFF (hereinafter also referred to as time stamp pattern). The time stamp pattern is output at predetermined time intervals. As in the example of FIG. 61B, the pattern output at the third and subsequent odd-numbered patterns (serial odd number) is a time stamp pattern. In each even-numbered pattern, the apparatus 110 outputs a pattern code corresponding to output information by the switching of the symbol 2 to the symbol 5 on/off.

The eighteenth pattern (serial number 18) may be a parity check bit for the information symbol pattern output between the second and sixteenth patterns using the symbols 2 to 5. Following the eighteenth pattern, a delimiter pattern indicating the start or delimiter of the pattern code is output similarly to the first pattern (serial number 1). The pattern code output apparatus can detect the end of the pattern code by the output of the delimiter pattern. The pattern code output apparatus can output a new pattern code for transmitting to the information device 200 by repeatedly outputting the first (serial number 1) to the eighteenth (serial number 18) patterns.

Note that the apparatus 110 may have the information device 200 detect the end of the pattern code by outputting the delimiter pattern twice, consecutively. The apparatus 110 may output a new pattern code after the delimiter pattern is output twice, consecutively. However, the above description is merely an example, and the pattern for the parity check bits is not restricted to the eighteenth pattern. Furthermore, the delimiter pattern is not restricted to the nineteenth pattern (the pattern with the next serial number 1).

Furthermore, the number of symbols is not limited to five, and may be more than five. Furthermore, the number of reference symbols in the time stamp pattern is not limited to one, and may be plural. By making the number of reference symbols plural, the information device 200 can recognize a change in the orientation of the apparatus 110 with respect to the information device 200 based on the positional relationship of each respective reference symbol. On the other hand, in the case where mutual displacement between the apparatus 110 and the touch panel is restricted to parallel movement, even if the number of reference symbols in the time stamp pattern is one, the information device 200 recognizes the parallel movement of the apparatus 110, and the arrangement of the elements 111 of the apparatus 110 after the movement can be specified. The card type apparatus 110 which is placed on a touch panel or the like can easily make parallel movements. Therefore, even if the number of reference symbols in the time stamp pattern is one, it is a highly likely for the arrangement of the elements 111 moving on the touch panel to be specified.

As in the example of FIG. 61B, the time stamp pattern plays the role of a time stamp by being output alternately with an information symbol pattern. In addition, and the reference symbol may always be in the ON state. In this case, the time stamp pattern may not have to be output.

Figure 61C:
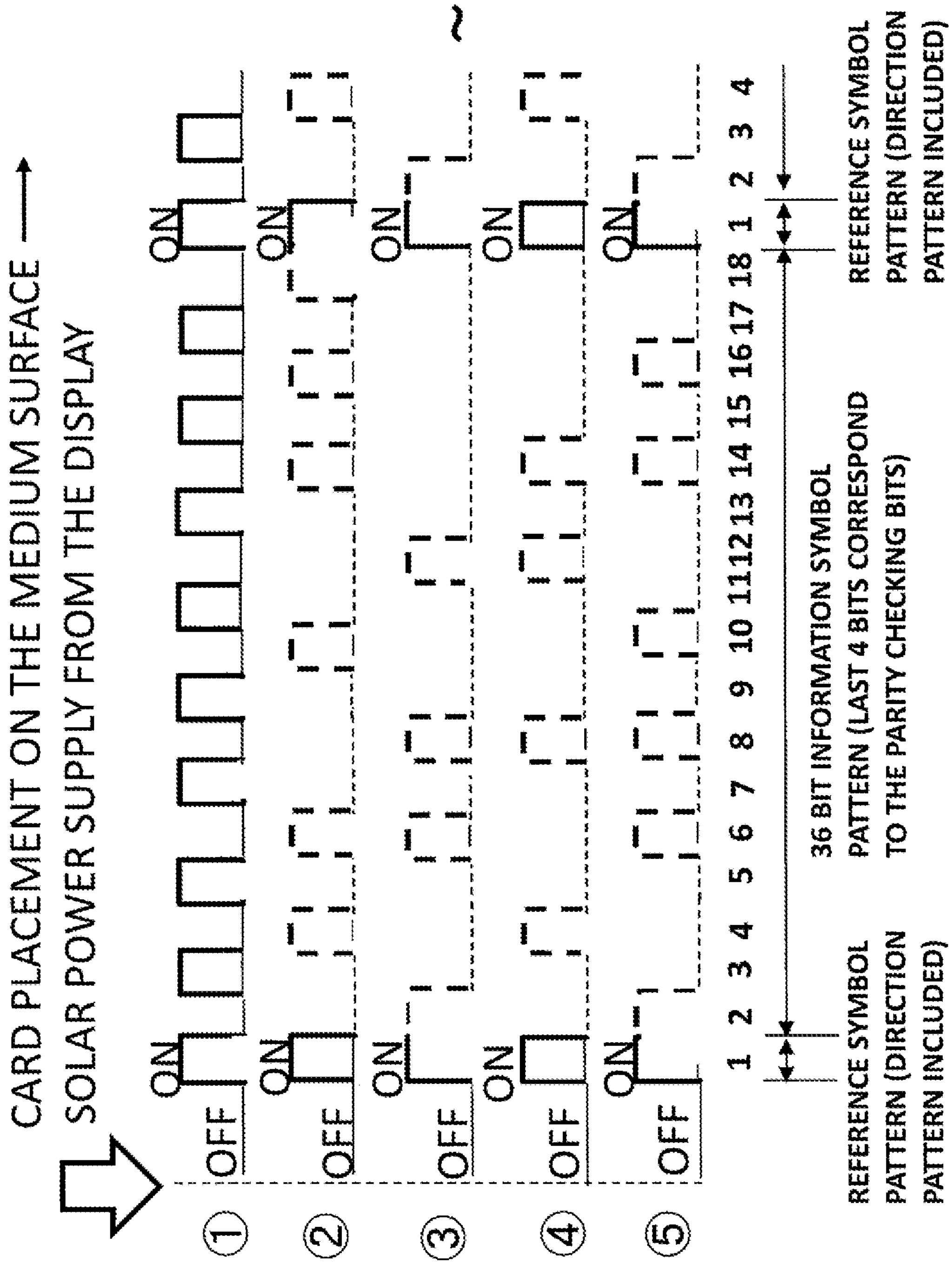
FIG. 61C is a diagram showing an example of a pattern code output.

FIG. 61C is a diagram showing another example of pattern code output. The example in FIG. 61C corresponds to the example of output shown in FIG. 61B, and the ON/OFF of each symbol is shown in chronological order. For example, when the apparatus 110 is placed on or is in proximity with the touch panel of the information device 200, it receives power supply from the information device 200 or the like, outputs a reference symbol pattern (delimiter pattern), and starts outputting the pattern code.

As in FIG. 61C, the element 111 of symbol 1 repeats a physical quantity change of ON/OFF at predetermined intervals. The elements 111 corresponding to the symbols 2 to 5 are switched on/off for each output pattern. The ON state of symbols 2 to 5 is indicated by a dotted line. Also in FIG. 61C, serial numbers 1 to 18 are assigned to each pattern which is a combination of the ON/OFF states of the conductors 111 corresponding to the respective symbols 1 to 5. As in FIG. 61C, serial numbers 1 to 18 can be considered to also indicate the time course. For example, in the fourth pattern (serial number 4), the symbols 2 and 4 are ON. The pattern code output apparatus outputs the time stamp pattern at the seventeenth point and the parity check bit at the eighteenth point. Next, the apparatus 111 outputs the reference symbol pattern (pattern of serial number 1) and starts outputting a new pattern code. Note that also in the symbol output according to the first embodiment, similarly to the pattern code generation apparatus 1 described in the zeroth embodiment, the apparatus 110 may also form a symbol by combining the lengths of the ON/OFF time intervals of the symbols, (see, for example, FIGS. 10 to 13, 26 and 27). Furthermore, the apparatus 110 may be made to output information in accordance with the symbol output intensity level intensity with a plurality of stages set for the symbol output intensity (see FIG. 13).

[Flow of the Processing]

Figure 62:
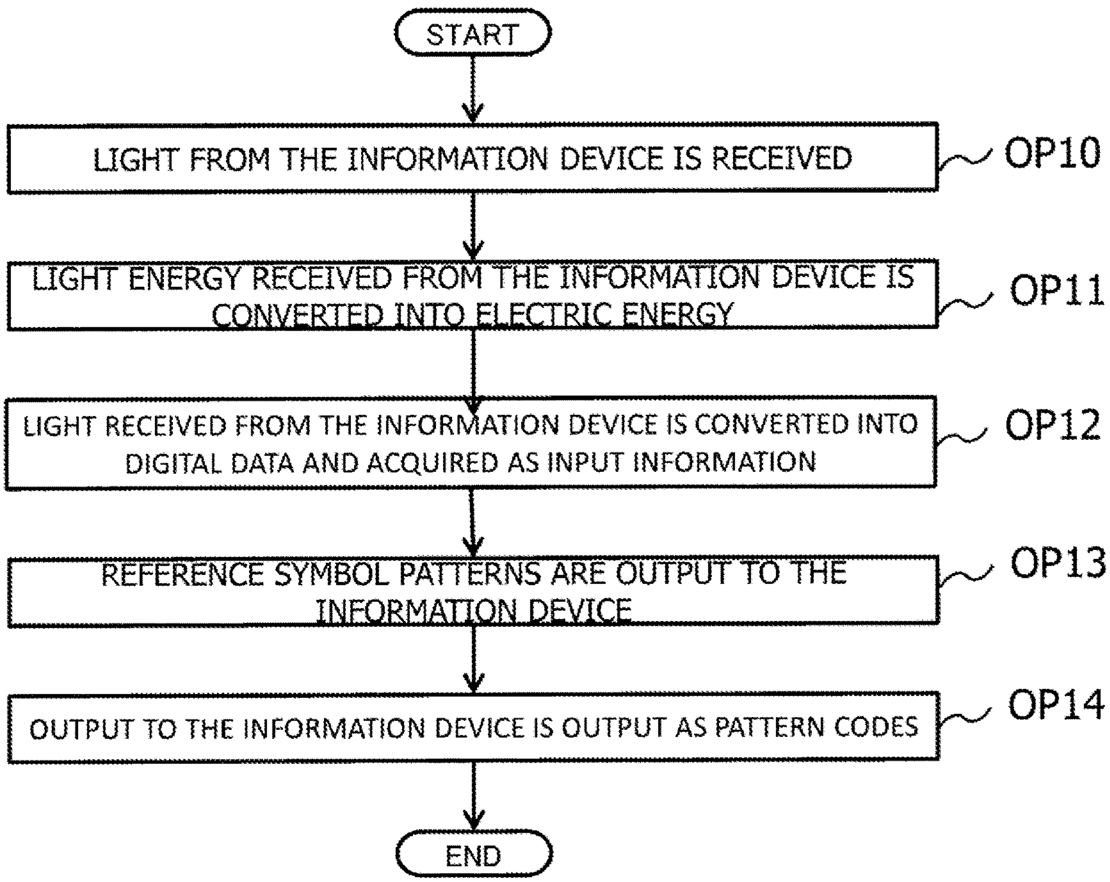
FIG. 62 is a flowchart of an example of processing in which an apparatus outputs information to an information device.

FIG. 62 is a flowchart of an example of processing in which the apparatus 110 outputs information to the information device 200. The processing shown in FIG. 62 is started, for example, when the apparatus 110 is placed on or is in proximity with the touch panel of the information device 200. Here, the term "proximity" refers to an approach in a distant range close enough for the touch panel to detect a change in a physical quantity such as electrostatic capacitance in each element 111 of the apparatus 110. Also, the processing shown in FIG. 62 may be started when the fingerprint sensor 113 of the apparatus 110 placed on the touch panel of the information device 200 detects a fingerprint, a dot code or the like. Furthermore, the processing shown in FIG. 62 may be started by having the apparatus 110 receive input information from the information device 200 via the photoelectric conversion element array 112.

In OP 10, the CPU 116 of the apparatus 110 receives light from the information device 200 by the photoelectric conversion element array 112. In OP 11, the photoelectric conversion element array 112 converts the energy of light received from the information device 200 into electric energy. However, the photoelectric conversion element array 112 may be a photoelectric conversion element such as one photodiode, one phototransistor, or the like.

In OP12, the CPU 116 converts a change in the terminal voltage of the photoelectric conversion element 112, accompanying a change in the amount of light received from the information device 200 by the comparator 118, into digital data, and acquires it as input information. However, the comparator 118 may convert the terminal voltage at both ends of a resistance having a resistance value of that of a reference resistance, induced by a change in the current value output from the photoelectric conversion element array 112, into digital data and have it be acquired as input information. Upon acquiring input information, the CPU 116 advances the control to OP13. By turning on each SW115, the CPU 116 outputs the reference symbol pattern to the information device 200. In OP14, the CPU 116 switches each SW115 on/off to output the output information to the information device 200 as a pattern code, and then the processing is terminated. The processing of OP13 and OP14 may be repeated in accordance with the output information to information device 200. The output information is, for example, identification information (a serial number, a credit card number, or the like) of the apparatus 110 stored in the memory 117 of the apparatus 110.

Figure 63:
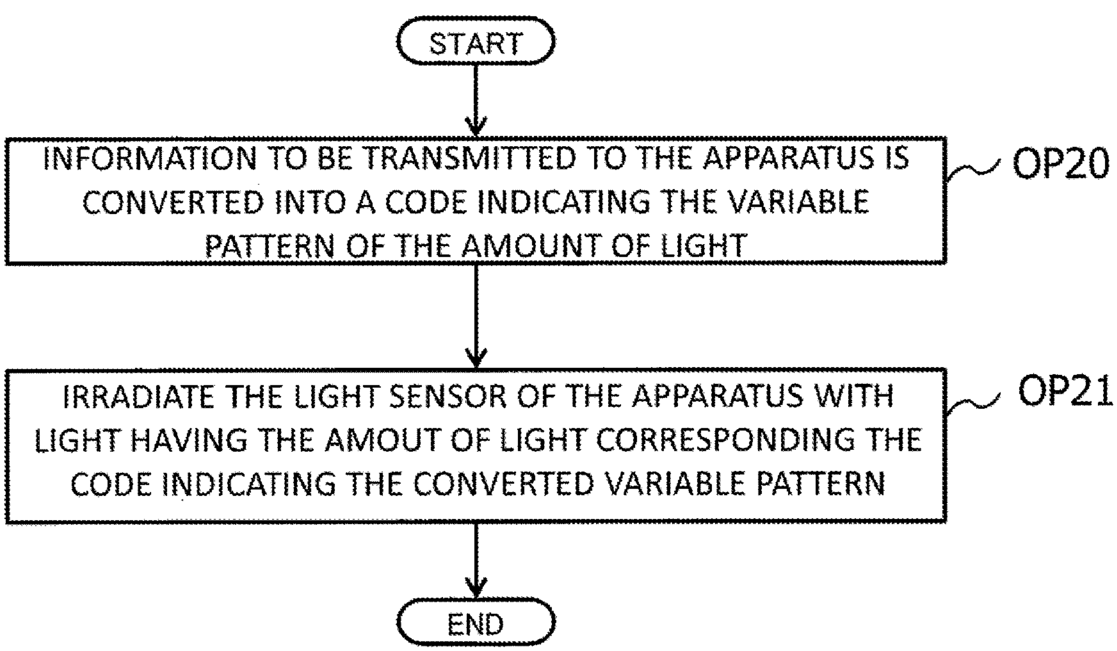
FIG. 63 is a flowchart of an example of a processing in which an information device outputs information to an apparatus.

FIG. 63 is a flowchart of an example of a processing in which the information device 200 outputs information to the apparatus 110. The processing shown in FIG. 63 is started, for example, by an operation on the touch panel of the information device 200, an input request from an application executed on the information device 200, and the like.

In OP20, the information device 200 converts information to be transmitted to the apparatus 110 into a code indicating a variation pattern of the amount of light. In OP21, the information device 200 irradiates the light sensor (the photoelectric conversion element array 112) of the apparatus 110 with light having the amount of light corresponding to the code indicating the converted variation pattern. More specifically, the information device 200 temporally changes the amount of light of the backlight that supplies light to the liquid crystal display on the lower side of the touch panel according to the converted variation pattern. The information device 200 may temporally change the operating current value of the light emitting diode which is the light source of the backlight. The apparatus 110 can receive light from the information device 200 and start the processing shown in FIG. 62.

Effect of the First Embodiment

The apparatus 110 and the apparatus 110A of the first embodiment can acquire input information of a predetermined format based on a change in the amount of light of the light received from the information device 200. In addition, the apparatus 110 and the apparatus 110A generate a physical quantity change due to switching between ON/OFF of each SW115 in a state where a finger comes into contact with the conductive pad 114 or the transparent conductive film 114A. By allowing the information device 200 to detect a change in this physical quantity, the apparatus 110 and the apparatus 110A can output the output information of a predetermined format to the information device 200. Note that in the first embodiment, the physical quantity change is a change in electrostatic capacitance between the apparatus 110 and each element 111 detected by the touch panel of the information device 200. The change in the electrostatic capacitance is detected together with the coordinates of the touch panel of the information device 200. In addition, the apparatus 110 shown in FIG. 58 can make a stable supply of power by being provided with the battery 122.

Modification Example of the First Embodiment

In the first embodiment, each hardware circuit and the like of the devices 110 and 110A is driven by receiving supply of electric energy from the battery 122. However, the power supply of the devices 110 and 110A is not restricted to the battery 122. That is, in the modification of the first embodiment, each hardware circuit or the like is driven by being supplied with electric energy generated from external energy. Methods for converting external energy into electric energy include, for example, photoelectric conversion, electromagnetic wave conversion, piezoelectric conversion, and thermoelectric conversion. Among the above, regarding external energy generated from the information device 200, it can be supplied to the apparatus 110 by controlling the activation of various wireless apparatuses such as a Wi-Fi, a Bluetooth, or the like installed in the information device 200 and electromagnetic wave energy which is output with the computer program running on the information device 200.

<<Photoelectric Conversion>>

Figure 64:
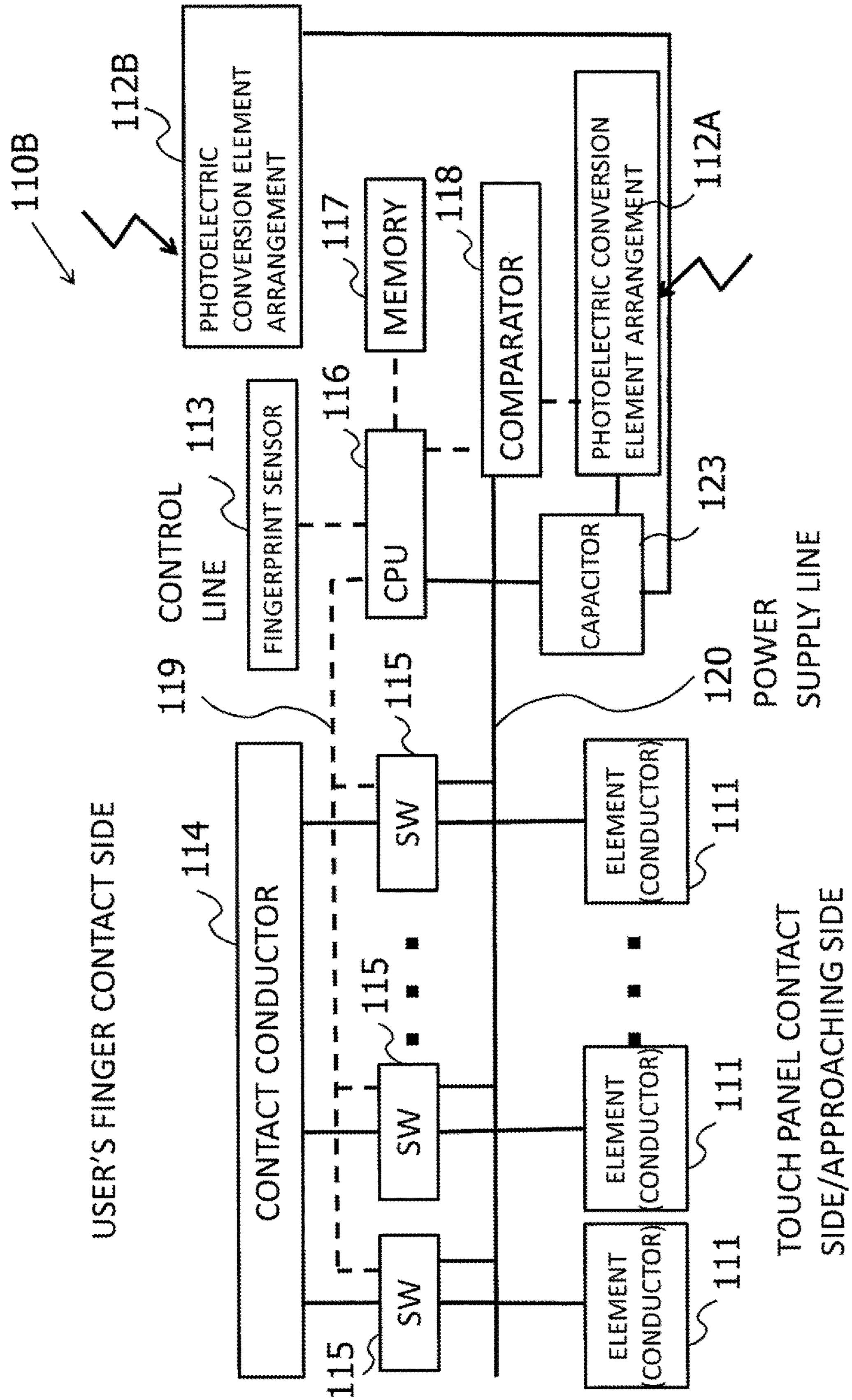
FIG. 64 is a schematic diagram showing an example of the internal configuration of an apparatus that receives power supply by photoelectric conversion.

FIG. 64 is a schematic diagram showing an example of an internal configuration of the apparatus 110B that receives power supply by photoelectric conversion. The same components as those in FIG. 58 are denoted by the same reference numerals, and descriptions thereof are omitted.

The apparatus 110B includes a fingerprint sensor 113, a contact conductor 114, and a photoelectric conversion element array 112B on the front side (the side on which the user's finger makes contact or comes into proximity). However, instead of the fingerprint sensor 113 and the contact conductor 114, the apparatus 110B may be provided with a fingerprint sensor 113A and a transparent conductive film 114A on the front side as in the apparatus 110A in FIG. 59. Furthermore, the apparatus 110B includes one or more elements 111 and a photoelectric conversion element array 112A on the back side (the side on which the touch panel makes contact or comes into proximity). Since the photoelectric conversion element array 112A and the photoelectric conversion element array 112B are the same as the photoelectric conversion element array 112 shown in FIG. 58, descriptions thereof are omitted.

Furthermore, the apparatus 110B includes at least one SW115, a CPU 116, a memory 117, a comparator 118, and a capacitor 123. Each component of the apparatus 110B is connected to the CPU 116 by a control line 119. In addition, each component of the apparatus 110B is supplied with electric power energy via the power supply line 120. The capacitor 123 stores and discharges electric energy generated in the photoelectric conversion element array 112A and the photoelectric conversion element array 112B. For example, even when the energy the photoelectric conversion element array 112A receives from the touch panel is insufficient, the photoelectric conversion element array 112B can supply sufficient electric power to the apparatus 110 by receiving external light, light such as from lighting appliances and the like. That is, the electric power provided by the photoelectric conversion element array 112B can shorten the activation time of the CPU 116 and the like, and increase the driving speed of SW115 and the like. The photoelectric conversion element array 112A and the photoelectric conversion element array 112B constitute examples of an "electric power supply circuit" and a "photoelectric conversion unit," respectively. The photoelectric conversion element is a photodiode, a phototransistor, or the like having a structure in which a p-type semiconductor and an n-type semiconductor are bonded, and has a structure similar to that of a solar cell element. The capacitor 123, the photoelectric conversion element array 112A, and the photoelectric conversion element array 112B constitute an example of an electric power supply circuit. The photoelectric conversion element array 112A and the photoelectric conversion element array 112B constitute an example of a photoelectric conversion unit that receives light and generate electric energy.

<<Electromagnetic Wave>>

Figure 65:
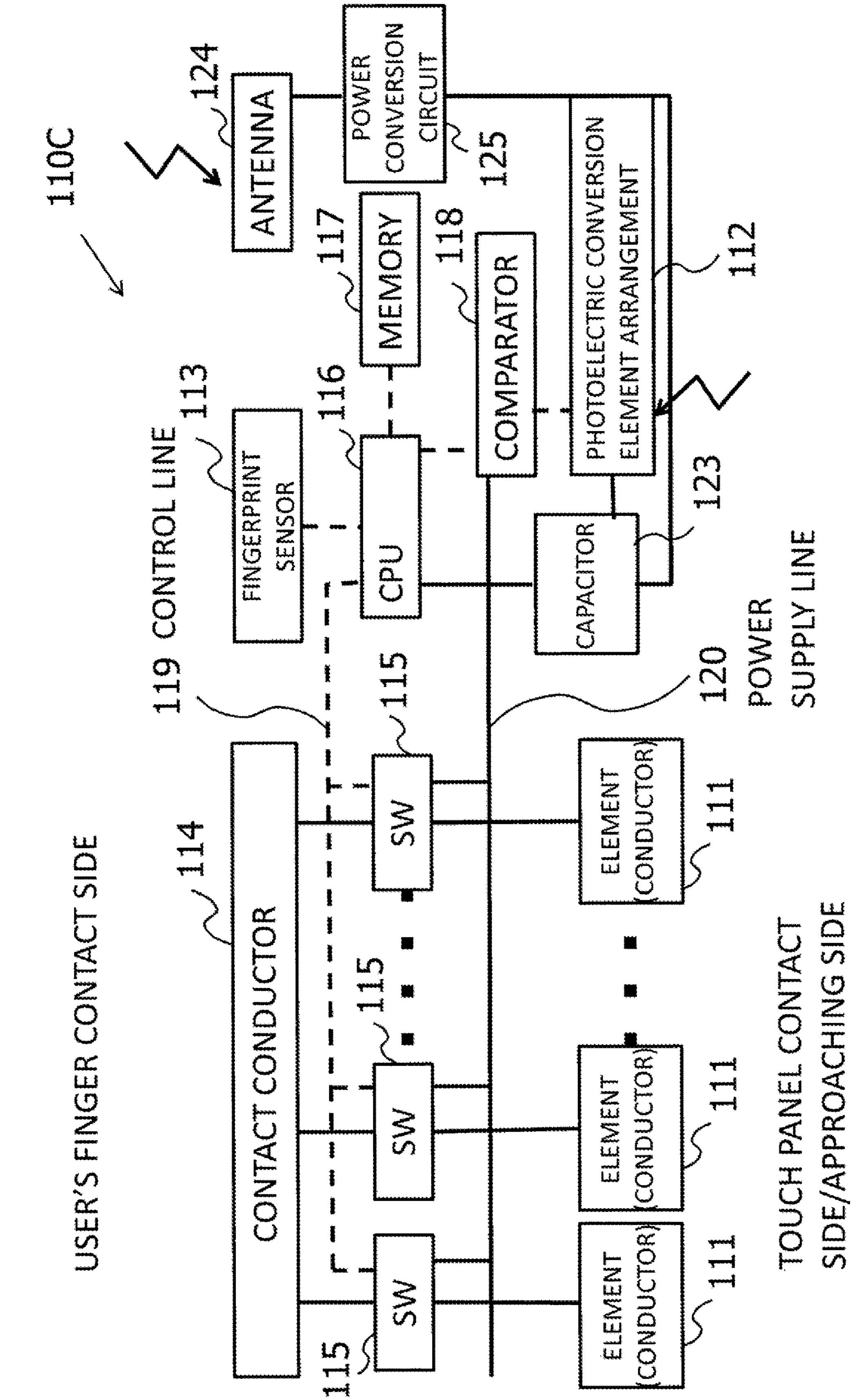
FIG. 65 is a schematic diagram showing an example of the internal configuration of an apparatus that receives power supply by electromagnetic waves.

FIG. 65 is a schematic diagram showing an example of an internal configuration of an apparatus 110C receiving electric power supply by electromagnetic waves. The same components as those in FIGS. 58, 60, and 64 are denoted by the same reference numerals, and descriptions thereof are omitted.

The apparatus 110C includes a fingerprint sensor 113, a contact conductor 114, and an antenna 124 on the front side (the side on which the user's finger makes contact or comes into proximity). The antenna 124 receives electromagnetic waves from the information device. However, instead of the fingerprint sensor 113 and the contact conductor 114, the apparatus 110B may be provided with a fingerprint sensor 113A and a transparent conductive film 114A on the front side as with the apparatus 110A in FIG. 59. The configuration of the back side of the apparatus 110C (the side on which the touch panel makes contact or comes into proximity) is the same as that in FIG. 58, and thus descriptions thereof are omitted.

Furthermore, the apparatus 110C includes at least one SW115, a CPU 116, a memory 117, a comparator 118, a capacitor 123, and an electric power conversion circuit 125. Each component of the apparatus 110C is connected to the CPU 116 by a control line 119. In addition, each component of the apparatus 110C is supplied with electric power energy via the power supply line 120. The antenna 124 generates an electromotive force from an incoming electromagnetic wave, for example, an electromagnetic wave from a wireless LAN unit of the information device 200. The electric power conversion circuit 125 charges the capacitor 123 by the electromotive force generated by electromagnetic induction in the antenna 124. The capacitor 123 supplies electric energy charged by the photoelectric conversion element array 112 and the electric power conversion circuit 125 to each part of the apparatus 110C. The antenna 124 and the electric power conversion circuit 125 constitute an example of an "electric power conversion unit." The photoelectric conversion element array 112, the electric power conversion circuit 125, and the capacitor 123 constitute an example of a "electric power supply circuit."

<<Piezoelectric Conversion>>

Figure 66:
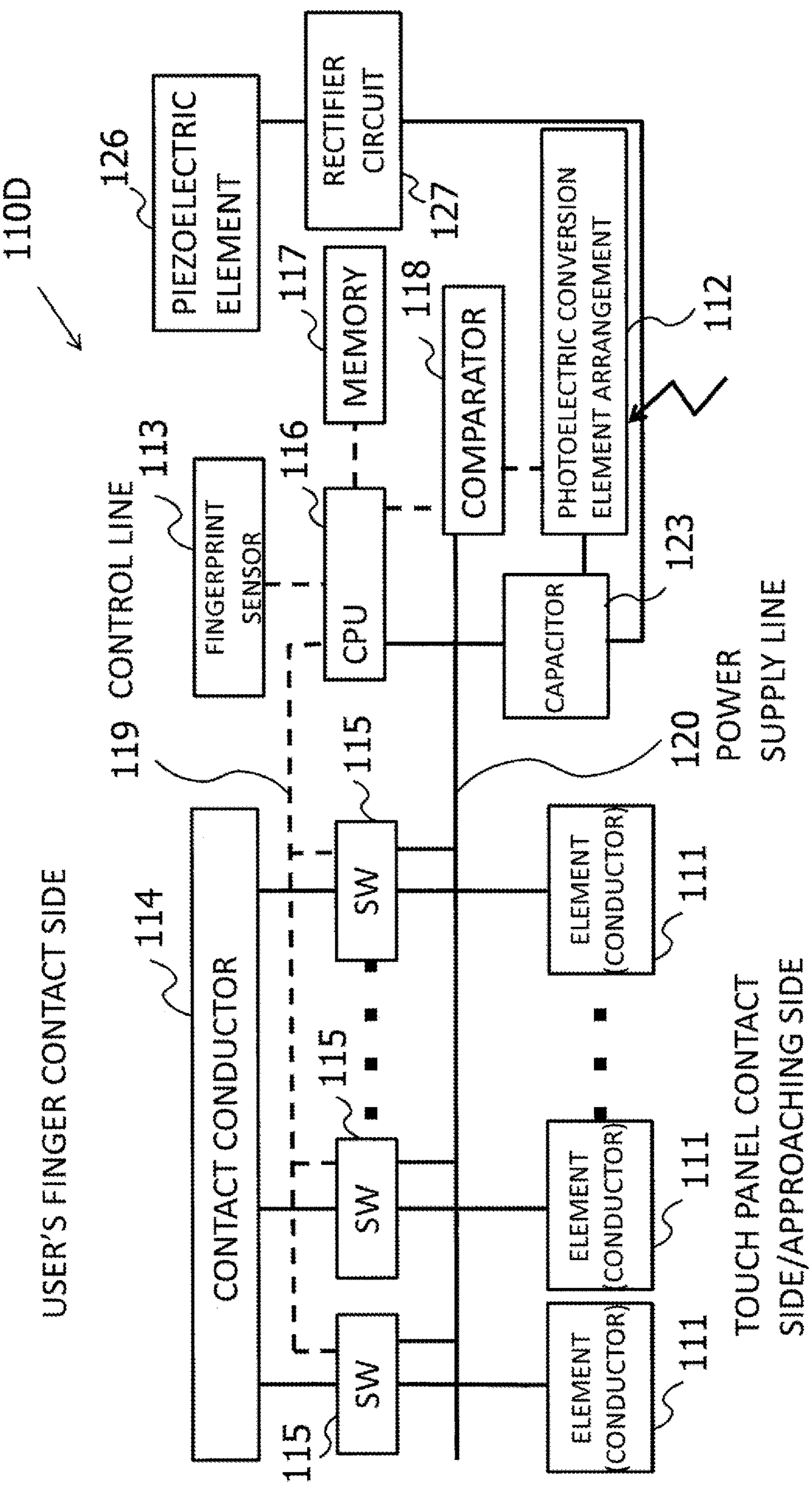
FIG. 66 is a schematic diagram showing an example of the internal configuration of an apparatus that receives power supply by piezoelectric conversion.

FIG. 66 is a schematic diagram showing an example of an internal configuration of a apparatus 110D which receives electric power supply by piezoelectric conversion. The same components as those in FIG. 58 are denoted by the same reference numerals, and descriptions thereof are omitted.

The apparatus 110D includes a fingerprint sensor 113, a contact conductor 114, and a piezoelectric element 126 on the front side (the side on which the user's finger makes contact or comes into proximity). However, instead of the fingerprint sensor 113 and the contact conductor 114, the apparatus 110B may be provided with a fingerprint sensor 113A and a transparent conductive film 114A on the front side as with the apparatus 110A in FIG. 59. The piezoelectric element 126 converts pressure generated by the pressing of the apparatus 110D, the bending of the card type apparatus 110D, and the like into electric energy. The piezoelectric element 126 is formed with, for example, a member such as a piezoelectric ceramic, piezo film, or the like. When a member such as a piezoelectric ceramic, a piezo film, or the like is pressurized, electric charge is generated in the material, and an AC voltage is generated between the upper and lower surfaces. The generated AC voltage is sent to the rectification circuit 127. The configuration of the back side of the apparatus 110D (the side on which the touch panel makes contact or comes into proximity) is the same as that in FIG. 58, and thus, descriptions thereof are omitted.

Furthermore, the apparatus 110 D includes at least one SW115, a CPU 116, a memory 117, a comparator 118, a capacitor 123, and a rectification circuit 127. Each component of the apparatus 110D is connected to the CPU 116 by a control line 119. Furthermore, each component of the apparatus 110D is supplied with electric power energy via the power supply line 120.

The rectification circuit 127 converts the AC voltage generated by the piezoelectric element 126 into a DC voltage and outputs a DC current to the capacitor 123. The capacitor 123 stores the DC output by the rectification circuit 127.

Note that, when sufficient electric power is obtained by one pressurization of the piezoelectric element 126, the apparatus 110D does not necessarily require the rectification circuit 127. For example, it is sufficient to accumulate electric power in the capacitor 123 acquired by one piezoelectric pressurization and to supply electric power to each component of the apparatus 110D. The piezoelectric element 126 constitutes an example of a "piezoelectric transducer." The piezoelectric element 126, the rectification circuit 127, and the capacitor 123 constitute an example of an electric power supply circuit.

<<Thermoelectric Conversion>>

Figure 67A:
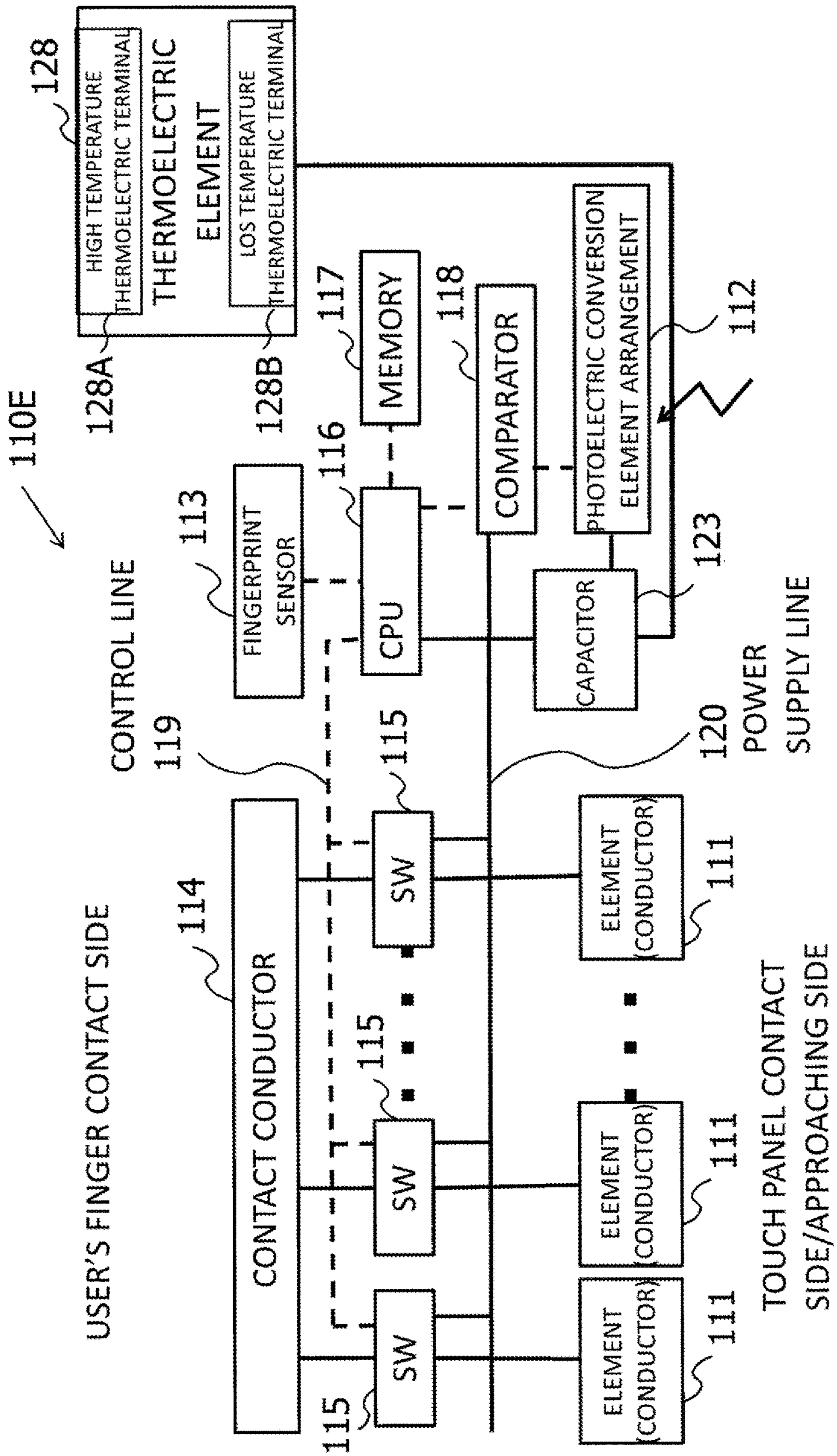
FIG. 67A is a schematic diagram showing an example of the internal configuration of an apparatus that receives power supply by thermoelectric conversion.

FIG. 67A is a schematic diagram showing an example of an internal configuration of a apparatus 110E that receives electric power supply by thermoelectric conversion. The same components as those in FIG. 58 are denoted by the same reference numerals, and thus descriptions thereof are omitted.

The apparatus 110E includes a fingerprint sensor 113, a contact conductor 114, and a thermoelectric element 128 on the front side (the side on which the user's finger makes contact or comes into proximity). The thermoelectric element 128 converts the heat of a part of the human body such as a finger or the like touching the touch panel of the information device into electric energy. The thermoelectric element 128 is, for example, a Seebeck element, and when a temperature difference is applied between the high temperature thermoelectric terminal 128A and the low temperature thermoelectric terminal 128 B provided at both ends, voltage is generated. When a finger comes into contact with the high temperature thermoelectric terminal 128A of the thermoelectric element 128, a temperature difference results between the high temperature thermoelectric terminal 128A and the low temperature thermoelectric terminal 128B indicating room temperature. Due to this temperature difference, the thermoelectric element 128 can generate electric power energy for driving the hardware circuit. The configuration of the back side of the apparatus 110E (the side on which the touch panel makes contact or comes into proximity) is the same as that in FIG. 58, and thus descriptions are omitted.

Furthermore, the apparatus 110E includes at least one SW115, a CPU 116, a memory 117, a comparator 118, and a capacitor 123. The capacitor 123 stores electric energy resulting from the voltage generated by the thermoelectric element 128. Each component of the apparatus 110E is connected to the CPU 116 by a control line 119. In addition, each component of the apparatus 110E is supplied with electric power energy via the power supply line 120. The thermoelectric element 128 constitutes an example of a "thermoelectric conversion unit". The high temperature thermoelectric terminal 128A and the low temperature thermoelectric terminal 128B constitute examples of a "first thermoelectric terminal" and a "second thermoelectric terminal," respectively. The thermoelectric element 128 and the capacitor 123 constitute an example of an "electric power supply circuit".

Advantageous Effect of the Modification of the First Embodiment

Since the apparatuses 110B to 110E shown in FIGS. 64 to 67 A are operated while generating electricity by converting external energy into electric energy, a battery or a rechargeable battery may not have to be provided.

The apparatus 110 in FIG. 64 includes two photoelectric conversion element arrays 112A and 112B. The photoelectric conversion element array 112A receives light from the screen of the information device 200 and generates electric energy. When the electric energy generated by the photoelectric conversion element array 112A is insufficient, the apparatus 110B can receive external light from the photoelectric conversion element array 112B and generate electric energy. Furthermore, when receiving information from the information device 200 via the photoelectric conversion element array 112 A, the apparatus 110B may receive electric power supply by electric energy due to external light or the like received from the photoelectric conversion element array 112B.

Even when the apparatus 110C in FIG. 65 is in an uncontacted state with the information device 200, it can receive electric power supply by converting the electromagnetic wave received from the information device 200 into electric energy. The apparatus 110D of FIG. 66 can receive electric power supply by converting external pressure obtained by a simple operation such as pressing with a finger into electric energy. The apparatus 110E of FIG. 67A can receive electric power supply by converting heat obtained by a simple operation such as a touch by a finger to electric energy.

Second Embodiment

In the second embodiment, the configuration and functions of the apparatus 110 are the same as those of the apparatus 110 to the apparatus 11E described in FIGS. 57 to 67A. The device configuration in the second embodiment is the same as that in the first embodiment, and thus descriptions thereof are omitted. However, in the embodiment, the apparatus 110 holds identification information for distinguishing from other devices. Identification information for distinguishing from other devices may be stored in the memory 117 (rewritable nonvolatile memory, ROM, or the like). The apparatus 110 transmits identification information to the information device 200 in the form of a pattern code (see FIGS. 61B and 61C). The information device 200 can execute the authentication processing for authenticating the apparatus 110 by using the identification information received in the form of the pattern code from the apparatus 110. The memory 117 (rewritable nonvolatile memory, ROM, or the like) constitutes an example of an identification information storage unit that stores identification information for identifying an apparatus from other apparatuses.

Therefore, the apparatus 110 may be used in the place of a credit card, a cash card, a point card or the like. When the apparatus 110 is used as a credit card, a cash card, a point card or the like, the apparatus 110 can transmit information in the form of a pattern code to the information device 200 by a change in a physical quantity such as a change in electrostatic capacity between the apparatus 110 and the touch panel of the information device 200. Therefore, the information device 200 is able to read a card number in the apparatus 110 from the touch panel of the information device 200 without the mediation of a contact type electrical interface or a magnetic reading interface provided in a conventional credit card, a cash card, a point card, or the like.

For example, the information device 200 may enable the apparatus 110 to start communication with the information device 200 by transmitting a trigger to the apparatus 110 with the transmission of input information to the apparatus 110 by the change in the amount of light of the touch panel. In addition, the information device 200 may make the photoelectric conversion element array 112 of the apparatus 110 receive light of the touch panel, and may enable the apparatus 110 to start communication with the information device 200 by transmitting a trigger to the apparatus 110 with the start of electric power supply. Furthermore, when the fingerprint sensors 113, 113A, and the like succeed in fingerprint authentication, the apparatus 110 may transmit a trigger to the information device 200 using a pattern code and may start communication between the apparatus 110 and the information device 200.

[First Modification of the Second Embodiment]

In the first modification of the second embodiment, the apparatus 110 generates encrypted information based on common time and identification information with the information device 200, and outputs the information to the information device 200. In addition to the apparatus configuration of the first embodiment, the apparatus 110 includes a clock signal generating unit and a counting circuit. Furthermore, the apparatus 110 includes a battery for operating the clock signal generating unit and the counting circuit.

The clock signal generating unit (not shown) generates a clock signal with a predetermined clock cycle from a predetermined time in order to acquire common time with the information device 200. The counting circuit (not shown) counts the current time based on the clock signal generated by the clock signal generating unit. The apparatus 110 generates encrypted information (one-time password) based on the counted time and the identification information. The apparatus 110 outputs the generated encrypted information to the information device 200. The information device 200 generates encrypted information based on the current time and the identification information of the apparatus 110 stored in the information device 200, and authenticates the apparatus 110 if the stored information matches the encrypted information received from the apparatus 110.

The apparatus 110 may include an antenna for detecting a counting circuit correction signal for correcting the time counted by the counting circuit. For example, the CPU 116 may receive a standard wave in which the standard time based on the cesium atomic clock is digitized from the antenna. The above standard time may be the time distributed via a public connection line. The CPU 116 converts the received standard wave signal into time, and by comparison with the time counted by the counting circuit, the counted time is corrected. The CPU 116 constitutes an example of a correction circuit. The antenna constitutes an example of a detection circuit. In addition, the time may be corrected by having the apparatus 110 receive the standard time or the current time of the information device from the information device 200 by communication based on the change in the amount of light of the touch panel.

[Processing Flow]

Figure 67B:
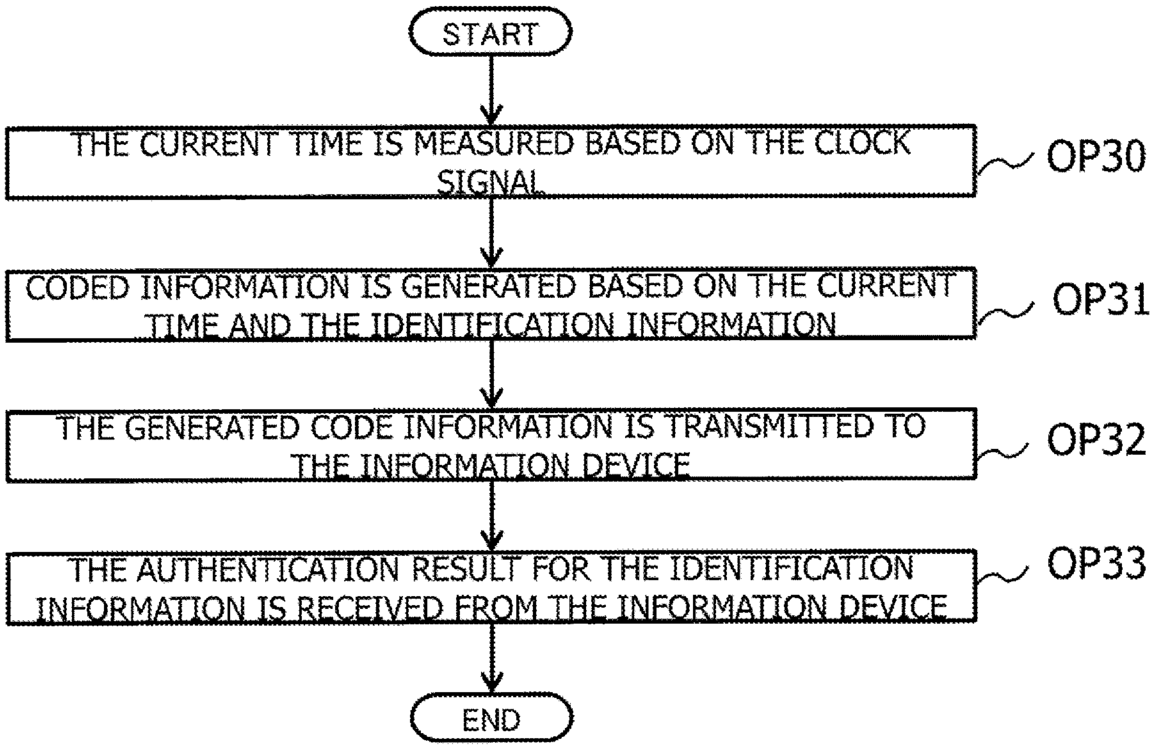
FIG. 67B is a flowchart of a processing example of the transmission of identification information encrypted by the time.

FIG. 67B is a flowchart of an example of a processing of a transmission of identification information encrypted with time. The processing of FIG. 67B is started, for example, by the reception of a transmission request of identification information by the information device 200.

In OP30, the CPU 116 counts the current time based on the clock signal generated by the clock signal generating unit. The current time may be time information including the year, the month, the day, the hour, the minute, the second, and the millisecond, which is based on the count value of 0 of, for example, a reference time point of the past (12 am, Jan. 1, 1970). Note that, the counted current time may be the time corrected by the correction circuit. In OP31, the CPU 116 generates encrypting information based on the current time and the identification information stored in the memory 117. Alternatively, the current time may be set with time-divided time determined by time-dividing elapsed time at predetermined time intervals. That is, the resolution of time is set as the predetermined time interval. By doing so, the information device 200 and the apparatus 110 may synchronize the time so that there is no error within this resolution.

In OP32, the CPU 116 transmits the generated encrypted information to the information device 200. The information device 200 decrypts the encrypted information using the current time of the same format as that of the apparatus 111 (for example, a time information format including the year, the month, the day, the hour, the minute, the second, and the millisecond), performs authentication processing of the identification information transmitted from the apparatus 110, and transmits the authentication result to the apparatus 110. In OP33, the apparatus 110 receives the authentication result from the information device 200, and the processing of identification information transmission ends.

Second Modification of the Second Embodiment

In the second modification of the second embodiment, the information device 200 changes the temporary encryption key, for example, by converting a random number into a change in the amount of light of the touch panel, a change in the hue, or a change in the amount of light for each hue, and transmits it to the apparatus 110 as input information. The CPU 116 of the apparatus 110 outputs input information obtained based on a change in the incoming amount of external energy such as light or the like from the information device 200 and encrypted information generated based on identification information to the information device 200. The information device 200 decrypts the encrypted information with the temporary encryption key already transmitted to the apparatus 110. Using such a procedure, it is possible to transmit the identification information of the apparatus 110 from the apparatus 110 to the information device 200 with enhanced security for encryption communication of the shared key system. The CPU 116 constitutes an example of an encrypted information generating circuit that generates encrypted information based on input information. Note that the encryption method between the information device 200 and the apparatus 110 is not restricted to the key sharing system.

[Processing Flow]

Figure 67C:
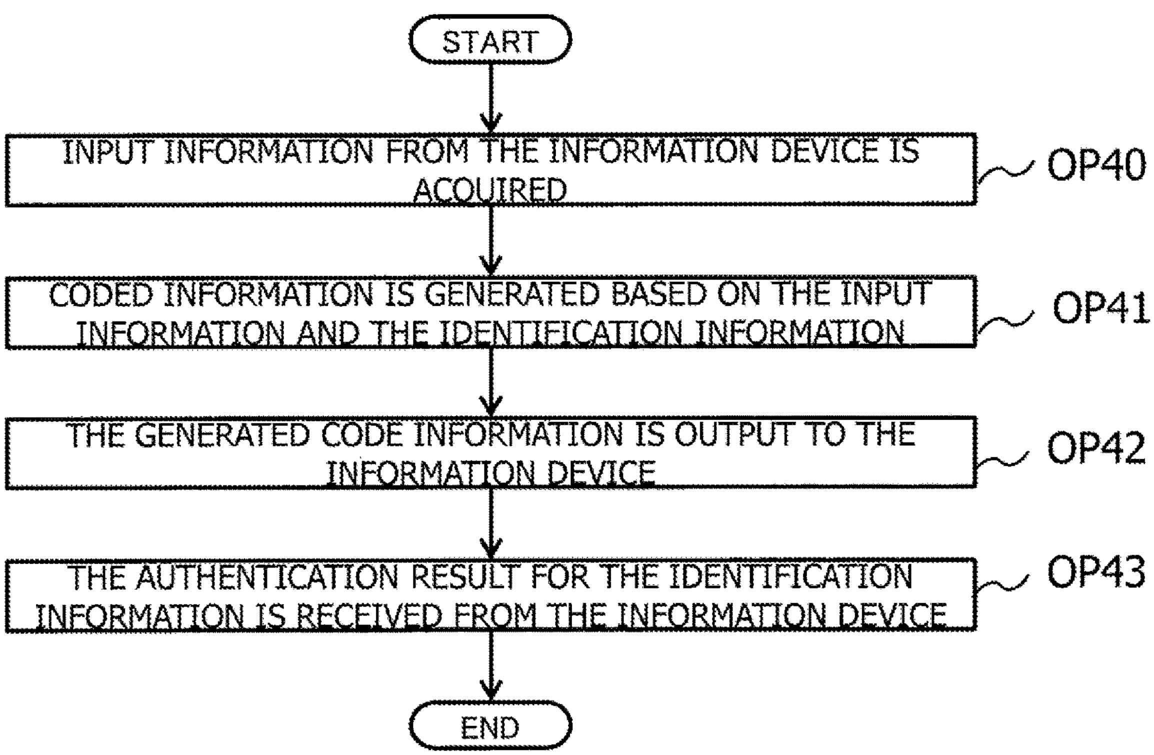
FIG. 67C is a flowchart of a processing example of the transmission of identification information encrypted by input information from an information device.

FIG. 67C is a flowchart of an example of a processing of a transmission of identification information encrypted by input information from the information device 200. The processing of FIG. 67C is started, for example, by the reception of input information from the information device 200.

In OP 40, the CPU 116 acquires input information from the information device 200 via the photoelectric conversion element array 112 or the like. The input information is, for example, a temporary value such as a random number generated by the information device 200, and is used as an encryption key. Note that in the information device 200, the generated random numbers and the like are stored in the memory or the like as input information to the apparatus 110. In OP 41, the CPU 116 generates encrypting information based on the acquired input information and the identification information stored in the memory 117.

In OP 42, the CPU 116 transmits the generated encrypted information to the information device 200. The information device 200 reads the input information already transmitted to the apparatus 110 from the memory or the like, decrypts the encrypted information, executes authentication processing of the identification information transmitted from the apparatus 110, and transmits the authentication result to the apparatus 110. In OP 43, the apparatus 110 receives the authentication result from the information device 200, and the processing of identification information transmission ends. Note that OP43 may be omitted by having the information device 200 display the authentication result or the like. Furthermore, when the identification information is, for example, a credit card number, a cash card number, a point card number, or the like, the information device 200 may acquire identification information by reading the input information already transmitted to the apparatus 110 from the memory or the like and decrypting the encrypted information.

Advantageous Effect of the Second Embodiment

In the first modification of the second embodiment, the apparatus 110 transmits encrypted information based on common time with the information device 200 and identification information to the information device 200. As a result, the security of the authentication processing of the information device 200 is improved.

In the second modification of the second embodiment, the apparatus 110 converts external energy such as light or electromagnetic waves from the screen of the information device 200 into electric energy, and acquires input information in a predetermined format based on a change in the amount of incoming external energy. The apparatus 110 transmits encrypted information based on the acquired input information and identification information to the information device 200. By transmitting output information linked with the input information obtained from the information device 200 to the information device 200, the security of authentication processing of the information device 200 is improved.

Third Embodiment

Figure 68A:
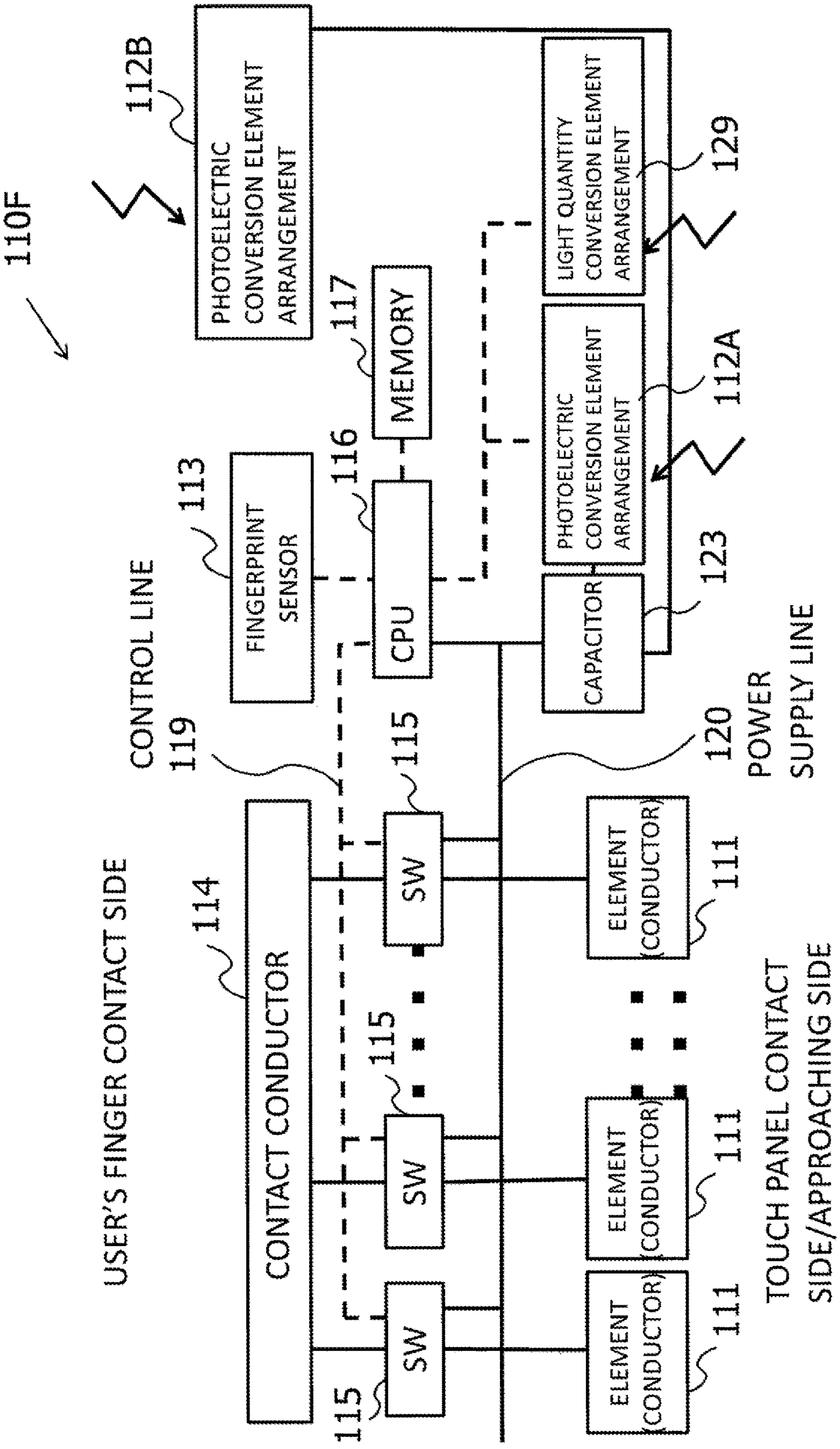
FIG. 68A is a schematic diagram showing an example of the internal configuration of an apparatus that acquires input information based on the change in the amount of incoming light of a plurality of colors.

In the third embodiment, the apparatus 110 acquires input information of a predetermined format based on a change in the incoming amount (amount of light) of light of a plurality of colors. FIG. 68A is a schematic diagram showing an example of the internal configuration of an apparatus 110F that acquires input information based on changes in the incoming amount of light of a plurality of colors. Constituent elements identical to those in FIGS. 58, 60, 64 to 67A are denoted by the same reference numerals, and descriptions thereof are omitted.

The configuration of the front side (the side on which the user's finger makes contact or comes into proximity) of the apparatus 110F is the same as that in FIG. 64, and thus descriptions thereof are omitted. However, instead of the fingerprint sensor 113 and the conductive pad 114 in FIG. 64, a fingerprint sensor 113A and a transparent conductive film 114A may be used as shown in FIG. 60. Furthermore, the apparatus 110F includes at least one element 111, a photoelectric conversion element array 112A, and a light quantity measurement element array 129 including at least one light quantity measurement element on the back side (the side on which the touch panel makes contact or comes into proximity). The light quantity measuring element of the light quantity measuring element array 129 is, for example, a photodiode, a phototransistor, or the like having a PN junction.

Furthermore, the apparatus 110F includes at least one SW115, a CPU 116, a ROM 117, and a capacitor 123. Each component of the apparatus 110F is connected to the CPU 116 through a control line 119. In addition, each component of the apparatus 110F is supplied with electric power energy via the power supply line 120.

The light quantity measuring element array 129 may measure the light color, that is, the light quantity for each wavelength by combining the light quantity measuring element array 129 and a color filter. The CPU 116 may acquire input information in a predetermined format based on a change in the amount of light for each color of light with respect to light of a plurality of colors received from the information device 200. However, when the apparatus 110F does not measure the color of light, that is, the light quantity for each wavelength, a single light quantity measuring element (a photodiode, a phototransistor, or the like) may be used instead of the light quantity measuring element array 129. The light quantity measuring element array 129 constitutes an example of a "light receiving unit." The light quantity measuring element array 129 or a single light quantity measuring element (a photodiode, a phototransistor, or the like) constitutes an example of an incoming amount detecting unit for detecting the incoming amount of external energy incoming from the exterior.

Advantageous Effect of the Third Embodiment

The apparatus 110F obtains input information in a predetermined format based on a change in light quantity for each color of light with respect to light of a plurality of colors received from the information device 200. By detecting the change in the amount of light for each color of light, the apparatus 110F can receive more information at one time than when using a single light quantity measuring element. On the other hand, when a single light quantity measuring element is used, the apparatus 110F can acquire input information from the information device 200 with a simple structure.

Fourth Embodiment

In the fourth embodiment, the apparatus 110 acquires input information in a predetermined format based on an image read from a display device of an information device 200 by a fingerprint detection image sensor 113A exemplified in FIG. 60. The configuration of the apparatus 110 in the fourth embodiment is the same as the device configuration in the first embodiment, and thus descriptions are omitted. The image read by the apparatus 110 from the display device of the information device may be, for example, a dot pattern including a plurality of dots having a diameter of less than 0.5 mm formed on the display surface, a bar code, a two-dimensional bar code, or the like. Note that if the fingerprint sensor 113 has sufficient accuracy, dots of about 0.05 to 0.2 mm in diameter may also be recognized.

Advantageous Effect of the Fourth Embodiment

Since the apparatus 110 acquires input information in a predetermined format based on an image or a dot pattern read from the information device 200, it is possible to realize transmission and reception of highly secured information.

Fifth Embodiment

In the fifth embodiment, the apparatus 110 detects from the fingerprint sensor 113 a pattern due to of at least a part of the human body, for example, a fingerprint. The fingerprint sensor 113 detects concaves and convexes of at least a part of the human body based on electrostatic capacitance between a surface for detecting concaves and convexes also referred to as a detection surface and a detection target. The configuration of the apparatus 110 in the fifth embodiment is the same as the device configuration in the first embodiment, and thus descriptions thereof are omitted. When a detected pattern such as a fingerprint or the like is authenticated by the apparatus 110, transmission and reception of information with the information device 200 is initiated.

Modification Example of the Fifth Embodiment

When the fingerprint sensor 113 detects a dot pattern including a plurality of dots having a diameter of less than 0.5 mm formed on a medium surface of the target to be read in addition to at least a part of the surface of a human body, and the detected dot pattern is authenticated by the apparatus 110, transmission and reception of information with the information device 200 may be started. Note that if the fingerprint sensor 113 has sufficient accuracy, dots of about 0.05 to 0.2 mm in diameter may also be recognized.

<<Image Sensor>>

The fingerprint sensor 113 may be an image sensor such as a CCD, a CMOS, or the like. When at least a part of the surface of the human body comes into proximity with the detection surface, the fingerprint sensor 113 may acquire an image of concaves and convexes of at least a part of the human body. Furthermore, the fingerprint sensor 113 may detect the shape of the dot pattern when a medium on which a dot pattern including a plurality of dots formed of a material that can be distinguished from the medium by the reflection of light comes into proximity with the detection surface.

The fingerprint sensor 113 may be a backlight type sensor including a light guiding medium and a light receiving element. The fingerprint sensor 113 emits light from the light guide medium to the target medium to be read. The fingerprint sensor 113 can detect a fingerprint or a dot pattern with a light receiving element by receiving the reflected light reflected by the medium. Note that in the present embodiment, the image sensor 160 described in detail in the ninth and the tenth embodiments may be applied as the fingerprint sensor 113.

<<Electrostatic Capacitance Sensor>>

The fingerprint sensor 113 may be an electrostatic capacitance sensor. In the case where at least a part of the surface of the human body comes into proximity with the detection surface, the fingerprint sensor 113 can detect concaves and convexes by measuring the electrostatic capacitance between the detection surface, and concaves and convexes of a part of the surface of the human body. In addition, in the case where a non-conductive medium having a dot pattern including a plurality of dots formed of a conductive material comes into proximity with the fingerprint sensor 113, by measuring the electrostatic capacitance between the dot and the sensor, the shape of the dot pattern may be detected.

[Processing Flow]

Figure 68B:
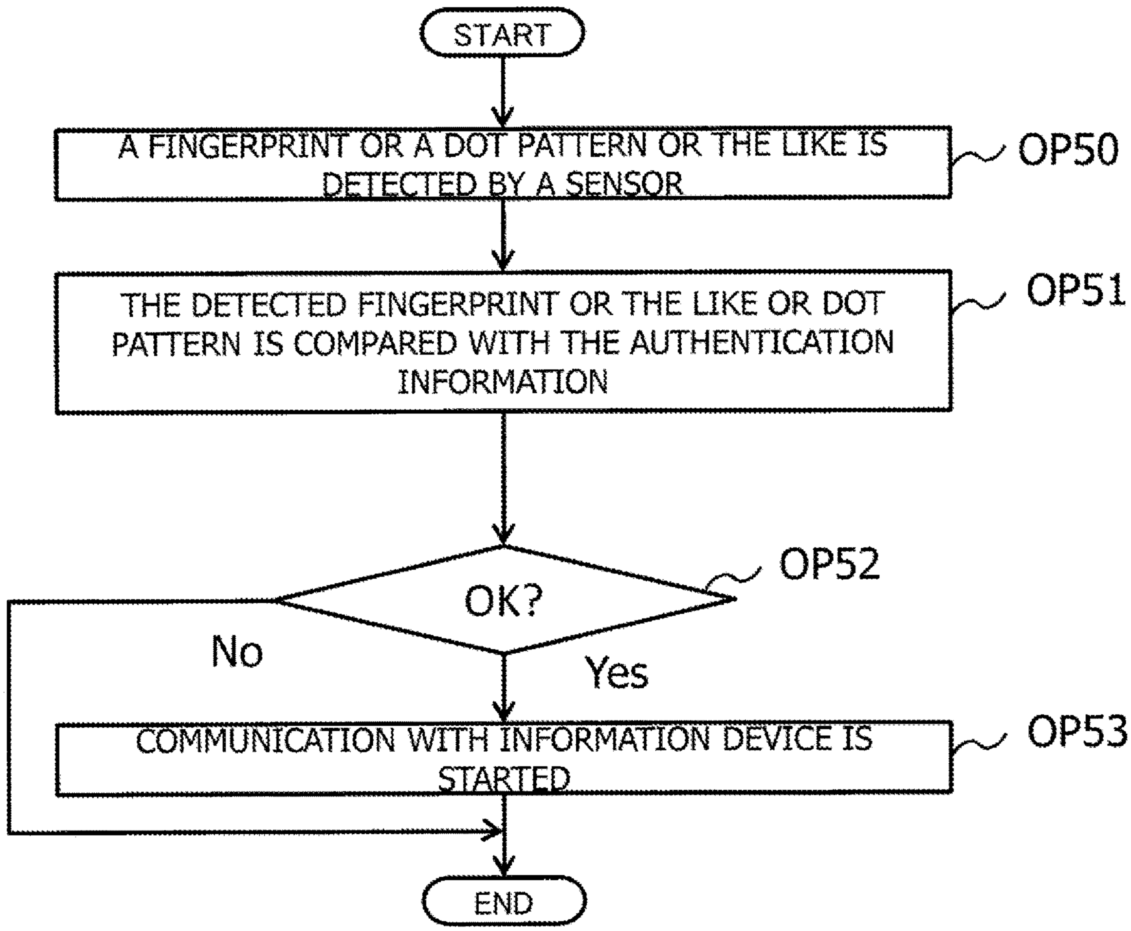
FIG. 68B is a flowchart of an example of processing for starting communication with an information device based on detection information.

FIG. 68B is a flowchart of an example of processing for starting communication with the information device 200 based on detection information. Detection information is information such as an image of a detection target detected by the fingerprint sensor 113. The processing in FIG. 68B is started, for example, when a fingerprint, a dot pattern, or the like of the detection target comes into proximity with the detection surface.

In OP50, the CPU 116 detects a detection target such as a fingerprint or a dot pattern by the fingerprint sensor 113. In OP51, the CPU 116 compares the detection target with the authentication information stored in the memory 117 or the like. The authentication information is, for example, a fingerprint of an owner of an apparatus 110 registered in advance, a dot pattern indicating an identifier of the apparatus 110 formed on a medium such as a card or a seal requiring authentication, or the like. When a two-dimensional code such as a dot pattern formed on a printed matter corresponding to the content is read, a pattern code corresponding to the two-dimensional code may be output to the information device 200 and may be used for acquiring contents, operating the information device 200, and the like.

In OP52, the CPU 116 determines whether or not the detection target is authenticated. When the detection target is authenticated (OP52: Yes), the processing proceeds to OP 53. When the detection target is not authenticated (OP52: No), the processing is terminated. In OP53, the CPU 116 starts communication with the information device 200.

Advantageous Effect of the Fifth Embodiment

The apparatus 110 starts the transmission and reception of information with the information device 200 by authenticating a fingerprint, or the like, or a dot pattern, detected by the fingerprint sensor 113. As a result, it is possible to authenticate the apparatus 110 with higher security.

Sixth Embodiment

In the sixth embodiment, the apparatus 110 includes a processing unit that executes information processing based on input information acquired from the information device 200. The configuration of the apparatus 110 in the sixth embodiment is the same as the device configuration in the first to the fifth embodiment, and thus descriptions thereof are omitted. The CPU 116 executes processing of the processing unit by a computer program. The processing of the processing unit or a part thereof may be executed by a hardware circuit.

[Processing Flow]

Figure 68C:
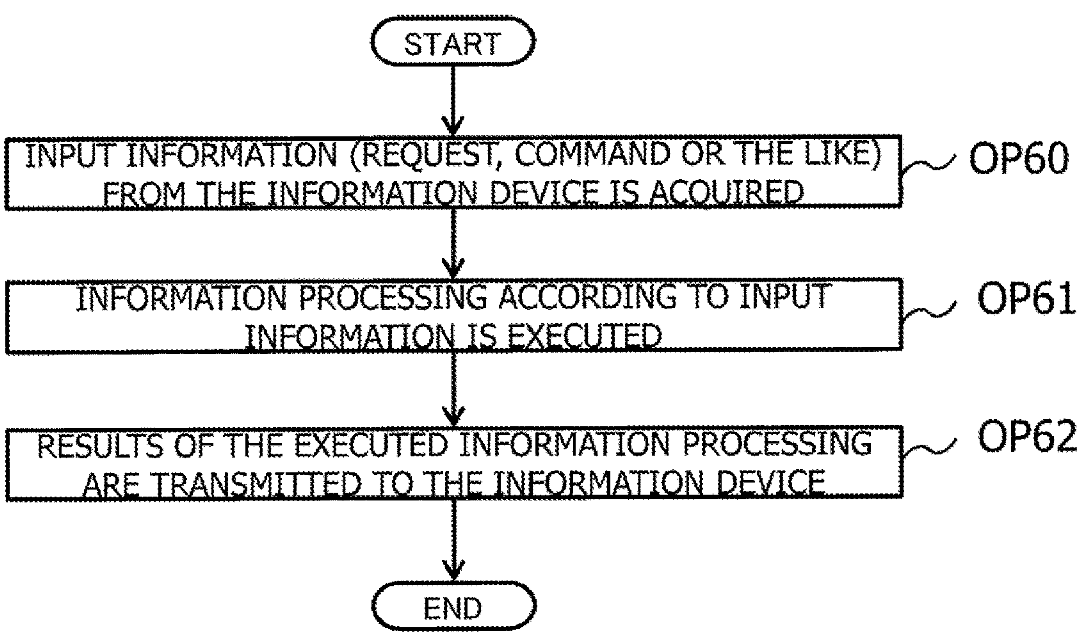
FIG. 68C is a flowchart of an example of the execution of processing in accordance with input information from an information device.

FIG. 68C is a flowchart of an example of the execution of processing in accordance with input information from the information device 200. The processing of FIG. 68C is started, for example, by receiving input information from the information device 200.

In OP60, the CPU 116 acquires input information received from the information device 200. The input information includes processing requests or commands from the information device 200. In OP61, the CPU 116 executes information processing in accordance with input information. Examples of information processing include the following cases.

For example, the case where the apparatus 110 is used as a credit card or a cash card is exemplified. Here, the input information is, for example, a numeric input request, and the information processing is, for example, a numeral transmission processing. For example, with respect to a transmission request (input information) for a credit card number or the like from a website on the Internet via a browser of the information device 200, the information device 200 may encrypt the transmission request (input information) of a credit card number in accordance with a temporal change in the quantity of light of the touch panel and transmit it to the apparatus 110. The apparatus 110 may encrypt the credit card number stored in the ROM or the like into a pattern code and have it transmitted from the element 111 or the like.

For example, when the information device 200 is a terminal, a mobile phone, or the like, having a touch panel, and a credit card number is entered at a website for internet shopping, the information device 200 may acquire the credit card number from the apparatus 110. In this case, the information device 200 may acquire the credit card number from the apparatus 110 based upon processing on the premise of successful authentication by the password input by the information device 200, or based upon processing on the premise of successful authentication by the fingerprint sensor 113 or the like.

Similarly, when the information device 200 is a terminal, a mobile phone or the like having a touch panel, and an account number for internet banking is input at a website for internet shopping, the information device 200 may acquire the account number from the apparatus 110. In this case, the information device 200 may acquire the account number from the apparatus 110 based upon processing on the premise of successful authentication by password input by the information device 200, or based upon processing on the premise of successful authentication by the fingerprint sensor 113 or the like Furthermore, a case where the apparatus 110 is used as an electronic money card is exemplified. Here, the input information is, for example, a payment request for an amount money to the electronic money card. The information device 200 may encrypt the payment request from an electronic money server in accordance with to a temporal change of the amount of light of the touch panel, a temporal change of the hue, or the temporal change of the amount of light of each hue, and transmit it to the apparatus 110. In accordance with a command (input information) from the apparatus 110, the apparatus 110 may rewrite an amount of electronic money in a rewritable nonvolatile memory or the like by subtracting the requested amount of money from the amount of electronic money stored in the rewritable nonvolatile memory or the like.

In OP 62, the CPU 116 transmits the result of an executed information processing to the information device 200, and the process of executing the processing according to the input information from the information device 200 ends.

Advantageous Effect of the Sixth Embodiment

The apparatus 110 executes processing based on input information acquired from the information device 200. Furthermore, the apparatus 110 outputs output information corresponding to the execution result to the information device 200. Thus, the apparatus 110 can realize the transmission and the reception of various kinds of information with the information device 200. The CPU 116 constitutes an example of a processing unit that executes information processing based on input information.

Seventh Embodiment

In the seventh embodiment, the apparatus 110 and the apparatuses 110A to 110F in the first to the sixth embodiments are realized as a card type apparatus. The configuration of the card type apparatus in the seventh embodiment is the same as that in each of the first to the sixth embodiments, except for the size of the card type apparatus, and thus, descriptions thereof are omitted. Even when the size of the back side of the card type apparatus is set to 85.60×53.98 mm, for example, defined by the ISO/JIS standard, a pattern code output apparatus, as shown in FIG. 61A, may be arranged.

Advantageous Effect of Seventh Embodiment

A card type apparatus is convenient to carry and it can be applied to various cards requiring secure transmission and reception of information with other information devices 200.

Eighth Embodiment

Figure 69A:
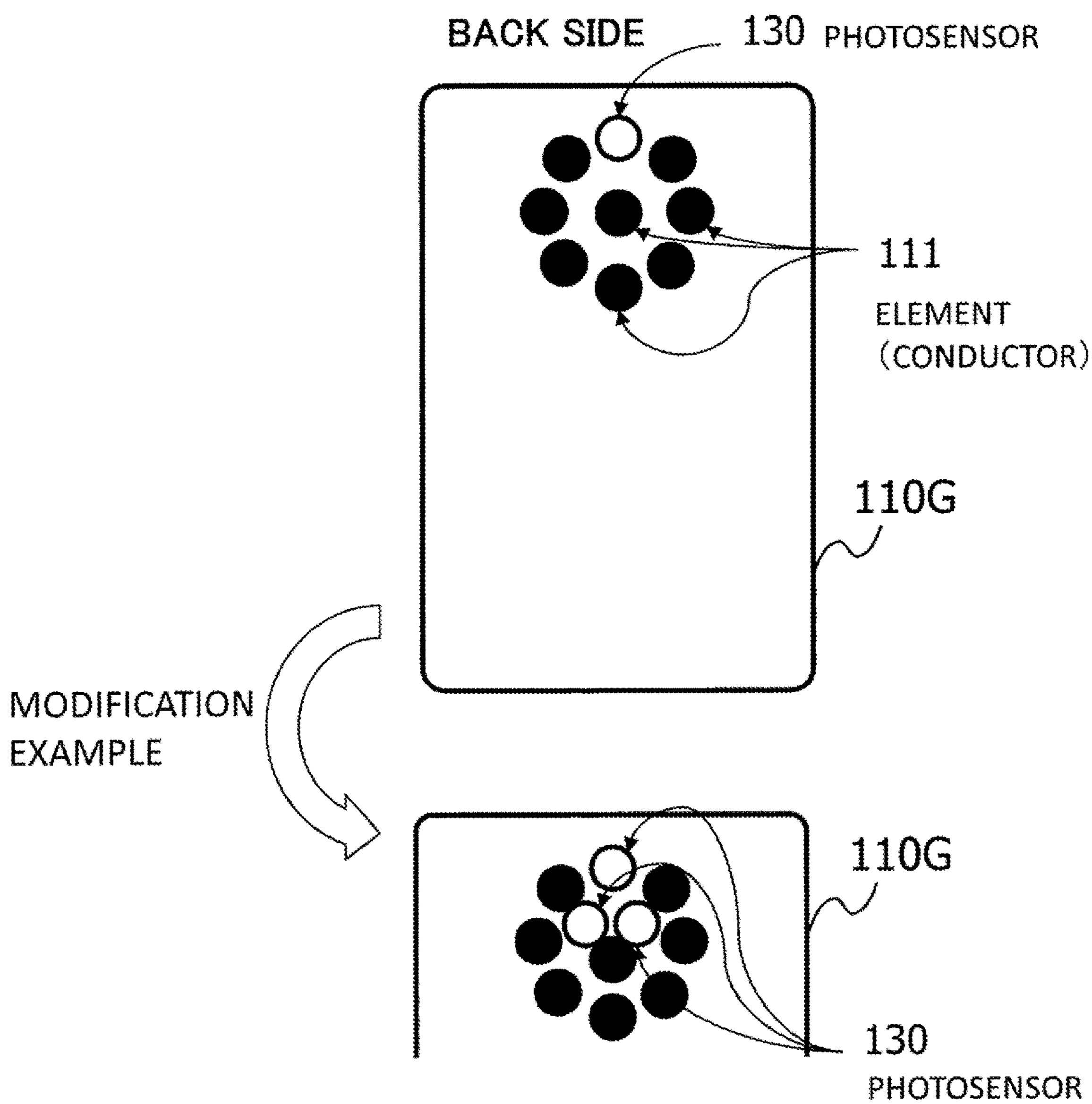
FIG. 69A is a schematic diagram showing an example of the configuration of the back side of a card-type device.

In an eighth embodiment, a more specific configuration of the card type apparatus of the seventh embodiment will be exemplified. However, the configurations of the apparatus 110 and the like described in the first to the sixth embodiments may be combined with the card type apparatus of the eighth embodiment. Furthermore, a part of the configuration of the stamp type code generation apparatus 1 described in the zeroth embodiment or a control procedure may be adopted for the card type apparatus of the eighth embodiment. FIG. 69A is a schematic diagram showing an example of a configuration of the back side of a card-shaped apparatus 110G. In the upper diagram of FIG. 69A, the card type apparatus 110G includes eight elements 111 and a light sensor 130. Each element 111 is arranged in a circle around one element 111. Although the number of recognitions by the element 111 of a current smartphone is generally 5 at the same time, it is possible to increase. For tablet PCs, many devices may already recognize 10. Also, even if six or more elements 111 are arranged, if the number that can output at the same time is restricted to five or less, the apparatus can be used even with a current smart phone.

The optical sensor 130 receives light output from the display of the information device 200. The optical sensor 130 is, for example, a photodiode. However, the optical sensor 130 may be an optical sensor capable of receiving optical signals of a plurality of channels. A modification example of the optical sensor 130 is shown on the lower side of FIG. 69A. In the lower diagram of FIG. 69A, the card type apparatus 110G includes a three channel optical sensor 130 that receives light of different wavelengths (RGB). The three-channel photosensor 130 includes a combination of color filters that transmit different wavelengths of light (RGB) and a photodiode. However, these three-channel optical sensors may receive light of the same wavelength region or of wavelength regions with overlap. That is, different light emitting regions may be set on the display, the light receiving elements such as photodiodes and the like provided in the three channels may emit light signals of different intensities for each of the light emitting regions, and the light receiving elements of the respective channels may receive light. In addition, the number of channels of the optical sensor 130 is not restricted to 3 channels, and may be 2 channels or less, or 4 channels or more. The information code transmitted from the information device 200 to the card type apparatus 110G when the optical sensor 130 receives light from the display of the information device 200 is also referred to as an optical code.

Figure 69B:
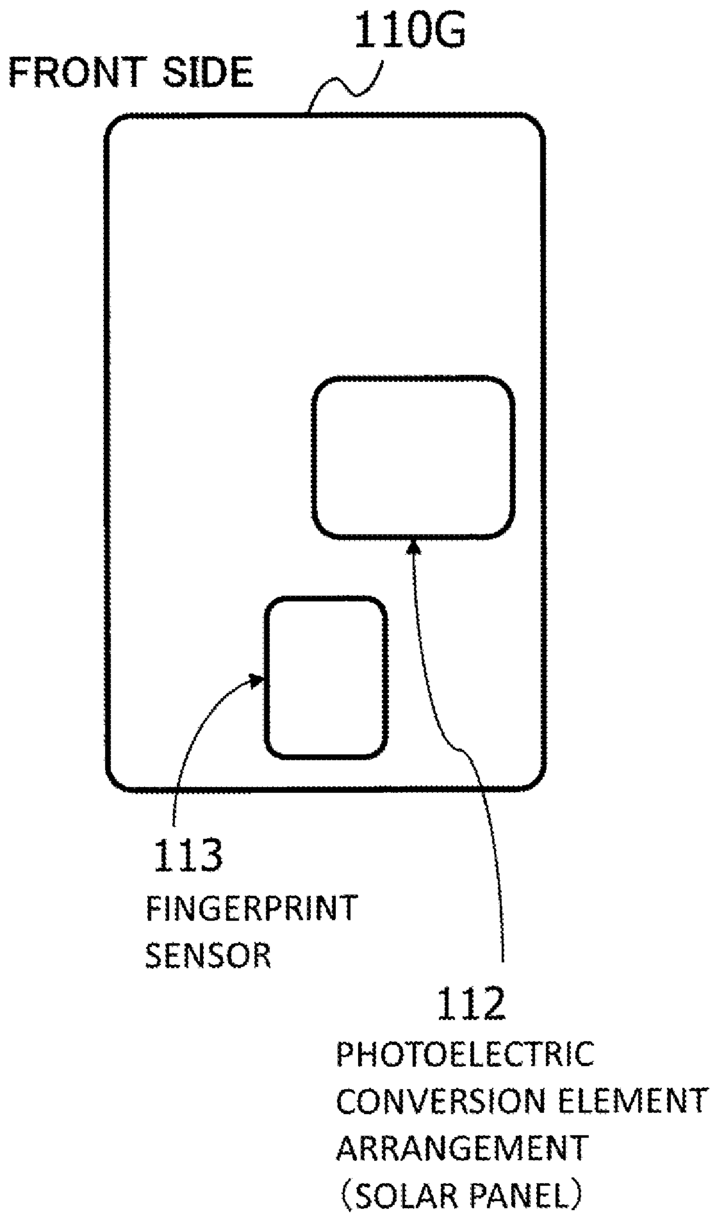
FIG. 69B is a schematic diagram showing an example of the configuration of the front side of a card-type device.

FIG. 69B is a schematic diagram showing an example of the configuration of the front side of the card-shaped apparatus 110G. The card type apparatus 110G includes a photoelectric conversion element array (solar panel) 112 and a fingerprint sensor 113. The card type apparatus 110G can receive electric power supply from the photoelectric conversion element array 112.

The fingerprint sensor 113 is, for example, an image sensor such as a CMOS or an electrostatic capacitance sensor. When turning on/off the power supply of the card type apparatus 110G, the power supply may be turned on/off by detecting a touch of a finger. An image sensor such as a CMOS is described in detail in the ninth embodiment. Noted that the card type apparatus 110G may not need to have the fingerprint sensor 113. Instead of the fingerprint sensor 113, the card type apparatus 110G may be provided with a sensor for reading a two-dimensional code such as a dot code, and the sensor and the fingerprint sensor 113 may be used together.

Figure 69C:
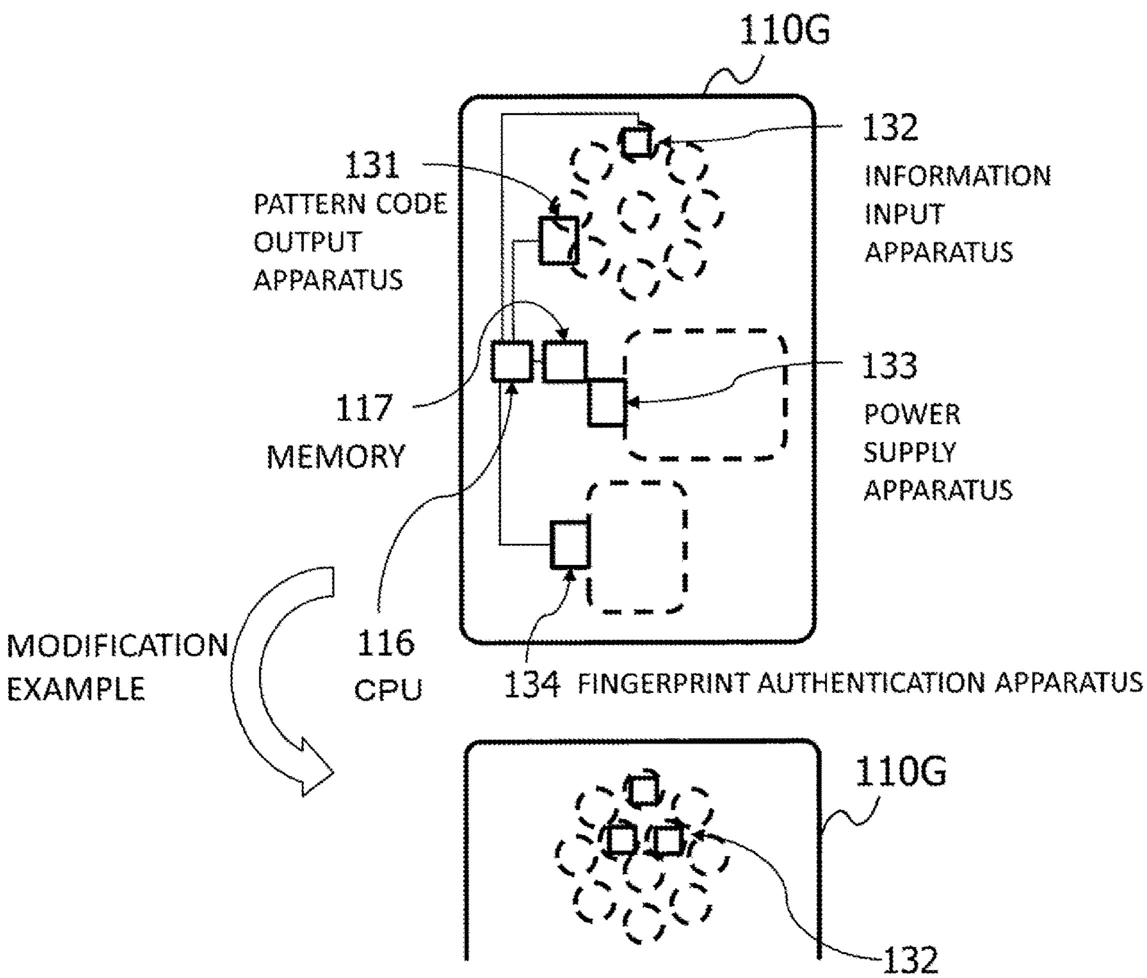
FIG. 69C is a schematic diagram showing an example of a hardware configuration of a card-type device.

FIG. 69C is a schematic diagram showing an example of a mechanism (hardware configuration) of the card type apparatus 110G. The card type apparatus 110G includes a CPU 116, a memory 117, a pattern code output apparatus 131, an information input apparatus 132, an electric power supply apparatus 133, and a fingerprint authentication apparatus 134.

The CPU 116 executes various programs expanded in the memory 117. By executing a program, the CPU derives and outputs a pattern code corresponding to the code value obtained from the information input apparatus 132 or outputs a predetermined pattern code. The predetermined pattern code includes, for example, a pattern code stored in the memory 117, a pattern code corresponding to a code acquired by the fingerprint authentication apparatus 134, time information generated from a built-in clock (or, for example, the year, the month, the day, the hour, the minute, the second, and the millisecond or time information including time-divided time determined by time-dividing elapsed time at predetermined time intervals, that is, time with a resolution based on predetermined time intervals). The CPU 116 constitutes an example of a pattern code generation unit that outputs a pattern code as predetermined format information upon a change in a physical quantity.

The memory 117 is a storage device that stores various programs executed by the CPU 116, and data such as predetermined pattern codes, various code values, and the like. The programs and data stored in the memory 117 may be made updatable by the information input apparatus 132. The memory 117 includes, for example, both volatile memories and nonvolatile memories.

The pattern code output apparatus 131 includes the drive circuit 121 and the element 111 of the first embodiment. Furthermore, the pattern code output apparatus 131 includes, for example, SW115 of the first embodiment, induces a change in a physical quantity (electrostatic capacity, electric field strength, or the like) in the element 111 based on a program instruction executed by the CPU 116, and outputs ON/OFF signals (symbols) as output information of a plurality of channels. The information input apparatus 132 is a light receiving circuit including the optical sensor 130 of FIG. 69A. However, the information input apparatus 132 may have the same configuration as that of the photoelectric conversion element 112 and the comparator 118 of the first embodiment. The information input apparatus 132 recognizes (digitizes) the intensity of the received light, the light emission time, and the intermittent time, and sequentially transmits information indicating stages of such to the CPU 116. In accordance with the program in the memory 117, the CPU 116 decrypts the information indicating stages from the information input apparatus 132 into code values. However, the information input apparatus 132 may include an optical sensor (a sensor including light receiving elements such as a plurality of photodiodes) capable of receiving optical signals of a plurality of channels. A modification of the optical sensor 130 is shown on the lower side of FIG. 69C. As in the lower diagram of FIG. 69C, when the plurality of optical sensors 130 receive light of different wavelengths, the information input apparatus 132 recognizes (digitizes) of the received light the intensity for each wavelength, the time of light emission, and the stages of intermittent time, and sequentially transmits information indicating stages of such to the CPU 116. In the present specification, the pattern code output apparatus 131 is a circuit including the element 111 and SW115 of the first embodiment for driving the element. The information input apparatus 132 is a light receiving circuit including a photosensor 130 and a circuit that processes the received light signal.

The electric power supply apparatus 133 converts the light energy obtained from the photoelectric conversion element array (solar panel) 112 and the like into electric power and supplies it to each electric circuit. The photoelectric conversion element array (solar panel) 112 may be disposed on the back side and photoelectrically convert the light emitted from the information device 200. Note that the photoelectric conversion element array (solar panel) 112 may be replaced with a battery. The electric power supply apparatus 133 is, for example, the capacitor 123 of FIG. 68A.

Furthermore, the electric power supply apparatus 133 may be configured to be chargeable. The fingerprint authentication apparatus 134 generates a code for specifying a fingerprint based on the image obtained from the fingerprint sensor 113. The fingerprint authentication apparatus 134 may read a two-dimensional code such as a dot code and output a code value (which may include a coordinate value). The fingerprint authentication apparatus 134 may include other CPUs, DSPs, and the like in addition to the CPU 116, and execute image processing according to a computer program.

[Pattern Code Output]

Figure 70A:
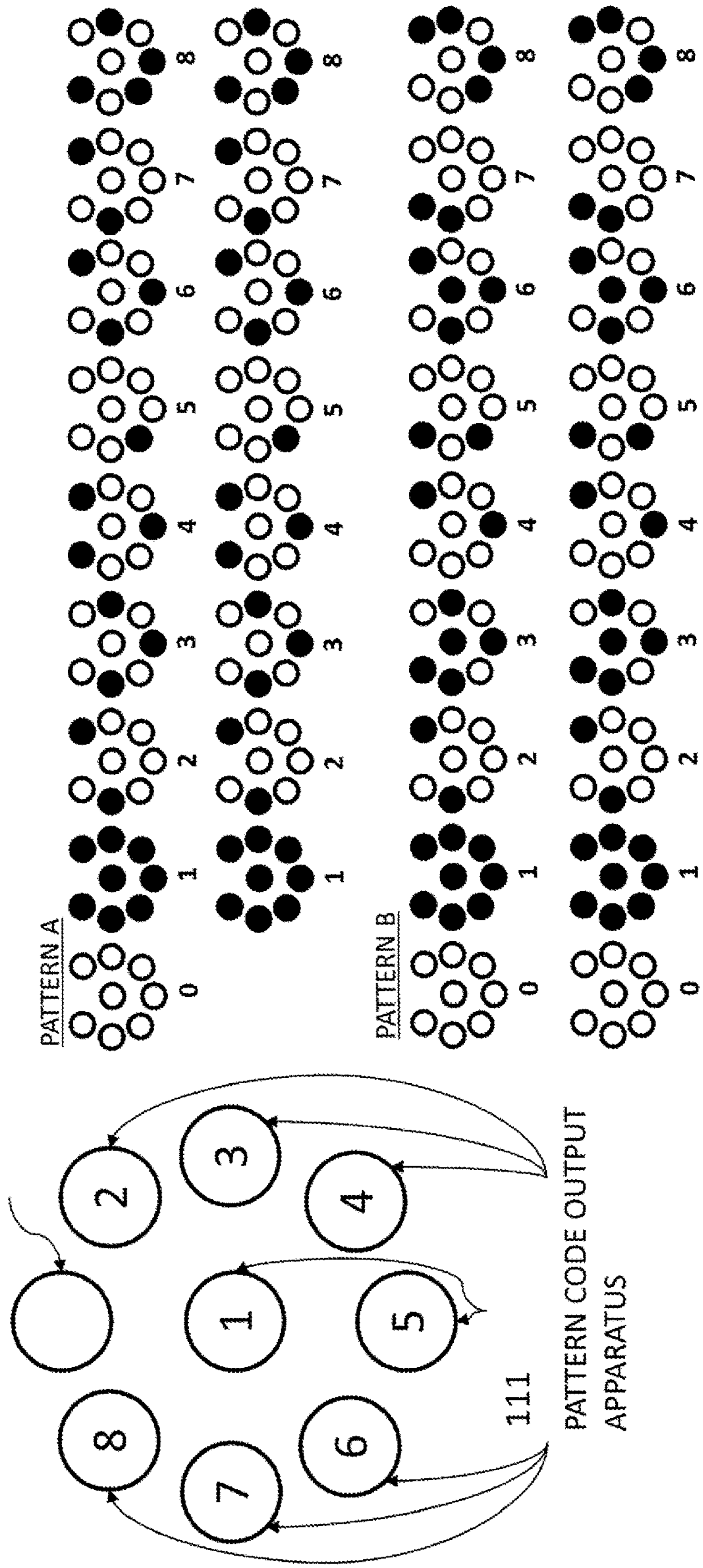
FIG. 70A is a diagram showing an output example of a pattern code by the card-type device in FIG. 69A.

FIG. 70A is a diagram showing an example of pattern code output by the card type apparatus 110G of FIG. 69A. In the card type apparatus 110G, an optical sensor (information input sensor) 130 is disposed at the top. The elements 111 arranged clockwise from the optical sensor 130 are to output symbols 2 to 8, respectively. The element 111 arranged at the center is to output symbol 1. A pattern in which the symbols 1 to 8 are ON (hereinafter also referred to as delimiter pattern or reference symbol pattern) indicates either the start or break of the pattern code. Note that on the left side of FIG. 70A, the circles indicate a physical arrangement of the elements 111, and the numbers in the circles indicate information (symbols) output from the elements 111. The arrangement of the elements 111 on the left side of FIG. 70A shows the center symbol 1 and the symbols 2 to 8 around it that are output. Furthermore, exemplified on the right side of FIG. 70A are patterns based on combinations of ON and OFF of each element 111 corresponding to symbol 1 to symbol 8, respectively, with each element 111 depicted with a black circle when ON and with an open circle when OFF. In FIG. 70A, serial numbers 0 to 8 are assigned under each pattern.

<<Pattern A>>

The card type apparatus 110G outputs the reference symbol pattern as the first (serial number 1) pattern under the control of the CPU 116, the pattern code output apparatus 131, and the like, and has the touch panel and the like of the device 200 exemplified in FIG. 55 recognize the symbol arrangement. Thereafter, by having the card type apparatus 110G output ON or OFF in the second (serial number 2) to the seventh (serial number 7) pattern by the element 111 of symbol 2 to symbol 8, six patterns that transmit information are output and the parity check pattern is output with the eighth (serial number 8) pattern. The information represented by each of the patterns in between the reference symbol pattern and the parity check pattern (for pattern A, patterns with serial number 2 to serial number 7 which are output twice) is referred to as a pattern code. When performing error checking and error correction besides the parity check, the card type apparatus 110G may output a pattern for transmitting information with the second (serial number 2) to the eighth (serial number 8) patterns in between the reference symbol patterns. Here, the pattern for transmitting information is a pattern other than a pattern for delimiting such as a reference symbol pattern and a pattern for error checking or error correction such as a parity check pattern. Hereinafter, a pattern that transmits information is simply referred to as an information pattern. A combination of a delimiter pattern and an information pattern is called a data block. As in FIG. 70A, a parity check pattern is also included in the data block alongside the pattern (pattern A) with the character string of "pattern A" attached. In this figure, a data block including patterns corresponding to serial number 1 to serial number 8 illustrated twice is exemplified. This is a combination of patterns among which are combinations of patterns of serial number 2 to serial number 7 representing information. Hereinafter, in this specification, a series of information patterns (for example, a combination of patterns of serial number 2 to serial number 7 in FIG. 70A) included in one data block is referred to as an electrostatic capacitance code. The electrostatic capacitance code can be regarded as an information code output by the apparatus 110 such as the card type apparatus 110G.

In the reference symbol pattern, the card type apparatus 110G outputs all of the symbols 1 to 8 as ON, but with a pattern based on the other information symbols, the start or the break of a pattern code may be made to be recognizable by not outputting the symbol 1 as ON. The card type apparatus 110G is made to have the information device 200 and the like recognize the correct pattern code with certainty even at the start of reading or when an error occurs, by repeating the reference symbol pattern output a predetermined number of times. When the touch panel of the information device 200 confirms the completion of pattern code reading, the card type apparatus 110G can recognize the propriety of the reading by outputting an optical signal indicating the completion of reading by the touch panel. As a result of the above, the card type apparatus 110G can output 7 bits×6=42 bits with the parity check in use. Assuming that one output time is 50 msec, the pattern code output apparatus can output 42 bits in about 400 msec. However, since recent models of smartphones can recognize touches at intervals of 12 msec, if the card type apparatus 110G is made to output a pattern code every 32 msec taking the security factor into consideration, the 42 bit pattern code can be recognized in about 250 msec at the shortest. If the number of times of information pattern output is increased, an enormous amount of pattern codes is output and is recognized by the touch panel. Note that in the pattern A of FIG. 70A, by recognizing the delimiter exemplified by the serial number 1, it is possible to recognize the data block as a pattern sequence delimited before and after the break.

<<Pattern B>>

As in FIG. 70A, alongside the pattern (pattern B) with the character string of "pattern B" attached, patterns with serial number 1 to serial number 8 are exemplified. The card type apparatus 110G is made to output the reference symbol pattern (all of the symbols 1 to 8) as ON as the first pattern and have the information device 200 recognize the arrangement of the symbols. Thereafter, the card type apparatus 110G outputs six patterns of symbols as the second to the seventh patterns, with symbol 1 and symbol 3 to symbol 7 as information symbols, and outputs the parity check code as the eighth. When performing error checking and error correction besides the parity check, the pattern code output apparatus 131 may output a pattern for transmitting information with the second (serial number 2) to the eighth (serial number 8) pattern. Pattern codes corresponding to the second (serial number 2) to the eighth (serial number 8) pattern are pattern codes for transmitting information.

In the case of the pattern B, the apparatus 110G outputs symbols 2 and 8 as ON in the reference symbol pattern, but in other information patterns and the parity check pattern (serial numbers 2 to 8), the apparatus 110G outputs with one of the two not ON. With this output method, the apparatus 110G enables the touch panel to recognize the start and break of the pattern code. Furthermore, in the case of the pattern B, the apparatus 110G alternately outputs the symbol 2 and the symbol 8 at predetermined intervals when outputting a combination pattern of ON and OFF at predetermined time intervals. With this output method, the card-type apparatus 110 G enables the information device 200 to reliably grasp the time interval. That is, in pattern B, symbols 2 and 8 play the role of timestamp. The card type apparatus 110G is made to have the information device 200 recognize the correct pattern code with more certainty even at the start of reading or when an error occurs, by repeating the reference symbol pattern output a predetermined number of times. When the touch panel of the information device 200 confirms the completion of pattern code reading, the CPU116 of the card type apparatus 110G can recognize the propriety of the reading by outputting an optical signal indicating the completion of reading by the touch panel. As a result of the above, the card type apparatus 110G can output 6 bits×6=36 bits when the parity check is in use. Assuming that one output time is about 50 msec, the card type apparatus 110G can output 36 bits in about 400 msec. However, since recent models of smartphones can recognize touches at intervals of 12 msec, if the card type apparatus 110G is made to output a pattern code every 32 msec taking the security factor into consideration, the 36 bit pattern code can be recognized in about 250 msec at the shortest. If the number of times of information pattern output is increased, an enormous amount of pattern codes can be output and be made to be recognized by the information device 200. Note that in the pattern B of the pattern code of FIG. 70A, by recognizing the delimiter exemplified by the serial number 1, it is possible for the information device 200 to recognize the data block as a pattern sequence delimited before and after the break.

<<Modification Example of the Pattern Code>>

Figure 70B:
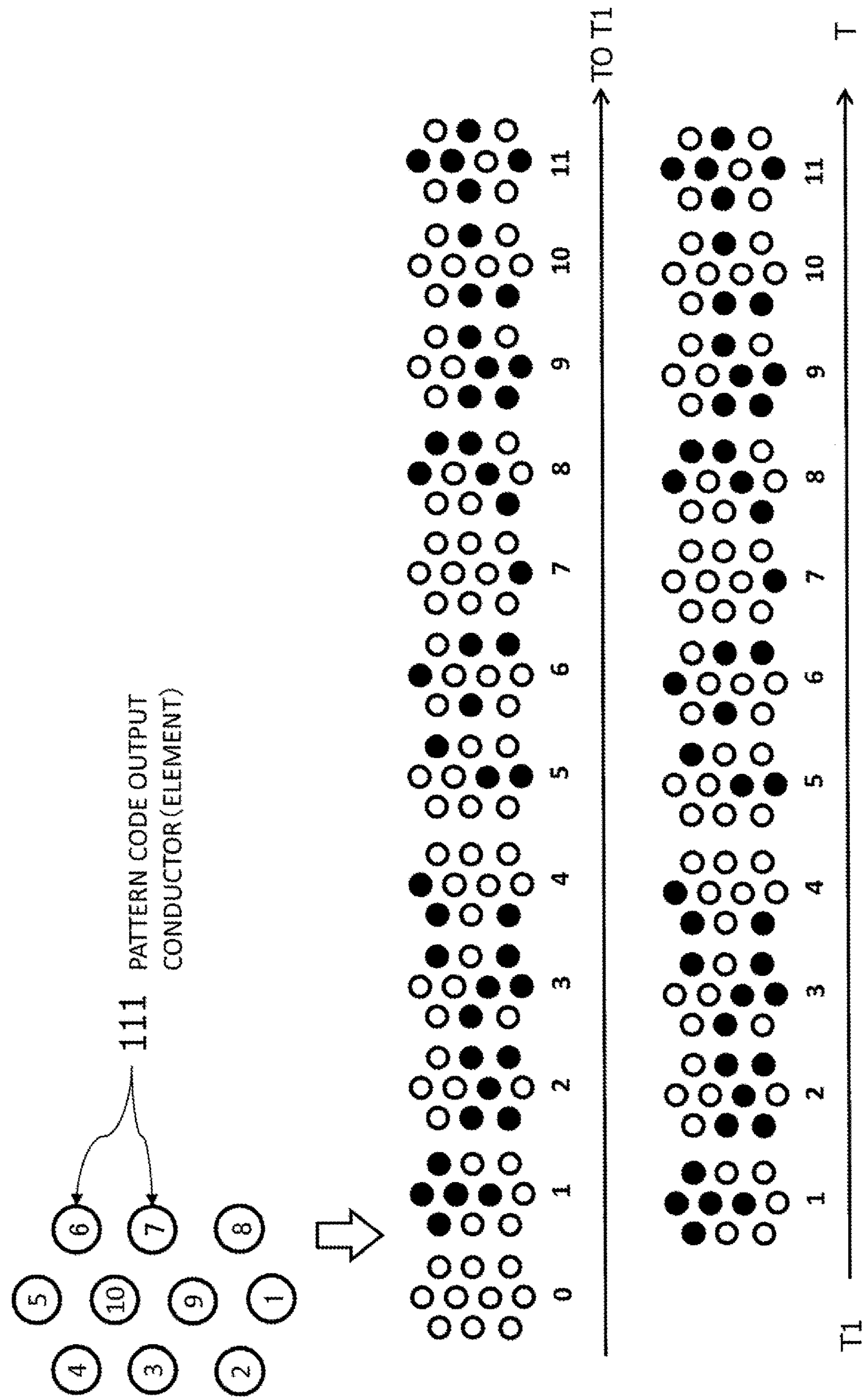
FIG. 70B is a diagram showing a modification example of the pattern code output example.

FIG. 70B is a diagram showing a modification example of the output of the pattern code of the card type apparatus 110G (pattern code output apparatus). In order to use the pattern code for an electronic payment or the like, it is desirable for the information device 200 to recognize a 128-bit pattern code (electrostatic capacity code) by transmission and reception within a predetermined time. On the other hand, with the current smartphone, the number of touch positions that can be simultaneously recognized (that is, the number of elements 111) is often limited to five. Thus, although the number of elements 111 to be simultaneously turned on is 5 or less, by increasing the number of elements 111 provided in the apparatus 110G to 6 or more, the number of codes can be increased. In the example of FIG. 70B, 10 elements which are pattern code output conductors are provided and are described. Note that in another application, about 128 bits of information may be made to be transmitted within a predetermined time by multiple transmissions/receptions. Note that although descriptions here are given under the assumption that the number of touch positions (that is, the number of elements 111) that can be simultaneously recognized by the touch panel of the information device 200 is five, the implementation of the present invention is not restricted to the case where the number of touch positions (that is, the number of elements 111) that can be simultaneously recognized by the touch panel of the information device 200 is five. That is, in the case where the number of touch positions (that is, the number of elements 111) that the touch panel can simultaneously recognize is N (integer), the following procedure can generally be applied.

As in FIG. 70B, the circles marked with the numbers 1 to 10 exemplify the arrangement of the elements 111. In the embodiments described below, the elements 111 numbered 1 to 10 in FIG. 70B are to output symbols 1 to 10, respectively. As in FIG. 70B, the elements 111 that output symbols 2 to 8 are arranged clockwise from the element 111 which is placed at the bottom and outputs the symbol 1. In the center of the area surrounded by the elements that output symbol 1 to symbol 8 are arranged two elements 111 that output symbol 10 and symbol 9 from top to bottom, respectively.

In the pattern code output example of FIG. 70B, although the numbers in the circles are omitted, the information output from each element 111 is regarded as symbol 1 to symbol 10, respectively, likewise to FIG. 70A (symbols 1 to 8). Also, a change in a physical quantity corresponding to OFF or ON for each element 111 corresponding to symbol 1 to symbol 10 is generated for output to symbols 1 to 10, respectively. Also, a combination of ON and OFF of the elements 111 corresponding to the symbol 1 to the symbol 10 at a certain point will be referred to as a pattern. As in FIG. 70B, a filled circle indicates that the element 111 is in the ON state, and an open circle indicates that the element 111 is in the OFF state. As in FIG. 70B, serial numbers 0 to 11 are assigned to each pattern code. Thus, these patterns are referred to as pattern 0 to pattern 11. As in FIG. 70B, pattern 0 to pattern 11 are exemplified in the upper row and pattern 1 to pattern 11 are exemplified again in the lower row. In FIG. 70B, exemplified is the output by the card type apparatus 110G of pattern 0 to pattern 11 with the elapse of time, and further output of pattern 1 to pattern 11. Patterns 0 to 11 each represent information of 10 bits. A series of data output as pattern 1 to pattern 11 is also called a data block. The data block includes a delimiter pattern and an information pattern for transmitting information. The information represented by each information pattern included in a data block is also called a pattern code.

When symbols 4, 5, 6, 9, 10 of pattern 1 (serial number 1), symbols 2, 3, 7, 8, 9 of pattern 2 (serial number 2), and at least symbol 1 of pattern 3 (serial number 3) is turned on, in accordance with the output of each arranged symbol, the touch panel can recognize the arrangement position of each element 111. Here, for example, for pattern 1 and pattern 2, if the card type apparatus 110G turns off the element 111 of the symbol 1, the other elements 111 excluding the element 111 of the symbol 9 are in different output states (ON or OFF). The combination of pattern 1 and pattern 2 is an output arrangement of a unique pattern distinguished from pattern 3 to pattern 11 for information output and can be indicated as a delimiter of a data block in which one pattern code is defined.

Here, when the card type apparatus 110G (pattern code output apparatus) consecutively outputs ON from the element 111 of the symbol 9 as in the case where the combination of pattern 1 and pattern 2 is output consecutively, by recognizing whether or not the position of the element 111, in which a physical quantity corresponding to the ON state of the symbol 9 is detected, is the same position, the touch panel can detect displacements and other defects occurring when a card is placed. Thereafter, for pattern 3 to pattern 11, the card type apparatus 110G turns the output (physical quantity) from each element 111 ON/OFF in synchronization with the output time interval of the nine information patterns defined by patterns 3 to 11. Then, the touch panel can accurately detect a pattern that varies depending on ON or OFF, and can recognize the pattern code. Here, to turn on/off the output (physical quantity) refers to, as described in the first embodiment, generating various degrees of strength at predetermined time intervals for the intensity of an electric field or a physical quantity such as electrostatic capacitance exerted on the touch panel by the element 111. Note that even at the start of pattern code reading or even when an error occurs, by having the card type apparatus 110G repeat the reference symbol pattern output a predetermined number of times, the touch panel of the information device 200 can reliably recognize the pattern code. When the touch panel confirms the completion of pattern code reading, a control device such as a CPU or the like that controls the touch panel outputs an optical code indicating the completion of reading from the display. Then, the card type apparatus 110G can recognize the completion of reading. As in FIG. 70B, the first data block is output according to the delimiter patterns of pattern 1 and pattern 2 and the information patterns of pattern 3 to pattern 11. The number of information patterns varies depending on the pattern code that are output and when the application side of the information device 200 recognizes the number of information pattern that are output, the application can decrypt the pattern code by acquiring the same number of patterns as that of information patterns output before and after the delimiter of the data block. That is, the information device 200 does not have to acquire all of the information patterns between a data block delimiter pattern and the next delimiter pattern. For example, when the information device 200 acquires a part of the information pattern from the first data block spanning from the delimiter pattern indicating the start to the next delimiter pattern, and acquires the remainder of the information pattern from the second data block spanning up to the next delimiter pattern, the decrypting may be ended at the stage where the lacking information pattern is fulfilled. With such a procedure, the information device 200 can shorten the decrypting time.

As in FIG. 70B, nine elements 111 for outputting information, that is, patterns 3 to 11 are exemplified. Here, for example, when the number of conductors that can be simultaneously recognized by the touch panel is five, in the patterns (patterns 3, 5, 7, 9, 11) in which the symbol 1 is ON, depending on the number of combinations of 0 to 4 conductors being ON among the 9 elements 111, ${}_9C_4+{}_9C_3+{}_9C_2+{}_9C_1+1=126+84+36+9+1=256$ (8 bits) of information may be output. On the other hand, for patterns (pattern 4, 6, 8, 10) in which symbol 1 is OFF, depending on the number of combinations of 0 to 5 conductors being ON among the 9 elements 111, ${}_9C_5+{}_9C_4+{}_9C_3+{}_9C_2+{}_9C_1+1=126+126+84+36+9+1=382$ (8.577 bits) of information may be output. Therefore, in the example of FIG. 70B, information of 8 bits×5+8.577 bits×4=about 74 bits is output. Assuming that the output time of a signal from one element 111 is 50 msec, the card type apparatus 110 G can output about 74 bits in 550 msec. In one second, the card type apparatus 110G can output 19 patterns (2 delimiter patterns and 17 information patterns). Of the 17 patterns, 9 are when the element 111 of symbol 1 is ON, and 8 are when it is OFF. Therefore, in one second, 8 bits×9+8.577 bit×8=about 140 bits of information is output. Of these, if 12 bits are used for error checking such as a parity check or the like, 128 bits are available, and the pattern code according to FIG. 70B can be used for electronic payment with a sufficient transmission rate. Note that since a smartphone of a recent model can recognize a touch at intervals of 12 msec, if the card type apparatus 110G outputs the pattern code every 32 msec taking the security factor into consideration, it may also be possible to output about 140 bits of information in 0.6 seconds. As described above, even in the case where the number of simultaneously recognizable elements 111 (that is, the touch position) in the touch panel is limited to 5, as for transmitting information to the touch panel, the card type apparatus 110G has information transmission capability for electronic payments exceeding minimum requirements.

Note that in the output of a symbol according to the eighth embodiment, as with the pattern code generation apparatus 1 described in the zeroth embodiment (see, for example, FIGS. 10 to 13, 26 and 27), the apparatus 110 may form a symbol by combining the relative lengths of the ON/OFF time intervals of symbols. Furthermore, the apparatus 110 may be set to output intensity of the symbols in a plurality of stages and made to output information according to the symbol output intensity level (see FIG. 13).

[Modification of the Eighth Embodiment]

Figure 71A:
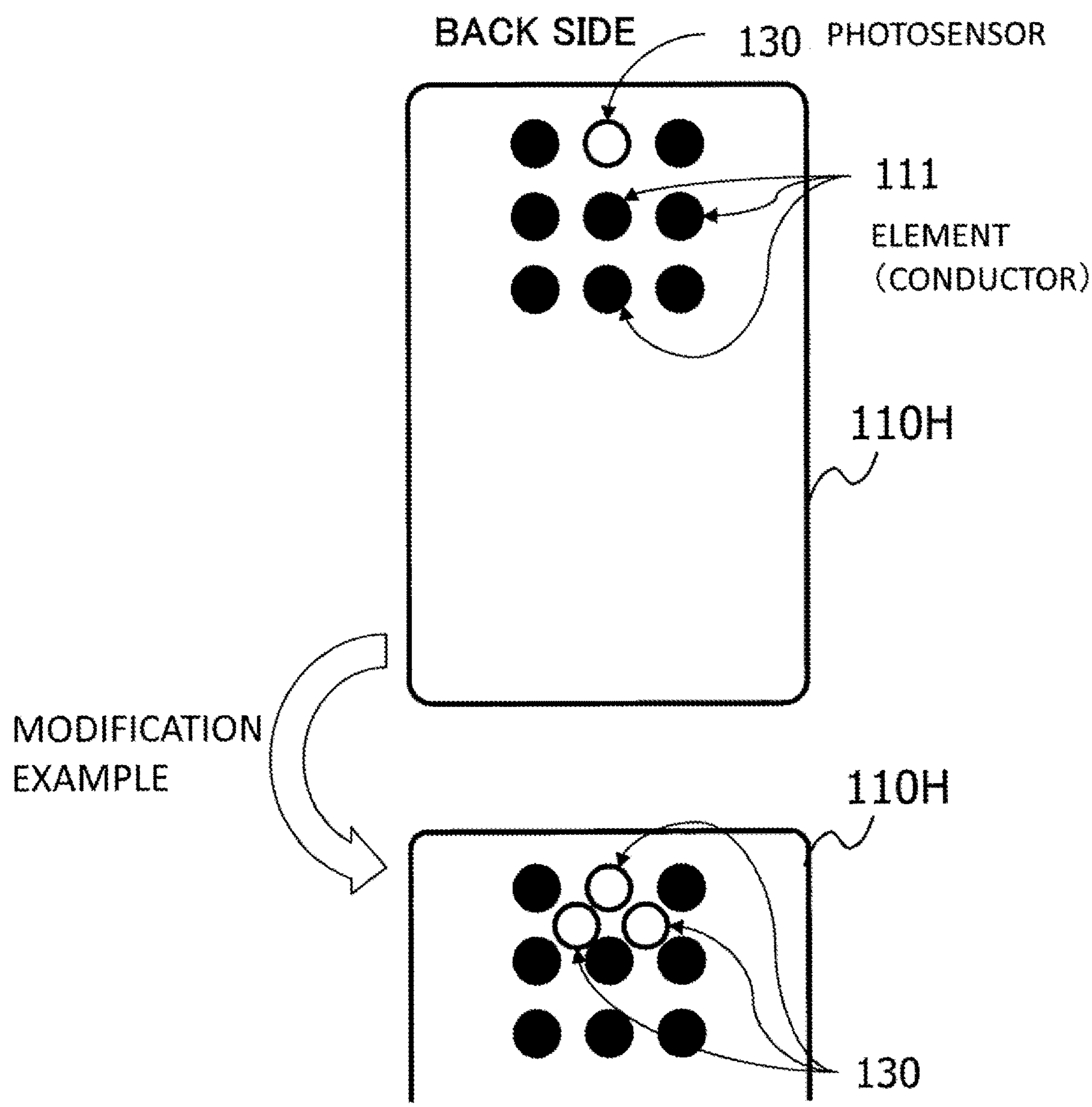
FIG. 71A is a schematic diagram showing an example of the configuration of the back side of a card-type device having a touch input panel.

As described above on FIG. 70B, there are cases where the number of touch positions that the touch panel can simultaneously recognize is limited. However, for the apparatus 110, the manner in which the elements 111 are arranged or the number of arrangements does not necessarily have restrictions. FIG. 71A is a schematic diagram showing an example of a configuration of the back side of a card type apparatus 110H including a touch input panel 135. In the upper view of FIG. 71A, the card type apparatus 110H includes eight elements 111 and a light sensor 130. Each element 111 (hereinafter also referred to as a pattern code output apparatus) is arranged in a rectangular frame shape around one element 111

The optical sensor 130 receives light output from the display of the information device 200. The optical sensor 130 is, for example, a photodiode. A modification example of the card type apparatus 110H is shown on the lower side of FIG. 71A. As in the lower diagram of FIG. 71A, the card type apparatus 110G is equipped with a light sensor 130 that receives light of different wavelengths (RGB). However, these three-channel optical sensors may receive light of the same wavelength region or of wavelength regions with overlap. The configuration of the optical sensor 130 is similar to that of the optical sensor 130 of the eighth embodiment (FIG. 69A).

Figure 71B:
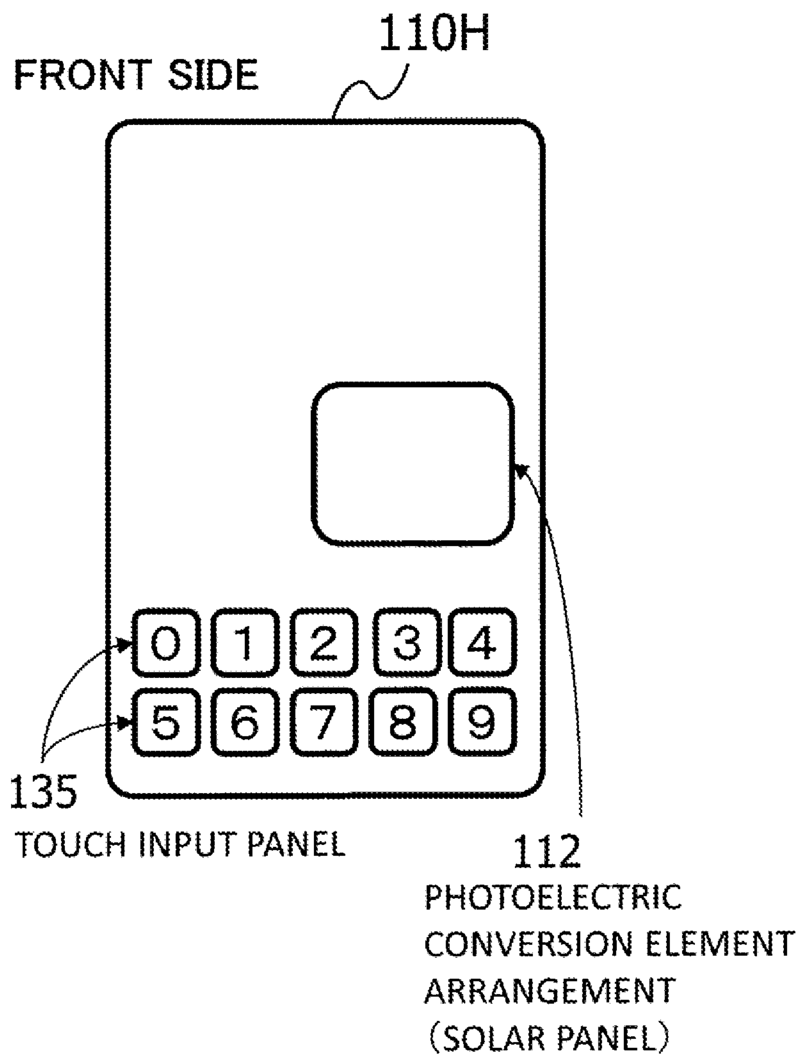
FIG. 71B is a schematic diagram showing an example of the configuration of the front side of a card-type device having a touch input panel.

FIG. 71B is a schematic diagram showing an example of the configuration of the front side of the card type apparatus 110H having the touch input panel 135. The card type apparatus 110H includes the photoelectric conversion element array (solar panel) 112 and the touch input panel 135. The card type apparatus 110H can receive electric power supply from the photoelectric conversion element array 112. The image reading apparatus 110H is also simply referred to as the apparatus 110H.

The touch input panel 135 is, for example, an electrostatic capacitance sensor or a pressure sensor. The card type apparatus 110H may detect a user's finger or a stylus pen making contact and may turn the power supply on/off accordingly. The touch input panel 135 of the card type apparatus 110H may include a plurality of panels differing for each value that is input, such as the buttons indicated by numerals 0 to 9 in frames as in FIG. 71B. Furthermore, the card type apparatus 110H with a single panel may recognize an input value by acquiring position information at the time of touching and relating it to a graphics object on the display. Furthermore, the touch input panel 135 may recognize input information by numerals, characters, and symbols drawn with a finger or a stylus pen. The card type apparatus 110H may serve as both the touch input panel 135 and a sensor for reading a two-dimensional code such as a dot code.

Figure 71C:
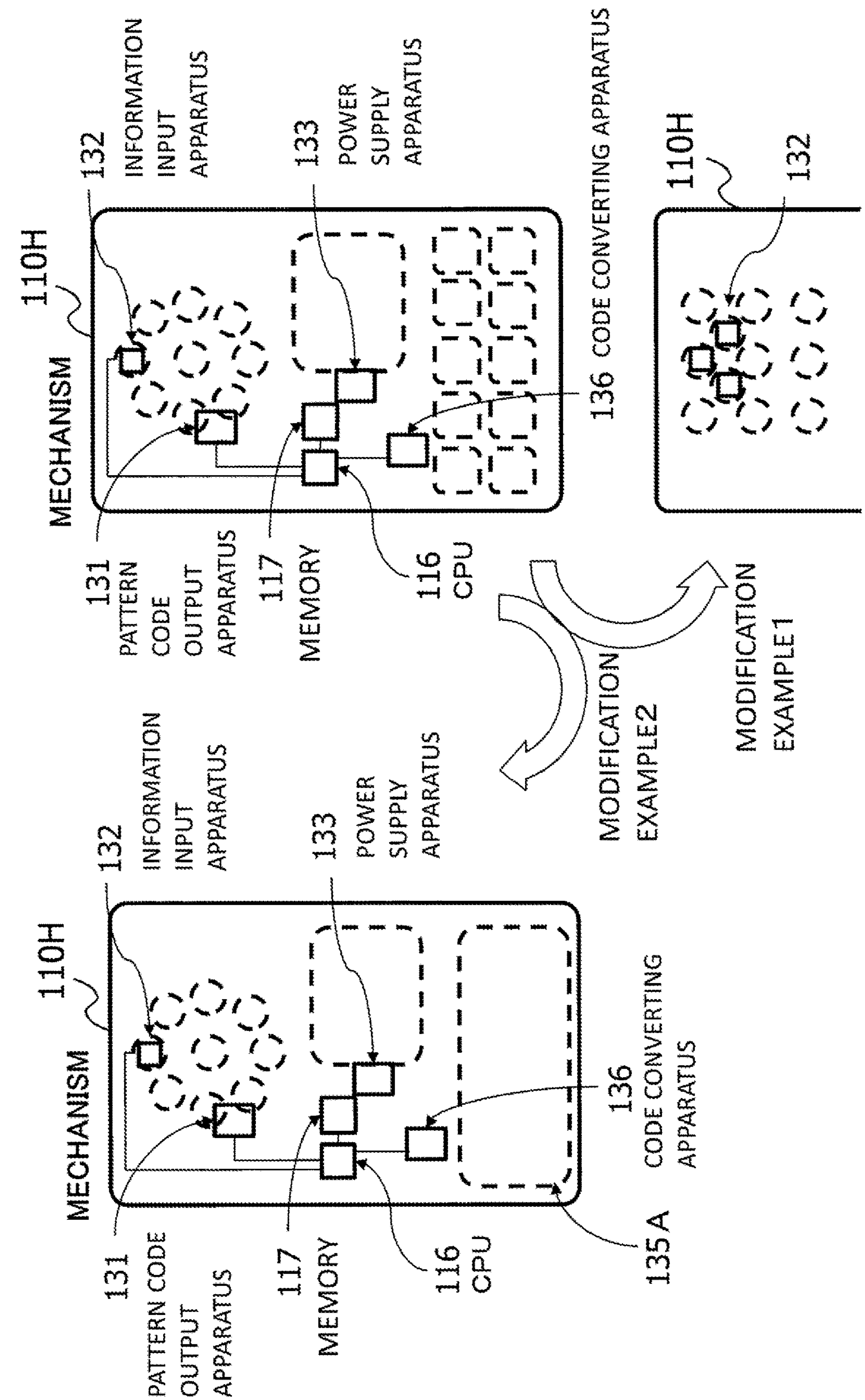
FIG. 71C is a schematic diagram showing an example of a hardware configuration of a card-type device having a touch input panel.

FIG. 71C is a schematic diagram showing an example of the mechanism (hardware configuration) of the card type apparatus 110H including the touch input panel 135 (see FIG. 71B). The card type apparatus 110H includes a CPU 116, a memory 117, a pattern code output apparatus 131, an information input apparatus 132, an electric power supply apparatus 133, and a code conversion device 136. However, in FIG. 71C, the touch input panel 135 is omitted. Among these, the CPU 116, the memory 117, the pattern code output apparatus 131, the information input apparatus 132, and the electric power supply apparatus 133 are similar to those in FIG. 69C, and thus descriptions thereof are omitted. The code conversion device 136 generates code values based on numerical values input from the touch input panel 135 exemplified in FIG. 71B or trajectory information of numbers, letters and symbols drawn on the touch input panel 135. However, a single touch panel 135A that can detect the touch position exemplified in the second modification of FIG. 71C may be provided. The code conversion device 136 may read a two-dimensional code such as a dot code and output a code value. The code conversion device 136 has a processor, a DSP and the like, and these processes may be executed by a computer program.

Second Modification of the Eighth Embodiment

Figure 71D:
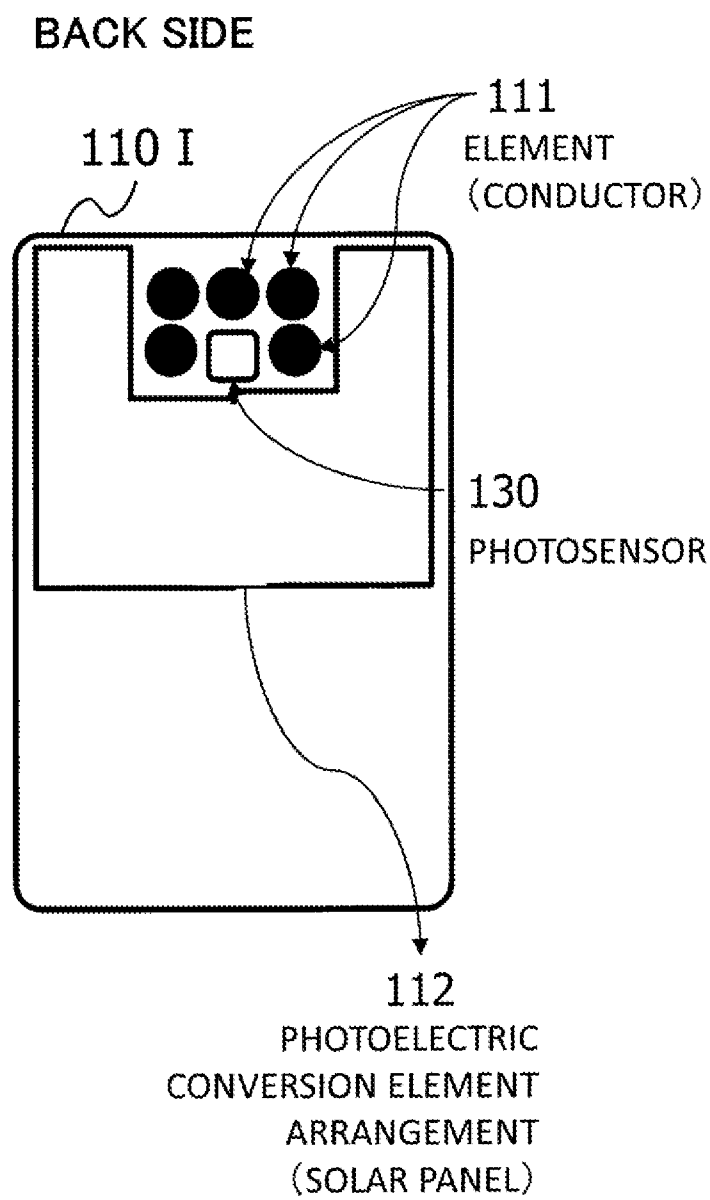
FIG. 71D is a schematic diagram showing an example of the configuration of the back side of a card-type device equipped with a power-saving display device.

As in FIG. 71D, a card type image reading apparatus 110I including an electric power-saving display device is also simply referred to as the apparatus 110I. FIG. 71D is a schematic diagram showing an example of a configuration of the back side of the card type apparatus 110I. The card type apparatus 110I includes five elements 111, a light sensor 130, and a photoelectric conversion element array (solar panel) 112. Three elements 111 are arranged in a row in the horizontal direction, and beneath each element 111 are arranged an element 111, an optical sensor 130, and an element 111, respectively. However, for the card type apparatus 110I, in order to use the pattern code for electronic payments or the like, it is desirable for the amount of information exchanged within a predetermined time to be 128 bits or more. Therefore, for the use of an applicable application, as exemplified in FIG. 70B, the transmission rate for the pattern code may be increased by providing about ten or more elements 111 corresponding to symbols 1 to 10.

As in FIG. 71D, the photoelectric conversion element array (solar panel) 112 has a U shape surrounding the elements 111 and the photosensor 130, but the shape is not restricted to this shape, and as long as the generation of electric power is possible, any shape is sufficient.

The optical sensor 130 receives light output from the display of the information device 200. The optical sensor 130 is, for example, a photodiode. The optical sensor 130 may be a combination of photodiodes or the like for receiving light (RGB) of different wavelengths. In the case of such a configuration, the optical sensor 130 can be regarded as a sensor that can detect different light intensities or different hues for each wavelength at the same timing and can decrypt optical signals into optical codes. However, these three-channel optical sensors may receive light of the same wavelength region or of wavelength regions with overlap. The configuration of the optical sensor 130 is similar to that of the optical sensor 130 of the eighth embodiment (FIG. 69A).

Figure 71E:
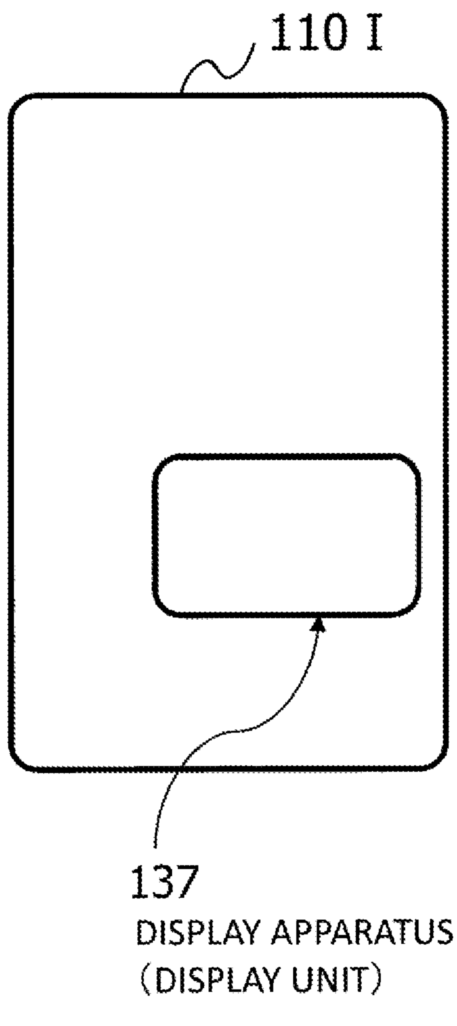
FIG. 71E is a schematic diagram showing an example of the configuration of the front side of a card-type device equipped with a power-saving display device.

FIG. 71E is a schematic diagram showing an example of the configuration of the front side of the card type apparatus 110I provided with an electric power-saving display device. The card type apparatus 110I includes a display device 137, and a display unit of the display device 137 is disposed on the front side. The display device 137 is an ultra-thin type electric power-saving display device such as an organic EL (electroluminescence) or an electronic notebook using a magnetic material. When used as a credit card or a membership card, the display device 137 may display a card number, an expiration date, a name, and a security code. These pieces of information may be displayed only when the user holds the card type apparatus 110I over the smartphone and acquires predetermined authentication. Furthermore, the display device 137 may display a password or the like. In the case of a point card, a game, or a card for education, the display device 137 may display points, items, power, scoring results, and the like stored in the card, and may display any other kind of information. If the display device 137 displays a two-dimensional code or the like, the user can also read with a smartphone.

Figure 71F:
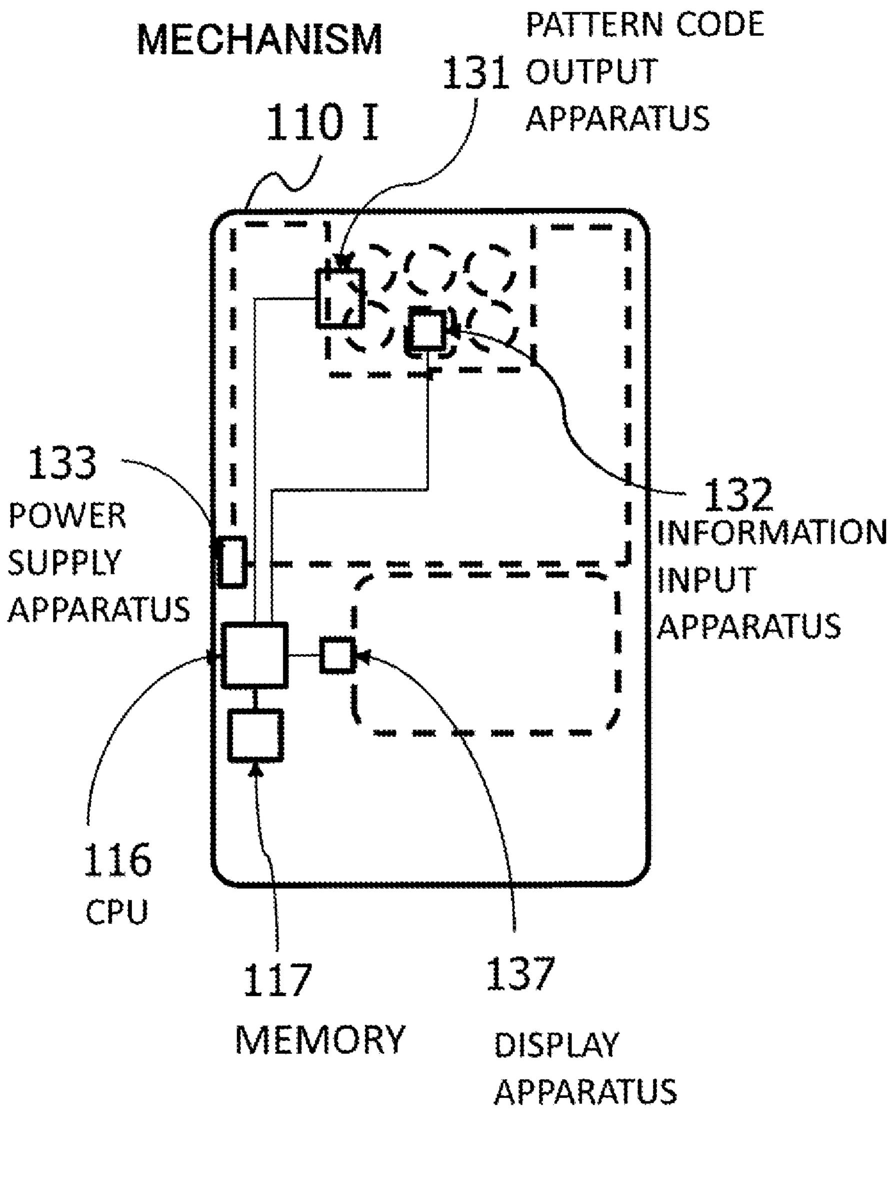
FIG. 71F is a schematic diagram showing an example of a hardware configuration of a card-type device equipped with a power saving display device.

FIG. 71F is a schematic diagram showing an example of a mechanism (hardware configuration) of the card type apparatus 110I provided with the electric power-saving display device. The card type apparatus 110I includes a CPU 116, a memory 117, a pattern code output apparatus 131, an information input apparatus 132, an electric power supply apparatus 133, and a display device 137.

The CPU 116, the memory 117, the pattern code output apparatus 131, the information input apparatus 132, and the electric power supply apparatus 133 are the same as those in FIG. 71C, and thus descriptions thereof are omitted. The display device 137 receives instructions from a program executed by the CPU 116, generates characters and graphics, and displays them on the display unit of the display device 137.

<Information Code of the Present Embodiment>

In the first to the eighth embodiments, information is input to the apparatus 110 or the like by a change in light quantity of the touch panel. Here, the terms of the information that is input to the apparatus 110 or the like is defined as an information code. The information code may be regarded as an information format defined by a pattern of a temporal change in energy incoming into the apparatus 110 or the like. Note that in the following description, the apparatus 110, the card type apparatuses 110A to 110H, and the like described in the first to the eighth embodiments are simply referred to as the apparatus 110 or the like. Furthermore, the following information code is input to the information input apparatus 132 which includes the optical sensor 130. Therefore, this information code is also referred to as an optical code.

In the following, a pattern code output from the pattern code output apparatus 131 comprising the element 111 is also defined. The following pattern code format may also be applied to the stamp type code generation apparatus 1 of the zeroth embodiment. Furthermore, when the code generation apparatus 1 of the zeroth embodiment includes the optical sensor 130 (information input apparatus 132) described below, the code generation apparatus 1 of the zeroth embodiment can recognize the following optical codes and can input.

Figure 71G:
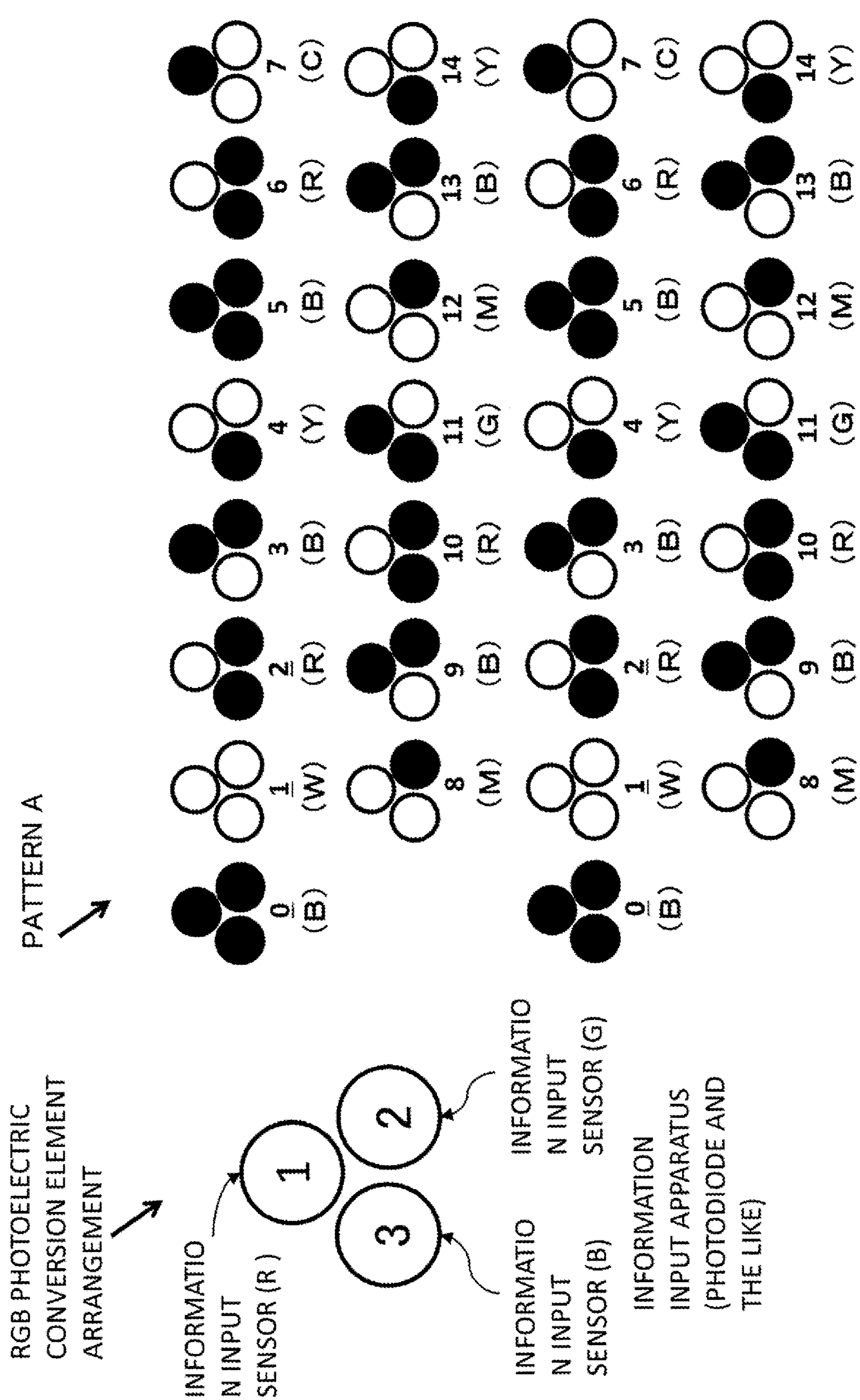
FIG. 71G is a diagram exemplifying an arrangement of photoelectric conversion elements that perform photoelectric conversion for each of the three wavelengths of RGB, and input information related to changes in the amount of light detected by the photoelectric conversion element arrangement as a function of time.

FIG. 71G exemplifies an arrangement (hereinafter referred to as an RGB photoelectric conversion element array) of photoelectric conversion elements performing photoelectric conversion for each of the three wavelengths of RGB and input information (a pattern of RGB light quantity change) based on a temporal change of a change in an amount of light detected by the RGB photoelectric conversion element array. That is, FIG. 71G exemplifies, for example, a format of a light reception signal received by the optical sensor 130 that receives light (RGB) of different wavelengths as described in the eighth embodiment. However, the following description is not restricted to the eighth embodiment, and an example of a format at the time of information input by the light amount variation pattern received by the apparatus 110 will be described herein. In the figure, the RGB photoelectric conversion element array corresponds to the information input apparatus 132 (optical sensor 130) of the eighth embodiment.

A photodiode (or a phototransistor) with a color filter corresponding to the three colors of R, G, B is exemplified as an arrangement of a RGB photoelectric conversion element array with circles marked with numbers 1 to 3. In the figure, circles marks 1 to 3 exemplify information input sensors (hereinafter referred to as information input sensors PD1, PD2, and PD3, respectively) corresponding to R, G, and B, respectively. By arranging a row of such information input sensors on a surface (back side) that comes into contact with or comes into proximity with the touch panel, the apparatus 110 and the like, can receive input information of the three channels from the information device 200 or the like having a touch panel. However, in the first to the eighth embodiments, the number of information input sensors for each wavelength of light, that is, the number of channels is not restricted to three. The apparatus 110 and the like may input information using color filters (wavelength selection filters) corresponding to wavelengths of two channels or less, or four or more channels. In addition, the apparatus 110 may receive information of the three channels, by receiving light of different amounts of light from the display areas of the touch panel corresponding to the information input sensors PD1, PD2, PD3, respectively, without separating the wavelengths.

The apparatus 110 or the like recognizes the brightness level of a received light. The brightness level may be of the two stages (1 bit) of ON/OFF with one threshold. By setting thresholds at a plurality of levels, the amount of information obtained from each photodiode may be increased to 2 bits or more. In this figure, the number of stages is two levels corresponding to ON/OFF. In the figure, black corresponds to OFF and this is a case where either no light is received or the received light has a value of brightness that equals or is less than a predetermined threshold value. In addition, open circle corresponds to ON, and this is a case where either light is received or the received light has a value of the brightness equal to or more than the predetermined threshold value.

[Pattern A]

In FIG. 71G, pattern A exemplifies an information code of input information input by three channels. As in FIG. 71G, for the pattern A, serial numbers 0 to 14 are assigned under three circular marks indicating sets of information input sensors PD1 to PD3. Also, under each serial number, exemplified are the colors emitted from the touch panel then, black (BK), white (W), red (R), green (G), blue (B), cyan (C), magenta (M), and yellow (Y). Furthermore, in the figure, when the information input sensors D1 to D3 are depicted with open circles, the information input sensor is ON, that is, exemplified is that the amount of current based on the incidence of light has exceeded the reference value, or the amount of terminal voltage based on the incidence of light has exceeded the reference value. On the other hand, when the information input sensors D1 to D3 are depicted with filled circles, the information input sensor is OFF, that is, exemplified is that the amount of current based on the incidence of light is less than the reference value, or the amount of terminal voltage based on the incidence of light is less than the reference value.

In the information input state, the display (panel) of the information device 200 is black (BK) with the serial number 0, and thus, the information input sensors D1 to D3 of the apparatus 110 are OFF. When the surface of the apparatus 110 with the information input sensors PD1 to PD3 is brought into contact with or brought into proximity with the display and, for example, if a predetermined pattern code is output from the apparatus 110 or the like, the display of the information device 200 becomes white (W) with the serial number 1 and the information input sensors PD1 to PD3 are turned on. Next, the display becomes red (R) with the serial number 2, and only the information input sensor PD1 is turned on. The series of RGB groups detected with stated depicted with serial numbers 0 to 2 indicates the start and delimiter of information code output. Afterwards, for the serial numbers 3 to 13, the display outputs information codes 11 times with the two colors of information input sensors PD2 (G) and PD3 (B), and performs a parity check at 14. When performing error checking and error correction in addition to the parity check, the display of the information device 200 or the like may output information codes when the serial number is from 3 to 14.

Here, the display turns on the detection value of the information input sensor D1 at the serial numbers 1 and 2. Thereafter, the display plays the role of a time stamp by repeating light emission so that the detection value of the information input sensor D1 alternately repeats OFF and ON at predetermined time intervals. Due to the light emission at the times of serial numbers 0 to 2 of such a display, the apparatus 110 makes it possible to recognize the start and delimiter of the information code. Herein, the information code is information transmitted from the display to the apparatus 110 based on changes in the amount of light, light wavelength (color), or the like from the display. As described above, the apparatus 110 may recognize the start timing for reading by serial numbers 1 and 2. In addition, even when an error occurs during information transmission, by having the display repeatedly output the information codes a necessary number of times, the apparatus 110 can reliably recognize the correct information code.

When the information input apparatus 132 confirms the completion of the information code reading, the apparatus 110 outputs a pattern code indicating the completion of reading from the element 111. By the pattern code indicating the completion of reading, the information device 200 can recognize the propriety of reading. Note that as the time stamp, the information input sensor D2 (G) or D3 (B) may be used.

As a result of the above, 2 bits×11=22 bits can be output even when a parity check is executed. The output time for each output is about 1/30 second, and thus it is possible to output the 22 bits of the information code in approximately 500 msec. With a display with good performance, since output is possible in about 1/60 second, the 22 bits of the information code can be recognized at about 250 msec at the shortest. Needless to say that an enormous amount of information codes can be output/recognized if the number of information code output times is increased. Note that by recognizing the delimiters 0 to 2 of the information code, the apparatus 110 can recognize the information code with the patterns before and after the delimiter. Therefore, in the information input state, the display may repeat light emission of the serial numbers 0 to 14, and it is not necessary for the information device 200 to read the predetermined pattern code (for example, a trigger pattern) indicating that the apparatus 110 surface is making contact or is in proximity. That is, the information device 200 may input the information code to the apparatus 110 by repeating light emission corresponding to the serial numbers 0 to 14 irrespective of whether or not the apparatus 110 makes contact or comes into proximity. That is, the apparatus 110 may detect repetition of light emission with serial numbers 0 to 14 and thus input information. However, input of the information code may be started from a state corresponding to any of the serial numbers 0 to 14. For example, even when input of an information code is started from any one of the states corresponding to serial numbers 3 to 14 by excluding delimiters of the information code, the apparatus 110 may merge the patterns recognized before and after the delimiter of the information code for specifying the information code. For example, when starting from the serial number 5, and 6, 7, 8, 9, 10, 11, 12, 13, 14, 0, 1, 2, 3, 4, are input, by having the apparatus 110 first recognize patterns of serial numbers from 5 to 14 before and after the delimiters 0 to 2 for the information code, then recognizes the delimiters 0 to 2 for the information code, and further recognizes serial numbers 3 and 4, it is possible to recognize the information code involving the serial numbers 5 to 14 and 3, 4.

[Pattern B]

Figure 71H:
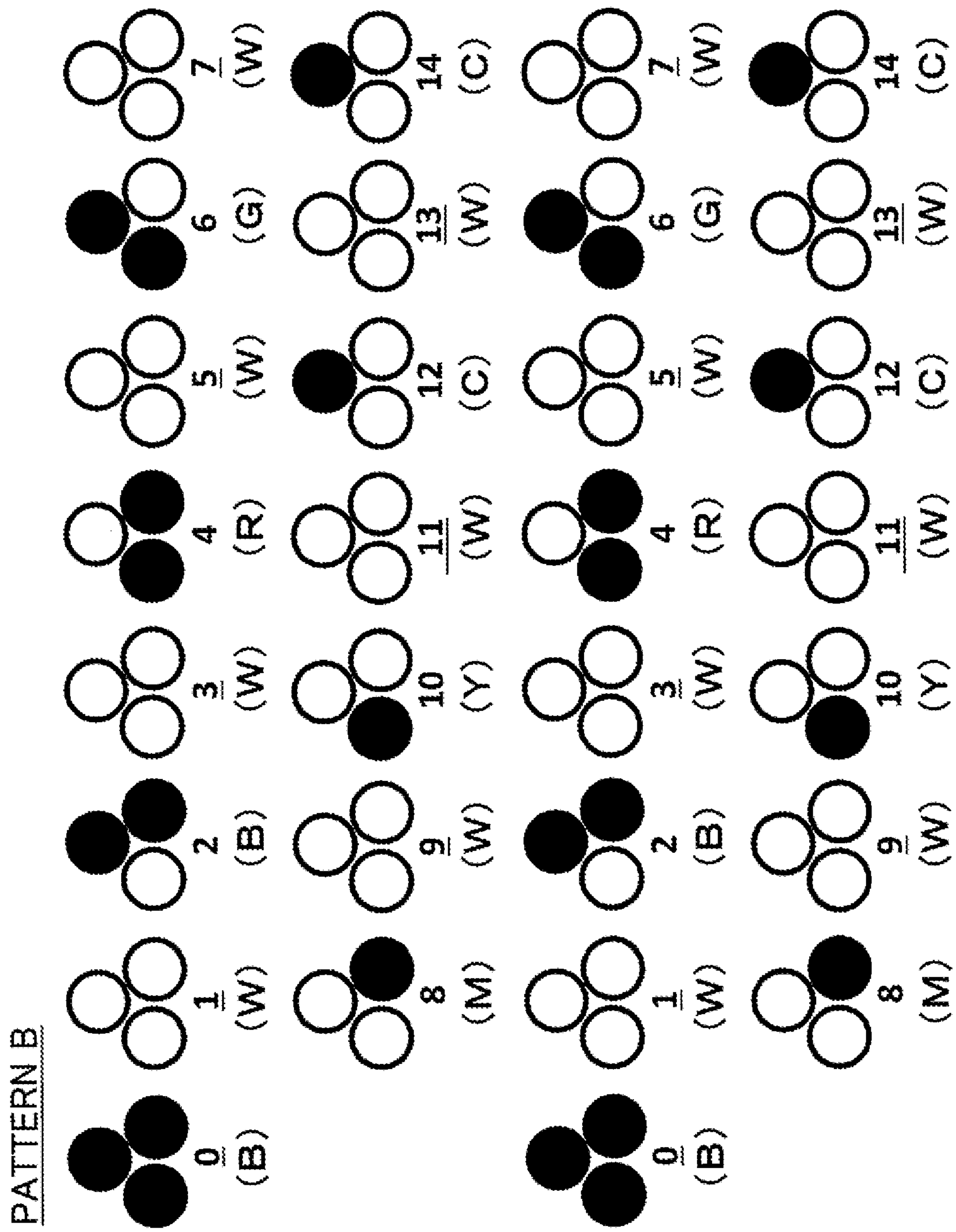
FIG. 71H is a diagram exemplifying information codes of input information input through three channels.

In FIG. 71H, the pattern B exemplifies the information code of another piece of input information input with the three channels. In the information input state, the display (panel) of the information device 200 turns off the information input sensors PD1 to PD3 with the pattern of serial number 0, and the panel turns black (BK). When the apparatus 110 is brought into contact with or brought into proximity with the display and a predetermined pattern code is output from the apparatus 110, the display turns on the information input sensors PD1 to PD3 with the pattern of the serial number 1, and turns white (W), and next, the information code output is started. Light emission at the serial numbers 0 and 1 described above indicates the start and delimiter of information code output. Afterwards, at the time of the serial numbers 2, 4, 6, 8, 10, 12, 14, the display outputs the information code 7 times with 6 colors based on the information input sensors PD1 (R), PD2 (G), PD3 (B), PD1+PD2 (Y), PD2+PD3 (C) PD3+PD1 (M). Meanwhile, by turning on the information input sensors PD1 to PD3 at the time of the serial numbers 1, 3, 5, 7, 9, 11, and 13, and the panel turns white (W), a role of a time stamp may be played. In addition, the display has the apparatus 110 recognize the start and delimiter of the information code by the black (BK) color of serial number 0. Even when a reading error occurs for the apparatus 110, by having the display repeat the information code as many times as necessary, the apparatus 110 can reliably recognize the correct information code. When the apparatus 110 confirms the completion of information code reading, it outputs a pattern code indicating the completion of reading from the element 111. The information device 200 can recognize the propriety of the reading by detecting the pattern code for the completion of reading with the touch panel. Note that for a time stamp, the information input sensors PD1 to PD3 may be turned off to show black (BK). In this case, in the information input state, the display may be set to serial number 0 and the information input sensors PD1 to PD3 are thus turned on to show white (W).

As a result of the above, the display can output an information code of 6 to the 7th power by emitting light of 6 colors, 7 times excluding the time stamp (white). The output time for each output is about 1/30 second, and thus it is possible to output 6 to the 7th power of information codes in about 500 msec. With a display with good performance, since output is possible in about 1/60 second, it is possible to recognize 6 to the 7th power of information codes in about 250 msec at the shortest. Needless to say that an enormous amount of information codes can be output/recognized if the number of information code output times is increased. Note that by recognizing the delimiter 0 of the information code, the apparatus 110 can recognize the information code with the patterns before and after the delimiter. Therefore, in the information input state, the display may repeat light emission of the serial numbers 0 to 14, and it is not necessary for the information device 200 to read the predetermined pattern code (for example, a trigger pattern) indicating that the apparatus 110 surface is making contact or is in proximity That is, the information device 200 may input the information code to the apparatus 110 by repeating light emission corresponding to the serial numbers 0 to 14 irrespective of whether or not the apparatus 110 makes contact or comes into proximity. The apparatus 110 may detect repetition of light emission with serial numbers 0 to 14 and thus input information. Note that if the apparatus 110 can recognize the time with a predetermined accuracy, the time stamp may be removed and 6 to the sixteenth power of codes may be output.

[Pattern C]

Figure 72A:
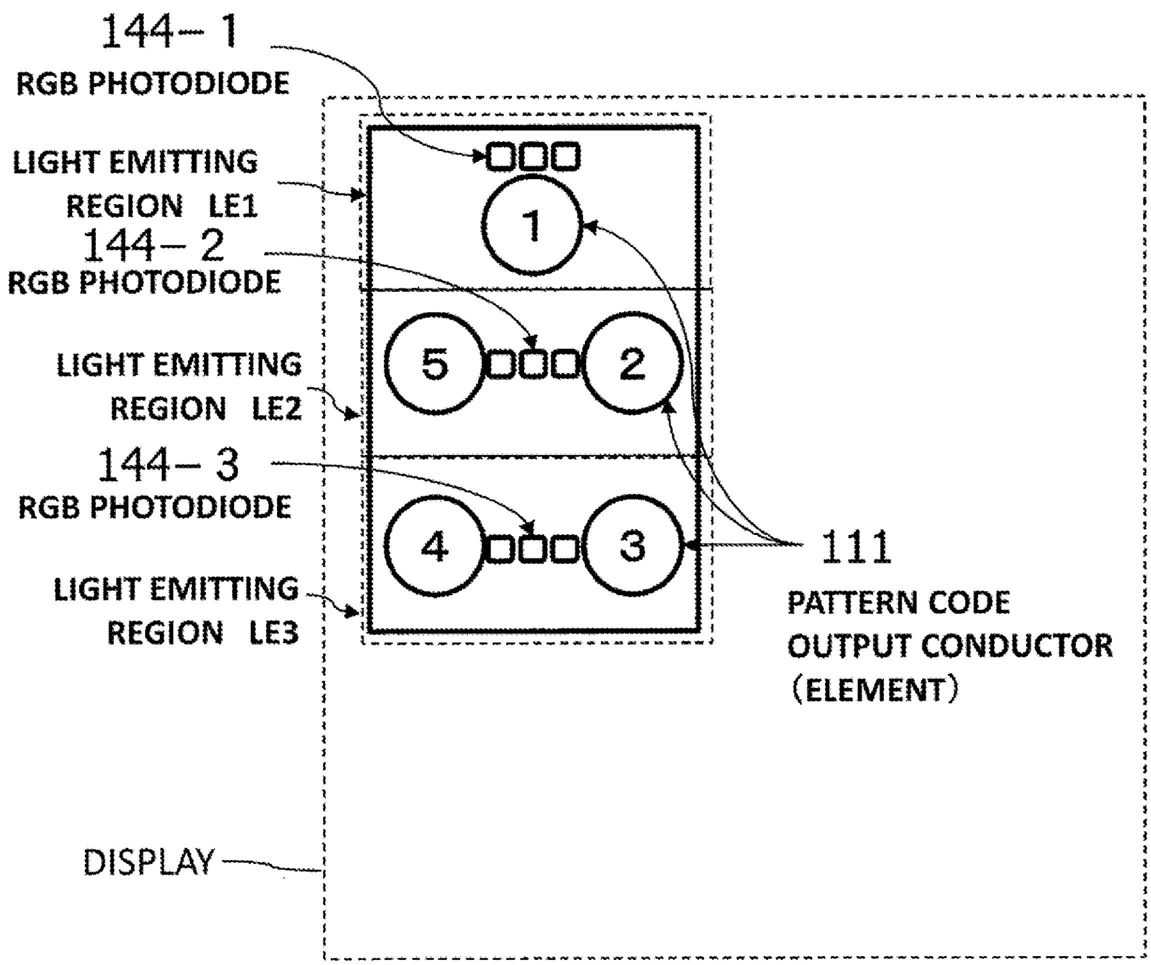
FIG. 72A is a diagram exemplifying the light emitting region of an optical code.

FIG. 72A is a diagram exemplifying a light emitting region of an optical code. In order to increase the amount of codes for the optical code, light emitting regions (display side) and light sensors (photodiode on the apparatus 110 side) may be disposed at a plurality of positions opposing each other, respectively, between the display of the information device 200 and the apparatus 110. That is, the number of the optical code emitting areas on the display of the information device 200 may be increased, and the RGB photodiodes 144 may be disposed at positions of the apparatus 110 opposing each light emitting region. Since the touch panel of the information device 200 can recognize the position information of each element 111, the positions of a plurality of photodiodes 144 provided in the card can also be recognized. Therefore, the touch panel of the information device 200 may set light emitting regions at positions on the display corresponding to positions of the RGB photodiodes 144 on the display every time the card is held over the display, and may emit optical codes. Light emitted from each light emitting region, for example, is to be an emitted light of one color. Note that light emission for the optical code and pattern output from the conductor 111 may be performed in parallel. That is, the information device 200 and the apparatus 110 may simultaneously perform bidirectional communication (the so-called full-duplex communication) by light emission from a display, and light reception by a RGB photodiode 144, or by the generation of a change in a physical quantity by an element 111, and detection by a touch panel. Also, in order to shorten the time of authentication and the like, an optical code acquired within a predetermined time may be stored and used. The RGB photodiode 144 corresponds to the optical sensor 130.

Figure 72B:
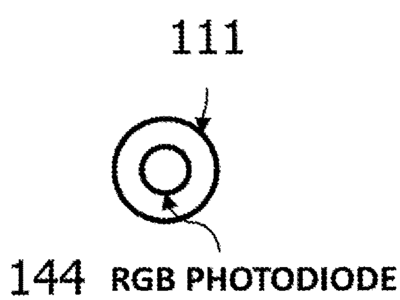
FIG. 72B is a diagram showing an example in which an RGB photodiode is incorporated in an element.

As in FIG. 72A, the light emitting regions LE1 to LE3 of the display of the information device 200 are shown overlapping with the elements 111 and the RGB photodiodes 144 of the apparatus 110 opposing the display. Note that in the figure, the display is exemplified with a dotted line. In the example of FIG. 72A, the RGB photodiode 144-1 to the RGB photodiode 144-3 are provided in areas of the apparatus 110 corresponding to the light emitting region LE1 to the light emitting region LE3 of the display, respectively. In a region of the apparatus 110 corresponding to the light emitting region LE1, the element 111 (circle marked with the numeral 1) for outputting the symbol 1 is arranged. The element 111 is also called a pattern code output conductor. In a region of the apparatus 110 corresponding to the light emitting region LE2, the elements 111 (circles marked with numerals 2 and 5, respectively) for outputting symbol 2 on the right side and symbol 5 on the left side are arranged. In a region of the apparatus 110 corresponding to the light emitting region LE3, elements 111 (circles marked with numerals 3 and 4, respectively) for outputting symbol 3 on the right side and symbol 4 on the left side are arranged. Note that the RGB photodiodes 144-1 to 144-3 may be incorporated in the element 111 as shown in FIG. 72B. Note that the RGB photodiodes 144-1 to 144-3 are collectively referred to as an RGB photodiode 144. However, the configuration in FIG. 72A is merely an example, and the positional relationship between the element 111 and the RGB photodiode 144 is not restricted to that in FIG. 72A.

Figure 72C:
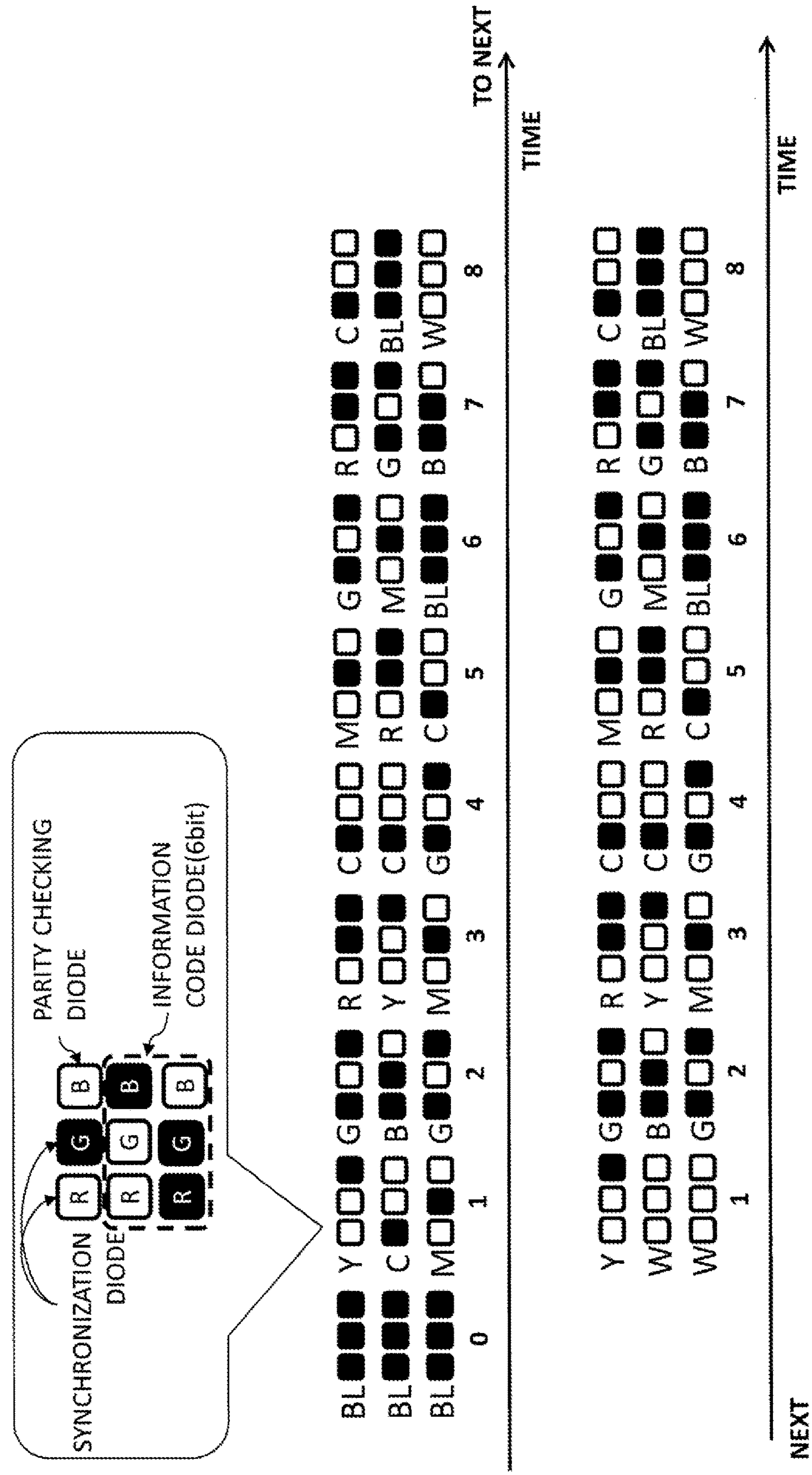
FIG. 72C is a diagram exemplifying an optical code detected by an RGB photodiode.

FIG. 72C is a diagram schematically exemplifying the ON/OFF states of the RGB photodiodes of the apparatus 110 resulting from the light emission of the display of the information device 200. In the example of FIG. 72C, the RGB photodiode 144 is composed of photodiodes arranged in the order of red (R), green (G), and blue (B) from the left. The photodiodes of the respective colors are turned on when light emission of the corresponding light is detected, and are shown in white in the figure. On the other hand, the photodiodes of the respective colors are OFF when light emission of the corresponding light is not detected, and are shown in black in the figure. In the figure, the combination of ON/OFF states of the RGB photodiodes 144 corresponding to each optical code is called a pattern. Serial numbers 0 to 8 are assigned to each pattern. Furthermore, in FIG. 72C, for example, patterns for each serial number are output at predetermined intervals on the time axis.

FIG. 72C exemplifies an optical code detected by the RGB photodiode 144. In each pattern, the outputs of the RGB photodiode 144-1 to the RGB photodiode 144-3 corresponding to the light emitting region LE1 to the light emitting region LE3 of the display of the information device 200 are arranged in an order from the top. In the 0th pattern (serial number 0), the outputs of the RGB photodiodes 144 are all OFF. Note that in the following description, the nth pattern (serial number n) is called pattern n. Furthermore, in FIG. 72C, for each of the RGB photodiode 144-1 to the RGB photodiode 144-3, color codes are clearly indicated for combinations in which RGB is ON. In the figure, the color code can depict the eight colors of black (BK), white (W), yellow (Y), cyan (C), and magenta (M), in addition to red (R), green (G), and blue (B), that is 3 bits. This is the result of setting red (R), green (G), and blue (B) to 2 gradations each. Note that in the present specification, the color code refers to digital information that can be represented by brightness, gradation, and the like in addition to hue. If red (R), green (G), and blue (B) are set to 4 gradations each, 6 bits can be presented by one light emission.

The role of the RGB photodiode 144-1 is as follows. The red (R) photodiode and the green (G) photodiode of the RGB photodiode 144-1 receive optical signals for delimiting the data block and for synchronization. On the other hand, the blue (B) photodiode of the RGB photodiode 144-1 receives optical signals for a parity check. Pattern 1, the pattern in which the light emitting region LE1 of the display emits yellow (Y) (only R and G emit) or white (W) (all three of R, G, B emit), is completely unique among patterns 1 to 8. The components of yellow (Y) and white (W) are detected at least by both the R and the G photodiodes. Therefore, the delimiter is defined by a pattern in which the light emitting region LE1 of the display emits yellow (Y) (only R and G emit) or white (W) (all three of R, G, B emit). This delimiter indicates a delimiter of a data block in which a combination of a series of optical codes is defined. That is, among pattern 1 to pattern 8, there are no independent delimiter patterns, and the part of the delimiter pattern and the part of the information pattern are combined. That is, the red (R) photodiode and the green (G) photodiode of the RGB photodiode 144-1 receive the delimiter pattern part. In addition, the RGB photodiodes 144-2 and 144-3 receive the information pattern part.

On the other hand, the roles of the RGB photodiodes 144-2 and 144-3 are as follows. In the patterns 2 to 9, the light emitting regions LE2 and LE3 emit light in synchronization with the light emission time interval of an information pattern defining an optical code. That is, the light emitting region LE1 alternately turns on the red (R) diode and the green (G) diode of the RGB photodiode 144-1. However, depending on whether the blue (B) diode for a parity check is turned on or off, the color emitted from the light emitting region LE1 is as follows. When the blue (B) component for a parity check is ON, magenta (M) (R+B are ON) and cyan (C) (G+B are ON) alternately emit light as light emission of the light emitting region LE1. On the other hand, when the blue (B) component for a parity check is OFF, red (R) and green (G) alternately emit light as light emission of the light emitting region LE1.

By the light emitting region LE1 of the display emitting light as described above, an information pattern in which the RGB photodiodes 144-1 to 144-3 emit light appropriately at each interval of time is detected, and the apparatus 110 can recognize an optical code. As a parity check for information patterns emitted in the light emitting regions LE2, LE3, the blue (B) component emitted in the light emitting region LE1 is detected by a photodiode for blue (B). In the present embodiment, the parity check may be either even parity or odd parity. In addition, the parity check may be parity including an optical signal for synchronization or may be parity of an optical signal only for defining the information code without including an optical signal for synchronization. Therefore, for example, in the case of even parity where parity is generated only with information codes, if the number of ONs of each light emitting component of the information code is odd, the light emitting region LE1 of the display emits light containing a blue (B) component. Note that as already described for FIG. 72B, a photodiode which is a light receiving element may be incorporated in the element 111.

Figure 72D:
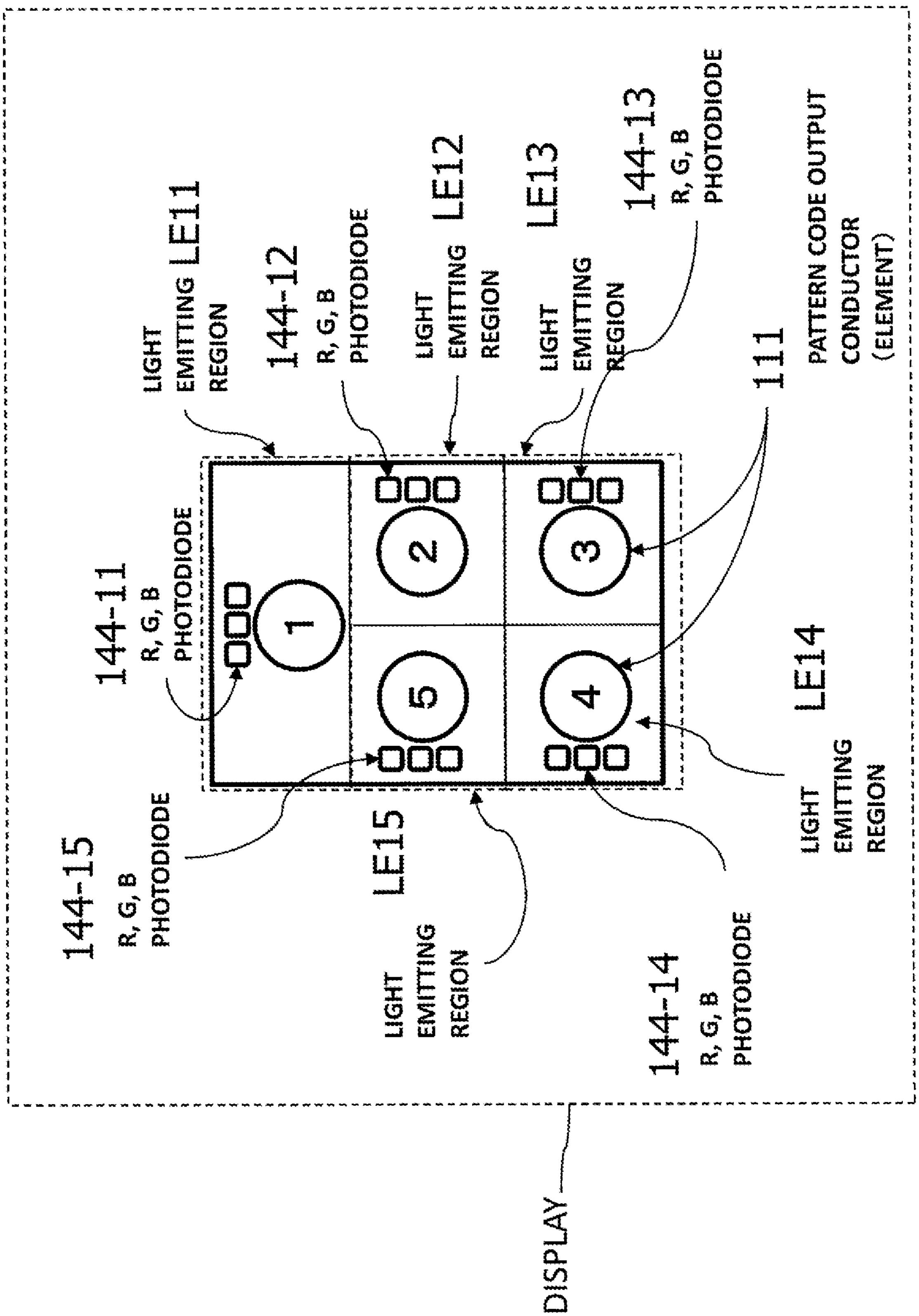
FIG. 72D is a diagram exemplifying a modification example of the light emitting region of an optical code.

Light components forming the information pattern has the three components of R, G and B, and 1 bit is used for the photodiode 144 to detect the ON/OFF of each light component. Each light emitting region can detect 3 bits by an information pattern consisting of the three components of R, G, B, and can detect 6 bits with two light emitting regions. Therefore, the pattern optical code can be defined. In order to use this for an electronic payment or the like, an optical code of 128 bits or more is to be recognized. Since the current smartphone can emit light at a time interval of 1⁄60 s, taking the security factor into consideration, if light is emitted at 1⁄30 s time intervals, 30 patterns per second can be recognized. As a result, it is possible to output/recognize an optical code of 6 bits×22=132 bits consisting of 22 information patterns including 1 data block delimiter pattern in about 0.7 to 0.8 seconds. In the case where the number of outputs of the information pattern is recognized on the card side, the card type apparatus 110 can decrypt the pattern code by acquiring the same number of patterns as that of information patterns output before and after the delimiter of the data block. That is, the card type apparatus 110 does not have to acquire all of the information patterns from a data block delimiter pattern to the next delimiter pattern. For example, when the card type apparatus 110 acquires a part of the information pattern from the first data block spanning from the delimiter pattern indicating the start to the next delimiter pattern, and acquires the remainder of the information pattern from the second data block spanning up to the next delimiter pattern, the decrypting may be ended at the stage where the lacking information pattern is fulfilled. With such a procedure, the card type apparatus 110 can shorten the decrypting time FIG. 72D is a diagram exemplifying a modification example of a light emitting region of an optical code. In the example of FIG. 72D, five light emitting regions from light emitting region LE11 to light emitting region LE15 are provided. Each of the emitting regions LE11 to LE15 has an RGB photodiode 144-11 to an RGB photodiode 144-15, respectively. It is possible to output/recognize an optical code of 12 bits×11=132 bits where information patterns are of 12 bits per information pattern, and the code consists of 11 information patterns including 1 data block delimiter pattern in about 0.44 seconds.

[Processing Flow]

Figure 72E:
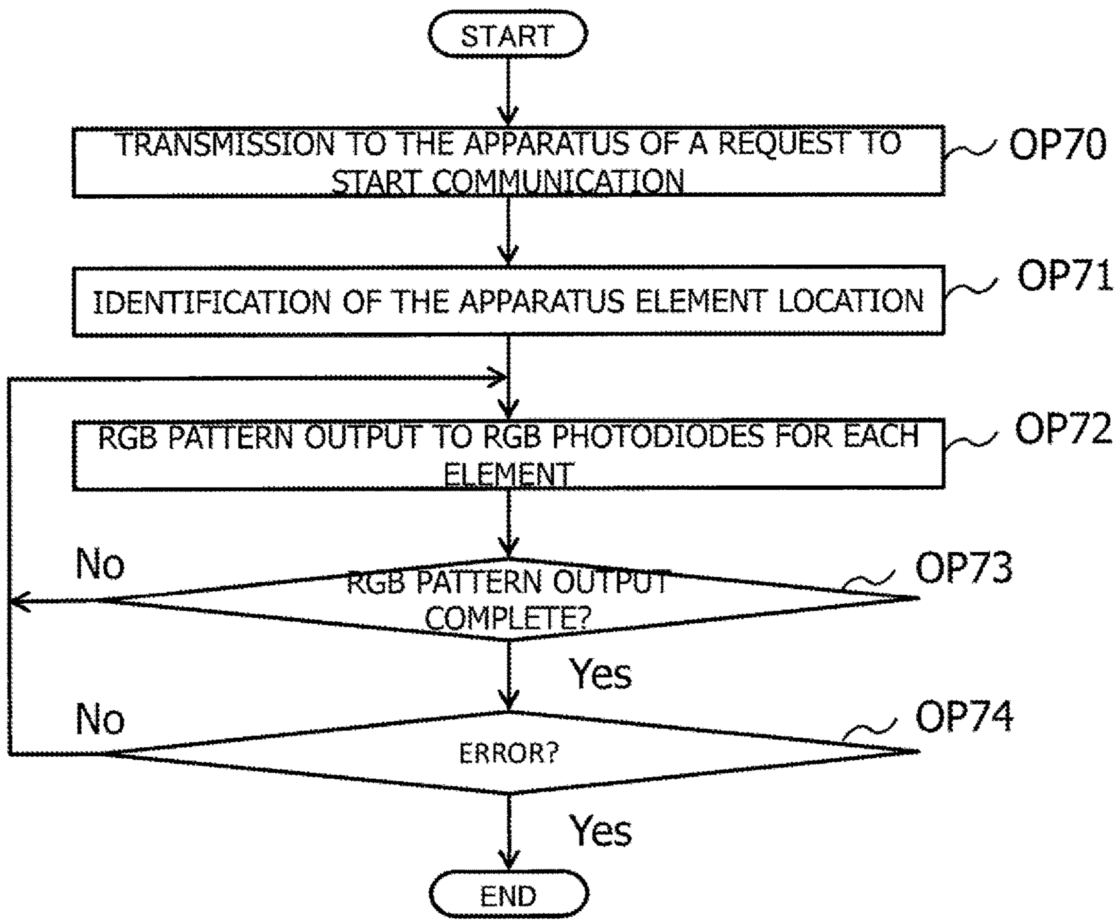
FIG. 72E is a flowchart of an example of processing of an information device specifying the position of the RGB photodiode of the apparatus and emitting an optical code.

FIG. 72E is a flowchart of an example of processing in which the information device 200 specifies the position of the RGB photodiode 144 of the apparatus 110 and emits an optical code. In this process example, the information device 200 transmits a communication start request to the apparatus 110 (OP70). The communication start request is, for example, a combination of black (BK, not light emitting) with serial number 0 and white (W) with serial number 1 indicated by pattern B in FIG. 72H. For the combination of black (BK) and white (W), since all of the RGB photodiodes 144 receive light of the same color, the information device 200 does not need to specify the regions of the diodes. Then, for example, the apparatus 110 makes the touch panel of the information device 200 detect a change in a physical quantity in the element 111 by changing the ON/OFF state of SW115 in the first embodiment. Then, the touch panel of the information device 200 specifies the arrangement position of the element 111 from the position where the physical quantity change is detected (OP71). Next, the information device 200 outputs an RGB pattern to the position of the RGB photodiodes 144 specified from the arrangement position of each element 111 (OP72). Note that, in OP72, although omitted from the drawing, a plurality of data blocks necessary for data transmission may be made to be output.

Then, the information device 200 determines whether or not output (communication) based on the RGB pattern is complete (OP 73). The completion of the pattern output (communication) refers to, for example, the completion of a series of transmissions of data to be transmitted from the information device 200 to the apparatus 110. The information device 200 repeats the processing of OP72 until the series of data transmissions is complete. When the series of data transmissions is complete, the information device 200 determines whether or not there is an error (OP 74). A case where there is an error refers to, for example, a case where a response indicating completion cannot be received from the apparatus 110 through the element 111. In addition, a case where there is an error refers to, for example, a case where an occurrence of communication error is notified from the apparatus 110 via the element 111. If there is an error, the information device 200 returns to OP72 and re-executes the output of the RGB pattern until the predetermined number of retrials is reached. And, if there is no error, the information device 200 ends the processing.

Figure 72F:
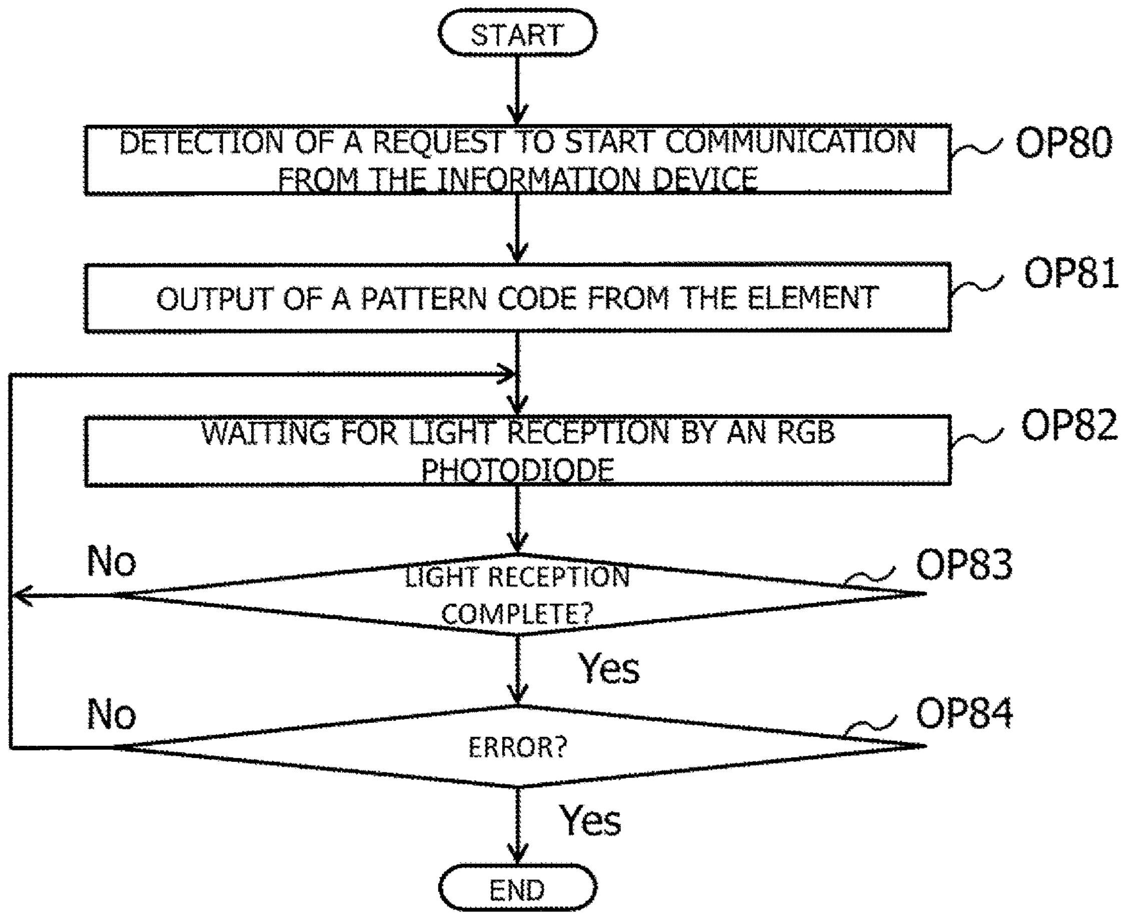
FIG. 72F is a flowchart of an example of processing of an apparatus receiving an optical code from an information device for each RGB photodiode.
Figure 72G:
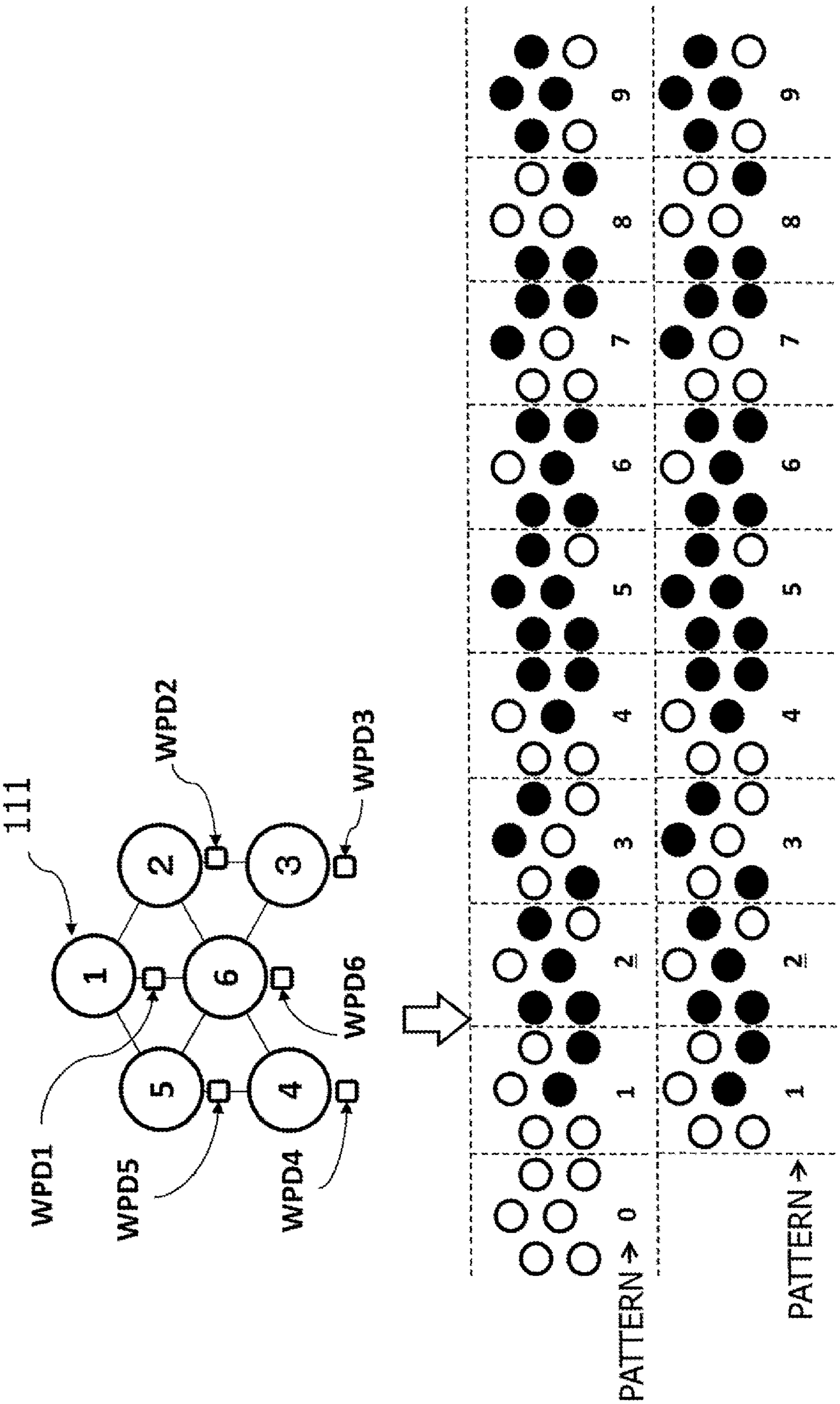
FIG. 72G is a diagram showing an example of pattern code output.

Note that as in FIG. 72E, output (communication) based on the pattern of RGB from the information device 200 to the apparatus 110 is started. However, the implementation of the present invention is not restricted to such a procedure. For example, output (communication) may be started by the touch panel of the information device 200 upon detecting a change in a physical quantity from the apparatus 110 via the element 111. When the information device 200 detects a pattern code via the element 111, beforehand, the information device 200 can recognize the arrangement of the elements 111 and the RGB photodiodes 144. Therefore, as shown in FIG. 72F, it is not necessary for all of the RGB photodiodes 144 to be emitted light of the same color, such as a combination of black (BK) and white (W). Thus, for example, as shown in FIG. 72G, the information device 200 may make a request to the apparatus 110 for starting the output of an information code based on a series of RGB detected with serial numbers 0 to 2 (black (BK) with serial number 0, white (W) with serial number 1, red '(R) with serial number 2) or the like.

FIG. 72F is a flowchart of an example of processing in which the apparatus 110 receives an optical code from the information device 200 for each RGB photodiode 144. In this processing, the apparatus 110 detects a communication start request from the information device 200 (OP80). The transmission start request is received by a plurality of RGB photodiodes 144 of the apparatus 110, for example, by a change in the amount of light emitted without restricting the area on the whole surface of the display of the information device 200. When any one of the RGB photodiodes 144 detects a transmission start request, the apparatus 110 outputs a pattern code from the element 111 (OP81). Then, the apparatus 110 enters a standby state for the reception of light by the RGB photodiode 144 (OP82). The apparatus 110 decrypts transmission data of the information device 200 from the received RGB pattern (OP83). And, the apparatus 110 determines whether or not communication based on the RGB pattern is complete (OP84). The completion of communication based on the RGB pattern refers to, for example, the completion of a series of transmissions of data to be transmitted from the information device 200 to the apparatus 110. Upon the completion of transmission, the information device 200, for example, notifies the apparatus 110 of the completion of transmission by an RGB pattern. Note that the information device 200 repeats transmission by a RGB pattern until a series of data transmissions is complete. When the series of data transmissions is complete, the information device 200 determines whether or not there is an error (OP85). The case where there is an error refers to, for example, a case where an error is detected by a parity check or the like in the apparatus 110. If there is an error, the apparatus 110 returns to OP82 and repeats the receiving and the decrypting of RGB patterns until a predetermined number of retrials is reached. If there is no error, the apparatus 110 ends the processing.

Note that as in FIG. 72F, communication based on the RGB pattern from the information device 200 to the apparatus 110 is started. However, the implementation of the present invention is not restricted to such a procedure. For example, output communication may be started by having the touch panel of the information device 200 detect a change in a physical quantity through the element 111 by the apparatus 110.

[Another Example of Pattern Codes and Optical Codes]

FIGS. 72G to 72K describe another specifications of a card type device in which a pattern code is output and an optical code is received.

FIG. 72G is a diagram showing an example of pattern code output. Note that a pattern delimiter is indicated by a dotted line. In the example of FIG. 72G, among the six conductors (elements) 111, an element 111 (circle marked with the numeral 6) that outputs the symbol 6 is arranged at the center. An element 111 (circle marked with the numeral 1) that outputs the symbol 1 is arranged above the element 111 that outputs the symbol 6. On the upper right, lower right, lower left, upper left of the element 111 which outputs the symbol 6, elements 111 (circles marked with numerals 2 to 5, respectively) for outputting the symbols 2 to 5 are arranged. Photodiodes WPD1 to WPD6 are disposed beneath each symbol, respectively. Although when the diameter from the edge of the substantially circular shapes is 7 mm, and the distance between the centers of the respective elements 111 is thus about 12 mm, for the latest model, about 10 mm is enough for a smartphone to reliably recognize a pattern output from each element 111. Although the diameter from the edge of the substantially circle can be further reduced, it is desirable to separate adjacent elements by the distance of about 4 mm or more.

With a current smartphone, only five multi-touches can be recognized. Thus, here, output by the elements 111 to a touch panel capable of five multi-touches is exemplified. Note that in FIG. 72G, ON of each element 111 is indicated with black, OFF is indicated with white. Here, a combination of an element 111 that is ON and an element 111 that is OFF is called a pattern. Also, in the figure, serial numbers 0 to 9 are assigned to each pattern. In the pattern 0 which is the initial state, each element 111 is in an OFF state. The ON/OFF of each element 111 is switched in the order of pattern 1 to pattern 9, and a pattern code is output.

For the pattern 1, the symbol 6 is in the ON state to make it distinguishable from the pattern 0. As delimiters of a data block, pattern 1 and pattern 2 consecutively have the symbol 1 set to the OFF state. Symbols 2 to 5 of pattern 1 are output with ON/OFF reversed in regards with pattern 2 to make it distinguishable from pattern 2. The ON/OFF states of symbols 2 to 5 of pattern 2 are set as parity check bits corresponding to symbols of information patterns 3 to 9. For the output of information patterns 3 to 9, the ON/OFF of symbol 1 is repeated in order to recognize the pattern output interval. Symbol 1 is set to be ON in the information pattern 3, and information pattern 9 is also set to end with symbol 1 ON. That is, patterns with symbol 1 ON are made not to occur twice in succession.

For the patterns 3, 5, 7, and 9 in which the symbol 1 is ON, information according to each pattern is defined by selecting 0 to 4 symbols from the five symbols 2 to 6 and combining them. Therefore, the definable amount of information is ${}_5C_4+{}_5C_3+{}_5C_2+{}_5C_1+1=31$ (4.95 bits). On the other hand, for the patterns 4, 6, and 8 in which the symbol 1 is OFF, information according to each pattern is defined by selecting 0 to 5 symbols from the five symbols 2 to 6 and combining them. Therefore, the definable amount of information is ${}_5C_5+{}_5C_4+{}_5C_3+{}_5C_2+{}_5C_1+1=32$ (5 bits).

After pattern 9 is output, pattern 1 and pattern 2, which are delimiter patterns, are output, and then information patterns 3 to 9 are output.

Figure 72H:
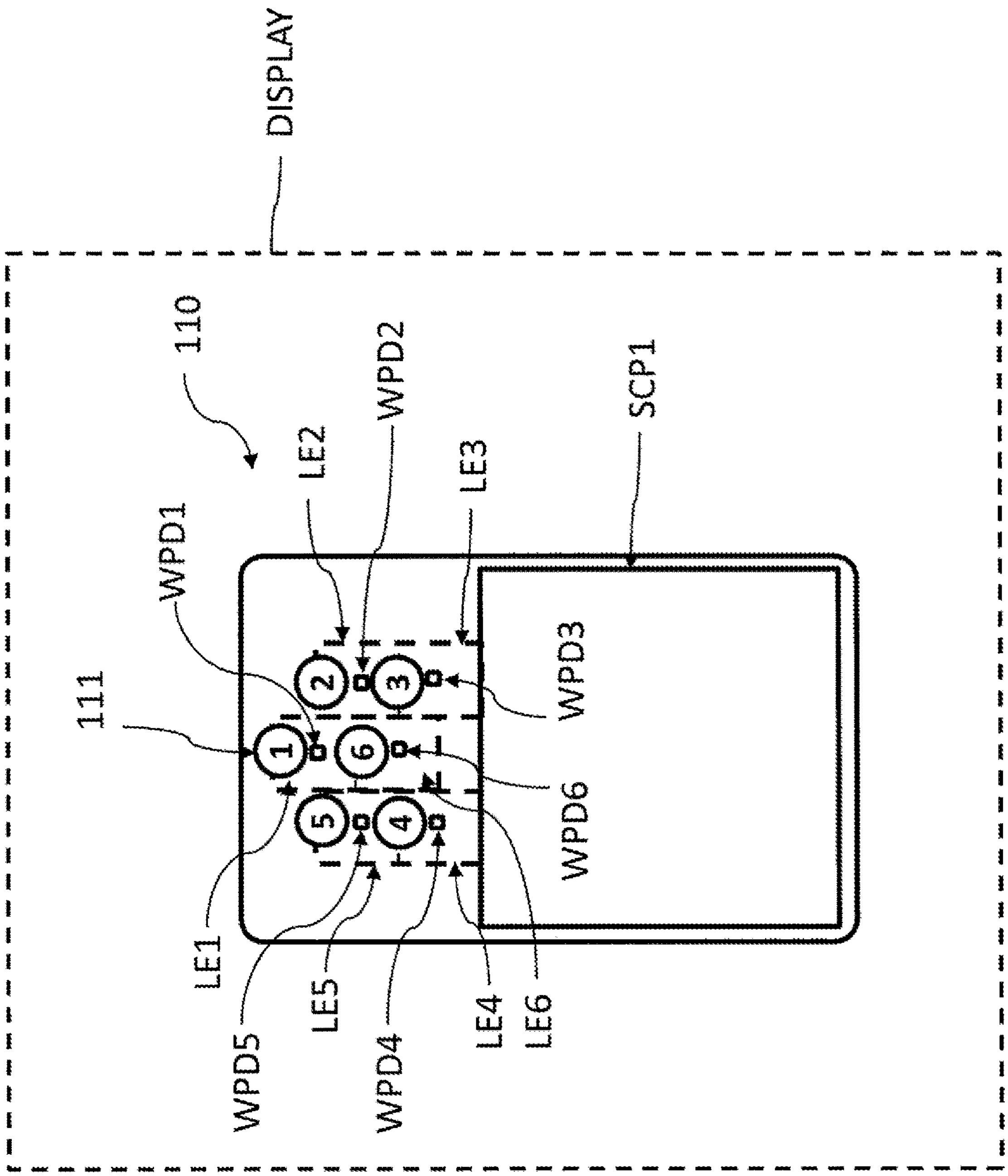
FIG. 72H is a schematic diagram showing an example of a configuration of the light receiving surface of a card-type device.

FIG. 72H is a schematic diagram showing an example of the configuration of the light receiving surface of the apparatus 110 having the arrangement of the elements 111 in FIG. 72G. Note that in FIG. 72H, in order to clearly show that the light emitting regions LE1 to LE6 are regions of the display, a display is drawn virtually with broken lines. The light receiving surface of the apparatus 110 has six elements 111 (exemplified in the figure with circles marked with the numerals 1 to 6 exemplifying the symbols, respectively), photodiodes WPD1 to WPD6, and a photoelectric conversion element array SCP1 which is a solar panel. The arrangement of the elements 111 is the same as that exemplified in FIG. 72G.

The photodiodes WPD1 to WPD6 are respectively disposed at positions surrounded by broken lines corresponding to the optical code emitting regions LE1 to LE6 of the display of the information device 200. In this example, the photodiodes WPD1 to WPD6 receive light directly from the display of the information device 200 without having a filter set. With such a configuration, the photodiodes WPD1 to WPD6 generate currents (or terminal voltages for a predetermined resistance) with sufficient sensitivity by photoelectric conversion of the light received from the display, and information (optical code) can be input from the optical signal. Therefore, restrictions of wavelength are not particularly set for the photodiodes WPD1 to WPD6. The photodiodes WPD1 to WPD6 can receive, for example, white light. Note that the apparatus 110 has a thin card shape with a thickness of less than 1 mm. On the other hand, for the display, the light emitting regions LE1 to LE6 emit light with independent amounts of light and the display has the corresponding photodiodes WPD1 to WPD6 receive the light. With such a configuration, it is possible to input information of a plurality of channels from the display to the apparatus 110 by dividing the light emitting region of the display without restricting the wavelength.

Figure 72I:
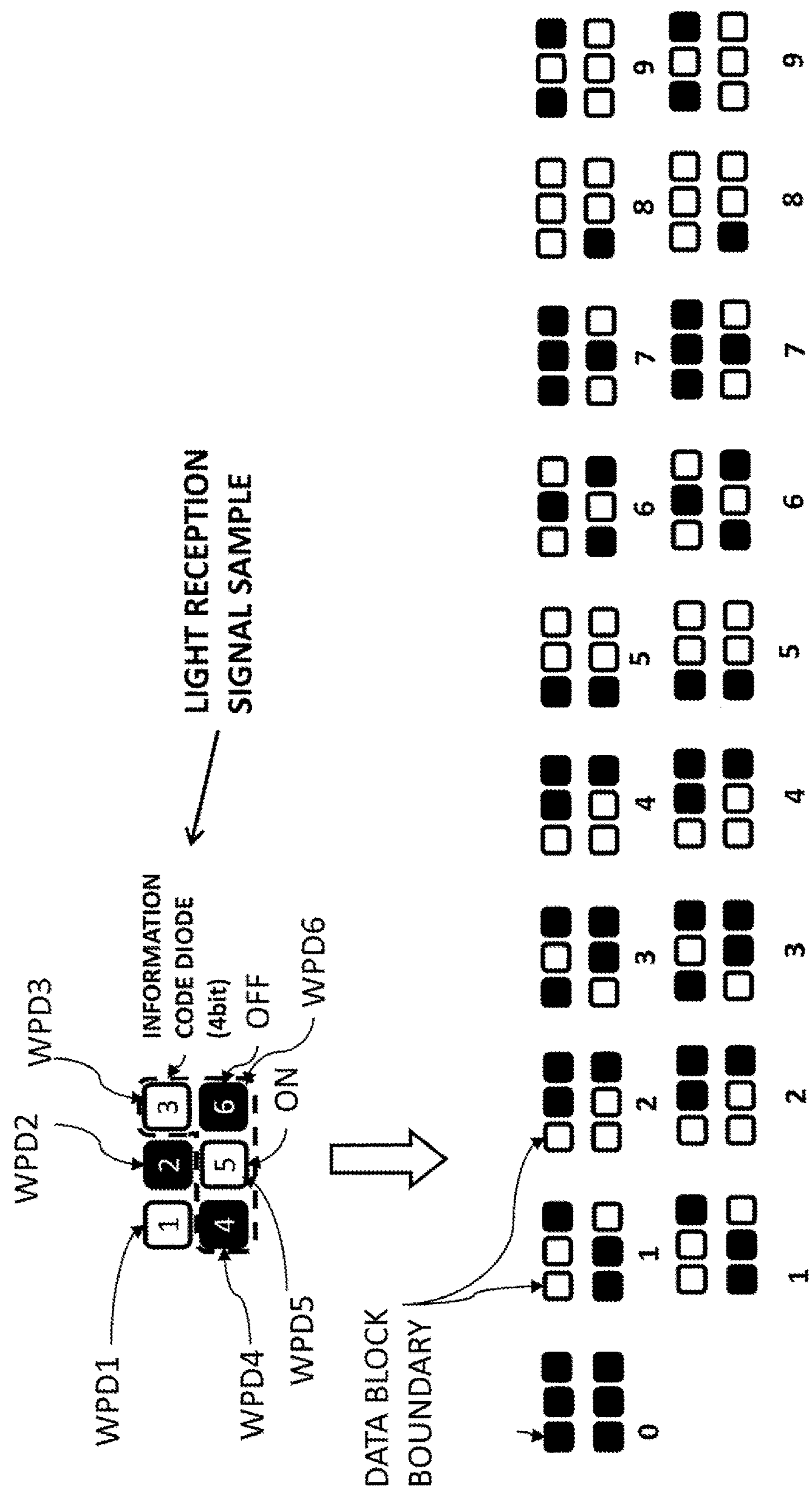
FIG. 72I is a diagram exemplifying an optical code input to an RGB photodiode.

FIG. 72I exemplifies an optical code input to a photodiode. In this figure, as exemplified in the light-receiving signal sample, each light receiving element (the photodiodes WPD1 to WPD6) of the diodes WPD1 to WPD6 which receive independent amounts of light from the corresponding light emitting regions LE1 to LE6 are exemplified in two rows and three columns. Thus, among the 2 rows and 3 columns, the upper row exemplifies the three light receiving elements of the photodiodes WPD1 to WPD3. Also, among the 2 rows and 3 columns, the lower row exemplifies the three light receiving elements of the photodiodes WPD4 to WPD6.

In this figure, rectangular areas filled with white indicate that the three light receiving elements among the photodiodes WPD1 to WPD6 are ON, that is, they are receiving light. On the other hand, the chamfered rectangular areas filled with black indicate that the three light receiving elements among the photodiodes WPD1 to WPD6 are OFF, that is, not receiving light. Also in this figure, an optical code is exemplified by a combination of the ON and OFF of the light receiving elements included in the photodiodes WPD1 to WPD6, respectively. In addition, serial numbers 1 to 9 are attached to each optical code.

With this optical code, white light is emitted twice in succession in the light emitting region LE1 of the display as a delimiter of the data block. A series of optical codes separated into data blocks is called an information code. Note that in some cases, an electrostatic capacitance code is also referred to as an information code. Therefore, for this optical code, as for light emission in the initial state, unless the optical code emitting region LE1 of the display emits light, the light emitting regions LE2 to LE6 may emit light of any color or may not emit light. Also with this optical code, by the optical code emitting region LE1 of the display alternately emitting white light in the patterns of serial numbers 2 to 9, the light receiving apparatus 110 is made to synchronize with the light emitting side. That is, the optical code emitting region LE1 of the display alternately emits white light with the patterns of serial numbers 2 to 9. Furthermore, the optical code emitting region LE2 of the display is used for a parity check. Therefore, the other light emitting regions LE3 to LE6 for the optical code of the display can transmit (output) 4 bits in total with one light emission. The photodiodes WPD3 to WPD6 can receive (input) 4 bits in total by one reception of light from the corresponding region of the display. Hereinafter, the photodiodes WPD3 to WPD6 are referred to as information code diodes. Note that if an error occurs in the parity check, the apparatus 110 may input an instruction for reemission of light to the touch panel of the information device 200 with the element 111.

If the optical code emission time interval is 1/30 s in pattern 1 to pattern 9, the amount of information exchanged between the display of the information device 200 and the apparatus 110 in 300 msec is 4 bits×9=36 bits. If the optical code emission time interval can be set to 1/60 s, the amount of information exchanged in 550 msec is 4 bits×33=132 bits, and the display of the information device 200 and the apparatus 110 can exchange 128 bits necessary for financial payments. Note that if the display outputs a delimiter with three consecutive ONs including the R component of the light emitting region LE1 of the 32nd pattern, the photodiodes WPD1 to WPD6 can recognize an optical code at a transmission rate of 4 bits×32=128 bits in 533 msec (240 bit/sec). In the specification exemplified in FIG. 72I, when white light is used for exchanging an optical code, the apparatus 110 may be made to recognize the brightness of the white color in multiple stages. For example, since one diode can recognize from 4 tones to about 16 tones, it is possible to output an optical code of 8 bits to 16 bits with one emission of light and the above transmission rate is 480 to 960 bit/sec.

Figure 72J:
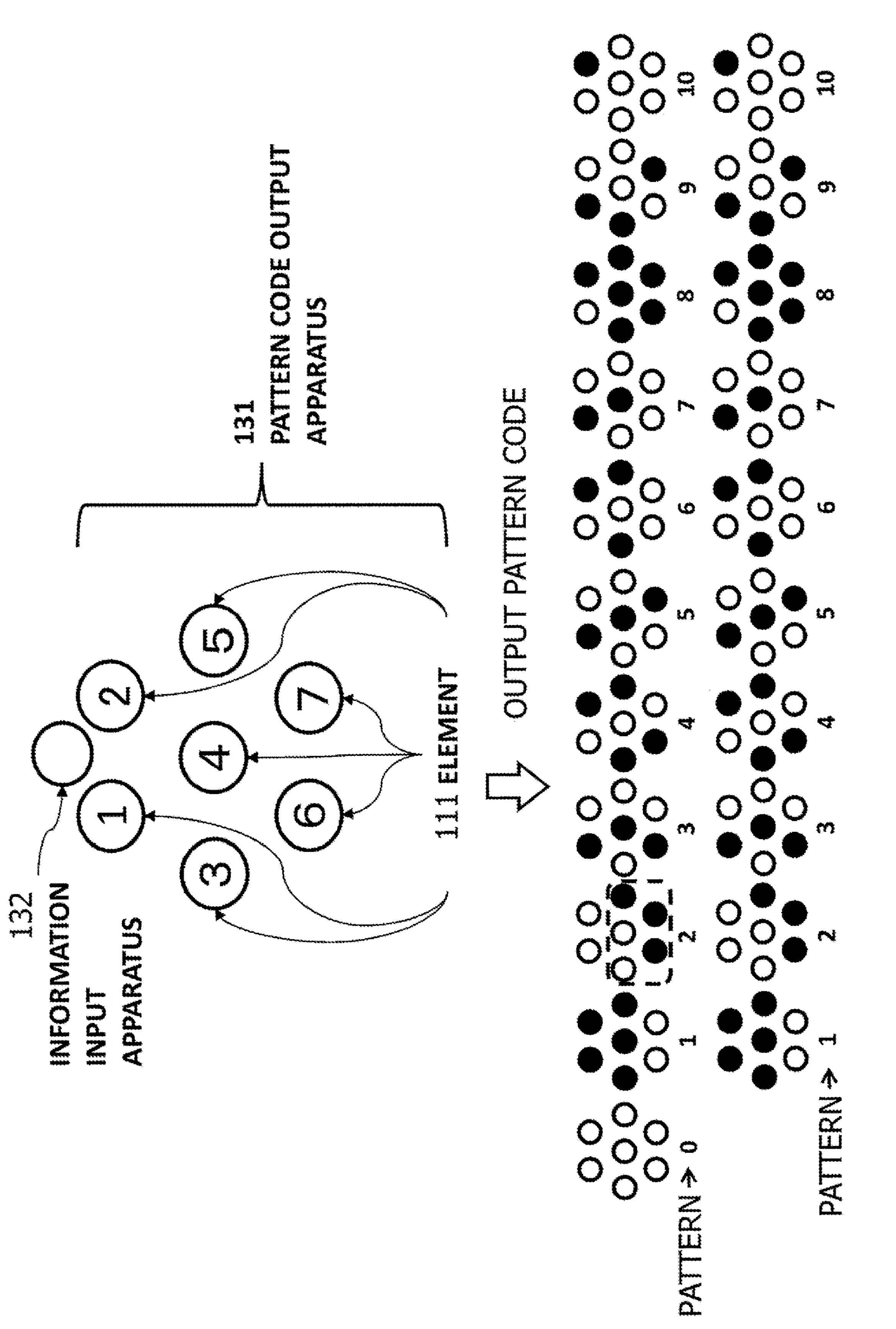
FIG. 72J is an example of another arrangement of components on the back side of an apparatus and an example of a pattern code output by this arrangement example.

FIG. 72J shows another arrangement example of components on the back side of the apparatus 110 and an example of a pattern code output by this arrangement example. In the figure, a pattern code output device 131 including seven elements 111 and an information input device 132 (optical sensor 130) are exemplified. Also, each element 111 of the pattern code output device 131 is exemplified by circles marked with the numerals exemplifying symbols 1 to 7, respectively. With the pattern code output device 131, the distances between all adjacent elements 111 are the same. With such a configuration, when the apparatus 110 electrically controls the ON/OFF of a physical quantity such as electrostatic capacitance (electric field strength) effects the information device 200, the extent to which the electrostatic capacitance effects the touch panel (or electric field intensity) is stabilized in any one of the elements 111. Furthermore, the touch panel can accurately recognize the center position of the element 111.

Furthermore, serial numbers 0 to 10 are assigned to each pattern of the pattern code. As in the eighth embodiment and the like, the pattern with the serial number n is referred to as pattern n. Also, in each pattern, a filled circle indicates the ON of a symbol, and an open circle indicates the OFF of a symbol. As described in the first embodiment, ON and OFF correspond to the ON and OFF of SW115. Also here, a case where the information device 200 can recognize only 5 multi-touches like the current smart phone is assumed.

For pattern 1, by turning symbols 1 to 5 ON, the apparatus 110 makes the touch panel recognize the orientation of an arrangement of the elements 111 in the pattern code output device 131. That is, by detecting the ONs of the symbols 1 to 5 in pattern 1, the touch panel recognizes the orientation of an arrangement of the elements 111. As a result of the recognition, the information device 200 can also accurately estimate the position of the elements 111 corresponding to the symbols 6 and 7 from the positional relationship of the elements 111 corresponding to the recognized symbols 1 to 5.

For pattern 2, symbols 1 and 2 are turned off, and afterwards, for pattern 3 to pattern 10, symbols 1 and 2 are alternately turned on and off. When patterns 1 to 10 are finished, patterns 1 to 10 are repeated. Such an output pattern is unique and the delimiter of the data block can be recognized.

By alternately turning symbols 1 and 2 on and off for pattern 3 to pattern 10, the touch panel can recognize synchronizing signals that synchronize with changes in the information patterns of symbols 3 to 7, and patterns output from the apparatus 110 with accuracy. Furthermore, since the position information of the symbols 1 and 2 can always be recognized, even if the stamp of the zeroth embodiment, the apparatus 110 or the like of the embodiments 1 to 8 slips and rotates on the touch panel, the information device 200 including the touch panel can easily estimate the change in the position of the element 111 that outputs the information pattern (symbols 1 to 7), and accurately recognize the pattern code. The amount of information of the information pattern corresponds to the combinations of selecting 0 to 4 symbols from the five symbols 3 to 7. With one output, ${}_5C_4+{}_5C_3+{}_5C_2+{}_5C_1+1=31$ (4.95 bits) can be defined. Note that symbols 3 to 7 of pattern 2 may be used as parity check bits for the information pattern of pattern 3 to pattern 10.

If the symbol output time interval is 50 msec for the data blocks of pattern 1 to pattern 10 formed by combinations of the above symbols 1 to 7, the amount of information of 4.95 bit×8=39.6 bits is exchanged in 500 msec. When the electronic device 200 is equivalent to the high speed touch panel of the current smart phone, the recognition time interval of the electronic device 200 can be assumed to be 12 msec. However, here, by designing with the security factor for the recognition of symbol 1 to symbol 7 from the element 111 to be triple and setting the symbol output time interval to 36 msec, if the security factor of conductor recognition can be set to be double for 1 second and the element output time interval can be set to 24 msec, 4.95 bit×26=128.7 bits of information quantity can be defined in 672 msec. In any case, 128 bits necessary for financial payments can be output within a period of about 0.6 seconds to 1 second.

Figure 72K:
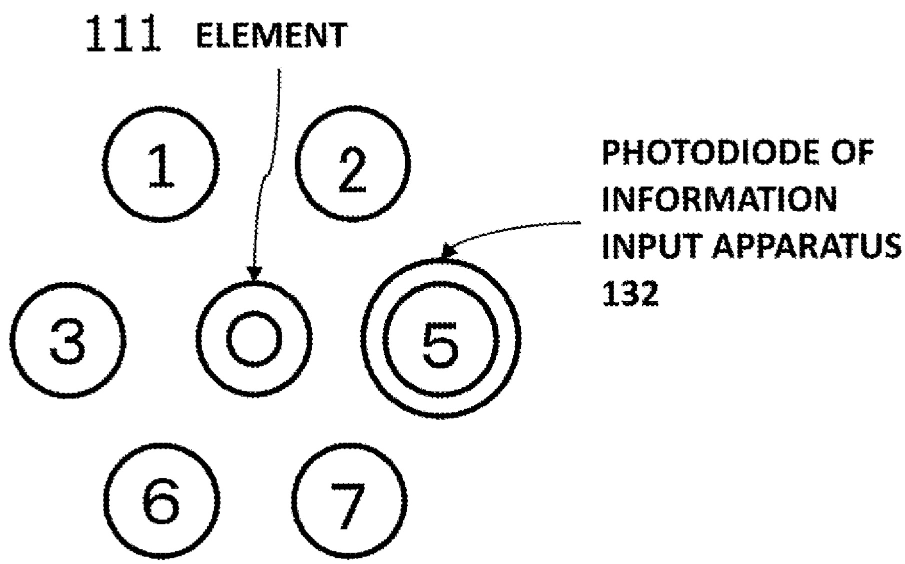
FIG. 72K is a diagram exemplifying another configuration of an element and a photodiode contained in an information input device (optical sensor)

FIG. 72K is a diagram exemplifying another configuration of the element 111 and photodiodes included in the information input device 132 (optical sensor 130). As shown in the figure, the photodiodes and the element 111 may be formed in concentric circles. For example, the light receiving unit of a photodiode may be arranged in an annular region (cylindrical region) on the rear surface of the apparatus 110, and the conductor element 111 may be arranged in an inner circle (cylindrical region inside the cylinder). Or conversely, on the rear surface of the apparatus 110, the conductor element 111 may be arranged in an annular region (cylindrical region), and the light receiving unit of the photodiode may be arranged in an inner circle (cylindrical region inside the cylinder).

Note that when the touch panel of the information device 200 such as a smartphone recognizes a physical quantity (electrostatic capacitance, electric field strength, or the like) based on the conductor element 111, there are cases in which there are limitations concerning the distance between centers of adjacent conductor and the distance between edges of adjacent conductor. However, with respect to the size of a conductor, there is no problem as long as there is some effect by the predetermined electrostatic capacitance or electric field intensity is generated. Therefore, the size of the conductor may be reduced to the extent that the touch panel of the electronic device 200 can still recognize a physical quantity from the element 111. However, anyhow, if the application program executed by the information device 200 sets various restrictions, that is not the case.

Figure 72L:
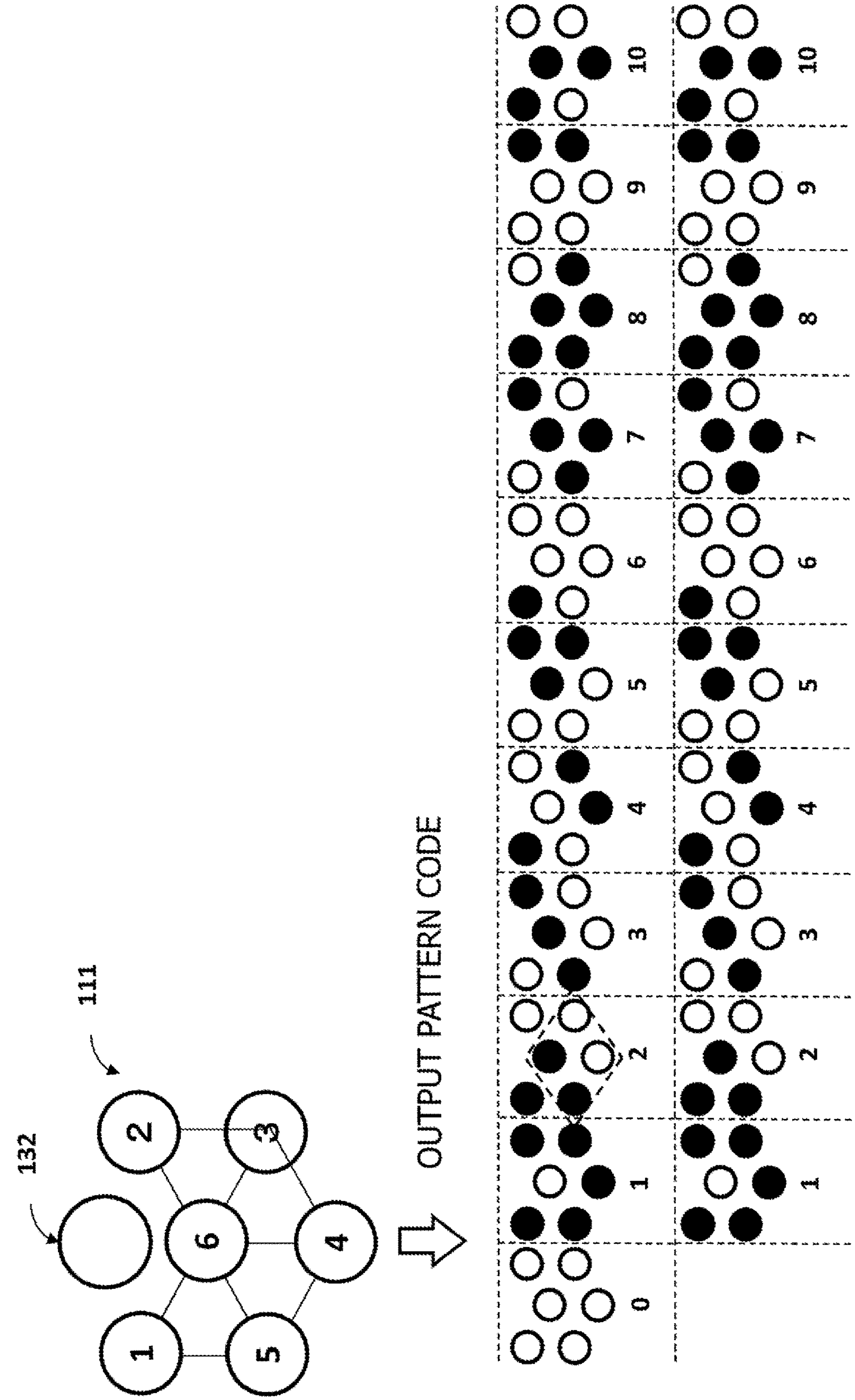
FIG. 72L is an example of another arrangement of components on the back side of an apparatus and an example of a pattern code output by this arrangement example.

FIG. 72L shows another arrangement example of components on the back side of the apparatus 110 and an example of a pattern code output by this arrangement example. This arrangement can be applied to, for example, the stamp type code generation apparatus 1 described in the zeroth embodiment and the apparatus 110 described in the first to the eighth embodiments. In the figure, a pattern code output device 131 including six elements 111 and an information input device 132 (optical sensor) are exemplified. Each element 111 of the pattern code output device 131 is exemplified with a circle marked with a numeral corresponding to symbols 1 to 6, respectively. As in FIG. 72J, for the pattern code output device 131, the distances between all adjacent elements 111 are the same.

Also, serial numbers 0 to 10 are assigned to each pattern of the pattern code. In each pattern, the filled circle indicates that the symbol is ON, and the open circle indicates that the symbol is OFF. In pattern 1, by turning the symbols 1 to 5 ON, the code generation apparatus 1 and the apparatus 110 make the touch panel recognize the orientation of the arrangement of the elements 111 in the pattern code output device 131. That is, by detecting the symbols 1 to 5 ON in pattern 1, the touch panel recognizes the orientation of the arrangement of the elements 111. As a result of the recognition, the information device 200 can accurately estimate the position of the element 111 corresponding to the symbol 6 from the positional relationship of the elements 111 corresponding to the recognized symbols 1 to 5.

In pattern 2 to pattern 10, symbols 1 and 2 alternately repeat ON and OFF. By this repetition of the symbols, the touch panel can recognize synchronizing signals that synchronize with changes in the information patterns of symbols 3 to 7, and patterns output from the apparatus 110 with accuracy. Furthermore, since the position information of the symbols 1 and 2 can always be recognized, even if the stamp type code generation apparatus 1 of the zeroth embodiment, the apparatus 110 or the like of the embodiments 1 to 8 slips and rotates on the touch panel, the information device 200 including the touch panel can easily estimate the change in the position of the element 111 that outputs the information pattern (symbols 1 to 6), and accurately recognize the pattern code.

If the symbol output time interval is 50 msec for data blocks of pattern 1 to pattern 10 formed by the combination of the above symbols 1 to 6, 4 bits×8=32 bits of information quantity is exchanged in 500 msec. Since recent models of smartphones can recognize touches at intervals of 12 msec, if the stamp type code generation apparatus 1 is made to output a pattern code every 32 msec taking the security factor into consideration, a 32 bit pattern code can be recognized in about 320 msec at the shortest. Note that if the code generation apparatus 1 and the apparatus 110 include an information reading apparatus capable of reading a dot code, the dot code read by the information reading apparatus may be directly output from the pattern code output device 131 to the touch panel.

<<Special Pattern Code Specification>>

Figure 72M:
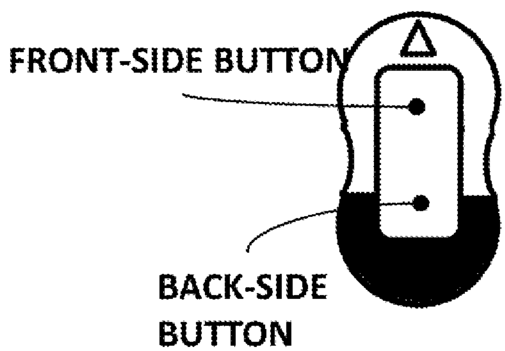
FIG. 72M is a diagram exemplifying a front button and a rear button provided either on the bottom side of a stamp-type code generation apparatus or on the back side (the side which comes into contact with the touch panel) of a card-type apparatus.

FIG. 72M exemplifies a front button and a rear button provided on the bottom face of the stamp type code generation apparatus 1 described in the zeroth embodiment or on the back side (the side that comes into contact with the touch panel) of the apparatus 110 described in the first to the eighth embodiments. When the user presses the front area and the rear area in the upper side of the stamp type code generation apparatus 1, and the front area and the rear area of the front side of the apparatus 110, the buttons on the bottom face of the code generation apparatus 1 and the back side of the apparatus 110 are turned on. The front button and the rear button are used for an interruption operation of the code generation apparatus 1 or the apparatus 110. In the interruption operation, by outputting a pattern called a special pattern from the code generation apparatus 1 or the apparatus 110 to the touch panel of the information device 200, the pattern code processing program on the information device 200 can be made to recognize the special pattern, and the so-called interruption processing can be executed. Here, the special pattern is in a manner a reservation pattern, which is output from the pattern code output device 131 and which is a pattern that can clearly be distinguished from the pattern of the data block exemplified in FIG. 72L.

The information generating apparatus 200 that executes an application program responding to the code generating apparatus 1 or the apparatus 110 has the special pattern be stored beforehand and when receiving the special pattern from the code generating apparatus 1 or the apparatus 110, it controls temporary stop/playback of contents and reissuing of points/stamps in priority over other processings. Even when the code generation apparatus 1 or the apparatus 110 separates away from the touch panel of the information device 200, the information device 200 is made to maintain storage of the special pattern.

Further, for example, the code generation apparatus 1 or the apparatus 110 may store the special pattern by reading the dot code with a dot code reading device. And, the code generation apparatus 1 or the apparatus 110 outputs a corresponding pattern code each time the front button or the rear button is pressed. When the code generation apparatus 1 or the apparatus 110 newly reads a special pattern with the dot code reading device, it clears the previously stored special pattern.

Figure 72N:
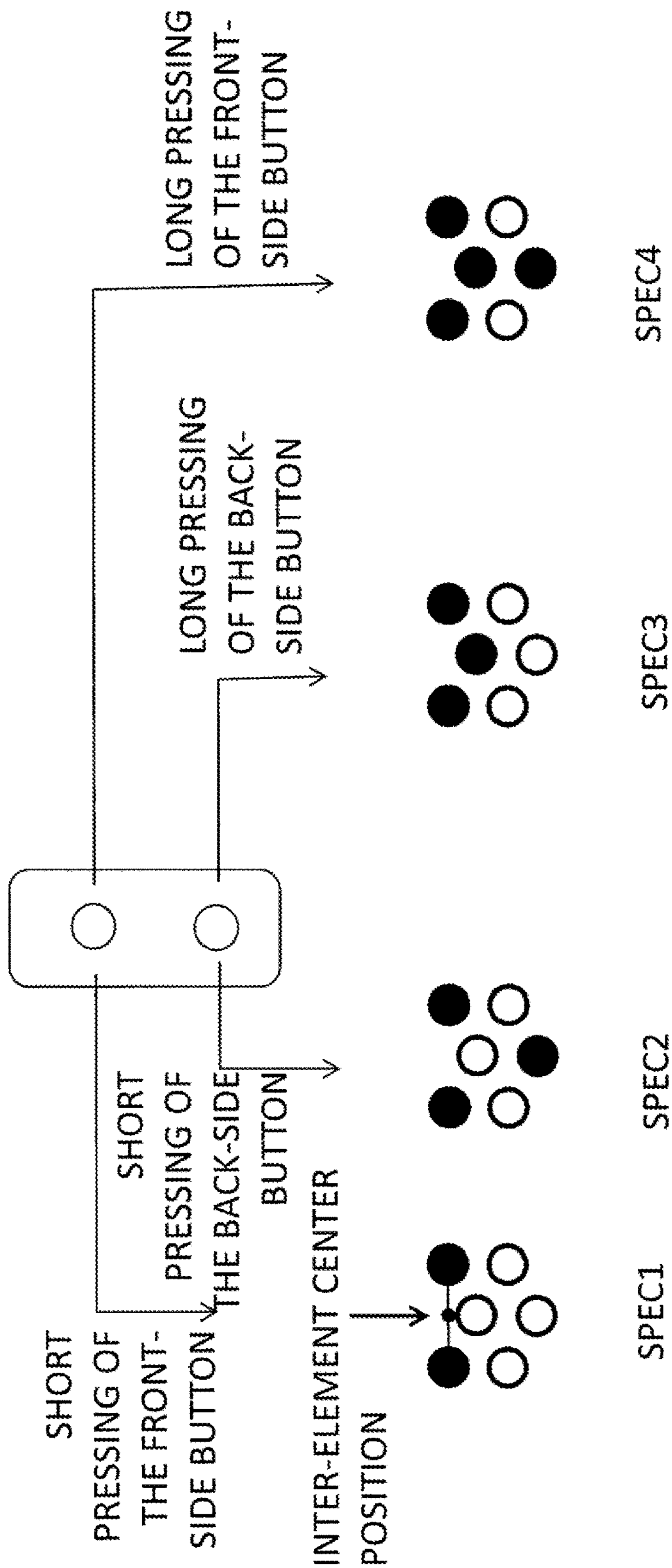
FIG. 72N is a diagram exemplifying a special pattern.

The special pattern is output when the front switch or the rear switch on the bottom face is turned on. FIG. 72N exemplifies a special pattern. As shown in the figure, the special pattern may be output from the pattern code output device 131 by button operations such as short pressing of the front button (for example, pressing for less than 1 second), short pressing on the rear button, long pressing of the front button (for example, pressing for 1 second or longer), long pressing of the rear button. Operation specifications for the front button and the rear button of the code generation apparatus 1 or the apparatus 110 are exemplified, as follows.

(1) Short Pressing of the Front Button (Less than 1 Second).

When the front button is ON for less than 1 second and then OFF, the pattern code output device 131 outputs symbols 1 and 2 in the ON state for 2 seconds (pattern SPEC1). Here, the pattern code output device 131 stops symbol output according to a previous operation in process. When the application program of the information device 200 detects pattern SPEC1, it accepts an icon selection on the screen. However, in order to avoid erroneous recognition, for example, the application program of the information device 200 may be made to perform processing only after the same special pattern is recognized twice in succession.

(2) Short Pressing of the Rear Button (Less than 1 Second).

When the rear button is ON for less than 1 second and then OFF, the pattern code output device 131 outputs the symbols 1, 2, 4 in the ON state for 2 seconds (SPEC2 Here, the pattern code output device 131 stops symbol output according to a previous operation in process. When the application program of the information device 200 detects pattern SPEC2, it accepts temporary stop/playback of a content such as a video reproduction or the like. Furthermore, the application program of the information device 200 executes reissuing in the processing of points and stamps. However, in order to avoid erroneous recognition, for example, the application program of the information device 200 may be made to perform processing only after the same special pattern is recognized twice in succession.

(3) Long Pressing of the Front Button (1 Second or Longer).

When the front button is ON for more than 1 second, the code generation apparatus 1 or the apparatus 110 separates away and until the front button is turned off or another button is pressed, the pattern code output device 131 continuously outputs the symbols 1, 2, and 6 in the ON state (SPEC3). The application program of the information device 200 is used when the code generation apparatus 1 or the apparatus 110 makes movements or rotates, and this special pattern is recognized. However, in order to avoid erroneous recognition, the same pattern code is to be recognized twice in succession before processing is performed. On the other hand, when the user moves or rotates the apparatus 110 on the touch panel, long pressing of the front button is to be maintained. If the application program of the information device 200 once recognizes another special pattern, and then recognizes the SPEC3 pattern twice, it continues processing based on the recognition of SPEC3 pattern. As a result, the application program of the information device 200 follows the movement and rotation of the code generation apparatus 1 or the apparatus 110.

(4) Long Pressing of the Rear Button (1 Second or Longer).

When the back button is turned on for 1 second or longer, the pattern code output device 131 outputs the symbols 1, 2, 4, 6 in the ON state for 2 seconds (SPEC4). If other operations are performed, the output of SPEC4 is ceased. The application program of the information device 200 terminates the content and the standby screen is redisplayed. However, in order to avoid erroneous recognition, the same pattern code is to be recognized twice in succession before processing is performed However, the definition of the information code as above is merely an example, and implementation of the present invention does not necessarily have to be in accord with the definition of the information code. For example, when the information input device 132 has only one channel, pattern codes of the pen type code generation apparatus exemplified in FIGS. 10 to 13 (information strings based on changes in a physical quantity of the element 111) may be diverted for the optical code in the first to the eighth embodiments (an information code input to the apparatus 110 from a touch panel, a display, or the like, based on a change in the amount of light). When there is only one channel, a preamble defined by a frame of an ethernet (registered trademark), a wireless LAN or the like, a bit string such as a frame start identification or the like, a simplified version of these bit strings, a version in which it is stretched in the time axis direction, or the like may be diverted for information codes in the first to the eighth embodiments. Also, similarly to the pattern code generation apparatus 1 described in the zeroth embodiment, in the output of symbols in accordance with the first to the eighth embodiments, the apparatus 110 may also form a symbol by combining the lengths, long and short, of the ON/OFF time intervals of the symbols, (see, for example, FIGS. 10 to 13, 26 and 27). Furthermore, the apparatus 110 may be made to output information in accordance with the symbol output intensity level intensity with a plurality of stages set for the symbol output intensity (see FIG. 13). Still further, the information device 200 may form an optical code by combining the lengths, long and short, of the ON/OFF time intervals in the same manner as the pattern code based on the symbol of the apparatus 110 in the exchange of an optical code by light emission from the display to the apparatus 110. In addition, the information device 200 may form an optical code by having the light be emitted in a plurality of stages of light intensities and combining the light intensities.

<Modification of a Physical Quantity Change>

In the above embodiments, that is, in the first to the eighth embodiments, by connecting the element 111 and the contact conductor via SW115, the electrostatic capacitance detectable by the touch panel is increased. However, the effective electrostatic capacitance of the element 111 detectable by the touch panel may be increased by applying a pulse signal (or an AC signal) to the element 111 in the place of such a configuration.

Figure 72O:
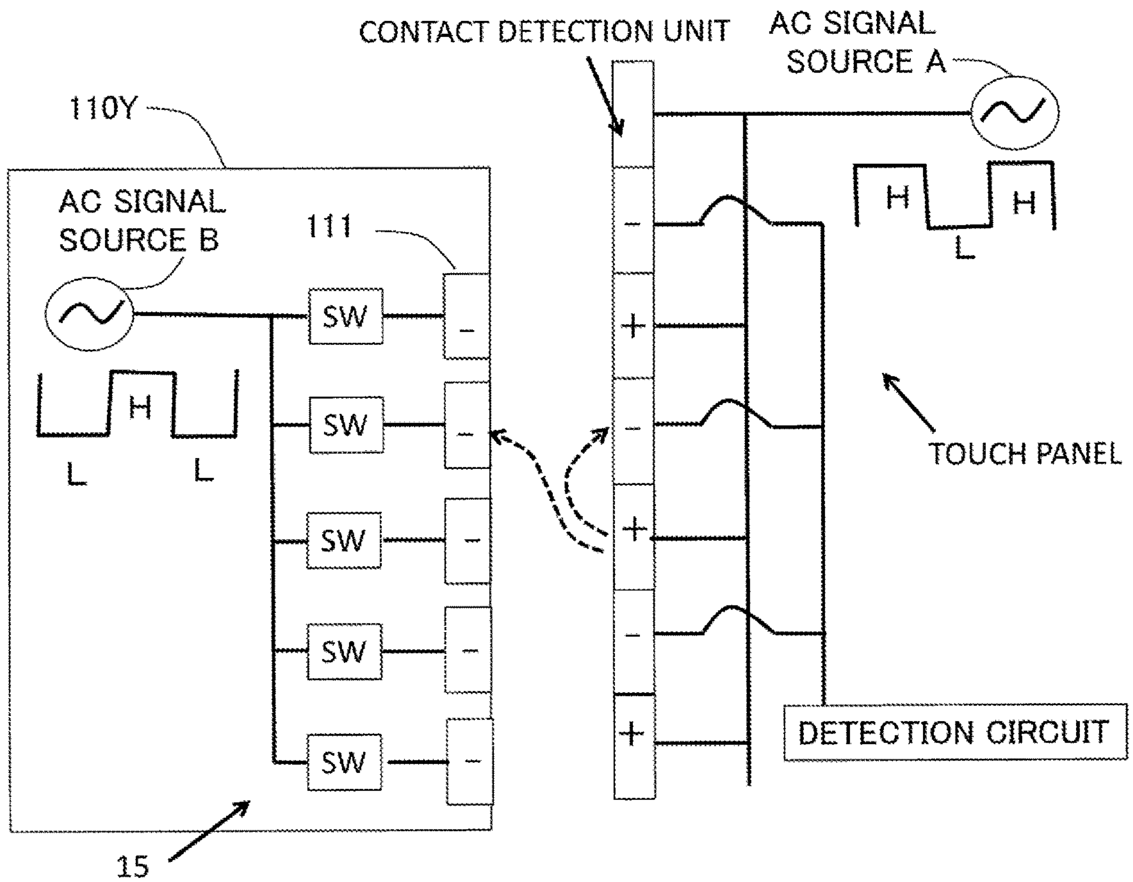
FIG. 72O is a diagram exemplifying an apparatus of a modification example and a touch panel that detects the change in a physical quantity of the apparatus.

FIG. 72O exemplifies an apparatus 110Y according to the present modification and a touch panel for detecting a change in the physical quantity of the apparatus 110Y. As shown in the figure, the touch panel includes a contact detection unit (transparent electrode), an AC signal source A, and a detection circuit. Note that the AC signal source A supplies the voltage of an AC signal (sine waveform) or a pulse signal to the contact detection unit. The contact detection unit (transparent electrode) consists of a plurality of subunit pairs in which one is connected to the AC source A and the other is connected to the detection circuit. Electric lines of force are generated between contact detection subunits (transparent electrodes) of a pair. That is, a capacitor is formed between a pair of contact detection subunits (transparent electrodes). Thus, the contact detection unit (transparent electrode) executes an object detection operation similar to that of a so-called mutual electrostatic capacitance type touch panel sensor. By the amount of electric charge charged or discharged in the capacitor formed between contact detection subunits (transparent electrodes) or by the electric field intensity between contact detection subunits (transparent electrodes), it is possible to detect the presence of a conductor or a dielectric substance that comes into contact with or comes into proximity with the contact detection unit (transparent electrode).

For example, when the apparatus 110Y comes into proximity with the contact detection unit of the touch panel or comes into contact with the contact detection unit of the touch panel with an insulating film or the like in between, a part of the lines of electric force formed between the paired contact detection subunits connected to the AC signal source A changes course towards the element 111 of the apparatus 110Y. As a result, the number of lines of electric force between the paired contact detection subunits (transparent electrodes) decreases, and the electric field intensity decreases. From the change in the electric field intensity, the detection circuit detects the approach of the element 111 to the contact detection unit and the position of approach.

By the way, when the area of the element 111 is small, lines of electric force from the contact detection unit connected to the AC signal source A cannot be sufficiently received. That is, the element 111 cannot generate a sufficient amount of static electricity with the contact detection unit connected to the AC signal source A. Therefore, it happens to be that the detection circuit cannot detect the presence of the element 111 of the apparatus 110Y. As a measure, in the first to the eighth embodiments, the apparent electrostatic capacitance of the element 111 is increased by having the human finger or the human body be connected to the element 111 by using SW115 and the contact conductor 114.

In this modification example, instead of having the human finger or the human body be connected to the element 111 by using SW115 and the contact conductor 114, a signal having a phase opposite to that of the AC signal source A is applied to the element 111. FIG. 72O exemplifies a state of electric charge of the contact detection unit and the element 111 at a certain point of time T1. At this point of time T1, it is assumed that a positive voltage (positive pulse) is applied to the contact detection subunits (areas with a plus mark) connected to the AC signal source A, and positive electric charge is accumulated. On the other hand, the element 111 is provided with an AC signal source B having a phase opposite to that of the AC signal source A. Therefore, at this point of time T1, negative voltage (positive pulse) is applied and negative charge is accumulated. Then, even if the area of the element 111 is small, more lines of electric force can be drawn from the contact detection unit connected to the AC signal source A as compared with the case where there is no voltage by the negative-phase AC signal source B due to negative charge. As a result, the number of lines of electric force between the paired contact detection subunits (transparent electrodes) decreases, and the electric field intensity decreases. Thus, even if the area of the element 111 is small, owing to the voltage of the opposite-phase AC signal source B, the detection circuit can detect the presence of the element 111.

By providing such an AC signal generating source B in the apparatus 110Y and adding an AC signal to the element 111, the touch panel may detect the presence of the element 111, its proximity position, or its contact position with an insulator film (or glass or the like), in between, based on a change in electrostatic capacitance, that is, a change in the physical quantity, even if the element 111 has an area smaller than that described in the above first to eighth embodiments, for example, with a diameter of 4 mm, 3 mm, 2 mm, 1 mm, or even less than 1 mm.

Figure 72P:
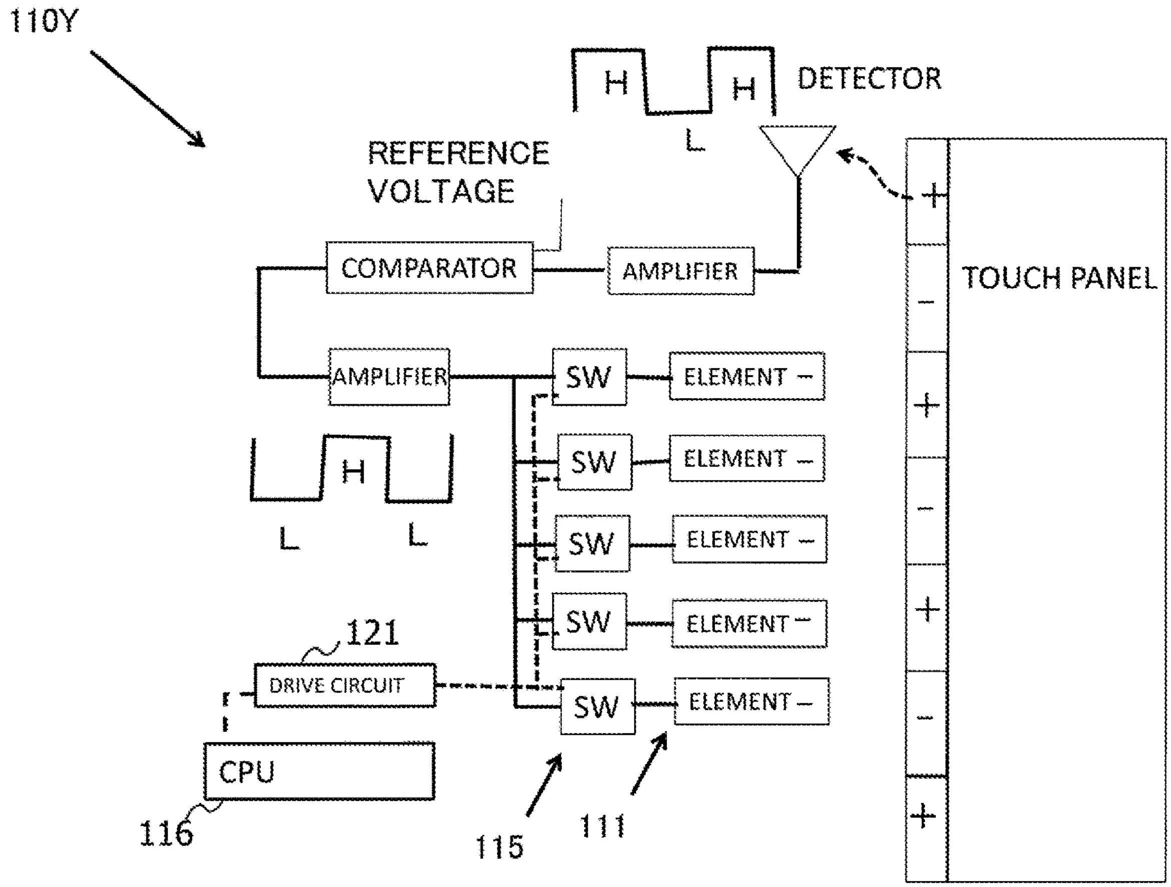
FIG. 72P is a diagram exemplifying a configuration in which AC signal source B generates an AC signal of opposite phase to that of an AC signal source of a touch panel for detection.

FIG. 72P exemplifies a configuration of an AC signal source B that generates an AC signal with a phase reverse to that of the AC signal source A for the detection of a touch panel. The AC signal source B includes a detector for detecting a change in lines of electric force (a change in electric field intensity), an amplifier AMP1 for amplifying a detection signal detected by the detector, a comparator for collating the output signal from the amplifier AMP1 with a reference voltage, and an amplifier AMP2 for amplifying the output of the comparator.

Lines of electric force are received by the detector from the contact detector connected to the AC signal source A of the touch panel. The orientation of the lines of electric force (positive and negative) and the density of the lines of electric force, that is, electric field intensity, changes with positive and negative values in accordance with a signal from the AC signal source A. Should the detector follow the principle of electrostatic induction, the detector is negatively charged when the contact detection unit connected to the AC signal source A of the touch panel is positive.

Therefore, a signal having a phase opposite to that of an AC signal applied to the contact detection unit connected to the AC signal source A of the touch panel is generated in the detector.

The amplifier AMP1 is to be an inverting amplifier. Thus, the amplifier AMP1 inverts and amplifies a signal of the detector and inputs it to the comparator. Therefore, the signal input to the comparator has the same phase as that in the contact detection unit connected to the AC signal source A of the touch panel.

The comparator generates positive and negative pulses by collating an output voltage of the amplifier AMP1 with the reference voltage. Suppose now that the comparator generates a positive output signal when the output signal from the amplifier AMP1 exceeds the reference voltage. And, the amplifier AMP2 is to be an inverting amplifier.

Then, since the amplifier AMP2 inverts the output of the comparator, a signal opposite in phase to the signal detected by the detector is generated in all of the elements 111.

With the circuit configuration as described above, it is possible to apply a signal having a phase opposite to that of the AC signal source A (pulse signal source) of the touch panel to the element 111. Therefore, even when the size of the element 111 is small, the touch panel can be made to make detections.

Note that in FIGS. 72O and 72P, examples of configurations for improving sensitivity of the element 111 are shown for the mutual electrostatic capacitance type touch panel. As for the self-capacitance type touch panel, similarly to the above, a signal having a phase opposite to that of the AC signal source (or pulse signal source) for the detection of a touch panel may be generated and applied to the element 111. For the self-capacitance type touch panel, since the position of the element 111 is recognized by the electrostatic capacitance formed between the touch panel and the element 111, by adding a reverse phase signal to the element 111, similarly to the above, it is possible to transmit charge opposite to that of the contact detection unit (the area with a plus mark) connected to the AC signal source A of the touch panel, and effectively, the sensitivity of the touch panel can be increased. With the configuration of FIG. 72P, even if the area of the element 111 is reduced, it is possible to cause a change in a physical quantity detectable by the touch panel with sufficient sensitivity, for example, a change in electric field intensity between contact detection subunits. As a result, the detection circuit can detect an approach, a contact, or the like of a conductor, a dielectric substance, or the like. even when the area of the conductor, the dielectric substance, or the like towards the contact detection unit is smaller than those of the elements 111 of the first embodiment to the eighth embodiment. The configuration of the present apparatus 110Y may be applied to the first to the eighth embodiments.

Ninth Embodiment

The image reading apparatus 110J according to the ninth embodiment will be described with reference to FIGS. 73A to 74. The image reading apparatus 110J is also simply referred to as the apparatus 110J. The image reading apparatus 110J has a photoelectric conversion element array (a so called solar cell) 112 and a fingerprint sensor 113 on one side of a card type package and an image sensor 160 on the other side. However, the fingerprint sensor 113 is not an indispensable component and need not be provided. Furthermore, in place of the photoelectric conversion element array 112, a thin button battery or a film type battery may be provided. The card type package is, for example, a thin plastic board having a thickness of less than 5 mm. For example, the card type package has the same appearance as those in FIGS. 55, 56, 57, 61A, 69A to 69C, 71A to 71C, 73A, 73B, and the like.

Figure 73A:
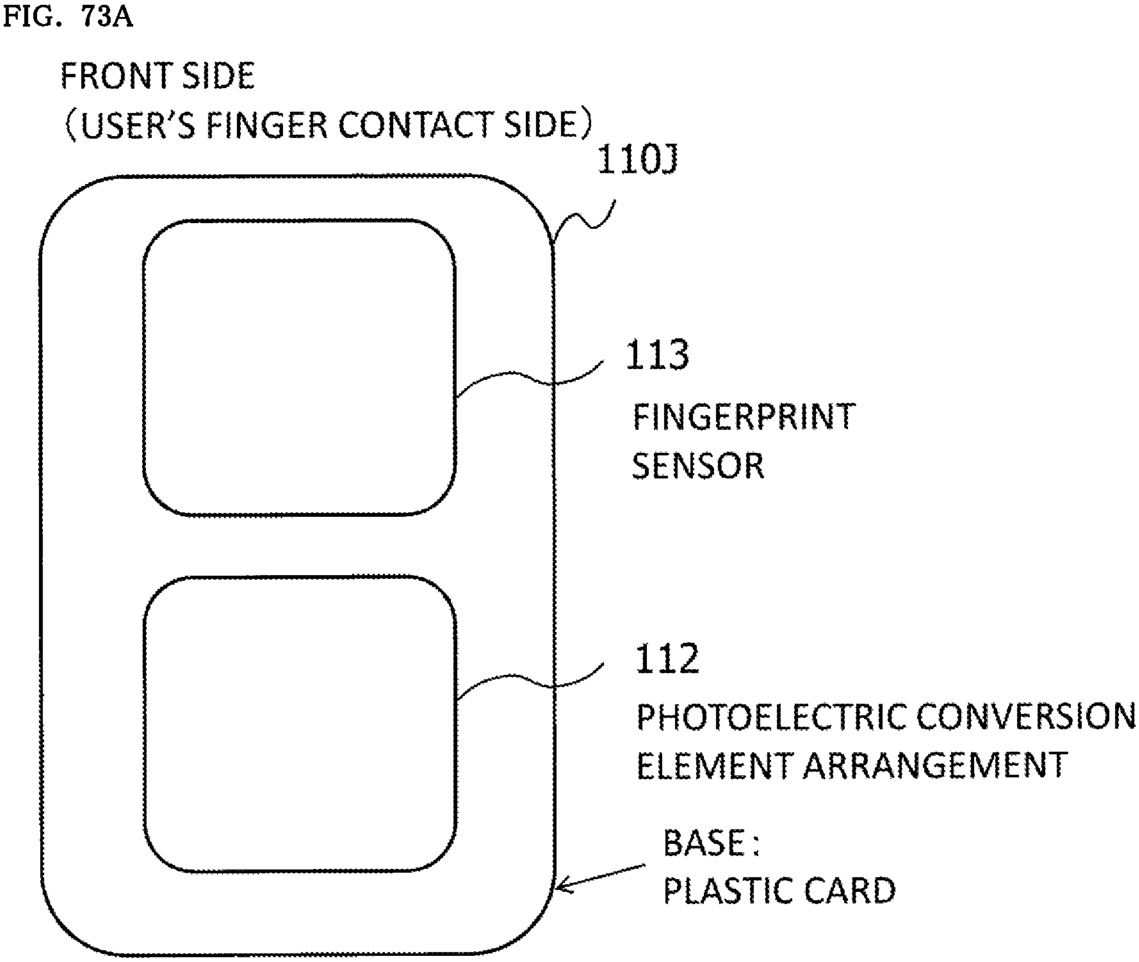
FIG. 73A is a schematic diagram showing an example of a configuration of the front side of an image reading apparatus.
Figure 73B:
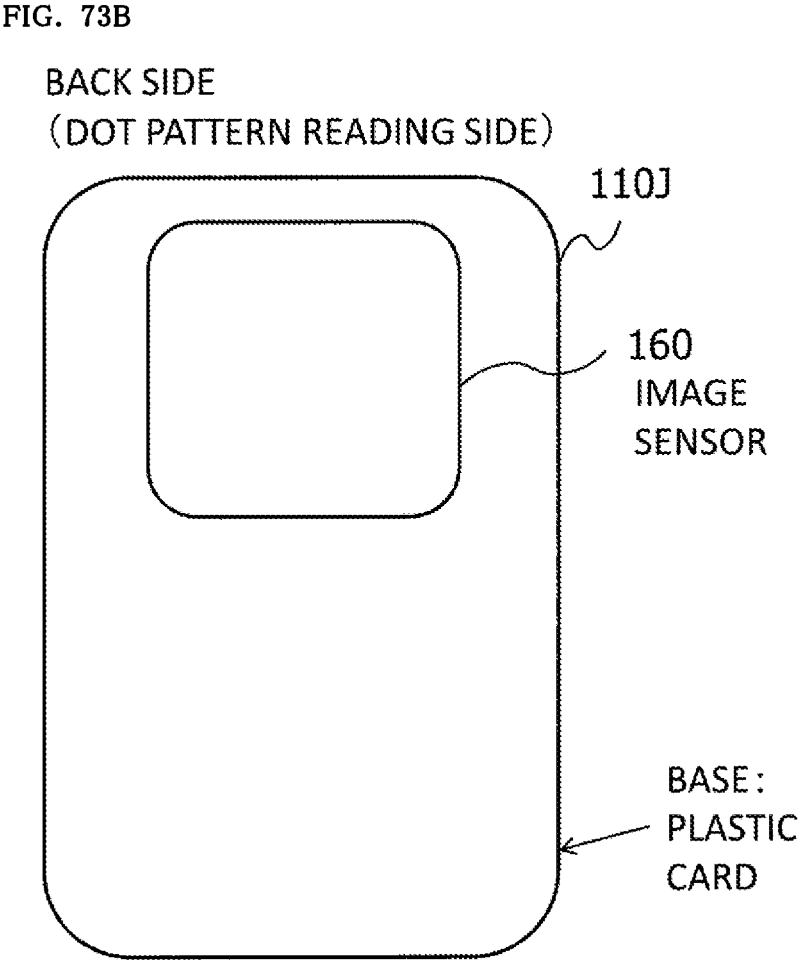
FIG. 73B is a plan view of the image sensor 160 side of image reading apparatus 110J.
Figure 74:
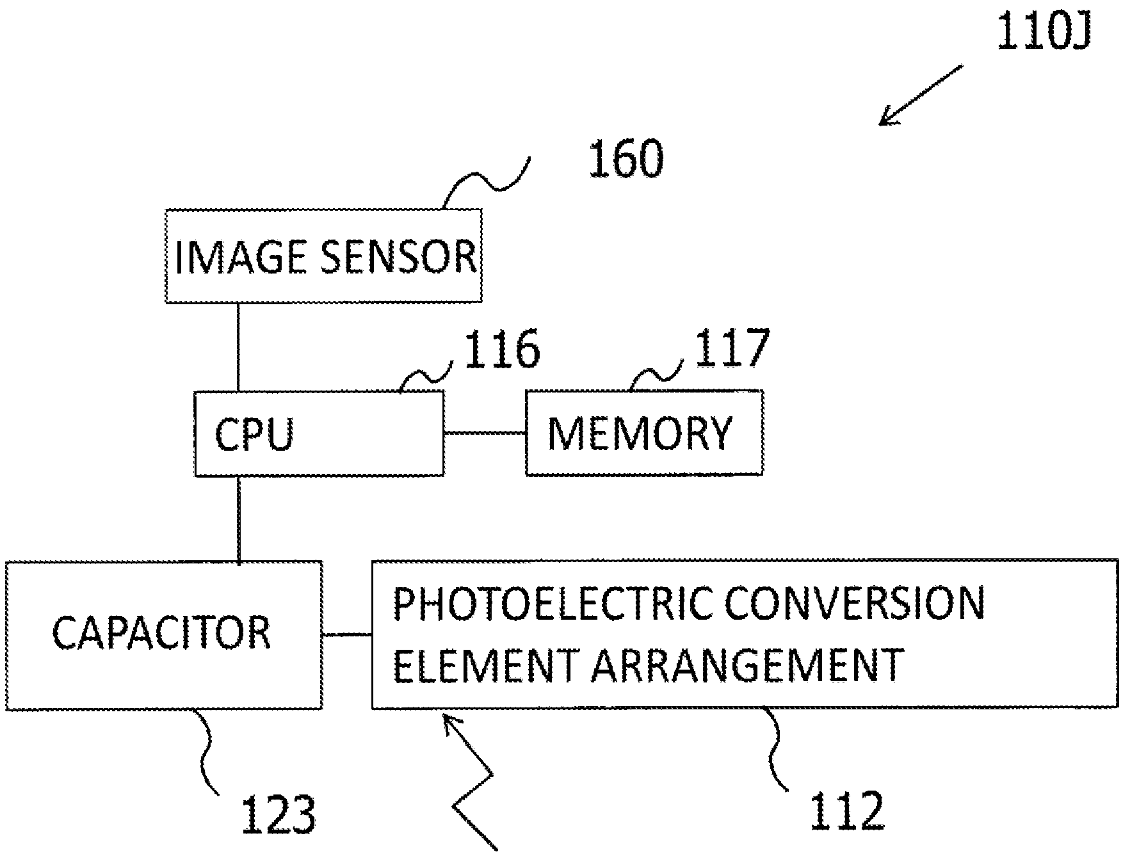
FIG. 74 is a diagram exemplifying a hardware configuration of image reading apparatus 110J.

FIG. 73A is a plan view of the front side of the image reading apparatus 110J, that is, the back side of the surface on which the image sensor 160 is provided. FIG. 73B is a plan view of the image sensor 160 side of the image reading apparatus 110J. FIG. 74 is a diagram exemplifying a hardware configuration of the image reading apparatus 110J. The image reading apparatus 110 J includes a CPU 116, a memory 117, an image sensor 160, a photoelectric conversion element array 112, and a capacitor 123. The CPU 116 of the image reading apparatus 110J executes a computer program that is executable and is expanded in the memory 117, acquires an image of a dot pattern including a plurality of dots of the size of 0.5 mm or less from the surface of a medium that comes into contact with or comes into proximity with the image sensor 160, and acquires information from the acquired image. Note that if the fingerprint sensor 113 has sufficient accuracy, dots of about 0.05 to 0.2 mm in diameter may be recognized. The acquired information is, for example, coordinates indicating the position of the medium surface, code information processed by the application program, and the like. The CPU 116 constitutes an example of a processing unit that executes processing on images.

[Image Sensor]

Figure 75:
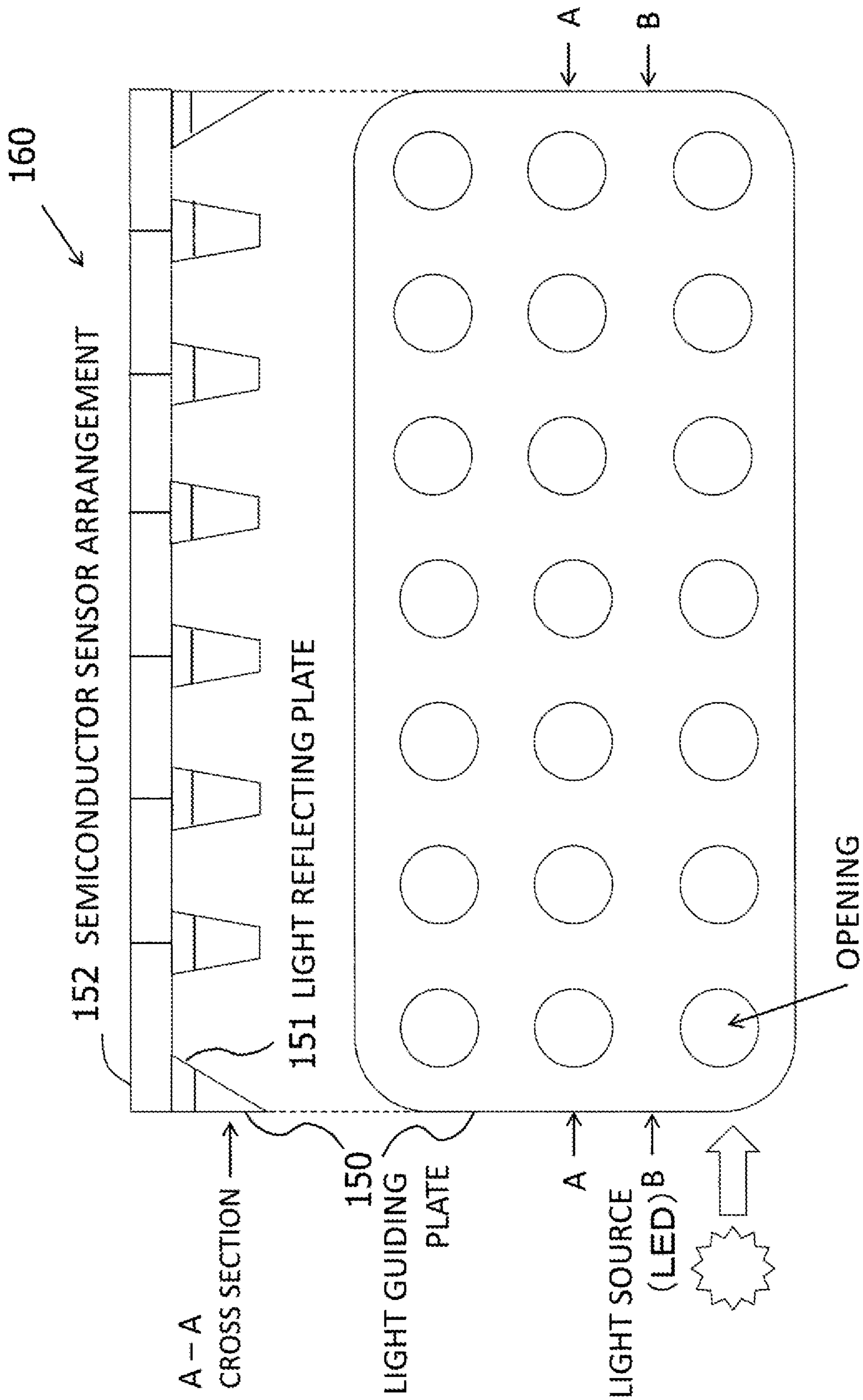
FIG. 75 is a diagram exemplifying a configuration of an image sensor.
Figure 76:
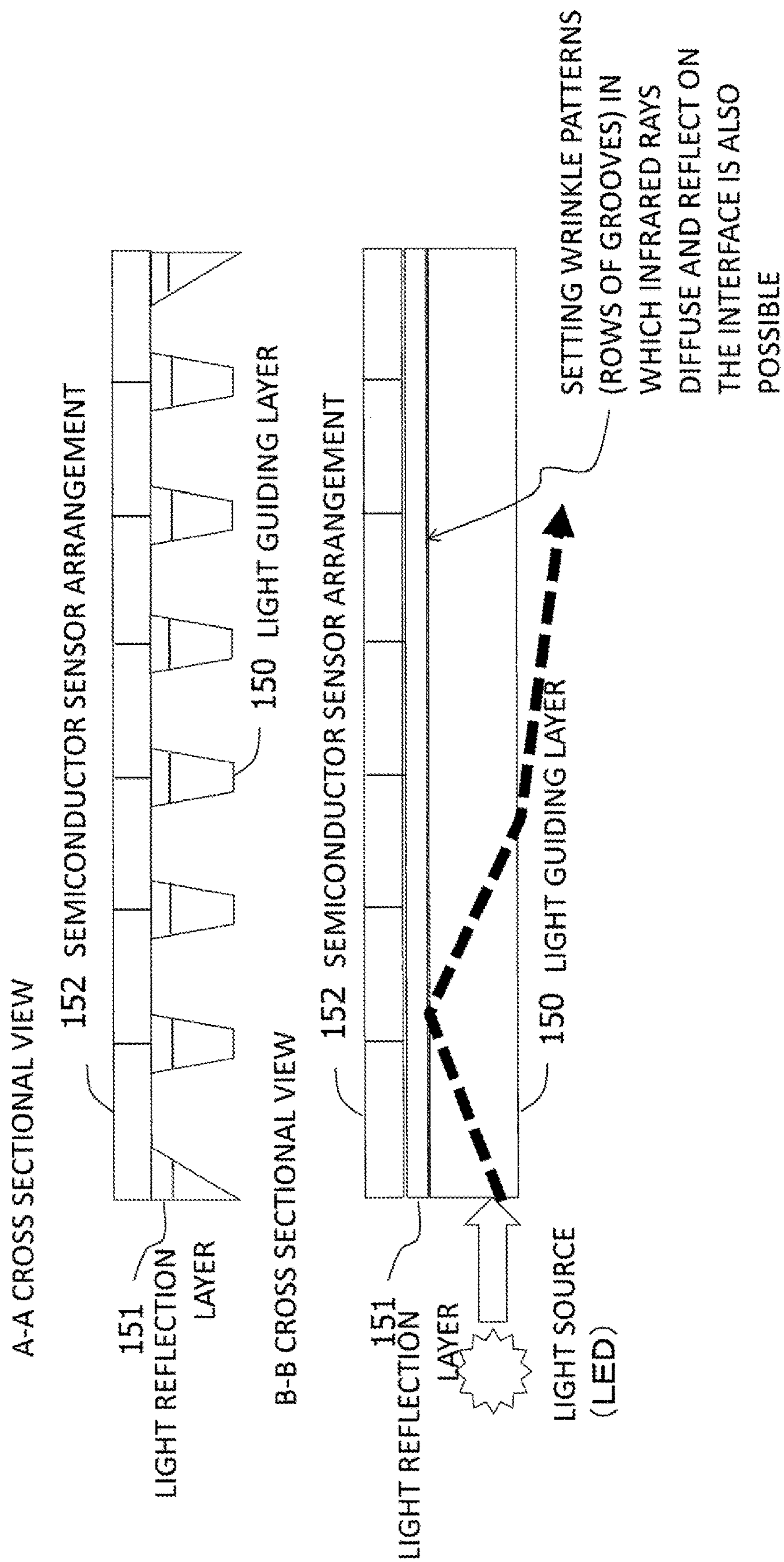
FIG. 76 is a diagram exemplifying a sectional view along A-A and a sectional view along B-B which does not have openings in FIG. 75.

FIG. 75 is a view exemplifying the configuration of the image sensor 160. The lower side in FIG. 75 is a plan view of the imaging surface of the image sensor 160, and the upper side is a sectional view along the A-A line in the plan view. Furthermore, FIG. 76 is a diagram exemplifying a sectional view along the B-B line in FIG. 75 which does not include openings along with a sectional view along the A-A line in the plan view.

As is apparent from the sectional view along the A-A line, the image sensor 160 has a semiconductor sensor array 152, openings that expose the light receiving unit of the semiconductor sensor array 152, a light reflecting layer 151 formed in contact with the semiconductor sensor array 152, and a light guiding layer 150 formed in contact with the light reflecting layer 151. The light reflecting layer 151 may also be referred to as a light reflecting plate 151. The light guiding layer 150 may also be referred to as a light guiding plate 150. The light guiding layer 150 constitutes an example of a "light guiding medium." The semiconductor sensor array 152 constitutes an example of a "light receiving element."

The semiconductor sensor array 152 is, for example, a CMOS image sensor, a CCD (charge coupled device), or the like. The semiconductor sensor array 152 includes an array of diodes that convert incident optical signals into electrical signals and a drive circuit that reads electrical signals in the horizontal and vertical directions of the image from the array of diodes. Note that in place of a diode, a so-called phototransistor may be used. Furthermore, the drive circuit includes, for example, an amplifier, an Analog/Digital (A/D) converter, and the like. The electric signals in the horizontal direction and the vertical direction of the image read out from the arrangement of the diodes are converted into digital data, for example, and stored in the memory. The semiconductor sensor array 152 and the drive circuit are formed by a general MOS process.

The semiconductor sensor array 152 may be covered with an insulating color filter layer not shown. In the color filter layer, the three colors of red, green, and blue are arranged in one set. A transparent protective film or lens layer may be formed on the surface side of the color filter layer (on the side opposite to the array of diodes).

The light reflecting layer 151 is, for example, a metal, and has openings for exposing respective diode P/N junction units and the color filter layer on the front surface thereof. After the semiconductor sensor array 152 and the drive circuit are formed, it is formed by vacuum evaporation, sputtering or the like, and openings are formed by a photoresist process and an etching process.

The light guiding layer 150 is, for example, acrylic, polycarbonate, glass, or the like. Note that a polyimide based material may be used for the bonding section between the light reflecting layer 151 and the light guiding layer 150.

A light emitting diode is provided on a side of the light guiding layer 150 and it irradiates the light guiding layer 150 with light. Among the light irradiated into the light guiding layer 150, incident light entering on the upper surface (the surface on the light reflecting layer 151 side) and the lower surface (the surface on the imaging target side) of the light guiding layer 150 at an angle equal to or larger than the critical angle for total reflection spreads within the light guiding layer 150 while repeating total reflections on. Incident light entering on the upper surface (the surface on the light reflecting layer 151 side) and the lower surface (the surface on the imaging target side) of the light guiding layer 150 at an angle less than the critical angle for total reflection is emitted to the exterior from the lower surface of the light guiding layer 150 (the surface on the imaging target side). On the other hand, since the light reflecting layer 151 is formed on the upper surface (the surface on the light reflecting layer 151 side) of the light guiding layer 150, the incident light is reflected regardless of the incident angle.

Figure 77:
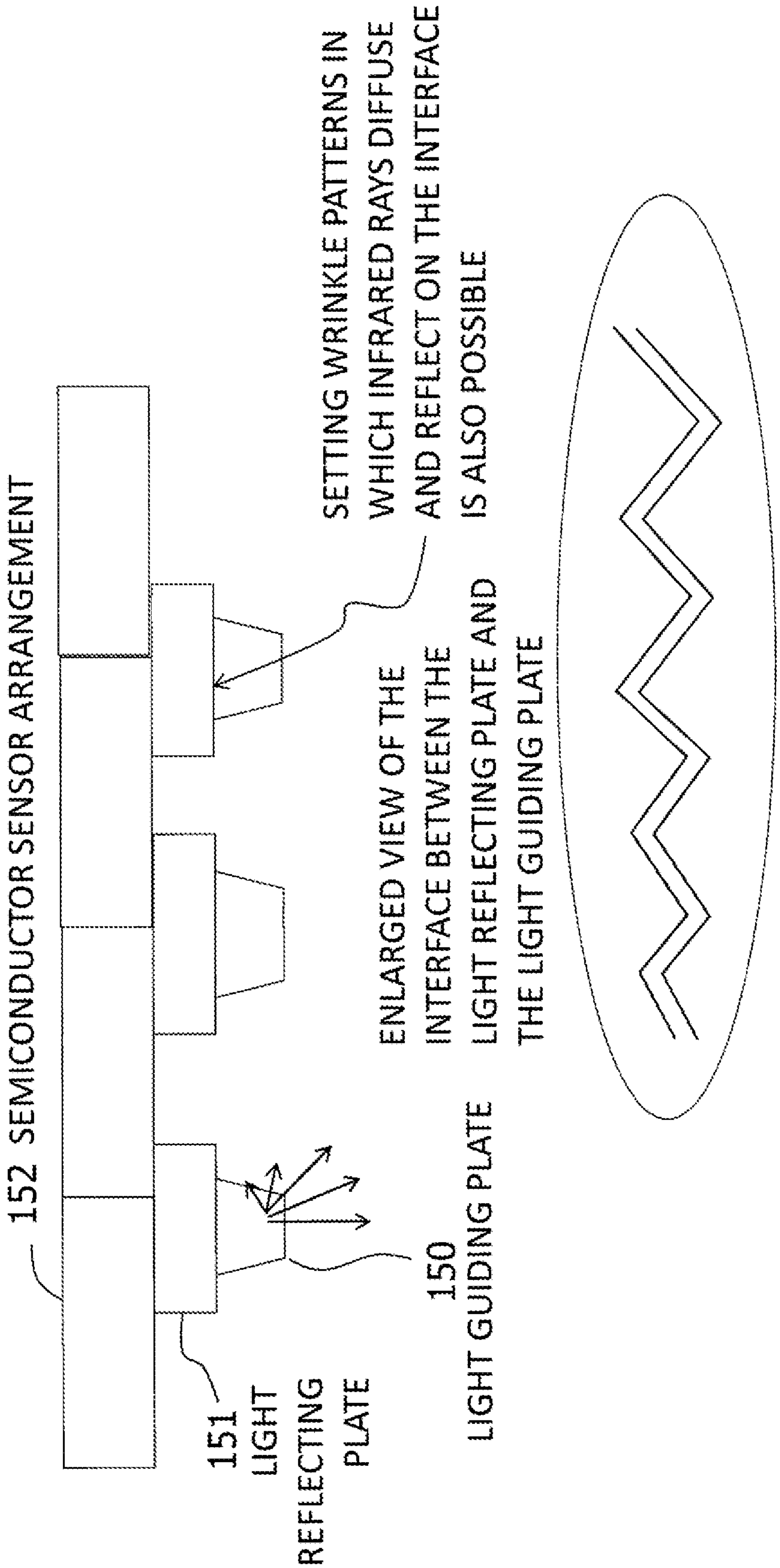
FIG. 77 is a diagram exemplifying embossing between the upper face of the light guiding layer and the light reflecting layer.

Note that a plurality of grooved patterns, such as a wrinkle pattern, may be formed between the upper surface (the surface on the light reflecting layer 151 side) of the light guiding layer 150 and the light reflecting layer 151. By forming the wrinkle pattern, the incident light entering on the upper surface (the surface on the side of the light reflecting layer 151) of the light guiding layer 150 is diffused or scattered in a plurality of directions, and is guided to the lower surface (the surface on the imaging target side) of the light guiding layer 150. FIG. 77 exemplifies a wrinkle pattern between the upper surface (the surface on the light reflecting layer 151 side) of the light guiding layer 150 and the light reflecting layer 151. The wrinkle pattern can be formed, for example, by forming grooves in the light reflecting layer 151 by a photolithography process and an etching process, and filling the grooves with the material of the light guiding layer 150.

According to the configurations in FIGS. 75 to 77, the light reflecting layer 151 and the light guiding layer 150 can be stacked on the semiconductor sensor array 152, light from the light source can be irradiated from the light guiding layer 150 to the imaging target, and light reflected from the imaging target can be guided to the openings provided in the light guiding layer 150 and the light reflection layer 151. Therefore, in the case where the shape and characteristic dimensions of the imaging target is sufficiently larger than the arrangement interval of the semiconductor sensors (diodes), even when the image sensor is attached to, coming into contact with, or coming into proximity with the imaging target, images of the image target can be acquired. For example, if the arrangement interval of the semiconductor sensors, that is, the pixel pitch is 1 micrometer, it is sufficiently possible to acquire an image having a shape of about 10 micrometers on the surface of the imaging target.

First Modification Example

Figure 78:
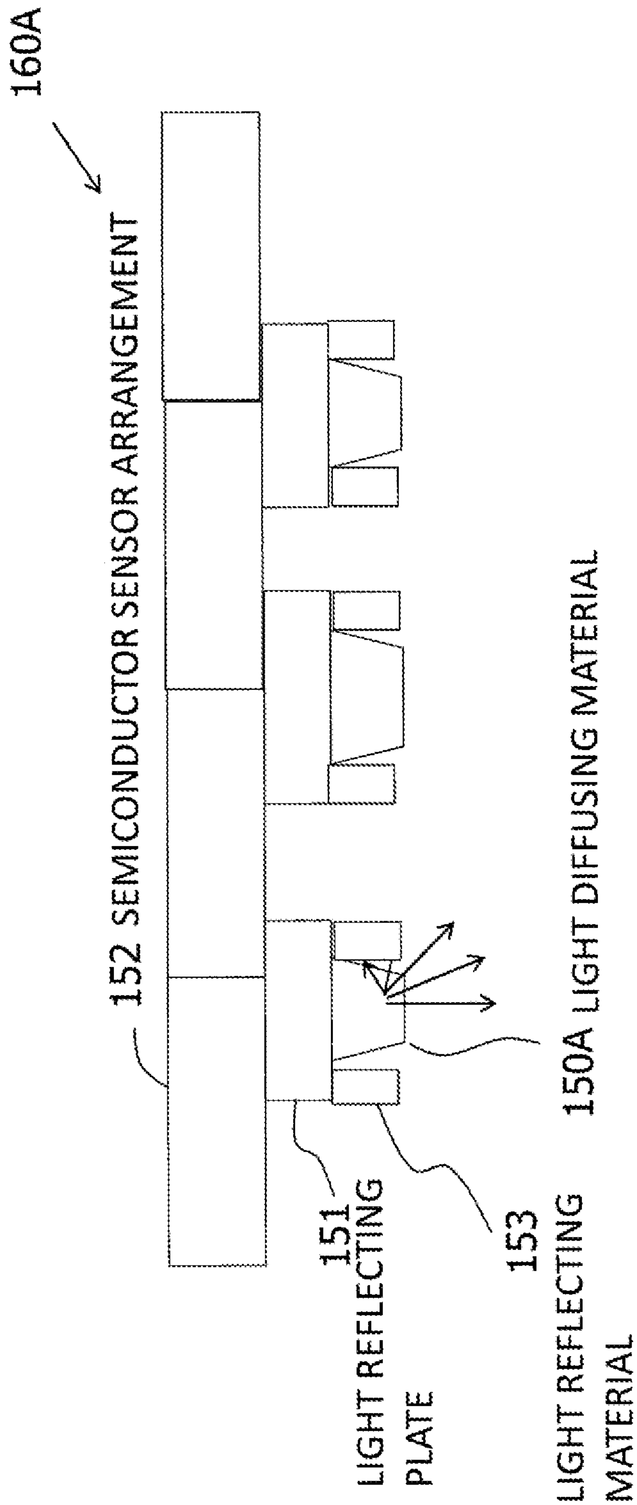
FIG. 78 is a diagram exemplifying a configuration of an image sensor in accordance with the first modification example.

FIG. 78 is a diagram exemplifying the configuration of an image sensor 160A according to a first modification example. In FIGS. 75 to 77, exemplified is the configuration of the image sensor 160 that irradiates light from the light source to the imaging target by the light guiding layer 150. However, for example, light may be diffused into the light guiding layer 150 using a light diffusion material. For example, an acrylic resin mixed with fine particles (fine powder) may be used for the light guiding layer 150. It is known that the light diffusion property of such a light diffusion layer 150A depends on the refractive index difference between the resin serving as a base material and the fine particles, and the particle diameter of the fine particles. As the fine particles, spherical fine particle polymers, ceramic fine particles, and the like of submicron to several tens of microns can be used.

When incident light from the light source enters on the light diffusion layer 150A, the incident light is radially diffused. With the light diffusion layer 150A, light can be irradiated onto the imaging target with efficiency and reduced unevenness in the amount of light. As a result, the image sensor 160A in FIG. 78 can acquire an image with less unevenness in the amount of light than that in FIGS. 75 to 77.

However, when the light diffusion layer 150A is used, direct light that is emitted from the light diffusion layer 150A and is not reflected by the imaging target may easily enter into the area of the diode array from the openings. Such direct light becomes background noise with respect to the reflected light reflected from the imaging target. Thus, in this modification example, as shown in FIG. 78, a film of a light reflecting material 153 is formed on the inner wall of the opening to reduce direct light entering the area of the semiconductor sensor array 152.

Second Modification Example

Figure 79:
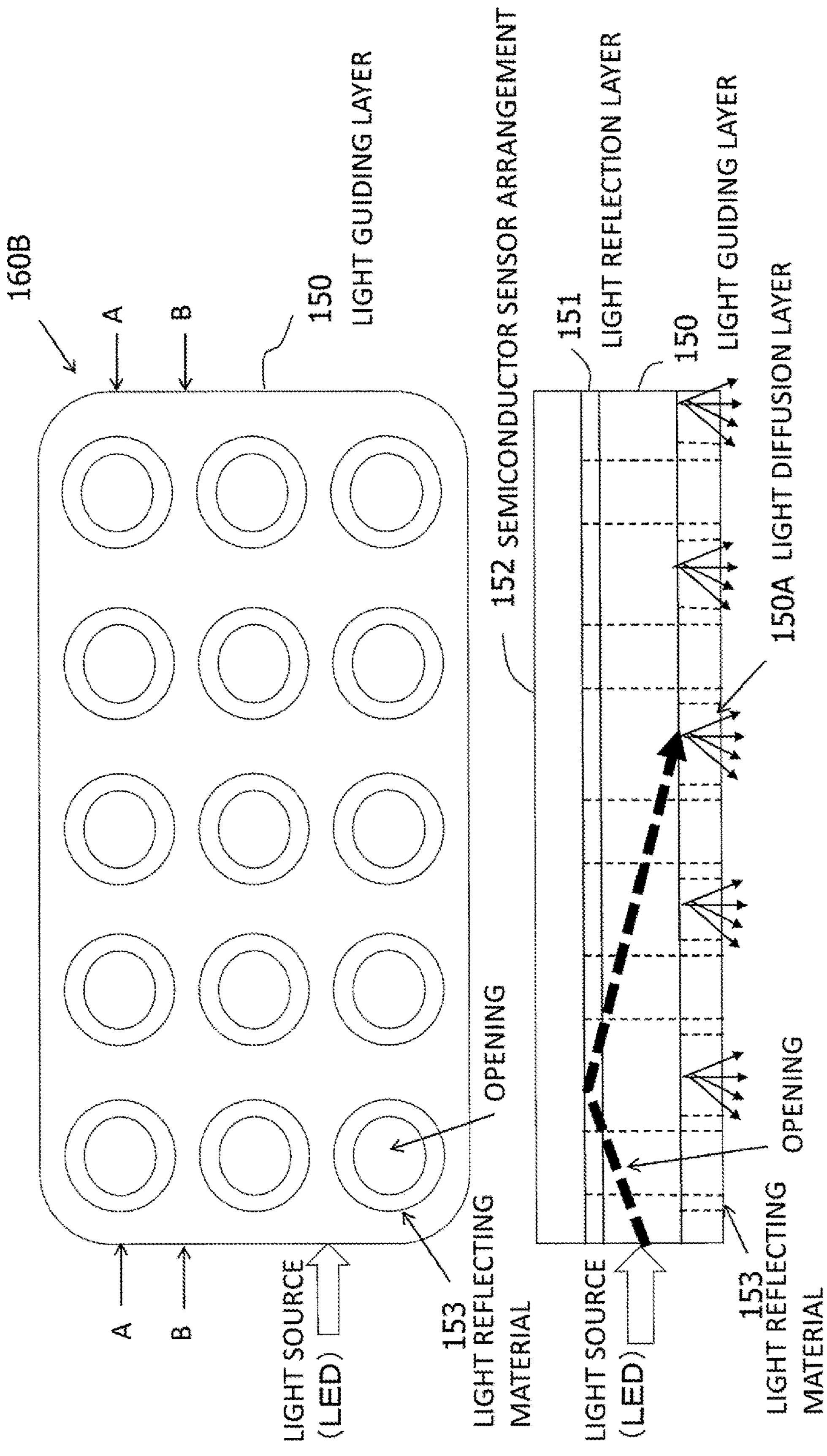
FIG. 79 is a diagram exemplifying a configuration of an image sensor in accordance with the second modification example.
Figure 80:
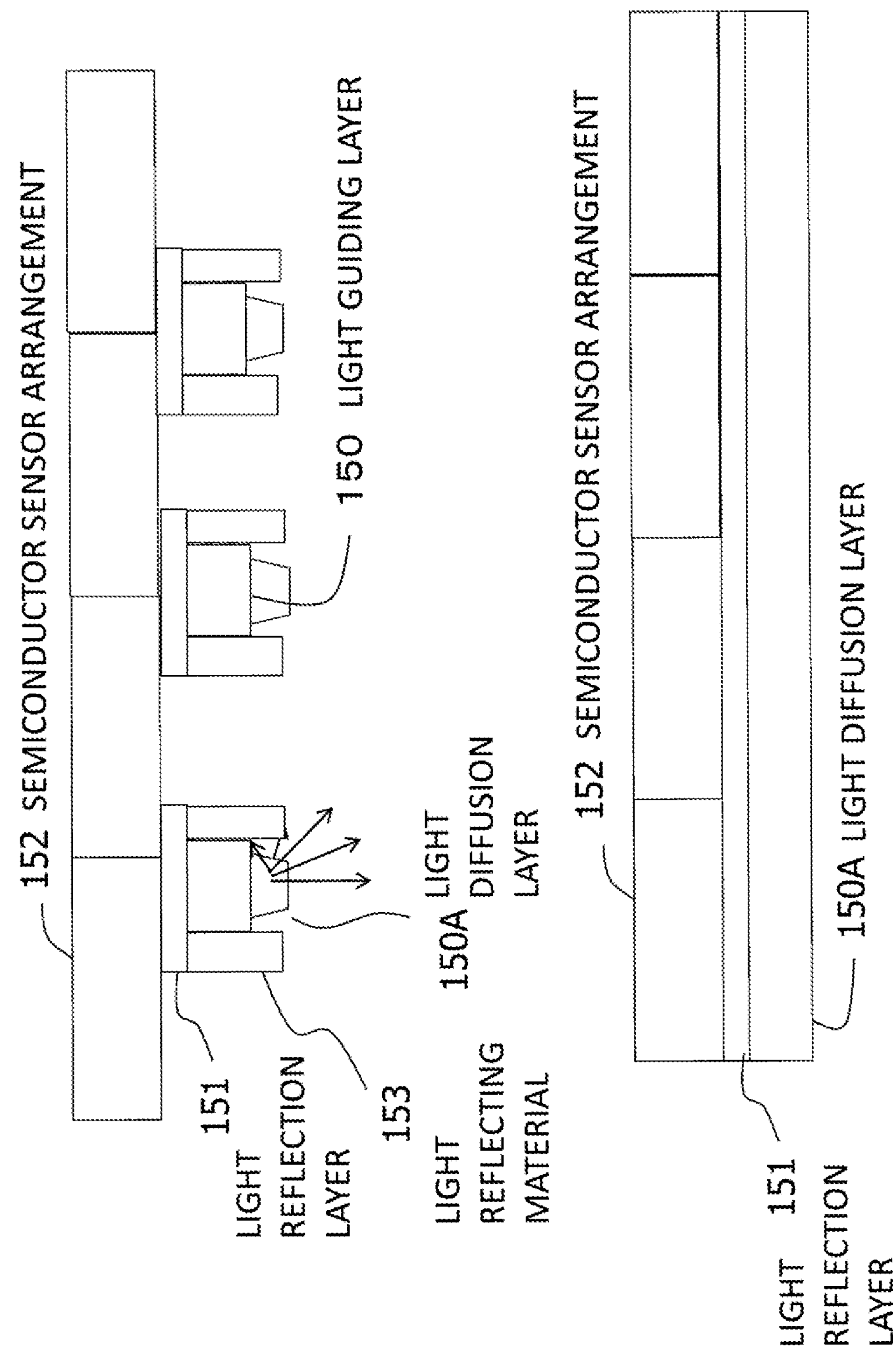
FIG. 80 is a diagram exemplifying a configuration of an image sensor in accordance with the second modification example.

FIGS. 79 and 80 exemplify a configuration of an image sensor 160B which is a second modification example of the image sensor 160. FIG. 79 exemplifies a plan view as viewed from the imaging surface side (side with openings opposing the imaging target) of the present modification and a front view in which the imaging surface is arranged down. FIG. 80 is a-sectional view along the A-A line in FIG. 79 (sectioned in a plane traversing the openings) and a sectional view along the B-B line (sectioned in a plane not traversing the openings).

As shown in FIGS. 79 and 80, the image sensor 160B of this modification includes a semiconductor sensor array 152, a light reflecting layer 151 having openings for exposing light receiving units of respective semiconductor sensors, a light guiding layer 150 having openings for exposing light receiving units of respective semiconductor sensors, a light diffusion layer 150A having openings for exposing the light receiving units of respective semiconductor sensors, and a light source for introducing light into the light guiding layer 150. The above light reflecting layer 151 is provided between the light guiding layer and the semiconductor sensor array 152, and reflects direct light incident from the light guiding layer 150 to the semiconductor sensor array at an angle less than the critical angle. On the other hand, the light diffusion layer 150A guides light incident at an angle equal to or larger than the critical angle on the interface between the light guiding layer 150 and the light diffusion layer 150A from the light guiding layer 150, and diffuses it radially. In addition, a film of a light reflecting material 153 is formed on the front surface of the light receiving unit of the semiconductor sensor array 152, that is, on the inner wall surface of openings on the imaging target side. The semiconductor sensor array 152 constitutes an example of an array of pixel sensors that output electric signals corresponding to incident optical signals, respectively.

According to the above configuration, among the light passing through the light diffusion layer 150A, direct light directly incident on the semiconductor sensor array 152 is reduced. That is, since the light reflecting layer 151 is formed on the upper surface (the surface on the light reflecting layer 151 side) of the light guiding layer 150, the incident light is reflected regardless of the incident angle. Furthermore, among the light passing through the light guiding layer 150, the light incident on the surface with openings at an angle less than the critical angle of total reflection is reflected by the film of the light reflecting material 153 formed on the inner wall surface of the opening. That is, the light incident on the openings are also reflected regardless of the angle of incidence in respect with the plane normal of the plane with openings. The film of the light reflecting material 153 constitutes an example of a light reflecting material that reflects light entering the opening interface into the light guiding layer.

On the other hand, the light incident on the lower surface (the surface on the imaging target side) of the light guiding layer 150 at an angle less than the critical angle of total reflection is incident from the lower surface (the surface on the imaging target side) of the light guiding layer 150 to the light diffusion layer 150A, is radially diffused, and is irradiated on the imaging target. As a result, the image sensor 160B of the present modification can guide the light from the light source without reducing transmittance by the light guiding layer 150, and can irradiate light with reduced unevenness on the imaging target. Therefore, the image sensor 160B of this modification can efficiently acquire an image from the imaging target.

Third Modification Example

Figure 81:
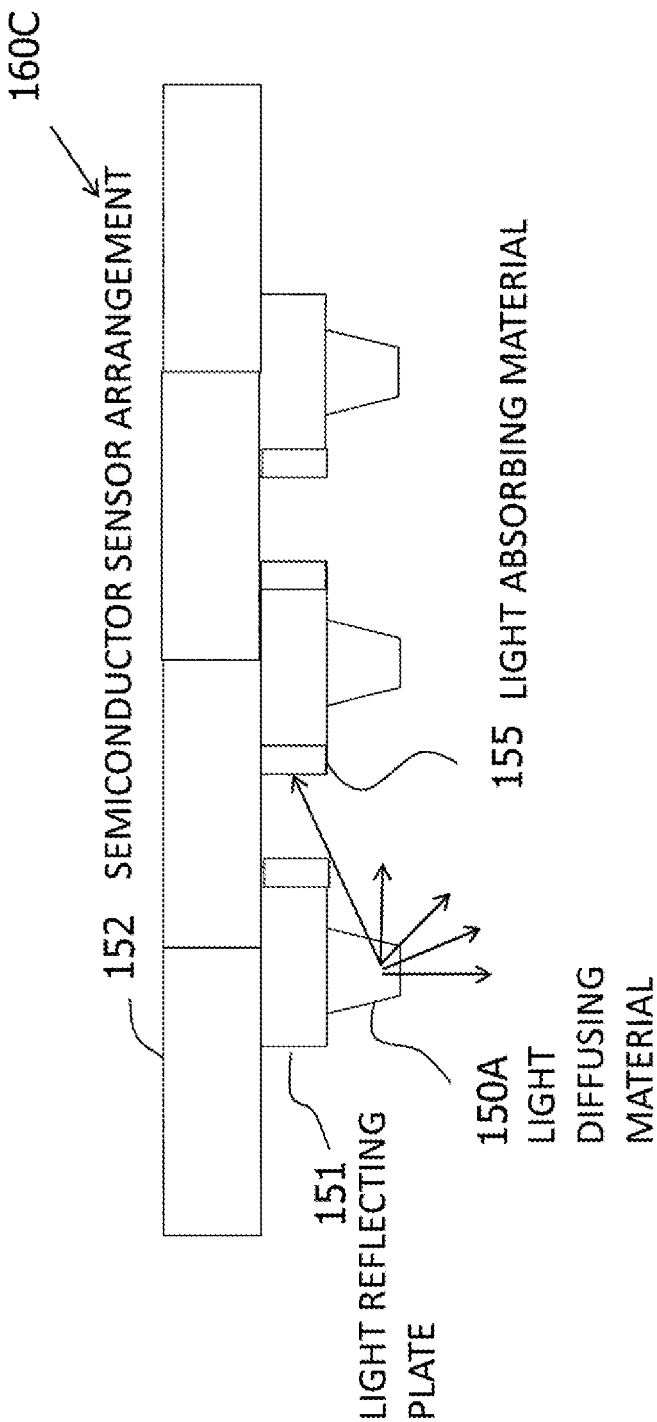
FIG. 81 is a diagram exemplifying a configuration of an image sensor in accordance with the third modification example.

FIG. 81 is a diagram exemplifying a configuration of an image sensor 160C according to a third modification example. In FIG. 81, instead of forming the film of the light reflecting material 153 on the inner wall of the opening in FIG. 78, a film of the light absorbing material 155 is formed. With such a light absorbing material, it is possible to reduce direct light directly entering the area of the semiconductor sensor array 152 among the light radially emitted from the light diffusing material.

The image sensor 160 and the image sensors 160A to 160C in the respective modifications are applicable as the fingerprint sensor and the image sensor for two-dimensional code reading used in each of the first to the eighth embodiments. The configurations of the embodiments described above can be combined when appropriate.

Tenth Embodiment

An image sensor 160D according to the tenth embodiment of the present invention will be described with reference to FIGS. 82 to 84. *c*

Figure 82:
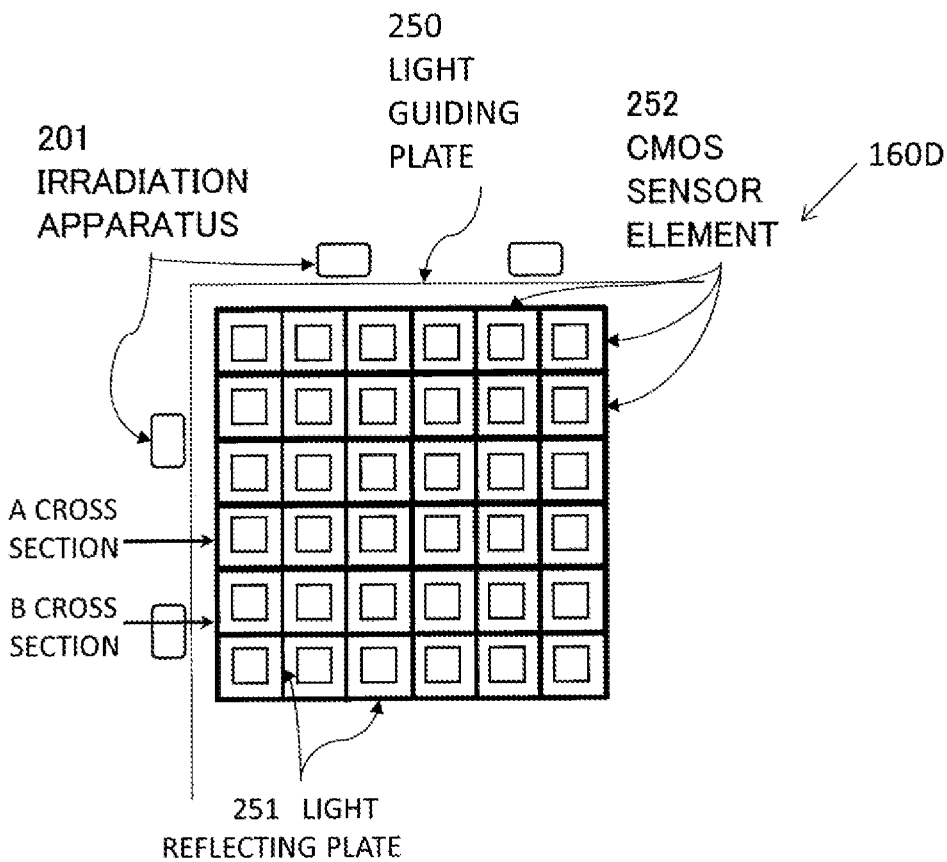
FIG. 82 is a plan view of the image sensor of the tenth embodiment as viewed from the imaging surface.
Figure 83:
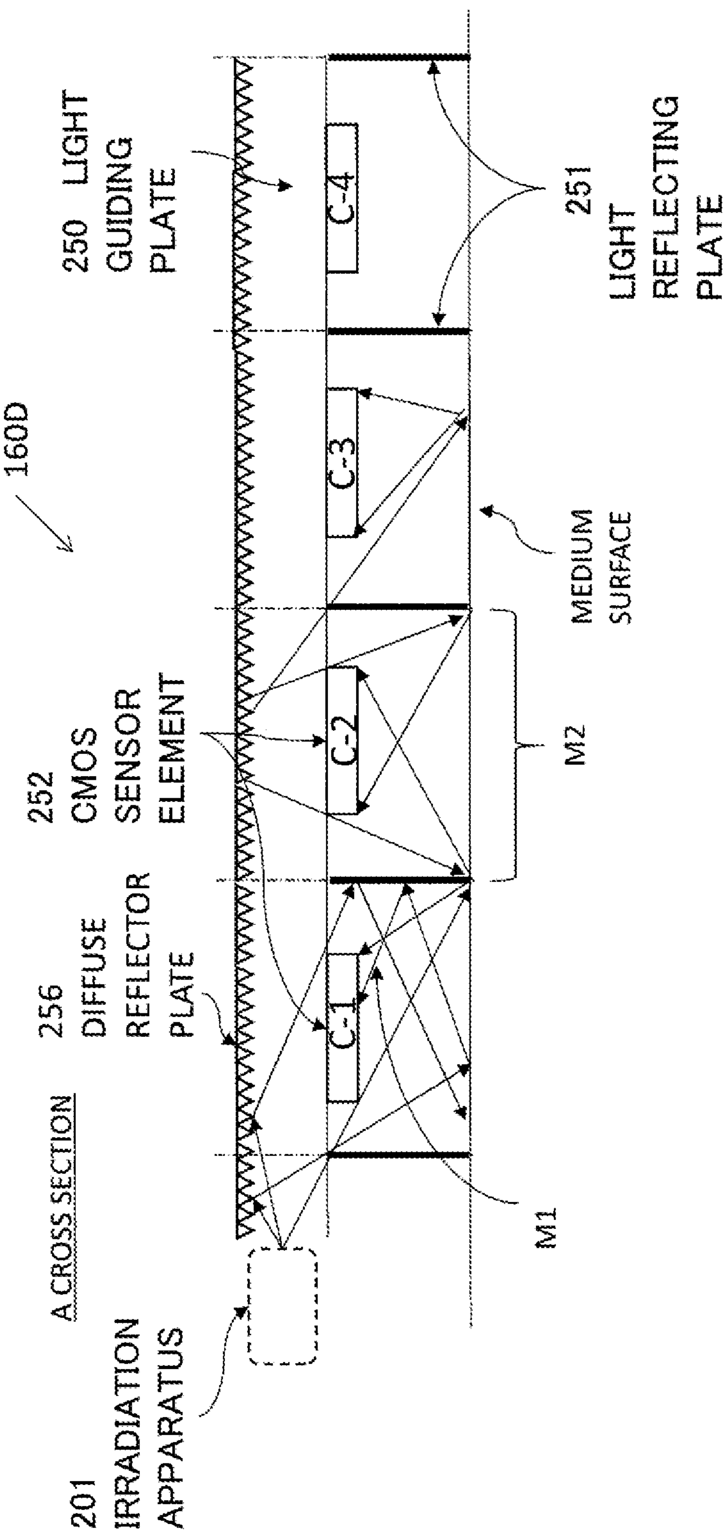
FIG. 83 is a sectional view of the image sensor.
Figure 84:
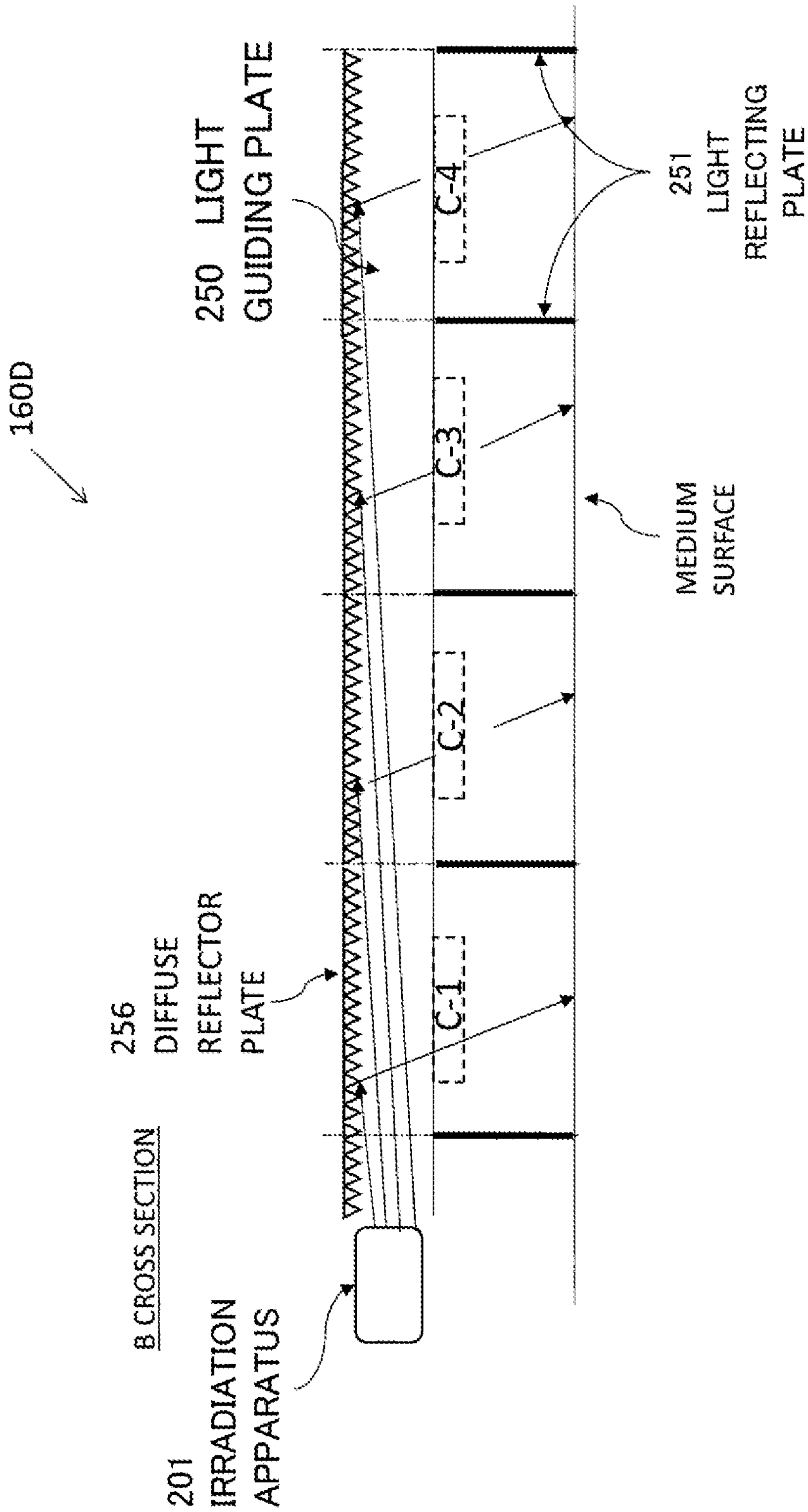
FIG. 84 is a sectional view of the image sensor.

FIG. 82 is a plan view of the image sensor 160D as viewed from the imaging surface, FIG. 83 is a sectional view along the arrow indicated by the letters "A cross section" of FIG. 82, and FIG. 84 Is a sectional view along the arrow indicated with the letters "B cross section" of FIG. 82.

In the image sensor 160D, CMOS sensor elements 252 are arranged on a semiconductor substrate in a lattice shape with predetermined spacing. The CMOS sensor elements 252 arranged in a lattice shape constitute an example of an array of pixel sensors that output electric signals corresponding to incident optical signals. The paper surface side in FIG. 82 and the lower side with respect to the paper surface side in FIG. 83 are light receiving units of the CMOS sensor element 252. When light enters the light receiving unit, the CMOS sensor element 252 outputs an electric signal having a pixel value.

Note that FIG. 82 is a diagram exemplifying a part of the arrangement of the CMOS sensor elements 252. Therefore, in FIG. 82, an arrangement of 6×6 CMOS sensor elements 252 is exemplified, but the number of CMOS sensor elements 252 included in the image sensor 160D is not necessarily 36 pieces. Furthermore, in FIGS. 83 and 84, the medium surface (also referred to as an imaging target surface) of the imaging target is placed on the lower side of the paper surface of the CMOS sensor elements 252. Also, a light guiding plate 250 is provided on the upper surface (the surface opposite to the imaging target side) of the CMOS sensor elements 252. Furthermore, adjacent to the light guiding plate 250, an irradiation device 201 for irradiating light into the light guiding plate 250 is provided. The irradiation device 201 is, for example, a light emitting diode. In addition, the irradiation device 201 constitutes an example of a light source. The light guiding plate 250 exemplified in FIGS. 82 to 84 constitutes an example of a light guiding layer that irradiates light onto the imaging target surface. Further, the light guiding plate 250 exemplified in FIGS. 82 to 84 is provided on the side opposite to the light receiving unit of the pixel sensor, and constitutes an example of a light guiding layer that introduces light from between the said adjacent pixel sensors to the said imaging target surface.

As shown in FIG. 83, for the light guiding plate 250, a light diffusing material in which fine particles (fine powder) are mixed into a resin serving as the base material may be used. When a diffusing reflective material is used for the light guiding plate 250, it is desirable to combine the layer of diffusing reflective material with a layer of light reflecting material to form a diffuse reflector plate 256. For example, a layer (or film, plate) of light reflecting material is provided on the upper surface (the surface opposite to the imaging target side) of the light guiding plate 250 including the light diffusing material. A substrate of composite material combined with a light reflecting material layer and a light diffusing material layer will be referred to as a diffuse reflector plate 256. The diffuse reflector plate 256 constitutes an example of a light diffusing reflective layer that diffuses and reflects light in the direction of the imaging target surface. As in FIG. 82, fine particles (fine powder) having a light diffusion effect are mixed in the upper surface side of the light guiding plate 250. Therefore, as in FIG. 82, a light guiding pathway is formed, for example, with a light reflecting material layer which is a metal film as the uppermost layer, a light diffusing material layer which is a resin mixed with fine particles (fine powder), and a light guiding layer 250 with little fine particles (fine powder) mixed in or with no fine particles (fine powder). However, fine particles (fine powder) may be mixed in the whole light guiding plate 250 so that the whole light guiding plate 250 becomes a light diffusing material layer.

The light emitted from the irradiation device 201 enters the light guiding plate 250, and a part of the light is diffused by the light diffusing material layer. Further, light is totally reflected by the metal layer bonded to the upper layer of the light diffusing material layer. The totally reflected light travels toward the CMOS sensor element 252 while diffusing. Therefore, the light incident on the light guiding plate 250 is diffused and reflected by the action of the diffuse reflector plate 256 and uniformly irradiated on the medium surface of an imaging target. In this manner, the light guiding plate 250 irradiates the medium surface with light having a predetermined wavelength through the substrate margin area between adjacent CMOS sensor elements 252. For example, the substrate margin area between adjacent CMOS sensor elements 252 is formed with a member that transmits light. In addition, gaps may be formed by etching in the margin area. Note that as described above, in FIG. 83, fine particles (fine powder) are mixed only in the vicinity of the uppermost layer to form a light diffusing material layer. However, fine particles (fine powder) may be mixed in the whole light guiding plate 250. For example, the light guiding plate 250 may be a milky white acrylic material that diffuses and reflects.

Further, as exemplified in FIGS. 82 to 84, a light reflecting plate 251 is formed between layers including adjacent CMOS sensor elements 252 constituted by the layer of the CMOS sensor element 252 and the layer on the lower side of the CMOS sensor element 252 (the medium surface side of the imaging target). The light reflecting plate 251 constitutes an example of a light shielding unit extending from the pixel sensor boundary on the substrate on which the pixel sensor is formed to the said imaging target surface side.

Therefore, basically, only light reflected on the medium surface of the imaging region directly below the CMOS sensor element 252 exemplified by the element C-2 is incident on the element C-2 as indicated by arrows M2 in FIG. 83. However, as indicated by arrows M1 in FIG. 83, there may be the case where light reflected from the medium surface of the imaging region directly below the CMOS sensor element 252 exemplified by the element C-1 is again reflected by the light reflecting plate 251 and is incident on the element C-1. However, the re-reflection of light on the light reflecting plate 251 makes the captured image brighter on the average, and influence on image recognition is small.

As shown in FIG. 83, the CMOS sensor element 252 receives light reflected in a region in the vicinity directly below the CMOS sensor element 252, that is, a rectangular region whose center is the position on the medium surface of the imaging target which faces the center of the imaging surface of the CMOS sensor element 252, and images the reflected light. That is, the arranged CMOS sensor elements 252 receive light reflected from opposing rectangular regions which are set without any space in between on the medium surface and outputs them as pixels. Therefore, the light reflecting plates 251 are arranged in a lattice shape on the boundary between adjacent CMOS sensor elements 252 to avoid as much as possible the entry to a sensor element of light reflected from other than the rectangular region for imaging. At least a part of the light reflected from the rectangular region on the medium surface of the imaging target which faces the CMOS sensor element 252 is incident on the CMOS sensor element 252 arranged directly above. Note that the space of the front side (the medium side of the imaging target) of the CMOS sensor element 252 surrounded by the light reflecting plate 251 may be filled with a material of protective film that transmits light. In addition, a protective sheet or plate through which light having a predetermined wavelength is transmitted may be disposed on the layer that comes into contact with the medium surface. The layer of the light reflecting plate 251 constitutes an example of a light shielding unit that limits light incident on each of the pixel sensors to a range opposing the pixel sensor on the imaging target surface opposing the light receiving unit of the said pixel sensor.

The manufacturing method for the image sensor 160D exemplified in FIGS. 82 to 84 is as follows. First, a layer of an array of a drive circuit, a detecting circuit, and a CMOS sensor element 252 of the CMOS sensor element 252 is formed by a usual semiconductor process. Next, a light reflecting plate 251 surrounding the light receiving surface side of the CMOS sensor element 252 is formed. For example, after forming the layer of the CMOS sensor element 252, the imaging surface of the CMOS sensor element 252 is covered with the material of a protective film that transmits light. Then, a groove may be formed at a position where the light reflecting plate 251 is to be placed by photolithography and etching, a film serving as a seed (seed) may be formed by sputtering a metal, and the layer of the light reflecting plate 251 may be formed by embedding the metal into the groove by a plating process. Note that after the metal is embedded, the protective film on the imaging surface side of the CMOS sensor element 252 may be removed by etching, or it may be left as a protective film that transmits light. Further, a protective sheet or a plate layer that transmits light having a predetermined wavelength may be formed on the lower layer of the layer of the light reflecting plate 251 (the medium surface side of the imaging target). A layer of a protective film, a protective sheet, or a plate that transmits light for embedding the light reflecting plate 251 can be formed, for example, with the same process as that for a color filter layer or a lens layer in a usual CMOS sensor.

Eleventh Embodiment

Figure 85:
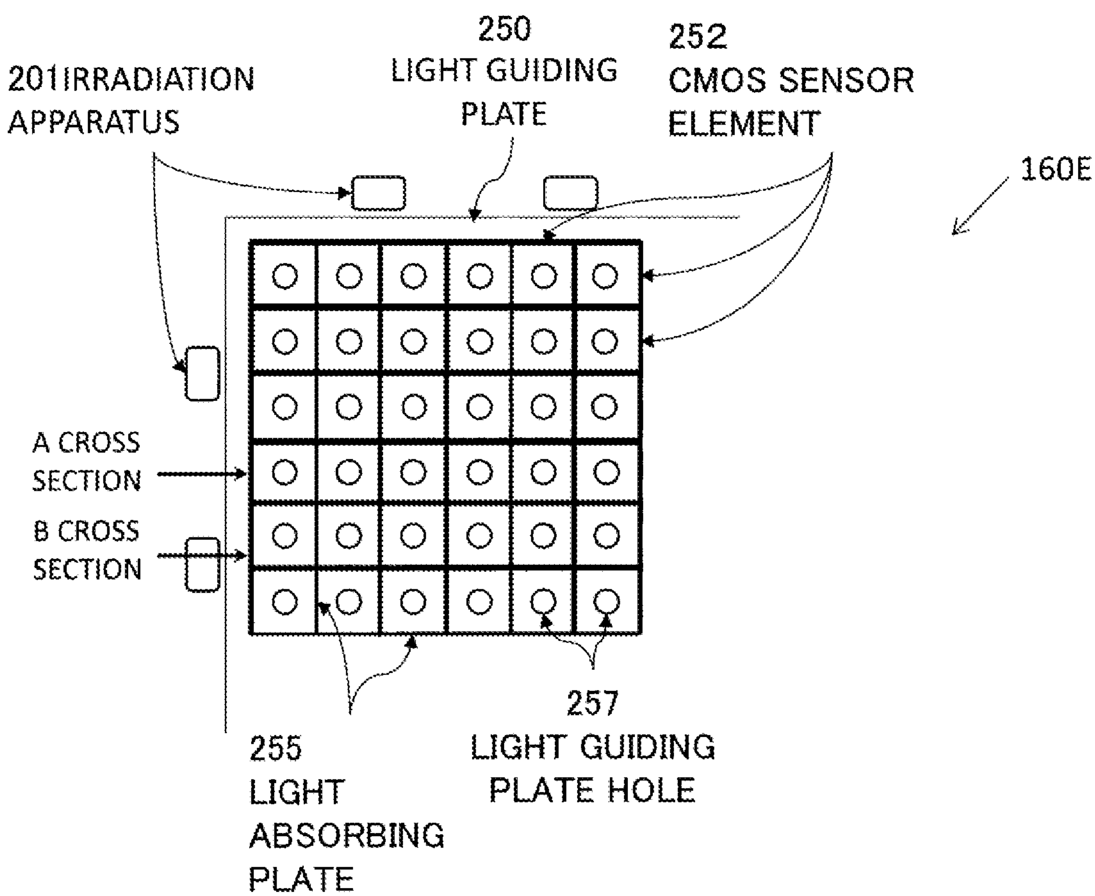
FIG. 85 is a plan view of the image sensor of the eleventh embodiment as viewed from the imaging surface.
Figure 86:
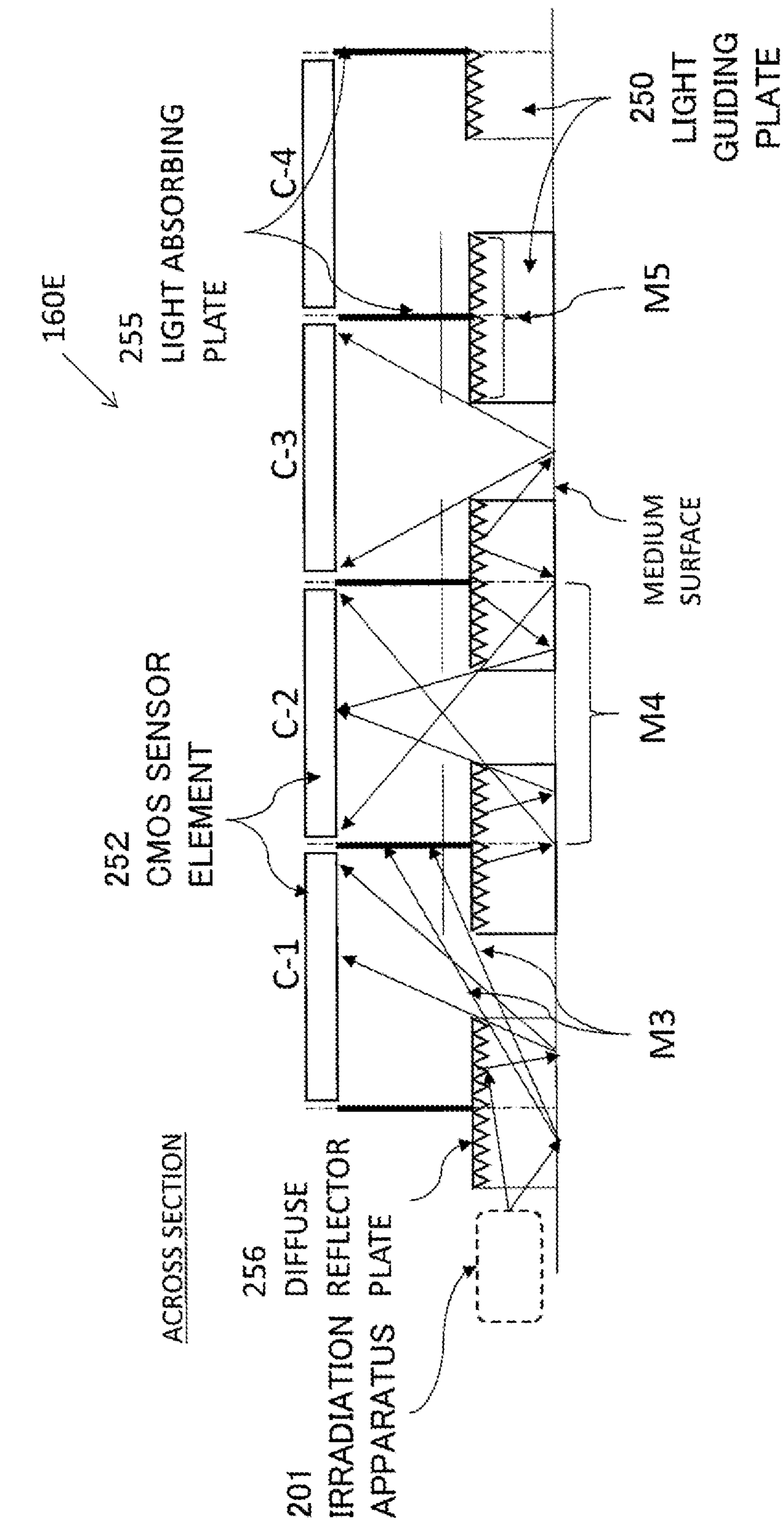
FIG. 86 is a sectional view of the image sensor.
Figure 87:
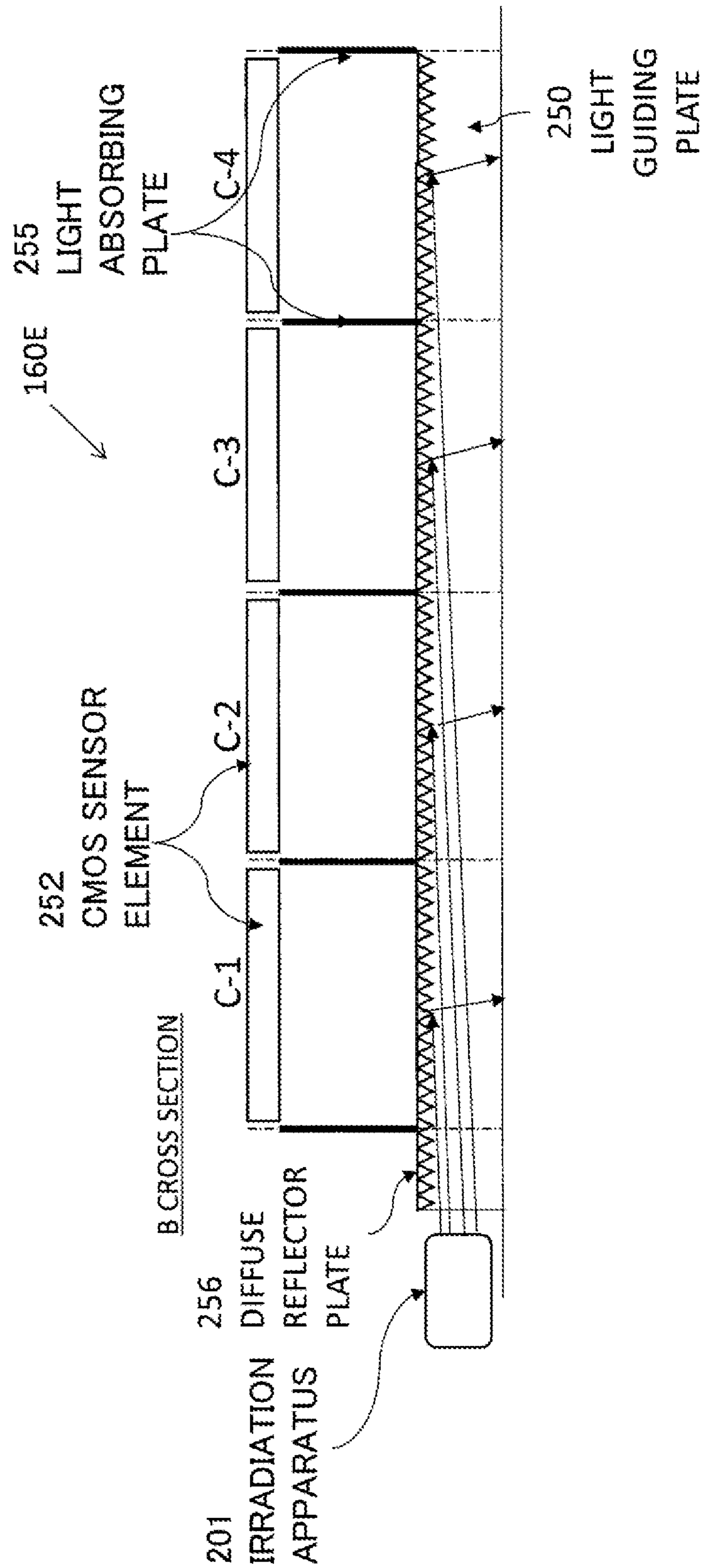
FIG. 87 is a sectional view of the image sensor.

With reference to FIG. 85 to FIG. 87, an image sensor 160E according to the eleventh embodiment of the present invention will be described. The image sensor 160E according to the tenth embodiment is a sensor that can also be used for image sensors exemplified in the present embodiment such as the image sensor 113A (FIG. 60) for fingerprint detection in the first embodiment, the image sensor described in the modification example of the fifth embodiment, the fingerprint sensor 113 in the eighth embodiment, the image sensor 160 and fingerprint sensor 113 in the ninth embodiment, or the like.

FIG. 85 is a plan view viewed from the imaging surface of the image sensor 160E, FIG. 86 is a sectional view along the arrow indicated by the letters "A cross section" in FIG. 85, and FIG. 86 Is a sectional view along the arrow indicated by the letters "B cross section" in FIG. 85. Note that FIG. 85, as with FIG. 82, exemplifies a part of the arrangement of the CMOS sensor elements 252.

As shown in FIG. 85, the CMOS sensor elements 252 are arranged in horizontal and vertical lines of a lattice shape on the imaging surface.

As exemplified in FIGS. 86 and 87, the image sensor 160E includes a layer of the CMOS sensor element 252, a layer of the light absorption plate 255 which is a lower layer (layer on the imaging surface side) of the CMOS sensor element 252, and a layer of a light guiding plate 250.

The space surrounded by the light absorption plate 255 (directly below the imaging surface of the CMOS sensor element 252) may be filled with material of a protective film that transmits light. That is, the light absorbing plate 255 may have a structure that fills a groove formed in protective film. For example, after forming the layer of the CMOS sensor element 252, it is covered with protective film. Then, by photolithography and etching, a groove for embedding the light absorption plate 255 is formed. Then, graphite or the like is embedded in the groove by sputtering to form the light absorption plate 255. After forming the light absorption plate 255, the protective film directly under the imaging surface of the CMOS sensor element 252 may be removed by etching. In addition, the protective film may be left together with the light absorbing plate 255. Note that the light absorption plate 255 may be formed with carbon nanotubes. Carbon nanotubes can be formed by, for example, a well-known CVD method.

A layer of the light guiding plate 250 is formed on the lower side of the layer of the light absorption plate 255 (the side opposite of the CMOS sensor element 252, the medium surface side of the imaging target). As in the tenth embodiment, the light guiding plate 250 may be a diffuse reflector plate 256 whose upper side is covered with a light reflection film such as a metal. In addition, the whole light guiding plate 250 may be a light diffusion material mixed with fine particles (fine powder). For example, the light guiding plate 250 may be a milky white acrylic material that diffuses and reflects. Further, an opening is formed in the light guiding plate 250, and light reflected from the medium surface is incident in the direction of the CMOS sensor element 252.

As indicated by arrows M3 in FIG. 86, light reflected by the medium surface other than the imaging region directly below the CMOS sensor element 252 exemplified by C-1 is absorbed by the light absorption plate 255 and is not incident on elements other than the CMOS sensor element 252 exemplified by C-1. And, as indicated by the arrows M4, only light reflected by the medium surface of the imaging region directly below the CMOS sensor element 252 exemplified by C-2 enters the CMOS sensor element 252 exemplified by C-2. Furthermore, in the layers of the diffuse reflector plate 256 and the light guiding plate 250 exemplified by the arrow M5, light incident on the light guiding plate 250 is diffused and reflected by the light diffuse reflector plate 256 to uniformly irradiate the medium surface of the imaging target.

The CMOS sensor element 252 images only light reflected in a region in the vicinity directly below the CMOS sensor element 252, that is, a rectangular region whose center is the position on the medium surface of the imaging target which faces the center of the imaging surface of the CMOS sensor element 252, and images the reflected light. That is, the arranged CMOS sensor elements 252 receive light reflected from opposing rectangular regions which are set without any space in between on the medium surface and outputs them as pixels. In order to prevent light reflected from regions other than the rectangular region opposing each CMOS sensor element 252 from being incident on the CMOS sensor element 252, under the CMOS sensor element 252, a light absorbing plate 255 is arranged in a lattice shape at the boundary between the CMOS sensor elements 252. Therefore, each CMOS sensor element 255 receives only light reflected from the rectangular region directly below to capture an image. The layer of the light absorbing plate 255 constitutes an example of a light shielding unit that limits light incident on each of the pixel sensors to a range opposing the pixel sensor on the imaging target surface facing the light receiving unit of the pixel sensor. The layer of the light absorbing plate 255 constitutes an example of a light shielding unit extending from the pixel sensor boundary on the substrate on which the pixel sensor is formed to the said imaging target surface side.

A light guiding plate 250 having a hole is provided directly below the lower surface of the CMOS sensor element 252, light having a predetermined wavelength is irradiated from the irradiation apparatus 201 onto the medium surface, and the light reflected on the medium surface is imaged by the CMOS sensor element 252. Thus, at least a part of the light reflected from the rectangular region on the medium surface of the imaging target which faces the CMOS sensor element 252 is incident on the CMOS sensor element 252 arranged directly above. Note that as described above, at least the gaps between the light absorbing plates 255 arranged in a lattice shape or the space of the holes of the light guiding plates 250 may be filled with a material that transmits light of a predetermined wavelength to form light guiding plates.

Twelfth Embodiment

Figure 88:
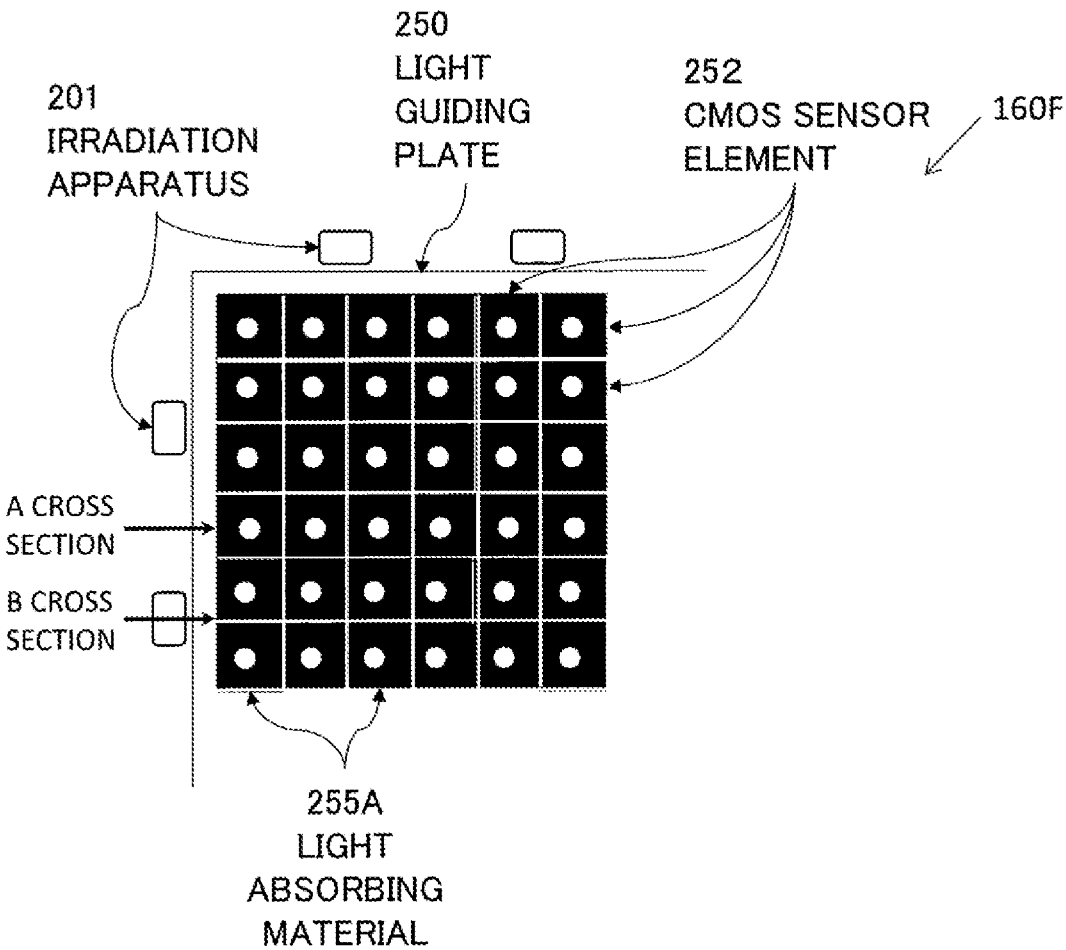
Figure 89:
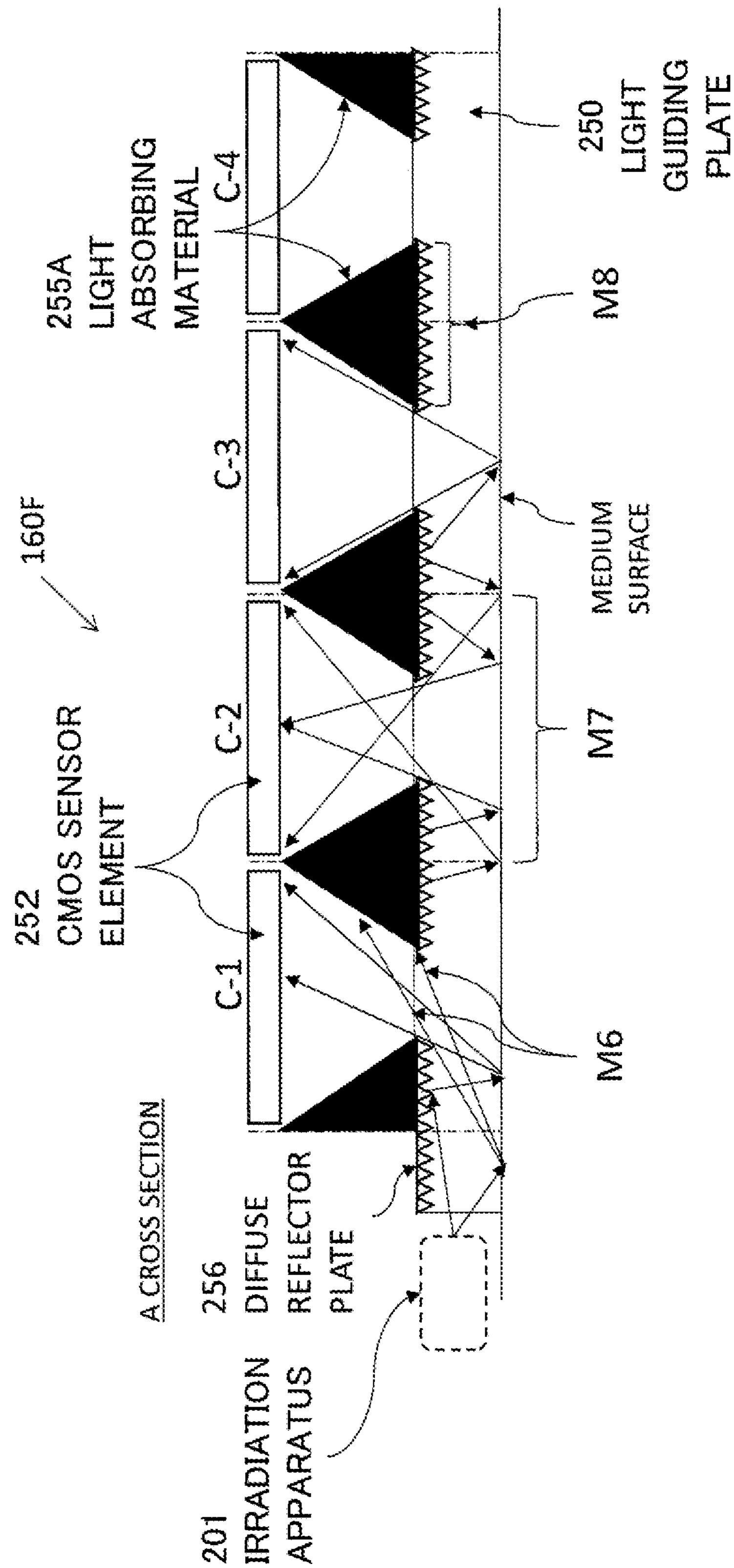
Figure 90:
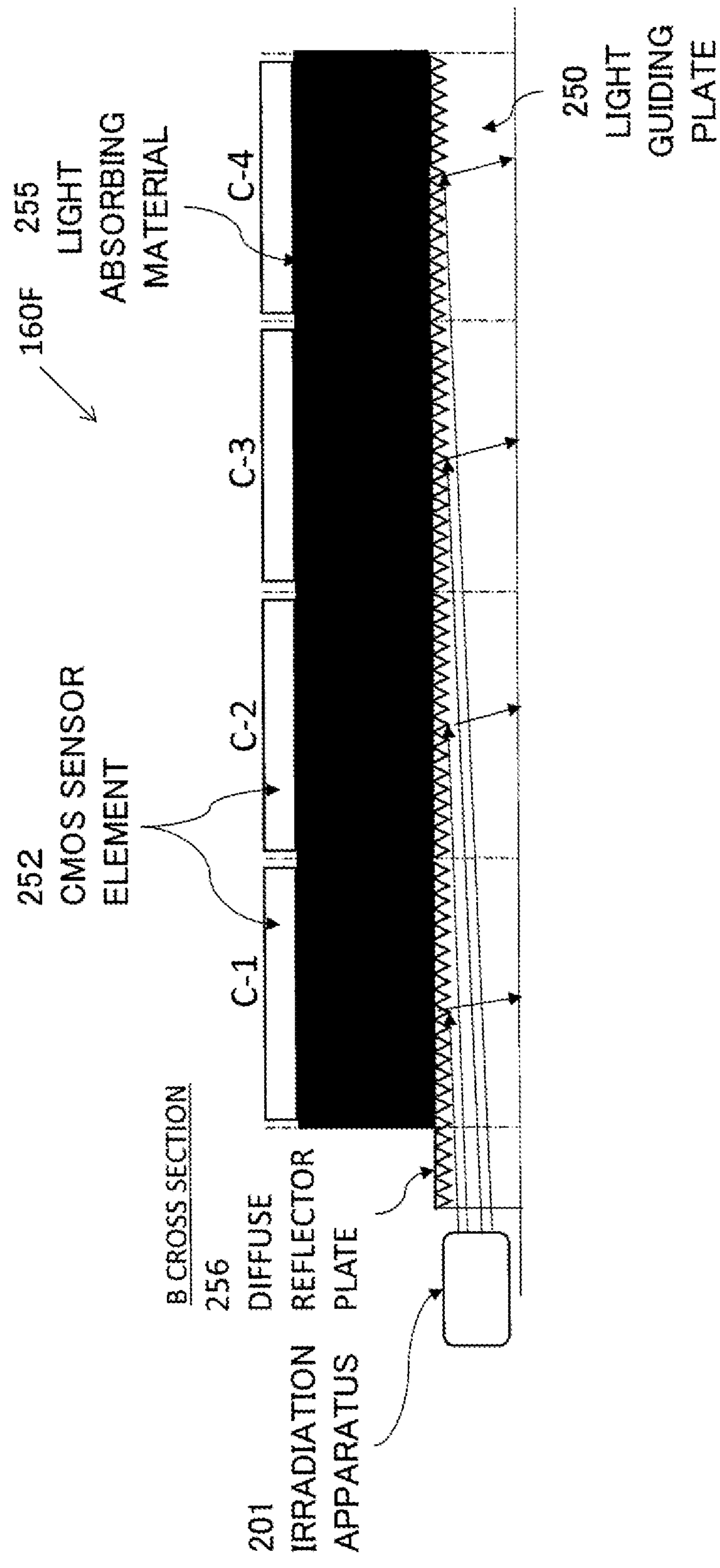

With reference to FIGS. 88 to 90, an image sensor 160F according to the twelfth embodiment of the present invention will be described. The image sensor 160F according to the tenth embodiment is a sensor that can also be used for image sensors exemplified in the present embodiment such as the image sensor 113A (FIG. 60) for fingerprint detection in the first embodiment, the image sensor described in the modification example of the fifth embodiment, the fingerprint sensor 113 in the eighth embodiment, the image sensor 160 in the ninth embodiment, the fingerprint sensor 113, or the like.

FIG. 88 is a plan view of the image sensor 160F as viewed from the imaging surface, FIG. 89 is a sectional view along the arrow indicated by the letters "A cross section" in FIG. 88, and FIG. 90 is a sectional view along the arrow indicated by the letters "B cross section" in FIG. 88. Note that FIG. 88 also exemplifies a part of the arrangement of CMOS sensor elements 252 similarly to FIG. 82 and FIG. 85.

As in FIGS. 89 and 90, the image sensor 160F includes a layer of the CMOS sensor element 252, a layer of the light absorbing material 255A which is a lower layer (layer on the imaging surface side) of the CMOS sensor element 252, and a layer of a light guiding plate 250, as with the image sensor 160E exemplified in FIGS. 85 to 87.

However, the light absorbing material 255A of the twelfth embodiment is not a plate like the light absorbing plate 255 of the eleventh embodiment, but has a shape in which the width of the cross section increases as the distance from the layer of the CMOS sensor element 252 increases. The space on the front side of the CMOS sensor element 252 surrounded by the light absorbing material 255A has a mortar-like shape (the space is tapered) in which the cross section becomes narrower as the distance from the layer of the CMOS sensor element 252 increases. That is, as viewed from the CMOS sensor element 252, the layer of the light absorbing material 255A has a structure in which countersink holes of a plurality of mortar holes are formed in the flat plate and openings that reach the surface of the imaging target medium are formed at the bottom of the countersink holes. Note that the countersink holes in the mortar holes are formed in a lattice shape at corresponding positions on the front side of the CMOS sensor element 252. As in the eleventh embodiment, the light absorbing material 255A is graphite, carbon nanotubes, or the like. The countersink hole of this mortar hole may be filled with material of protective film that transmits light. The layer of the light absorbing material 255A constitutes an example of a light shielding unit of which cross sectional dimensions increase as it extends from the substrate on which the pixel sensor is formed toward the said imaging target surface side.

As shown in FIG. 89, the light absorbing material 255A of which space becomes narrower as the distance from the layer of the CMOS sensor element 252 increases is formed, for example, by superposing the surface formed by isotropic etching such as wet etching on to the CMOS sensor element 252 and bonding them or pasting them together. That is, a layer of graphite (or a carbon nanotube film) is formed on the light guiding plate 250 (and the diffuse reflector plate 256), and by photolithography and isotropic etching of the graphite layer (or carbon nanotube film), the form of the graphite layer (or carbon nanotube film) is shaped. Etching is carried out until a pot-shaped recess is formed, and there is further opening at the bottom, so that the light guiding plate 250 (and the diffusive reflector 256) is exposed, and the graphite layer (or carbon nanotube film) may be removed. Then, the CMOS sensor element 252 is aligned so as to be exposed at the opening, and the surface of the etched graphite layer (or carbon nanotube film) is superimposed on the surface of the CMOS sensor element 252 and they are bonded.

As indicated by arrows M6 in FIG. 89, light reflected by the medium surface other than the imaging region directly below the CMOS sensor element 252 exemplified by C-1 is absorbed by the light absorbing material 255A, and is not incident to elements 252 other than the C-1 CMOS sensor element 252. As indicated by the arrow M7, only light reflected by the medium surface of the imaging region directly below the CMOS sensor element 252 exemplified by C-2 is incident on the element C-2. Further, in the layers of the diffuse reflector plate 256 and the light guiding plate 250 exemplified by the arrow M8, the light incident on the light guiding plate 250 is diffused and reflected by the light diffuse reflector plate 256 to uniformly irradiate the medium surface of the imaging target. The layers of the diffuse reflector plate 256 and the light guiding plate 250 constitute an example of a light guiding layer formed between the light blocking unit and the imaging target surface.

That is, as shown in FIG. 89, the CMOS sensor element 252 images only light reflected in a region in the vicinity directly below the CMOS sensor element 252, that is, a rectangular region whose center is the position on the medium surface of the imaging target which faces the center of the imaging surface of the CMOS sensor element 252, and images the reflected light. That is, the arranged CMOS sensor elements 252 receive light reflected from opposing rectangular regions which are set without any space in between on the medium surface and outputs them as pixels. In order to prevent light reflected from regions other than the rectangular region opposing each CMOS sensor element 252 from entering the CMOS sensor element 252, a light absorbing material 255A (light absorbing plate) having tapered holes in a lattice shape is provided under the CMOS sensor element 252. Therefore, each CMOS sensor element 252 receives only the light reflected from the rectangular region directly below to capture an image. The layer of the light absorbing material 255A constitutes an example of a light shielding unit that limits light incident on each of the pixel sensors to a range opposing the pixel sensor on the imaging target surface opposing the light receiving unit of the said pixel sensor. The layer of the light absorbing plate 255A constitutes an example of a light shielding unit extending from the pixel sensor boundary on the substrate on which the pixel sensor is formed to the said imaging target surface side.

The light guiding plate 250 is provided on the bottom side of the layer of the light absorbing material 255A, and the medium surface is irradiated with light having a predetermined wavelength, and the light reflected on the medium surface is imaged by the CMOS sensor element 252. Thus, at least a part of the reflected light is incident on the CMOS sensor element 252 arranged directly above from the rectangular region. Note that an opening (hole) equivalent to the tapered opening. in the light guiding plate directly below the lower part of the light absorbing material 255A may be provided. The shape of the hole may be a cylindrical shape or the like, but it is also possible to have it be a tapered shape with its lower portion spreading so that light reflected from the whole area of the block is incident on the sensor element through the air gap. Note that as described above, a protective film that transmits light may be embedded in the space on the front side of the CMOS sensor element 252 surrounded by the light absorption plate.

Thirteenth Embodiment

Figure 91:
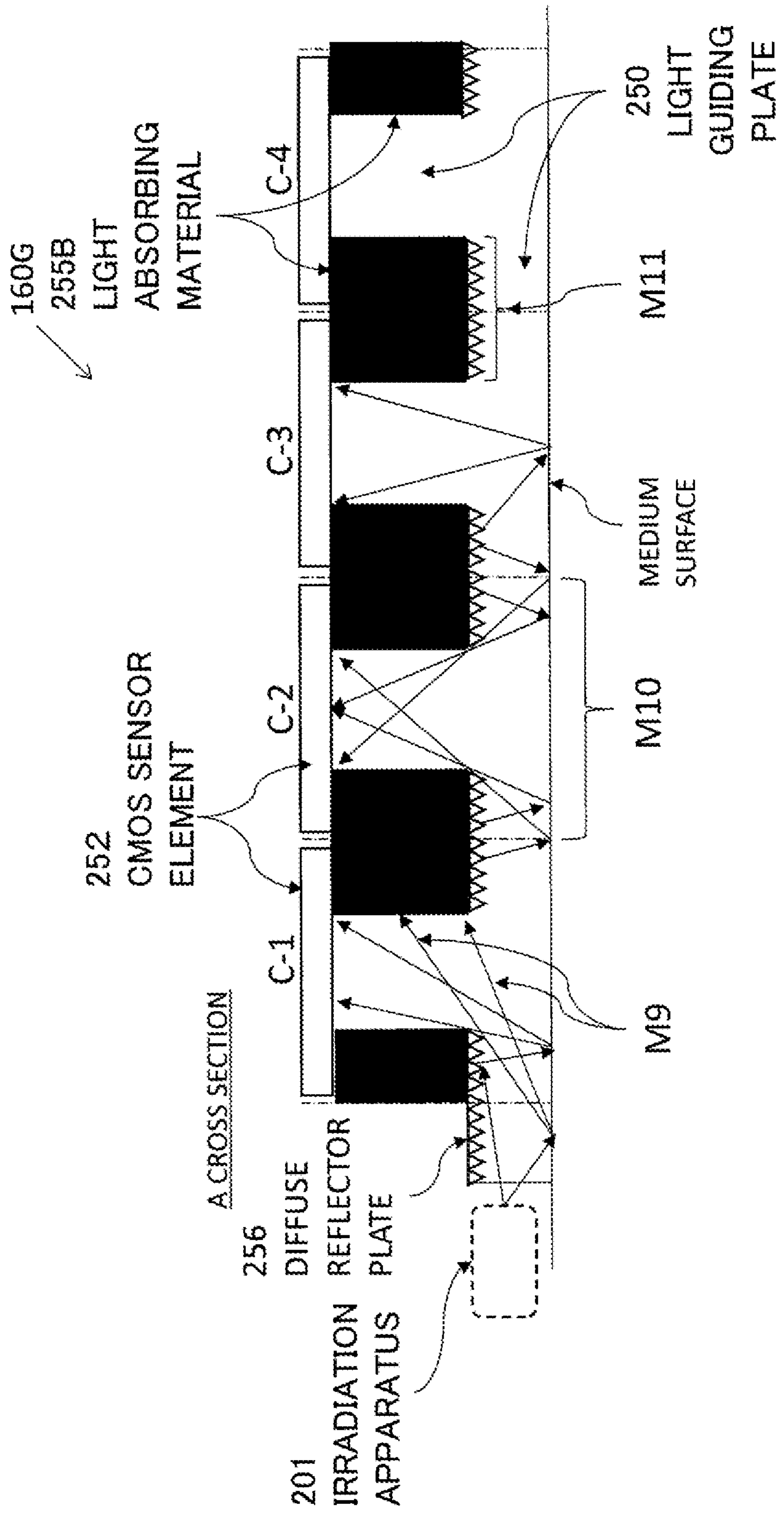

With reference to FIG. 91, an image sensor 160G according to the thirteenth embodiment of the present invention will be described. The image sensor 160G according to the tenth embodiment is a sensor that can also be used for image sensors exemplified in the present embodiment such as the image sensor 113A (FIG. 60) for fingerprint detection in the first embodiment, the image sensor described in the modification example of the fifth embodiment, the fingerprint sensor 113 in the eighth embodiment, the image sensor 160 in the ninth embodiment, the fingerprint sensor 113, or the like.

FIG. 91 is a sectional view of a portion of the CMOS sensor element 252 of the image sensor 160G. The image sensor 160G differs from the twelfth embodiment in the point that the space surrounded by the layer of the light absorbing material 255 B does not form a tapered surface as shown in FIG. 89, but forms a vertical cylindrical surface that substantially exposes the image sensor 160 G. The layer of the light absorbing material 255B in FIG. 91 may be formed by forming a layer of graphite (or a layer of carbon nanotubes) and further performing photolithography and anisotropic dry etching. Note that a protective film (transparent light guiding material) that transmits light may be embedded in the space surrounded by the layer of the light absorbing material 255B. Further, a layer of the light guiding plate 250 is provided in the layer of the light absorption material 255B. The layers of the light guiding plate 250 are similar to those of the tenth to the twelfth embodiments, and a layer of the diffuse reflector plate 256 may be provided on the upper side (the side of the CMOS sensor element 252).

As indicated by arrows M9 in FIG. 91, light reflected by the medium surface other than the imaging region directly below the CMOS sensor element 252 exemplified by C-1 is absorbed by the light absorption plate 255 and is not incident on elements other than the CMOS sensor element 252 exemplified by C-1. And, as indicated by the arrows M10, only light reflected by the medium surface of the imaging region directly below the CMOS sensor element 252 exemplified by C-2 enters the CMOS sensor element 252 exemplified by C-2. Furthermore, in the layers of the diffuse reflector plate 256 and the light guiding plate 250 exemplified by the arrow M5, light incident on the light guiding plate 250 is diffused and reflected by the light diffuse reflector plate 256 to uniformly irradiate the medium surface of the imaging target.

Note that the shape of the hole of the layer of the light absorbing material 255B may be a cylindrical shape or the like, but it is also possible to have it be a tapered shape with its lower portion spreading so that light reflected from the whole area of the block is incident on the sensor element through the air gap. The layer of the light absorbing plate 255B constitutes an example of a light shielding unit that limits light incident on each of the pixel sensors to a range opposing the pixel sensor on the imaging target surface opposing the light receiving unit of the pixel sensor. The layer of the light absorbing plate 255B constitutes an example of a light shielding unit extending from the pixel sensor boundary on the substrate on which the pixel sensor is formed to the said imaging target surface side.

<Example of a Dot Pattern Imaged According to the Embodiment of an Image Sensor or the Like>

Figure 92:
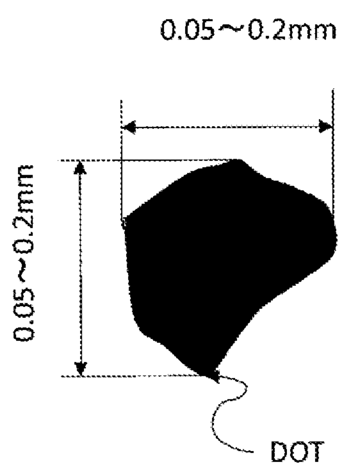

FIG. 92 exemplifies one dot included in the dot pattern imaged by the image sensor or the like according to the present embodiment. The image sensor or the like of the present embodiment is an image sensor or the like that can also be used for image sensors exemplified in the present embodiment such as the image sensor 113A (FIG. 60) for fingerprint detection in the first embodiment, the image sensor described in the modification example of the fifth embodiment, the fingerprint sensor 113 in the eighth embodiment, the image sensor 160 and fingerprint sensor 113 in the ninth embodiment, or the like.

In the case of a paper surface, dot printing is performed at 600 dpi (0.042 mm), but depending on the dot gain, paper quality, ink characteristics, accuracy of the printing machine, the dot size is to be about 0.05 mm or more, and also, for label printing and the like, accuracy is low and printing is performed at 300 dpi (0.085 mm), but due to a similar factor, the dot size is to be about 0.1 mm. Furthermore, in a display with low resolution, dots are displayed at about 2 mm.

Figure 93:
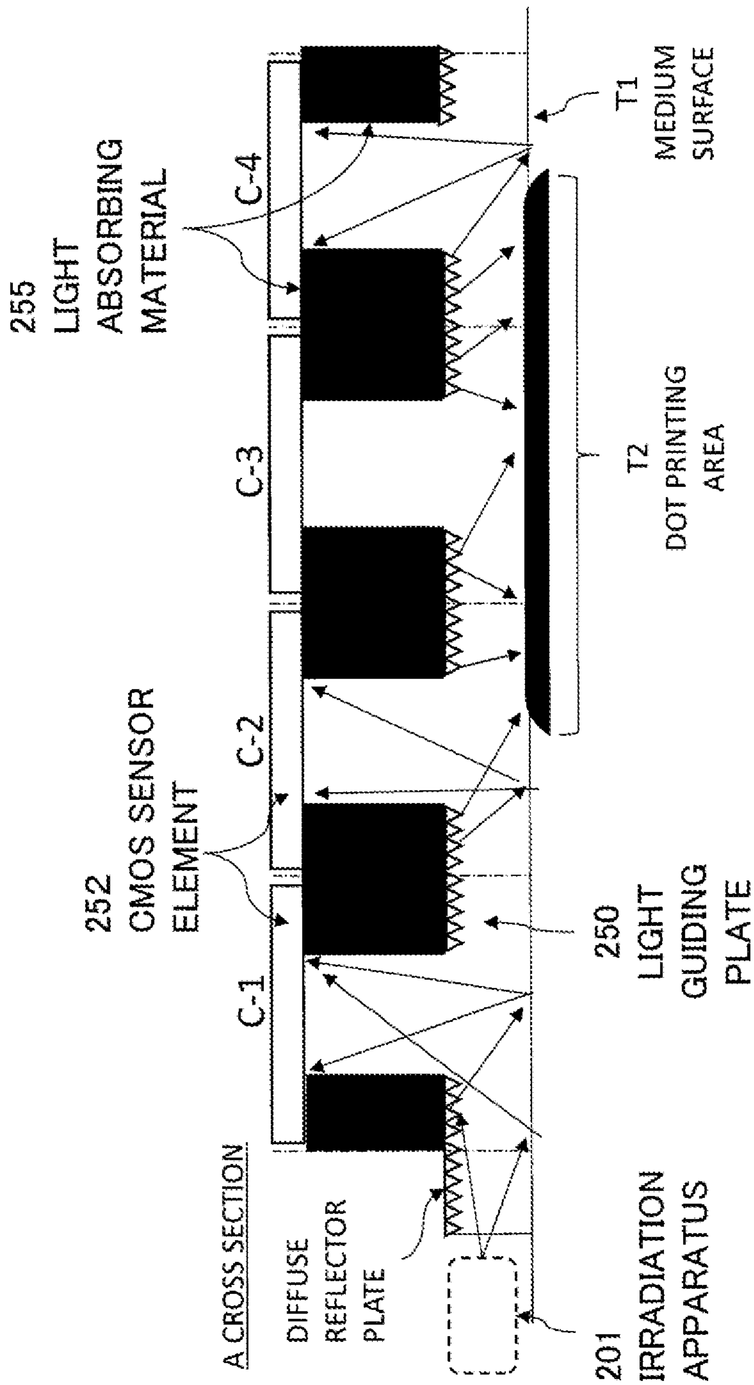

In the tenth through the thirteenth embodiments, (1) when reading dots printed at 600 dpi (about 0.05 mm in actual size), it is desirable to read a dot of about 2 to 4×2 to 4 pixels (4 to 16 pixels) or more (see FIG. 93). This is because when the printing situation is not good and the printing is thin, there are cases where the dots become small or some of the dots are missing and printing is performed at about 0.02 mm. Even in such a case, in order to accurately recognize dots, it is desirable to image one dot with a plurality of sensor elements.

Figure 94:
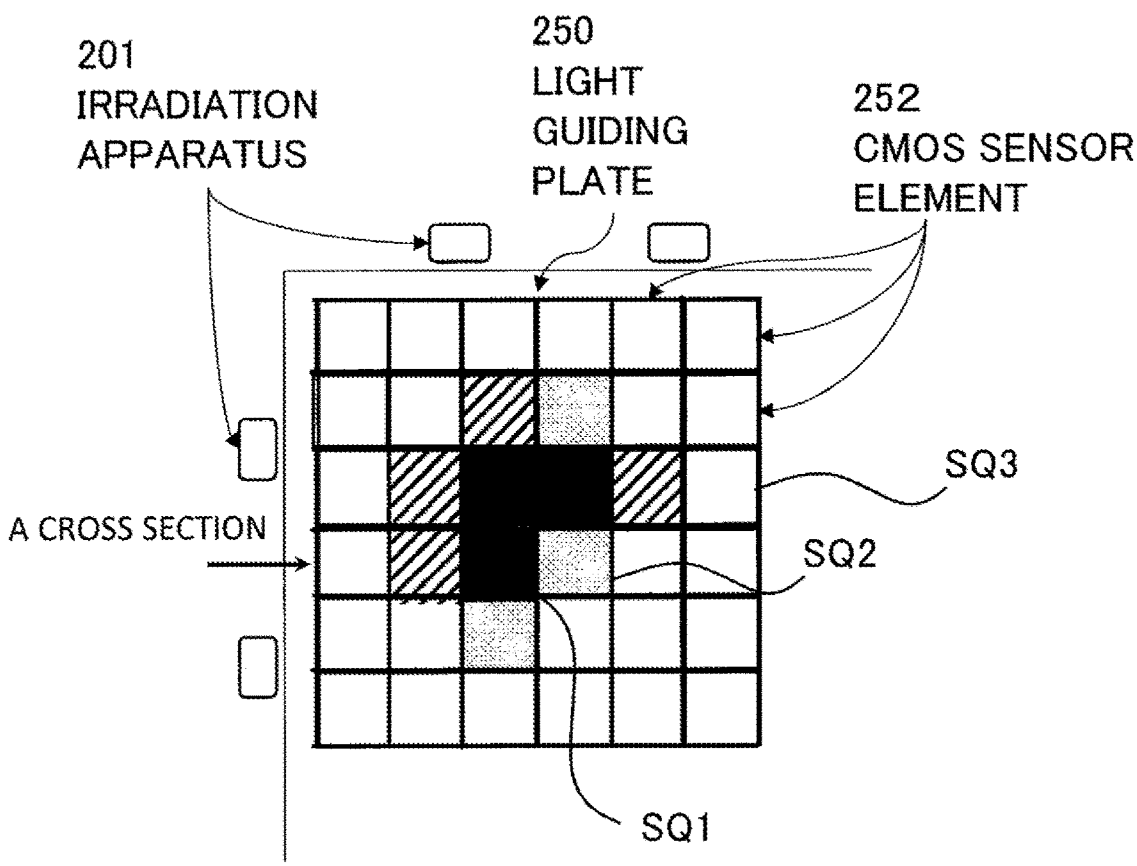

(2) Sensor elements are arranged directly above the print medium surface divided into rectangular shapes (hereinafter referred to as block formation), but in the tenth to thirteenth embodiments, light is irradiated on the surface of the print medium, and at least a part of the light of reflected light is incident on the sensor element arranged directly above. Therefore, if dots are formed in the whole rectangular area, all of the irradiation light is absorbed by the dots and no reflected light is generated. Therefore, output from the CMOS sensor element 252 is extremely small (shown in black in SQ1 in FIG. 94). If dots are formed in only a part of the rectangular region, only light reflected from the remainder of the medium surface is reflected, and only light reflected from a partial region is incident on the CMOS sensor element 252. Accordingly, the CMOS sensor element 252 outputs a current corresponding to a comparatively low luminance value (shown in gray in SQ2 (indicated by slanted lines and dots in the figure) in FIG. 94). On the other hand, if no dot is formed in the block, at least a part of the reflected light is incident on the CMOS sensor element 252 from the whole region of the block (the rectangular region directly under the CMOS sensor element 252). Accordingly, the CMOS sensor element 252 outputs a current corresponding to a relatively high luminance value (shown in white in SQ3 in FIG. 94).

(3) As in the eleventh to thirteenth embodiments shown in FIGS. 85 to 91, a mechanism for absorbing light is in effect so that light reflected from other than the rectangular region directly below is not incident on the CMOS sensor element 252 arranged directly above the irradiated region when light is irradiated on the surface of a printing medium, However, as long as light reflected from the medium surface does not affect the recognition of dots in another region, light reflected from other than the block directly below may be incident on the sensor element by a predetermined amount. Based on sufficient optical simulation and experiment, the light absorbing material may be replaced with a light reflecting material.

(4) As in the embodiments of FIG. 82 to FIG. 91, while a light reflecting material and a light absorbing material are arranged at the boundary of one block (a rectangular region directly below the CMOS sensor element 252) on a medium on which reflected light is incident on one sensor element, if the resolution of the CMOS sensor element 252 is sufficiently high, block regions directly under the corresponding medium may be collectively set as one block with respect to a plurality of adjacent CMOS sensor elements 252, and light reflecting material and light absorbing material may be arranged That is, instead of forming the light reflecting plate 251 of FIG. 82, the light absorbing plate 255 of FIG. 85, the light absorbing material 255A of FIG. 88, the light absorbing material 255B of FIG. 91, or the like around respective CMOS sensor elements 252, the light absorbing material 255A may be formed around the arrangement of the plurality of CMOS sensor elements 252. The light reflecting plate 251 in FIG. 82, the light absorbing plate 255 in FIG. 85, the light absorbing material 255A in FIG. 88, the light absorbing material 255B in FIG. 91, and the like formed around the arrangement of the plurality of CMOS sensor elements 252 constitute examples of a light shielding unit for limiting light incident on a partial array of pixel sensors including a plurality of pixel sensors to light from a range opposing the said partial array on an imaging target surface opposing the light receiving unit of the said pixel sensor.

In addition, for example, when the size of the CMOS sensor element 252 is sufficiently small and resolution is high as compared with the size of the dot, the light reflecting plate 251 in FIG. 82, the light absorbing plate 255 in FIG. 85, the light absorbing material 255A in FIG. 88, the light absorbing material 255B in FIG. 91, or the like need not to be provided. In the case where the light reflecting plate 251 of FIG. 82, the light absorbing plate 255 of FIG. 85, the light absorbing material 255A of FIG. 88, the light absorbing material 255B of FIG. 91, or the like are not provided, for example, the pixel value may be determined based on the output value from the internal arrangement (for example, M−2 rows×N−2 rows) in an array (M rows×N columns, 3×3 or more) of a plurality of CMOS sensor elements 252 by ignoring detection values from surrounding rows and columns (for example, the first row and the Mth row, the first column and the Nth column). The surrounding rows and columns are not restricted to the outermost one row and one column, and detection values from a sequence near the surroundings may be ignored. Then, brightness may be determined by averaging or by applying the majority logic on the output from the CMOS sensor elements 252 belonging to the internal arrangement. By doing so, since the energy of the reflected light decays according to the distance from the surface of the object to be imaged, when dots of a size sufficiently larger than the pitch of the CMOS sensor elements 252 are formed on the imaging plane with a sufficiently large dot pitch, resolution is sufficient. As for such an image sensor, for example, by applying a process for a general CMOS image sensor, the image sensor exemplified in the tenth to the thirteenth embodiments can be manufactured without providing a light reflecting plate 251 as in FIG. 82, a light absorbing plate 255 as in FIG. 85, a light absorbing material 255A as in FIG. 88, a light absorbing material 255B as in FIG. 91, and the like. This is an example of a pixel sensor for outputting a single pixel data by combining a plurality of pixel sensors for determining luminance by averaging or by applying the majority logic on the output from the CMOS sensor elements 252 of the internal arrangement.

(5) In the embodiments of FIG. 82 to FIG. 91, while having a configuration in which a light reflecting material and a light absorbing material are arranged at the boundary of one block (a rectangular region directly below the CMOS sensor element 252) on a medium on which reflected light is incident on one sensor element to block reflected light incident from outside of the imaging region of the CMOS sensor element 252, reflected light incident from outside the imaging region of the CMOS sensor element 252 may be blocked, by disposing a lens not shown having a special structure in the imaging region.

The photographing region is a rectangular region directly below the CMOS sensor element 252. The lens having a special structure transmits only light incident within a predetermined angle from the medium surface with respect to the vertical direction and has the sensor detect the light. Light incident from an adjacent region, that is, light incident at an angle exceeding a predetermined angle is eliminated by refraction or reflection.

Here, the predetermined angle is an angle level at which there is no influence even if light incident from other than directly under the CMOS sensor element 252 is detected to some extent. Note that when the resolution of the CMOS sensor element 252 is high, one lens may be arranged for a plurality of CMOS sensor elements 252.

(6) In the embodiments of FIGS. 82 to 91, although all of the light guiding plates are used and the diffuse reflector plate is provided, needless to say that any method may be used as long as light incident from the periphery by the irradiation device is irradiated in the plane direction of the light guiding plate. Also, in FIGS. 85 to 91, the shapes of the light guiding plate and the light absorbing material are different, but any combination of shapes may be used.

(7) In the embodiments of FIG. 82 to FIG. 91, in principle, although based on the assumption of light reflected from the rectangular region of the print medium surface, the CMOS sensor element 252 is arranged directly above, if the resolution of the sensor is sufficiently high, light reflected from the whole region of the rectangular region need not be incident on the sensor element and it is sufficient to recognize with a plurality of predetermined sensor elements that there is no reflected light from one dot print region. That is, it is sufficient to image light reflected from a part of each rectangular region (generally, in the vicinity of the center of the rectangular region directly below the CMOS sensor element 252) to recognize the presence or absence of the dot.

(8) In the above tenth to the thirteenth embodiments, while adjacent sensor elements are arranged at a predetermined interval as shown as in FIG. 82 to FIG. 91, in order to improve sensitivity based on the arrangement of the sensor elements, it is preferable to have the interval between the sensor elements to be as small as possible. Conversely, the sensor elements may be arranged at intervals sufficient for a sensor element to recognize one dot printed on the medium surface of about 2 to 4×2 to 4 pixels (4 to 16 pixels) or more.

(9) In the case where the dot code to be used is defined in the 2×2 mm region, if a region of 4×4 mm is photographed, even if some of the dots cannot be recognized, by selectively retrieving dot patterns of readable regions (dot recognizable regions) and by error correction, it is possible to read the dot code accurately. Therefore, when one dot of 0.05 mm is photographed in one direction with 3 pixels, 3 pixels×4 mm/0.05 mm=240 pixels are required in one direction, and the CMOS sensor can ensure a sufficient recognition rate with a resolution of 240×240 pixels. That is, light reflected from the block area of a print medium surface of 4 mm/240 pixels×0.017 mm in actual size is imaged by one sensor element. Note that if printing accuracy can be secured, it is possible to image a region of 3.5×3.5 mm at a resolution of 160×160 pixels. In that case, an area of 3.5 mm/160 pixels≈0.022 mm in actual size may be imaged per element. Note that if an image sensor is arranged at an image pitch of 1 micron, for example, by adopting a process of an ordinary CMOS sensor for the image sensor described in the tenth to the thirteenth embodiments, a dot of about 3 microns (a dot interval is, for example, 3 microns) can be read. Therefore, according to the image sensors of the tenth to the thirteenth embodiments, the conventional dot pattern enables reading of a fine dot pattern of two digits. As described in the above (4), when a light reflecting plate 251 as in FIG. 82, a light absorbing plate 255 as in FIG. 85, a light absorbing material 255A as in FIG. 88, a light absorbing material 255B as in FIG. 91, or the like are not provided, even if the average value is used or majority decision is applied based on the output of CMOS sensor elements 252 of M rows and N columns, for example, of central 3 rows×3 columns out of 5 rows×5 columns, it is possible to detect dots with a size of 15 microns for an element arrangement of 5 rows×5 columns (5 microns×5 microns).

(10) By using ink in which only dots react to light having a predetermined wavelength, and a dot pattern is superimpose printed on a graphics, dots can easily be recognized and TT codes can be acquired, by irradiation of a predetermined wavelength and imaging of reflected light. In the contact type flat plate dot code reading apparatus as exemplified in the tenth to the thirteenth embodiments, since light is irradiated by the light guiding plate, and the medium surface comes into contact with the light guiding plate, external light does not enter. As a result, there is no need for a filter that transmits at least certain wavelengths and blocks other specific wavelengths. Thus, it is possible to photograph a dot pattern displayed in the visible light region emitted from the display and to recognize the dot code.

Generally, for dot printing on a paper medium, carbon black which absorbs infrared rays, transparent ink which absorbs infrared rays, or inconspicuous colored ink is used. In this case, it is desirable to irradiate light with such infrared wavelength using infrared rays. Of course, ultraviolet rays may be used and dots may be printed using ink which reacts upon irradiation with ultraviolet rays differently with light of other wavelengths such as visible light.

(11) This contact type flat dot code reading device may also serve as a fingerprint authentication device. In the case of fingerprint authentication, an area of about 8×8 mm is imaged and recognition is to be made at about 500×500 pixels or more (508 dpi recommended by the international standard of ISO/IEC 19794-2). That is, the image is recognized with an accuracy of 0.016 mm in actual size. From the above, it is necessary only to photograph a region of about 8×8 mm at 500×500 pixels, which is about twice of the 240 pixels necessary for dot code recognition. As a result, it is almost equal to the accuracy of dot reading, and thus fingerprint authentication is possible. A contact type flat plate dot code reader capable of reading at least 8×8 mm at an actual size of 0.016 mm (about 500×500 pixels or more) or less can be used for fingerprint authentication.

(12) In the reading of the dot code, it was sufficient to photograph a part (generally, the vicinity of the center) of respective blocks for recognizing the existence of a dot in (3), however, when photographing a line segment for fingerprint authentication or the like, it is necessary to recognize it as a line rather than points, and it is important to recognize the thickness of the line with a predetermined accuracy and to recognize that the lines are continuous, and it is desirable to image light reflected from all regions of a predetermined medium surface (finger).

(13) In the above tenth to the thirteenth embodiments, a configuration including a CMOS sensor element is exemplified. However, the implementation of the present invention is not restricted to CMOS sensors. That is, the present invention can be implemented as long as it is an image sensor (also referred to as a photosensor) that receives light from an imaging target surface and outputs a pixel signal by an element arrangement that converts it into an electric signal. Therefore, for example, even with an image sensor using a CCD, the present invention can be implemented.

(14) In the above described tenth to the thirteenth embodiments, examples of the reception of light reflected from the rectangular region are described, however, light is not restricted to reflected light and the CMOS sensor element 252 can receive light from the backlight of a pixel forming element or an element array of a liquid crystal display, an electroluminescence panel or some other display device and can output pixel signals. In this case, light from the irradiation device 201 is unnecessary. Further, as a pixel sensor dedicated to such a display device, the irradiation device 201, the light guiding plate 250, the diffuse reflection plate 256, and the like are unnecessary.

Fourteenth Embodiment

With reference to FIG. 95 to FIG. 99, the optical sensor of the apparatus 110 according to the fourteenth embodiment of the present invention will be described. The optical sensor according to the fourteenth embodiment can be used as the optical sensor 130 in the eighth embodiment. The apparatus 110 is, for example, similar to the card type device described in the first embodiment and the like.

The optical sensor 130 according to the fourteenth embodiment includes a combination of an LED which is a light emitting element and a photodiode which is a light receiving element. That is, the optical sensor 130 which includes a light receiving element capable of detecting the wavelength and intensity of light emitted from a touch panel of a smartphone or a display of a PC (hereinafter also referred to as a touch panel or the like), receives light that changes in the time direction and acquires an optical code. On the other hand, the light sensor 130 can also receive reflected light and acquire a color code when light is irradiated on the colored portion of printed material from the light emitting element (also referred to as an irradiation device). In this case, the print area where the reflected light detected by the optical sensor is reflected is to be of the same color. That is because when the apparatus 110 is a card, if the color of the print area in the range detected by each photodiode is different at the position where the apparatus 110 is placed, color change occurs according to how the card type device is placed, and color information is detected differently. Here, the print area of the same color refers to the range of the surface of printed matter which detects reflected light in a state where the optical sensor 130 including each photodiode is not moved. Therefore, there may be a plurality of print areas with different colors on one print medium surface. Note that the apparatus 110 can easily recognize whether or not it is being placed on either a touch panel or the like or a printed matter by determining whether light emitted from a touch panel or the like is received with changes with time. Also, the reflected light can be determined whether or not to be reflected light from a printed matter, depending on whether the transmission signal by the light emitting element and the reception signal by the light receiving element have a specific relationship. For example, when a specific pulse signal (emission signals of HI and LO) is irradiated from a light emitting element, and the same pulse signal can be received by a light receiving element, it can be determined that it is reflected light from the printed matter. On the other hand, when a signal that does not coincide with the pulse signal emitted from the light emitting element is received by the light receiving element, it can be determined that there is a high possibility that it is not reflected light from the printed matter. When the apparatus 110 recognizes that it is placed on a touch panel or the like, the light sensor 130 may stop irradiation. If the light emitted from the irradiation device does not affect the recognition of the optical code emitted from the touch panel or the like, the light sensor 130 may continue irradiation.

Figure 95:
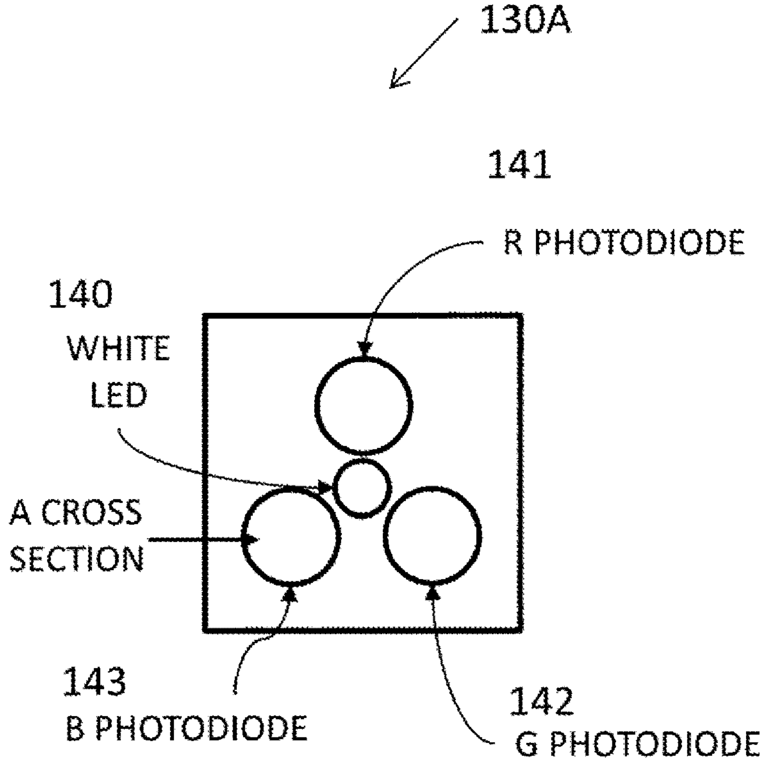

FIG. 95 is a plan view as viewed from the light receiving surface of the optical sensor 130A. At the center of the optical sensor 130A, a white LED 140 is disposed as an irradiation device. An R photodiode 141, a G photodiode 142, and a B photodiode 143, each of which is provided with a color filter that transmits light of different wavelengths (RGB), are arranged around the white LED 140 at equal intervals. For the R photodiode 141, the G photodiode 142, and the B photodiode 143, a photodiode having sensitivity to light in the wavelength range of each color may be used.

Figure 96:
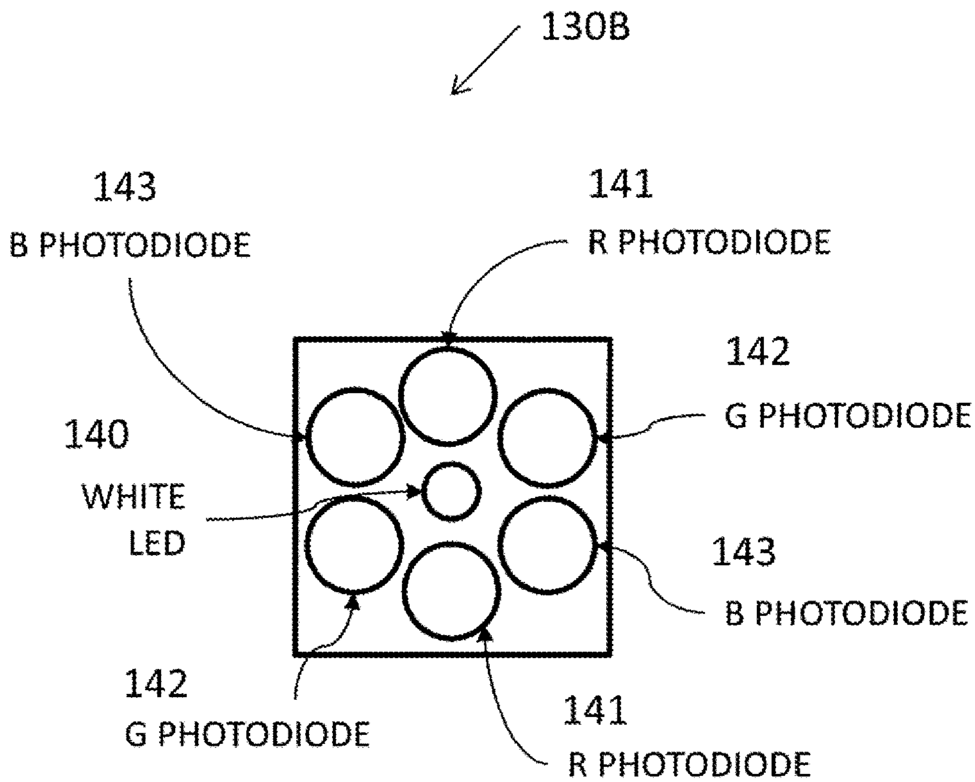

FIG. 96 is a plan view of the optical sensor 130B having six photodiodes as viewed from the light receiving surface. In the optical sensor 130B, a white LED 140 is arranged in the center, and two R photodiodes 141, two G photodiodes 142, and two B photodiodes 143 are arranged at equal intervals. In the example of FIG. 96, each photodiode is arranged in the order of R→G→B→R→G→B clockwise from above the white LED 140.

The white LED 140 is located at approximately the same distance from each photodiode. Since approximately the same amount of light is irradiated on the surface of the print medium, the amount of light received by the R photodiode 141, the G photodiode 142, and the B photodiode 143 can be considered to be about the same. However, if the printing situation under each photodiode is not uniform, the color code may not be correctly decrypted. Therefore, by making the positions of the R photodiode 141, the G photodiode 142, and the B photodiode 143 as close as possible to each other, it may be considered that the amount of received light does not vary to the extent that affects decrypting even if there is a slight change in color. If the irradiation device is configured to irradiate the surface of the print medium uniformly, regardless of the position of the white LED 140, it is desirable to have the positions of the R photodiode 141, the G photodiode 142, and the B photodiode 143 are close to each other. In the example in which three photodiodes are arranged as shown in FIG. 95, it is desirable to have each diode be close to each other so as to constitute a triangle and to have each diode uniformly irradiate the surface of the print medium as a color code reading target with a light guiding plate or the like.

The R photodiode 141, the G photodiode 142, and the B photodiode 143 detect the intensity of light of red (R), green (G), and blue (B), respectively. Although the detection level may depend on printing accuracy, it is possible to detect at least 8 levels (3 colors×3 bits=9 bits, 512 colors) to 16 levels (3 colors×4 bits=12 bits, 4096 colors). If printing accuracy is high, even more levels can be detected.

Here, in order to prevent erroneous recognition, a white photodiode is added and an error check may be carried out by determining whether or not the relationship (level) between the intensity of light detected by the white photodiode and the intensity of light detected by the R photodiode 141, the G photodiode 142, and the B photodiode 143 is normal. As another method, as with the optical sensor 130B shown in FIG. 96, two R photodiodes 141, two G photodiodes 142, and two B photodiodes 143 are provided and an error check may be performed by determining whether or not the light detected by two diodes that detect light of the same color are of the same level. In this case, as shown in FIG. 96, it is desirable to have the photodiodes for detecting the same color arranged not to be close to each other. This is because it is also possible to determine whether or not it is placed on the print surface of an area other than the area where the color code of the same color is acquired. Note that since the medium is printed with inks of cyan (C), magenta (M) and yellow (Y), each photodiode may be provided with a filter that transmits light of wavelengths of cyan, magenta and yellow, respectively, to detect the intensity of each light.

Figure 97:
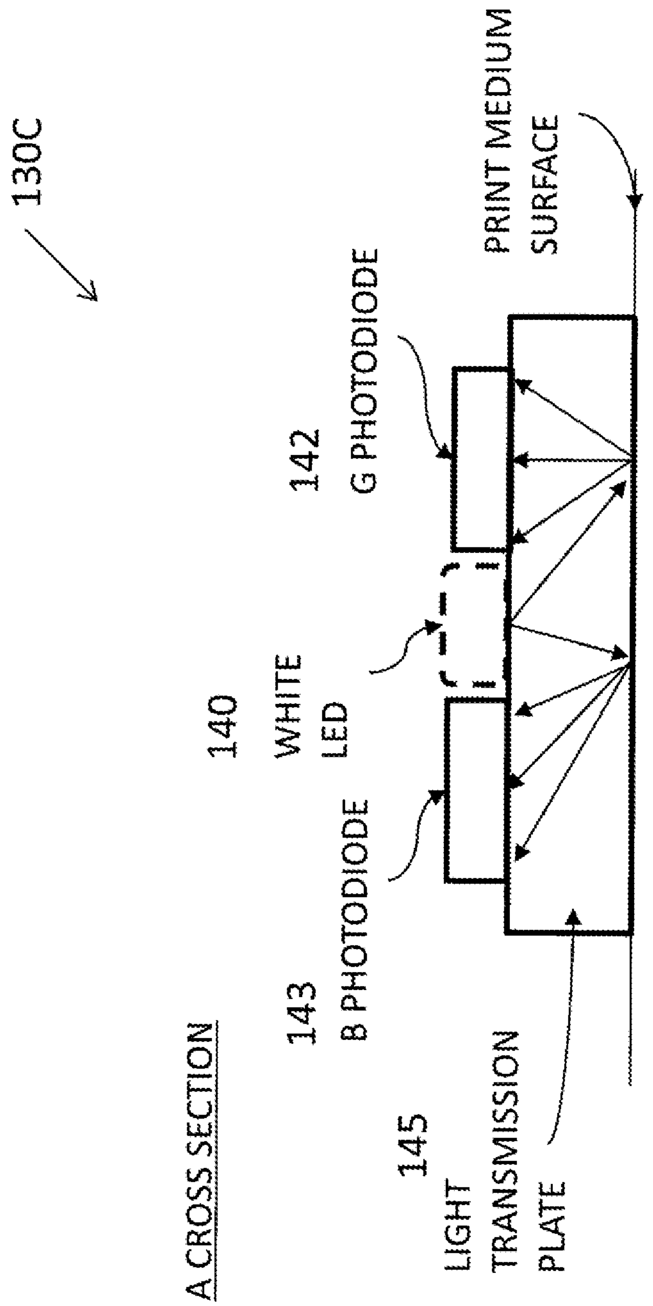
Figure 98:
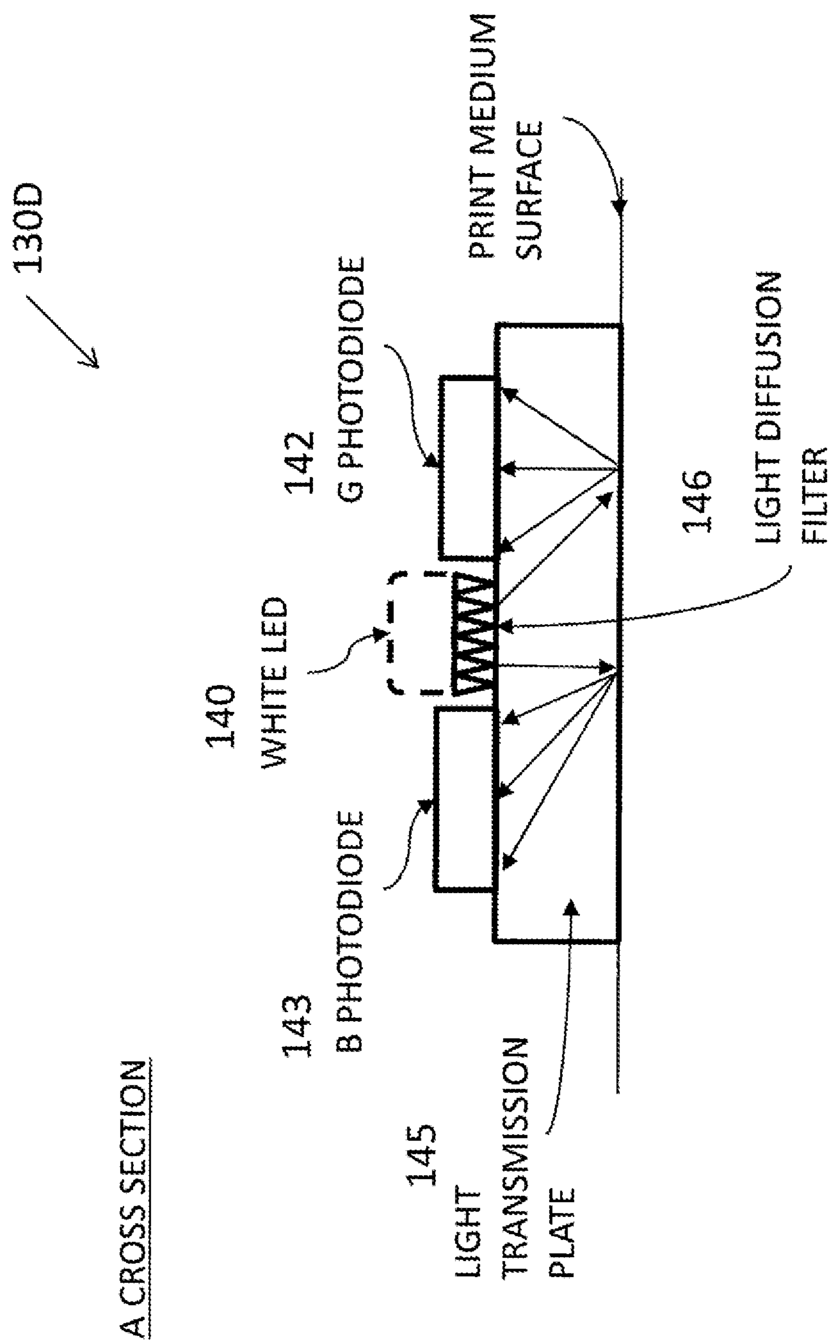
Figure 99:
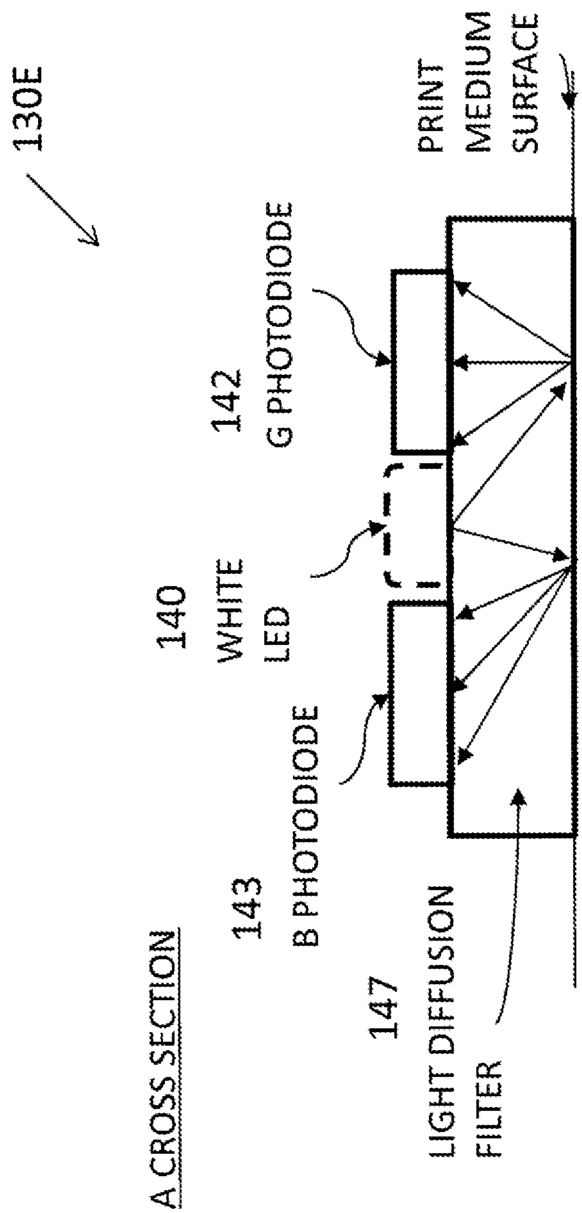

FIGS. 97 to 99 are sectional views of the optical sensor along the arrow indicated with the letters "A cross section" of FIG. 95, showing a modification of the optical sensor 130A.

FIG. 97 is a sectional view of the optical sensor 130C. The optical sensor 130C has a configuration in which a light transmitting plate 145 having a predetermined thickness is provided so that light from the white LED 140 is irradiated on the print area of the color code and each photodiode can receive predetermined reflected light. The light irradiated from the white LED 140 as a point light source is received on each surface of the R photodiode 141, the G photodiode 142, and the B photodiode 143 as reflected light of the same amount. Since the amount of light of the reflected light is high at the surface of the print medium under the white LED 140 and decreases toward the periphery, the printed color information may not be acquired accurately in some cases. However, when the light transmitting plate 145 is embedded in the card-shaped apparatus 110, if the surrounding side surfaces are formed with reflective material, since light is reflected on the side surface, the amount of light does not decrease so much even in the surroundings. When a light transmitting plate is not embedded, a reflecting plate may be provided in the surrounding side surface.

FIG. 98 is a sectional view of the optical sensor 130D. The optical sensor 130D has a configuration in which the light diffusion filter 146 is provided directly under the white LED 140 in order to diffuse and irradiate in multiple directions as the surface light source from the white LED 140. As a result, the white LED 140 of the optical sensor 130D can irradiate the print medium surface relatively uniformly. The white LED 140 may be an LED subjected to diffusion reflection processing.

FIG. 99 is a sectional view of the optical sensor 130E. The optical sensor 130E has a configuration in which a light diffusion plate 147 formed of a material (white acryl or the like) that diffuses light is included instead of a light transmitting plate. As a result, the light irradiated from the white LED 140 is irradiated onto the surface of the print medium almost uniformly, and reflected light is also diffused and reflected. Therefore, a difference in the amount of received light due to a difference in position of reception is reduced. Even when the printing situation is not good and there is a change in the color of the color code reading print medium surface, the optical sensor 130E can receive an averaged reflected light.

In the fourteenth embodiment, lights of three different wavelengths of R, G, and B are received, but the wavelength is not restricted to R, G, B, and light having other wavelengths may be used to read optical codes according to a similar mechanism. Note that a filter that transmits only predetermined wavelengths is provided, and the number of light receiving devices (photodiodes or the like) that can receive light of different wavelengths is not restricted. The amount of information that can be read increases according to the number of light receiving devices.

Note that, the irradiation apparatus may irradiate light with wavelengths including all of the different wavelengths, or may include an irradiation apparatus that irradiates a predetermined wavelength for each different wavelength. Note that a code reading device including the above optical sensor 130A or 130B may also be used as a stamp code reading device. In addition, as the optical sensor, the apparatus 110 may use a light receiving element that receives light of the same color or light with partially overlapping wavelength ranges instead of a light receiving element that receives light of different wavelengths. In the case where a plurality of light receiving elements are used for receiving such light of the same color or light with partially overlapping wavelength ranges, the light reflecting area on the medium surface received by each light receiving element is separated, and the light receiving surface of the light receiving elements may be separated with a partition wall or the like so that reflected light from the reflection area on the medium surface that is incident on each light receiving element is not mixed.

Fifteenth Embodiment

With reference to FIG. 100 to FIG. 102, a pattern code output by a digital stamp according to the fifteenth embodiment of the present invention is described. The digital stamp according to the fifteenth embodiment can have the same configuration as the code generation apparatus 1 shown in the zeroth embodiment.

[Pattern Code Output]

FIG. 100 is a schematic diagram showing an example of the configuration of the contact surface between the digital stamp and the information device 200. The digital stamp includes an information reading apparatus data input unit (photoelectric conversion element array) 112 and five elements 111 (also referred to a pattern code output device), and has an information reading instruction notch 26 on the outer circumference. The information reading instruction notch 26 is similar to the information reading instruction notch 26 provided in the code generation apparatus 1 in the zeroth embodiment.

The five elements 111 are conductors, and similarly to the zeroth embodiment, the information output from each element 111 is referred to as symbols 1 to 5. The symbol 1 is output from the element 111 on below the information reading apparatus data input unit 112. Symbol 2 and symbol 3 are output from the two elements 111 on the right side of the information reading apparatus data input unit 112, with the one on the upper side being the symbol 2 and the one on the lower side being the symbol 3. Symbol 4 and symbol 5 are output from the two elements 111 on the left side of the information reading apparatus data input unit 112, with the one on lower side being the symbol 4, and the one on the upper side being the symbol 5. As described in the first embodiment, a symbol is a signal detected by a physical quantity sensor such as a touch panel by an interaction between the element 111 and the sensor (physical quantity sensor) such as a touch panel capable of detecting a physical quantity.

The digital stamp, outputs information (pattern code) to be transmitted to the information device 200, by outputting various arrangement patterns (hereinafter also referred to simply as patterns or information patterns) from a plurality of elements 111 arranged on a plane and having spatial breadth, by the switching on/off of each symbol. That is, the pattern code refers to information expressed by changing the combination of ON and OFF of the symbols output from the plurality of elements 111 on the time axis. A combination of ON and OFF of a symbol output from a plurality of elements 111 at a certain time is referred to as a pattern. The states of ON or OFF of a symbol are transmitted from the digital stamp to the touch panel by the electrostatic capacitance between each element 111 and the touch panel or by the change in the electric field intensity on the touch panel surface. That is, the information device 200, detects a change in electrostatic capacitance (or a change in the electric field intensity on the surface of the touch panel) between respective elements 111 on the contact surface of the digital stamp placed on or is in proximity with the touch panel incorporated on the chassis surface and the touch panel, and the position of the element 110, thereby acquiring a pattern code from a digital stamp.

The digital stamp changes changing information patterns in the time direction to encrypt a large amount of pattern codes, and the pattern code is repeatedly output so that it can be recognized without loss. For this reason, the digital stamp makes the information device 200 recognize the delimiter of the data block, with a series of pattern codes as data blocks. A delimiter of the data block is defined by one or more unique patterns not appearing in other patterns. Furthermore, for the information pattern that changes in the time direction, the same pattern may occur consecutively, and it is necessary to accurately recognize the time interval during which the pattern occurs. Although the recognition interval for the touching of the touch panel differs for each model, the recognition interval for the touching of the touch panel of the current smartphone (recognition of a change in electrostatic capacitance or electric field intensity) is around 20 ms to 40 ms. However, with any type of device, it is difficult to achieve accurate synchronization between the time increment of detecting the element 111 by an application running on the reading side of a smartphone, a tablet terminal or the like, and the interval of information pattern generation when an information pattern is generated from the digital stamp. Therefore, it is desirable to have a digital stamp generate a pattern for accomplishing synchronization, and to have the information device 200 recognize an interval of information pattern generation. The pattern for accomplishing synchronization is not defined by all of the symbols 1 to 5, but is formed by part of the symbols, for example the symbol 1.

In the present embodiment, the digital stamp repeats ON/OFF of the symbol 1 alternately in accordance with the generation of individual information patterns. As a result, the touch panel or the like of the information device 200 can recognize the interval of information pattern generation and can decrypt the information pattern output from the digital stamp.

FIG. 101 is a diagram showing an example of pattern code output. The pattern code output apparatus 111 outputs various information patterns by the switching on/off of each symbol. As in FIG. 101, each information pattern is given a serial number from the left. The zeroth (serial number 0) information pattern is the case where the symbols 1 to 5 are in the OFF state. That is, as in FIG. 101, an element exemplified by an open circle indicates OFF, and an element exemplified by a filled circle indicates ON. ON refers to the case, for example, similar to the apparatus 110 of the first embodiment, where the element 111 is connected to another conductor or a connection switch (SW115 of the first embodiment or the like) is ON to a person's finger. The definition of OFF is similar to the description above. By placing the digital stamp on the touch panel of the information device 200, for example, similarly to the apparatus 110 of the first embodiment, the digital stamp receives electric power supply from the information device 200 or the like and starts operation. That is, as indicated by the first (serial number 1) information pattern, symbols 1 to 5 are set in the ON state. Note that the digital stamp can receive electric power supply by photoelectric conversion by the photoelectric conversion element array 112 that receives light from a battery or a touch panel.

As in FIG. 101, a delimiter of a data block is defined by the two information patterns of the first information pattern 1 and the second information pattern 2. In the following description, the nth information pattern is referred to as the pattern n. In pattern 1, symbols 1 to 5 are ON, and in pattern 2, symbols 1, 3, and 4 are ON. For symbols 1 to 5 defining the information pattern output in the time direction, symbol 1 alternates ON/OFF. Thus, in pattern 1 and pattern 2, symbol 1 and 3 or less (may be 0) of symbols 2 to 5 are continuously output as ON. Therefore, the combination of pattern 1 and pattern 2 (hereinafter also referred to as reference symbol pattern) in which the symbol 1 is turned on twice in succession has a different way of generating the symbol 1 in the combination of successive patterns of data blocks. Thus, the reference symbol pattern becomes a unique continuous pattern distinguished from other information patterns, and the delimiter of the data block is recognized.

Note that when the arrangement of the symbols 1 to 5 is axis symmetric, since the arrangement orientation of the elements 111 cannot be determined, the arrangement order of the symbols 2 to 5 may not be recognized in some cases. In this case, if at least one of the symbols 2 to 5 and the symbol 1 are output as ON in the pattern 2, the application of the information device 200 can recognize the arrangement orientation of the symbols. The application that recognizes the pattern code detects the output of symbol 1 and symbols 2 to 5, performs collation evaluation, recognizes that in two or more consecutive patterns symbol 1 is ON, and if the ON/OFF combination of symbols 2 to 5 is different, it can be recognized to be a delimiter of data blocks. Note that the symbols which are continuously turned on are not restricted to symbol 1, and any symbol may be used, and there may be a combination of three or more symbols that are ON in succession. However, for the symbols to be consecutively turned on, when outputting an information pattern other than a delimiter pattern, alternate ON and OFF are to be repeated.

Furthermore, the group of patterns serving as delimiters may include symbols that are continuously OFF. That is, symbols that alternately repeat ON/OFF can be used as a delimiter of data blocks by setting the symbols to the OFF state in succession. In this case, the other elements 111 are to turn on symbols at different positions for each information pattern. In order to maximize the amount of information with a limited number of symbols, it is desirable to be able to detect the time interval by the ON/OFF of one symbol. When the digital stamp delimits a data block, if all of the symbols are turned on in either pattern 1 or pattern 2, the touch panel of the information device 200 can recognize the arrangement situation of the placed symbols. Therefore, the touch panel of the information device 200 can easily detect the output of the changing information pattern after recognizing the delimiter of the data block.

The number of information patterns included in one data block differs depending on the output pattern code, and when the application side of the information device 200 recognizes the number of information patterns to be output, the application can decrypt pattern codes by acquiring the same number of patterns as the number of information pattern output before and after the delimiter. That is, the information device 200 does not have to acquire all of the information patterns from the data block delimiter pattern to the next delimiter pattern. There is a case where the information device 200, for example, acquires a part of the information patterns in the first data block from the delimiter pattern indicating the start to the next delimiter pattern, and further acquires the remaining information patterns in the second data block up to the next delimiter pattern. In such a case, the information device 200 may terminate the decrypting when the lacking information pattern is acquired in the second data block. With such a procedure, the information device 200 can shorten the decrypting time.

As in FIG. 101, an information pattern is output with pattern 3 to pattern 9. In pattern 9, the lowest digit of a binary number obtained by adding the ON/OFF (1 bit) of each symbol from the pattern 3 to the pattern 8 is assigned to the ON/OFF (1 bit) of the symbol of the corresponding pattern 9 and a parity check (error check) code is formed. In order to prevent erroneous detection on the information device 200 side, any kind of error check or error correction may be used. If the output of each of the above patterns is set to 50 ms intervals, including the OFF state of the pattern 0 in the initial state, even if an information pattern of the parity check is added to the data block in 0.5 seconds, the digital stamp can output 4 bits×6 patterns=24 bits (17 million codes). Note that in this case, it is assumed that the information device 200 executes the parity check in 0.5 seconds. When the time (or processing time on the information device 200 side) for adding the information pattern of the parity check on the digital stamp side is one second, a huge amount of pattern codes may be output by 48 bits (about 300 trillion codes). In order to use this pattern code for electronic payments or the like, it is desirable to output a pattern code of 128 bits or more. Since smartphones of recent models can recognize a touch at intervals of 12 ms, if the pattern code is output every 25 ms, 40 patterns can be recognized per second. As a result, the smartphone can output and recognize a total of 40 pattern codes in 1 second, including 2 for the data block delimiter, 32 for the 128-bit pattern, and 6 further for the error checking pattern. Note that the digital stamp may use a plurality of patterns for error checking. Such a pattern code output by symbols 1 to 5 can also be used for outputting a pattern code to a card type device. In that case, each element 111 for switching symbols 1 to 5 on/off may be arranged in any way.

Note that after the digital stamp repeats the output of the pattern code by the pattern 1 to the pattern 9 a plurality of times, when the application executed by the information device 200 or the like finishes the recognition of the pattern code, the digital stamp may be moved and rotated, and the user may operate the application. In the example of FIG. 101, by outputting pattern 11 with the symbols 1, 2, 5 in the ON state in a plurality of times, the end of the pattern code output is recognized, and the digital stamp may be moved and rotated. However, since pattern 11 is also used as a normal information pattern, pattern 10 is output as a delimiter pattern. The delimiter pattern 10 is a pattern in which the symbols 1 to 5 are in the ON state. The combination (reference symbol pattern) of the delimited pattern 10 and the next output pattern 11 is uniquely distinguished from other information patterns. By the output of pattern 10 and pattern 11, the end of the pattern code output is recognized, and the operation of rotating and moving the digital stamp can be executed.

FIG. 102 is a diagram showing another example of a pattern code output. The example of FIG. 102 corresponds to the example of output shown in FIG. 101, and shows the ON/OFF of each symbol in a temporal sequence. For example, when the digital stamp is placed on or is in proximity with the touch panel of the information device 200, for example, similarly to the apparatus 110 of the first embodiment, it is supplied with electric power from the information device 200 or the like, it outputs pattern 1 and pattern 2 which are the reference symbol patterns, and starts outputting the pattern code. In pattern 1, symbols 1 to 5 are in the ON state. In pattern 2, symbol 1 is in the ON state and symbols 2 to 5 are in the OFF state. By having the symbol 1 twice in succession, pattern 1 and pattern 2 are recognized as reference symbol patterns. Note that in pattern 2, symbols other than symbol 1 may be set to be ON, and the example in FIG. 101 indicates that symbols 1, 3, and 4 are in the ON state. Since the orientation of the digital stamp is specified by turning on a symbol other than symbol 1, pattern 2 is also referred to as an orientation pattern.

Symbol 1 repeats ON/OFF at predetermined time intervals. Symbols 2 to 5 are switched on/off for each output pattern. The ON state for symbols 2 to 5 is indicated by the dotted line. For example, in pattern 4, symbols 2 and 4 are in the ON state. The element 111 which is a pattern code output device repeats the output of 28-bit information by the information symbol pattern from pattern 3 to pattern 9. Note that for each information symbol pattern from pattern 3 to pattern 9, the reference symbol pattern (pattern 1 and pattern 2) is output. Note that the last 4 bits of pattern 9 immediately before the reference symbol pattern may be used as a parity check bit.

The pattern code output apparatus 111 outputs pattern 10 in which with the symbols 1 to 5 are in the ON state, and repeats the output of the pattern 11 in which the symbols 1, 2 and 5 are in the ON state, whereby the end of pattern code output is indicated. The reference symbol pattern indicating the end of the pattern code output is pattern 10 or a combination of pattern 10 and the orientation pattern 11. After the output of the pattern code is completed, the output of pattern 11 which is an orientation pattern is repeated.

The specifications of the pattern code of the digital stamp described above and the specifications of the pattern code of the digital card (card type apparatus 110G or the like) described in the eighth embodiment can be used mutually. That is, the digital stamp may adopt a pattern code specification similar to that in the eighth embodiment. Also, in the first to eighth embodiments, pattern codes similar to those in the present embodiment may be adopted. In addition, functions of both a digital stamp and a digital card may be provided in a digital stamp or a digital card by selectively combining the functions.

Other Modification Examples

By experiments conducted by the inventors, when two AA batteries are used as a power supply for the stamp type code generation apparatus 1, the card type apparatus 110, or the like, of the above embodiment, that the change in electrostatic capacitance due to the code generation apparatus 1, the card type apparatus 110 or the like is at a level sufficient for recognition by a touch panel of a mobile phone or the like is elucidated. That is, in the case where two AA dry batteries are used as a power supply, even if a human finger does not come into contact with the contact conductor 114 exemplified in FIG. 57, the touch panel of a mobile phone or the like may sufficiently detect a change in electrostatic capacitance due to the ON and OFF of SW115. Therefore, for example, for the code generation apparatus 1 exemplified in FIG. 1, FIG. 22, and the like of the embodiment, the apparatus 110, the card type apparatus 110H or the like, described in the first embodiment to the ninth embodiment or the like, by adjusting the area of the device surface or of the metal embedded in the plate material made of plastic to about 2 AA dry batteries, it is possible to induce a change in a physical quantity such as electrostatic capacitance, electric field intensity or the like in a touch panel without using the contact conductor 114.

Since tempered glass and protective sheets are often attached to the touch panel, the electrostatic capacitance of one conductor required for detecting a change in a physical quantity due to the ON/OFF of SW115 at a maximum thickness of less than 1 mm is about 1.5 Pf or more. As described above, when an element 111 having a diameter of about 7 to 8 mm is used, if a conductor equivalent to two AAA dry batteries is provided, the case of the code generation apparatus 1, the card type apparatus 110, or the like can be made to be nonconductive On the other hand, when the electrostatic capacitance is lower than this capacitance, it is desirable to make the case of the code generating apparatus 1 or the upper side (front side face) of the plastic plate material of the apparatus 110 a conductor, and to embed a metal layer in the plastic plate material of the apparatus 110 so that ON/OFF can be controlled with SW115 or the like. Needless to say that the above conditions may vary depending on performance on the touch panel side and the electric circuit inducing a change in electrostatic capacitance.

In addition, in the above first to ninth embodiments, a change in the physical quantity is exemplified as a change in electrostatic capacitance or electric field intensity on the touch panel surface. However, in practice of the present invention, a change in a physical quantity is not restricted to a change in electrostatic capacitance or electric field intensity. That is, according to a physical quantity that detects as a change the input operation of information received by the information device 200 or the like, the apparatus 110 or the like may generate a corresponding change.

Sixteenth Embodiment

With reference to FIG. 103 to FIG. 106, applications for when a digital card (devices 110, 110A to 110J of the first to the ninth embodiments) according to the sixteenth embodiment of the present invention is used as a card type device will be described. The card type device according to the sixteenth embodiment is also referred to as a G-Card. The digital card according to the sixteenth embodiment can be used, for example, for various purposes such as personal authentication or security management in distribution. Furthermore, the circuit, the sensor, the conductor arrangement and the control procedure for the stamp-type code generation apparatus described in the zeroth embodiment can be applied to the G-Card.

[Personal Authentication System]

FIGS. 103 to 106 explain an example for using the G-Card for individual authentication. FIG. 103 is a diagram exemplifying an example of a current credit card. For payment with various cards such as current credit cards or the like, an expensive card reader for reading an IC chip or a magnetic stripe is used. Furthermore, an ID of a card capable of inputting and outputting information in a non-contact manner has the possibly of being skimmed during transmission, and particularly with a magnetic card or the like, the ID may be easily copied and forged.

FIG. 104A is a diagram showing an example of use of a card type device (G-Card). FIG. 104B is a diagram showing a modification example of the card type device. Note that the plurality of elements and sensors arranged on the back surface of a G-Card are covered with a non-conductive sheet. In the example of FIG. 104A, the G-Card has a fingerprint authentication panel on its surface. However, the fingerprint authentication panel is not required. Also, in the example of FIG. 104B, the G-Card has a password input touch panel on the front side. In addition, the G-Card has a sign input touch panel on the back side. However, the password input touch panel and the sign input touch panel may be omitted.

The application of the G-Card as a credit card, a prepaid card, a point card, various membership cards can greatly improve convenience and security. The G-Card stores the ID of the card in a nonvolatile memory exemplified by the memory 117 and the like described in the eighth embodiment and the like. In addition, the G-Card outputs a pattern code to the touch panel of the information device 200 via the pattern code output device 131 through interaction between the G-Card which changes a physical quantity and the touch panel. In addition, the G-Card recognizes (digitizes) changes in the amount of light received from the display or the like of the information device 200, and levels of intensity for each wavelength, light emission time, and intermittent time through the information input device 132, and thereby inputs information.

When implementing identity verification, approval and agreement in various situations, a G-card authentication application is activated in the information device 200 such as a smartphone, a tablet, a dedicated authentication device, or the like. Then, with the information device 200 such as a smartphone, a tablet, a dedicated certification device, or the like, the touch panel is touched with a G-Card owned by the principal and by receiving a pattern code that identifies the G-Card, identity verification is confirmed. In that case, the security of the G-Card can be enhanced by password input, fingerprint authentication, or the like from the touch panel exemplified in FIG. 104B and FIG. 104A.

As exemplified in FIG. 104B, the G-Card may authenticate a signature written by the user with a finger or a stylus pen on the touch panel. The G-Card may acquire characteristic points of the signature and collate it with characteristic points recorded on the card to authenticate. The G-Card may transmit the trajectory of the signature to the information device 200 as a pattern code, and the information device 200 may execute authentication on the cloud by sending the received trajectory of signature to the cloud or the like.

In order to prevent a counterfeit G-card or the like that outputs the same pattern code as the G-Card by skimming the pattern code from the G-Card acquired by the touch panel, the G-Card is to acquire an optical code emitted from the touch panel and based on the acquired optical code and the first ID stored in the memory 117 or the like of the G-Card, a second ID calculated by a predetermined algorithm is to be output as a pattern code. As a result, the information device 200 can authenticate the G-Card. Note that the G-Card may first output the first ID from the G-Card to the information device 200 and the touch panel (display) of the information device 200 may emit the optical code corresponding to the first ID. Furthermore, the optical code emitted from the touch panel of the information device 200 is to be a one-time password generated by the cloud, and by having the second password calculated based on the first ID of the G-Card be used as a one-time ID, higher security can be realized.

First, the user places the G-Card on the touch panel of the information device 200. Then, the G-Card converts ID1 into a pattern code and outputs it to the touch panel of the information device 200 via the pattern code output device 131. The information device 200 decrypts the received pattern code and transmits it to the cloud. The cloud receives ID1, a time based on predetermined time intervals is parameterized, and ID2 calculated by using the time and ID1 as parameters is transmitted to the information device 200. The information device 200 converts ID2 into an optical code and transmits it to the G-Card by light emission of a display or the like of the information device 200. The G-Card receives the optical code via the information input device 132, generates ID 3 by a predetermined algorithm, and outputs it to the touch panel via the pattern code output device 131. The information device 200 transmits the acquired ID 3 to the cloud in the same procedure as described above and authenticates whether the ID 1 is correct. However, ID 1 may be omitted. When ID 1 is not used, the cloud transmits ID 2 calculated with the time as a parameter to the information device 200 and executes similar processing.

Currently, when making a payment on the internet, payment is made possible by entering a name, a card number, an expiration date, and a security code provided on a credit card or a prepaid card. Therefore, as shown in FIG. 105, cases where information provided on a credit card is copied when a credit card is handed at a store or the like for payment and the information is abused for payment on the net are increasing. Since the user himself/herself of a G-Card can make a net payment by holding the G-Card over his/her information device 200 such as a smartphone, unless the G-Card is stolen, the input of a credit card number and payment by impersonation by others cannot be done.

Furthermore, by linking the ID of the information device 200 such as a smartphone or the like with the G-Card, the G-Card can be prevented from being used even if it is stolen unless the person's smartphone is there. Even if both the smartphone and the G-Card are stolen, safe identity verification is possible by performing fingerprint authentication or authentication by password input as shown in FIG. 106 when using the G-Card. Note that the processing exemplified in FIG. 106 can be executed, for example, by the procedures exemplified in the flowcharts of FIGS. 62, 63, 67B, 67C, 68B, 68C, 72E, 72F, and the like.

[Security System]

Counterfeit goods and illegally diverted goods manufactured in developing countries or the like are widespread. In particular, the elimination of infringed luxury items such as infringed brand-name products and infringed goods concerning people's life such as foods, chemicals, or the like is a global issue. FIGS. 107 to 110 explain an example of the use of a G-Card for a security system such as product warranty.

FIG. 107 is a diagram showing an example of an application of the G-Card used for product warranty. The G-Card can be used as a warranty card for product warranty, by including it in a package of a product. Also, an ultra-thin G-Card module may be incorporated into the package itself of the product or may be affixed to the product in the form of a seal when delivered. As a result, highly accurate authentication and traceability can be realized.

As described in the first to the eighth embodiments and the like, the back side of the G-Card and the G-Card module are provided with a plurality of elements and solar panels for receiving and supplying electric power. Note that the elements and the like are built in the G-Card and are covered with a non-conductive sheet.

The user activates a G-Card security application for guaranteeing a product with the information device 200 such as a smartphone or the like, or opens the security page of a web site of the product and holds the G-Card or the G-Card module over it. By this operation, the touch panel of the information device 200 such as a smartphone or the like acquires a pattern code via the pattern code output device 131 of the G-Card or G-Card module. Then, the information device 200 such as a smartphone or the like acquires various kinds of information such as authenticity determination of the product, manufacturing date, validity period, product contents, or the like from the G-Card or the G-Card module via the touch panel, and can display it for viewing by the user.

FIG. 108 is a diagram showing a processing example of authenticity determination by the G-Card. When the G-Card is held over the smartphone, a code number is displayed on the smartphone, and the user may easily perform authenticity determination of a product or the like by checking whether the unique security code provided on the G-Card coincides with the displayed code number.

FIG. 109 is a diagram showing an example of authenticity determination by a G-Card and security code input. Before the user holds (or after the user holds) the G-Card over the smartphone, a unique security code (4541 5673 in the example of FIG. 109) provided on the G-Card is input to the information device 200 such as a smartphone or the like. On the other hand, the information device 200 such as a smartphone emits a corresponding optical code, transmits it to the G-Card and has it be collated with the information stored in the nonvolatile memory of the G-Card, or the pattern code output from the G-Card and the security code entered by the user are collated, thereby making it possible to determine authenticity, based on whether or not the association is correct. Therefore, there may be cases where authenticity determination is executed by the information device and by the G-Card.

First, a case where a determination is made on the information device 200 side will be described. The information device 200 inputs an optical code to the G-Card via the information input device 132 of the G-Card by light emission from the display or the like, and requests transmission of a security code. Then, the G-Card reads the security code from the nonvolatile memory such as the memory 117 or the like and outputs the security code to the touch panel of the information device 200 in the form of a pattern code via the pattern code output device 131. The information device 200 decrypts the pattern code acquired via the touch panel and by collating it with the input security code, a judgement on authenticity determination is executed. The information device 200 may display the result of authentication determination on the display.

Next, a case where a determination is made on the G-Card side will be described. The information device 200 converts an input security code into an optical code and inputs it to the G-Card via the information input device 132 of the G-Card by light emission from a display or the like. The G-Card decrypts the optical code received from the information input device 132 and acquires a security code. Then, the G-Card collates the decrypted security code with the security code stored in the nonvolatile memory such as the memory 117 or the like. As a result, a judgment on authenticity determination is executed. The G-Card outputs the result of the authentication determination to the touch panel of the information device 200 via the pattern code output device 131. The information device 200 may display the received result of authentication determination on the display.

The above unique security code may be printed on one or more of the product, the package, the warranty card and the like. The security code may be a current date, the current time, or the like. The G-Card may output the pattern code with a current date or the current time as a one-time password and have authentication be executed. In the case where a current date or the current time is set as a one-time password, the security code need not be printed. When a security code is not used, the authenticity of the G-Card itself is determined. For example, first, the information device 200 encrypts predetermined information with a one-time password, converts it into an optical code, and inputs it to the G-Card via the information input device 132. The G-Card decrypts the received optical code and further decrypts the decrypted result with the one-time password. The G-Card transmits the decrypted result to the touch panel of the information device 200 in the form of a pattern code via the pattern code output device 131. The information device 200 decrypts the pattern code received from the G-Card and determines that the G-Card is genuine when it coincides with the predetermined information transmitted at the beginning.

Further, in order to enhance security, the G-Card security application acquires an optical code emitted from the touch panel of the information device 200 such as a smartphone or the like, and based on the acquired optical code, outputs a pattern code calculated by a predetermined algorithm from the pattern code output device 131. The information device 200 such as a smartphone or the like can execute authentication determination and traceability by decrypting the pattern code output from the G-Card using information of the optical code emitted to the G-Card.

FIG. 110 is a diagram showing an example of the application of the G-Card module. Although it is imaginable to present a card with a photograph or the like at the time of identity verification upon receiving an item or the like, there are many cases where such card or the like are not possessed. The G-Card module can realize identity verification even without a card with a photograph or the like. In order to verify the principal when handing an item or the like, a G-Card module affixed to an item or the like or a receipt delivered to the principal is held over the information device 200 such as the smartphone or the like on the delivery side, and registered personal information of the principal is displayed. With the personal information displayed, identity verification is possible. The personal information of the principal registered in the G-Card module need not be a photograph, and may include information that only the principal knows, such as date of birth, age, password, and the like. By confirming or inputting information only known by the principal, identity verification is possible.

In this processing, information or the like which only the principal knows is stored in a nonvolatile memory such as the memory 117 or the like of a G-Card module affixed to a receipt delivered to the principal. For example, when the deliverer holds the G-Card module over the information device 200 such as a smart phone or the like, by procedures exemplified in FIGS. 62, 63, 67B, 67C, 68B, 68C, 72E, 72F, or the like, information of the memory 117 is output to the touch panel of the information device 200 via the pattern code output device 131. By having information device 200 display the information acquired from the G-Card module on a display, the deliverer can recognize information or the like that only the principal knows and can perform identity verification.

[Ticket Purchase/Coupon Acquisition and Authentication]

FIGS. 111 to 113 explain an example of the application of the G-Card for ticket purchase/coupon acquisition and ticket/coupon authentication. An application for using a G-Card in the information device 200 such as a smartphone, a tablet, or the like is also referred to as a G-Card application. When purchasing a ticket or acquiring a coupon with the G-Card application, the user holds the G-Card over the touch panel of the information device 200 such as a smartphone, a tablet, or the like. By this operation, the corresponding pattern code (ticket/coupon code) is output as an optical code from a touch panel of a smartphone or the like, and input to the G-Card via the information input device 132. The G-Card decrypts the optical code and stores it in the memory 117. Further, as shown in FIG. 111, a G-Card having a credit card function can also execute payment. Specifically, when the surface on which elements of the G-Card are arranged is brought into contact with or brought in proximity with the touch panel, the G-Card outputs information used for payment to a smartphone or the like. Note that the G-Card can have the same configuration as that of FIG. 104.

Note that in order to accurately match the positions of the photodiodes of the information input device 132 (photosensor 130) of the G-Card, for example, the photodiodes WPD1 to WPD6 exemplified in FIG. 72H, with the positions of the light emitting regions LE1 to LE6 of the display, an application of the information device 200 may display a mark, for example, a frame-like graphics object for card alignment on the display. In the example of FIG. 111, the information device 200 displays guidance such as "(upper side of the card)" "(lower side of the card)" "Please adjust of the left side of the back side of the card here" or the like together with a dotted frame shaped graphics object. By having the information device 200 displaying such guidance, the user can bring the G-Card into contact with or into proximity with the touch panel with accuracy. Therefore, even if the information device 200 does not recognize the arrangement position of the pattern code output device 131 (element 111) of the G-Card, each of the light emitting regions LE1 to LE6 may make light incident to each of the corresponding photodiodes WPD1 to WPD6. In this case, since it is unnecessary for the information device 200 to recognize the position of the G-Card, a pattern code output device 131, for example, with only one or two elements 111 may be suffice. The information device 200 may emit light from each of the light emitting regions LE1 to LE6, triggered by the recognition of ON symbols of the elements 111 of the pattern code output device. In addition, the G-Card can receive an optical code with the corresponding photodiodes WPD1 to WPD6, and when there is no error, may output a confirmatory response as a pattern code with the pattern code output device (element 111).

When making an entry with a purchased ticket or using a coupon, the information device 200 operates as a tablet, a terminal device for a dedicated reading device, or the like for ticket/coupon authentication. Here, for example, an application for confirming a ticket/coupon purchased with the G-Card is to be activated by the information device 200. As shown in FIG. 112, when the G-Card is held, an output request for a pattern code corresponding to a ticket or a coupon is emitted from the display of the touch panel of the terminal device as an optical code, and is input to the G-Card via the information input device 132. The G-Card receiving the optical code reads a ticket or a coupon corresponding to the optical code from the memory 117. Then, the G-Card converts the read ticket or coupon into a pattern code and outputs it to the touch panel of the information device 200 via the pattern code output device 131.

A terminal device or the like reads and decrypts the pattern code output from the G-Card and acquires information on the ticket or the coupon. If the pattern code is the same as the pattern code recorded on the cloud or in the terminal device, the terminal device or the like approves entry into a venue or exchange/use of a coupon. The corresponding pattern code recorded on the G-Card may be erased so that a once used ticket or coupon is not used again. Alternatively, as shown As in FIG. 113C, use history of tickets and coupons may be recorded on the G-Card and may be made to be displayed by holding the G-Card over an information device 200 such as the user's smartphone or the like.

[Content/Coupon/Point Customer Attraction Service]

FIGS. 114 to 116 explain an example of the application of the G-Card for a content viewing service and a coupon/point accumulation customer attraction service. The user acquires a G-Card for being provided with contents, coupons, and points from the service provider in a predetermined manner. At the point when the user acquires the G-Card, an ID for being provided with the contents, the coupons or the points is not recorded in the memory 117 of the G-Card. Note that as a predetermined method, the user may receive a direct mail (DM), a catalog, a magazine, a newspaper, a product enclosed with a G-Card, or may acquire a G-Card distributed in a store, a facility, or on the street.

FIG. 114 is a diagram showing an example of a granting service such as points or the like by the G-Card. In order to attract customers, the service provider installs an optical code light emitting device 170 for G-cards at the service counter at a predetermined attraction spot. The user goes to the service counter with the G-Card and holds the G-Card over the optical code light emitting device 170. The G-Card acquires an ID for contents, coupons, point service output from the optical code light emitting device 170 via the information input device 132, and records it in a nonvolatile memory such as the memory 117. Depending on the information output from the optical code light emitting device 170, the service counters at various places can provide different services. Note that the G-Card may be held over the optical code light emitting device 170 by the person in charge at the service counter receiving the G-Card from the user. Further, the optical code light emitting device 170 may be an information device 200 such as a smartphone or the like of a person in charge at the service counter.

When the user acquires a G-Card, the G-Card records an ID for contents and coupon/point services in the memory 117, but to prevent use it may be locked with an electronic key. In this case, the G-Card may be made to release the electronic key so that the ID for predetermined contents or coupon/point services can be used when the G-Card is held over an optical code light emitting device 170. When a plurality of electronic keys are set in the G-Card, the user can use a service corresponding to the electronic key. In this case, the user can acquire different contents and coupons/points at various service counters like participating in a stamp rally.

FIG. 115 is a diagram showing an example of the display of the status of a point service by a G-Card. By holding the G-Card over an information device 200 such as a smartphone or the like, for example, the user can confirm the expiration date of points and the number of points earned. Furthermore, FIG. 116 is a diagram showing an example of the display of service contents of coupons or the like by the G-Card. By holding the G-Card over the information device 200 such as a smartphone or the like, for example, the user can confirm the service contents of a coupon acquired with a purchase of a concert ticket or the like.

The user can use the coupons/points recorded on the G-Card at various stores. Furthermore, by activating a G-Card application with an information device 200 such as a smartphone or the like of the user and holding the G-Card over the device, the user may use coupons/points even for services on the net. Also, as shown in FIGS. 115 and 116, the user can view the status of currently held coupons, service contents of points, or expiration dates recorded in the card. Furthermore, the user may move coupons/points to an application for using the G-Stamp (a stamp type code generation apparatus 1 shown in FIG. 4 of the zeroth embodiment) on an information device 200 such as a smartphone or the like and use them. For enjoying an acquired content, the user activates a G-Card application with the information device 200 such as a smartphone, a tablet, or the like. Also, if the user holds the G-Card over an information device 200 such as a smartphone, a tablet, or the like, various contents such as games, photographs, and videos can be transferred from the G-Card to the information device 200. Furthermore, the user may manipulate contents such as games or the like by placing the G-Card on a smartphone or tablet and moving/rotating it. When the user activates the G-Card application and uses the G-Card, the service provider may provide further services using various communication means that can be received by an information device 200 such as the user's smartphone. Note that the G-Card is not restricted to cards, and may take any shape like a coin or a game piece. In addition, the G-Card may be used not only for attracting customers to the service counter but may be made to be usable without having to visit the service counter.

[Stamp/Point Card Light Emitting System]

FIGS. 117 to 120 are examples of the use of a G-Card as a stamp and a point card. Here, an example of stamp imprinting and addition/erasing of points by light emission to the G-Card of the display of the information device 200 will be described.

Conventionally, stamps are imprinted on paper stamp cards, and points are recorded and stored in plastic point cards when making payments at stores. However, the number of cards increases and it becomes difficult to manage, for the user. Also, with plastic cards, the amount of points stored and validity is not apparent, and thus a user cannot acquire these information unless performing cumbersome net registration and search.

FIG. 117 is a diagram showing an example of the use of a G-Card as a single purpose point card of a specific store. Furthermore, FIG. 118 is a diagram showing an example of the use of a G-Card as a common point card for a plurality of stores.

In the example of FIG. 117, the G-Card includes an electronic notebook 171. The electronic notebook 171 may display a current stamp or a point status for visualization. For the electronic notebook 171, a magnetic material, an organic EL, or the like may be used, and letters and pictures may be drawn by control inside the card, or the use of a dedicated machine control for writing in from the exterior may be controlled.

FIG. 119 is a diagram showing an example of the addition and erasing of stamps and points recorded on a G-Card. The user shows the G-Card at the store. The user holds the G-Card over an information device 200 such as a smartphone, a tablet or the like provided in the store for business use. That is, with this service, a store keeper does not have to use a special machine. By this operation, the smartphone or tablet emits an optical code to the G-Card by coupling with a POS or by touch input, and stamp imprinting on the G-Card and addition/erasing of points to the memory 117 can easily be requested. Also, when the information device 200 such as a smartphone, a tablet, or the like emits an optical code to the G-Card for requesting the transmission of information stored in the memory 117, the G-Card converts the information of the nonvolatile memory such as the memory 117 or the like into a pattern code and then it is output. According to such a procedure, the user may recognize the ID of the card, the current stamp and point status on the display of an information device 200 such as a smartphone, a tablet (distributor G-card), or the like and erasing points is also possible.

The user may display a G-Card recognition page by downloading a G-Card application with an information device 200 such as a smartphone or the like or by accessing a G-Card website or a predetermined website. When the user holds the G-Card over the information device 200 that is displaying the recognition page, the information device 200 detects a change in a physical quantity by the pattern code output device 131 (element 111) due to the approach of the G-Card. Then, the information device 200 that is displaying the recognition page emits an optical code from the display, and inputs an information output request to the G-Card via the information input device 132. Then, the G-Card outputs information such as a recorded store ID, a number of points acquired at the store, expiration dates, and the like as a pattern code to the touch panel of the information device 200 via the pattern code output device 131. By displaying information based on the output pattern code on an information device 200 such as a smartphone or the like, the user can confirm points for each store with an information device 200 such as a smartphone or the like at any time. Here, if the G-Card is placed on a smartphone in a predetermined orientation, the information recorded on the G-Card may be moved to the smartphone. Further, as shown As in FIG. 120, if the G-Card is placed in a predetermined orientation, for example, in an orientation different from the orientation shown in FIG. 119, the information device 200 such as a smartphone or the like may just display information recorded on the G-Card. When using stamps or points recorded on a smartphone, stamp imprinting and addition/erasing of points may be carried out by the aforementioned G-Stamp or store G-Card. Note that also in the processing of FIG. 120, an information device 200 such as a smartphone or the like may guide the user with the same procedure as in FIG. 111. That is, the application of the information device 200 may display a mark, for example, a frame-shaped graphics object on the display for card alignment, and display a guidance.

When using points, the user touches an information device 200 such as a smartphone, a tablet, or the like and inputs the number of points used at the register, and by holding a G-Card over the information device 200 such as a smartphone, a tablet, or the like points may be erases. The user holds the card (G-card) over an information device 200 which is displaying a G-Card application or a G-Card recognition page of a predetermined site. Then, the information device 200 such as a smartphone or the like reads the store ID stored in the G-Card and information transmitted from the store linked to the store ID can be received. If the information device 200 such as a smartphone or the like permits the reception of the information transmitted from the store, various kinds of advertisement information such as store campaigns (triple points granted on the weekend or ○○ will be gifted) are received by push mail or the like. By having the user view various kinds of advertisement information, use of the store is promoted.

As another method, an information device 200 such as a smartphone or the like may request to transmit information to a server or the like of the store linked with the read store ID. Note that the G-Card may also be used as a common stamp card or point card. The G-Card can record the ID of various stores and corresponding information, and as a terminal device of each store, the information device 200 emits an optical code corresponding to the ID of the store to the common card (G-Card). In addition, the information device 200 of each store does not acquire information of other stores from the card (G-card).

[Toy/Game]

With reference to FIGS. 121 and 122, an example of a game using a card type apparatus will be described. For a game card or trading card using a G-Card, the user places the G-Card on an information device 200 having a touch panel such as a tablet or the like. Since the G-Card is specified by the touch panel, the user can enjoy the game while moving/rotating the G-Card. Furthermore, since the obtained score, power, items, or the like can be recorded on the G-Card, with the G-Card the user may play competition games or enjoy games in the same manner as at a game arcade. Note that an application installed in the G-Card may record game information in the memory 117 (see the first embodiment) or the like of the G-Card.

In addition, if a game machine capable of communicating with a G-Card is provided at a game arcade, a shopping mall or the like, the G-Card may be a tool sold to users at a game arcade, a shopping mall, or the like. The user purchases a G-Card at a game arcade or a shopping mall where game machines that may be enjoyed by a G-Card are provided, and plays a game. Then, after the user returns home, the user may enjoy continuation of the game even with a tablet or the like owned at home with the G-Card. By holding the ID of the G-Card or game information over a tablet or the like of a third party, the user may provide a part or all of it.

As exemplified in FIG. 121, on the surface of a G-Card, operating areas for a touch panel, various switches, or the like are provided. The user may operate a game by touching the operating area of the G-Card with a finger. An information device 200 such as a smartphone or the like, or a game machine having a touch panel may accurately recognize the placement position of a G-Card. Therefore, as exemplified in FIG. 122, the information device 200 and the game machine can also recognize the arrangement of the operating area provided on the G-Card. If the operating area is a nonconductor (insulator) such as glass or the like, when the user operates the operating area of the G-Card, the touch panel of the information device 200 or the game machine can directly recognize a touch by a finger through the G-Card. That is, in addition to operating the G-Card, the user can operate the information device 200 or the game machine through the G-Card, even when a G-Card lies in between the finger and the touch panel. Icons indicating operations may be formed on the nonconductive surface. In that case, the number of fingers to touch simultaneously, including output from the G-Card element 111, must not exceed the multi-touch limit for simultaneous recognition. When touching the operating area, the G-Card may turn off the output of a part of or all of the elements 111.

FIG. 123 exemplifies a game device using a G-Card equipped with a photodiode with an irradiation device (for example, the optical sensor of the fourteenth embodiment and the eighteenth embodiment). By placing the G-Card equipped with a photodiode with an irradiation device on an area on a board game or a card where a color code is formed, a color code may be acquired, and a game may be allowed to proceed. Here, the color code refers to digital information that can be represented by hue, brightness, gradation or the like. For G-Cards equipped with photodiodes in two places, the number of color codes can be increased by the combination of two colors left and right. For example, 3 bits for the ON/OFF of each color of R, G and B, 6 bits for the combination of two spots, and by dividing each color into 4 levels, 12 bits. Furthermore, by placing the G-Card in reverse, a 24-bit color code can be obtained. Note that if a dot reading device is provided, position information can also be acquired from a dot code.

FIG. 124 is an example of a device having another shape. The G-Card can take various shapes like a game piece. A G-Card composed of various shapes can be referred to as a G-Piece. A G-Piece may be provided with LEDs capable of emitting one or a plurality of colors, or an audio output device. When a G-Piece is placed on a game screen such as a tablet or the like, an optical code is received and a game piece may emit color or a sound may be output. A power supply such as a button battery may be used. By providing a G-Piece with a pattern conductor, the status of a game piece may be output or game information may be recorded. Either the element 111 or the optical sensor 130 (or the information input device 132) may be omitted from a G-Piece.

simultaneously recognized by a touch panel or the like of a game machine, when a G-Piece uses a number of elements 111 more than the limit of the number of touches that can be detected, for example, by outputting ON from the element 111 to the touch panel, only after an emission of an optical code, any number of game pieces can be placed. As shown in the figure, the G-Piece may have, for example, three elements 111. A device such as a touch panel or the like on which the G-Piece is placed can recognize the orientation of the G-Piece by making the dimensions of each different for the three elements 111 so that their arrangement is not point symmetrical.

[Signature]

An electronic notebook using an input device with a touch panel may be provided on the surface of a G-Card. The electronic notebook is, for example, the signature input touch panel in FIG. 104B, the electronic notebook 171 in FIG. 117, or the like. The user may sign an electronic notebook provided on the surface of a card using an input device such as a touch panel or the like. For example, by placing a G-Card on a touch panel of an information device 200, the user may sign the electronic notebook. The electronic notebook may be in any form as long as data can be acquired by displaying a handwriting such as an organic EL, a magnetic material, or the like provided in a touch panel. A dot pattern may be formed on the card. The user may input a signature with a dedicated dot reading pen.

The G-Card may extract feature points from the signature trajectory and collate them with feature points of the signature recorded in the memory 117 to authenticate. The signature trajectory may be transmitted to an information device 200 by a pattern code and the information device 200 may execute authentication on the cloud by sending the received signature trajectory to the cloud or the like.

[Game Card]

In the game card, without electrically turning on/off the conductor, an element 111 (conductor) may be formed (including printing) with a unique pattern, and an area for operation by a finger may be provided. Note that in the area for operation by a finger is to be in a configuration where a conductor can provide interaction to a touch panel with electrostatic capacitance or with an electric field large enough to be detected by the touch panel. Hereinafter, among the G-cards, a game card which does not electrically turn on/off a conductor is simply referred to as a card.

FIG. 125 and FIG. 126 exemplify a configuration of a game card. FIG. 125 exemplifies the configuration of the back side (the side that comes into contact with the touch panel) of the card. FIG. 126 exemplifies the configuration of the front side of the card. This card has all components that require a power supply eliminated in the stamp type code generation apparatus 1 of the zeroth embodiment or the apparatus 110 of the first to the eighth embodiments or the like. On the other hand, a conductor corresponding to the element 111 and a conductor plate inside the card connecting the conductor are provided on this card.

As with the current smartphone or the like, it is assumed that the number of places simultaneously recognizable by multi-touch is five, on the touch panel of the information device 200. In such a case, by placing a card on which four elements 111 (conductors) are arranged, on the touch panel, for example, it is possible to execute a game program using the card while enabling operation with fingers.

For example, when a user places a card on which four elements 111 (conductors) are placed on a touch panel, if the arrangement pattern of the elements 111 (conductors) is unsymmetrical and unique for each card, no matter how the card is rotated, the touch panel may recognize a unique pattern code, and specify the type of the card and the arrangement on the touch panel. In this case, it is possible for the touch panel to recognize one last touch. Therefore, the remaining touch recognition is made to be allowed when the user presses the touch panel with a finger through the card (that is from the upper side of the card).

For example, on the card surface, in addition to a card title and a character name such as "OO competition game, ΔΔ character," a touch area TC1 with icons labelled "walk," "run," "stop," "sit," "sleep," "wake up," "turn," "jump," "fight," or the like is provided.

The information device 200 recognizes the type and placement of the card by the arrangement pattern of the elements 111 (conductors) on the back side. Therefore, each time the touch area TC1 is pressed, the information device 200 recognizes the position of the touch area TC1 in the depressed card and specifies the label. And, for example, when "walk" is pressed, the information device 200 that executes the game program executes the movement of walking on the display for the "ΔΔ character" corresponding to the type of the card.

When three conductors are arranged, although two fingers may touch simultaneously, the number of pattern codes is reduced. Note that with a tablet, up to 10 multi-touch recognitions are possible, more than five conductors can be arranged to set a large amount of pattern codes, and furthermore, simultaneous touches with a plurality of fingers is possible. FIG. 127 shows an example of the use of a card on a tablet terminal. In this specification, the number of touches that the touch panel can recognize simultaneously is assumed to be 5 places, and 10 places, but these limitations are mere examples. Therefore, the implementation of the present invention is not limited by the number of touches itself that the touch panel can simultaneously recognize.

FIG. 128A is a sectional view (hereinafter referred to as cross section A) of a card cut along a plane passing through a line connecting A1 and A2 indicated with arrows in FIG. 125 and perpendicular to the paper surface. FIG. 128B is a sectional view (hereinafter referred to as cross section B) of a card cut along a plane passing through the line connecting B1 and B2 indicated with arrows in FIG. 125 and perpendicular to the paper surface. Also, FIG. 129 is a plan view (referred to as a bottom view) of the card of FIG. 125 as viewed from below (the back side where the card comes into contact with the touch panel). As in the figure, generally the card has a three-layer structure with a protection/print layer CA1 on the front side, an internal conductor plate CA2, and an insulator CA3 (or an elastic insulator CA4) on the back side. In addition, the circumference of the card is surrounded with an insulating frame. Furthermore, as shown in FIG. 128A, in the vicinity of cross section A, an element 111 (conductor) is embedded in the insulator CA3 on the back side and connected to the internal conductor plate CA2. By placing such a card on the touch panel of an information device 200 or the like, the touch panel recognizes a physical quantity (electrostatic capacitance, electric field intensity due to electrostatic induction) and the like of the element 111 on the back side of the card, and thus detects the placement of the card. However, it is difficult for the touch panel of the information device 200 or the like to detect a physical quantity of only the element 111 (conductor). Therefore, in this embodiment, a conductive plate CA2 is disposed on the card surface or inside the card, and when the user touches the card, a physical quantity (electrostatic capacitance, electric field intensity, or the like) exerted on the touch panel from the element 111 is made to increase. Note that the part of the insulator CA3 in FIG. 128A, is a part where the presence of or a change in a physical quantity (electrostatic capacitance, electric field intensity, or the like) is not detected by the touch panel. Therefore, when the user's finger touches the card, the touch panel detects the arrangement of the elements 111 (conductors) from the presence of or a change in a physical quantity (electrostatic capacitance, electric field intensity, or the like). If the arrangement of the elements 111 (conductors) is unsymmetrical, the information device 200 acquires coordinates of the arrangement positions of the elements 111 (conductors) detected by the touch panel. Therefore, if the arrangement of the elements 111 (conductors) of each card is unique for a plurality of cards, the information device 200 may recognize the type of the card.

In this configuration, when the protection/print layer CA1 can be formed with a conductive material such as conductive ink or the like, by the touching of the card surface, the user's finger is connected to the element 111 (conductor), via the protection/print layer CA1 and the conductive plate CA2. On the other hand, in the case where the protection/printed layer CA1 is not of a conductive material, if the thickness is sufficiently thin and is about 0.5 to 0.6 mm, when the user brings a finger into contact with the protecting/print layer CA1, electrostatic induction is induced in the conductive plate CA2, and the element 111 (conductor) through the conductive plate CA2, may make the touch panel recognize the presence of or a change in a physical quantity (electrostatic capacitance, electric field intensity due to electrostatic induction) and the like. In addition, if the specification of the card allows the user to touch only the touch area TC1 (for example, an icon labelled "walk," "run," or the like), the touch area TC1 may be provided with a conductive part (for example, a thin film of conductive ink), and all of the elements 111 (conductors) and the conductive parts of these touch areas TC1 may be connected by conductive lines.

As exemplified in FIG. 128B, a layer of an elastic insulator CA4 and a layer of an insulator CA6 are provided under the conductive plate CA2 directly below the touch area TC1 (for example, labelled "walk"). And a spacer CA5 is embedded in the layer of the elastic insulator CA4. The elastic insulator CA4 may be an air gap, that is, a layer of air. Furthermore, the elastic insulator CA4 may be of a honeycomb structure or a layer formed with sponge-like material. The spacer CA5 need not be of column shape, and may take any shape as long as the structure supports the conductive plate CA2 with respect to the touch panel surface. The spacer CA5 may be, for example, a quadratic surface obtained by rotating a quadratic curve such as a hemispherical shape, a parabola, or the like. The spacer CA5 may be of an elastic material. If the spacer CA5 is elastic, when the user presses the touch area TC1 (for example, labelled "walk"), the conductive plate CA2 at the depressed position is more likely to come into contact with the touch panel, and operability of the user is improved.

When the user touches (presses) the touch area TC1 with a finger, or with a conductor held by fingers or in a hand, the conductive plate CA2 and the insulator CA6 on the back side make contact. Note that the insulator CA6 may be omitted. In the absence of the insulator CA6, the user touches (presses) the touch area TC1 with a finger, or with a conductor held by fingers or in a hand, the conductive plate CA2 comes into contact with or comes into proximity with the touch panel surface. Therefore, since the conductive plate CA2 comes into contact with the insulator CA6 or the touch panel surface by pressing a finger on the touch area TC1, the touch panel may recognize the presence of or a change in a physical quantity (electrostatic capacitance, electric field intensity due to electrostatic induction).

As exemplified in FIG. 129, when viewing the card from the lower side (the back side), the card is surrounded by a frame CA0, and an area where four elements 111 are provided and an area where many spacers CA5 are provided exist. Insulator CA3 is filled around the elements 111. In addition, elastic insulator CA4 is filled around spacer sCA5. However, the elastic insulator CA4 may be an air layer. When the elastic insulator CA4 forms the gap, for example, the insulating rate is extremely high. For example, in the presence of a gap of about 0.2 mm to 0.3 mm, the touch panel does not detect a touch. On the other hand, when the user presses the elastic insulator CA4 from the upper side of the card, if the conductive plate CA2 at the depressed position approaches the touch panel to a distance of less than 0.2 mm, the touch panel detects a touch (finger pressing). Therefore, in accordance with the configurations of FIGS. 128A, 128B, 129, the information device 200 such as a game machine or the like may execute processing so that the touch panel identifies the card and the "ΔΔ character" corresponding to the type of the card performs a walking motion. Note that in FIG. 129, the insulator CA6 is omitted. As already mentioned, the insulator CA6 is not necessary.

FIG. 130 shows a modification example of cross section B which is a sectional view of a card cut along a plane passing through the line connecting B1 and B2 indicated with arrows in FIG. 125 and perpendicular to the paper. As exemplified in FIG. 130, in the case where the elastic insulator CA4 is embedded in the cross section B, that is, the area directly below the touch area TC1 (for example, labelled "walk"), the spacer CA5 may be omitted. In a configuration without the spacer CA5, the elastic insulator TC4 is of an elastic material such as, for example, a sponge, an elastic honeycomb structured material, or the like. Note that as exemplified in FIG. 128, the same material as that of the elastic insulator CA4 may be used in the place of the insulator CA3 around the element 111 (conductor) and have it be formed as one. With such a configuration, when the user presses the touch area TC1 (for example, labelled "walk"), a portion of the depressed conductor plate CA2 sinks somewhat. Then, the distance between the depressed portion and the touch panel becomes closer than other parts, and thus the touch panel may detect a change in a physical quantity (electrostatic capacitance, electric field intensity due to electrostatic induction) or the like due to depression of the touch area TC1. As described above, in the configurations of FIGS. 128A and 130, on the back side (the side opposing the touch panel), a layer that comes into contact with or comes into proximity with the touch panel is formed with the insulator CA3 and the insulator CA4.

FIG. 131 and FIG. 132 are examples of other cards for games. FIG. 131 shows the configuration of the back side (the surface that comes into contact with the touch panel) of another card. As shown in FIG. 132, this card has a touch area TC2 and a touch area TC3. In the touch area TC2, for example, the title of "OO language learning card" and pictures are provided, and on the back side, five elements 111 (conductors) are included as shown in FIG. 131. Therefore, the touch area TC2 is referred to as a pattern code output touch area. On the other hand, labels such as "English," "Japanese," "Q1," "Q2," "Q3," "YES," "NO," or the like are printed as icons in the touch area TC3. In this sense, the touch area TC3 is referred to as an icon touch area. Furthermore, with this card, there is no mutual electrical connection between the touch area TC2 and the touch area TC3. In addition, although a conductive plate CA2 exists under the touch area TC2, a conductive plate CA2 does not exist under the touch area TC3.

For example, when the user places the card on the touch panel of the information device 200 and touches the touch area TC2, the electrostatic capacitance of the user's body increases via the conductor plate CA2, and thus the information device 200 may detect the element 111 (conductor). Therefore, the information device 200 specifies the type of the card and the arrangement position of the elements 111 (conductors) by reading the pattern code corresponding to the arrangement of the elements 111 (conductors). As a result, the information device 200 associates the touch area TC2 with coordinates of its position on the touch panel of the information device 200. That is, the information device 200 specifies the position of the icon ("English" "Q1") printed on the card on the touch panel.

Thereafter, the user touches the touch area TC3 and gives an operation instruction. Then, since the finger separates away from the touch area TC2, interaction with the touch panel of a physical quantity (electrostatic quantity, electric field, or the like) by the element 111 (conductor) becomes insufficient, the information device 200 no longer recognizes the element 111 (conductor). Therefore, even if the information device 200 were to recognize only up to five points of touches, like the current smartphone, the touch of the finger may be recognized. That is, when the user presses the icon printed on the touch area TC3 with a finger, as in the case of FIG. 130, the information device 200 recognizes the touch position of the finger via the touch panel. At this point in time, the information device 200 can simultaneously recognize five touches. That is, in the cards shown in FIGS. 131 and 132, since conductivity is disconnected between the pattern code output touch area and the icon touch area, it is possible to arrange five conductors as pattern codes, and the number of unique pattern codes is increased.

FIG. 133 is a sectional view (hereinafter referred to as cross section C) of a card cut along a plane passing through a line connecting $C_1$ and $C_2$ indicated with arrows in FIG. 131 and perpendicular to the paper surface. FIG. 134 is a sectional view (hereinafter referred to as cross section D) of a card cut along a plane passing through a line connecting D1 and D2 indicated with arrows in FIG. 131 and perpendicular to the paper surface. Cross section C in FIG. 133 has a similar structure as that of cross section A in FIG. 128. On the other hand, as shown in FIG. 134, in the cross section D, unlike FIG. 129, a conductor plate CA2 is not provided. That is, there is no conductor plate CA2 directly below the touch area TC3 in FIG. 132. Therefore, even if the user has a finger come into contact with the touch area TC3, the touch panel may not detect interaction by a physical quantity (electrostatic capacitance, electric field intensity, or the like) through the element 111 (conductor) directly under the touch area TC2. On the other hand, an insulator CA3 is provided in the cross section D part. The insulator CA3 may be the same as the insulator around the element 111 (conductor) in the cross section C part. Since the insulator CA3 has a certain degree of permittivity, when the user touches the surface of the protection/print layer CA1 with a finger, the touch panel may detect interaction due to a physical quantity such as electrostatic capacitance, electric field intensity, or the like, and may specify the touch position. Note that if the protection/print layer CA1 and the insulator CA3 are made of a transparent material, even when the user places a card on the touch panel, it is possible to view the screen and operate the touch panel from above the card. In this case, the protection/print layer CA1 and the insulator CA3 may be, for example, transparent media such as glass, acryl, or the like. Note that the protection/print layer CA1 and the insulator CA3 may be integrated, regardless of whether they are transparent or non-transparent.

FIG. 135 shows a modification example of a sectional view (hereinafter referred to as cross section CC) of a card cut along a plane passing through a line connecting C1 and C2 indicated with arrows in FIG. 131 and perpendicular to the paper surface. For example, both the element 111 (conductor) and the conductor plate CA2 may be formed by printing, as the element 111A and the conductive plate CA2AA, respectively. In this case, both the element 111A and the conductive plate CA2AA can be considered to be printed thin film. Also, the element 111A and the conductive plate CA2AA may be connected with a conductive wire. Note that parts other than the element 111A, the conductive plate CA2AA, and the conductive wire, may be embedded in the insulator CA3 to form a card type chassis. However, for parts other than the element 111A, the conductive plate CA2AA, and the conductive wire, a part may be air gaps.

FIG. 136 shows a modification example of a sectional view (hereinafter referred to as cross section DD) of a card cut along a plane passing through a line connecting D1 and D2 indicated with arrows in FIG. 131 and perpendicular to the paper surface. In this example, an element 111 (conductor) is provided under each icon printed in the touch area TC3. When the user touches an icon (labelled "English" and the like) exemplified in FIG. 132, physical quantities such as electrostatic capacitance, electric field intensity, and the like due to finger induced interaction in the touch panel via the element 111 (conductor) directly below. Therefore, the information device 200 can recognize which icon is pressed.

Note that when an operation is performed using an icon printed on a card as shown in FIG. 132, the card may slip and rotate while the user is touching the icon. If the card slips and rotates, the information device 200 cannot associate the touch area with the touch position. Therefore, to prevent the card from slipping and rotating, slip-resistant material may be applied to the back side of the card. However, even if the card were to slip and rotate, if a conductive area (touch area TC2) is touched, a predetermined icon can be selected uneventfully without having to apply a slip-resistant material.

FIG. 137 shows an example of another card for a game. In this example, a transparent touch area TC4 is provided on the card. The transparent touch area TC4 may be, for example, a transparent dielectric substance such as glass or acryl. Note that the structure of the back side of the touch area TC2 is similar to those of FIGS. 131 and 132, and the elements 111 (conductor) are arranged. When the user places such a card on a screen of an information device 200, the icon image displayed on the display of the information device 200 is displayed in the transparent touch area TC4. Even if the card is placed diagonally, the smartphone screen is displayed diagonally in accordance with the orientation of the card so that it fits within the transparent frame. However, even if the card rotates and moves, it is displayed in the same position. Therefore, if the conductive area is touched again, an icon image is displayed so as that it fits within the transparent touch area TC4. When the user touches the transparent touch area TC4, the touch panel may detect the touch position of the finger and may specify the touched position by interaction with the touch panel by the finger. That is, the electrostatic capacitance or the electric field intensity due to a finger may be detected by the touch panel through the transparent dielectric substance of the transparent touch area TC4. Therefore, an application executed by the information device 200 may execute processing corresponding to an icon displayed at the touched position.

Note that by covering the TC2 and the transparent touch area TC4 with a conductive transparent film and connecting them to the conductor plate CA2 exemplified in FIG. 133, while the user is touching the transparent touch area TC4, it is possible to give sufficient interaction from the elements 111 (conductor) on the back side of touch area TC2 to the touch panel, and the information device 200 may recognize the arrangement of the elements 111 (conductor). In that case, the user may give finger interaction to an icon portion such as “English” on the display of the touch panel through the transparent touch area TC4 and may select the icon on the display.

FIG. 138 shows an example in which processing of a drawing application is executed on a card of FIG. 137. When the user traces on a transparent touch area TC4 with a finger, a drawing application executed by the information device 200 can acquire a movement trajectory of the finger via the touch panel, by interaction by the finger from the transparent touch area TC4. The drawing application may draw lines on the display in accordance with the trajectory. Therefore, the user, for example can draw characters in a drawing area of the drawing application directly under the transparent touch area TC4 of a card placed on the touch panel of the information device 200.

FIG. 139 is a processing example of a game program that an information device 200 executes by recognizing a card as exemplified in FIGS. 125 to 138. In this processing, the Central Processing Unit (CPU) of the information device 200 activates the game program according to the user's operation. For example, first, a character appears in a scene of a game (S1). Then, the CPU waits for the card to be placed on the touch panel (S2). Upon detecting a placement of a card on the touch panel (YES in S2), the CPU specifies the relative position (arrangement) of the card on the touch panel, in addition to identifying the type of the card, from the arrangement of the elements 111. Then, the CPU waits for the user's finger to touch the card icon. Note that when a card includes a transparent touch area TC4, the CPU waits for the user's finger to touch an icon on the display (S4). Then, when the CPU detects the touch of a finger (YES in S4), whether or not the touched icon instructs the end of the game program is judged (S5). If the touched icon does not indicate the end of the game program, the CPU makes the character perform an action in accordance to the touch position. Then, the CPU returns the processing to S4. On the other hand, with the judgement of S5, if the touched icon instructs the end of the game program, the CPU ends the game program.

As described above, according to the sixteenth embodiment, by eliminating components requiring power supply from the apparatus 110 such as a G-Card and the like, the code generation apparatus 1 of the zeroth embodiment and the like, cards and other items (items) for games may be formed with a simple configuration including an insulator, elements 111, a conductor plate such as CA2 and the like. In that case, as shown in FIG. 125, by using a number (for example, four) of elements 111 smaller than the number of touch points (for example, five places) that can be simultaneously detected by the touch panel, even when a card or an item is arranged on a touch panel of a game machine, an information device 200 and the like, it may be possible to perform a contact operation with a finger. Furthermore, as shown in FIG. 129, by combining the conductive plate CA2 and the elastic insulator CA4, it is possible to exert an interaction based on a physical quantity on the touch panel of the lower layer from above of the conductive plate CA2 and the touch position may be recognized. Also, as shown in FIG. 130, the same goes for the case where an elastic insulator CA4 is arranged with a conductor plate CA2 and a spacer CA5. In the case of FIG. 130, even if the distance between the conductive plate CA2 and the surface of the touch panel is set to about 0.2 mm to 0.3 mm, by using the elastic insulator CA4 as an air gap, it is possible to allow the touch panel not to detect the conductive plate CA2 in the non-pressed state and to make the touch panel recognize the pressed position when the user presses the conductive plate CA2.

In addition, by using the transparent touch area TC4 of FIG. 137, an icon on the display of a game machine, an information device 200, and the like, and a card may be used together, and a character and the like corresponding to the card may be operated by an icon operation on the display.

Seventeenth Embodiment

In FIG. 140 to FIG. 142, exemplified is a processing of information transmission between the code generation apparatus 1 of the zeroth embodiment, the apparatuses 110, 110A to 110J, and the like of the first embodiment to the ninth embodiment, the digital stamp of the fifteenth embodiment, the G-Card and the like of the sixteenth embodiment, and the information device 200. In the present embodiment, described is an example of processing where the information device 200, for example, detects the arrangement of the elements 111 in the apparatus 110 exemplified in FIG. 72H, and outputs an optical code to the light emitting regions LE1 to LE6 corresponding to the photodiodes WPD1 to WPD6 and the like specified from the arrangement of the elements 111. In the processing of the present embodiment, for example, the configurations described for the code generation apparatus 1 of the zeroth embodiment, the apparatus 110 and the like of the first embodiment to the eighth embodiment, and the digital stamp of the fifteenth embodiment are used in combination. Therefore the code generation apparatus 1 of the zeroth embodiment, the apparatus 110 and the like of the first to the eighth embodiment, and the digital stamp of the fifteenth embodiment are assumed to have a plurality of photodiodes for receiving light from the information device 200. Therefore, the processing described below with reference to FIGS. 140 to 142 can be applied directly to the code generation apparatus 1 of the zeroth embodiment, the apparatus 110 and the like of the first to the eighth embodiments, and the digital stamp of the fifteenth embodiment.

In the processing of FIG. 140, the CPU of the information device 200, for example, acquires a pattern code as a change in a physical quantity based on interaction to the touch panel via the element 111 of the apparatus 110. Then, the CPU detects whether or not the acquired pattern code is a pattern code corresponding to the trigger pattern (S10). The trigger pattern is, for example, the reference symbol pattern exemplified in FIG. 70A. Also, as exemplified in FIG. 72G, the trigger pattern is, for example, a combination of patterns 1 and 2 in which the symbol 6 is continuously turned on and the symbol 1 is continuously turned off. However, a trigger pattern may be defined at the application level, by an information pattern (for example, patterns 3 to 9 in FIG. 72) in addition to the combination involving such reference symbol patterns or a pattern indicating the start of output. When the trigger pattern is detected (YES in S10), the CPU specifies the positions on the display of the light emitting regions LE1 to LE6 corresponding to the photodiodes WPD1 to WPD6 of the apparatus 110, on the basis of the element arrangement detected by the touch panel (S11). Note that the light emitting region of the apparatus 110 may be appointed for each model of the apparatuses 110, for example. The information device 200 may determine the model of the apparatus 110 from the arrangement of the elements 111 for each model of the apparatus 110. Furthermore, after detection of the trigger pattern, the information device 200 may acquire model information of the apparatus 110 from the apparatus 110 by a pattern code from the element 111 in a predetermined procedure. In S10, the trigger pattern is detected when a pattern code is acquired as a change in a physical quantity due to interaction with the touch panel via the element 111 of the apparatus 110. Therefore, a case where YES in S10 corresponds to when the apparatus 110 which is an example of an object touches the touch panel which is an example of a flat plate sensor. Furthermore, the touch panel is an example of a display equipped with a transparent flat plate sensor.

Then, the CPU responds to the apparatus 110 by emitting light according to the optical code in the light emitting regions LE1 to LE6 (see FIG. 72H) on the display (S12). The light emitting regions LE1 to LE6 on the display are examples of partial areas of the display corresponding to positions where the light receiving elements (photodiodes WPD1 to WPD6 and the like) are provided on the apparatus 110. The positions of the light emitting regions LE1 to LE6 are determined from the positional relationship between the touch panel and the apparatus 110. Since the CPU emits light according to the optical code, the amount of light of the light emitting regions LE1 to LE6 varies with time, for example, as described with reference to FIG. 72I. Then, the CPU is in waiting for an event (S13). The event is issued from the OS based on, for example, a driver of the touch panel, or a processing of a computer program and the like being run on the CPU.

For example, when the event is an event indicating a movement of the apparatus 110 (YES in S14), the CPU detects the position of the element 111 on the touch panel and executes processing to follow the movement of the element 111 (S15). By this processing, even if the apparatus 110 moves on the touch panel, the CPU may re-detect the position of the element 111 (S15). Upon completion of the following processing, the CPU returns the processing to S13.

Furthermore, for example, when the event is the input of a pattern code from the apparatus 110 via the element 111, the CPU executes a pattern code input processing (S19). Upon completion of the pattern code input processing, the CPU returns the processing to S13. The pattern code input processing is, for example, in the case where the apparatus 110 is a credit card, a cash card, a point card and the like, a processing of acquiring a card number and the like. The pattern code input processing is, for example, a processing of reading the balance amount of electronic money from an electronic money card.

Furthermore, for example, when the event is a light emission request from an application running on the CPU (YES in S18), the CPU executes the optical code light emission processing (S19). Upon completion of the optical code emitting process, the CPU returns the processing to S13. The optical code emitting processing, for example, in the case where the apparatus 110 is a credit card, a cash card, a point card and the like, is a processing of returning a response to a card, a processing of recording a transfer destination in a cash card, a processing of writing in points to a point card, a processing of writing the balance amount on an electronic money card, and the like. Here, in the processing of S19, the CPU changes the amount of light with time, for example as shown in FIG. 72I, of a partial region (for example, the emitting regions LE1 to LE6 in FIG. 72H) of the display corresponding to the positions where the light receiving elements (the photodiodes WPD1 to WPD6 and the like) are provided. Then, when the event is a command indicating the end (YES in S20), the CPU ends the program.

FIG. 141 exemplifies processing in which the apparatus 110 outputs a pattern code to an information device 200 via the element 111. In this processing, the CPU of the apparatus 110 waits for a trigger for starting processing (S30). The trigger is, for example, an ON signal input from the display of the information device 200 to the photodiodes WPD1 to WPD6. Furthermore, for example, it is two consecutive receptions for the photodiode WPD1 exemplified in FIG. 72I. Also, when the apparatus 110 has a fingerprint sensor as described in the first embodiment, the trigger is, for example, successful authentication with the fingerprint sensor as described in the first embodiment. Furthermore, when the apparatus 110 has a photoelectric conversion element array 112 as described in the first embodiment, the trigger is, for example, the start of electric power supply from the photoelectric conversion element array 112.

Upon detecting the trigger, the CPU of the apparatus 110 outputs a pattern code from an element 111 (S31). Then, the apparatus 110 waits for an optical code response. The optical code is emitted, for example, in the light emitting regions LE1 to LE6 of the display corresponding to the photodiodes WPD1 to WPD6. Upon detecting the optical code response through the photodiodes WPD1 to WPD6, the apparatus 110 is in waiting for an event (S33).

The event is, for example, reception of an optical code from the information device 200 via the photodiodes WPD1 to WPD6 (S34). When the event is the reception of the optical code, the CPU decrypts the received optical code. Then, the CPU returns the processing to S33.

Furthermore, the event is, for example, a pattern code output request decrypted from an optical code (S36). When the event is a pattern code output request, the CPU executes a pattern code output processing (S37). Then, the CPU returns the processing to S33. Here, the pattern code output processing is, for example, in the case where the apparatus 110 is a credit card, a cash card, a point card and the like, a processing of obtaining a card number and the like from the memory 117 (see the first embodiment) and transmitting it to the information device 200. Furthermore, the pattern code output processing is, for example, a processing of reading the electronic money balance amount from the memory 117 as an electronic money card and transmitting it to the information device 200.

Also, if the event is a request to store information decrypted from the optical code in the memory 117 (see the first embodiment), the CPU executes memory storage processing for storing information into the memory 117 (S39). Here, when the apparatus 110 is a point card, the memory storing processing is a processing of storing points. When the apparatus 110 is an electronic money card, the memory storing processing is a processing of writing the balance amount of the electronic money into the memory 117. Then, when the event is a command indicating the end (YES in S20), the CPU ends the program.

<<Modifications>>

According to FIGS. 140 and 141, the information device 200 determines the arrangement of the light emitting regions LE1 to LE6 based on the arrangement of the elements 111 of the apparatus 110. However, the implementation of the present invention is not restricted to such processing. For example, instead of determining the light emitting regions LE1 to LE6 from the arrangement of the elements 111, the information device 200 may display a frame for placing a apparatus 110 such as a card and the like, as exemplified in FIG. 111. Then, when a trigger signal indicating that a card is placed on the displayed frame is detected, the information device 200 may specify the photodiodes WPD1 to WPD6 of the apparatus 110 from the displayed frame, and may determine the arrangement of the light emitting regions LE1 to LE6.

In this processing, for example, the information device 200 detects, for example, a light emission request for an optical code from an application (S10A). The optical code emission request is, for example, a request to acquire a credit card number from a web browser. Upon detecting the optical code emission request (YES in S10A), the CPU of the information device 200 displays a card frame on the touch panel display and guides the user to place an apparatus 110 such as a G-Card (S12A). Then, the CPU is in waiting for an event (S13). For example, after the card frame is displayed, when the apparatus 110 is placed, a placement event occurs (S14A). The placement event occurs, for example, by the detection of the elements 111 due to the placement of the apparatus 110 on the touch panel. When a placement event occurs, the CPU executes positioning confirmation (S15A). In the positioning confirmation, the CPU emits light in the light emitting regions LE1 to LE6, and receives a light receiving response from the elements 111 of the apparatus 110. If the positioning cannot be confirmed, for example, a timeout occurs, the CPU may display guidance on the display and may execute a retry. Note that when the positioning confirmation is successful, the CPU returns the processing to S13. Also note that the processing from S16 onward is the same as in FIG. 140 except that there is no processing for the movement event. In this example, the CPU guides the user to place a apparatus 110 such as a card and the like and confirms the placement of the apparatus 110 such as a card and the like on the touch panel. Furthermore, the CPU confirms the positioning and executes the optical code emitting processing (S19). Therefore, also in this processing, it can be said that the CPU changes the amount of light with time of a partial region of the said display corresponding to the positions where the light receiving elements on the object face, from the positional relationship between the flat plate sensor and the object when an object comes into contact with the flat plate sensor.

According to the processings in FIGS. 140 and 141, from the arrangement of the elements 111 of a apparatus 110 and the like, the information device 200 specifies the arrangement of optical sensors (for example, the photodiodes WPD1 to WPD6 in FIG. 72H) and determines light emitting regions (for example, LE1 to LE6 on the display side drawn with dotted lines in the same FIG.). Therefore, the information device 200 may input information to the apparatus 110 and the like by changes in the amount of light and the like through a plurality of channels.

In addition, according to the processing of FIG. 142, since the user is guided using a graphics object such as a card frame and the like on the display, the information device 200 need not to detect the arrangement of the elements 111. Therefore, even with an apparatus 110 with a number of elements 111 less than 3 or when the orientation of the elements 111 cannot be specified since the arrangement of the elements 111 is point-symmetrical, the information device 200 may input information to the apparatus 110 and the like by changes in the amount of light and the like through a plurality of channels.

The processing of this embodiment is executed by the CPU and the like of the information device 200, for example, in accordance with the computer program stored in the recording medium. Among such recording media that can be detached from a computer and the like, are for example, a flexible disk, a magneto-optical disk, a CD-ROM, a CD-R/W, a DVD, a Blu-ray disk, a DAT, an 8 mm tape, memory cards and the like such as a flash memory. In addition, as recording media fixed to a computer and the like, are a hard disk, a ROM (read only memory), and the like. Furthermore, a SSD (Solid State Drive) may be used as a recording medium removable from a computer and the like, or as a recording medium fixed to a computer and the like.

Eighteenth Embodiment

The optical sensors 130F and 130G according to the eighteenth embodiment will be described with reference to FIGS. 143 to 147. As in the fourteenth embodiment, the optical sensors 130F and 130G have a combination of an LED which is a light emitting element and a photodiode which is a light receiving element. Therefore, the optical sensors 130F and 130G can irradiate light on a printed matter and the like and can detect its color. Therefore, the optical sensors 130F and 130G can be used as the optical sensor 130 in the eighth embodiment and the like. In addition, the optical sensors 130F and 130G can be used by incorporating them into the stamp type code generation apparatus of the zeroth embodiment or the apparatus 110 of the first to eight embodiments and the like.

FIG. 143 is a plan view of the optical sensor 130F as viewed from the light receiving surface. At the center of the optical sensor 130F, a photodiode 240 is disposed as a light receiving element. LED-R 241, LED-G 242, and LED-B 243 which are light emitting diodes (LEDs) emitting lights (RGB) of different wavelengths are arranged around the photodiode 240 at equal intervals. In this configuration, when there is a red (R) print surface on the surface facing the light receiving surface of the optical sensor 130F, if the LED-R 241 emits light, the photodiode 240 receives reflected light from the print surface with an amount equal to or greater than the predetermined amount of light. That is, the photodiode 240 receives reflected light in the red wavelength range irradiated from the LED-R 241. On the other hand, even if the LED-G 242 (the green wavelength range) and the LED-B 243 (the blue wavelength range) emit light on the red (R) print surface, the photodiode 240 can only receive reflected light from the print surface with an amount less than the predetermined amount of light.

Similarly, when the LED-G 242 emits light in the green wavelength range on the green (G) print surface, the photodiode 240 receives reflected light from the print surface with an amount equal to or greater than the predetermined amount of light. On the other hand, even if the LED-R 241 (the red wavelength range) and the LED-B 243 (the blue wavelength range) emit light on the green (G) print surface, the photodiode 240 can only receive reflected light from the print surface with an amount less than the predetermined amount of light.

Similarly, when the LED-B 243 emits light to the blue (B) print surface, the photodiode 240 receives reflected light from the print surface with an amount equal to or greater than the predetermined amount of light. On the other hand, even if the LED-R 241 and the LED-G 242 emit light on the blue (B) print surface, the photodiode 240 can only receive reflected light from the print surface with an amount less than the predetermined amount of light.

FIG. 144 is a plan view of the optical sensor 130G having six LEDs as viewed from the light receiving surface. At the center of the optical sensor 130G, a photodiode 240 is disposed as a light receiving element. Two each of LED-R 241, LED-G 242, and LED-B 243 are arranged around the photodiode 240 at equal intervals. In the example of FIG. 144, the light emitting diodes are arranged in the FIG. 145 is a sectional view of the optical sensor 130F (cut along a plane perpendicular to the paper surface passing through the arrow with "cross section A" in FIG. 143). The optical sensor 130F is configured with a light transmitting plate 145 having a predetermined thickness so that irradiated light from the LED-R 241, the LED-G 242, and the LED-B 243 may irradiate the print area of the color code and the photodiode 240 may receive predetermined reflected light. The light irradiated as point light sources from the LED-R 241, the LED-G 242, and the LED-B 243 are received as respective reflected lights on the surface of the photodiode 240. Since the amount of light reflected from the surface of the print medium directly below each of LED-R 241, LED-G 242, and LED-B 243 is high and decreases with the distance from directly below each LED, the printed color information may not be acquired accurately. However, when the light transmitting plate 145 is embedded in a card type apparatus 110, if the surrounding side surface is formed of a reflective material, since light is reflected on the side surface, the amount of light does not decrease that much even at a position away from directly under each LED. When the light transmitting plate 145 is not embedded, a reflecting plate may be provided on the surrounding side surface.

FIG. 146 is a flowchart exemplifying an optical code acquisition processing executed by a CPU of an apparatus 110 and the like installed with an optical sensor 130F or an optical sensor 130G. Here, the optical code is obtained as a combination of, for example, the amount of received light R when the LED-R emits light, the amount of received light G when the LED-G emits light, and the amount of received light B when the LED-B emits light. When the amounts of the received lights R, G and B are of two levels (1 bit), the apparatus 110 may obtain 1 bit of information with one emission of light from each LED, and may acquire 3 bits of information from LED-R, LED-G, and LED-B. On the other hand, by setting the received amounts of lights R, G, B at multiple levels, the apparatus 110 may acquire a lot more information as a combination of R, G, B from the print surface and the like. Note that when the received amounts of lights R, G, B are set at multiple levels, LED-R, LED-G, LED-B may preliminarily emit light on the reference print surface and the gains of the photodiodes may be calibrated. On the print surface to be used as a reference in this case, the hue and brightness of color which are to be references for corresponding combinations of multi-levels of R, G and B may be printed in single colors. Reference print media corresponding to the number of combinations of multi-levels of R, G and B may be regarded to have been prepared.

In the color code acquiring processing, the CPU of the apparatus 110 emits LED-R, it is received with a photodiode, and the received amount of light R is stored (S50). Next, the CPU of the apparatus 110 emits LED-G, it is received with a photodiode, and the received amount of light G is stored (S51). Next, the CPU of the apparatus 110 emits LED-B, it is received with a photodiode, and the received amount of light B is stored (S52). Note that processing from S50 to S52 is not restricted to this order. That is, there is no restriction on which of the R, G, and B colors emits light first.

Then, the CPU outputs the received amounts of lights R, G, B, for example, to an area accessed by an application program (for example, a game program). Then, the CPU determines whether or not to end the processing (S54). If the processing is not ended, the CPU returns the processing to S50 and the same processing is repeated. Note that as in FIG. 145, for each RGB emission, the received amount of lights RGB is output to the area accessed by the application program. However, instead of such a processing, the CPU may acquire a predetermined number of sets of RGB, and transmit them to the application program in the form of an array.

The optical sensors 130F and 130G of the eighteenth embodiment described above can detect colors from print surfaces of different colors (RGB). Therefore, similarly to the optical sensors 130A to 130E of the fourteenth embodiment, the optical sensor 130F can acquire a color code from the print surface. However, a feature of the optical sensor of the eighteenth embodiment is that while LED-R 241, LED-G 242 and LED-B 243 are provided as light emitting elements, color filters as in the fourteenth embodiment are not required. That is, the photodiode 240 detects reflected light from the print surface without color filters. Therefore, with the optical sensors 130F and 130G, decay of light by color filters does not occur. In other words, the optical sensors 130F and 130G can read color codes with higher sensitivity than the optical sensors 130A to 130E of the fourteenth embodiment, from the print surface.

Nineteenth Embodiment

The nineteenth embodiment will be described with reference to FIGS. 147 to 148.

The nineteenth embodiment shows examples of arrangements of fixed pattern codes, unlike the practical example in which the pattern code outputs by making the output of a conductor electrically variable. The pattern code of the present embodiment is featured by being provided with two types of conductors, a reference conductor and an information conductor, and defining the orientation of a pattern code and a pattern code by the positional relationship between a reference conductor and an information conductor.

FIG. 147 is a diagram for describing a case where three to four conductors of the same size are arranged, wherein FIG. 147(*a*) shows a case where the distance between the reference conductors is 43 mm, FIG. 147(*b*) shows a case where the distance between the reference conductors is 38 mm, FIG. 147(*c*) shows a case where the distance between the reference conductors is 33 mm, and FIG. 147(*d*) shows the case where the distance between the reference conductors is 28 mm.

With the pattern code of this embodiment, by arranging two reference conductors and one or two information conductors, the orientation of the pattern code is determined and a unique pattern code can be defined.

The distance between the two reference conductors is set to be larger than the distance between any other conductors (between a reference conductor and an information conductor, between an information conductor and an information conductor), that is, the two reference conductors are arranged so that the distance between the two reference conductors is of the maximum value among the distances of two conductors. Thus, by searching for two conductors with the largest distance between the conductors, the two may be found to be the reference conductors. Then, the remaining one or two may be found to be information conductors, and from the positional relationship between the reference conductor and the information conductor, the orientation of the pattern code may be determined and a unique pattern code may be defined.

Here, "the distance between conductors" refers to the distance from the center of one conductor to the center of the other conductor.

The distance between the conductors is preferably about 10 mm. However, the preferable distance depends on the performance of the smartphone or tablet.

The conductors are arranged so as to have the distance between conductor center be recognized under the assumption that the maximum recognition error of the conductor center positions is within about ±2 mm (about 4 mm in total), and to have the pattern code be acquired with accuracy.

Next, each case of (a) to (d) is described.

(a) is a diagram showing a case where the distance between the reference conductors is 43 mm. The dotted circles in the figure are placement candidates for information conductors (hereinafter referred to as "placement candidate"). The placement candidates are placed with 5 mm intervals. If recognition error is small, it is possible to define a large number of pattern codes by shortening the intervals of the placement candidates and increasing the number of information conductors to be placed. Note that when they are arranged adjacent to each other, they are to be arranged at a distance of 10 mm or more so that the two adjacent conductors can be recognized with certainty.

When the distance between the reference conductors is 43 mm, there are 38 placement candidates where the distance between the conductors is shorter by 4 mm or more (that is, the distance between conductors is 39 mm or less) with respect to the distance between the reference conductors.

However, when two information conductors are arranged between the reference conductors, the reference conductors and the information conductors are aligned in a straight line, and the orientation of the pattern code cannot be determined. Therefore, only one information medium can be placed between the reference conductors. Thus, first, the number of combinations for selecting 2 places and 1 place out of 33 places remaining upon subtracting 5 placement candidates located between the reference conductors from 38 is obtained as follows.

$$33C2+33=561 \text{ ways} \quad (A)$$

Next, the number of combinations of two candidate positions where the distance between the conductors is less than 10 mm is $$9+15+21+27+33+28+5=138 \text{ ways} \quad (B)$$

Conductors cannot be arranged with a distance between the conductors less than 10 mm. This is because there is a possibility that adjacent two may not be recognized. Therefore, combinations where the distance is less than 10 mm are excluded.

Next, when one placement candidate located between the reference conductors is selected and it can be distinguished from other conductors, the number of combinations is $$29\times2+28\times3=142 \text{ ways} \quad (C).$$

From the above, the number of combinations for the placement of information conductors that can be placed in the case of (a) are $$(A)-(B)+(C)=561-138+142=565 \text{ ways}$$

(b) is a diagram showing a case where the distance between the reference conductors is 38 mm.

In this case, there are 29 placement candidates where the distance between the conductors is shorter by 4 mm or more (that is, the distance between conductors is 34 mm or less) with respect to the distance between the reference conductors.

However, just as in the case of (a), only one information medium can be placed between the reference conductors. Thus, first, the number of combinations for selecting 2 places and 1 place out of 25 places remaining upon subtracting 4 placement candidates located between the reference conductors from 29 is obtained as follows.

$$25C2+25=325 \text{ ways} \quad (A)$$

Next, the number of combinations of two candidate positions where the distance between the conductors is less than 10 mm is $$5+21+27+27+18+3=101 \text{ ways} \quad (B).$$

As in the case of (a), combinations where the distance between conductors is less than 10 mm are excluded.

Next, when one placement candidate located between the reference conductors is selected and it can be distinguished from other conductors, the number of combinations is $$21\times2+20\times2=82 \text{ ways} \quad (C).$$

From the above, the number of combinations for the placement of information conductors that can be placed in the case of (b) are $$(A)-(B)+(C)=325-101+82=306 \text{ ways}.$$

(c) is a diagram showing a case where the distance between the reference conductors is 33 mm.

In this case, there are 21 placement candidates where the distance between the conductors is shorter by 4 mm or more (that is, the distance between conductors is 29 mm or less) with respect to the distance between the reference conductors.

However, just as in the cases of (a) and (b), only one information medium can be placed between the reference conductors. Thus, first, the number of combinations for selecting 2 places and 1 place out of 18 places remaining upon subtracting 3 placement candidates located between the reference conductors from 21 is obtained as follows.

$$18C2+18=171 \text{ ways} \quad (A)$$

Next, the number of combinations of two candidate positions where the distance between the conductors is less than 10 mm is $$9+15+21+18+3=66 \text{ ways} \quad (B).$$

As in the cases of (a) and (b), combinations where the distance between conductors is less than 10 mm are excluded.

Next, when one placement candidate located between the reference conductors is selected and it can be distinguished from other conductors, the number of combinations is $$14\times2+13=41 \text{ ways} \quad (C).$$

From the above, the number of combinations for the placement of information conductors that can be placed in the case of (c) are $$(A)-(B)+(C)=171-66+41=146 \text{ ways}.$$

(d) is a diagram showing a case where the distance between the reference conductors is 28 mm.

In this case, there are 10 placement candidates where the distance between the conductors is shorter by 4 mm or more (that is, the distance between conductors is 24 mm or less) with respect to the distance between the reference conductors.

However, just as in the cases of (a) to (c), only one information medium can be placed between the reference conductors. Thus, first, the number of combinations for selecting 2 places and 1 place out of 8 places remaining upon subtracting 2 placement candidates located between the reference conductors from 10 is obtained as follows.

$$8C2+8=36 \text{ ways} \quad (A)$$

Next, the number of combinations of two candidate positions where the distance between the conductors is less than 10 mm is $$3+9+8+1=21 \text{ ways} \quad (B).$$

As in (a) to (c), combinations where the distance between conductors is less than 10 mm are excluded. Next, when one placement candidate located between the reference conductors is selected and it can be distinguished from other conductors, the number of combinations is $$4\times2=8 \text{ ways} \quad (C).$$

From the above, the number of combinations for the placement of information conductors that can be placed in the case of (d) are $$(A)-(B)+(C)=36-21+8=23 \text{ ways.}$$

From (a) to (d), the total number of codes of the four types of pattern codes having different distances between the reference conductors is $$565+306+146+23=1,040.$$

Note that needless to say, the distance between the reference conductors is not restricted to the above mentioned four, as long as the orientation of the pattern code can be recognized, the reference conductor may be placed anywhere. Note that the pattern code may be defined by forming a unique arrangement with only information conductors without disposing the reference conductor. A unique arrangement refers to an arrangement where the same pattern does not exist even with rotating/moving.

FIG. 148 is a diagram for describing a case where a reference medium having a size different from that of the information conductor is arranged, and a total of 3 to 4 conductors are arranged. (A) shows a case where the distance between reference conductors is 35 mm, (b) shows a case where the distance between reference conductors is 30 mm, (c) shows a case where the distance between reference conductors is 25 mm, and (d) shows a case where the distance between reference conductors is 20 mm.

With the pattern code of this embodiment, by arranging two reference conductors and one or two information conductors, the orientation of the pattern code is determined and a unique pattern code can be defined.

The two reference conductors are made different in size from the information conductor to an extent that they can be recognized by the information device 200 provided with a touch panel (in the same FIG., the reference conductor is larger than the information conductor). As a result, the information device 200 recognizes the sizes of conductors, and finds that the large conductor is the reference conductor. Then, the remaining one or two are found to be information conductors, and the orientation of the pattern code may be determined from the positional relationship between a reference conductor and an information conductor.

The distance between the conductors (the distance from the center of one conductor to the center of the other conductor) is preferably about 10 mm. However, the preferable distance depends on the performance of the smartphone or tablet.

The conductors are arranged so as to have the distance between conductor center be recognized under the assumption that the maximum recognition error of the conductor center positions is within about ±2 mm (about 4 mm in total), and to have the pattern code be acquired with accuracy.

Next, each case of (a) to (d) will be described.

(a) is a diagram showing a case where the distance between the reference conductors is 35 mm. The dotted circles in the figure are placement candidates for information conductors (hereinafter referred to as “placement candidate”). The placement candidates are placed with 5 mm intervals. If recognition error is small, it is possible to define a large number of pattern codes by shortening the intervals of the placement candidates and increasing the number of information conductors to be placed. When they are actually arranged, they are to be arranged at a distance of 10 mm or more so that the two adjacent conductors can be recognized with certainty.

When the distance between the reference conductors is 35 mm, there are 34 placement candidates for the information conductors.

However, when two information conductors are arranged between the reference conductors, the reference conductors and the information conductors are aligned in a straight line, and the orientation of the pattern code cannot be determined. Therefore, only one information medium can be placed between the reference conductors. Thus, first, the number of combinations for selecting 2 places and 1 place out of 31 places remaining upon subtracting 3 placement candidates located between the reference conductors from 34 is obtained as follows.

$$31C2+31=496 \text{ ways} \quad (A)$$

Next, the number of combinations of two candidate positions where the distance between the conductors is less than 10 mm is $$25+25+25+15+2=92 \text{ ways} \quad (B).$$

Conductors cannot be arranged with a distance between the conductors less than 10 mm. This is because there is a possibility that adjacent two may not be recognized. Therefore, combinations where the distance is less than 10 mm are excluded.

Next, when one placement candidate located between the reference conductors is selected and it can be distinguished from other conductors, the number of combinations is $$29\times2+28=86 \text{ ways} \quad (C).$$

From the above, the number of combinations for the placement of information conductors that can be placed in the case of (a) are $$(A)-(B)+(C)=496-92+86=490 \text{ ways.}$$

(b) is a diagram showing a case where the distance between the reference conductors is 30 mm. In this case, there are 34 information conductor placement candidates as in the case where the distance between the reference conductors is 35 mm.

Therefore, since the same number of combinations as that in the case of (a) holds here, in the case of (b), the number of combinations for the placement of information conductors that can be placed is 490.

(c) is a diagram showing a case where the distance between the reference conductors is 25 mm. In this case, there are 32 placement candidates for the information conductors. However, just as in the cases of (a) and (b), only one information medium can be placed between the reference conductors. Thus, first, the number of combinations for selecting 2 places and 1 place out of 31 places remaining upon subtracting 1 placement candidate located between the reference conductors from 32 is obtained as follows $$31C2+31=496 \text{ ways} \quad (A)$$

Next, the number of combinations of two candidate positions where the distance between the conductors is less than 10 mm is $$25+25+25+15+2=92 \text{ ways} \quad (B).$$

As in the cases of (a) and (b), combinations where the distance between conductors is less than 10 mm are excluded.

Next, when one placement candidate located between the reference conductors is selected and it can be distinguished from other conductors, the number of combinations is $$28 \quad (C).$$

From the above, the number of combinations for the placement of information conductors that can be placed in the case of (c) are $$(A)-(B)+(C)=496-92+28=432 \text{ ways}.$$

(d) is a diagram showing a case where the distance between the reference conductors is 20 mm. In this case, there are 30 placement candidates for the information conductors. However, just as in the cases of (a) to (c), only one information medium can be placed between the reference conductors. Thus, first, the number of combinations for selecting 2 places and 1 place out of 29 places remaining upon subtracting 1 placement candidate located between the reference conductors from 30 is obtained as follows.

$$29C2+29=435 \text{ ways} \quad (A)$$

Next, the number of combinations of two candidate positions where the distance between the conductors is less than 10 mm is $$25+25+25+9=84 \text{ ways} \quad (B).$$

As in (a) to (c), combinations where the distance between conductors is less than 10 mm are excluded. Next, when one placement candidate located between the reference conductors is selected and it can be distinguished from other conductors, the number of combinations is $$28 \quad (C).$$

From the above, the number of combinations for the placement of information conductors that can be placed in the case of (d) are $$(A)-(B)+(C)=435-84+28=379 \text{ ways}.$$

From (a) to (d), the total number of codes of the four types of pattern codes having different distances between the reference conductors is $$490+490+432+379=1,791.$$

In this manner, when the sizes of the reference conductor and the information conductor are made different, it is possible to output more pattern codes than when the sizes are the same.

Note that, needless to say that the distance between the reference conductors is not restricted to the above-mentioned four, and as long as the orientation of the pattern code can be recognized, the reference conductor may be placed anywhere. Furthermore, by changing the sizes of the two reference conductors, it is possible to recognize the orientation of the pattern code regardless of where the information conductor is located.

Note that in the above description, although the zeroth to the nineteenth embodiments are described, in the present invention, each pattern code, each device, and the like of the respective embodiments can be used in appropriate combinations across the embodiments. For example, it is possible to use the pattern code used for the stamp type code generation apparatus for the card type apparatus, or to use the information reading apparatus used for the card type apparatus for the stamp type device. Of course, the reverse is also possible.

Twentieth Embodiment

The code generation apparatus 1 of the above zeroth embodiment, the card type apparatuses 110 to 110 G (hereinafter simply referred to as the apparatus 110 and the like) of the first embodiment to the ninth embodiment, and a game card and other items (items) not requiring a power supply exemplified FIGS. 125 to 138 of the sixteenth embodiment may be combined into one apparatus. In that case, to the apparatus of the present embodiment, the image sensor 160D exemplified in the tenth embodiment, the image sensor 160E exemplified in the eleventh embodiment, the image sensor 160F exemplified in the twelfth embodiment, the image sensor 160G exemplified in the thirteenth embodiment, or the optical sensor 130 exemplified in the fourteenth embodiment may be combined. Furthermore, as an output procedure for the pattern code of the apparatus of the present embodiment, the output procedure exemplified in the fifteenth embodiment may be applied. In addition, the information transmission processing between the apparatus exemplified in the seventeenth embodiment and the information device 200 may be applied to information transmission processing between the apparatus of this embodiment and the information device 200. Also, the optical sensors 130F and 130G exemplified in the eighteenth embodiment may be applied to the apparatus of the present embodiment. Further, as the pattern code of the apparatus of the present embodiment, the arrangement of the pattern code of the nineteenth embodiment may be applied.

FIG. 149 is a plan view of the apparatus 110K according to the twentieth embodiment as viewed from the back side. Here, as with the first embodiment and the like, the back side refers to the side of the apparatus 110K on which the touch panel of the information device 200 comes into contact or comes into proximity. Furthermore, FIG. 150 is a plan view of the apparatus 110K according to the twentieth embodiment as viewed from the front side. The front side refers to the side opposite to the back side, and is a side touched by a part of a human body such as a user's finger when the back side comes into contact with the touch panel of the information device 200.

As shown in FIG. 149 and FIG. 150, both the back side and the front side of the apparatus 110K are divided into an electrical mechanism region 110K-1 and a non-electrical mechanism region 110K-2. The electric mechanism region 110K-1 includes electronic circuit parts, electric power supply parts and the like, accepts the user's operation by the action of the electric circuit and the electronic circuit, and has the touch panel of the information device 200 detect physical action. The electrical mechanism region 110K-1 has, for example, the same configuration as the code generation apparatus 1 of the zeroth embodiment, and the card type apparatuses 110 to 110G (hereinafter simply referred to as the apparatus 110 and the like) of the first embodiment to the ninth embodiment. Note that a contact conductor 114 exemplified in FIG. 151 is embedded under the touch area TC2.

FIG. 151 exemplifies the configuration of the electrical mechanism region 110K-1. Specifically, in the electric mechanism region 110K-1, compared with the configuration of the apparatus 110F in FIG. 68A, the photoelectric measurement element array 129 is changed to the photodiode WPD1 to WPD6. Note that as in FIG. 151, the same reference numerals are assigned to the same constituent elements as those described in the first embodiment to the tenth embodiment, and thus descriptions thereof are omitted. Note that the configuration of the components of the electrical mechanism region 110K-1 is not restricted to that shown in FIG. 151, and the apparatus 110 and the like described in the zeroth embodiment, and the first embodiment to the tenth embodiment may be used. Note that in FIG. 151, although one comparator 118 is exemplified, the number of comparators 118 is not restricted to one. When signals are detected in parallel from photoelectric conversion elements (photosensors, phototransistors, and the like) such as the plurality of photodiodes WPD1 to WPD6 and the like, the comparators 110 are provided in parallel with the same number as the plurality of photoelectric conversion elements. A circuit for acquiring input signals from a plurality of channels is formed by a combination of the plurality of photodiodes WPD1 to WPD6 and the like, and the plurality of comparators 118. Furthermore, an analog/digital converter (A/D converter) may be used in the place of the comparator. By using the A/D converter, it is possible to realize multivalued signals of 3 bits or more in each channel by one input.

As in FIG. 149, the apparatus 110K has six elements 111 and six photodiodes WPD1 to WPD6 on the back side, similar to [Second Modification of the Eighth Embodiment] (FIGS. 72G and 72H). Furthermore, the apparatus 110K has a photoelectric conversion element array 112A and a touch area SCP1 on the back side. Also, as shown in FIG. 150, the apparatus 110K has a photoelectric conversion element array 112B, a fingerprint sensor 113, a touch area TC2, and a touch area TC4 on the front side. The structure and action of the six elements 111 and the six photodiodes WPD1 to WPD6 on the back side are as described in FIGS. 72G and 72H. As described with reference to FIG. 72G, pattern codes are output by having each element 111 being switched on/off in the order of pattern 1 to pattern 9. The apparatus 110K has the touch panel of the information device 200 detect the electrostatic capacitance (electric field intensity), for example, of five elements 111 among the six elements 111. The information device 200 recognizes the arrangement of the elements 111, therefore, the arrangement positions of the photodiodes WPD1 to WPD6 by recognizing the output pattern, for example, of five elements 111 among the six elements 111 on the touch panel.

On the other hand, the photodiodes WPD1 to WPD6 are each disposed at positions surrounded by broken lines corresponding to the optical code emission regions LE1 to LE6 of the display of the information device 200. The display of the information device 200 emits light from the optical code light emitting regions LE1 to LE6 of the display corresponding to the arrangement positions of the photodiodes WPD1 to WPD6 with independent amounts of light, and has the corresponding photodiodes WPD1 to WPD6 receive the lights. With such a configuration, it is possible to input information of a plurality of channels from the display to the apparatus 110 by dividing the light emitting region of the display without restricting the wavelength.

The photoelectric element conversion array 112A, what is known as a solar panel, receives sunlight from the display, converts it into electric energy, and supplies electric power to each part of the apparatus 110K. However, instead of providing a photoelectric element conversion array 112A, the photodiodes WPD1 to WPD6 may supply electric power to the apparatus 110K by photoelectric conversion. That is, as photodiodes WPD1 to WPD6, light receiving elements with sufficient conversion capability may be used. Each of the photodiodes WPD1 to WPD6 may include a plurality of photodiodes to increase electric power generating capability.

Note that the photoelectric conversion element array 112B on the front side is provided to supplement electric power supply by the photoelectric element conversion array 112A or electric power supply by the photodiodes WPD1 to WPD6 on the back side. That is, the apparatus 110K is supplied with power by the combination of the photoelectric conversion element array 112B on the front side, and the photoelectric conversion element arrangement 112A and the photodiodes WPD1 to WPD6 on the back side or by at least one of them. However, when sufficient electric power is supplied by the photoelectric element conversion array 112A or the photodiodes WPD1 to WPD6 on the back side, the photoelectric conversion element arrangement 112B on the front side need not be provided.

The fingerprint sensor 113 is used, for example, for user authentication. Similar to the apparatus 110 of the first embodiment, the apparatus 110K, for example, may control SW115 to have a trigger pattern from an element be detected by the touch panel when a fingerprint detected by the fingerprint sensor coincides with the fingerprint data of the user stored in the memory.

Note that when the fingerprint sensor 113 is omitted, the apparatus 110K may, for example, start processing with the reception of a predetermined light pattern for starting from the photodiodes WPD1 to WPD6 as a trigger. Furthermore, the apparatus 110K may, for example, start processing with the contact of a human finger or other conductors with the contact conductor 114 of the touch area TC2 as a trigger. Also, the apparatus 110K may, for example, include in the place of the fingerprint sensor 113, an image sensor 113A and the like exemplified in FIGS. 59 and 60. In that case, the apparatus 110K may start processing with the reading of a predetermined pattern by the image sensor 113A or the like as a trigger.

The non-electric mechanism region 110K-2 does not have electronic circuit parts, electric power supply parts and the like, and for example, when a user presses the surface of the apparatus 110K, the approach of the user's finger is detected by the touch panel of the information device 200 by the mechanical and physical deformation of the material forming the apparatus 110K. The non-electric mechanism region 110K-2 has a structure similar to that of a game card or other articles (items) not requiring a power supply as exemplified in the sixteenth embodiment. As the non-electric mechanism region 110K-2, any of the configurations of FIG. 128A, FIG. 128B, FIG. 130, and FIG. 133 to FIG. 136 may be used. Furthermore, as the touch area TC4 of the non-electric mechanical region 110K-2, as shown in FIG. 137, a transparent touch area may be provided.

As described above, according to the apparatus 110K of the twentieth embodiment, the code generation apparatus 1 of the zeroth embodiment and the game card or other articles (items) not requiring the power supply of the sixteenth embodiment may be combined to form one apparatus. In addition, the apparatus 110 and the like of the first embodiment to the ninth embodiment and the game card or other articles (items) not requiring the power supply of the sixteenth embodiment may be combined to form one apparatus.

In this case, the user inputs data to the information device 200 by having the touch panel of the information device 200 detect the position of the element 111 by coming into contact with the touch area TC2 with a finger, a conductor, and the like. Furthermore, the user may have the touch panel of the information device 200 detect the depressed position by touching the touch area TC4 and pressing the touch area TC4.

In this case, when the touch area TC2, as the first operation unit, comes into contact with a part of the human body or a conductor other than the apparatus 110K, the first predetermined information is output through one or more physical quantity control unit driven by the information output unit. Also, when the touch area TC4, as the second operation unit, comes into contact with a part of a human body or a conductor, the touch panel of the information device 200 is made to recognize the contact position.

Therefore, upon recognizing the position of the apparatus 110K, by detecting the position of the element 111, the information device 200 may input light patterns to the photodiodes WPD1 to WPD6 by having the areas LE1 to LE6 on the display emit light. Furthermore, upon recognizing the position of the apparatus 110K, by detecting the position of the element 111, the information device 200 may detect the depressed position of the touch area TC4 and thus recognize which portion of the surface of the apparatus 110K is pressed. The information device 200 may recognize, for example, that areas labeled “Japanese,” “English,” “Listen,” “Read,” “Write,” and the like in FIG. 150 are pressed, and may execute processing in accordance with these labels.

In addition, when the touch area TC4 has a transparent touch area as shown in FIG. 137, the user may select an icon and other graphical user interface (GUI) parts displayed on the touch panel (display) displayed in the transparent area. Therefore, the information device 200 may accept input from the element 111 of the apparatus 110K to the touch panel, and by inputting a light pattern from the display to the photodiodes WPD1 to WPD6, may accept input to the touch panel via the transparent area of the touch area TC4 in addition to exchanging information with the apparatus 110K and executing various processings.

Twenty-First Embodiment

With reference to FIGS. 152 to 175, details of the circuit configuration of the apparatus 110L, control, and information processing according to the twenty-first embodiment are described.

Note that the configuration of the apparatus 110L described in the present embodiment may be applied to the code generation apparatus 1 of the above zeroth embodiment, the apparatuses 110 to 110K (hereinafter simply referred to as the apparatus 110 and the like) of the first embodiment to the ninth embodiment and the twentieth embodiment. In addition, the configuration of the code generation apparatus 1 of the above zeroth embodiment, the configurations of the apparatuses 110 to 110K (hereinafter simply referred to as the apparatus 110 and the like) of the first embodiment to the ninth embodiment and the twentieth embodiment may be applied to the apparatus 110L of the present embodiment. The appearance configuration of the apparatus 110L is similar to that of the apparatus 110K of the twentieth embodiment (see FIGS. 149 and 150). Furthermore, the configuration of the electric circuit of the apparatus 110L is similar to the configuration of the electric mechanism region 110K-1 of the apparatus 110K (FIG. 151). Therefore, FIG. 149 and FIG. 150 are also referred to as they are in the twenty-first embodiment.

FIG. 152 is a diagram exemplifying the details of the circuit configuration of the apparatus 110L. The apparatus 110L, on the information input side, is provided with a plurality of photodiodes WPD1 to WPD6, a plurality of comparators 118 for detecting respective signals from the plurality of photodiodes WPD1 to WPD6, a buffer 182 for holding signals from the plurality of comparators 118. Note that in this specification, when collectively referring to the photodiodes WPD1 to WPDk (where k is an integer), they are simply referred to as a photodiode WPD or photodiodes WPD.

Furthermore, on the information output side, two output buffers 183A and 183B, a selector 184, a drive circuit 180, a SW115, an element 111, and a contact conductor (conductor pad) 114 are provided. Similarly to the apparatus 110 and the like of the above embodiment, when a user brings a finger and the like into contact with the contact conductor 114, the electrostatic capacitance of the human body of the user is electrically connected to the element 111 via SW115 in the ON state. As a result, static electricity moves between the element 111 and the human body, and the touch panel detects a change in electrostatic capacitance between the panel and the element 111 or a change in electric field intensity from the element 111.

The CPU 116 controls, for example, the apparatus 110L in accordance with a computer program and the like that is expanded in an executable manner in the memory 117. The CPU 116 alternately outputs information from the output buffers 183A and 183B, controls the selector 184, and alternately outputs information from the output buffers 183A and 183B to the drive circuit 180. The drive circuit 180 alternately obtains information from the output buffers 183A and 183B, and information is output from the element 111 in the form of a pattern code, by controlling the ON or OFF states of SW115 in accordance with the acquired information. Note that although omitted in FIG. 152, the drive circuit 180 is connected to each SW115 by wirings (conductive paths) independent of each other, and each SW115 may be turned on or off independently. Also, the CPU 116 outputs the next information to the output buffer 183A. The CPU 116 and the drive circuit 180 can be regarded as constituting an example of an information output unit.

Then, the information device 200 emits the code values of the detected pattern codes to the photodiode WPD1 to the photodiode WPD6 together with the synchronization optical signal. The comparators 118 generate digital signals of 0 or 1 from the signals received by the photodiodes WPD1 to WPD6, and stores them in the buffer 182. Then, the exclusive OR (EXOR) circuit 181 compares the information (code value) held in the output buffer 183B with the information (code value) stored in the buffer 182. When the exclusive OR circuit 181 detects a mismatch between the code value of the buffer 182 and the code value of the output buffer 183B, an instruction to retransmit is ordered to selector 184. Then, the selector 184 again outputs the information of the output buffer 183B to the drive circuit 180. On the other hand, when the exclusive OR circuit 181 detects a match between the code value of the buffer 182 and the code value of the output buffer 183B, an instruction to switch buffers is ordered to selector 184. Then, the selector 184 outputs the information of the output buffer 183A to the drive circuit 180. In this manner, an error check is executed between the code value of the pattern code output from the element 111 and the code value included in the optical code for synchronization.

However, in FIG. 152, although the apparatus 110L includes two output buffers 183A and 183B, the number of output buffers is not restricted to two. For example, as is described in the twenty-first embodiment, the apparatus 110K outputs pattern codes as a pattern code string by combining a reference pattern as a delimiter and a plurality of information patterns. This pattern code string is referred to as a capacitance code or an information code. In this case, the same number of output buffers 183A and the like as that of information patterns from the reference pattern to the next reference pattern may be provided. By providing the same number of output buffers as that in the pattern code string, the timing for executing the error check of the output pattern code may be delayed, and for example, an error check may be executed after outputting the pattern code string.

Also as in FIG. 152, hardware circuits such as the selector 184 for switching the output buffers 183A and 183B, the drive circuit 180, the exclusive OR circuit 181 and the like for executing error checks, together with the CPU 116 perform pattern code output processing, error checking, retransmission processing, and the like. However, the CPU 116 may execute a part or all of these processings. On the other hand, a part of the processings of the CPU 116 may be executed by a hardware circuit.

Although omitted in FIG. 152, similarly to the twentieth embodiment (FIG. 151), the CPU 116, the comparator 118, the photodiodes WPD1 to WPD6, the buffer 182, the output buffers 183A and 183B, the drive circuit 180, SW115, and the like are supplied with power from the photoelectric conversion element arrays 112A, 112B, and the like exemplified in FIG. 151.

Furthermore, in FIG. 152, the photodiodes WPD1 to WPD6 and the plurality of elements 111 are arranged apart from each other. However, although FIG. 152 clearly shows the relationship of connections on the electric circuit, and the physical relationship of positions is not restricted. Therefore, the photodiodes WPD1 to WPD6 and the plurality of elements 111 may be arranged adjacent to each other or may be arranged separately as shown in FIGS. 149 and 151. In addition, the number of the photodiodes WPD1 to WPD6 and the number of the plurality of elements 111 may be the same or may be different. As exemplified in FIG. 152, the apparatus 110L may have an interface (I/F) circuit 180A, and a light emitting unit, an audio unit, a vibration unit, a wireless communicating unit, and the like connected to the I/F circuit 180A. Here, the light emitting unit is, for example, a light emitting diode (LED) and the like. The audio unit includes a sound (sound, voice) generation unit including a digital/analog conversion unit, a speaker, and the like. In addition, the vibration unit includes an oscillator, a vibrator that induces mechanical vibrations, and the like. Furthermore, the wireless communication unit is a communication interface complying with the wireless local area network (LAN), Bluetooth standards, and the like.

Also, the apparatus 110L (CPU 116) outputs a data block (electrostatic capacitance codes, information codes) of pattern codes that is the first piece of information with pattern codes and inputs a data block of optical codes (information codes) that is the second piece of information, and executes various kinds of information processings. Then, according to the result of the information processing, the apparatus 110L may convey the third piece of information to the exterior by light emission from the light emitting unit, by a sound from the audio unit, by a vibration from the vibration unit, and wireless communication from the wireless communication unit via the I/F circuit 180A. As described above, at least one among the light emitting unit, the audio unit, the vibration unit, and the wireless communication unit, and the I/F circuit 180A and the CPU 116 can be regarded as constituting an example of the information output unit. However, in the present embodiment including the twenty-first embodiment, the light emitting unit, the audio unit, the vibration unit, the wireless communication unit, and the I/F circuit 180A are not indispensable and may be omitted.

FIG. 153 shows an arrangement example of five photodiodes WPD1 to WPD5 and five elements 111-1 to 111-5 in the twenty-first embodiment. Note that in the following embodiments, when referring to the elements 111-1 and the like individually, they are described as the elements 111-1 and the like, and when referred to collectively, they are simply referred to as the elements 111. When collectively referring to the photodiodes WPD1 to WPD5, they are simply referred to as photodiodes WPD. However, the number of a plurality of photodiodes WPD1 and the like, and the number of a plurality of elements 111 is not restricted to five. For example, the number of photodiodes WPD1 and the like, and the number of a plurality of elements 111 need not be equal. Furthermore, an arrangement example of a plurality of photodiodes WPD1 and the like, and a plurality of elements 111 is not restricted to that in FIG. 152. For example, the arrangement of the photodiodes WPD1 to WPD6 and a plurality of elements 111 may be as the configuration of the eighth embodiment, the ninth embodiment, or the twenty-first embodiment.

In the example of FIG. 153, five elements 111 and five photodiodes WPD1 to WPD5 are arranged adjacent to each other. Also, in the figure, each of the elements 111 is labeled with a numeral, and the five elements 111 are exemplified so that they can be distinguished on the drawing.

As already described in the eighth embodiment, the information device 200 communicates with apparatus 110L by detecting a change in a physical quantity from the element 111 on the touch panel, recognizing the arrangement of the element 111, and having the display emit light at positions corresponding to the photodiode WPD1 to WPD5. Note that, through this specification, turning on SW115 connected to the element 111, and bringing the element 111 and the contact conductor 114 into a conductive state is referred to as "turning the element 111 on." Furthermore, turning off SW115 connected to the element 111, and bringing the element 111 and the contact conductor 114 into a cut-off state is referred to as "turning the element 111 OFF".

FIG. 154 exemplifies a communication procedure between the apparatus 110L and the information device 200. In the figure, pattern codes are exemplified in the first row and the third row from the top, and an open circle indicate the OFF state of a SW115, and a filled circle indicate the ON state of a SW115. In the figure, a portion surrounded by a dotted line is a pattern code corresponding to one output by a change in a physical quantity output corresponding to the arrangement of FIG. 153. Also, in the second and fourth rows from the top of the figure, optical codes are exemplified. Like the pattern codes, a portion surrounded by a dotted line is an optical code corresponding to one light emission emitted from the photodiodes WPD1 to WPD5. As in FIG.

152, for example, a filled rectangle exemplifies a state where light is received for the photodiodes WPD1 to WPD5, and an open rectangle exemplifies a state where light is not received for the photodiodes WPD1 to WPD5.

The apparatus 110L changes a physical quantity from the element 111 to the information device 200 via the touch panel, and has the information device 200 recognize the arrangement on the touch panel of the elements 111. For example, by having the user hold the apparatus 110L over the touch panel, a reference pattern (turning on SW115 connected to all elements 111) for recognizing the position of the element 111 is output. Here, the numbers 0 to 10 indicated under the pattern codes are indexes of the pattern codes. An index exemplifies the position in the order of the output of a sequence of pattern codes spanning from the reference pattern to the pattern code immediately before the next reference pattern. That is, the apparatus 110L outputs the reference pattern as the first pattern code. Then, the touch panel detects a change in a physical quantity and recognizes the position of the conductor.

Then, after recognizing the arrangement of the elements 111, the information device 200 emits a synchronization optical code and controls the output timing for the next pattern code for output from the apparatus 110L. The information device 200 may increase recognition probability of the pattern code via the touch panel by timing control using a synchronization optical code. Note that as in FIG. 154, a synchronization optical code includes a pattern code index (numbers below) from the element 111. The index is exemplified by numbers from 0 to 10 in FIG. 154. By adding an index to a synchronization optical code, for example, when an error occurs in the pattern code with the synchronization optical code assigned with the index, the apparatus 110L may designate the index to retransmit the pattern code.

In the example of the diagram, after recognizing the reference pattern, the information device 200 outputs the synchronization optical code of index 2. Upon receiving the synchronization optical code of index 2, the apparatus 110L outputs a parity check pattern. Note that the parity check pattern may be output at the end of the pattern code string. In addition, the parity check is not indispensable for pattern code output based on a change in a physical quantity from the apparatus 110L. Error checking instead of the parity check will be described in detail with reference to FIGS. 155 and 164 through FIG. 170.

After detecting the parity check pattern, the information device 200 outputs the synchronization optical codes of indexes 3 to 10. Since synchronization optical codes of indexes 3 to 10 are combined to present information, the combination is referred to as an information code. However, the number of optical codes included in the information code is not restricted to 8. Upon receiving the synchronization optical codes of indexes 3 to 10, the apparatus 110L outputs respective pattern codes of 8 patterns at a predetermined timing with respect to the input of the optical synchronization codes of index 3 to index 10.

Thereafter, the information device 200 emits the synchronization optical code 1 for output control of a reference pattern indicating an arrangement pattern for delimiters and conductors. The synchronization optical code 1 is a code including index 1. Upon receiving the synchronization optical code 1, the apparatus 110 renews the output of the reference pattern. Furthermore, when the information device 200 outputs the synchronization optical codes of indexes 2 to 10, the apparatus 110L outputs a parity check code and a pattern code string for transmitting information in synchronization with the reception of the synchronization optical codes. The pattern code string corresponding to the synchronization optical code string of indexes 3 to 10 is also referred to as an information code. However, for distinguishing from the optical code, the pattern code string may be referred to as a electrostatic capacitance code.

In this manner, after the information device 200 recognizes the reference pattern through the touch panel, by emitting a synchronization optical code and controlling the output of the next conductor pattern, the touch panel may reliably recognize the conductor pattern. In this manner, when an index (decimal number below) indicating the position in an order of pattern codes from the apparatus 110 is included in a synchronization optical code, with respect to the pattern code which cannot be recognized by the information device 200 side, the synchronization optical code 1 including the same index may be re-emitted and the pattern code output may be renewed. Furthermore, only the pattern code corresponding to the designated index may be output on the information device 200 side. However, an index need not be included in a synchronization optical code. That is, simply as a synchronization optical signal, the information device 200 may emit one kind of pattern, for example, an optical code for having all of the photodiodes WPD1 to WPD6 receive light. When the optical code for having all of the photodiodes WPD1 to WPD6 receive light is used as a synchronization optical code, it is not a concern even if recognition of the element 111 is incomplete. This is because the information device 200 has only to emit the whole area of the display which includes the apparatus 110. In that case, pattern codes are sequentially output at each time interval. However, if no index is provided, it is not possible to recognize which pattern code is being output, and when all SW115 are ON in the reference pattern (SW115 connected to all of the elements 111 is ON) and in other patterns, the reference pattern cannot be recognized. Therefore, by restricting the pattern in which all of the elements 111 are ON to only the reference pattern, the information device 200 can recognize the reference pattern. Furthermore, the apparatus 110L cannot distinguish and recognize a state before the output of the first reference pattern, an all-OFF parity check pattern, a case where the touch panel cannot recognize the conductor pattern (error and the like), a pattern where all of the elements 111 are OFF to eliminate the touch move phenomenon (described later), and the like from an information pattern with all of the elements 111 turned off. Therefore, by eliminating the pattern in which all of the elements 111 are turned off from the pattern codes, the information device 200 may recognize the information pattern. As a result, as in the twenty-first embodiment, when the eight conductor patterns 3 to 10 are information patterns, normally, the amount of 5 bits×8=40 bits (about 1100 trillion codes) of information can be output, but since the describable amount of information is 5 bits=64, by excluding information patterns where all are ON and all are OFF, the amount is the eighth power of (64−2)=about 218 trillion code. By removing the all ON and the all OFF information patterns, the amount of information becomes about ⅕ as compared with the case where they are not excluded. On the other hand, if 1 bit is used for a plug to distinguish between the reference pattern and the information pattern, the information that can be described by the pattern code is 4 bits×8=32 bits (about 4.3 billion codes), and the amount of information decreases significantly. Therefore, the method of the present embodiment is extremely rational for a method of distinguishing a specific bit reference pattern from an information pattern, and it is needless to say that the method may also be used for pattern codes described in the other embodiments.

FIG. 155 is a timing chart exemplifying the relationship between synchronization optical codes output from the display by the information device 200 and pattern codes based on a change in a physical quantity output from the apparatus 110L that receives synchronization optical codes. First, upon starting communication, the apparatus 110L outputs a reference pattern based on the change in the physical quantity. For the information device 200, since the first pattern code recognized by the touch panel is the reference pattern, the index of the reference pattern is 1. That is, the information device 200 initializes the index to 1 by recognizing the reference pattern.

After the information device 200 recognizes the reference pattern output from the apparatus 110L using the touch panel, a synchronization optical code is emitted from the display as a synchronization signal. In the figure, serial numbers (indexes 2 to 10 and 1) indicated by the synchronization optical codes are displayed. Upon recognizing a synchronization optical code, the apparatus 110L immediately outputs a pattern code indicating information to be output at the timing of the index.

FIG. 156 shows an example of the error checking method in the twenty-first embodiment. In FIG. 154, as synchronization optical codes, optical codes indicated with indexes of 1 to 10, or simply the same optical codes are exemplified. However, for synchronization optical code emission, the information device 200 may directly transmit the value (also referred to as a code value) indicated by the pattern code based on a change in a physical quantity detected immediately before emission of a synchronization optical code back to the apparatus 110L. By including the code value obtained from the pattern code based on the change in the physical quantity detected by the information device 200 in the next synchronization optical code and sending it back to the apparatus 110, the apparatus 110 can execute an error check each time. In this case, since the pattern code output from the apparatus 110L to the information device 200 is directly sent back from the information device 200 to the apparatus 110, the apparatus 110 can check all of the bits of the output results based on changes in physical quantities.

Note that since the processing speed in the information device 200 is different from the processing speed in the apparatus 110L, the apparatus 110L does not need to notify the information device 200 of an error result each time an optical code is sent back from the information device 200, and may notify at arbitrary timings.

As in FIG. 156, the reference pattern is output at index 1 from the state in which all of the SW115 are OFF at index 0. And, with respect to the synchronization optical codes of indexes 1 to 9, the pattern code based on the changes in physical quantities of indexes 2 to 10 is output. For example, the synchronization optical code of index 2 is not only the synchronization optical code of index 3 but also a code (hereinafter referred to as an error check optical code) for checking error in the pattern code of index 2 output just before.

After recognizing an optical code for error check as a synchronization optical code, the apparatus 110L outputs the next pattern code. If not even one of the photodiodes WPD1 to WPD5 receives light, the apparatus 110L cannot receive a synchronization signal. Therefore, as in FIG. 156, the central photodiode WPD5 is used for synchronization. That is, the information device 200 has the display emit light for the central photodiode WPD5 for all synchronization optical code emissions.

With such a communication procedure, in the figure, error correction is realized as follows. In index 5 of the figure, for the pattern code CP1 based on changes in a physical quantity, the apparatus 110L outputs with the elements 111-1, 111-3, and 111-4 ON, and the elements 111-2, 111-5 OFF (for the definition of the element 111, see the label in FIG. 153). On the other hand, immediately after the output of the pattern code CP1 by the apparatus 110L at index 5, the synchronization optical code CP2 from the information device 200 has the photodiodes WPD3, WPD4, and WPD5 ON and the photodiodes WPD1 and WPD2 OFF. Among them, the photodiode WPD5 is a bit which is always output ON for synchronization as described above. Therefore, in the synchronization optical code CP2 from the information device 200 at index 5 the value of the photodiode WPD1 is different from that of the pattern code CP1 transmitted from the apparatus 110L to the information device 200 immediately before.

The apparatus 110L which receives the synchronization optical code CP2 of index 5 compares the code value of the optical code CP2 with the code value of the pattern code CP1 transmitted at index 5 and held in its own output buffer 183A or 183B, and thereby detects errors in the output value of the element 111-1. Thus, the apparatus 110L outputs the same pattern code CP3 as the pattern code already output at index 5 again. In the figure, the index of the pattern code CP3 output again is exemplified as 5-2. However, when renewing output, the apparatus 110L turns on the central element 111-5. Then, since the central element 111-5 is ON, the information device 200 recognizes that it is a renewed output of the pattern code of the last output (the pattern code of index 5). Then, at index 5A, a synchronization optical code corresponding to the pattern code CP3 received immediately before is emitted. Thereafter, the apparatus 110L and the information device 200 return to normal communication. In this manner, by having the information device 200 send the optical code corresponding to the pattern code detected immediately before back to the apparatus 110L, error checking is realized.

FIG. 157 shows another example in which the pattern code output is renewed. In the figure, at index 3, the pattern code CP4 is output from the apparatus 110L to the information device 200. In the pattern code CP4, the elements 111-1 and 111-3 are ON. On the other hand, for the optical code CP5 for synchronization sent back from the information device 200 to the apparatus 110L at index 3, excluding the photodiode WPD5 which is a synchronization bit, only the photodiode WPD3 is ON. Therefore, the apparatus 110L recognizes the bit of the element 111-1 among the pattern codes CP4 to be an error. And, at index 3A, the apparatus 110L renews the output of the pattern code CP6 which is the same as the pattern code CP4. Thereafter, communication between the apparatus 110L and the information device 200 returns to the normal state.

FIG. 158 is a timing chart exemplifying the relationship between synchronization optical codes and pattern codes in FIGS. 156 and 157. The index is exemplified with labeling on the pattern codes and the synchronization optical codes. As described with reference to FIGS. 156 and 157, an error occurs when the information device 200 detects the pattern code output from the apparatus 110L at index 5 of the upper row (the first row and the second row) of the figure. And, the apparatus 110L detects an error by a synchronization optical code sent back from the information device 200 to the apparatus 110L, and the pattern code already output at index 5A last time (the element 111-5 at the center is ON and the element output is the same for the others) is output again. Likewise, even at index 3 of the lower row (the third row and the fourth row) of the figure, the apparatus 110L detects an error by a synchronization optical code sent back from the information device 200 to the apparatus 110L, and renews the output of the pattern code already output at index 3A last time.

[Modified Example of Pattern Code]

FIG. 159 is a diagram illustrating another configuration of the back surface where the apparatus 110L contacts the touch panel. As shown in the figure, the apparatus ll0L has elements 111-1 to 111-5. Note that the apparatus 110L may include a switch SWL. The switch SWL is a switch that is turned on when the apparatus 110L is placed on the surface of a touch panel or the like. Further, in the apparatus 110L, an information reading apparatus may be placed at the position of the switch SWL. The information reading apparatus is, for example, the image sensor 160 of Embodiment 9, the image sensor 160 D exemplified in Embodiments 10 to 13, and the like. This information reading apparatus has a function of reading a two-dimensional code such as QR code, dot code, color code, or a fingerprint and the like. In the case of reading a two-dimensional code, if it is a printed matter, the code is imaged darkly because there is no reflected light when no light is irradiated from the apparatus 110L, and it is imaged brightly by reflected light when light is irradiated. On the other hand, in the case of a taking image of display, when light is not irradiated from the device, the image is brightly done except when the display does not emit light. When the device irradiates light, there is no change in the captured image because the irradiation light is not reflected by the display. From the above, it is possible to recognize whether it is a printed matter or a display from the result with or without light irradiation. On the other hand, since the two-dimensional code displayed on the display cannot be displayed at a high resolution such as printing, it is desirable to display the two-dimensional code with an enlarged rather than printing and switch to read by the information reading apparatus. For example, in the case where the two-dimensional code is a dot code, it is available to read the code with the dot size 0.042 mm and the reference dot interval 0.508 mm in case of printing, but it is difficult to read the code unless both of them are doubled or more to display accurately in case of display. Therefore, in the case of taking image of a printed matter and in the case of taking an image of a display, it is possible to properly read the two-dimensional code with switching to the corresponding software based on judging either one by the information reading apparatus, and switch to the corresponding software and properly read the two-dimensional code.

By the way, the photodiode WPD1 and the like are omitted In FIG. 159. When the optical code is not received, the photodiode may be eliminated. In this example, elements 111-1 to 111-5 are illustrated. Also, in this example, the elements 111-1 to 111-5 correspond to bits 1 to 5 of the pattern code to be outputted.

FIG. 160 and FIG. 161 are diagrams illustrating pattern codes output from the elements 111-1 to 111-5 of FIG. 159. In the figures, ON of the element 111 is black, and OFF is white. In the figures, the index 1 to 10 and the bit values indicated by the pattern codes are exemplified below the pattern code. The bit value depends on the definition of the bit in FIG. 159. In the figures, the pattern of the index 1 in which all the elements 111 are ON is a reference pattern indicating that the apparatus 110L recognizes the arrangement of the elements 111 for the information device 200, and also shows a boundary of the pattern code string. It is necessary to exclude the reference pattern from the pattern code of the pattern indicating the information (referred to as the information pattern). So, in the information pattern illustrated in FIG. 159, the element 111-1 (corresponding to bit 5) is always OFF. Also, the pattern code of index 2 is used for the parity check pattern. Therefore, the apparatus 110L can output the information amount of 4 bits×8=32 bits (about 4.3 billion codes) with the pattern codes of the indexes 3 to 10. Here, the information pattern of the index 6 is that all the elements 111 are OFF (hereinafter referred to as "all OFF patterns"), and the pattern codes on both sides are all OFF. In this case, it is difficult to recognize the information pattern. Thereat, as explained in the case of not including an index in the synchronization optical code of FIG. 154, it is possible to recognize the reference pattern by limiting the pattern to be all ON to the reference pattern. Furthermore, it becomes possible to recognize the information pattern because of always turning on any element by omitting the information pattern which becomes all OFF from the pattern code. As the result, in the case where the eight information patterns of indexes 3 to 10 are the pattern code of one block as in the present embodiment, since 5 bits=64, excluding the patterns of all ON and all OFF, (64−2) to the eighth power=about 218 trillion codes, and the amount of information increases drastically.

Note that the apparatus 110L outputs information corresponding to various applications as a pattern code. As an example, when the apparatus 110L has an information reading apparatus such as the CPU 116 and the like, the information read by the information reading apparatus, for example, the dot code (32 bits) may be output as it is or a part of the output information may be include the apparatus 110L identification information (ID).

The feature of FIG. 160 and FIG. 161 can be exemplified that pattern codes in which all the elements 111 are OFF are inserted between the reference pattern indicated by the indexes 1 to 10, the parity check pattern, and the information pattern. The all OFF pattern is outputted to suppress false detection of touch move when changing from the output state of the first pattern code to the output state of the second pattern code. Here, the touch move is a working in which, when a user performs a touch operation on the touch panel, the user releases the finger from the position where the user is currently touching the finger or the like and moves the position to a position in the vicinity within a short time When touched, the touch panel detects the operation by assuming that the finger has moved while touching it. When the touch panel detects the touch operation, the coordinate data between the two touch points is interpolated and outputted. Touch move is detected, for example, by a device such as a smartphone, in particular by quickly touching a nearby position.

In this way, when pattern codes which all the elements 111 are OFF are inserted before the reference pattern of the index 1, the parity check pattern of the index 2 and the information pattern of the indices 3 to 10, all the elements 111 OFF pattern code can be used as a synchronization pattern. The information device 200 may synthesize the physical quantity output corresponding to each element 111 by NOR logic. Then, when all the outputs of the elements 111-1 to 111-5 in FIG. 159 are OFF, the information device detects the logic 1 and is possible to fetch the next information pattern in synchronization with the input of all the bits OFF.

Also, in this process, it is possible to use the pattern code of all bits OFF as an error pattern code. For example, it is assumed that a certain pattern code is input to the information device 200 at the input of the first pattern code, and then the code value of the pattern code is returned from the information device 200 with the same optical code. And, it is assumed that the code value of the previously transmitted pattern code and the code value returned by the optical code do not match. Then, in order to inform the information device 200 of the error, the apparatus 110L (1) at first, outputs the synchronous pattern code (all bits OFF), (2) then, outputs the error pattern code (all bits OFF) Then, (3) next, it is sufficient to output the pattern in which the error has occurred again. By outputting the pattern code in this manner, the information device 200 (1) outputs the synchronization pattern, (2) next, detects an error error pattern code (all bits OFF), and further obtain the pattern code again.

However, in this process, when apparatus 110L outputs the pattern code, the code value corresponding to the pattern code from the information device 200 is returned as the optical code before the next synchronization pattern output, and to the output of the pattern code from the apparatus 110L before the next synchronization pattern output, if it can be processed without delay. If the pattern cannot be output again before the next synchronization pattern is generated, the apparatus 110L outputs (2) an error-error pattern code (all bits OFF) next to (1) instead of the above, then, (3) it outputs a pattern code of an index indicating which pattern code an error occurred, and (4) outputs the pattern in which the error has occurred again. By doing so, the information device 200 detects (2) the error-error pattern code (all bits OFF) next to the synchronization pattern, (3) acquires the index where the error occurred, and (4) the pattern code can be obtained again.

FIG. 162 shows an example in which the touch panel erroneously detects touch move at the time of outputting the pattern code from the element 111 by the element 110L. In the figure, before the output change, the elements 111-1 and 111-2 are ON. Next, it is assumed that the element 111-1 is turned off in a short time within a predetermined time, and the element 111-4 is turned on. There is no change in the output of the element 111-2. Let the position of the element 111-1 be the starting point PS (X0, Y0) and the position of the element 111-4 be the end point PE (XE, YE). In this case, the touch panel outputs coordinate values of multiple points PS (X0, Y0), P1 (X1, Y1), P2 (X2, Y2), P2 (X2, Y2) on a straight line from the start point PS (X0, Y0) to the end point PE . . . , PE (XE, YE) to the application program. Such touch move detection is considered to be executed by a device driver and the like of the touch panel. Depending on the touch panel, there is a case to output instead of outputting coordinates of the midstream point, the element 111-1 may be output as a touch move that has been moved to the element 111-4 while touching, as the start of touch.

FIG. 163 exemplifies processing for reducing erroneous detection of touch move at the time of outputting the pattern code from the element 110L. That is, when outputting the second information pattern after outputting the first information pattern, the apparatus 110L once outputs all OFF pattern in which all the elements 111 are OFF. Then, the second information pattern is output next. By setting the information pattern to 70 ms and the synchronization pattern to 100 ms in the trial smartphone, erroneously detection of touch move can be prevented. It also varies depending on the model of the smartphone. Here, occurrence of the phenomenon of touch move is reduced when the interval between the adjacent elements 111 is increased (for example, around 15 mm). In addition, by developing software that supports touch move processing, it is possible to recognize the original element position. The limitation by the design value or setting value of the model of the information device 200 as described above can be changed by setting for each model. However, for example, in each model, such restriction can be avoided by changing the device driver executed by the operating system (OS) to one that is not limited to the design value or set value of the model.

Returning to FIG. 160 and FIG. 161, a processing example will be described. In the index 1 of FIG. 160, a reference pattern is output in order to define the boundary and direction of the data block. Next, all OFF pattern is outputted, and at the index 2, a parity check pattern is output. Further, all OFF pattern is outputted, and in the index 3, the information pattern corresponding to the bit string 1011 is outputted. Thereafter, similar processing is repeated up to the index 10.

The parity check of Embodiment 21 will be described by using the FIG. 161. In the figure, in the parity check pattern of the index 2, the element 111-1 is OFF and the elements 111-2 to 111-4 are ON. On the other hand, in indexes 3 to 10, the element 111-1 is 1 at indexes 3, 4, 5, 8, 9, and 10. Therefore, the parity which obtains by adding these bits 1 is 1+1+1+0+0+1+1+1=1. Therefore, when odd parity is adopted, the element 111-1 is OFF in the parity check pattern.

Similarly, for element 111-2, the added value of the bit at index 3 to 10 is 1+1+0+1+0+1+1+1+0=0. In the case of odd parity, the element 111-1 is ON in the parity check pattern. Moreover, for the element 111-3, the added value of the bits at the indices 3 to 10 is 0+1+1+0+0+1+1+1=1. In the case of odd parity, the element 111-3 is OFF in the parity check pattern. Furthermore, for the element 111-4, the added value of the bits at the indices 3 to 10 is 1+0+0+0+1+1+0+0=1. In the case of odd parity, the element 111-4 is OFF in the parity check pattern.

[Communication Processing Flow Between the Apparatus 110L and the Information Device 200]

FIG. 164A illustrates a pattern code output process (device-side synchronous communication) executed by the CPU 116 of the apparatus 110L. However, instead of executing the processing of FIG. 164 A and the subsequent steps by the CPU 116, the hardware circuit may execute the processing. Therefore, in the following description, it is assumed that each processing flow is executed by the apparatus 110L.

In this process, at first, the apparatus 110L outputs a reference pattern from the element 111 (S60). Next, the apparatus 110L waits for receiving the synchronization optical code from the information device 200. When receiving the synchronization optical code, the apparatus 110L outputs a parity check pattern from the element 111 (S61). Then, the apparatus 110L executes synchronous output of the information pattern (S63).

Next, the apparatus 110L waits for light reception response from the information device. Then, the apparatus 110L receives the response from the information device 200. Then, the apparatus 110L determines whether or not a parity error is indicated in the response from the information device 200 (S67). Note that the process of S67 may be a process of determining whether or not the response is a normal response. If it is determined in S67 that a parity error is indicated, the apparatus 110L returns the process to S60 and executes the above process again. If the parity error of S67 occurs more than a predetermined number of times during the transmission of the same pattern code string, the apparatus 110L may determine that it is a failure and terminate the process.

If it is determined in S67 that there is no parity error, the apparatus 110L determines whether information to be transmitted next remains. If the next information remains, the apparatus 110L returns the process to S60 and transmits the next information.

In the process of FIG. 164A, the apparatus 110L outputs the parity check pattern at the timing of the index 2 after outputting the reference pattern (after S60), but after outputting the information pattern (after the index 10), The parity check pattern may be output.

FIG. 165 illustrates details of the information pattern synchronization output process (S63 in FIG. 164A). In this example, the apparatus 110L waits for light reception of the optical synchronization pattern (S631). Then, the apparatus 110L determines whether or not there is light reception of the synchronization light pattern (S632). Upon receiving the optical synchronization pattern, the apparatus 110L outputs the next pattern code at the light receiving timing (S635). Then, the apparatus 110L determines whether or not output corresponding to the total number of pattern codes has been performed (S637). For example, in the examples of FIG. 156, FIG. 157, FIG. 160, FIG. 161 and the like described above, the total number of pattern is 8 from index 3 to index 10. Then, the apparatus 110L repeats the processing from S631 to S637 until the output corresponding to the total number of pattern codes is completed. Since erroneous cognition tends to occur at the moment when the device is placed on the touch panel or when the device is moved, it is desirable to repeat the entire pattern code a predetermined number of times. In such a case, it is not necessary to start an error check of the pattern code from acquisition of the reference pattern, but a necessary number of pattern codes including the latest reference pattern obtained by the touch panel may be stored and the parity check may be performed. If the parity check error occurs, the stored initial information pattern is omitted, an error check is performed with the newly obtained necessary number of information patterns, and this process is repeated until no error occurs. As a result of the error check, after obtaining the error-free electrostatic capacity code, the output of the pattern code may be ended by the optical code.

FIG. 166 shows another process example of the information pattern synchronization output process (S63 in FIG. 164A). In the process of the figure, an error check is executed after one times of pattern code output. Also in this process, the apparatus 110L waits for light reception of the optical synchronization pattern (S631). The process S631 in FIG. 166 is the same process as in FIG. 165, but the same code value as the pattern code outputted last time is included in the optical synchronization pattern to be received. Then, the apparatus 110L determines whether or not there is light reception of the optical synchronization pattern (S632). When the apparatus 110L receives the synchronization light pattern, the apparatus 110L collates the code value of the previous output pattern code and of the synchronization light pattern. Then, it is determined whether or not the two code values coincide, that is, the presence or absence of an error (S633). Incidentally, the previous output pattern code is held, for example, in the output buffer 183A or 183B exemplified in FIG. 152.

If there is no error in the determination in S633, the apparatus 110L outputs the next pattern code at the light receiving timing according to the determination in S632 (S635). On the other hand, if there is an error in the determination in S633, the apparatus 110L outputs the previous output pattern code again (S635). Then, the apparatus 110L repeats the process from S631 to S637 until the output of the all number of pattern codes is completed.

FIG. 165 and FIG. 166 exemplify processes in which the apparatus ll0L outputs the pattern code in synchronization with the synchronization optical code emitted from the information device 200. In FIG. 167, a process of the apparatus 110L to output an information pattern following the synchronization pattern code is exemplified. In this case, in the process of S62 of the device side synchronous communication process in FIG. 164A, the apparatus 110L outputs the pattern code for synchronization at first, and then outputs the parity check pattern at a predetermined timing. Subsequently, the process moves to FIG. 167. In this process, the apparatus 110L outputs a synchronization pattern code at first (S63F). Of the patterns that can be defined by the pattern code, a reference pattern and a pattern that is not used as an information pattern may be used for the synchronization pattern code. For example, in the example of FIG. 160, since elements 111-1 to 111-4 are used as information patterns, a total of 16 patterns can be used. Next, the apparatus 110L outputs an information pattern (S63G). Next, the apparatus 110L receives the optical code (S63H). Then, the apparatus 110L collates the optical code with the previous output pattern (S633). Since the processing in S633 and subsequent steps is similar to that in FIG. 166, thereof the description will be omitted.

In FIG. 166 and FIG. 167, after the apparatus 110L outputs the pattern code, the code value of the pattern code detected by the information device 200 is coded into the synchronous optical code and sent back to the apparatus 110L. In other words, against for the output of pattern code for one time, an error check was executed by the next synchronization optical code. However, as already described with reference to FIG. 152, it is possible to delay the timing of error checking by preparing output buffers 183A and the like for three or more, for example, the number of pattern codes from the reference pattern to the next reference pattern.

FIG. 168 is a process example in which error checking is executed after outputting the pattern code string from the reference pattern to the next reference pattern. In this process, the apparatus 110L waits for light reception of the optical synchronization pattern (S631). The process of S631 of FIG. 168 is the same process as FIG. 166. Then, the apparatus 110L determines whether or not that the light reception of the optical synchronization pattern has done (S632). When the apparatus 110L receives the synchronization light pattern, the apparatus 110L stores the code value of the reply pattern included in the synchronization light pattern in the buffer 183 and the like (see FIG. 152) and outputs the next pattern code (S635A). Then, the apparatus 110L determines whether or not the pattern code of the total number of pattern codes included in the pattern code string up to the next reference pattern has been output (S637).

When the pattern code of the total number of pattern codes is output in the determination of S637, the apparatus 110L compares the reply code value from the information device 200 stored in the process of S635 with the transmitted pattern code (S638). The process of S638 is executed for all transmission pattern codes. Then, the apparatus 110L determines whether there is an error, that is, whether there is a mismatch between the return code value and the transmitted pattern code (S639).

If there is an error in the determination in S639, the apparatus 110L outputs, for example, the index of the pattern code in which the error is detected, and further outputs the pattern code in which the error is detected (S63A). Here, the index is a number (for example, index 3 to 10 in FIG. 156) indicating the ordinal position of the information pattern exemplified in FIG. 156, FIG. 157, FIG. 160.

Therefore, in this process, among a combination of ON and OFF of the element 111 that can be defined by the pattern code, a part of the pattern code is used as an information pattern, and the remaining pattern code is used as an index. For example, in the case of FIG. 160, 16 patterns can be used depending on a combination of ON and OFF of the four elements 111 from the element 111-1 to the element 111-4.

As already described in the explanation of FIG. 159, the apparatus 110L can use a pattern in which all of the elements 111 are ON as a reference pattern and a pattern code in which all of the elements 111 are OFF as an error pattern code. If the output of the pattern code again in which the error has occurred is not in time for the next synchronization timing, the apparatus 110L may firstly outputs the error pattern code after receiving the optical synchronization pattern, and then output the pattern code indicated the index. That is, as an example, in the process of S63A, a pair of an error pattern code, a pattern indicating an index, and an information pattern (output again) in which an error is detected are output. In the case where an error bit is provided in a pattern code, if the output of the pattern code in which an error has occurred can be made in time after receiving the optical synchronization pattern, the apparatus 110L may output an error bit and a pattern code to be output again without using the index. The process of S63A is executed for all the pattern codes which errors are detected in the process of S638.

Further, the apparatus 110L performs the same process as that of S638 for the pattern code outputted in S63A, that is, the process of receiving the reply pattern and comparing the code value of the reply pattern with the transmitted pattern code (S63B). Then, when an error is detected in the process of S63B, the apparatus 110L returns the process to 63A and repeats the output again. However, if the number of errors exceeds the allowable limit, the apparatus 110L may terminate the process assuming that an abnormality has occurred.

On the other hand, if there is no error in the determination of S63C, the apparatus 110L clears the pattern code output buffer 183A and the like (S63D) and ends the process. Even when there is no error in the determination of S639, the apparatus 110L clears the pattern code output buffer 183A and the like (S63D), and ends the process.

FIG. 169 indicates a process flow chart which synchronization is established by the synchronization pattern code outputted from the apparatus 110L instead of being synchronized by the synchronization optical code, and also the error check is executed after a delay of pattern code output for one time as shown in FIG. 168. In FIG. 169, the process in S63F and S63G is the same as in FIG. 167. Next, the apparatus 110L receives the replied optical code and stores it in the buffer 182 or the like (S63I). The process after S637 of FIG. 169 is the same as that of FIG. 168. As described above, also in the case where the apparatus 110L outputs the synchronization pattern code, as same as FIG. 168, an error check can be executed after temporarily outputting the pattern code string from the reference pattern to the next reference pattern.

In the process of FIG. 168, the apparatus 110L executes error check after outputting the pattern code string from the reference pattern to the next reference pattern, and if there is an error, the pattern code detected error is output again. However, the process of the apparatus 110L is not limited to the examples of FIG. 168 and FIG. 169. In the case where the apparatus 110L has a sufficient buffer 183, error check may execute at any timing during the light reception process period of the pattern code string (for example, the pattern code of the index 3 to the index 10 in FIG. 154) included in the range from the reference pattern to the next reference pattern.

FIG. 164B exemplifies a process in which the apparatus 110L outputs the synchronization pattern code instead of outputting the synchronization optical code by the information device 200. Also in this element, similarly to FIG. 164A, the apparatus 110L firstly outputs a reference pattern from the element 111 (S60). Then, the apparatus 110L waits for light receipt as a response from the information device 200. The apparatus 110L receives light as a response from the information device 200. When the information device 200 recognizes the reference pattern (YES in S6A), the apparatus 110L outputs a synchronization pattern from the element 111 (S6B). Then, the optical code from the information device 200 is input in synchronization with the synchronization pattern (S6C).

Here, in the processes of S6B, S6C, the apparatus 110L can use various forms as a synchronization pattern. For example, the apparatus 110L may input a fixed pattern code not including an index as a synchronization pattern. In that case, the information device 200 may input the optical code in synchronization with the input of the fixed pattern code.

Further, the apparatus 110L may input an index as a synchronization pattern. In that case, the information device 200 may input the optical code corresponding to the input index. That is, for example, as shown in FIG. 72I, FIG. 154 to FIG. 158, the optical code is indexed to each optical code. Whereat, when the apparatus 110L inputs the synchronization pattern code, the index is assigned as the synchronization pattern, and the information device 200 only needs to emit the optical code of the assigned index. In this case, the information device 200 may generate a synchronization signal with the OR logic of each bit value of the input synchronization pattern code, and emit the optical code with adjusting the timing.

In addition, the apparatus 110L may reply the optical code just input from the information device 200 as the synchronization pattern code as it is. In this case, the information device 200 may generate a synchronization signal with the OR logic of each bit value of the synchronization code, and emit the optical code with adjusting the timing. In this case, the information device 200 may perform error check by comparing the code value input as the synchronous pattern code with the optical code transmitted to the apparatus 110L by light emission of the optical code just before.

Next, the apparatus 110L determines whether or not an optical code amount of 1 information code portion (optical code indicating information in one data block) has been acquired (S6D). Here, the 1 information code portion is a series of optical codes from the boundary of the data block to the next division as described with reference to FIG. 72I. If the acquisition of the optical code for 1 information code portion has not been completed, the apparatus 110L replies the process to S6B. When the acquisition of the optical code for 1 information code portion is completed, the apparatus 110L determines whether or not to acquire the next information (S6E).

In the case of acquiring the next information, there are cases where an optical code of predetermined information is input, not all information codes are acquired, and the like. When acquiring the next information, the apparatus 110L replies control to S6B.

As described above, when the information device 200 outputs the synchronization pattern code instead of outputting the synchronization optical code, it is not necessary to start the error check of the pattern code from the reference pattern acquisition. This is because the information device 200 can acquire and accumulate coordinate values from any pattern code limited to the reference pattern, receive the reference pattern, and may specify the pattern code from accumulated coordinate values when the required pattern codes of electrostatic capacity code (one data block) has been acquired. Therefore, the apparatus 110L may store the necessary number of pattern codes including the latest reference pattern acquired by the touch panel and perform the parity check. If a parity check error occurs, the stored initial information pattern is omitted, an error check is performed with the newly obtained required number of information patterns, and this process is repeated until no error occurs.

By the apparatus 110L outputting a pair of the index and the pattern code to be output again, the information device 200 can detect the index. Upon detecting the index, the information device 200 recognizes that it is output again of the pattern code in which the error has occurred, and corrects the acquired pattern code.

FIG. 170A is a flowchart illustrating synchronous communication process on the information device 200 side. As already mentioned, the hardware configuration of the information device 200 is the same as that of the code recognition apparatus 3 described in Embodiment 0, so its description is omitted (see FIG. 5). In this process, the information device 200 (CPU 51 in FIG. 5) detects the reference pattern of the apparatus 110L on the touch panel (S70). Then, the information device 200 determines whether or not a reference pattern has been detected (S71). If the reference pattern is not detected, the information device 200 further determines whether or not to end the process (S72). For example, the information device 200 may terminate the process if the reference pattern cannot be detected for a predetermined time or longer. On the other hand, if the process is not ended, the information device 200 replies the process to S70. It should be noted that the user may determine and terminate the process.

Upon detection of the reference pattern in S 71, the information device 200 specifies the position of the photodiode WPD1 and the like and emits the optical synchronization pattern. The manner of specifying the position of the photodiode WPD1 and the like is the same as that of Embodiment 17 (S 11 of FIG. 140). That is, for example, as illustrated in FIG. 153, the disposition of the photodiodes WPD1 to WPD6 (in the case of FIG. 159, the photodiodes WPD1 to WPD5) with respect to the arrangement of the elements 111-1 to 111-110L. When a reference pattern is detected, some movement set a predetermined region around the detection position of each element as a bounding box, and if the position of the element detected after a slight movement is within the bounding box, the pattern code can be recognized. Furthermore, if a predetermined area is reset as a bounding box around the newly detected position, correction can be made for the amount of movement of the apparatus, and by repeating this it is possible to acquire the pattern code accurately even when the movement is continuing. Needless to say, this processing can also be used when the apparatus 110L recognizes other pattern codes. Therefore, the apparatus 110L can uniquely specify the position of the photodiode WPD1 or the like if the reference pattern is detected and the arrangement of the elements 111 can be specified. As a matter of course, the position of the photodiode WPD1 and the like can be uniquely specified each time the arrangement of the element in the case where the apparatus 110L moves. Then, the information device 200 emits the synchronization light pattern at the position of the display corresponding to each position of the photodiode WPD1 or the like (S73).

Next, the information device 200 detects the parity check pattern by the touch panel (S74). Then, the information device 200 executes information pattern synchronization input processing (S75). Then, the information device 200 executes the parity check on the code value of the pattern code input in S75 and emits a response signal (S76). When an error occurs in the parity check, the output is restarted from the reference pattern again. In addition, the information device 200 determines whether to end the process (S77). For example, when the user selects the end of processing from the menu screen such as a touch panel, the information device 200 ends the processing. When the information device 200 does not end the process, the information device 200 moves to the process of S70. Here, when an error is not detected by the parity check pattern and the information device 200 acquires the correct information code, it may emit an optical code indicating the end of acquisition of the information code and terminate the output of the pattern code from the apparatus 110L. Incidentally, it is not necessary to start the error check of the pattern code from the acquisition of the reference pattern, and the required number of pattern codes including the latest reference pattern acquired by the touch panel are stored, and the parity check may be performed. If the parity check error occurs, the first stored information pattern is omitted, and the error check is performed with the necessary number of information patterns including the newly acquired pattern code, and the processing may be repeated while shifting the pattern code to be checked until no error occurs.

FIG. 171 is a process flowchart illustrating the details of the information pattern synchronization input process (S75 in FIG. 170A) by the information device 200. This process is the one in side of the information device 200 corresponding to the information pattern synchronous output process (FIG. 166) in the apparatus 110L. In this process, the information device 200 creates a synchronization light pattern code including a code value which is decrypted from the pattern code output from the apparatus 110L and is replied to the apparatus 110L (S750). Then, the created synchronization light pattern code is emitted (S751).

Next, the pattern code from the apparatus 110L in synchronization with the synchronization light pattern code is input (S752). Then, it is determined whether or not there is an error specification in the inputted pattern code. The case where there is an error specification is, for example, a case where the central element 111-5 indicating an error is ON as shown in FIG. 156. If the central element 111-5 indicating an error is ON, the information device 200 simultaneously inputs the specification of the error and the pattern code to be inputted again in the process of S752. Incidentally, it should be noted that the case of an error specified may be, for example, a case where an index other than the information pattern is input. When an index other than the information pattern is input, the information device 200 further outputs the next synchronization optical signal and inputs the next pattern code to be output again.

If there is no error, the information device 200 stores the code value as a new pattern code input one in S752 (S754). On the other hand, if there is an error specification in the pattern code input in the judgment in S753, the pattern code already input with the error specified is corrected. For example, as shown in FIG. 156, when the central element 111-5 indicating an error is ON, the information device 200 corrects the code value of the pattern code that has just been input according to the pattern code input in S752. Further, for example, when an error is specified by the index, the code value of the pattern code corresponding to the index is corrected. Then, the information device 200 determines whether or not the total number of pattern code strings from the reference pattern to the next reference pattern have been input. If the total number of them have not been input, the information device returns to process of S750.

Here, the case that the central element 111-5 indicating an error is ON is explained in above, but it is already explained that information pattern is defined by the pattern codes which omits the all ON reference patterns and all OFF pattern codes, moreover the pattern that a piece of pattern indicating error (for example, pattern that only the element 111-5 is ON and the others are OFF) is omitted from information patterns and there is a case that the central element 111-5 indicating an error is ON, but in the explanation of FIG. 154 and FIG. 160, from the information pattern, the information pattern In addition, it is described that one pattern indicating an error (for example, a pattern in which only five elements are ON, the other in OFF state) is omitted from the information patterns may be an error pattern outputting error occurrence. After the process, index and information pattern may be output again. As a result, since 5 bits is 64, the 8 power of (64−3) is about 191 trillion codes, and the amount of information is greatly increased compared with 4 bits×8=32 bits (about 4.3 billion codes).

Process in FIG. 171, there is no limitation on the timing at which the pattern code with error specification is output from the apparatus 110L to the information device 200. In other words, as shown in FIG. 166, even if the apparatus 110L checks for an error every time the pattern code is output and the error pattern code is output again, the information device 200 can correct the error pattern. Also, as shown in FIG. 168, even if the apparatus 110L checks for an error after outputting the entire pattern codes and outputs the pattern code with the error again, the information device 200 can correct the error pattern code according to FIG. 171. And even if the apparatus 110L outputs again the pattern code with the error at an arbitrary timing from the reference pattern to the next reference pattern, the information device 200 can correct the error pattern code according to FIG. 171.

In the process of FIG. 171, the error check for the last pattern code of the pattern code string from the reference pattern to the next reference pattern is omitted. An error check is performed by including the code value of the last pattern code in the synchronization light pattern when the information device 200 causes the apparatus 110L to output the next reference pattern.

Incidentally, as shown in FIG. 165, if the apparatus 110L simply synchronizes with the synchronization light pattern and error check is not executed, the process of S750 in FIG. 171 may be omitted. When the process in S750 is omitted, only the parity check (S76) in FIG. 170A is executed as the error check on the information device 200 side. However, both the parity check and the check process in the apparatus 110L by replying the pattern code input to the information device 200 may be performed according to S750 and S751 in FIG. 171.

FIG. 172 is a process example of the information device 200 when the information device 200 inputs the synchronization pattern code from the apparatus 110L. In this process, the information device 200 inputs the pattern code for synchronization (S752A). Next, the information device 200 inputs the information pattern at a predetermined timing from the input of the synchronization pattern code (S752B). The process in S753 and thereafter are the same as those in FIG. 171.

As described above, in the embodiment 21, the apparatus 110L outputs a pattern code in accordance with the synchronization light pattern, and the information device 200 transmits the code value based on the received pattern code to the apparatus 110L with an optical code for error check. Therefore, the apparatus 110L and the information device 200 can communicate in a so-called bidirectional manner at the same time by the output due to a change in the physical quantity from the element 111 and the emission of the optical code from the display of the information device 200. Further, the apparatus 110L executes pattern code output due to a change in physical quantity from the element 111 and detection of incoming amount of energy by the photodiodes WPD1 to WPD5 or the like in at least one part overlapping time.

[Location Information Notification Process Application of Touch Panel]

In the embodiment 21, a process is exemplified that the coordinates of the position where the information device 200 detects the change of the physical quantity due to the element 111 on the touch panel is notified to the apparatus 110L. By such process, the apparatus 110L can acquire the coordinates on the touch panel from the information device 200 by outputting the pattern code based on the change of the physical quantity due to the element 111. As a result, when the apparatus 110L, for example, has a layout information of the graphics object displayed on the display of the information device 200, the apparatus 110L can perform process according to the graphics object. For example, apparatus 110L can recognize that particular buttons, menus, icons, and the like have been accessed by element 111 of apparatus 110L.

Here, in order to recognize which particular buttons, menus, icons, and the like are accessed by the apparatus 110L, it is necessary to emit the optical code indicated which particular buttons, menus, icons, and the like are accessed from the information device 200 and to be detected and recognized by the apparatus 110L through the photodiode. In this manner, by recognizing that the apparatus 110L has accessed which particular buttons, menus, icons, and the like, various kinds of accessed information can be stored (logged) in the apparatus 110L. As this variety of information, any information such as benefits coupons or points, keys that can access particular information, item or points got in games, purchased tickets or virtual currency, and so on, may be used. By acquiring these, the apparatus 110L can output corresponding operation or process as an information code. Although not shown, pointers (arrows, protrusions, and the like) are provided on the apparatus 110L, and the position information on the information device 200 instructed by the pointer can be acquired by using the reference pattern output from the apparatus 110L, and which particular button, menu, an icon and the like is accessed is also possible to make it easy to visually recognize.

In FIG. 170A, process that firstly acquires the reference pattern, and secondly synchronously inputs the information pattern after detecting a parity check pattern, has been exemplified. However, instead of such process, regardless of whether or not the reference pattern is detected, the information device 200 stores the coordinate position of the physical quantity change input from the apparatus 11L for the time being, and the reference pattern and the parity check pattern, and when a pattern code corresponding to a piece of electrostatic capacity code (information code) is input, the pattern code may be identified from the coordinate position.

Such process is effective when the apparatus 110L inputs the information pattern together with the synchronization pattern code.

FIG. 164C exemplifies the process of the apparatus 110L that inputs the information pattern to the information device 200 in synchronization with the synchronization pattern code. In this process, the apparatus 110L firstly outputs a reference pattern (S60). Next, the apparatus 110L synchronously outputs the parity check pattern in synchronism with the synchronization pattern code from the element (S62A). Further, the apparatus 11L synchronously outputs a predetermined number of information patterns in synchronization with the synchronous pattern code outputting from the element (S63A). Then, the apparatus 110L determines whether or not a response has been received from the information device 200 (S6H). Even when waiting for a predetermined time period, if there is no response reception from the information device 200, the apparatus 110L determines whether or not this process is within a predetermined number of times (S67A).

Then, if it is within the predetermined number of times, the apparatus 110L returns control to S60 and repeats the same processing. That is, when inputting an information pattern in synchronization with the synchronous pattern code, a reference pattern, a parity check pattern, and a predetermined number of information patterns (electrostatic capacity code, information Code) to be repeated a predetermined number of times. On the other hand, if it is determined in S6H that there is a response light reception from the information device 200, the information device 110L determines whether or not to output the next information code (S68A). Further, when the next information code is output, the process returns to S60.

As described above, when the apparatus 110L inputs the information pattern in synchronization with the synchronization pattern, the reference pattern, the parity pattern code (may be omitted except when necessary), and the predetermined number of information pattern may be repeatedly output.

FIG. 170B exemplifies the process of the information device 200 that inputs the pattern code regardless of whether or not the reference pattern is detected.

In this process, first, in the information device 200, an application program (also referred to as G application) for inputting a pattern code is activated (S 80). Then, the information device 200 determines whether or not the pattern code is detected (S81). When the pattern code cannot be detected, the information device 200 returns the process to S81 and waits for the input of the pattern code.

On the other hand, when the pattern code can be detected in S81, the information device 200 determines whether or not the reference pattern is detected (S82). When detecting the reference pattern, the information device 200 determines the direction of the coordinates (S83). Next, the information device 200 inputs a parity check pattern (S84). On the other hand, when the information device 200 detects a pattern code other than the reference pattern in the determination of S82, the information device 200 temporarily stores the coordinate value in which the change of the physical quantity is detected in the memory and the like (S85). This is because, in the case of a pattern other than the reference pattern, it is not always possible to identify the direction of the coordinates, that is, the arrangement of the elements of the apparatus 110L.

Then, the information device 200 determines whether acquisition of one information code (that is, 1 capacitance code) has been completed (S86). If the acquisition of the information code has not been completed, the process goes ahead to S87. Then, the information device 200 waits for the input of the synchronization pattern code (S87). When the synchronization pattern code is input (YES in S88), the information device 200 inputs the coordinate value of the information pattern at a predetermined timing in accordance with the synchronization pattern code (S89). Then, the information device 200 stores the coordinate value detected at the time of inputting the information pattern in a memory or the like (S8A). Then, the information device 200 returns the process to S86. As described above, when the apparatus 110L inputs the information pattern in synchronization with the synchronization pattern, the information device 200 activates an application program (G application or the like) cooperating with the apparatus 110L, and may wait input of the pattern code. In this case, even if the reference pattern cannot be acquired, any one of the reference pattern, the parity pattern code (may be skipped except when necessary), and a predetermined number of information patterns may be taken in order. Then, when the reference pattern, the parity pattern code (when necessary), and the predetermined number of information patterns has been acquired by plurality of data blocks inputting, the information device 200 may identify the information pattern from the coordinate values of the predetermined number of information patterns. Therefore, the information device 200 can perform high-speed processing as compared with the case of inputting the pattern code in the order of the reference pattern, the parity pattern code (when necessary), and the predetermined number of information patterns.

On the other hand, when the acquisition of 1 information code is completed in the determination of S86, the information device 200 settles the pattern code from the coordinate value stored in the memory and the like (S8B). Then, the information equipment 200 performs a parity check and the like, and emits the optical code of the response signal to the apparatus 110L (S8C). Then, the information device 200 determines whether or not to terminate the process (S8D). If the process is not terminated, the information device 200 returns the process to S81 and enters the next information code acquiring process.

FIG. 173 is an example of process in which the information device 200 transmits the position coordinates on the touch panel in accordance with the output of the pattern code from the apparatus 110L. In this process, for example, the apparatus 110L notifies the reference pattern, as described above, thereby causing the information device 200 to recognize the position of the element 111 and receiving the synchronization optical code. Then, the apparatus 110L outputs the pattern code in accordance with the synchronization optical code and transmits various requests to the information device 200. Also, the apparatus 110L outputs the information pattern in synchronization with the pattern code of the apparatus 110L itself by outputting the synchronization pattern code. It is now assumed that the information device 200 is in a state waiting for a coordinate transmission request from the apparatus 110L (S100) in this state.

Then, when the information device 200 detects a coordinate transmission request from the apparatus 110L (YES in S101), the information device 200 acquires coordinates of each element 111 of the pattern code when a coordinate transmission request is detected (S102). Then, the information device 200 transmits the acquired coordinates to the apparatus 110L by emitting the optical code (S103). Next, the information device 200 determines whether or not to terminate the process (S104). For example, if the user instructs the termination of the application for executing this process, the information device 200 terminates the process. Further, the information device 200 may terminate the process by outputting the information code from the apparatus 110L.

FIG. 174 exemplify a flowchart of position coordinate receiving process by the apparatus 110L. In this state, it is assumed that the apparatus 110L has already transmitted a coordinate transmission request to the information device 200 and is waiting for the response. In this process, the apparatus 110L receives an optical code from the information device 200 (S110). Then, the apparatus 110L acquires the coordinate value from the optical code (S111). As corresponding to the plurality of elements 111, plurality of coordinates to acquire may be available.

Next, the apparatus 110L executes a process corresponding to the coordinate value (S112). For example, the apparatus 110L executes an application corresponding to the icon at the position of the coordinate value on the display of the information device 200. For example, when the icon is an icon meaning an information acquisition request from the apparatus 110L, the apparatus 110L acquires the information requested from the memory 117 and the like and outputs it to the information device 200 according to the format of the pattern code. Then, the apparatus 110L determines whether or not to terminate the process (S113). For example, when the coordinate value is a coordinate included in an icon meaning termination, the apparatus 110L terminates the process. Here, by recognizing the position information on the information device 200 by the optical code of the photodiode of the apparatus 110L, it is possible to recognize at which position and in which direction the apparatus 110L is placed on the information device 200. Thus, the apparatus 110L can output the operation or process corresponding to the position and direction as an information code. Further, information on the position and direction can be stored (logged) in the apparatus 110L. When the apparatus 110L is placed on the map or the game screen displayed on the information device 200, although not shown, based on the coordinate value of a pointer (arrow, protrusion, and the like.) which is a part of the apparatus 110L calculated from its position and direction, it is possible to recognize the position to which the user has instructed, and to output the operation or process corresponding to the position with the information code. This pointer makes it easy to recognize where the user is instructing.

[Adjustment of Physical Quantity Output Value]

With reference to FIG. 175 and FIG. 176, a process of adjusting the output value of the physical quantity output from the apparatus 110L with the information device 200 will be exemplified. This process is executed by the CPU 116 of the apparatus 110L activating the adjustment program. In this process, the CPU 116 of the apparatus 110L scans the ON drive signal and the OFF drive signal of the SW115 in a predetermined range, outputs the physical quantity from the element 111, and acquires the detection result of the physical quantity from the information device 200.

The apparatus 110L sets the ON drive signal and the OFF drive signal of the SW115 to predetermined values (S121). Here, the ON drive signal of SW115 is, for example, a gate drive signal for turning on a transistor included in SW115. The OFF drive signal of SW115 is, for example, a gate drive signal for turning off the transistor included in SW115.

Then, the apparatus 110L drives the SW115 with the ON drive signal and the OFF drive signal to output the pattern code of the test pattern to the touch panel of the information device 200. Then, the ON drive signal and the OFF drive signal of the SW115 are scanned in a predetermined range, and the process is repeated (S122). When the scanning in the predetermined range is completed, the apparatus 110L acquires the proper ON drive signal amplitude and OFF drive signal amplitude from the information device 200 within the above drive range, and these are set to the ON drive signal and the OFF drive signal of the SW115 respectively (S123). The process in S123 is one of process examples in which the adjustment of the change in the physical quantity is performed according to the signal amplitude of the drive signal for bringing the semiconductor switch into the conductive state and the signal amplitude of the drive signal for cutting off the semiconductor switch.

FIG. 176 is a flowchart illustrating an appropriate case determination process based on test pattern detection in the information device. In this process, the information device 200 detects the physical quantity output in a plurality of test cases in which the ON driving signal and the OFF driving signal of the SW115 are scanned in a predetermined range from the apparatus 110L through the touch panel (S130). Then, the information device 200 compares the detected test pattern with the correct answer pattern. The information device 200 compares such the detected test pattern with the correct pattern a plurality of test cases in above. Then, the information device 200 notifies the setting value of the ON drive signal and the OFF drive signal of the SW115 corresponding to the case of the test case having the most correct answer pattern to the apparatus 110L (S133).

According to the above procedure, the apparatus 110L can set the ON drive signal and the OFF drive signal of the SW115 to appropriate values. By setting the ON drive signal of the SW115 to an appropriate value, the apparatus 110L can reliably turn on the SW115. On the other hand, by setting the OFF drive signal of the SW115 to an appropriate value, for example, the influence of the junction capacitance due to formation of a depletion layer such as a diode, a transistor, and the like included in the SW115 can be reduced.

In addition, for example, when the touch panel of the information device 200 detects the electrostatic capacitance between the touch panel of the information device 200 and the element 111 of the apparatus 110L or the electric field intensity from the element 111 due to the AC signal, the junction capacitance of the SW115 cannot be ignored in some cases. For example, in spite of the fact that the SW115 is OFF, it is assumed that the AC signal flows through the SW115 due to the junction capacitance (also referred to as parasitic capacitance, floating capacitance) of the SW115. By the processes of FIG. 175 and FIG. 176, the influence of the junction capacitance of the SW115 is reduced, and the information device 200 can satisfactorily detect the change in the physical quantity or the physical quantity from the apparatus 110L.

Twenty-Second Embodiment

FIG. 177 is a diagram exemplifying a configuration of a back surface of the apparatus 110M according to the embodiment 22 coming into contact with the touch panel. The configuration of the apparatus 110M described in the present embodiment may apply to that of the devices 110 to 110L (hereinafter simply referred to as the apparatus 110 and the like) in the code generation apparatus 1 of the embodiment 0, embodiments 1 to 9, and the embodiment 20 to 21. In addition, the apparatus 110 and the like in the configuration of the code generation apparatus 1 of the embodiment 0, the embodiments 1 to 9, and the embodiment 20 to 21 may be replaced with the apparatus 110L of the present embodiment. The apparatus 110M of the embodiment 22 has a circular rear surface that contacts the touch panel. As shown in the figure, the apparatus 110M has an information reading unit 11 near the center of the back surface. In addition, the apparatus 110M has six photodiodes WPD arranged in a circular shape around the information reading unit 11. Further, the apparatus 110M has elements 111 arranged in a circle around the six photodiodes WPD.

By adopting the configuration of FIG. 177, the distance between the elements 111 can be secured as much as possible within the circular back surface. Therefore, when the touch panel of the information equipment 200 detects physical quantities such as electrostatic capacity, electric field intensity, and the like from the plurality of elements 111, the influence due to the interaction between the element 111 and the element 111 can be reduced. For example, when one element 111 is turned on by the interaction between the element 111 and the element 111, the physical quantity, for example, the electrostatic capacity or the electric field intensity may be detected to be large. By securing the distance between the elements 111 as much as possible within the bottom surface of the apparatus 110M, the influence due to the interaction between the elements 111 can be reduced.

FIG. 178 shows a modification of the apparatus 110M. As shown in FIG. 178, in the apparatus 110M, placement elements 111 and photodiodes WPD may be alternately arranged in a circle around the information reading unit 11.

Twenty-Third Embodiment

With reference to FIG. 179 to FIG. 192, an apparatus 110N according to an embodiment 23 will be described. In the present embodiment, an example of the shape, structure, appearance, and the like of the apparatus 110N will be described. The configuration of the apparatus 110N described in the present embodiment may apply to that of the devices 110 to 110M (hereinafter simply referred to as the apparatus 110 and the like) in the code generation apparatus 1 of the embodiment 0, embodiments 1 to 9, and the embodiments 20 to 22 that is used in the present invention. Further, the apparatus 110 and the like in the configurations of the code generation apparatus 1 of embodiment 0, embodiments 1 to 9, and embodiments 20 to 22 may be applied to the apparatus 110N of the present embodiment.

In the twenty-third Embodiment, the apparatus 110N is formed using a card type, that is, a flat plate type substrate. However, the apparatus 110N is not limited to the card type, but it may have a chassis such as the code generation apparatus 1 of the embodiment 0, a box shape, or the like. Further, the apparatus 110N may be formed as a part of various character products. Hereinafter, a card type or flat type chassis will be described as an example. Herein, the chassis generally refers to a box for accommodating the device, but in the following embodiment 23, it is referred as the chassis when electronic parts, wires, and the like are enclosed and confined in the base material of the card, when they are sandwiched between the base materials of the card, or when they are attached to a recess formed in the base material of the card. Incidentally, it should be noted that the chassis may be an external structure and the like of the code generation apparatus 1 of the zeroth embodiment.

FIG. 179 illustrates an appearance of the back surface of the apparatus 110N contacting with the touch panel of the information device 200. On the rear surface of the information device 200, a plurality of, for example, five elements 111, a plurality of photodiodes WPD, and a photoelectric conversion element array 112 are provided in the chassis. In order to clearly show the relationship with other figures, two of the five elements 111 are set as elements 111-1 and 111-2. Also, on the rear surface of the information device 200, the portion where the element 111 is provided is excluded and covered with a printable coating layer.

If the coating material is a nonconductive material having a high dielectric constant, it may be coated on the surface of the element. In that case, print or colored coating is used to blind the element. Incidentally, the coating layer may have a two-layer structure, a printing may be performed on the underlying coating layer, and a transparent coating layer that covers the printing may be formed thereon. There is no limitation on the material of the coating layer, and a material harmless to the human body and durable is desirable. However, the coating layer is not indispensable, and printing may be performed on the surface of the casing such as the exposed card substrate. In the coating material, at least a portion where the photoelectric conversion element array 112 and the photodiode WPD are provided is a transparent material. However, the entire coating material covering the back side of the information device 200 may be transparent. When printing is performed, printing is performed on a portion other than the portion where the photoelectric conversion element array 112 and the photodiode WPD are provided. If ink that transmits at least one of R, G, and B light is used, it may be printed on a portion where the photodiode WPD is provided.

The dotted line in FIG. 179 illustrates the internal configuration of the apparatus 110N. A control unit is provided inside the apparatus 110N, and the element 111, the photodiode WPD, the photoelectric conversion element array 112, and the like are connected to the control unit by wiring. For example, the control unit is provided with the CPU 116, the memory 117, the capacitor 123, the comparator 118, the buffer 182, the exclusive OR circuit 181, the output buffers 183A and 183B, the driving circuit 180, the selector 184, and the like.

Although not shown in FIG. 179, a support structure M1 (see FIG. 182) with translucency and supporting the coating layer is formed between the photoelectric conversion element array 112 and the coating layer. In addition, the photodiode WPD is provided inside the substrate, and light enters the photodiode WPD from the opening covered with the transparent coating material on the rear surface of the apparatus 110N. In another form which is not a thin type card, the opening portion on the back of the apparatus 110N, on which light is incident, may be left open, without coating.

FIG. 180 is a cross sectional view of a cross section (hereinafter referred to as "A cross section") obtained by cutting the apparatus 110N along the "A cross section" arrow in FIG. 179 along a plane perpendicular to the paper surface. FIG. 181 is a cross sectional view of a cross section (hereinafter referred to as "B cross section") obtained by cutting the apparatus 110N along the "B cross section" arrow in FIG. 179, along a plane perpendicular to the paper surface. FIG. 182 is a cross-sectional view of a cross section (hereinafter referred to as "C cross section") obtained by cutting the apparatus 110N along the "C cross section" arrow in FIG. 179 along a plane perpendicular to the paper surface. In FIG. 180 to FIG. 182, the upper side of the apparatus 110N is the front surface and the lower side is the rear surface.

As shown in FIG. 180, a conductive layer 114A is provided below or inside the coating layer on the surface side in the cross section including the element 111. The conductive layer 114A has the same structure as the contact conductor 114 of the embodiment 1 and the like. The conductive layer 114A is formed of a plate like or sheet like conductive material, but may be formed by printing with a conductive ink. The conductive layer 114A may be exposed on the surface of the apparatus 110N without providing a coating layer.

In the apparatus 110N, SWs 115 equal in number to the elements 111 are provided inside the chassis. In FIG. 180, elements 111-1, 111-2, SW115-1, SW115-2 are illustrated. The conductive layer 114A, the SW115, and the element 111 are connected by wiring. That is, each of the elements 111 is connected to the conductive layer 114A via a conductive path (wiring) via SW115 which is one or more physical quantity control parts.

Therefore, when a part of the user's body, for example, a finger touches the conductive layer 114A of the apparatus 110N through the coating layer, the physical quantity change of the electrostatic capacity, the electric field intensity, and the like is induced on the rear surface of the apparatus 110N via the SW115 and element 111 that are electrically conducting (ON). The information device 200 detects the change of the physical quantity on the rear surface of the apparatus 110N via the touch panel, and detects the existence of the element 111. Therefore, the user can transmit the effect of the touch operation to the touch panel of the information device 200, regardless of where the conductive layer 114A is provided on the surface of the apparatus 110N. The touch operation may be performed with the user's finger or with a conductor hold in user's hand. In this sense, the rear surface of the chassis of the apparatus 110N can be regarded as an example of the working surface to act on the partner device.

Incidentally, although it is desirable that the coating layer on the surface is conductive, but in case of low conductivity if the dielectric constant is large to some extent, above physical quantity change on the rear surface of the apparatus 110N is induced by the user's touch operation. However, as described above, the coating layer may not be provided.

As shown in FIG. 180, FIG. 181, and FIG. 182, a recess surrounded by the side walls WW1, WW2 of the base material is formed on the rear face side of the base material of the apparatus 110 N. Then, as shown in FIG. 180 and FIG. 181, the filling material M2 is filled in a region in the recess including the element 111 and the photodiode WPD. In addition, as shown in FIG. 182, the support structure M1 is formed in the recess on the rear surface side of the photoelectric conversion element array 112.

As described above, a layer filled with the filling material M2 is formed in a region including the element 111 and the photodiode WPD in the recess on the rear surface side of the apparatus 110N. The layer of the filling material M2 is a portion including the periphery of the element 111 in the apparatus 110N, and is electrically nonconductive (that is, insulative) and is a layer formed by filling a filler material having a low dielectric constant at the hollow portion of the base material excluding the conductive layer 114A, the element 111, the SW115 and the coating layer. As the filling material M2, for example, a honeycomb structure containing many voids, and nanocapsules in which air is confined can be exemplified. Since such a filling material M2 contains a lot of air, the conductivity and the dielectric constant are extremely low, for example, some of which are close to air. The filling material M2 is filled in the hollow portion of the base material to form a load bearing surface material.

Aero capsule (registered trademark) manufactured by Teijin Ltd. can be exemplified as a commercial product of such a filling material. Aero capsule (registered trademark) is also called high hollow structure yarn, which forms a large cavity in the yarn and contains a large amount of air contained in the fiber itself. The high hollow structure yarn increases the hollow ratio to the limit and contains a large amount of air. However, the filling material M2 is not limited to the Aero capsule (registered trademark) or high hollow structure yarn. The filling material M2 is largely attributable to the thickness of the apparatus 110N. If it is a certain thickness (about 2 to 3 mm or more), a nonconductor having a relatively low dielectric constant may be used.

However, the filling material M2 is not limited to nanocapsules or high hollow structure yarns. As a material whose dielectric constant is less than 2 close to air, a so-called low-k film can be exemplified. For example, as exemplified in the document ULVAC TECHNICAL JOURNAL No. 66 2007 pp. 8-12), various porous substances, for example substances based on a porous silica material and having a dielectric constant lower than 2 has been proposed.

The filling material M2 supports the front and rear surfaces of the apparatus 110N and reduces the influence on the detection of the physical quantity of the touch panel of the information device 200 due to the presence of the user's finger or the like. That is, when the information device 200 detects the change of the physical quantity occurring in the element 111 due to the ON and OFF of the SW115, the influence of the user's finger or the like may be superimposed on the change in the physical quantity due to the ON and OFF of the SW115. It is presumed that this is caused by the fluctuation of the physical quantity caused by the contact of the user's finger or the like with the apparatus 11N. It is estimated that the variation in the physical quantity due to the coupling between the electric circuit of the apparatus 110N and the electric circuit of the information device 200 overlaps with the change in the physical quantity occurring in the element 111 due to the ON and OFF of the SW115. By providing a recess in the base material and making the base material hollow, the conductive layer 114 on the front surface side of the chassis from the chassis back side, or the SW115, the wiring layer, the control portion, and the like disposed inside the chassis, the air layer can be formed. Empirically, it has been found that if the air layer is about 0.1 to 0.2, the interaction between the human body, the electrical circuit of the apparatus 110 N and the like and the information device 200 can be reduced to a negligible level. That is, by providing a recess or a cavity in the base material, it is possible to reduce the influence of the fluctuation of the physical quantity and the like. However, it is desirable to form an active surface on which the element 111 is arranged on the back surface side. Therefore, in the embodiment 23, the recessed portion of the base material of the card is filled with the low dielectric constant term insulation filling material M2. As the filling material M2, any material may be used as long as it can suppress fluctuation of the physical quantity. The filling material M2 is an example of a low dielectric insulating material. Also, the layer of filling material M2 is an example of a supporting layer.

By filling the filling material M2, the SW115 can maintain a distance equal to or greater than a predetermined distance from the touch panel surface of the information equipment 200 and can suppress the interaction between the SW115 and the touch panel surface. A desirable distance between the SW115 and the surface of the touch panel of the information device 200 will be described in the section of [limit value of capacitance]. Although the layer of the filling material M2 may be exposed, it may be coated with a coating material. Therefore, it can be said that the rear surface side of the layer of the filling material M2 is an example in which the support layer filled with the low dielectric constant insulating material is exposed or coated with the coating material to form the active surface.

The SW115 may be fixed to the conductive layer 114A or may be separated from the conductive layer. When separating the SW115 from the conductive layer 114A, a filling material M2 may be filled between the SW115 and the conductive layer 114A. In this case, in the cross section A in FIG. 180, the apparatus 110N has (the coating material), the conductive layer 114A, the filling material M2, SW115, the filling material M2, (coating material), the element 111 In order to form a front surface (upper) side may be formed a hierarchy.

Further, a base material of the apparatus 110N (a base material of a card or a substrate on which no electronic circuit is formed) may be sandwiched between the SW115 and the conductive layer 114A. That is, in the A cross-section of FIG. 180, the apparatus 110N has a structure in which (coating material), conductive layer 114A, card base material, SW115, filling material M2, (coating material), and element 111 are arranged in this order from the front side may be formed a hierarchy. In any case, since the layer of the filling material M2 is sandwiched between the SW115 and the rear surface which comes into contact with the touch panel, the SW115, which is one or more physical quantity control units, is provided in a layer that is separated from the working surface via the support layer It can be said that it is provided.

As shown in FIG. 181, in order to reduce interference with the element 111 and the information device 200, the photodiode WPD is fixed to the recess inner wall surface (ceiling surface) of the base material of the apparatus 110N. As described above, the vicinity of the B cross section including the photodiode WPD is filled with the filling material M2, but since the opening HL1 is provided in the filled portion of the filling material M2, the light from the ear surface reaches the photodiode WPD. Therefore, the filling material M2 need not be transparent. However, when a transparent material is used as the filling material M2, the opening HL1 may not be formed. It is desirable that the information device 200 has a structure such that light emitted by the information device 200 for the other photodiode WPD does not intrude into the opening HL1 in the lower portion of the photodiode WPD, and a tapered opening May be provided.

As described above, since the opening HL1 is provided in the filling material M2 of FIG. 181, it is not necessary to be transparent. However, when the filling material M2 is transparent, the support structure M1 needs to cover the opening HL1 with a light partition wall that blocks light so that the information device 200 does not intrude light emitted for another photodiode WPD is there.

The support structure M1 in FIG. 182 may be a wall portion passing through a "D cross-sectional" arrow in FIG. 182 and having a lattice shape in a cross section (hereinafter referred to as D cross section) cut along a plane perpendicular to the paper surface. In this case, the support structure M1 has a large number of open spaces opened in a rectangular parallelepiped shape or a honeycomb-like well shape formed of a material having low conductivity from the photoelectric conversion element array 112 to the back surface contacting the touch panel of the information device 200 Form. Therefore, the support structure M1 can be regarded as an example of a second support layer formed by arranging a plurality of openings so as to allow light to pass therethrough, and the back side of the support structure M 1 has at least a part Form.

As a result, it has a structure that lowers the dielectric constant, functions as a load bearing surface material, and can receive light emission energy from the information device 200 with low loss. Therefore, when the rear surface of the apparatus 110N comes into contact with or comes into proximity with the touch panel, light from the display of the information device 200 passes through the support structure M1, is incident on the photoelectric conversion element array 112, and generates electric power. Therefore, it can be said that the photoelectric conversion element array 112 receives light from a plurality of openings in a layer separated from the active surface (rear surface) via the support structure M1.

As described above, on the rear side of the photoelectric conversion element array 112 (also referred to as a solar panel), a support structure M1 (a frame of a load bearing surface material) that can transmit light and supports the coating material on the rear surface is formed. The support structure M1 may have any structure as long as it is a nonconductive material, has a low dielectric constant, is low loss, and is capable of transmitting light.

The arrangement of the photoelectric conversion element arrays 112 above the flat surface of the chassis bottom surface is realized by electrostatic capacitance floating (parasitic) on the photoelectric conversion element array 112 and capacitance when touching the conductive layer with the fingers on the touch panel So that it will not be detected. Therefore, a gap layer is provided under the photoelectric conversion element array 112, and the photoelectric conversion element array 112 can efficiently receive light emitted from the touch panel and convert it into energy.

The shape of the support structure M1 is not limited to a lattice shape in cross section, and may be a triangle, pentagon, hexagon, or a polygon having a larger vertexes. FIG. 185 illustrates a case where a cross section called a honeycomb structure as a support structure M1 is hexagonal. However, instead of providing the support structure M1 in FIG. 182 or the support structure having a polygonal cross section as shown in FIG. 185, a transparent medium with a low dielectric constant of the nonconductive layer that the touch panel does not detect may be used.

FIG. 183 is a modification of the cross section A in FIG. 180. In FIG. 183, a layer of the conductive element 111A is formed on the lower side of the conductive metal element 111, that is, on the surface coming into contact with the touch panel of the information device 200. 180, in the absence of the conductive rubber 111A, the physical quantity detection sensitivity of the touch panel when the user touches or approaches the touch panel of the information device 200 on the back side of the apparatus 110N is lower than the physical quantity detection sensitivity of the lower surface of the element 111 It depends on processing accuracy. That is, depending on the processing accuracy of the lower surface of the element 111, for example, when the user touches the touch panel of the information device 200 with the back surface of the apparatus 110N, a gap is generated between the element 111 and the touch panel. As a result, there is a case that the detection value of the physical quantity detected by the touch panel from the element 111 fluctuates when the SW115 is ON.

Therefore, as shown in FIG. 183, when the layer of the conductive rubber 111A is formed on the surface of the element 111 which comes into contact with the touch panel, the adhesion between the element 111 and the touch panel can be improved and the fluctuation in the detection value of the physical quantity detected by the touch panel from the element 111 can be suppressed. The conductive rubber 111A has lower hardness than the metal element 111.

There is no limitation on the type of the conductive rubber 111A, but it is preferable that the conductivity is close to the element 111. For example, according to the website of Shin-Etsu Chemical Co., Ltd. (https://www.silicone.jp/contact/qa/qa123.shtml), it is stated that "As a conductor (conductive filler) mixed in the silicone rubber, in addition to carbon black, there are various kinds such as silver powder, gold plated silica, graphite, conductive zinc oxide and the like." Then, "the obtained value of volume resistivity is $1\times10^{-2}$ to $1\times10^{4}$ ($\Omega\cdot$m) in the case of carbon type, further lower when $1\times10^{-7}$ to $1\times10^{-4}\Omega\cdot$m) can be realized." Therefore, even when the element 111 is made of a metal material, it is possible to select the conductive rubber 111A having desirable conductivity. It should be noted that such a configuration is not a thin type card, but is preferably used in another form. Since the element 111 can be said to be a metal layer, the conductive rubber 111A can be said to be a conductive material layer which covers the working surface side of the metal layer and has lower hardness than the metal layer.

FIG. 184 indicates a modification of the B cross section of FIG. 181. As shown in FIG. 181, instead of providing the filling material M2 and providing the opening HL 1 under the photodiode WPD, the optical partition wall M3 surrounding the photodiode WPD may be provided. In FIG. 184, the photodiode WPD is incorporated in the substrate BD1 and mounted on the ceiling portion of the recess on the lower side of the apparatus 110N. However, instead of using the board BD1, the photodiode WPD may be fixed to the ceiling portion (card base material) of the recess on the lower side of the apparatus 110N.

On the substrate BD1, the optical partition wall M3 is erected downward from the substrate BD 1 (toward the rear surface where the touch panel is contacted). It is necessary to cover the opening HL1 with the optical partition wall M3 which blocks the light so that the information device 200 does not intrude the light emitted for the other photodiode WPD. Furthermore, a tapered opening with a widened lower part may be provided for collecting light. The optical partition wall M3 may be a wall portion passing through the "E cross section" in FIG. 184 and having a lattice shape in a cross section cut along a plane perpendicular to the paper surface (hereinafter referred to as "E cross section"). Therefore, the optical partition wall M3 forms an inner wall space having a rectangular cross section around the photodiode WPD together with the substrate BD1. As shown in FIG. 184, this inner wall space has an opening on the side coming into contact with the touch panel.

Therefore, when the apparatus 110N is brought into contact with the touch panel, the light of the display of the information device 200 directly under the inner wall space where each photodiode WPD is accommodated is incident on each photodiode WPD by the optical partition wall M3. In other words, as shown in FIG. 149, when the information device 200 divides the display into the optical code light emitting regions LE 1 to LE 6 and emits optical codes, light from the optical code light emitting regions LE 1 to LE 6 is emitted from the light emitting regions LE 1 to LE 6 Can be received by the photodiodes WPD1 to WPD6 corresponding to the photodiodes WPD1 to WPD6. On the other hand, it is possible to prevent the photodiodes WPD from receiving optical codes from light emitting regions other than just under the inner wall space in which the respective photodiodes WPD are accommodated by the optical partition wall M3.

Also, by appropriately selecting the spacing and the thickness of the optical partition wall M3, the optical partition wall M3 can support the coating on the rear surface of the apparatus 110N. However, the light partition wall M3 and the filling material M 2 used in FIG. 180 to FIG. 183 may be used in combination.

Although it is desirable that the bottom printed layer and/or the coating layer be transparent, it may be any printing as long as it allows light detected by the photodiode WPD to pass through. It should be noted that the photodiode WPD is not limited to one that detects white color, and predetermined light may be detected.

The reason why the photodiode WPD is arranged above the bottom surface (contact surface with the touch panel) as shown in FIG. 181 and FIG. 184 is to suppress occurrence of interaction with the electric circuit that the photodiode WPD and the conductor connected to the photodiode WPD are electrically connected to circuits in the information device 200 such as a touch panel and the like.

For example, due to such a structure, coupling between the photodiode WPD, the conductor and the like and the touch panel is suppressed. Further, with such a structure, it is possible to reduce the touch panel detecting the electrostatic capacitance floating (parasitic) on the electronic parts such as SW115 and the electrostatic capacitance when touching the conductive layer with the finger. Further, it is preferable that the space between the optical partition walls is filled with the filling material M2 which forms the non-conductive layer including the above-mentioned air layer after ensuring the opening HL1 (see FIG. 181) so as to be able to detect the optical code. Instead of the filling material M2, a nonconductive transparent medium having a low dielectric constant which is not detected by the touch panel may be used. Note that the arrangement of the photodiode WPD is not limited and any arrangement may be adopted because the touch panel can recognize it by the arrangement of the element 111.

FIG. 186A and FIG. 186B indicate modifications of the apparatus 110N. In the figure, the control unit has the same configuration as that of FIG. 179, and includes the CPU 116 and the like. In the example of FIG. 186A, the SW115 that turns on or off the connection between the conductive layer 114A and the element 111 is provided in the control unit. As a result, only the wiring may be provided in a portion (referred to as a wiring layer) connecting the element 111 and the control unit. That is, a first partial region including all of one or more elements on the rear surface as the working surface is assumed. In addition, corresponding to this first partial region, a second partial region is assumed on the front surface side (conductive layer 114A side) at a position overlapping in the planar direction in FIG. 186A. The second partial region can be regarded as a partial region specified at a position sandwiching the chassis with respect to the first partial area. In the portion sandwiched between these two partial regions, only the element 111 and the wiring are included as the element to be an electric circuit. Therefore, it can be said that the SW115 as the physical control unit is disposed outside the chassis portion specified as the portion sandwiched between the two partial areas. In FIG. 186A, coating and printing on the front and rear surfaces are omitted. Also, recess portions formed by the side walls WW1, WW2 of the base material, filling material M2 of the recess portion, support structure M1, and the like are similar to those in FIG. 180 to FIG. 182.

On the other hand, in FIG. 186B, instead of the conductive rubber 111 A in FIG. 183, a printed layer formed by the conductive ink 111B is formed. The printed layer can be said to be a conductive material layer which covers the working surface side of the metal layer and has lower hardness than the metal layer. Also, the printed layer is an example of a printed workpiece.

A layer of the conductive rubber 111A or a layer of the conductive ink 111B in FIG. 186A suppresses formation of an air layer between the element 111 and the touch panel of the information device 200, thereby improving adhesion. Therefore, with the layer of the conductive rubber 111A or the layer of the conductive ink 111B, the touch panel can stably detect the change in the physical quantity or the physical quantity generated in accordance with the ON and OFF of the SW115. That is, the touch panel can stably detect the presence of the element 111 and the conductive rubber 111A or the electrostatic capacity and the electric field strength indicating the presence of the element 111 and the conductive ink 111B when the SW115 is ON.

As described above, the apparatus 110N according to the embodiment 23 has the recess portion on the touch panel side of the base material, and allows the constituent elements other than the element 111 to be separated from the touch panel more than a predetermined distance through the air layer. As a result, the apparatus 110N of the embodiment 23 can suppress the interaction with the touch panel by the components other than the element 111. Therefore, when the SW115 switches ON and OFF and changes the physical quantity detected from the element 111 by the touch panel, It is possible that the SW115 interacts with an electric circuit or an electronic part of a touch panel and other information devices (hereinafter referred to as an information device 200 and the like), a control unit such as the CPU 116 interacts with the information device 200 and the like, the photoelectric conversion element 112 interacts with the information device 200 and the like, and the user whose body such as a finger touches the conductive layer 114A interacts with the information device 200 or the like.

Further, in the embodiment 23, a layer of the filling material M2 including air or voids is formed in the recess portion on the touch panel side of the base material of the flat type chassis. The filling material M2 is a material having a low dielectric constant and a high insulation ratio, and it is possible to form a working surface on the rear surface of the apparatus 110 N while suppressing the above interaction. In addition, the filling material M2 can support the coating layer coating the rear surface.

Further, by storing the SW 111 in the control unit, the apparatus 110N can reduce the interaction between the SW115 and the touch panel. Since the apparatus 110N has the support structure M1 on the touch panel side of the photoelectric conversion element array 112, it is possible to suppress the interaction between the photoelectric conversion element array 112 and the touch panel while maintaining the amount of light receiving on the photoelectric conversion element array 112.

As described above, the apparatus 110N of the embodiment 23 can suppress erroneous detection when the touch panel inputs the pattern code due to the change in the physical quantity from the element 111.

[Limit Value of the Electrostatic Capacity]

Hereinafter, with reference to FIG. 187 to FIG. 190, description of the experimental result on the limit value when the electrostatic capacity is assumed as the physical quantity detected by the touch panel will be given. In this experiment, an experiment was performed to investigate the limit value of the physical quantity of the element 111 (the limit value of the electrostatic capacity) detected by the touch panel.

FIG. 187 illustrates a configuration of the experimental fixture and procedure of the experiment. In this experiment, when the element 111 and one terminal (electrode) of the capacitor C are connected and the finger of the experimenter touches the other terminal (electrode) of the capacitor, It was investigated whether or not to be detected the physical quantity change from the element 111 as a touch operation by the touch panel.

As the capacitor C, a coaxial cable having a characteristic impedance of 50 ohms was used. From the dimensions and actual measurement of the coaxial cable, it is known that the electrostatic capacitance between the core wire and the shielding material can be calculated as L=0.29*L (pF) for the length L (mm) of the coaxial cable. Here, an asterisk (*) is a symbol indicating multiplication. Hereinafter, the coaxial cable is also referred to as a shielded wire.

As the element 111, a circular material made of brass having a diameter of 7 mm, 7.5 mm, and 8 mm was used. Further, as the touch panel, iphone (registered trademark) 5S and iphone (registered trademark) 6 manufactured by Apple Inc., USA are used.

Here, when the human body does not contact the terminal of the capacitor C, the electrostatic capacitance between the terminals of the capacitor C is set as C. Also, if the electrostatic capacitance of the element 111 is C2 and the electrostatic capacitance of the human body of the experimenter is Cm, the combined capacitance CTOTAL satisfies an equation 1/CTOTAL=1/C+1/C2+Cm when the finger touches the terminal of the capacitor C. Therefore, by changing the electrostatic capacitance C, it is possible to determine the limit value of the combined capacitance detected by the touch panel. Further, it is possible to specify the limit value of the electrostatic capacity C to detect the capacitance Cm of the human body through the electrostatic capacitance C and the element 111. The limit value of the electrostatic capacitance C is an indicator deciding a gap to be set between device electrical circuit of the 110N and the touch panel in order to suppress the interaction between the information device 200 and SW115 as described in the embodiment 23, the photodiode WPD, the photoelectric conversion element array 112 and the control unit and the like (the electric circuit of the apparatus 110N). Further, the limit value of the capacitance C can specify the limit value of the junction capacitance of a semiconductor circuit such as a transistor included in the SW115 when the SW115 is OFF.

That is, unless the electrostatic capacitance between the electric circuit such as the SW115, the photodiode WPD, the photoelectric conversion element array 112, and the control unit, and the touch panel is less than the limit value, there is a possibility of generating the interaction between the electric circuit of the apparatus 110 N and the touch panel. Further, unless the junction capacitance of the SW115 is less than the limit value, even when the SW115 is turned off, there is a case where the SW115 does not function as OFF when the touch panel detects the electrostatic capacitance with the AC signal, and the physical quantity output OFF (OFF of SW115) from the element 111 may not be detected.

Experimental results are shown in FIG. 188 to FIG. 190. FIG. 188 shows the experimental result when the diameter of the element 111 is 7 mm. In FIG. 188, the presence (touch operation) of the element 111 cannot be detected for both the iphone 5S and the iphone 6 with the shielded wire length of 5.3 mm and the electrostatic capacitance C=1.54 pF. On the other hand, when the length of the shielded wire is 6.0 mm or more and the electrostatic capacity C is 1.74 pF or more, both the iphone 5S and the iphone 6 can detect the presence (touch operation) of the element 111. Thereat, when the diameter of the element 111 is 7 mm, the limit value of the capacitance C can be specified to be about 1.64 pF for both iphone 5S and iphone 6. In both cases, an intermediate value between the electrostatic capacitance when it could be detected and the electrostatic capacitance when it could not be detected was adopted. The same applies to the following.

FIG. 189 shows the experimental result when the diameter of the element 111 is 7.5 mm. In FIG. 189, the presence (touch operation) of the element 111 cannot be detected for both the iphone 5S and the iphone 6 with the shielded wire length of 6 mm and the electrostatic capacitance C=1.74 pF. On the other hand, when the length of the shielded wire is 6.8 mm or more and the electrostatic capacity C is 1.972 pF or more, the iphone 5S can detect the presence (touch operation) of the element 111. Thereat, when the diameter of the element 111 is 7.5 mm, in the iphone 5S, the limit value of the electrostatic capacitance C can be specified as about 1.86 pF. Further, when the length of the shielded wire is 7.8 mm or more and the electrostatic capacity C is equal to or more than 2.262 pF, the iphone 6 can detect the presence (touch operation) of the element 111. Therefore, when the diameter of the element 111 is 7.5 mm, the limit value of the electrostatic capacitance C in iphone 6 can be specified to be about 2.12 pF.

FIG. 190 shows the experimental result when the diameter of the element 111 is 8 mm. In FIG. 190, the presence (touch operation) of the element 111 cannot be detected for both the iphone 5S and the iphone 6 with the length of the shielded wire being 6.8 mm and the capacitance C=1.972 pF. On the other hand, when the length of the shielded wire is 7.6 mm or more and the electrostatic capacity C is 2.204 pF or more, both the iphone 5S and the iphone 6 can detect the presence (touch operation) of the element 111. Thereat, when the diameter of the element 111 is 8 mm, the limit value of the electrostatic capacity C can be specified to be about 2.09 pF for both iphone 5S and iphone 6.

Meanwhile, the electrostatic capacitance $C_2$ formed between the element 111 and the touch panel is as follows.

ε: Relative dielectric constant of the gap between a sensor of the touch panel and the conductor (for example, glass on the touch panel surface)=7.5 d: distance of gap (m)=0.2 mm

S: Regarding the area (square m) of the conductor, both the conductor and the sensor have a diameter of 8 mm.

From the dielectric constant in vacuum ∈o=8.854e−12,

C2=6.64E−11×2×7×0.004 m×0.004 m/0.0002 m=3.34 E−10=33.4 pF.

In addition, the capacitance of the human body has been reported as Cm=100 pF to 150 pF (Journal of the Institute of Electronics, Information and Communication Engineers B Vol. J 84-B, no. 10 pp. 1841-1847 October 2001).

Therefore, as the combined capacitance CTOTAL of the electrostatic capacitance C of the shielded wire, the electrostatic capacity of the element 111, and the electrostatic capacity Cm of the human body, the electrostatic capacity $C_2$ of the element 111 and the electrostatic capacity Cm of the human body are almost negligible. From the above, it can be specified that the limit electrostatic capacity that can be detected by the touch panel is about 1.6 pF to about 2.2 pF as shown in FIG. 188 to FIG. 190.

When ½ is adopted as the safety coefficient for turning off or suppressing the interaction, in order to prevent the touch panel from detecting the electrostatic capacitance, the junction capacitance at the time of shutting off the SW115 is not more than 0.8 pF is desirable. Further, in order to suppress the interaction between the touch panel and the portion other than the element 111, that is, the SW115, the photodiode WPD, the photoelectric conversion element array 112, the control portion, and the like, it is necessary to keep a gap that the electrostatic capacitance between the portion other than the element 111 and the touch panel is 0.8 pF or less.

Furthermore, when ⅓ is adopted as the safety coefficient, in order to prevent the touch panel from detecting the electrostatic capacitance, the junction capacitance at the time of shutting off the SW115 is desirably 0.5 pF or less. Further, in order to suppress the interaction between the touch panel and the portion other than the element 111, that is, the SW115, the photodiode WPD, the photoelectric conversion element array 112, the control portion, and the like, it is necessary to keep a gap that the electrostatic capacitance between the portion other than the element 111 and the touch panel is 0.5 pF or less.

For example, it is assumed that a component P having a circular bottom surface with a diameter of 8 mm is present in the control portion and exerts an action by the floating capacitance Cf on the touch panel. The electrostatic capacity between the part P and the touch panel is calculated with Cf=εS/d assuming the air relative dielectric constant to be 1 and it is about 0.45 pF at the distance d=0.2 mm to the touch panel, It meets the limit value of the electrostatic capacity in the case of the coefficient of ⅓. Also, it is about 0.75 pF at the distance d=0.12 mm, which meets the limit value of the electrostatic capacity when the safety factor is ½. Furthermore, it is about 1.58 pF at the distance d=0.057 mm, which meets the limit value of the electrostatic capacity in the case of the safety coefficient 1.

On the other hand, when the safety coefficient at ON is 2, in order for the touch panel to detect the capacitance as the physical quantity of the element 111, the electrostatic capacity at the time of ON is preferably 6.6 pF or more. This value can be sufficiently attained by the electrostatic capacity $C_2$ of the element 111 and the electrostatic capacity Cm of the human body when the SW115 is ON.

[Limit Value of ON Resistance of SW]

Hereinafter, with reference to FIG. 191 to FIG. 192, the experimental result on the limit value of the ON resistance of SW115 will be described. FIG. 187 illustrates the configuration of the experimental fixture and experimental procedure. In this experiment, various resistances were inserted between the element 111 and the human body, and it was investigated whether or not the touch panel detects the change in the physical quantity from the element 111 as a touch operation. The resistance value acquired at this time can be regarded as the limit value of the ON resistance of SW115.

FIG. 192 shows the experimental results. Also in this experiment, it was investigated whether iphone (registered trademark) 5S and iphone (registered trademark) 6 can detect the element 111 to which a human body is connected through the above resistance by changing the resistance value R. The diameter of the element is 7 mm, 7.5 mm, 8 mm similar to the investigation of capacitance. As shown in FIG. 192, in iphone (registered trademark) 5S, any diameter can be detected at about 1,200 kohm or less. Also, it was undetectable at more than 1500 kohm. From the above, the limit resistance value of iphone (registered trademark) 5S can be specified to be about 1,350 kohm. On the other hand, in iphone (registered trademark) 6, it was detectable at 820 kohms or less, and it was undetectable at over 1000 kohms. From the above, the limit resistance value of iphone (registered trademark) 6 can be specified to be about 910 kohm.

Twenty-Seventh Embodiment

The apparatus 110P according to Embodiment 27 will be described with reference to FIGS. 193 to 195B. In Embodiment 27, a pattern code (electrostatic capacity code) output by the apparatus 110P due to a physical quantity change and a process of the information device 200 that detects the pattern code are exemplified. The output of the pattern code of this embodiment and the method of reading the pattern code by the information device 200 can be applied to the pattern-code output and reading of the code generation apparatus 1 in above-described Embodiment 0, and of the apparatuses 110 to 110N (hereinafter simply referred to as the apparatus 110 and the like).

In the configuration of the apparatus 110P according to the present embodiment, other than the arrangement of the elements 111, it is not explicitly shown, but it is the same as the configuration of the devices 110 and the like of the above embodiments.

Therefore, as necessary, the configurations of the devices 110 etc. of the above-described embodiments are cited.

Therefore, for example, the CPU116 exemplified in FIGS. 58, 64, and the like can be referred to as an example of an information input unit and an information output unit, and the SW115 can be regarded as an example of a physical quantity control unit. Further, the photoelectric conversion element array 112A and the comparator 118 illustrated in FIG. 64 can be regarded as one example of one or more detection units that detect the amount of incoming of energy by incoming light or electromagnetic waves. However, for example, in the case of using the apparatus 110K exemplified in FIG. 149, it can be regarded as one or a plurality of detection units that detect the incoming amount of energy due to light or electromagnetic waves arriving from the photodiodes WPD1 to WPD6.

The touch panel of the information device 200 or the touch panel 31 of the code recognition apparatus 3 illustrated in FIG. 5 can be regarded as an example of a panel. Further, the pattern based on the change in the physical quantity output from the apparatus 110P to the information device 200 is an example of the first information, and the optical code emitted from the information device 200 from the display is an example of the second information.

FIG. 193 illustrates the configuration of the element 111 on the back surface where the apparatus 110P contacts the touch panel and the pattern code output from the element 111. In the present embodiment, individual elements 111 are distinguished from 111-1 to 111-5 by using branch numbers.

Also, when they are collectively referred to, it is referred to as element 111.

However, in Embodiment 27, the number of elements 111 is not limited to five. The apparatus 110P may have six or more elements or four or less elements. In the figure, numbers 1 to 5 are given in circle marks exemplifying 111-1 to 111-5. The number given in the circle in the figure is the element number. The element number is a number for identifying the element. For example, when the information device recognizes the position of the element on the touch panel, the element number is assigned to identify the recognized element.

In twenty-seventh Embodiment, one information pattern and the next information pattern included in each pattern code are segmented into delimiter patterns. The delimiter pattern is a pattern in which all the elements 111 are OFF. When the element 111 is turned off, it means that the SW115 connecting the element 111 and, for example, the contact conductor 114 described in FIG. 67A is OFF.

In the upper left of FIG. 193, the arrangement of the elements 111-1 to 111-5 is exemplified. Here, it is assumed that elements 111-1 to 111-5 correspond to bits 1 to 5, respectively, in one pattern. Bit 1 is the rightmost bit of the bit string and bit 5 is the leftmost bit of the bit string. Here, the bit pattern corresponding to the physical quantity output from the elements 111-1 to 111-5 is represented by b5, b4, b3, b2 and b1. b1 is a bit corresponding to the physical quantity output from the element 111-1, and b5 is a bit corresponding to the physical quantity output from the element 111-5. In FIG. 193, a bit pattern for a combination pattern (hereinafter simply referred to as a pattern) are exemplified. Serial numbers 1 to 6 are assigned so that the position (timing) on the time axis on which each pattern is output can be identified. This serial number can also be said to identify each pattern.

Among the serial numbers, 1A, 2A, 3A, 4A, 5A, and 6A indicate delimiter patterns after outputting information patterns of serial numbers 1 to 6 (patterns transmitting information with any of the elements ON). By inserting a delimiter pattern of serial numbers 1A, 2A, 3A, 4A, 5A, 6A in a pattern code (block of pattern sequence) including a series of patterns, one pattern and the next pattern can be clearly discriminated. Also, for example, even when the ON state remains to some extent under the influence of the floating capacitance when the ON element is turned off, it is possible to clearly distinguish one pattern from the next pattern by providing a break pattern.

In the figure, for serial number 0, a pattern of all OFF is exemplified. This example illustrates a state in which the apparatus 110P has not yet been detected by the information device 200. In this example, next, the apparatus 110P outputs a pattern of all ON (serial number 1) and further outputs a delimiter pattern output (serial number 1A). Here, the pattern of all ON is the reference pattern in Embodiment 27. The reference pattern is also called a header pattern. By detecting the reference pattern, the information device 200 can recognize the arrangement of elements in each pattern included in the pattern code.

In FIG. 193, the apparatus 110 P outputs the parity pattern (serial number 2) next to the reference pattern and further outputs the delimiter pattern output (serial number 2A). Thereafter, the apparatus 110P outputs four pairs of information patterns and delimiter patterns. Then, the apparatus 110P repeatedly outputs the same pattern code again.

In the pattern code of twenty-seventh Embodiment, when at least one of the elements 111-1 to 111-4 is OFF, the information pattern defining the information turns on the element 111-5. With such a pattern configuration, the information pattern can be distinguished from the all-OFF delimiter pattern. On the other hand, when the element 111-1 is turned on from the element 111-1, the apparatus 110P turns off the element 111-5. With such a pattern configuration, the information pattern can be distinguished from all ON header patterns. Also, even when all the elements 111-1 to 111-4 are turned on by the parity pattern (serial number 2), the apparatus 110P turns off the element 111-5. With such a pattern configuration, the parity pattern can be distinguished from all ON header patterns.

In each pattern of FIG. 193, a time delay may occur in the time when each element 111 is turned on. Therefore, at the time of reading a pattern, the information device 200 (1) monitors whether any element 111 is turned on after detecting all OFFs, (2) monitors whether or not each of the elements is turned on until all elements are turned off when any of the elements 111 is turned on, (3) confirms which element 111 turns on during the period from all previous OFF (all OFF of (1)) to all current OFF (all OFF of (3)) when all next OFF is detected. Through such a procedure, even if the ON time of each element fluctuates, the information device 200 can recognize the combination of the elements 111 that have been in the ON state at least once and can specify the information pattern.

As described above, the pattern of all OFF is excluded from the information pattern defining the information. This is because all the OFF patterns have a role as a delimiter pattern for a pattern in which at least one element 111 is turned on since at least one element 111 is turned on and detected by the touch panel.

Further, in the present embodiment, the pattern of all ONs and the parity pattern are excluded from the information pattern defining information. All ON patterns are included in a predetermined number of patterns defining a pattern code (that is, a capacitance code). By including one reference pattern in a predetermined number of patterns defining the pattern code, the information device can assign the element number to the position of the reference pattern and decrypt the information pattern other than the reference pattern. Therefore, the reference pattern has a role of a special pattern for a reserved word distinguished from the information pattern, and is not included in the information pattern. In addition to the reference pattern, a predetermined number of reserved words specifying various roles may be provided and excluded from the information pattern. For the special pattern as the reserved word, a pattern designating interrupt processing may be provided in addition to the reference pattern. Also, a reserved word for notifying status such as error occurrence may be provided.

In FIG. 196, the parity pattern is exemplified. However, in this embodiment, since the pattern acquired by the touch panel is folded back from the display to the apparatus 110P with the optical code and the correctness check is performed, the apparatus 110P and the information device 200 may omit the parity check without exchanging the parity check pattern.

FIG. 194A illustrates a configuration of information defined by a combination of patterns in FIG. 193. When information patterns (1) to (4) in FIG. 193 are combined, a 16-bit pattern code is formed. The information pattern (1) represents a bit pattern 0011 in which the elements 111-1 and 111-2 are ON patterns. The information pattern (2) is a pattern in which the element 111-1, the element 111-3, and the element 111-4 are ON, and represents a bit pattern 1101. Similarly, the information patterns (3) and (4) represent the bit patterns 1111 and 0000, respectively. Therefore, from the physical quantity output shown in FIG. 193, the information device 200 can decrypt the 16-bit pattern code exemplified in FIG. 194A.

FIG. 194B illustrates the setting of a parity pattern. The parity bits can be calculated by adding (exclusive ORing) the bits of information patterns (1) to (4) for each of the elements 111-1 to 111-4. In the example of FIG. 194B, each bit of the information patterns (1) to (4) and an even parity where the addition (exclusive OR) including the parity bit becomes 0 are exemplified.

FIG. 195A is a diagram illustrating a procedure of signal exchange in the case where there is an error in the pattern output from the element 111 corresponding to FIG. 193. In the present embodiment, the pattern output from the element 111 is sent back to the apparatus 110P with the optical code by the information device 200 by the light emission of the display. Therefore, in FIG. 195A, in addition to the pattern from the element 111 exemplified in FIG. 193, an optical code is also illustrated. Further, a column (indicated by numbers 1 to 5 in the rectangle) of the photodiodes WPD1 to WPD5 is exemplified at a position indicated by an arrow of a symbol 110P illustrating the working surface of the apparatus 110P.

Upon recognizing the all-OFF pattern from the element 111, the information device 200 specifies the pattern from the combination of the ON positions already acquired from the element 111. Upon specifying the pattern, the information device 200 converts the specified pattern into a bit pattern and immediately transmits it from the display with an optical code. In the figure, firstly, the information device 200 specifies a pattern of numbering number 1, and the bit pattern of 11111 converted from the specified pattern is transmitted as an optical code.

Next, the apparatus 110P transmits the information pattern (1) of the serial number 2 (corresponding to the bit pattern of 10001), and the information device 200 identifies the pattern (1), converts it into the bit pattern 10001 and transmits it with an optical code. Further, the apparatus 110P transmits the information pattern (2) of the serial number 3 (corresponding to the bit pattern of 10011), but the information pattern specified by the information device 200 has a different information pattern (corresponding to 10010 where the bit is missing). The information device 200 converts the acquired information pattern into a bit pattern in the same manner as described above and transmits it to the apparatus 110P. That is, the information pattern (2) transmitted from the apparatus 110P with the serial number 2 and the optical code transmitted by the information device 200 by folding back are different.

Then, in the apparatus 110P, a part of the information pattern (2) is missing, the bit pattern transmitted from the display of the information device is 10010, and it turns out that it is an error. The apparatus 110P outputs an error retransmission pattern to retransmit the same information pattern (2). The error retransmission pattern and all ON and all OFF are patterns not used in the information pattern, that is, reserved words, and the information device 200 can determine the occurrence of an error and execute error correction. Since the information pattern after the error correction is also transmitted from the information device 200 to the apparatus 110P with the optical code according to the same procedure, it can be confirmed whether the error correction was correct or not.

FIG. 195B is a diagram illustrating a transmitted pattern code. According to the procedure of FIG. 195A, a 20-bit pattern code 10000 01111 10011 10001 is transmitted. However, since all the ON patterns (11111), the whole delimiter pattern OFF (00000), and the error retransmission pattern (11110) are excluded as the reference pattern of 5 bits=32, they can be described by the pattern code of this embodiment, the information amount is the numerical value of (4 3)=707, 281 in (32−3). Therefore, it is reduced by about 30% from the value of the information of all 20 bits=1,048,576. However, for example, when a flag such as an error is assigned to one bit of the five elements 111 and the remaining four bits are used for the information pattern, it is a numerical value of 4 bits×4=16 bits=65 and 536. Therefore, in the communication system of this embodiment provided with the reserved words such as the reference pattern, the delimiter pattern, and the error retransmission pattern, the data can be greatly increased as compared with the scheme in which the flag bit is provided.

FIGS. 196 to 201 illustrate a process of exchanging a physical quantity output pattern including the all-OFF delimiter pattern exemplified in FIG. 193 between the apparatus 110P and the information device 200. FIG. 196 shows an example of processing in which the information device 200 acquires the pattern code output from the apparatus 110P. Since this process is a process of inputting a pattern due to a physical quantity change to the touch panel of the information device 200, it calls a panel input process. The detection event is information indicating that the CPU (the CPU 51 of the code recognition apparatus in FIG. 5) of the information device 200 detects the change in the physical quantity on the touch panel through the control circuit of the touch panel. Here, the change in the physical quantity means, for example, in the case of the capacitive touch panel, that the electrostatic capacity such as mutual capacitance on the touch panel changes from less than the threshold value to a value exceeding the threshold, or that the electrostatic capacity is changes from a value exceeding the threshold value to less than the threshold value. When the electrostatic capacitance detected from the element 110 of the apparatus 110P by the touch panel is less than the threshold value, it is said that the element 110 is OFF, and when the capacitance detected from the element 110 exceeds the threshold value, it is said that the element 110 is ON. As described in the first embodiment and the like, ON and OFF of the element 110 P correspond to ON and OFF of the SW115.

In the detection event detection processing, all coordinates of the touch panel are scanned, and coordinates changed from OFF to ON (or from ON to OFF) are detected. The information reported in the detection event is a change from OFF to ON on the touch panel, a change from ON to OFF, and position coordinates at which the change is detected. However, depending on the processing of the driver program that accesses the control circuit of the touch panel, in the case where a plurality of position coordinates on the touch panel that have been turned on are adjacent, a touch event may be notified as a single area. For example, instead of a group of position coordinates on the touch panel that was ON, the center coordinates of the area indicated by the group of position coordinates and the size of the area (for example, the area in the X axis or Y axis direction of the touch panel Length) or the like is notified.

FIG. 197 illustrates details of the detection event acquiring process (S140 of FIG. 196). In this process, the information device 200 determines whether there is a change in ON/OFF at any position on the touch panel (S1401). Then, when there is a change in ON/OFF at any position on the touch panel, next, the information device 200 determines whether or not the information device 200 is completely OFF (S1402). Here, "all OFF" means that there is no coordinate position where the physical quantity such as mutual capacitance exceeds the threshold value as a result of scanning each sensor on the touch panel. That is, when a detection event of all OFF is acquired, it indicates that all the sensors on the touch panel have been turned on at one or more positions so far all changed to OFF. When the operation surface of the apparatus 110P (that is, the arrangement surface of the apparatus 110) contacts the touch panel and the information device 200 recognizes the position of the apparatus 110, The detection of the touch event in S140 may be limited to the range in which the active surface of the apparatus 110P is in contact.

In the determination at S1402, if the detection event is not all OFF, the information device 200 determines whether or not the previous detection event was all ON (S1403). All ON means ON when it is detected at a position corresponding to the number of all the elements 111 of the apparatus 110P. When ON is detected at a position corresponding to the number of all the elements 111 of the apparatus 110P, the information device 200 determines that all ONs are detected. When the previous detection event is all ON, the information device 200 stores the position arrangement (referred to as a pattern) by the current detection event in the element buffer as a parity pattern (S1405). The element buffer is a buffer on the memory 117 that temporarily holds the result of the detection event and is a buffer that holds the coordinates of one set of the elements 111 (111-1 to 111-5 and the like in FIG. 193) of the apparatus 110P. It is to be noted that the information device 200 may store the coordinate group of the detected region for one element 111 or may store the center coordinates and dimensions. Then, the information device 200 returns the process to S1401.

On the other hand, if it is determined in S1403 that the previous event is not all ON, the information device 200 stores the ON position (that is, the position of the element) acquired in the detection event in the element buffer. As described above, when the ON position is stored in all the element buffers, the information device 200 recognizes that all ONs are detected. The information device 200 stores the position information (that is, the pattern) of the element buffers of all ONs as a reference pattern. The reference pattern is used as information for identifying the coordinates of a pattern other than the reference pattern and assigning the element number. Then, the information device 200 returns the process to S1401. Also, in the determination of S1402, if all OFF is determined from the detection event, the information device 200 ends the detection event acquiring process.

Next, returning to FIG. 196, the description will be continued. After the detection event acquiring process (S140), the information device 200 transfers the pattern of the element buffer to the memory and clears the element buffer (S141). Further, the information device 200 sends back the current pattern to the device with the optical code and instructs the next pattern output by the next physical quantity change (S142). For example, as illustrated in FIG. 156, the information device 200 executes light emission for synchronization, and sends back the value (also referred to as a code value) represented by the pattern code due to the physical quantity change detected immediately before the light emission of the synchronizing optical code as is to the apparatus 110P. By the optical code emission for synchronization, the information device 200 instructs the apparatus 110P to output the next pattern. The process of S142 can be said to be an example of responding the energy by the light or the electromagnetic wave including the information acquired by the partner device every output as the first information. Further, in the process of S142, the partner device detects the OFF state where all the one or more elements are OFF through the panel, and the OFF information that indicates that at least the OFF state is recognized is included in the second information It is an example of outputting.

Next, the information device 200 determines whether the number of patterns stored in the pattern memory has reached the number of information patterns+2 (S143). The number of information patterns+2 means that the information pattern, the reference pattern, and the parity pattern are stored. When the number of patterns stored in the pattern memory does not reach the number of information patterns+2, the information device 200 returns the process to S140.

At determination of the In S143, if the number of patterns stored in the pattern memory reaches the number of information patterns+2, the information device 200 executes a parity check with a predetermined number of patterns stored in the pattern memory (S144). Here, the information device 200 specifies the parity pattern from the storage order on the pattern memory. That is, the information device sets a pattern stored next to the reference pattern on the pattern memory as a parity pattern. When the end of the series of patterns stored in the pattern memory is the reference pattern, the information device 200 determines that the first pattern is a parity check pattern. Then, the information device 200 performs exclusive OR on each element of a predetermined number of information patterns on the pattern memory excluding the reference pattern and the parity pattern, and compares it with the parity pattern.

In the case of a parity error (NG) in the parity check of S144, the information device 200 erases the information pattern to be parity-checked from the pattern memory and notifies the apparatus 110P of the error (S145). As described in S142, in the embodiment 27, the information device 200 executes light emission for synchronizing optical code and error checking is performed on a pattern basis since the information device 200 sends the value (also referred to as the code value) represented by the pattern due to the physical quantity change detected immediately before the light emission of the synchronization optical code back to the apparatus 110P. That is, if there is a mismatch between the code value included in the returned synchronizing optical code and the pattern outputted immediately before the apparatus 110 P, the apparatus 110P re-outputs the pattern with an error bit (see FIG. 156). Therefore, the parity check of S144 and S145 may be omitted.

On the other hand, if the parity check in S144 is OK, the information device 200 assigns the element number to the position of the element of each pattern on the pattern memory based on the reference pattern (S146). In the case where the reference pattern is an asymmetric pattern in the upper, lower, left and right directions, the information device 200 can determine the orientation of the reference pattern, and assigns the element number to the position corresponding to each element of the apparatus 110P on the reference pattern. More specifically, the information device 200 associates the coordinates of each element with the element numbers. Then, the information device 200 identifies the pattern by assigning the element number based on the position information of the elements of the pattern memory. Then, the information device 200 acquires the pattern code (electrostatic capacity code), and notifies the apparatus 110P of completion of acquisition (S147).

FIG. 198 is a flowchart illustrating panel input processing that does not perform a parity check. In this processing, the processing of S140 to S142 is the same as that of FIG. 196, so that the description thereof will be omitted. In this process, the information device 200 determines whether or not the stored number of patterns has reached the number of information patterns+1 (S143A). In addition to the number of information patterns, the number of information patterns+1 is the number of patterns when a reference pattern is acquired. When the number of stored patterns does not reach the number of information patterns+1, the information device 200 returns to the processing of S140 and executes the detection event acquiring process.

On the other hand, when the number of stored patterns reaches the number of information patterns+1, the information device 200 assigns the element number to the position of the element based on the reference pattern (S146). Then, the information device 200 acquires the electrostatic capacity code based on the element position information of the element buffer and the element number of the reference pattern (S148). Then, the information device 200 notifies the apparatus 110P of the acquisition completion of the pattern code (electrostatic capacity code) (S148).

FIG. 199 is a flowchart illustrating a pattern output process by a change in the physical quantity of the apparatus 110P. In this process, the apparatus 110P outputs the first pattern and then outputs all the OFF patterns (S170). Then, the apparatus 110P waits for an output instruction of the next pattern (S171). If there is no output instruction of the next pattern, the apparatus 110P judges whether or not the completion code is received instead of the output instruction of the next pattern (S178). Upon receiving the completion code, the apparatus 110P terminates the pattern output. On the other hand, in the judgment of S171 and S178, if there is no output instruction of the next pattern and no completion code is received, the apparatus 110P returns to the processing of S171.

On the other hand, if it is determined in S171 that the next pattern output instruction is received, the apparatus 110P acquires the return pattern sent with the optical code together with the next pattern output instruction (S172). In the present embodiment, upon detecting all the OFF patterns, the information device 200 transmits an output instruction of the next pattern as an optical code to the apparatus 110P. In the output instruction of the next pattern, the pattern outputted to the information device 200 due to the change in the physical quantity of the element 111 from the previous apparatus 110P is folded back. This pattern is called a folded pattern.

In S171 and S172, the apparatus 110P acquires a return pattern, the information input unit can be said to be an example of acquiring response information from the responded energy. Further, the output instruction and the returning pattern of the next pattern are an example of response information. Also, an output instruction and a return pattern of the next pattern can be referred to as OFF identification information.

Then, the apparatus 110P compares the sent pattern with the returning pattern (S173). The sent pattern is a pattern that has been transmitted last time, which is held by the apparatus 110P until the loop pattern is received. When the sent pattern matches the returning pattern (YES in S174), the apparatus 110P outputs the next pattern (S176).

On the other hand, if the sent pattern and the returning pattern do not match (NO in S174), the apparatus 110P re-outputs the sent pattern (S175). The process in S173 is an example of a true/false determination. In addition, the processing of S175 can be regarded as an example of re-outputting the corresponding predetermined amount of information. In addition, in the processes of S175 and S176, after inputting the OFF identification information, the information output unit causes the ON state to be caused by a change in the next physical quantity using the OFF identification information as a synchronization signal. After outputting the patterns of S175 and S176, the apparatus 110P outputs a pattern of all OFF (S177). Then, the apparatus 110P returns the process to S191.

In the processing of S175 to S177, the apparatus 110P turns on at least one of the one or more elements at the first time point, and at the second time point after the first time point, all the one or more elements are in the OFF state can be said to be an example of the process. Further, in this embodiment, the change in the physical quantity that the apparatus 110P causes the touch panel to detect from the element 111 is an example of a change that causes an ON state detected by the panel and an OFF state where the physical amount from the element is not detected by the panel can be said.

FIG. 200 illustrates a modification of the panel input process. In the figure, the information device 200 that detects the pattern code detects the start pattern code output by detecting the reference pattern of all ON. In the processing of FIG. 199, the information device 200 starts by detecting all the ON patterns (S150). It is to be noted that before the detection of all ONs, the information device 200 can be regarded as a state in which the presence of the apparatus 110 is not recognized.

Upon detecting all the ONs, the information device 200 specifies the arrangement of the elements 111 (S151). Then, the information device 200 waits until all of the elements 111 are turned off (S152). Upon detecting all OFF (YES in S152), the information device 200 waits until one or more elements are turned on (S153). When a predetermined time has elapsed before one or more elements are turned on and timeout occurs (YES in S154), the information device 200 ends the process.

When at least one element 111 is turned on in the determination of S153 (YES in S153), the information device 200 stores the identification of the ON element 111, that is, which of the elements 111-1 to 111-5 (S155). Then, the information device 200 determines whether the element 111 has detected all OFF (S156). If the information device 200 cannot detect the full OFF, the process returns to S155 and the ON element is stored. In this manner, the information device 200 stores which element 111 is turned on until all OFF is detected.

If it is determined in S156 that all OFFs are detected (YES in S156), the information device 200 specifies and saves one output pattern. That is, the ON element 111 detected in the process of S155 is set to bit 1, and the bit pattern 4 bits with bit 0 as the element that did not turn on are stored (S157). In the embodiment 27, since the number of elements 111 is not limited to five, the number of bits resulting from one pattern output is not limited to four bits.

Next, the information device 200 emits an optical code for error check, that is, an optical code corresponding to the bit pattern stored in S157 to the photodiodes WPD1 to WPD5 of the apparatus 110 (S158). The arrangement position of the photodiodes WPFD1 to WPD5 may be, for example, in the vicinity of the element 111 as shown in FIG. 72G, or may be the arrangement position as shown in FIG. 179. When the apparatus 110P receives an optical code corresponding to the bit pattern stored in S157 in S158, the apparatus 110P judges whether or not the pattern output from the element 111 and the optical code received from the photodiodes WPFD1 to WPD5 match. When the apparatus 110P detects an error, the element 111 re-outputs the pattern. The procedure in which the apparatus 110P re-outputs the pattern is the same as that illustrated in FIGS. 166, 167, 168, and 169, for example. That is, the apparatus 110P holds the outputted pattern code for a certain period of time, and if there is a mismatch between the optical code sent back from the information device 200 and the output pattern code, for example, it outputs the index of the pattern code detecting the error, and further output the pattern code in which the error is detected. That is, the error correction procedure in the case where an error is detected in the apparatus 110P by the optical code output in S158 is the same as in the embodiment 20.

Next, the information device 200 determines whether or not a prescribed number of patterns, that is, the number of information patterns+one pattern has been saved (S159). That is, the number of information patterns+one pattern means that the input of one pattern code has been completed. Therefore, the information device 200 specifies and stores a series of pattern codes (electrostatic capacity codes) (S160). The saved pattern code includes a bit pattern corresponding to the parity pattern of FIG. 193 and a bit pattern corresponding to information patterns (1) to (4). The parity check may be checked by a higher-level program than the program that executes the processing in FIG. 200. Since the error check is executed for each pattern input by the process of S158, it is not necessary to execute the parity check. Further, as exemplified in FIG. 200, a parity check may be executed after the processing of S160. Then, the information device 200 returns the process to S153 and detects the next pattern code.

In FIG. 200, the pattern code starts with a header pattern of all ONs (serial number 1). However, the information device 200 does not necessarily start processing from the detection of the header pattern. The information device 200 may recognize that detection of a series of pattern codes has ended when the header pattern is finally detected after storing the parity pattern and the information patterns (1) to (4). Further, for example, the information device 200 may first recognize the information patterns (1) to (4) and then recognize the header pattern. In this case, the information device 200 has the input of the parity pattern next to the header pattern, and it is sufficient to detect the next pattern.

Similarly, the information device 200 may first recognize the information patterns (2) to (4) and then recognize the header pattern. In this case, the information device 200 may detect a subsequent pattern by inputting a parity pattern and an information pattern (1) next to the header pattern. The same is true when the information device 200 firstly recognizes the information pattern (3) or (4).

FIG. 201 is a flowchart showing a modified example of the communication process between the information device 200 and the apparatus 110P. In this process, the information device 200 emits an optical code in accordance with an output instruction from the apparatus 110, and causes the apparatus 110 to receive the optical code. Further, the information device 200 executes an error check by a return code. The process of FIG. 201 is called an optical code output process.

In this process, first, the information device 200 outputs a trigger signal with an optical code (S190). Next, the information device 200 waits for an instruction to output the next optical code (S191). If there is no next instruction to output the optical code, the information device 200 determines whether or not a completion code has been received instead of the next instruction to output the optical code (S198). When receiving the completion code, the information device 200 ends the optical code output process. On the other hand, in the judgment of S191 and S198, if there is no next instruction to output the optical code and no completion code is received, the apparatus 110P returns to the processing of S191.

On the other hand, if it is determined in S191 that there is an output instruction of the next optical code, the apparatus 110P acquires the returning pattern to be sent together with the next instruction to output the optical code (S192). In the present embodiment, in the output instruction of the next pattern, the information of the optical code transmitted (emitted) from the information device 200 last time to the element 111P is folded back as a pattern by the element 111. This pattern is called a folded pattern.

Then, the information device 200 compares the sent optical code with the returning pattern (S193). The transmitted optical code is an optical code that has been transmitted last time, which the information device 200 holds until reception of a return pattern. If the information of the transmitted optical code matches the information of the returning pattern, the information device 200 outputs the next optical code (S196).

On the other hand, if the transmitted optical code and the returning pattern do not match, the information device 200 re-outputs the transmitted optical code (S197). Then, the apparatus 110P returns the process to S191.

As described above, the apparatus 110P according to the present embodiment inserts an all-OFF pattern between the information pattern and the information pattern, so that it can output with distinguishing between the information pattern and the information pattern even in the case where it takes time to turn off after the element 111 turns on at the time outputting the physical quantity from the apparatus 110P, or in the case when there is a variation in the time until OFF by the element 111 (or each SW115 connected to each element 111). According to the procedure of the embodiment 27, after acquiring the pattern based on the change in the physical quantity, the information device 200 sends the information specified by the pattern back to the apparatus 110P with the optical code, causes the apparatus 110P to perform a true/false check, and re-outputs the pattern in some cases. Therefore, highly reliable communication can be realized between the information device 200 and the apparatus 110P by the pattern and the optical code due to the physical quantity change from the element 111 (the SW115 connected to the element 111).

Twenty-Eighth Embodiment

Processing of the apparatus 110Q according to the twenty-eighth Embodiment will be described with reference to FIGS. 202 to 206. In the present embodiment, a process of adjusting the threshold value for judging the output level of the physical quantity from the element 111 (the magnitude of the capacitance, the electric field strength) or the output level of the physical quantity of the information device 200 by the apparatus 110Q will be described. The configuration and processing procedure of the apparatus 110Q of the present embodiment can be applied to the output of the pattern code of the code generation apparatus 1 of Embodiment 0, the embodiments 1 to 9, the embodiments 20 to 23, the devices 110 to 110N and 110P in the embodiment 27 (hereinafter simply referred to as the apparatus 110 and the like) and reading thereof.

In the apparatus 110 and the like of above Embodiment 1, the area of the element 111 (hereinafter referred to as touch area) detected by the touch panel of the information device 200 varies depending on the capacitance of a person coming into contact with the contact conductor 114, the capacitance of the element 111 and the combined capacitance including the floating capacitance of the system from the element 111 to the person coming into contact with the contact conductor 114. In the present embodiment, the configuration and processing for adjusting the touch area of the element 111 detected by the touch panel of the information device 200 on the side of the apparatus 110Q will be described.

In the case where there is sufficient distance between the elements 111 and there is no arrangement of electric parts in the vicinity of the element 111, the area of a region affecting the touch panel by the circular element 111 having a diameter of about 7.5 to 8 mm (hereinafter referred to as a reaction region), or the dimension (for example, the maximum length which is the maximum length dimension) is substantially the same as the area and the maximum length of the touch region when touching a touch panel such as a smartphone or a tablet terminal with an adult's finger.

When the plural elements 111 are in the vicinity each other (about several hundred microns to several millimeters), the reaction region tends to become larger due to the coupling between the elements 111. When the reaction region is large, the size of the detection region of the touch panel when the SW115 is turned on is too large, so that there may be cases where the reaction region including two adjacent elements 111 is recognized as one. In addition, when the reaction region is too large, the center coordinate value of the reaction region detected by the touch panel may deviate from the position corresponding to the center of the original element 111. In this way, when the touch panel of the information device 200 detects a reaction area exceeding the proper reaction area, the optical code instructs the device side to be a proper reaction area, and the reaction area is controlled to be proper by turning on SW1 and SW1+SW2.

Due to the performance of a touch panel such as a smartphone or a tablet terminal and the influence of the dielectric constant and the thickness of the material of the protective sheet, the reaction area becomes small and it may be hard to recognize. In this way, when the size, area and the like of the reaction region detected by the touch panel of the information device 200 are smaller than the appropriate size, the information device 200 instructs the apparatus 110 Q side by an optical code so as to have an appropriate size and area.

That is, in the present embodiment, while the person comes into contact with the contact conductor 114 (FIG. 58 and the like), the element 111 of the apparatus 110Q is switched between ON and OFF. Then, in accordance with the touch area when the element 111 is ON, that is, the physical quantity of output from the element 111, the apparatus 200 determines the size of the surface portion where the touch sensor of the touch panel exceeds the touch detection threshold (for example, the number of electrodes). At this time, while changing the forward bias value of the SW115 as a parameter, the apparatus 110Q switches the element 111 between ON and OFF. The apparatus 110 then determines the most appropriate forward bias value.

FIG. 202 is a diagram illustrating a relationship among signal exchange of the apparatus 110Q and information device 200. As shown in the figure, in the apparatus 110Q, the forward bias voltage (or current) of the SW115 can be adjusted by the DAC DA1. Further, the CPU116 instructs the forward bias voltage (or current) of output from the DAC DA1. By adjusting the voltage value (or current value) from the DAC DA1 under the control of the CPU116, it is possible to adjust the resistance at the time of forward bias of SW115. For example, in the case that SW115 is an ordinary diode, in order to identify the voltage and the current of the diode by memorizing the relationship between the current, I, and the voltage, V, is saved in the memory and the like of the information device 200 in a map format, the forward bias voltage and the like may be instructed from the information device to the apparatus 110Q with an optical code.

In the example of FIG. 202, first, the user places a certain working surface of the element 111 of the apparatus 110 Q on the touch panel of the information device 200. Then, the information device 200 instructs the apparatus 110Q to execute forward bias adjustment processing. Then, in accordance with the instruction by the optical code from the information device 200, the apparatus 110Q biases the SW115 in the forward direction with a predetermined voltage value (for example, 0.7 V). The predetermined voltage value may be an initial value or a current setting value. Then, the touch panel detects the change in the physical quantity such as the mutual electrostatic capacitance (or the electric field strength from the element 111) between the element 111 and the touch panel due to the turning on of the SW115. Then, according to the detected change in the physical quantity, the touch panel determines the range over which the influence of the element 111 is exerted, that is, the size, area and the like of the region in which the change in the physical quantity corresponding to the touch operation on the touch panel is obtained.

When the size of the obtained region is within a tolerance range from an appropriate value, the information device 200 sends an optical code indicating OK to the apparatus 110Q. On the other hand, if the size of the region is too small relative to the appropriate value, the information device 200 instructs the apparatus 110Q to increase by a predetermined increment such as a forward bias voltage. On the other hand, if the size of the region is too large with respect to the proper value, the information device 200 instructs the apparatus 110Q to decrease by a predetermined increment such as forward bias voltage or the like. The CPU116 of the apparatus 110Q receives the instruction by the optical code via the photodiode, decrypts the instruction by the optical code, controls the DAC DA1, and adjusts the forward bias.

In this manner, the information device 200 repeats the instruction and the detection of the area on the touch panel until the size of the area reaches an appropriate value. Then, when the size of the obtained region falls within a tolerance range from an appropriate value, the information device 200 sends an optical code indicating OK to the apparatus 110Q. The CPU116 of the apparatus 110Q holds the setting value of the DAC DA1 when the OK is notified in a nonvolatile register and uses it as the setting value of the DAC DA1 in the subsequent processing.

Through the above processing, the size and the area of the region where the change in the physical quantity corresponding to the touch operation on the touch panel is obtained are adjusted so as to be close to the tolerance range from the appropriate value. Therefore, as one example, the CPU116 and the DAC DA1 control the SW115, which is a physical quantity control unit, to adjust the degree of operation on the panel in accordance with the change in the physical quantity generated in one or more elements 111.

FIG. 203 is a diagram showing a modification example of FIG. 202. As shown in FIG. 202, the apparatus 110Q may be provided with a pulse generator PG1 instead of the DAC DA1. The pulse generator PG1 applies the forward voltage (or current) of SW115 (semiconductor switch) as a pulse signal of a predetermined duty ratio and a predetermined frequency. For example, the apparatus 110Q increases the forward voltage (or current) and decreases the forward resistance of the semiconductor switch by bringing the duty ratio close to 1 (100%). In addition, the apparatus 110Q can lower the forward voltage (or current) and increase the forward resistance of the semiconductor switch by lowering the duty ratio from 1 (100%).

Therefore, similarly to the case of FIG. 202, if the size of the information device 200 area affected by the element of the apparatus 110Q is too small relative to the appropriate value, the information device 200 increases the duty ratio of the pulse signal by a predetermined increment to the apparatus 110Q. On the other hand, if the size of the region is too large with respect to the appropriate value, the information device 200 instructs the apparatus 110Q to decrease by the predetermined increment of the duty ratio of the pulse signal. The CPU116 of the apparatus 110Q receives an instruction by the optical code via the photodiode, decrypts the instruction by the optical code, controls the pulse generator PG1, and adjusts the duty ratio or the frequency. In this manner, the information device 200 repeats the instruction and the detection of the area on the touch panel until the size of the area reaches an appropriate value.

It should be noted that the CPU116 may change the frequency instead of changing the duty ratio of the pulse signal. By changing the frequency, the impedance of the SW115 is changed. Therefore, similarly to the case of FIG. 202, the CPU116 and the pulse generator PG1 can change the impedance of the SW115 and can adjust the forward voltage (or current).

Through the above processing, the size and the area of the region where the change in the physical quantity corresponding to the touch operation on the touch panel is obtained are adjusted so as to be close to the tolerance range from the appropriate value. Therefore, as one example, the CPU116 and the pulse generator PG1 control the SW115, which is a physical quantity control unit, to adjust the degree of action on the panel in accordance with the change in the physical quantity generated in one or more elements 111.

FIGS. 204A and 204B are diagrams showing modifications of FIGS. 202 and 203. FIG. 204A is a figure exemplifying a plan view of the element 111, and a connection among each part in the plan view of the element 111, the contact conductor, and the semiconductor switches SW1 to SW4. FIG. 204B is a cross-sectional view of the element 111 in FIG. 204A taken along a plane including the P1 arrow and perpendicular to the plane of the paper.

In FIGS. 204A and 204B, the element 111 has a portion (conductor 1) of the central metal film and one or more portions of the annular metal film (conductor 2 to conductor 4) surrounding the central metal film portion. The conductors 1 to 4 can be connected to the contacting conductor 114 by the switches SW 1 to SW 4. Therefore, the CPU116 acts as an adjusting unit together with the switches SW 1 to SW 4, and the switch conductors SW1 to SW4 among the portion of the central metal film (conductor 1) and the portion of one or more annular metal films (conductor 2 to conductor 4) 114 in accordance with the number of parts to be conducted. As in the case of FIGS. 202 and 203, the device 200 obtains the reaction region by the element 111A in the initial state or the current setting value, and determines a combination in which SW 1 to SW 4 are turned on so that the dimensions and area of the reaction region become appropriate values. Example of the combination of switches to be ON signals is SW1, SW1+SW2, SW1+SW2+SW3, SW1+SW2+SW3+SW4, and the like.

As in the case of FIGS. 202 and 203, in the case where the size of the region affected by the element of the apparatus 110Q is too small relative to the appropriate value, the information device 200 turns on the switches SW1 to SW4 and the like, and instructs the apparatus 110Q with an increase in optical code. On the other hand, if the size of the area is too large with respect to an appropriate value, the information device 200 instructs the apparatus 110Q to increase the number of switches SW1 to SW4 to be turned off with an optical code. The CPU116 of the apparatus 110Q receives an instruction by the optical code via the photodiode, decrypts the instruction by the optical code, and increases or decreases the switch to be turned on according to the instruction. In this manner, the information device 200 repeats the instruction and the detection of the area on the touch panel until the size of the area reaches an appropriate value.

Through the above processing, the size and the area of the region where the change in the physical quantity corresponding to the touch operation on the touch panel is obtained are adjusted so as to be close to the tolerance range from the appropriate value. Therefore, as one example, the CPU116 controls the physical quantity control units SW1 to SW4 to adjust the degree of operation on the panel in accordance with the change in the physical quantity generated in one or more elements 111.

In this example, the element 111A is divided into the conductors 1 to 4, but the division number is not limited to 4. That is, the number of conductors may be three or less, or five or more. Also, the number of switches may be appropriately provided according to the number of conductors. Also, in FIG. 204, the conductor 1 is circular and the conductor 2 to the conductor 4 are annular, but these conductors are not limited to circular or annular ones. For example, the conductor 1 may be polygonal, or the conductor 2 to conductor 4 may be a polygonal annular pattern.

In the examples of FIGS. 204A and 204B, conductors having diameters of 6 mm, 7 mm, 8 mm, and 9 mm can be selected. However, when the device is manufactured, it is preferable that the distance between the conductors, the material of the conductor, the diameter of the conductor and the number of ring-shaped conductors may be determined by various conditions such as the filling with a nonconductive material, the dielectric constant of the material protecting the contact surface of the conductor, the length of the conductive wire and the like. Note that it is desirable to fill the space between the ring-shaped conductors with a material having a low dielectric constant with a nonconductor. This is because the coupling in the case of not energizing can be reduced as much as possible. Further, a gap may be provided between the ring-shaped conductors. Conductors may be convex.

FIG. 205 is a flowchart illustrating processing of the information device 200 that executes the calibration of Embodiment 208. In this process, the information device 200 transmits calibration start and forward bias setting instructions as optical codes to the apparatus 110Q (S201). Next, the information device 200 transmits a pattern output instruction to the apparatus 110Q (S202). In accordance with the pattern output instruction, the apparatus 110Q turns on the SW115 with the initial value or the current value. At this time, the apparatus 110Q may turn on the SW115 one by one or may turn on a plurality of SW115. Next, the information device 200 acquires the area of the reaction region (S203).

Then, the information device 200 determines whether or not the area of the reaction area is within an allowable range from an appropriate value (S 204, S 205). In the judgment of S204 and S205, if the reaction area is too large, the information device 200 instructs the apparatus 110Q to decrease (S206). The decrease setting is, for example, corresponding to a decrease in the forward bias, a decrease in the duty ratio, a decrease in the frequency, in FIG. 205, reduction in conductivity among the switches SW 1 to SW 4, and the like.

On the other hand, if the reaction area is too small in the judgment of S204 and S205, the information device 200 instructs the apparatus 110Q to increase setting (S206). Increase setting is, for example, corresponding to an increase in the forward bias, an increase in the duty ratio, an increase in the frequency, an increase in the conducting of the switches SW1 to SW4 in FIG. 205, and the like.

Then, in the judgment of S204, when the reaction area is appropriate, the information device 200 transmits a completion notice to the apparatus 110Q with an optical code. Upon receiving the completion notice, the apparatus 110Q holds the current setting by the calibration process in a nonvolatile register and uses it in subsequent processing.

As described above, in the information device 200 of the present embodiment, the apparatus 110Q can be set such that the reaction area on the touch panel affected by the element 111 of the apparatus 110Q becomes a proper value. From the detection result of the reaction area on the touch panel of the information device 200, the apparatus 110Q can be adjusted so that the size and area of the reaction become appropriate values.

FIG. 206 is a diagram showing processing of the information device 200 according to the modification of Embodiment 28. In Embodiment 28, the information device 200 instructs the set value of the forward bias and the like in the case where the SW115 is a semiconductor switch to the apparatus 110Q so that the reaction area becomes a proper value. In the modification shown in FIG. 206, the information device 200 adjusts the threshold value at which the touch sensor on the touch panel detects the change in the mutual capacitance so that the size and area of the reaction area are appropriate values. The other processes in FIG. 206 are the same as those in FIG. 205. That is, in FIG. 206, the description of processing from S201 to S205 is omitted because it is the same as that in FIG. 205.

In the judgement of S204 and S205, if the size and the area of the reaction are too large, the information device 200 increases the threshold value of the touch sensor of the touch panel (S216). As the threshold value increases, the touch sensor having the detection value reaching the threshold value decreases, and the size, area and the like of the reaction region decrease. On the other hand, if it is determined in steps S204 and S205 that the size and the area of the reaction are too small, the information device 200 reduces the threshold value of the touch sensor of the touch panel (S217). As the threshold value decreases, the touch sensor having the detection value reaching the threshold value increases, and the size, area and the like of the reaction region increase. When the size and the area of the reaction have reached an appropriate value (YES in S204), the information device 200 saves the threshold value in a nonvolatile memory or the like and notifies completion to the apparatus 110Q (S218).

According to the process of FIG. 206, it is possible to set the size and area of the reaction to an appropriate value by setting the information device 200 without providing a special configuration in the apparatus 110Q.

Twenty-Ninth Embodiment

Referring to FIGS. 207 to 209, the apparatus 110 of twenty-ninth Embodiment will be described. Each of FIGS. 207 to 209 shows a modified example of the element 111. The configuration of the apparatus 110 of the present embodiment can be applied to the code generation apparatus 1 of above-mentioned Embodiment 0, and to the apparatuses 110 to 110N, 110 P and 110 Q (hereinafter simply referred to as the apparatus 110 and the like) of Embodiments 1 to 9, Embodiment 23, Embodiment 27, and Embodiment 28.

FIG. 207 is a diagram illustrating the configuration of the element 111B. The figure is a combination of a plan view and a side view (front view) of the element 111B. As shown in the figure, the element 111B has a thick portion near the center, and a thin three-dimensional shape as it is closer to the periphery. That is, the surface of the element 111B that comes into contact with the touch panel has a higher center portion than the peripheral portion. That is, the height in the normal direction near the center of the contact surface of the element 111 B is a convex shape higher than the periphery.

Therefore, the central portion of the element 111B tends to adhere to the touch panel. On the other hand, a portion closer to the periphery of the element 111B is likely to have a slight air layer between it and the touch panel. With such a structure, the touch panel strongly detects the electrostatic capacity of the central portion, and the accuracy of recognizing the center coordinate position is improved. That is, the element 111B is formed such that the change in the physical quantity occurring in the vicinity of the center of each contact surface contacting the touch panel is larger than the vicinity of the contact surface.

FIG. 208 is a diagram illustrating the configuration of the element 111C. In the figure, the black part is a conductor. That is, the element 111C has a meshed conductor, and the conductor area per unit area covering the vicinity of the center of the contact surface is larger than around the periphery. That is, the element 111C achieves the distribution of the conductor density by combining the radial conductor and the annular conductor. With such a structure, the touch panel strongly detects the electrostatic capacity of the central portion, and the accuracy of recognizing the center coordinate position is improved. That is, the element 111C is formed such that the change in the physical quantity occurring in the vicinity of the center of each contact surface contacting the touch panel is larger than the vicinity of the contact surface.

FIG. 209 is a diagram illustrating the configuration of the element 111D. In the element 111D, a material with a lower resistance value is used as it gets closer to the center, and a material with a higher resistance value is used as it gets closer to the periphery. That is, the conductivity of the element 111D near the center of the contacting surface is higher than that in the vicinity of the periphery. For example, in the case of forming the element 111D by printing, the resistance value can be reduced by gradually changing the printing density (halftone dot) of the conductive ink like a gradation and by increasing the density near the center.

With such a structure, the touch panel detects the electrostatic capacity of the central region strongly and improves the accuracy to recognize the center coordinate position. That is, the element 111 D is formed such that the change in the physical quantity occurring near the center of each contacting surface comes into contact with the touch panel is larger than that in the surrounding part of the contacting surface.

Thirtieth Embodiment

The explanation is made about the system 110S relevant to the thirtieth Embodiment with FIG. 220 and FIG. 211. FIG. 211 shows the top view of the apparatus 110*s*, while FIG. 210 shows cross-sectional view of the apparatus 110 when the apparatus 110S is cut by the location shown by the arrows P2 and P2. The configuration of the apparatus 110S in this embodiment is adapted to the devices from 110 to 110N and from 110P to 110Q (simply, apparatus 110(*s*)), of the embodiments from 9 to 20, the embodiments from 27 to 28.

The apparatus 110S is covered by a conductive sheet on upper face side, the opposite side of working face. It is possible that the upper face side is covered by a high permittivity (dielectric) insulation layer where some pictures are printed on the surface. FIG. 211 shows a top view of the apparatus 110S when the conductive sheet is removed.

As shown in FIG. 211, the apparatus 110S has CPU 116, memory 117, battery 122, SW(s) 115, and photodiode(s) WPD on a board under the conductive sheet. A battery 122 is a button cell. It is possible that the battery 122 is changed to a solar panel when the apparatus 110*s* is thin. The control circuit area is defined as the area where the CPU 116, the memory 117, the battery 122, and the SW(s) 115, and the photodiode(s) WPD exist, when the apparatus 110S is shown from horizontal angle of the apparatus 10S.

As shown in FIG. 211 and FIG. 210, the elements 111 are placed on the working face side of the apparatus 110S. The area for the elements 111 is placed at another area of the control circuit area on the apparatus 110S at the top view. The area where elements 111 exist is called as element area. On the contrary, the control circuit area where no element 111 exists is called as non-element area.

The low permittivity (dielectric) insulation layer is a low permittivity and non-conducting material, and it is desirable that the material includes air layer. The low permittivity and non-conductive layer has, for example, porous non-conductive layer, or air gap, or the material of low permittivity insulation material. The examples of the structures are shown for example in the air layer or air gap of FIG. 128A, FIG. 128B, FIG. 133, FIG. 134, FIG. 135, and FIG. 136, for example non-conductive layers including air layer shown from FIG. 179 to FIG. 186B, and the layer filled by the material of M2.

A board is mounted on the upper layer of the low permittivity insulation layer (the opposite side of the working side). As shown in FIG. 210, penetrating conductive wires are installed from the elements 111 to the upper side (the opposite side of the working side) through the low permittivity insulation layer and the board. The penetrating conductive wires are contacted to the electrodes which are contacted to the SW115 at the under layer of the conducting sheet. That is to say, the elements 111 is contacted to the elements 111 by the penetrating conductive wires and wires on the upper side of the board. Besides, wires to connect SW115, CPU 116, memory 117, battery 122 and so on, on the control circuit area are omitted in FIG. 211.

Besides, openings are formed on the working side, so that the photodiodes WPD are mounted in the openings. The photodiodes WPD are mounted on the working side of the board, and they are connected to the control circuit area including CPU through omitted via wires and wires on the upper side of the board. Besides, the openings which mount the photo diodes WPD are covered by transparent material. It is possible that the shape of the open windows is a shape of taper so that they can gather light.

The apparatus 110S is the device works to a panel which detects physical quantity describing as follows. The apparatus 110S has the working side that generates the change in physical quantity so that the said panel can detect the change, and the manipulation surface where users manipulate at the opposing surface of the working side. The working side has an element area which has more than one element 111, and has a non-element area except for the element area.

There is insulating layer between the working side and manipulation surface, which consists of structures of porous, air gap, or low permittivity insulation layer are filled, and the manipulation surface of the insulation layer has a physical quantity control unit which generates physical quantity changes on more than one elements, and wire (control layer) which connect said physical quantity control unit to said more than one elements.

More than one elements are connected to the wire (control layer) through the penetrated conductive wire which runs through the insulating layer, and a physical-quantity controlling circuit is placed on the upper board which is manipulation surface corresponding to non-element area of the wire (control layer), and wirings connect said physical quantity control units and said penetrated conductive wires.

By said structure, the effects from such elements for control as wires on the board, a CPU 116, a memory 117, a battery 122, SW(s) 115 and so on. That is to say, thanks to the structures of low permittivity by the structures of porous, air gap, or low permittivity insulation layer, the effects by the elements for control can be decreased. Besides, it is possible to adapt a solar panel instead of a battery 122, so that a photoelectric conversion element array 112 gets lights from such lights of the display or indoor light, and provides electric power to every elements of the apparatus 110S, for example. Besides, like as from FIG. 65 to FIG. 67A of the embodiment 1, such energy sources as electro-magnetic waves, piezoelectric conversion, thermoelectric conversion can supply the power.

Also, when the apparatus 110*s* supplies the power by a solar panel or another device from light, such transparent structures for light to reach the display of an information devices as the supporting structure M1 of FIG. 182 (multi well shape openings by rectangular or honeycomb structure), as honeycomb structure like as shown in FIG. 185 is formed at the side where the solar panel is faced to light emission display of the information device 200.

So, when the touch panel detects such physical quantity as electro static capacitance or electric field by SW115 of the elements 111, the effects by said controlling elements can be decreased. So, the touch panel can stably detect the change in the physical quantity. Besides, the photodiode(s) WPD also can be placed at the nearest place to the upper surface of the board, as long as the photodiode(s) can receive the light signals from display.

Thirty-First Embodiment

The explanation about an apparatus 110T for the thirty-first Embodiment is described with the FIG. 212 and FIG. 216. FIG. 212 shows the top view (the opposite side of the working face side) of the apparatus 110T, while FIG. 213 shows cross-sectional view of the apparatus 110T vertical to the paper plain when the apparatus 110T is cut by the location shown by the arrows P3 and P3. As shown in the FIGs, the apparatus 110T consists of the elements 111 on the working face, an elastic low permittivity insulation layer which forms the working face, and a net shaped metal layer. The elastic low permittivity insulation layer is the insulation layer, where structures of porous, air gap, or low permittivity insulation layer are filled, as shown in the embodiment 30. However it is desirable that the elastic low permittivity insulation layer in FIG. 212 has larger elasticity. It is possible that the low permittivity insulation layer is formed of honeycomb structure or the permittivity insulation layer CA4 and spacer CA5 as shown in FIG. 128B.

The net shaped metal layer should be formed of as large mesh size as the finger(s) certainly touches the net shaped metal layer, when the user finger(s) touches the upper face (manipulation surface) in the net shaped metal layer. For example, the mesh size become a few mm square in case the shape of the mesh is rectangular, for example. FIG. 212 shows the example structure where a net shaped metal layer exists at the upper side (the opposite side of the working face side) of the area on which the elements 111 are located. That is to say, the penetrating conductive wire is contacted to the net shaped metal layer through low permittivity insulation layer.

When the apparatus 110S is put on the touch panel of the information device 200 and a user touches the net shaped metal layer, the change of such physical quantity as capacitance and electric field occurs on the surface on the elements 111. Then the information device 200 detects the change of the physical quantity through the touch panel. For example, by total 4 elements 111, the 4 positions are detected on the touch panel where the physical quantity was changed.

Furthermore, when a user pushes the net shaped metal layer, a part of the low permittivity insulation layer was depressed. Then, the depressed part of the net shaped metal layer becomes closer to the touch panel, the change in such physical quantity as capacitance between the touch sensor of the touch panel and the net shaped metal layer, or electric field on the touch panel surface is induced. As a result, the touch panel detects the change in the physical quantity by said depressed part in addition to the position change in the elements 111.

In the structure of device shown in the FIG. 212, a user lets the touch panel detect the position where physical quantity changes at the place where elements 111 are placed or where a user depressed around the elements 111. Besides, the number of the multi-touch by the touch panel is supposed to be maximum 5. So, 4 elements 111 are installed in order for the touch panel to detect the positions where physical quantity changes by the depressed place, or to detect 4 positions where physical quantity changes by the elements 111. Additionally, the number of the elements 111 can be reduced to 3 when number of the fingers for touch is 2. The elements 111 can be formed of aluminum foil, conductive paper, and printed conductive ink on the working face side (on the face of the elastic low permittivity insulation layer). In addition, high permittivity layer can be printed on the working face side.

Additionally, we suppose touch panel can detects the number of the multi-touch to be maximum 5, we do not need to fix the maximum number to be 5. That is to say, the apparatus 110T allows to reduce the number of the elements 111 by the difference number between the multi-touch maximum number and the number of fingers a user can manipulate at the same time. Additionally, the manipulation surface, upper surface of the net shaped metal layer can be covered by high permittivity material, and such drawing pattern of buttons can be printed on the high permittivity material for cover.

FIG. 214 and FIG. 215 show another example embodiment of the apparatus 110. FIG. 214 shows a top view of the apparatus 110T (from the opposite side of the working face), while FIG. 215 shows a cross-sectional view of another example embodiment of the apparatus 110, when the apparatus 110T is cut by the location shown by the arrows P4 and P4.

In the structure shown in FIG. 212 and FIG. 213, a user lets the touch panel detect the position where physical quantity changes at the place where elements 111 are placed or where a user depressed around the elements 111. On the contrary in the structure shown in FIG. 214 and FIG. 215, the region where elements 111 are placed and the region for the net-shaped metal is placed is separated in the top view of the apparatus 110T. Despite the area of the net-shaped metal layer where a user can depress is limited, the depression stably can work the touch panel by this structure. This is because the coupling between the depressed portion by the user fingers and the elements 111.

FIG. 216 shows the structure of the apparatus 110U, which is another formation example of the 4$^{th}$ embodiment of this invention. The top view, the left side view and the front view of the apparatus 110U are combined by broken lines and are shown in FIG. 216.

As shown the figure, the apparatus 110U consists of a dielectric layer having groove part, and a net-shaped metal layer on the dielectric layer. A printing conductive layer is allowed instead of the net-shaped metal layer. The printing conductive layer is, for example, conductive wires are formed by printing the conductive ink on the high permittivity insulation layer above the dielectric layer. The conductive printed layer can be printed at the same side where another kind of printing is done. A net-shaped metal layer or a printed conductive layer is called as a net-shaped metal layer. In case the shape of the mesh is grid, the pitch of the grid should be about 6 mm so that a finger can surely touch to the conductive wire or the conductive printed wire, as well as the touch panel surely detects the figure touch. In addition, the net-shaped metal layer corresponds to mesh-shaped conductive layer, and each wire of net-shaped conductive layer corresponds to the each conductive route. The mean to form the dielectric layer and the mesh-shaped metal layer, for example, a sheet where a metal mesh is placed, or a sheet printed by conductive ink is attached from the lower face to a mesh-grooved dielectric layer. Therefore, the metal mesh or the sheet printed by conductive ink is hidden by the sheet. On this structure, at the conditions where the sheet is enough thin and the permittivity is enough high, a change in such physical quantity as capacity or electric field on the elements 111 by the human touch to the mesh-shaped metal layer.

The lower face of the apparatus 110U is working face to the touch panel, and it has plural elements (4 elements in the figure). The elements 111 are connected to the net-shaped metal layer by the penetrated conductive wire penetrating the dielectric layer. Therefore, the user capacitance is connected to the elements 111 by the user finger(s) touch to the net-shaped metal layer, resulting in inducing the change in such physical quantity as capacitor or electric field to the working surface.

In addition, the apparatus 110U has groove parts in the dielectric layer corresponding to the portion of the conductive wire by the net-shaped metal layer as shown in the figure. The groove parts runs parallel to the conductive wire of the net-shaped metal layer, and the cross-section of the vacant groove is, for example, a rectangular shape which size is more than about 0.3 mm or a polygonal shape, or a round shape like as an aisle. That is to say, the groove parts are formed parallel to the conductive wire by the net-shaped metal layer. The width of the groove should be less than about 1 mm so that the touch panel works at finger(s) touch to the dielectric layer. Additionally, the groove depth is more than about 0.3 mm, so that the touch panel doesn't detect the capacitance of the conductive wire.

The touch panel becomes insensitive to the change in such physical quantity as capacitance or electric field by a user finger touch even to the net-shaped metal layer of the apparatus 110U, which is put on the touch panel. That is to say, the effect by the net-shaped metal or the net-shape printed conductive layer can be decreased by forming the net-shaped grooves.

On the contrary, the net-shaped metal layer is connected to the elements 111 by the penetrated conductive wires which penetrate the dielectric layer. Therefore, the touch panel detects the change in the physical quantity on the elements 111 by user figure(s) touches the ne-shaped metal layer. Additionally, the touch panel detects the change in such physical quantity as capacitance or electric field by a user finger(s) touch to the dielectric layer. Besides, in the case where the net-shaped metal is placed on the back face of the sheet, or in the case where the back face of the sheet is printed by the conductive ink to form net-shaped conductive wire, user finger(s) does not touch to the conductive wire or the dielectric material on the lower layer of the sheet. However, when the sheet thickness is enough thin, or the permittivity is enough high, the effect of the touch (change in capacitance or electric field) on the elements 111 can be effective through a sheet installed to the touch panel by a user. Also, when the sheet thickness is enough thin or the permittivity is enough high, the effect of the touch (change in capacitance or electric field) through a sheet installed to the touch panel by a user is effective.

Therefore, in the configuration of FIG. 216, unlike FIGS. 212 to 215, even when the dielectric layer has no elasticity and the net-shaped metal layer does not collapse, a change in the physical quantity at the element 111 caused by the net-shaped metal layer can be detected by the touch panel, and the touch panel detects changes in physical quantities such as mutual electrostatic capacity, electric field strength, which are detected by the touch operation of the finger on the dielectric.

It is assumed that the maximum value of the multi-touch number of the information device 200 is 5. In this case, in order to make the touch operation on the touch panel of the information device 200 by the user's finger effective, the number of elements 111 is four. In order for the user to perform a touch operation on the touch panel with two fingers, the number of elements 111 is three.

Therefore, in FIG. 216, it is possible to form an apparatus 110U of a card shape which is similar to a general plastic card and more convenient to use.

In the example of FIG. 216, a net-shape metal layer or net-shape printing layer is also formed in a region where the elements 111 are placed. Therefore, in the apparatus 110U of FIG. 216, even in the region where the elements 111 are arranged, a user can exert the action of the elements 111 on the touch panel in contact with or in proximity with the working faces via the mesh-shaped metal layer.

FIG. 217 is a modification of the apparatus 110U. In the example of FIG. 217, a net-shaped metal layer or net-shaped printing layer is formed in a region different from the element region where the conductive elements 111 are placed. Here, the element region refers to a planar region where the elements 111 are placed on the working surface side, when the apparatus 110U is viewed in a plan view. In the configuration of the figure, since there is no net-shaped metal layer in the element region on the manipulation surface (upper surface), in the element region on the manipulation surface side, a change in the physical quantity via the elements 111 cannot be exerted on the touch panel. However, when the user touches the mesh metal layer with the finger, the finger also touches the dielectric layer, so that the operation of the user is transmitted to the touch panel via the dielectric layer. In this case, since the operation by the user is performed in a region away from the element region, the influence of the element 111 is reduced, and the user can operate with stable operation through the dielectric layer.

FIG. 218 is a diagram illustrating the configuration of the apparatus 110U according to another modified example. FIG. 218 is a view in which a plan view, a left side view, and a front view of the apparatus 110U, are combined and drawn by a dotted line. As shown in FIG. 218, the apparatus 110U has a dielectric layer, the elements 111 on the lower surface of the dielectric layer which is the working surface, and a net-shaped metal layer on the upper surface of the dielectric layer which is the working surface. In the FIG. 218, the apparatus 110U has a SW115 for controlling the connection between the elements 111 and the mesh shaped metal layer, and a photodiode WPD for receiving the optical code from the display of the information device 200. FIG. In addition, although omitted in the figure, the apparatus 110U in FIG. 218 has a CPU 116, a memory 117, a photoelectric conversion element array 112, and the like similarly to FIG. 58, FIG. 64, and the like. In the figure, portions such as the SW115, the photodiode WPD, the CPU 116, the memory 117, the photoelectric conversion element array 112 and the like are referred to as an element ON/OFF control section. Accordingly, the manipulation surface (upper surface) of the apparatus 110U in FIG. 218 has three regions of an element region, an element ON/OFF control portion, and a touch region provided with a net-shaped metal layer.

Therefore, in the apparatus 110U of FIG. 218, when the user is touching the mesh-shaped metal layer, it is possible to cause the touch panel to detect the change in the physical quantity via the elements 111 by the ON/OFF operation of the SW115. Further, in the apparatus 110U, the user touches the dielectric layer under the mesh-shaped metal layer, so that the touch panel can make the touch panel detect the user's touch operation. Further, the apparatus 110 can receive the optical code by the light emission of the display of the information device 200 by the photodiode WPD.

Note that by combining the mesh-shaped metal layer and the elastic low dielectric constant insulating layer, which is the configuration of the apparatus 110T described in this embodiment, by the action on the touch panel by the elements 111 and the action on the touch panel by the user's finger, the structure to communicate with the touch panel can be applied to the devices 110 to 110 N, 110 P to 110 Q (hereinafter simply referred to as the apparatus 110 and the like) of the 1st to 9th embodiments, the 20th to the 23rd embodiments, and the 27th to 28th embodiments. For example, in the elements 111 of FIG. 58, the elements 111 may be incorporated in an elastic low dielectric constant insulating layer to form a working surface and a mesh-shaped metal layer may be formed instead of the contact conductor 114. In addition, for example, in the touch region TC 2 and the touch region TC 4 in FIG. 128 A, FIG. 149, FIG. 150, etc., in place of the conductor plate CA 2, just under the upper protection and print layer (see FIG. 128 A for example) the net-shaped metal layer is installed, and an elastic insulator may be used instead of the insulator CA3 on the back side.

Similarly, depending on the action of the elements 111 on the touch panel and the action on the touch panel by the user's finger, the configuration for communicating with the touch panel can be applied to the devices 110 to 110N, 110P to 110Q (hereinafter simply referred to as the apparatus 110 and the like) of the 1st to 9th embodiments, the 20th to 23rd embodiments, and the 27th to 28th embodiments by combining the mesh-shaped metal layer and the dielectric having the cavity, which is the configuration of the apparatus 110U. For example, in the elements 111 of FIG. 58, the elements 111 may be incorporated into a low dielectric having cavities to form a working surface and a mesh-shaped metal layer may be formed instead of the contact conductor 114. In addition, for example, in the touch region TC 2 and the touch region TC 4 in FIG. 128A, FIG. 149, FIG. 150, etc., in place of the conductor plate CA2, just under the upper protective and printed layer (see FIG. 128 A for example) layer, a dielectric having cavities may be used instead of the insulator CA3 on the back side.

Thirty-Second Embodiment

Referring to FIG. 219 and FIG. 220, the apparatus 110V according to the embodiment 32 will be described. FIG. 219 is a plan view of the apparatus 110V as viewed from the side acting on the touch panel, and FIG. 220 is a cross-sectional view of the apparatus 110V cut by a plane perpendicular to the plane of the paper passing through the arrow P5 of FIG. 219. In the present embodiment, the apparatus 110V has a solar panel 112C in the element region where the element 111 is disposed. The solar panel 112C supplies power to the control circuit area of the apparatus 110V. The other configuration and operation of the embodiment 32 are the same as those of the apparatus 110S of the thirtieth embodiment.

In the thirty-second Embodiment, the solar panel 112C is provided in the element region. That is, the element 111 is disposed on the working surface of the apparatus 110S. As in the embodiment 30, as shown in FIG. 220, when viewing the apparatus 10S in the planar direction, the element 111 exists in a region that is separated from the control region. A region viewed in the planar direction of the apparatus 110S in which the element 111 is present can be called an element region. On the other hand, the control circuit region where the element 111 does not exist can be called a non-element region.

As shown in FIG. 220, the element 111 is incorporated in a low dielectric constant insulating layer. As in the embodiment 30, the active surface is a structure in which the element 111 is formed in the low dielectric constant insulating layer. The element 111 is the same as that of Embodiment 1, thirty Embodiment or the like.

The low dielectric constant insulating layer is a nonconductive material having a low dielectric constant, and a material containing an air layer is desirable. That is, the low dielectric constant insulating layer is, for example, an insulating layer having a porous structure, a hollow structure, or a structure filled with a low dielectric constant insulating material, for example, as shown in FIGS. 128A, 128B, 133 to 135, an air layer or a void such as a non-conductive layer including the air layer of FIG. 179 to FIG. 186B, a layer of the filling material M2, and the like. However, on the side of the working surface of the solar panel 112C, a structure that allows light to pass therethrough, for example, a support structure M1 as shown in FIG. 182 (a rectangular parallelepiped shape or a honeycomb-shaped well shape A large number of open spaces are formed), a honeycomb structure as shown in FIG. 185 is formed.

Furthermore, since the upper layer (the side opposite to the working surface) of the low dielectric constant insulating layer is the same as that in the thirtieth embodiment, the description thereof will be omitted.

By adopting such a configuration, it is possible to secure a region where the solar panel 112C is arranged. Even when the apparatus 110V is placed on the touch panel, since the low dielectric constant insulating layer is interposed between the solar panel 112C and the touch panel 112C, coupling between the solar panel 112C and the touch panel 112C can be reduced. Therefore, it is possible to accurately detect the change in the physical quantity from the element 111 on the touch panel.

Thirty-Third Embodiment

With reference to FIGS. 221 to 223, authentication processing by the apparatus 110W and the information device 200 according to the embodiment 33 will be described. Here, the apparatus 110W has the same configuration as, for example, the apparatus 110K in FIG. 149. However, the apparatus 110W in the embodiment 33 is not limited to the apparatus 110W in FIG. 149. That is, the processing of the embodiment 33 can be applied to the code generating apparatus 1 of the above-described embodiment 0, and to the apparatuses 110 to 110N and the apparatuses 110 P to 110V of the embodiments 1 to 9, the embodiments 20 to 23 and the embodiments 27 to 32 (hereinafter simply referred to as the apparatus 110 and the like).

As shown in FIG. 221, the apparatus 110W is divided into an electric mechanism region 110K-1 and a non-electric mechanism region 110K-2 like the apparatus 110K of the embodiment 20. The electric mechanism region 110K-1 has electronic circuit parts, power supply parts and the like, accepts the user's operation by the action of the electric circuit and the electronic circuit, and causes the touch panel of the information device 200 to detect the physical action. The electrical mechanism region 110K-1 has, for example, the same configuration as the code generation apparatus 1 of the embodiment 0, and the card type devices 110 to 110G (hereinafter simply referred to as the apparatus 110 and the like) of the embodiments 1 to 9. For example, the electric mechanism region 110K-1 has the CPU116, the memory 117, the SW115, the element 111, the photodiodes WPD1 to WPD6, the fingerprint sensor 113, the photoelectric conversion element arrays 112A and 112B, and the like illustrated in FIG. 151 or FIG. 512.

A contact conductor 114 similar to that of the embodiment 20 or the reticulated metal layer of the embodiment 31 is buried under the touch region TC2. Therefore, by placing the apparatus 110W on the touch panel and the user touches the touch area TC2 with his/her finger, the user can activate the process on the touch panel, for example, the process of "authentication card".

The non-electric mechanism region 110K-2 does not have electronic circuit parts, power supply parts and the like, and for example, when the user presses the surface of the apparatus 110K, due to mechanical and physical deformation of the material to be formed in the apparatus 110K, the approach of the user's finger (touch operation) is detected by the touch panel of the information device 200. However, in the present embodiment, the touch operation by the approach of the user's finger is not detected only by the mechanical physical deformation of the material forming the apparatus 110W. For example, similarly to the lower layer of the reticulated metal layer of the apparatus 110U of the embodiment 30, it is possible to cause the touch panel to detect the touch operation by the user by using a dielectric having a thickness and a dielectric constant to the extent detected from the touch panel.

In addition, the non-electric mechanism region 110K-2 may have a structure similar to that of a game card or other items not requiring a power supply as exemplified in Embodiment 16. Any structure in FIG. 128 A, FIG. 128 B, FIG. 130, and FIGS. 133 to 136 may be used as the non-electric mechanism region 110K-2. Further, as the touch region TC 4 of the non-electric mechanical region 110 K-2, there may be a transparent touch region as shown in FIG. 137.

In the present embodiment, the apparatus 110W, for example, functions as an ID card for executing user authentication processing. That is, the user's password and the like are registered in the nonvolatile memory 117 of the apparatus 110W. When the user places the apparatus 110W on the touch panel of the information device 200 and touches the touch area TC2 labeled "authentication card", through the element 111 on the operation surface of the apparatus 110W (back surface, for example, see FIG. 149), the information pattern (the arrangement of the elements 111) is input to the information device 200.

The information device 200 specifies the orientation of the apparatus 110W from the information pattern (the arrangement of the elements 111) and identifies the orientation of the apparatus 110W and assigns the label "registration", "authentication", "ENTER", "0" to "9" or the like (Area) on the touch panel corresponding to the position of the touch panel.

When the user touches, for example, the "registration" label, mechanical or physical deformation of the material forming the apparatus 110W or action on the dielectric occurs. Then, the information device 200 detects the touch operation by the user on the "registration" label and executes the registration process. In the registration process, a touch operation from "0" to "9" and "ENTER" is detected and a password for registration is accepted. The apparatus 110V registers the accepted password for registration in the nonvolatile memory 117.

Similarly, when the user touches the "authentication" label, the apparatus 110W activates the authentication process, detects a touch operation from "0" to "9" and "ENTER" and accepts a password for authentication. The apparatus 110W compares the accepted password for authentication with the password registered in the nonvolatile memory 117, and outputs the comparison result as an information pattern (pattern code) from the element 111 to the touch panel.

As shown in FIG. 221, the apparatus 110W has a touch area TC 2 on which labels such as "0" to "9" and "ENTER" are printed. In addition, the apparatus 110W has one or more elements 111 on its working surface (see FIG. 149). Thus, in the apparatus 110W, one or more elements are arranged in a first region of the working surface and a second region, which is different from the first region of the working surface, is formed of a dielectric. In the apparatus 110W, on the opposite side of the second area from the action surface, a label indicating characters is given, and in addition to the information pattern of one or more elements, so that the touch panel It can be said that the touch panel can detect the change in the physical quantity due to touching the label when the user touches the finger on the label.

FIG. 222 illustrates a flowchart of card authentication processing by the information device 200. Here, it is assumed that the apparatus 110W is a card type device. First, when the apparatus 110 is placed on the touch panel with its working surface in contact, the information device 200 recognizes the apparatus 110W (card) from the arrangement of the ON elements 111. Here, the arrangement of the ON elements may be designated by the SW115 according to the information stored in the nonvolatile memory 117.

Then, the information device 200 waits for a command from the apparatus 110W. The command is inputted by touching the label attached to the touch area TC4 as described above. When the command is password registration (YES in S221), the information device 200 executes password registration/update processing (S222). In the password registration/update processing, the information device accepts the current password, the new password, and the like via the touch panel by the touch operation from "0" to "9" and "ENTER". Then, the information device 200 inputs the accepted current password, new password, and the like to the apparatus 110W with the optical code. The apparatus 110W registers a password for registration in the nonvolatile memory 117 based on the current password, the new password, and the like inputted by the optical code.

When the command is password authentication (YES in S223), the information device 200 executes a password authentication process. In the password authentication processing, the information device receives an input of the password for authentication via the touch panel by touch operation from "0" to "9" and "ENTER" (S224). Then, the information device 200 inputs the accepted password for authentication to the apparatus 110W with the optical code (S225). Then, the information device 200 acquires the authentication result from the apparatus 110W as an information pattern (pattern code) from the element 111 (S226). Then, the information device 200 determines whether or not the authentication result is OK (S227). When the authentication result is OK, the information device 200 executes processing after authentication (S228). On the other hand, if the authentication result is OK, the information device 200 displays an error on the display (S229). Furthermore, if the command is other than password registration and password authentication, the information device 200 ends the process.

FIG. 223 illustrates a flowchart of card authentication processing by the apparatus 110W. In this process, the apparatus 110W is placed on the touch panel of the information device 200 and receives a command input (S230). When the command is password registration (YES in S231), the apparatus 110W executes password registration/update processing (S232). In the password registration/update processing, the apparatus 110W accepts the current password, the password for registration and the like from the information device 200 by the optical code via the display. Then, the apparatus 110W registers a password for registration in the nonvolatile memory 117 based on the accepted current password, new password, and the like. The CPU116 of the apparatus 110W executes the processing of S232 as an example of the registration processing.

If the command is the password authentication (YES in S233), the apparatus 110W accepts the input of the password for authentication by the optical code via the display (S234). Then, the apparatus 110W compares the entered password with the password registered in the nonvolatile memory 117 (S235). Then, the apparatus 110W outputs the authentication result with the information pattern (pattern code) due to the physical quantity change from the element 111 (S236). Furthermore, if the command is other than password registration and password authentication, the apparatus 110W ends the process. The CPU116 of the apparatus 110W executes the processing of S233 to S236 as an example of the authentication processing. The CPU116 executes the process of S236 as an example of the information output unit.

As described above, according to the present embodiment, the apparatus 110W can input the information to the information device 200 with the information pattern (pattern code) due to the physical change from the element 111 and the input of information pattern (pattern code) of position information by detecting the user operation on the apparatus 110W by the touch panel. Then, the apparatus 110W receives the authentication information by the optical code from the information device 200. That is, in cooperation with the information device 200, the apparatus 110W temporarily accepts the user's operation for authenticating the user with the information device 200 and further receives the information received by the information device 200 from the information device 200 with the optical code. With such a configuration, a function as an authentication card for authenticating the user himself/herself is provided by combining a unique command (activation of authentication card processing, for example) owned by the apparatus 110W and a touch panel operation by the user.

In the S222 and S224, the information device 200 detects the touch operation by the user on the label on the apparatus 110W, accepts the registration command, accepts the authentication command, inputs the password, and the like. However, in the processing of S222 and S224, the information device 200 can accept a registration command, accept an authentication command, input a password, or the like via a user interface as a normal information device using a display and a touch panel. Then, it is also possible to accept a normal registration command using the touch panel, to accept the authentication command, to request the apparatus 110W to register/update the password, or to authenticate the password using the optical code according to acceptance of a normal recording command using the touch panel.

Therefore, the information device 200 and the apparatus 110W register the authentication information input by the user via the label of the apparatus 110W and the touch panel in the nonvolatile storage portion of the apparatus 110W with the optical code. Further, the information device 200 and the apparatus 110W input the label of the apparatus 110W and the authentication information input via the touch panel into the apparatus 110W by optical code, and compare it with the authentication information registered in the nonvolatile storage portion. In addition, the information device 200 and the apparatus 110W execute such processing in accordance with the user's input through the display of the information device 200 and the touch panel. Therefore, the information device 200 and the apparatus 110W are examples of a system that cooperates with each other to perform ten authentications. Such authentication can be used in various situations. The information device 200 and the apparatus 110W specify processes and services according to the output pattern from the element 111. Then, the information device 200 and the apparatus 110W can compare the authentication information entered by the user with the authentication information registered in the nonvolatile memory 117, authenticate the user, and provide processing and services. Therefore, in addition to simply the function of the ID card or the electronic key, the user can be further authenticated by the authentication information registered in the nonvolatile memory of the apparatus 110W.

Thirty-Forth Embodiment

The processing of the embodiment 33 controlled a semiconductor switch exemplified in FIGS. 19 to 21 and the like or the SW115 exemplified in FIGS. 58, 60, 64 and the like because the code generation apparatus 1 of the zeroth embodiment and the devices 110 to 110 N, 110 P to 110V (hereinafter simply referred to as the apparatus 110 and the like) of the first embodiments to ninth embodiment, twentieth embodiment to twenty-third embodiment, twenty-seventh embodiment to thirty-two embodiment generate a change in the physical quantity from the element 111 In FIG. 25, one numerical value constituting the pattern code is defined by the contact switch 404 of the pattern code setting/output device 403 in the code generation apparatus 1.

However, in each of the above-described embodiments, a Micro Electro Mechanical Systems (MEMS) switch may be used instead of the semiconductor switch, SW115, or contact switch. Since the semiconductor switch has a junction capacitance when the PN junction is biased in the reverse direction or a capacitance of the depletion layer, even in the OFF state, a pulse signal or an AC signal may flow. On the other hand, a general contact switch may be sized and not suitable as a compact apparatus 110 or the like.

Therefore, in the apparatus of each of the embodiments described above, a change in the physical quantity may be generated in the code output unit 13, the element 111 or the like by the MEMS switch. The MEMS conducts or blocks a conductive path to which one or more elements 111 are connected by a movable electrode and an actuator for driving the movable electrode. MEMS actuators are not limited. The actuator may be, for example, electrostatic drive, piezoelectric drive. For example, the CPU116 may drive the actuator by a driver transistor or directly, and control the MEMS switch to ON or OFF similarly to the SW115 or the like in the above embodiment.

By using the MEMS switch, it is possible to suppress at least the junction capacitance of the PN junction or various parasitic capacitances caused in the depletion layer. In addition, since the MEMS is formed with dimensions on the order of several microns to several hundreds of microns, it is advantageous also in miniaturization.

Thirty-Fifth Embodiment

Thirty-Fifth Embodiment will be described with reference to FIGS. 224 to 227. In the present embodiment, results of experiments using the apparatus 110 and various information devices will be described. First, FIG. 224 illustrates the state of the apparatus at the time of experiment. In the experiment, an experiment kit was placed on the touch panel of the information device 200. Like the apparatus 110, the experiment kit has an element 111, a SW115 (semiconductor switch), and a drive circuit for driving the SW115 ON/OFF. One terminal of the SW115 is connected to the element 111, and the other terminal comes into contact with the human body (finger).
Thereafter, center-to-center distance means the distance between the centers of the tap when two taps are arranged.

The experimental procedure is as follows; ON/OFF by SW115 was repeated 100 times, and how many times ON/OFF was recognized was counted, and the percentage which was recognized as the recognition rate was obtained.

At this time, the length and thickness of the conductive wire between the SW115 and the element 111, the type of the touch panel (information device 200), the time width of the ON pulse, the time width of OFF, and the average, shortest and longest switching times from the ON state to the OFF state measured via the touch panel of the device 200 when the SW115 switched from ON to OFF were measured. As shown in FIG. 224, the experiment was conducted in the case where two elements 111 were mounted and the case where only one element 111 was mounted, and in the case where two elements 111 were mounted, the distance between the elements 111 was changed. As the information device 200, iPhone (registered trademark) and iPad (registered trademark) manufactured by Apple Inc., USA are used.

FIG. 225 shows the recognition rate of the change from ON to OFF, and the average, shortest and longest times of switching from the ON state to the OFF state (hereinafter referred to as "ON-OFF time") measured from the ON state through the touch panel by changing the ON time when the length of the conductive wire is 5 cm. The conductive wire has a diameter of 0.33 mm. Further, the radius of the element 111 is 8 mm, and the material thereof is aluminum. As shown in the figure, the recognition rate rises as the ON time increases, about from 81% to 85% at ON time from 20 ms to 30 ms, and 90% or more at ON time 40 ms to 100 ms. On the other hand, ON/OFF time tends to increase with ON time. The above result does not depend on the model of the information device 200.

From the above it is desirable that the ON time is 30 ms. However, when the ON time is 40 ms or more, it is more preferable that the recognition rate is 90% or more. Assuming the sampling time T at which the touch panel detects an event, the period of sampling, that is, the period from the start point (for example, the upper left pixel) to the end point (for example, the lower right pixel) of the touch panel is approximately equal to T. Then, for example, when the sampling of the element 111 has been completed just before the element 111 is turned on near the sampling start point, the ON of this element 111 is detected at the next sampling, and the detection event is the second detection event since the element 111 is turned on. Assuming that the result of one sampling is reported to the OS at one detection event, if sampling of the element 111 has ended near the sampling start point and just before the element 111 is turned on, the element 111 is turned on, the detection event is reported approximately twice as long as the sampling time T. On the other hand, when the sampling is executed immediately after the element 111 near the sampling end point is turned on, the first sampling is almost finished when the element 111 is turned on, and the element 111 is reported to be ON. Therefore, a detection error which is approximately twice the sampling time can be generated from the time when the element 111 is turned on with respect to the sampling time T of the touch panel.

Therefore, it is desirable that the time for turning on the element 111, that is, the ON time of the pulse for driving the SW115 is approximately twice the sampling time (that is, the scanning time of the touch panel). This is because there is a possibility that ON of the element 111 will not be detected by the information device 200 if the ON time is further short. According to the experimental result of FIG. 225, it is considered that this is the reason why the recognition rate is low when the ON time is short. Therefore, the time for all OFF can be considered as well. If the time of all ON is shorter than about twice the sampling time, there is a possibility that all OFF is not detected.

It is assumed that the sampling time of the touch panel of the information device 200 is dependent on the model, but assuming, for example, 1/60 second which is close to the frame rate of a general display, it is 16.6 ms, and it is desirable that the ON time, the all OFF time are about 30 ms or more. Further, from the experimental result of FIG. 225, it is shown that it is more desirable if these times are 40 ms.

The reason why the ON/OFF time is lengthened with the ON time in FIG. 225 is that the subsequent ON pulse period is detected to be ON as is by the information device 200 in the case that the element 111 detects ON in the vicinity of the beginning of the pulse.

FIG. 226 shows a case where the length of the conductive wire is 10 cm in the condition of FIG. 225. Also in this case, the recognition rate and ON/OFF time are the same as in FIG. 224.

FIG. 227 shows the result of measuring the recognition rate and ON/OFF time using two elements 111. In this case, the length of the wire 7.0 cm, a thickness of 0.33 mm, and an ON time of 40 ms. As shown in the figure, when the center-to-center distance is as large as 13 mm or more, both the recognition rate and ON and OFF time do not depend on the intermediate distance of the element 111. Therefore, when the diameter of the element 111 is about 8 mm, if the element 111 is 12 mm or more, the information device 200 can be stably recognized.

FIG. 228 shows the result of measuring the recognition rate and ON/OFF time by changing the length of the conductive wire using one element 111. The thickness of the conductive wire is 0.07 mm, and the ON time is 40 ms. As shown in the figure, both the recognition rate and ON/OFF time do not depend on the length of the device.

FIG. 228 shows the measurement result for the conductive wire with the diameter of 0.33. As shown in the figure, both the recognition rate and ON/OFF time do not depend on the length of the device.

<In Another Aspects>

The present embodiment further includes the following aspects.

(Aspect 1)

A device, working on a panel having a sensor for detecting a physical quantity, having a working face on which the change in said physical quantity that can be detected by said panel from the opposing surface of the device, one or more elements formed on said working face, a physical quantity control unit for causing the one or more elements to cause said physical quantity change, an information output unit that drives the one or more physical quantity control units according to the change in said physical quantity to output first predetermined information, where said information output unit outputs said first predetermined information in first state where said working face comes into contact with or comes into proximity with said panel, wherein said physical quantity control unit suppresses said floating physical quantity so that said panel does not recognize floating physical quantity when the output of said physical quantity from the element is turned off.

(Aspect 2)

The device according to aspect 1, wherein said physical quantity control unit has a semiconductor switch whose parasitic capacitance between the terminals is suppressed to 1.6 pF or less, preferably 0.8 pF or less, more preferably 0.5 pF or less.

(Aspect 3)

The device according to aspect 2, wherein the semiconductor switch has a reverse bias setting so that the resistance value when the switch is off is equal to or greater than 800 kohms and the junction capacitance is equal to or less than 2.1 pF.

(Aspect 4)

A device, working on a panel having a sensor for detecting a physical quantity that has a working face on which the change in said physical quantity that can be detected by said panel occurs from the opposing surface of the device, that has one or more elements formed on said working face, that has a physical quantity control unit for causing the one or more elements to cause said physical quantity change, that has an information output unit that drives the one or more physical quantity control units according to the change in said physical quantity to output first predetermined information, that has a power supply circuit for supplying electric energy based on incoming energy from a partner device having said panel, Wherein said information output unit outputs first predetermined information in a state in which said working face comes into contact with or coming into proximity with said panel.

(Aspect 5)

The power supply circuit according to aspect 4, wherein said power supply circuit has a conversion unit for generating electrical energy based on light, electromagnetic waves, external pressure or a temperature difference between terminals on at least one face of the working face and the back face against the working face.

(Aspect 6)

The device according to aspect 4, wherein said panel includes a display, wherein said converting unit is provided on the working face, and generates electric energy from light emitted from the display, wherein the incoming energy is light emitted from the display.

(Aspect 7)

The device according to aspect 6, wherein the conversion unit is a solar cell.

(Aspect 8)

A device, working on a panel having a sensor for detecting a physical quantity, that has a working face on which the change in said physical quantity that can be detected by said panel from the opposing surface of the device, that has one or more elements formed on the working face, that has a physical quantity control unit for causing the one or more elements to cause said physical quantity change, and that has an information output unit that drives the one or more physical quantity control units according to the change in said physical quantity to output first predetermined information, wherein the plurality of elements are arranged, the number of which exceeds the maximum number of elements which said panel can simultaneously recognize, wherein the information output unit drives said physical quantity control unit so that the number of elements causing said physical quantity change simultaneously becomes equal to or smaller than said maximum number.

(Aspect 9)

A device working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and having an information output unit that drives the one or more physical quantity control units according to the change in said physical quantity to output first predetermined information, wherein said information output unit outputs a synchronization signal by changing a physical quantity from at least one or more synchronization elements out of said plurality of elements, said device transmits the information to said panel by changing said physical quantity of the time synchronously with the synchronization signal among the plurality of elements.

(Aspect 10)

The device according to aspect 9, wherein said panel includes a display, wherein the output of said physical quantity from the synchronization elements drives said physical quantity control unit and transmits said first predetermined information to said panel, synchronously within a predetermined time that is equal to or more than a detectable value of said panel and within a predetermined time that is OFF (Aspect 11)

The device according to a 9th or 10th aspect of the present invention, wherein said 2 or more than 2 synchronization elements are provided, and the change of said physical quantity from said elements by a predetermined method, is made different so that the partner device having said panel recognizes the arrangement of the other elements.

(Aspect 12)

A device, which working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, wherein said information output unit drives said physical quantity control unit to cause a physical quantity change in at least a part of said plurality predetermined elements or in a change in a physical quantity of the elements or in plural change in a physical quantity by one or a combination of predetermined elements, causing the other device having said panel to recognize the arrangement of all of the elements.

(Aspect 13)

A device, which working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, wherein said device indicates breaks for the output of the predetermined information when the output of first predetermined information is repeated by the manner that said physical quantity from the elements can be controlled by changing said physical quantity that can be specified differently from the other physical quantity at a predetermined time interval (Aspect 14)

The device according to aspect 13, wherein a change in said physical quantity that can be specified at a predetermined time interval indicating said predetermined break at a different time includes an error check of said first predetermined information (Aspect 15)

A device, which working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has a nonconductive layer formed on a part or the whole of a region different from the region where the elements are placed on said working face, that has a conductive layer partially or entirely formed of a conductive material having a conductive path to the elements on the face opposite to the region on which the elements on the active face are placed, or said conductive layer on which a nonconductive layer is formed, that has the manipulation surface which is formed on the opposite side of said non-conducting working face, When touching either the conductive layer or the conductive layer formed on the upper layer of the conductive layer with a human body part or a conductor, the one or more physical quantity control parts are driven to output first predetermined information, And further said panel are driven to recognize the touch position, when touching either the conductive layer or the conductive layer formed on the upper layer of the conductive layer with a human body part or a conductor.

(Aspect 16)

The device according to aspect 15, wherein said manipulation surface includes non-conductive layer, said manipulation surface is provided integrally in the manipulation surface in the lower layer of the non-conductive layer.

(Aspect 17)

The device according to aspect 16, wherein the air layer is provided between said conductive layer provided on a lower layer of said manipulation surface and said nonconductive layer provided on the working face in order recognize a touch position by pressing with a touch of a human body part or a conductor (Aspect 18)

The device according to aspect 16, wherein said non-conductive layer provided on the opposite side of said manipulation surface includes a space capable of being compressed by pressing with a touch by a body part or a conductor to recognize a touch position.

(Aspect 19)

The device according to aspect 18, wherein said non-conductive layer is formed of a honeycomb structure or a sponge-like material.

(Aspect 20)

The device according to any one of aspects 15 to 19, wherein said manipulation surface and part or all of the layers forming the lower layer of said manipulation surface are transparent.

(Aspect 21)

The device according to any one of Aspects 15 to 20, wherein at least a part or all of said manipulation surface has graphics and characters formed thereon.

(Aspect 22)

The device according to any one of aspects 20 or 21, including said panel comprising a display, by placing 3 or more of the elements are placed, by touch of a portion of a human body or a conductor to said manipulation surface, a partner device having said panel recognizes the position of the transparent region of said manipulation surface, displays a predetermined image in said part of the transparent region (Aspect 23)

A device, which working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, and that an image sensor provided on at least one of said working face and the opposite face.

(Aspect 24)

The device according to aspect 23,
wherein said image sensor images a pattern by at least a part of a body part or a concavo-convex part on a surface of said part.

(Aspect 25)

The device according to any one of modes 23 and 24,
wherein the image sensor images a barcode, a dot code, a two-dimensional code or a color code as input information input to said device.

(Aspect 26)

The device according to aspect 25,
wherein the input information is either formed on a predetermined medium or displayed on a display.

(Aspect 27)

The device according to aspect 26,
wherein the display is provided on said panel.

(Aspect 28)

The device according to aspect 26 or 27,

Wherein the image sensor is provided so as not to receive external light in a state of being placed on either the predetermined medium or the display, An irradiation unit that irradiates said input information with light of a predetermined wavelength is provided, Wherein when said image sensor is placed on the predetermined medium, a reaction of the light irradiated on said predetermined medium is imaged, wherein when placed on the display, the image displayed by the display is captured.

(Aspect 29)

The device according to aspect 28, in which said image sensor detects the reaction of light when said predetermined wavelength is irradiated from said irradiating unit, which recognizes whether the device is placed on said predetermined medium or placed on said display.

(Aspect 30)

The device according to any one of aspects 23 to 30, further comprising a processing unit that executes information processing based on information captured by said image sensor, wherein said information output unit outputs said first predetermined information including a result of said information processing.

(Aspect 31)

A device, which working on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has a touch panel that accepts an input operation by touching or tracing with a body part or a conductor.

(Aspect 32)

The device according to aspect 31,
wherein at least said touch panel is formed with graphics or characters partially or entirely.

(Aspect 33)

The device according to any one of aspects 31 and 32,
wherein at least said touch panel is provided with a character recognition means for recognizing a trace traced by a part of a human body or a conductor.

(Aspect 34)

The device according to any one of aspects 31 to 33,
further comprising a biometric recognition means for recognizing a pattern due to a concavo-convex part on the surface of the part of the human body.

(Aspect 35)

The device according to any one of aspects 31 to 34,
Further comprising a processing unit for executing information processing based on the information acquired by said touch panel, wherein said information output unit outputs said first predetermined information including a result of said information processing.

(Aspect 36)

The device according to any one of aspects 1 to 35,
further comprising one or a plurality of detection units for detecting an incoming amount of energy due to incoming light or electromagnetic waves from a partner device having said panel, an information input unit that acquires second predetermined information based on a temporal change in the incoming amount of said energy detected by said detection unit.

(Aspect 37)

A device acting on a panel having a sensor for detecting a physical quantity, that has a working face on which the change in said physical quantity that can be detected by said panel from the opposing face of said device, that has one or more elements formed on said working face,
that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, wherein said information input unit, at least one or more detection units detects a synchronization signal according to the amount of incoming of said energy change with time, that obtains said second predetermined information by detecting a change in incoming amount of another energy in synchronization with a synchronization signal.

(Aspect 38)

The device according to aspect 37, wherein said information input unit acquires said second predetermined information from said second predetermined information, wherein said synchronization signal synchronizes within a predetermined ON time that is equal to or more than a detectable value of the detection unit and within a predetermined OFF time that is less than a detectable value of the detection unit.

(Aspect 39)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, wherein said information input unit, at least one or more detection units detects a synchronization signal according to the amount of incoming of said energy change with time, Wherein the change in said physical quantity and the detection of the incoming amount of energy are performed in a time in which at least one part overlaps.

(Aspect 40)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, wherein said information input unit, at least one or more detection units detects a synchronization signal according to the amount of incoming of said energy change with time, Wherein said information input unit detects the synchronization signal by the detection unit according to the incoming amount of said energy that changes with time and changes said physical quantity from the element in synchronization with the synchronization signal over time so that said information input unit transmits said first predetermined information to said panel.

(Aspect 41)

The device according to aspect 40, wherein said synchronization signal synchronizes within a predetermined ON time that is equal to or more than a detectable value of the detection unit and within a predetermined OFF time that is less than a detectable value of the detection unit, wherein said information control unit drives said physical quantity control unit to transmit first predetermined information to said panel.

(Aspect 42)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Said information output unit outputs a synchronization signal by temporally changing a physical quantity from at least one of the plurality of elements for synchronization, Wherein said information input unit acquires said second predetermined information by detecting a change in the incoming amount of said energy in synchronization with said synchronization signal.

(Aspect 43)

The device according to aspect 42, wherein said information input unit is configured to acquire said second predetermined information from said panel, to synchronize the output of said physical quantity from said synchronization element within a predetermined time that is equal to or more than a detectable value of said panel and within a predetermined time that is OFF that is less than a detectable value of said panel.

(Aspect 44)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, that indicates a break of information when detects the change of said predetermined amount of energy, wherein said detection unit detects a change in the amount of incoming which can be identified by detecting the change in the incoming amount of the energy at a predetermined time interval different from the other and thereby.

(Aspect 45)

The device according to aspect 45, wherein an error check of said second predetermined information is included in a change in incoming amount that can be specified at a predetermined time interval indicating the predetermined break at the time interval different from the other (Aspect 46)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Wherein the incoming energy including the code arrives, defined by the acquired information pattern of said predetermined constant, every time a predetermined number of information patterns are output among said information patterns based on said physical quantity change of said elements forming said first predetermined information And said information input unit performs a right or wrong judgment on said code detected by said detecting unit and a code defined in a corresponding predetermined number of information patterns, if not, said device re-outputs the corresponding predetermined number of information patterns.

(Aspect 47)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Wherein said information output device, Wherein the incoming energy including the code arrives, defined by the acquired information pattern of said predetermined constant, every time a predetermined number of information patterns are output among said information patterns based on said physical quantity change of said elements forming said first predetermined information And said information input unit performs a right or wrong judgment on said code detected by said detecting unit and a code defined in a corresponding predetermined number of information patterns, If not, said device re-outputs the corresponding predetermined number of information patterns.

among said information patterns due to a change in the incoming energy to form said predetermined information, each time a predetermined number of information patterns are the incoming, outputs said physical quantity including code defined in the information patterns of the acquired predetermined number, wherein the opponent device implements the correctness determination between the code defined in a predetermined number of information patterns applicable, and the code which said detecting unit detects if they do not match, said device obtains a corresponding predetermined number of information patterns.

(Aspect 48)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Wherein said incoming amount includes position information of said panel, Wherein said information input unit acquires said position information from said incoming amount detected by said detection unit.

(Aspect 49)

The device according to aspect 48, wherein said information output unit drives said physical quantity control unit to cause first predetermined information corresponding to said position information to cause said physical quantity change in each of said plurality of elements.

(Aspect 50)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Wherein at least one or more of said detection units is arranged in at least one of insides of the elements or an annular region centered on the elements.

(Aspect 51)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit that has counting means for counting identification information for identifying said device as another device, Wherein said counting unit counts the encrypting information based on said second predetermined information acquired by said information input unit, said information output unit outputs said first predetermined information including said encrypting information.

(Aspect 52)

The device according to aspect 51,

Further comprising ID storage means for storing an ID for identifying said device as another device, wherein said counting unit counts at least said second predetermined information acquired by said information input unit and encrypting information based on said ID.

(Aspect 53)

The device according to aspect 51 or 52,

Further comprising a clock signal generating unit for generating a clock signal at a predetermined clock cycle from a predetermined initial time, wherein said counting unit counts at least said second predetermined information acquired by said information input unit and encrypting information based on said clock signal.

(Aspect 54)

The device according to any one of aspects 51 to 53,

Further comprising a detection circuit for detecting a standard time signal from the outside, wherein said counting unit counts at least said second predetermined information acquired by said information input unit and encrypting information based on the standard time signal.

(Aspect 55)

The device according to any one of aspects 51 to 54 is provided,

Wherein a part or all of said second predetermined information is information that changes at predetermined time intervals, Wherein said second predetermined information is either information generated by the counterpart device having said panel itself or includes information transmitted from the cloud to a counterpart device having said panel.

(Aspect 56)

The device according to any one of aspects 51 to 55 is provided, in which the identification information is recognized by said cloud to which the identification information is transmitted from the other device having said panel or the other device having said panel based on said first predetermined information.

(Aspect 57)

A device acting on a panel having a sensor for detecting a physical quantity, that has a working face on which the change in said physical quantity that can be detected by said panel from the opposing face of said device, that has one or more elements formed on said working face, that has a physical quantity control unit for causing the one or more elements to cause said physical quantity change, and that has an information output unit that drives the one or more physical quantity control units according to the change in said physical quantity to output first predetermined information, that has one or a plurality of detection units for detecting an incoming amount of energy due to incoming light or electromagnetic waves from a partner device having said panel, that has an information input unit configured to acquire second predetermined information based on a temporal change in the incoming amount of said energy detected by said detection unit, Wherein said information input unit acquires said second predetermined information which is an instruction for correcting to a proper change in said physical quantity based on a detection result that a panel including said sensor detects a change in said physical quantity, Wherein the information output unit drives the one or more physical quantity control units based on said second predetermined information to adjust a change in said physical quantity to output said first predetermined information.

(Aspect 58)

The device according to aspect 57,

Wherein said physical quantity control unit is a semiconductor switch, wherein the adjustment of the change in said physical quantity is carried out by a signal amplitude of a drive signal for bringing said semiconductor switch into a conductive state and a signal amplitude of a drive signal for cutting off said semiconductor switch.

(Aspect 59)

A device acting on a panel having a sensor for detecting a physical quantity, that has a working face on which the change in said physical quantity that can be detected by said panel from the opposing face of said device, that has a plurality of elements formed on said working face, that has a physical quantity control unit for causing the plurality of elements to cause said physical quantity change, that has one or a plurality of detection units for detecting an incoming amount of energy due to incoming light or electromagnetic waves from a partner device having said panel, An information input unit configured to acquire second predetermined information based on at least one of an amount of incoming of said energy detected by said detection unit and a change over time of the incoming amount;

Wherein said information output unit outputs said first predetermined information in a state where said working face comes into contact with or comes into proximity with said panel, Wherein said detection unit is placed at the position uniquely recognized by the disposition of the plurality of elements by which said panel detects said physical quantity (Aspect 60)

The device according to any one of aspects 8 to 58 is provided, said information output unit drives said one or more physical quantity control units according to a change in said physical quantity in a state in which said working face comes into contact with or comes into proximity with said panel to output first predetermined information.

(Aspect 61)

The device according to any one of aspects 37 to 58,

Wherein said information input unit acquires second predetermined information based on at least one of an incoming amount of or a temporal change of the incoming amount of said energy in a state where the working face comes into contact with or comes into proximity with said panel.

(Aspect 62)

The device according to any one of aspects 2 to 59,

Wherein said physical quantity control unit is designed to reduce said physical quantity to be floated so that said panel does not recognize said physical quantity floating when said output of said physical quantity from said elements is turned off, (Aspect 63)

A device according to any one of Aspect 1 to Aspect 3 or Aspect 8 to Aspect 59,

A power supply circuit for supplying electric energy based on incoming energy from a partner apparatus having said panel (Aspect 64)

A device according to any one of aspects 1 to 7 or 9 to 59,

A number of elements exceeding the maximum number of elements that can be simultaneously recognized by said panel are placed, Wherein said information output unit drives said physical quantity control unit so that the number of elements causing said physical quantity change simultaneously becomes equal to or less than said maximum number, (Aspect 65)

A device according to any one of aspects 1 to 8 or 12 to 59.

Wherein said information output unit outputs a synchronization signal by temporally changing a physical quantity from at least one or more synchronization elements out of the plurality of elements Wherein the information is transmitted to said panel by changing said physical quantity of the time from an information output unit among said plurality of elements synchronously with the synchronization signal.

(Aspect 66)

A device according to any one of aspects 1 to 11 or 13 to 59,

Wherein said information output unit drives said physical quantity control unit to cause a physical quantity change in at least a part of a predetermined element or a change in a physical quantity of said elements by a combination of predetermined elements by one or a plurality of elements Causing the partner device having said panel to recognize the placement of all of said elements (Aspect 67)

A device according to any one of aspects 1 to 12 or 15 to 59.

A change in said physical quantity from said elements can be controlled at a predetermined time interval by changing said physical quantity that can be specified differently from the others so that a break of the predetermined information is indicated when the output of said first predetermined information is repeated (Aspect 68)

A device according to any one of aspects 1 to 14 or 23 to 59.

That has a nonconductive layer formed on a part or the whole of a region different from the region where the elements are placed on said working face, That has either A conductive layer partially or entirely made of a conductive material having a conductive path to said element or A conductive layer on which a nonconductive layer is formed as an upper layer on the surface of the working face opposite to the region where said element is arranged, That has a manipulation unit formed on the opposite surface of the non-conductive layer of the working face, When touching either said conductive layer or said conductive layer formed on the upper layer of the conductive layer with a human body part or a conductor, the one or more physical quantity control units are driven to output first predetermined information, Further causing said panel to recognize the touch position when touching the manipulation unit with a part of a human body or a conductor, (Aspect 69)

The device according to any one of Aspects 1 to 22 or Aspect 31 to Aspect 59, comprising an image sensor provided on at least one of said working face and the opposite surface.

(Aspect 70)

An apparatus according to any one of Aspects 1 to 30 or Aspect 37 to Aspect 59, comprising a touch panel that accepts an input operation by touching or tracing with a body part or a conductor.

(Aspect 71)

The device according to any one of Aspect 36 or 39 to 59, Said information input unit detects a synchronization signal according to the incoming amount of said energy at least one or more detection units change with time, and acquires said second predetermined information by detecting a change in incoming amount of another energy in synchronization with a synchronization signal.

(Aspect 72)

The device according to any one of Aspect 36 to Aspect 38 or Aspect 40 to Aspect 59, wherein the detection of the change in said physical quantity and the amount of incoming of energy are performed in a time in which at least one part overlaps.

(Aspect 73)

A device according to any of embodiments 36 to 39 or aspects 42 to 59, which transmits predetermined information, wherein said information input unit detects the synchronization signal by said detection unit according to the incoming amount of the energy that changes with time, and changes said physical quantity from elements in synchronization with the synchronization signal over time (Aspect 74)

A device according to any one of Aspect 36 to Aspect 41 or Aspect 44 to Aspect 59, said information output unit outputs a synchronization signal by temporally changing a physical quantity from at least one of the plurality of elements for synchronization, Wherein said information input unit acquires said second predetermined information by detecting a change in said incoming amount of the energy in synchronization with said synchronization signal, (Aspect 75)

A device according to any one of Aspect 36 to Aspect 43 or Aspect 46 to Aspect 59, Wherein the detection unit detects a change in the amount of incoming which can be identified by detecting the change in the incoming amount of the energy at a predetermined time interval different from the other, and thereby said device indicates the predetermined breaks of information when the output of said second predetermined information is repeated (Aspect 76)

The device according to any one of Aspect 36 to Aspect 45 or Aspect 47 to Aspect 59.

Wherein said information input device

Wherein said incoming energy including the code defined in the acquired information pattern of the predetermined constant arrives every time a predetermined number of information patterns are output among said information patterns based on said physical quantity change of the element forming said first predetermined information and executes the correctness judgment of said code detected by said detecting unit and the code defined in the corresponding predetermined number of information patterns, outputs the corresponding predetermined number of information patterns again, if they do not match.

(Aspect 77)

The device according to any one of Aspects 36 to 46 or 48 to 59,

Wherein said information output unit

Each time a predetermined number of information patterns arrive out of the information patterns based on the change in said incoming energy forming said second predetermined information, Outputs said physical quantity including the code defined in the obtained information pattern of the predetermined constant, Wherein said partner device executes the correctness judgment of the code defined in the corresponding predetermined number of information patterns and the code detected by said detection unit acquires a corresponding predetermined number of information patterns, if they do not match.

(Aspect 78)

The device according to any one of Aspects 36 to 47 or 50 to 59.

Wherein the incoming amount includes position information of said panel,

Wherein the information input unit acquires said position information from the incoming amount detected by said detection unit, (Aspect 79)

The device according to any one of aspects 36 to 49 or 51 to 59.

Wherein at least one or more of the detection units is placed in at least one of an inside of said element and an annular region around said elements, (Aspect 80)

The device according to aspect 36 to aspect 50 or aspect 59

Further comprising counting means for counting identification information for identifying said device as another device, Wherein said counting means calculates encrypting information based on said second predetermined information acquired by said information input section, Wherein said information output unit outputs said first predetermined information including said encrypted information, (Aspect 81)

A device according to any one of Aspect 36 to Aspect 58 Wherein said detection unit is placed at a position where said panel uniquely recognizes from the disposition of the plurality of elements in which said panel detected said physical quantity (Aspect 82)

A device according to any one of aspects 1 to 81

Wherein said physical quantity is a capacitance or an electric field strength,

Wherein the one or more elements are made of a conductive material, (Aspect 83)

A device according to any of aspects 1 to 82

That has a nonconductive layer formed on a part or the whole of a region different from the region where the element is placed on said working face, That has a conductive layer or a nonconductive layer partially or entirely formed of a conductive material having a conductive path to said elements is formed on the surface opposite to the region where the element is placed on said working face, Wherein said one or more physical quantity control units are driven to output the first predetermined information, When any one of said conductive layer and the conductive layer on which nonconductive layer is formed is touched with a body part or a conductor.

(Aspect 84)

A device according to any one of aspects 1 to 59

Further comprising a contact conductor formed on a surface opposite to said working face, said contact conductor being made of a conductive material which is brought into proximity or contact from the outside, Wherein said one or more physical quantity control units include a switch for controlling whether to form a path from each of the one or more elements to said contact conductor or to block said path (Aspect 85)

The device according to aspect 84, wherein a non-conductive layer is provided as a protective and printed layer on the surface of said contact conductor.

(Aspect 86)

The device according to any one of aspects 1 to 59, wherein the element is a thin film conductor formed on said working face.

(Aspect 87)

Said device according to any one of aspects 1 to 59, wherein the device is a stamp-type device or a card-type device working on a panel.

(Aspect 88)

The device according to any one of aspects 1 to 59, wherein the counterpart device having said panel is either a smartphone or a tablet.

(Aspect 89)

The device according to any one of aspects 36 to 59, wherein at least one or more of the detection units is placed in the vicinity of a position where said elements are placed.

(Aspect 90)

The device according to any one of aspects 36 to 59,

Wherein said detection unit is a light receiving unit that detects light of one or more colors, Wherein the information input unit acquires the second predetermined information with an optical signal based on at least either of the temporal change of the light amount or the light amount of said one color or plural colors (Aspect 91)

The device according to aspect 90,

Wherein said light detecting unit detects at least one of said plurality of colors as the optical signal for said synchronization.

(Aspect 92)

The device according to aspect 90 or 91, wherein the optical signals of said plurality of colors are R, G, B.

(Aspect 93)

The device according to any one of Aspects 36 to 59, Said detection unit reads an image from the opposite surface, wherein said information input unit acquires said second predetermined information based on the read image.

(Aspect 94)

The device according to any one of aspects 36 to 59. Wherein said first predetermined information and said second predetermined information are related to each other as the information to be transmitted with respect to the received information or the information to be received with respect to the transmitted information, (Aspect 95)

The device according to any one of aspects 36 to 59, Further comprising a processing unit that executes information processing based on said second predetermined information acquired by said information input unit, Wherein said information output unit outputs the first predetermined information including a result of said information processing (Aspect 96)

The device according to Aspect 95, wherein said information output unit outputs predetermined third information according to any one of information transmission by wireless communication, audio output, light emission, and vibration.

(Aspect 97)

An information device that has a panel mounted with a sensor for detecting occurrence of a physical quantity change from the element and a position where said physical quantity changes, that has a control unit for controlling said sensor and said panel, Wherein said control unit temporally changes the light amount of the partial area of said panel corresponding to the position uniquely defined from the placement of the elements when said elements are brought close to or in contact with said sensor, which transmits second predetermined information (Aspect 98)

A program to be executed, to a computer connected to a panel mounted with a sensor for detecting occurrence of a physical quantity change from said elements and a position where said physical quantity change occurs and specifying a position of said element, To identify a location uniquely defined from the placement of said elements when said elements come into proximity with or come into contact with said sensor and, To change a light amount of a partial region of said panel corresponding to the position with time.

(Aspect 99)

A program to be executed,

To acquire second predetermined information either by accepting an input from a detecting unit that detects incoming amount of energy by incoming light or electromagnetic waves from a partner device having a panel or by reading from a built-in storage means, and To generate said physical quantity change in each of at least one element formed on a working face on which a change in a physical quantity that can be detected by said panel occurs based on said second predetermined information.

(Aspect 100)

A program to be executed,

To acquire second predetermined information by accepting an input from the image sensor or by reading out from the built-in storage means and, To generate said physical quantity change in each of at least one element formed on an working face on which a change in a physical quantity that can be detected by said panel occurs based on the second predetermined information.

(Aspect 101)

A program to be executed to a computer connected to a panel,

To detect an occurrence of a change in a physical quantity from the element and a position where said physical quantity change has occurred with said panel, To specify the position of said elements from the detected physical quantity change and position, To acquire first predetermined information based on a position of the element, and To perform predetermined processing based on said first predetermined information.

(Aspect 102)

A program to be executed,

To acquire second predetermined information

By receiving a predetermined input from a detecting unit that detects incoming amount of energy by incoming light or electromagnetic wave from a partner device having a panel or by reading out from a built-in storage means, To cause said physical quantity change to each of at least one element formed on an working face where a change in a physical quantity that can be detected by said panel occurs based on the second predetermined information, To detect an amount of incoming of the energy with the detection unit when the partner device transmits energy by light or electromagnetic waves, To acquire third predetermined information on the basis of at least one of an incoming amount of the energy or a temporal change in an incoming amount of the energy detected by said detection unit, (Aspect 103)

A program to be executed,

To acquire second predetermined information by accepting a predetermined input from the image sensor or by reading out from the built-in storage means;

To cause said physical quantity change to each of at least one element formed on a working face where a change in a physical quantity that can be detected by said panel occurs based on the second predetermined information, To detect an amount of incoming of the energy with said detection unit when the partner device transmits energy by light or electromagnetic waves, To acquire third predetermined information on the basis of at least one of an incoming amount of the energy or a temporal change in an incoming amount of the energy detected by the detection unit, (Aspect 104)

A program to be executed to a computer connected to a panel,

To detect occurrence of a change in a physical quantity from the element with said panel, and to detect a position where said physical quantity change has occurred, To specify said position of the elements from the detected physical quantity change and position, To acquire first predetermined information based on a position of said element, To acquire the second predetermined information in a predetermined manner, To transmit energy by light or electromagnetic waves to said device based on the second predetermined information, (Aspect 105)

A communication system comprising,

A device for generating a physical quantity,

An information device having a panel including a sensor for detecting said physical quantity;

The communication system comprising:

One or more elements formed on the working face,

A physical quantity control unit for causing said one or more elements to cause said physical quantity change;

A detection unit for detecting an incoming amount of energy by incoming light or electromagnetic waves from said partner device;

An image sensor,

A storage unit,

An information input section,

An information output unit for driving the one or more physical quantity control units, And, Wherein said information input unit acquires first predetermined information by accepting a predetermined input from at least one of said detection unit or said image sensor, or by reading out from said storage unit, Said information output unit drives said physical quantity control unit based on said first predetermined information to cause said one or more elements to cause said physical quantity change, Wherein the information device with said panel, Detects A physical quantity change generated from said device and a position where said physical quantity change has occurred, Specifies said position of the element from the detected physical quantity change and position, Acquires first predetermined information based on said position of the element, Performs predetermined processing based on said first predetermined information.

(Aspect 106)

A communication system comprising,

A device for generating a physical quantity,

An information device having a panel including a sensor for detecting said physical quantity;

The communication system comprising:

One or more elements formed on the working face,

A physical quantity control unit for causing said one or more elements to cause said physical quantity change;

A detection unit for detecting an incoming amount of energy by incoming light or electromagnetic waves from said partner device;

An image sensor,

A storage unit,

An information input section,

An information output unit for driving the one or more physical quantity control units, And, Wherein said information input unit acquires first predetermined information by accepting a predetermined input from at least one of said detection unit or said image sensor, or by reading out from said storage unit, Said information output unit drives said physical quantity control unit based on said first predetermined information to cause said one or more elements to cause said physical quantity change, Wherein the information device with said panel, Detects A physical quantity change generated from said device and a position where said physical quantity change has occurred, Specifies said position of the element from the detected physical quantity change and position, Acquires first predetermined information based on said position of the element, Acquire the second predetermined information by a predetermined method, Transmits energy based on light or electromagnetic waves to said device based on the second predetermined information, Said device, Detects the amount of incoming of the transmitted energy by said detection unit, Acquires third predetermined information based on at least one of an incoming amount of the energy or a temporal change of the incoming amount detected by the detection unit acquired by said information input unit, (Aspect 107)

A communication method of an information device,

Specifies the position at which a light receiving unit placed at the position uniquely defined from the placement of said elements is provided when the elements are brought close to or in contact with said sensor, Acquires said second predetermined information by a predetermined method, Changes the light quantity of the partial area of said panel corresponding to said position of the light receiving unit with time based on said second predetermined information.

(Aspect 108)

A communication method, wherein the device

Acquires second predetermined information by accepting an input from a detecting unit that detects incoming amount of energy by incoming light or electromagnetic wave from a partner device having a panel or by reading out from the built-in storage means, Then, causes said physical quantity change to be generated in each of one or more elements formed on the working face on which a change in physical quantity that can be detected by said panel occurs based on the second predetermined information, An information device having a panel including a sensor for detecting said physical quantity, wherein a physical quantity change generated from said device and a position where said physical quantity change has occurred are detected by said panel, Specifies the position of said elements from the detected physical quantity change and position, Acquires first predetermined information based on the position of said elements, Performs predetermined processing based on said first predetermined information, (Aspect 109)

A communication method, wherein the device

Acquires second predetermined information by accepting an input from the image sensor or reading out from the built-in storage means, Causes said physical quantity change in each of one or more elements formed on the working face on which a change in physical quantity that can be detected by said panel occurs based on said second predetermined information, Wherein an information device having a panel including a sensor for detecting said physical quantity, Detects a physical quantity change generated from said device and a position where said physical quantity change has occurred by said panel, Specifies the position of said elements from the detected physical quantity change and position, Acquires first predetermined information based on said position of the element, Performs predetermined processing based on said first predetermined information.

(Aspect 110)

A communication method, wherein the device

Acquires second predetermined information by accepting an input from a detecting unit that detects incoming amount of energy by incoming light or electromagnetic wave from a partner device having a panel or by reading out from the built-in storage means, Then, causes said physical quantity change to be generated in each of one or more elements formed on the working face on which a change in physical quantity that can be detected by said panel occurs based on the second predetermined information, Wherein an information device having a panel including a sensor for detecting said physical quantity, Detects A physical quantity change generated from the device and a position where said physical quantity change has occurred, Specifies the position of said elements from the detected physical quantity change and position, Acquires first predetermined information based on said position of the element, Acquires said second predetermined information by a predetermined method, Transmits energy based on light or electromagnetic waves to said device based on said second predetermined information, Wherein said device, Detects the amount of incoming of the transmitted energy by said detection unit, And acquires third predetermined information based on at least one of an incoming amount of the energy detected by the detection unit or a temporal change of the incoming amount with time by said information input unit, (Aspect 111)

A device

That has one or a plurality of detection units for detecting incoming amount of energy by incoming light or electromagnetic waves from a partner device having a panel, That has an information input unit which acquires second predetermined information based on a temporal change in the incoming amount of said energy detected by said detection unit, Wherein said incoming amount includes position information of said panel, Wherein said information input unit acquires one or a plurality of said position information detected by said detection unit.

(Aspect 112)

The device according to aspects 111 further comprise,

A processing unit that executes information processing corresponding to said one or a plurality of the position information, An information output unit that outputs a predetermined output based on said information processing;

(Aspect 113)

The device according to aspects 112, wherein said information output unit performs predetermined output by any one of information among wireless transmission, audio output, light emission, and vibration.

(Aspect 114)

The device according to any one of aspects 111 to 113, wherein said detection unit comprises a photodiode.

(Aspect 115)

The device according to any one of aspects 111 to 114, wherein said information input unit acquires said position information in a state in which the opposite surface of said device come into contact with or come into proximity with said panel, (Aspect 116)

A device

That has a housing having a working face for causing the device to act on a partner device, Wherein at least a part of said working face is formed by a support layer filled by a low dielectric constant insulating material by being exposed or formed by coating a coating material and provided with one or more conductive elements, Wherein said housing has one or more physical quantity control units that cause a physical quantity change in each of said one or more elements in a layer that is separated from the working face via said support layer, Wherein a conductive layer is formed on the opposite surface from the working face of said housing by being exposed or coated with a coating material, Wherein said one or more elements are respectively connected to the conductive layer via conductive paths via said one or more physical quantity control units.

(Aspect 117)

The device according to aspect 116, wherein said one or more elements each include a conductive material layer that has a lower hardness than said metal layer, which covers a metal layer and the working face of said metal layer.

(Aspect 118)

The device according to aspect 117, wherein said conductive material layer is a printed workpiece.

(Aspect 119)

The device according to any one of aspects 116 to 118, Wherein at least another part of the working face is formed with a second support layer formed by arraying a plurality of openings allowing light to pass there through, Wherein photoelectric conversion elements those receive light from the plurality of openings is provided in a layer that is separated from said working face by said support layer (Aspect 120)

The device according to aspect 119, wherein a plurality of photoelectric conversion elements are provided to form a solar panel.

(Aspect 121)

The device according to any one of aspects 116 to 120, wherein the low dielectric constant insulating material has a high hollow structure or a porous structure.

(Aspect 122)

A device according to any one of the aspects 116 to 121,

Wherein said physical quantity control unit is placed outside of said housing,

Which is specified as a portion sandwiched between the two partial regions,

Where one of the region includes all of the one or more elements on the working face in said housing and Where the other region is specified on a position sandwiching said housing with respect to the partial region on said opposite surface in said housing.

(Aspect 123)

The device according to any one of aspects 116 to 122, wherein the housing is a flat plate type structure.

(Aspect 124)

The device according to any of aspects 1 to 95, further comprising all of the features according to aspects 116 to 123.

OTHER EXAMPLES

This embodiment further includes the following example.

Example 1

<Device that Inserts all OFF and Outputs Physical Quantity (FIG. 199)> device working on a panel having a sensor for detecting a physical quantity, that has a working face on which the change in said physical quantity that can be detected by said panel occurs from the opposite surface of said device, that has one or more elements formed on the working face, And a physical quantity control unit for causing each of said one or more elements to cause a change in said physical quantity;

And an information output unit that drives said one or more physical quantity control units to output first information according to said change in said physical quantity, Wherein said change in said physical quantity is a change causing an ON state in which a physical quantity from said elements is detected by said panel and an OFF state in which a physical quantity from said elements is not detected by said panel, Said device repeat executes that said information output unit sets at least one of said one or more elements to be in an ON state at a first point in time and turns off all of said one or more elements at a second point in time after the first point in time

Example 2

The device according to Example 1, further comprising,

One or a plurality of detection units for detecting the amount of incoming of energy by incoming light or electromagnetic waves from a partner device having said panel, And an information input unit that acquires second information based on a temporal change in said energy detected by said detection unit

Example 3

The device according to Example 2, wherein

Each time a predetermined amount of information is outputted as the first information from the information output unit, said device responds with the energy by the light or the electromagnetic wave including the information acquired by the partner device, Said information input unit extracts from said response energy and acquires response information, performs true/false determination based on the acquired response information and said predetermined amount of information, and when both do not match, said information output unit re-outputs the corresponding predetermined amount of information,

Example 4

<Synchronization Signal (FIG. 198, FIG. 200)>

The device according to Example 3,

Wherein said first predetermined information is defined by a combination of elements in an ON state among said one or more elements, Wherein said partner device detects an OFF state in which all of said one or more elements are OFF through said panel, Wherein in response to the fact that at least OFF identification information indicating that the OFF state has been recognized is included in the second information and outputted, after the information input unit has inputted the OFF identification information, the information output unit generates the ON state by using the OFF identification information as a synchronization signal by the next change in said physical quantity,

Example 5

(FIG. 200)

The device according to Example 4, wherein the information input unit acquires the response information as said OFF identification information.

Example 6

(FIGS. 207 to 209)

A device working on a panel having a sensor for detecting a physical quantity,

And a working face on which the change in said physical quantity that can be detected by said panel occurs from the opposing surface of said device, One or more elements formed on the working face, A physical quantity control unit for causing each of said one or more elements to cause a change in said physical quantity;

And an information output unit that drives said one or more physical quantity control units to output information according to a change in said physical quantity, Wherein said one or more elements are formed such that the change in said physical quantity occurring in the vicinity of the center of each contact surface in contact with said panel is greater than in the vicinity of the periphery of the contact surface.

Example 7

(FIGS. 207 to 209)

The device according to Example 6,

Wherein said one or more elements include:

(Condition 1) the height in the normal line direction in the vicinity of the center of each contact surface is a convex shape higher than near the periphery, (Condition 2) the conductor area per unit area covering the vicinity of the center of each contact surface is larger than the vicinity of the periphery, (Condition 3) the conductivity in the vicinity of the center of each contact surface is higher than around the periphery, Wherein Said device that satisfies one condition selected from the group of the three conditions.

Example 8

<Calibration> (FIGS. 202 to 206)

A device working on a panel having a sensor for detecting a physical quantity,

That has a working face on which said change in said physical quantity that can be detected by said panel occurs from the opposing surface of said device, One or more elements formed on the working face, A physical quantity control unit for causing each of said one or more elements to cause a change in said physical quantity;

An information output unit that drives said one or more physical quantity control units to output information according to a change in said physical quantity;

And an adjustment unit that controls said physical quantity control unit to adjust a degree of action on said panel in accordance with a change in a physical quantity generated in said one or more elements.

Example 9

<Adjustment of Switch Bias> (FIG. 202)

The device according to Example 8,

Wherein said physical quantity control unit is a semiconductor switch, wherein said adjustment unit controls a driving voltage value or a driving current value when turning on the semiconductor switch.

Example 10

(FIG. 203)

The device according to Example 8,

Wherein said physical quantity control unit is a semiconductor switch, wherein said adjustment unit drives said semiconductor switch to turn on with a pulse signal and controls a duty ratio of the pulse signal or a repetition period of the pulse signal.

Example 11

(FIG. 204A, FIG. 204B)

The device according to Example 8,

Wherein said physical quantity control unit is a semiconductor switch,

Wherein said one or more elements have portions of a central metal film and one or more annular metal films surrounding portions of said central metal film, wherein said adjustment unit adjusts the number of portions of said central metal film and portions of said one or more annular metal films conducted by the semiconductor switch.

Example 12

(FIGS. 202 to 205)

The device according to any one of Examples 8 to 11,

Further comprising one or a plurality of detection units for detecting an incoming amount of energy due to incoming light or electromagnetic waves from a partner device having said panel, Wherein said physical quantity control unit causes a change in said physical quantity for adjustment in each of the one or more elements, The detection unit acquires a response to said change in said physical quantity for adjustment from the partner device, wherein the adjustment unit adjusts the degree of action on said panel according to the response.

Example 13

A device working on a panel having a sensor for detecting a physical quantity comprising, a working face on which said change in said physical quantity that can be detected by said panel occurs from the opposing surface of the device, One or more elements formed on said working face, A physical quantity control unit having MEMS (Micro Electro Mechanical Systems), causing said one or more elements to cause the change in said physical quantity, And an information output unit which drives said one or more physical quantity control units to output information by a change in said physical quantity.

Example 14

The device according to Example 12, wherein said MEMS conducts or blocks conductive paths to which said one or more elements are connected by movable electrodes and actuators for driving the movable electrodes.

Example 15

(FIGS. 212 to 217)

A card shaped device acting on a panel having a sensor for detecting a physical quantity, wherein a working face on which said change in said physical quantity that can be detected by said panel occurs from the opposing surface of said device, that has one or more elements formed on said working face, that has a dielectric layer interposed between said working face and said opposite surface of the card shape with respect to the working face, that has a mesh conductor layer formed on said opposite surface side of said dielectric layer, Wherein said dielectric layer is formed of an insulator capable of detecting a change in said physical quantity acting on said panel from said contact position as a user contacts said surface of said dielectric layer including said mesh conductor layer.

Example 16

(FIGS. 216 to 217)

The device according to Example 15, wherein grooves parallel to the conductive paths constituting said mesh conductor layer are formed in said dielectric layer.

Example 17

The device according to Example 15 or 16,

Further comprising said physical quantity control unit for causing each of said one or more elements to cause a change in said physical quantity, And an information output unit that drives said one or more physical quantity control units according to the change in said physical quantity to output first predetermined information.

Example 18

(FIG. 125, FIG. 126, FIG. 129)

The device according to Examples 1 to 17, wherein three or more of said elements are provided, and a physical quantity change can be caused at three or more positions on a panel that are asymmetric with respect to two intersecting axes on said working face.

Example 19

(FIG. 196, FIG. 200)

The device according to Example 1 to 18,

Wherein said change in said physical quantity is a change causing an ON state in which said physical quantity is detected by said panel and an OFF state in which said physical quantity is not detected by said panel, wherein said first predetermined information is defined by a pattern that is a combination of elements in the ON state and does not include a combination of elements in which said one or more elements are all in an OFF state.

Example 20

(FIG. 196, FIG. 200)

The device according to Example 1 to 19,

Wherein said change in said physical quantity is a change causing an ON state in which said physical quantity is detected by said panel and an OFF state in which said physical quantity is not detected by said panel, wherein the first predetermined information is defined by a pattern which is the element placement in an ON state excluding a predetermined number of reservation patterns including a reference pattern for causing said panel to recognize the orientation of said device.

Example 21

<Presence of Air Layer (FIGS. 179 to 187, 210, 211)>

A device acting on a panel having a sensor for detecting a physical quantity,

That has a working face having a change in said physical quantity that can be detected by said panel from an opposing surface of said device and an manipulation surface to receive an operation by a user on said opposite side of said working face, wherein an element regions where said one or more elements are placed and non-element region other than said element region exist, Between the working face and the operating surface, An insulating layer having a porous structure, a hollow structure, or a structure filled with a low dielectric constant insulating material, On the manipulation surface side of the insulating layer, Which has a wiring control layer including a physical quantity control unit for causing each of said one or more elements to cause a change in said physical quantity and a wiring part for connecting said physical quantity control unit to said one or more elements, Wherein each of the one or more elements is connected to a wiring control unit by through conductive wires penetrating the insulation layer, Wherein said physical quantity control unit is placed in a portion of an upper layer which is said working face side corresponding to said non-element area of said wiring control layer, and said wiring part connects said physical quantity control unit and the through wiring in the wiring control layer.

Example 22

<Detection Unit of Energy Incoming Amount> (Described with Reference to FIGS. 179 to 186 B in the Embodiment of FIG. 210)

The device according to Example 21,

Wherein one or a plurality of detection units for detecting said amount of incoming of energy due to incoming light or electromagnetic waves from a partner device having said panel is provided in an upper layer which is said working face side of said insulating layer, wherein light or electromagnetic waves are formed to be permeable to one or more detection units.

Example 23

<Power Supply> (Description in FIGS. 210 and 219 with Reference to FIGS. 179 to 186 B)

The device according to Example 21 or 22,

Wherein a power supply circuit for supplying electrical energy based on incoming light or electromagnetic wave energy from a partner device having said panel is provided in an upper layer which is said working face side of said insulating layer, wherein light or electromagnetic waves are formed to be permeable to said supply circuit.

Example 24

<Password is Registered Inside the Card, Personal Authentication> (FIG. 220, FIG. 221)

A device working on a panel having a sensor for detecting a physical quantity,

And a working face on which said change in said physical quantity that can be detected by said panel occurs from the opposing surface of the device, That has one or more elements formed on the working face, That has a physical quantity control unit for causing each of the one or more elements to cause a change in said physical quantity;

That has an information output unit that drives said one or more physical quantity control units to output first information according to a change in said physical quantity;

That has one or a plurality of detection units for detecting an incoming amount of energy due to incoming light or electromagnetic waves from a partner device having said panel, That has an information input unit configured to acquire second information based on a temporal change in the energy detected by said detection unit;

That has a nonvolatile storage unit,

Wherein said information input unit executes

A registration process of registering authentication information as the second information in sad nonvolatile storage unit, And an authentication process for comparing the second information input after the registration process with the storage information stored in the nonvolatile storage unit, And said information output unit outputs the result of said authentication process as first information.

Example 25

The device according to Example 24,

Wherein said device is card-shaped, said one or more elements are placed in a first region of said working face, and a second region different from the first region of the working face is formed of a dielectric, A label indicating a character is given to a surface opposite to the working face of the second region and a user touches a finger on the label in addition to the information pattern by said one or more elements, And said panel can detect a change in said physical quantity caused by touching said label against said panel.

Example 26

An information system comprising the device according to Example 24 and an information device having a touch panel, wherein the second information is input through said touch panel.

Example 27

<Information Device Corresponding to Example 1> (FIG. 196)

An information device that acquires first information comprising,

A panel capable of specifying a position at which a change in a physical quantity and a change in said physical quantity occur at a position on a plane;

And a control unit,

Wherein said change in said physical quantity is a change causing an ON state in which said physical quantity is detected by said panel and an OFF state in which said physical quantity is not detected by said panel, Said control unit specifies a first time point at which all of the positions of one or more detection targets on said panel are in an OFF state, and detects that at least one of the positions of said one or more detection targets is in an ON state, and identifies a second point in time in which all of the positions of the one or more detection targets are in an OFF state, Wherein said information device acquires first information depending on a combination of positions in time whether or not the detection target whose ON state has been detected in the period from the first time point to the second time point by a combination of positions, Example 28

<Presence of Reference Pattern, Restriction of Position of Detection Object> (FIGS. 196 to 198)

An information device according to Example 27,

Wherein said control unit acquires a plurality of patterns which are combinations of positions where a change in physical quantity at a position on said plane is caused by said panel, and said plurality of patterns include a reference pattern for designating a position of said detection target, and an information pattern for defining the first information.

Example 29

<Synchronization by Optical Code (Reconfirmation of FIGS. 164A to 172)>

An information device for communicating with an device which receives an optical signal and inputs information and outputs information due to a change in a physical quantity other than an optical signal, That has a display, That has a panel capable of specifying a change in a physical quantity and a position at which a change in said physical quantity occur on said display;

That has a control unit,

Wherein, said information device that changes a luminance of a predetermined area on the display and detects a change in a physical quantity generated by the device on a panel in synchronization with the change in the luminance.

Example 30

<Synchronization Due to Change in Physical Quantity (Reconfirmation of FIGS. 164A to 172)>

An information device for communicating with a device which receives an optical signal and inputs information and outputs information due to a change in a physical quantity other than an optical signal, That has a display, That has a panel capable of specifying a change in a physical quantity and a position at which a change in said physical quantity occur on said display;

That has a control unit,

Wherein, said information device detects a change in a physical quantity at a predetermined position on said panel, and changes a luminance of a predetermined area on said display in synchronization with a change in said physical quantity.

Example 31

<(Electrostatic Capacity+Recognition by Human Touch) (FIGS. 125 to 139)>

The information device comprising a display, and panel capable of specifying a change in a physical quantity and a position at which a change in said physical quantity occur at a position on said display, and a control unit, wherein said control unit specifies a plurality of first type positions on said panel where said change in said physical quantity has occurred, And executes a first process (activation of an application or provision of a service) based on the state (ON or OFF) of said physical quantity at said plurality of first type positions, while maintaining the state (ON or OFF) of said physical quantity at the plurality of first type positions, specifies a position of a second type on said panel where a change in said physical quantity has occurred at positions other than said plurality of first type positions on said panel, executes a second process (command input, numeric input, etc.) corresponding to the position of the second type.

Example 32

<Detection of Change in Physical Quantity and Detection of the Amount of Energy to be Performed in a Time in which at Least One Part is Overlapped, FIG. 172>

An information device for communicating with an device which receives an optical signal and inputs information and outputs information due to a change in a physical quantity other than an optical signal, that has a display, that has a panel capable of specifying a change in a physical quantity and a position at which a change in said physical quantity occur on said display;

that has a control unit, wherein said control unit inputs second information based on an optical signal from said display to the device in a time at which at least one part overlaps a time for executing a detection process of a position where said change in said physical quantity has occurred by said panel, Example 33

<Error Check by Folding Back Optical Code> (FIGS. 196 to 200, FIG. 166, FIG. 167, FIG. 168, FIG. 169, and FIG. 171)

An information device for communicating with an device which receives an optical signal and inputs information and outputs information due to a change in a physical quantity other than an optical signal, that has a display, that has a panel capable of specifying a change in a physical quantity and a position at which a change in said physical quantity occur on said display;

that has a control unit, wherein said control unit acquires a predetermined amount of information based on said change in said physical quantity detected by said panel and by changing the luminance of a predetermined area of said display, to convert the optical signal including the acquired information of the predetermined amount into said information, and let said device receive said optical signal.

Example 34

(FIG. 196 to FIG. 199, FIG. 171, FIG. 172)

The information device according to Example 33, wherein said control unit causes the device to receive an optical signal including the predetermined amount of information each time a predetermined amount of information is acquired based on a change in said physical quantity.

Example 35

(FIGS. 196 to 199)

The information device according to Example 33,

Wherein said change in said physical quantity is a change causing an ON state in which said physical quantity is detected by said panel and an OFF state in which said physical quantity is not detected by said panel, wherein said control unit causes said device to receive an optical signal including said predetermined amount of information when detecting that said one or more elements are all in an OFF state by said panel.

Example 36

<Error Check by Reflecting Optical Code, Error Detection Receiving from Device and FIGS. 142, 143>

An information device for communicating with a device which receives an optical signal and inputs information and outputs information due to a change in a physical quantity other than an optical signal, that has a display, that has a panel capable of specifying a change in a physical quantity and a position at which a change in said physical quantity occur on said display;

that has a control unit, wherein the controller causes the device to receive an optical signal including a predetermined amount of information by changing luminance of a predetermined region of the display, a predetermined amount of information based on a change in said physical quantity detected by said panel is acquired from said device, performing a true/false determination between a predetermined amount of information included in said optical signal and a predetermined amount of information based on a change in said physical quantity, and if they do not match, said information device transmits an optical signal including the corresponding predetermined amount of information to the device that makes it receive again.

Example 37

The information device according to Example 36, wherein said control unit acquires a predetermined amount of information based on a change in said physical quantity from the device each time said device receives an optical signal including a predetermined amount of information.

Example 38

<Output Position Information of Panel, FIG. 173>

An information device for communicating with an device which receives an optical signal and inputs information and outputs information due to a change in a physical quantity other than an optical signal, that has a display, that has a panel capable of specifying a change in a physical quantity and a position at which a change in said physical quantity occur on said display;

That has a control unit, wherein the controller causes said device to receive an optical signal including information on a position where a change in said physical quantity has occurred by changing a luminance of a predetermined region on the display.

Example 39

<Input Optical Signal to the Device and Make Encrypted Information Based on Input Information, FIG. 67C> an information device for communicating with an device which receives an optical signal and inputs information and outputs information due to a change in a physical quantity other than an optical signal, that has a display, that has a panel capable of specifying a change in a physical quantity and a position at which a change in said physical quantity occur on said display;

that has a control unit, wherein said controller changes the luminance of an area on said display that is uniquely recognized from an arrangement of a plurality of positions where said panel detects a change in said physical quantity to thereby transmit the optical signal including the second information to the device, (Authentication, etc.) said device acquires first information generated based on the inputted second information through said panel, so that said information device executes the processing according to the first predetermined information.

Example 40

<Correcting Proper Change in the Physical Quantity> (FIG. 175, FIG. 176, FIG. 205)

an information device for communicating with a device which receives an optical signal and inputs information and outputs information due to a change in a physical quantity other than an optical signal, that has a display, that has a panel capable of specifying a change in a physical quantity and a position at which a change in said physical quantity occur on said display;

that has a control unit, said controller changes the luminance of a predetermined area on the display which is uniquely recognized from the placement of the plurality of positions where the panel detects the change in said physical quantity, thereby causing the device to generate a change in said physical quantity to be tested in the device, and instructs the device to receive an optical signal including an instruction to adjust to a change in an appropriate physical quantity based on a detection result of a change in said physical quantity by the panel.

Example 41

<Threshold Change of Information Device> (FIG. 206)

An information device for communicating with a device which receives an optical signal and inputs information and outputs information due to a change in a physical quantity other than an optical signal, that has a display, that has a panel capable of specifying a change in a physical quantity and a position at which a change in said physical quantity occur on said display;

That has a control unit, wherein said change in said physical quantity is a change causing an ON state in which said physical quantity is detected by said panel and an OFF state in which said physical quantity is not detected by the panel, wherein said control unit has an adjustment mode for adjusting a change in said physical quantity and a result of specifying the position by said panel, and in the adjustment mode, in accordance with a detection result when said physical quantity through said panel is in an ON state.

Example 42

When ON time, experiment result, match-move processing is not performed, OFF time is not required. Also, even if there is some floating capacity, whether floating capacitance or original ON can be judged with detection software can be judged by passage of time.

A device working on a panel having a sensor for detecting a physical quantity, that has a working face on which the change in said physical quantity that can be detected by said panel occurs from the opposing surface of the device, that has one or more elements formed on the working face, that has a physical quantity control unit for causing each of said one or more elements to cause a change in said physical quantity;

that has an information output unit that drives the one or more physical quantity control units to output first information according to a change in said physical quantity, wherein the change in said physical quantity is a change in the ON state in which a physical quantity from the element is detected by said panel, and a time period during which the ON state is controlled by said panel controls said panel to scan pixel data of the entire panel is set at a time more than twice the sampling.

Example 43

The device according to Example 42, wherein said change in said physical quantity is a change causing an ON state in which a physical quantity from said elements is detected by said panel and an OFF state in which a physical quantity from said element is not detected by said panel, wherein said first information includes an information pattern defined by a combination of elements in which said physical quantity is in an ON state among said one or more elements and a delimiter pattern in which said physical quantity is in an OFF state in all of said one or more elements alternately generated.

Example 44

The device according to Example 43, wherein in the delimiter pattern in which said physical quantity is in an OFF state, the time of the OFF state is set to a time equal to or more than twice the sampling time.

Example 45

The device according to Example 43, wherein in the delimiter pattern in which said physical quantity is in an OFF state, the time of the OFF state is set to 30 ms or more.

EXPLANATION OF SIGNS

Description of Reference Numerals and Signs

1 CODE GENERATION APPARATUS
3 CODE RECOGNITION APPARATUS
11 INFORMATION READING UNIT
12 CODE GENERATION UNIT
13 CODE OUTPUT UNIT
31 TOUCH PANEL
32 DETECTING UNIT,
33 RECOGNITION UNIT
110 APPARATUS, CARD TYPE APPARATUS,
200 INFORMATION DEVICE,
111 ELEMENT,
112 PHOTOELECTRIC CONVERSION ELEMENT ARRAY,
113 FINGERPRINT SENSOR,
114 CONTACT CONDUCTOR (CONDUCTOR PAD)
114A CONDUCTIVE LAYER,
115 SW,
116 CPU,
117 MEMORY,
118 COMPARATOR,
119 CONTROL LINE,
120 POWER SUPPLY LINE,
121 DRIVE CIRCUIT,
122 BATTERY,
123 CAPACITOR,
124 ANTENNA,
125 POWER CONVERSION CIRCUIT,
126 PIEZOELECTRIC ELEMENT,
127 RECTIFICATION CIRCUIT,
128 THERMOELECTRIC ELEMENT,
129 LIGHT QUANTITY MEASURING ELEMENT ARRAY

The invention claimed is:

1. A device, working on a panel having a sensor for detecting a physical quantity comprising:
- a working face on which the change in said physical quantity that can be detected by said panel from the opposing surface of the device,
- one or more elements formed on said working face,
- a physical quantity control unit for causing the one or more elements to cause said physical quantity change,
- an information output unit that drives the one or more physical quantity control units according to the change in said physical quantity to output first predetermined information,
- wherein said physical quantity control unit suppresses said floating physical quantity so that said panel does not recognize floating physical quantity when the output of said physical quantity from the element is turned OFF, and
- said physical quantity control unit has a semiconductor switch whose parasitic capacitance between the terminals is suppressed to 1.6 pF or less, preferably 0.8 pF or less, more preferably 0.5 pF or less.

2. The device according to claim 1, wherein the semiconductor switch has a reverse bias setting so that the resistance value when the switch is off is equal to or greater than 800 kohms and the junction capacitance is equal to or less than 2.1 pF.

3. The device according to claim 1, further comprising a contact conductor formed on a surface opposite to said working face, said contact conductor being made of a conductive material which is brought into proximity or contact from the outside, wherein said one or more physical quantity control units include a switch for controlling whether to form a path from each of the one or more elements to said contact conductor or to block said path.

4. The device according to claim 3, wherein a non-conductive layer is provided as a protective and printed layer on the surface of said contact conductor.

5. The device according to claim 1, wherein the element is a thin film conductor formed on said working face.

6. The device according to claim 1, wherein the device is a stamp-type device or a card-type device working on a panel.

7. The device according to claim 1, wherein the counterpart device having said panel is either a smartphone or a tablet.

8. A device, working on a panel having a sensor for detecting a physical quantity comprising: a working face on which the change in said physical quantity that can be detected by said panel occurs from the opposing surface of the device, a plurality of elements formed on said working face, a physical quantity control unit for causing the plurality of elements to cause said physical quantity change, an information output unit that drives the one or more physical quantity control units according to the change in said physical quantity to output first predetermined information, one or a plurality of detection units provided on at least one of said working face and the opposite face, wherein said detection unit is an image sensor and wherein the image sensor images a barcode, a dot code, a two-dimensional code or a color code as input information input to said device and wherein, image sensor is provided so as not to receive external light in a state of being placed on either the predetermined medium or the display, an irradiation unit that irradiates said input information with light of a predetermined wavelength is provided, when said image sensor is placed on the predetermined medium, a reaction of the light irradiated on said predetermined medium is imaged, and when placed on the display, the image displayed by the display is captured.

9. The device according to claim 8, wherein said image sensor images a pattern by at least a part of a body part or a concavo-convex part on a surface of said part.

10. The device according to claim 8, wherein the input information is either formed on a predetermined medium or displayed on a display.

11. The device according to claim 8, wherein said image sensor detects the reaction of light when said predetermined wavelength is irradiated from said irradiating unit,
- which recognizes whether the device is placed on said predetermined medium or placed on said display.

12. The device according to claim 8, further comprising a processing unit that executes information processing based on information captured by said image sensor,
- wherein said information output unit outputs said first predetermined information including a result of said information processing.

13. The device according to claim 8, wherein at least one or more of the detection units is placed in the vicinity of a position where said elements are placed.

14. The device according to claim 8, further comprising a contact conductor formed on a surface opposite to said working face, said contact conductor being made of a conductive material which is brought into proximity or contact from the outside, wherein said one or more physical quantity control units include a switch for controlling whether to form a path from each of the one or more elements to said contact conductor or to block said path.

15. The device according to claim 8, wherein the element is a thin film conductor formed on said working face.

16. The device according to claim 8, wherein the device is a stamp-type device or a card-type device working on a panel.

17. The device according to claim 8, wherein the counterpart device having said panel is either a smartphone or a tablet.

18. A device, working on a panel having a sensor for detecting a physical quantity comprising:

a working face on which the change in said physical quantity that can be detected by said panel occurs from the opposing surface of the device, a plurality of elements formed on said working face, a physical quantity control unit for causing the plurality of elements to cause said physical quantity change, an information output unit that drives the one or more physical quantity control units according to the change in said physical quantity to output first predetermined information, one or a plurality of detection units provided on at least one of said working face and the opposite face, wherein said detection unit detects an incoming amount of energy due to incoming light or electromagnetic waves from a partner device having said panel, and wherein said device further comprises an information input unit that acquires second predetermined information based on a temporal change in the arrival amount of said energy detected by said detection unit.

19. The device according to claim 18, wherein said detection unit is placed at the position uniquely recognized by the disposition of the plurality of elements by which said panel detects said physical quantity.

20. The device according to claim 18, wherein said detection unit is a light receiving unit that detects light of one or more colors, wherein the information input unit acquires the second predetermined information with an optical signal based on at least either of the temporal change of the light amount or the light amount of said one color or plural colors.

21. The device according to claim 20, wherein said light detecting unit detects at least one of said plurality of colors as the optical signal for said synchronization.

22. The device according to claim 20 further comprising a processing unit that executes information processing based on said second predetermined information acquired by said information input unit, wherein said information output unit outputs the first predetermined information including a result of said information processing.

23. The device according to claim 22, wherein said information output unit outputs predetermined third information according to any one of information transmission by radio, audio output, light emission, and vibration.

24. A device, working on a panel having a sensor for detecting a physical quantity comprising:

a working face on which the change in said physical quantity that can be detected by said panel occurs from the opposing surface of the device, a plurality of elements formed on said working face, a physical quantity control unit for causing the plurality of elements to cause said physical quantity change, an information output unit that drives the one or more physical quantity control units according to the change in said physical quantity to output first predetermined information, one or a plurality of image sensor provided on at least one of said working face and the opposite face, wherein the image sensor captures image displayed by a display and input information in a state of being placed on the display.

25. The device according to claim 24, wherein the image is a barcode, a dot code, a two-dimensional code or a color code as input information input to said device.

26. The device according to claim 24, wherein said image sensor images a pattern by at least a part of a body part or a concavo-convex part on a surface of said part.

27. The device according to claim 24, wherein the image sensor is provided so as not to receive external light.

28. The device according to claim 24, further comprising an irradiation unit that irradiates a predetermined wavelength, wherein, when the image sensor is placed on a predetermined medium, image formed on the predetermined medium is captured.

29. The device according to claim 28, wherein, when the image sensor cannot detect more than a predetermined light amount from imaging surface, the irradiation unit irradiates the predetermined wavelength.

30. A device, working on a panel having a sensor for detecting a physical quantity comprising:

a working face on which the change in said physical quantity that can be detected by said panel occurs from the opposing surface of the device, a plurality of elements formed on said working face, a physical quantity control unit for causing the plurality of elements to cause said physical quantity change, an information output unit that drives the one or more physical quantity control units according to the change in said physical quantity to output first predetermined information, one or a plurality of image sensor provided on at least one of said working face and the opposite face, and an irradiation unit that irradiates a predetermined wavelength, wherein, the image sensor captures image placed on the predetermined medium and input information in a state of being placed on the predetermined medium.

* * * * *